United States Patent [19]

Davidian

[11] 4,428,045

[45] Jan. 24, 1984

[54] APPARATUS FOR SPECIFYING AND RESOLVING ADDRESSES OF OPERANDS IN A DIGITAL DATA PROCESSING SYSTEM

[75] Inventor: Gary Davidian, Mountain View, Calif.

[73] Assignee: Data General Corporation, Westboro, Mass.

[21] Appl. No.: 301,998

[22] Filed: Sep. 11, 1981

[51] Int. Cl.$^3$ .......................... G06F 1/00; G06F 9/00
[52] U.S. Cl. ..................... 364/200; 364/300
[58] Field of Search ... 364/200 MS File, 900 MS File

[56] References Cited

U.S. PATENT DOCUMENTS

| | | | |
|---|---|---|---|
| 3,328,767 | 6/1967 | Ottaway | 364/200 |
| 3,510,847 | 5/1970 | Carlson et al. | 364/200 |
| 3,787,813 | 1/1974 | Cole et al. | 364/200 |
| 3,938,096 | 2/1976 | Brown et al. | 364/200 |
| 3,976,978 | 8/1976 | Patterson et al. | 364/200 |
| 4,084,228 | 4/1978 | DuFond et al. | 364/200 |
| 4,173,783 | 11/1979 | Couleur et al. | 364/200 |
| 4,240,139 | 12/1980 | Fukuda et al. | 364/200 |
| 4,241,397 | 12/1980 | Strecker et al. | 364/200 |

*Primary Examiner*—Mark E. Nusbaum
*Assistant Examiner*—William G. Niessen
*Attorney, Agent, or Firm*—Gordon E. Nelson; Joel Wall; Jacob Frank

[57] ABSTRACT

Improved apparatus for specifying and resolving addresses of operands in a digital data processing system. Instructions executed by the system are contained in procedures. Addresses are calculated using a set of architectural base addresses. Operands are represented in the instructions by means of names. The names include immediate names, which directly specify one of the architectural base registers and a displacement, and table names, which specify a name table entry in a name table associated with the procedure. The name table entry specifies how the address of the operand represented by the table name may be derived using the architectural base addresses and information contained in the name table. Each name table entry includes a basic name table entry. The basic name table entry contains a base source specifier and a base or displacement specifier. The base source specifier specifies either one of the architectural base addresses as a base address or that the base address is not one of the architectural base addresses. In the former case, the base or displacement specifier specifies a displacement; in the latter, it contains an immediate name or a table name specifying another name table entry in the name table and the base address is derived using the immediate name or table name. Calculation of addresses is performed by name processing apparatus which is responsive to the base source specifier and the base or displacement specifier.

3 Claims, 13 Drawing Figures

*IMPROVED POINTER FORMATS*

*NAME FORMATS*

NAME TABLE OVERVIEW

IMPROVED I-STREAM

CONCEPTUAL DIAGRAM OF S-LANGUAGE MACHINE IN CS 10110

CONCEPTUAL DIAGRAM OF CALCULATING
UNIT AND ACCUMLATOR IN THE PRESENT INVENTION

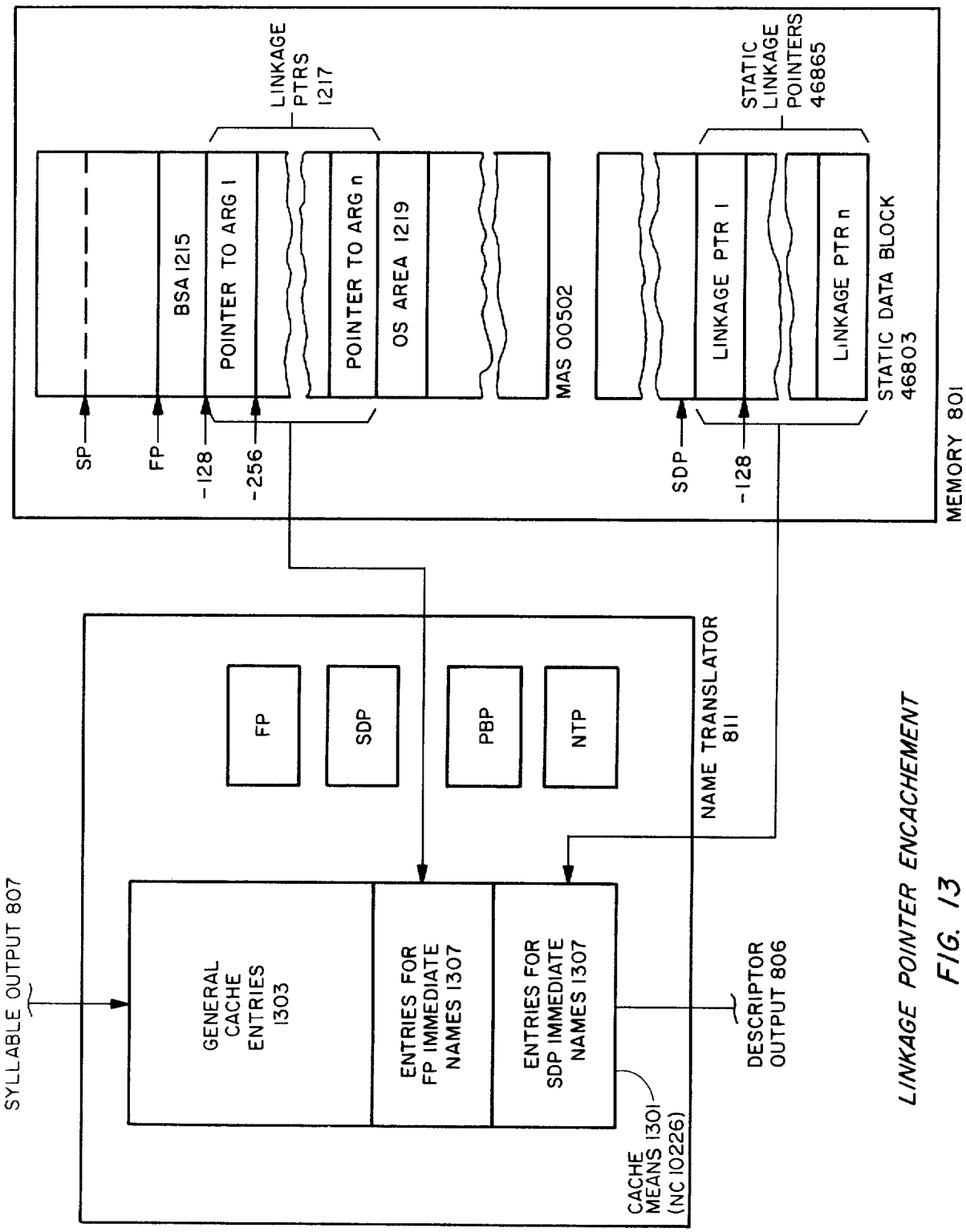

APPARATUS FOR SPECIFYING AND RESOLVING ADDRESSES OF OPERANDS IN A DIGITAL DATA PROCESSING SYSTEM

CROSS REFERENCE TO RELATED APPLICATIONS

The present patent application is related to U.S. patent application Ser. No. 266,539, filed May 22, 1981, and to U.S. patent application Ser. Nos. 301,997, 301,999, 302,000, 302,261, 302,262, 302,263, 302,264, 302,321, and 302,322, all filed on Sept. 11, 1981, and U.S. Pat. Ser. No. 303,312, filed Sept. 15, 1981.

BACKGROUND OF THE INVENTION

1. Field of the Invention

The present invention relates to digital data processing systems and more particularly to digital data processing systems characterized by one or more of the following features:

- An address space segmented into objects, so that an address of data consists of two parts: an object identifier specifying an object and an offset value specifying a location within the object specified by the object identifier.
- Pointers, that is, data which represents addresses, which may represent addresses either directly indirectly. Pointers which represent addresses directly contain addresses; those which represent addresses indirectly contain information which the digital data processing system uses to obtain an address.
- Multiple S-languages instead of a single instruction set. An S-language is an intermediate language closely related to a high-level programming language. The meaning of a given operation code in a system with multiple S-languages depends solely on the S-language.
- Standard operation code sizes and operand syllable sizes for all S-languages.
- Instructions contained in procedures in special objects called procedure objects. Execution of a procedure may be commenced only by a Call instruction.
- Instructions which specify locations in memory for data, an operation to be performed on the data, and a destination location in memory for the result of the operations, as opposed to instructions which specify transfers between memory and registers and operations on the contents of the registers.
- Call and Return instructions which have the same semantics and manipulate the same data structures in all S-languages.
- Base-displacement addressing from base pointers whose values may be changed solely by the execution of Call and Return instructions.
- Instructions in which operands are represented by names, that is, indexes into data structures called name tables containing name table entries. In order to obtain the operand's location, the name is resolved, i.e., information in the name's name table entry is combined with the values of the base pointers to produce a descriptor specifying the location, length, and type of the operand represented by the name.
- Cache means in the central processing unit for encaching information required to resolve a name.

The present invention may be employed with advantage in any digital data processing system having one or more of the listed characteristics and is particularly advantageous in a digital data processing system having several or all of the above characteristics.

2. Description of the Prior Art

The present data processing systems are an improvement over certain previous digital data processing systems, hereafter referred to as the original data processing systems and described more fully in U.S. patent application Ser. No. 266,539, filed May 22, 1981. The present and original systems have the characteristics listed above and have a number of advantages over traditional digital data processing systems.

Considering first the characteristics shared by the original and present systems, the segmentation of the address space into objects permits an address space which is on the one hand very large, and on the other hand divisible into private address spaces. Which users have access to a given set of objects is determined by a component of the digital data processing system called the access control system.

With regard to the pointers, the existence of pointers which represent addresses either directly or indirectly allows the interpretation of a pointer which represents an address indirectly to be delayed until the actual execution of the program using the pointer. Indeed, though the value of the pointer remains unchanged, the address derived from the value may vary in different executions of the program.

With regard to multiple S-languages, the use of different S-languages corresponding to different high-level languages allows the S-language to be tailored to the high-level language, thereby simplifying the task of compilers and reducing the amount of S-language code produced from a given amount of high-level language code. The complexity of S-language code is further reduced by the use of call and return instructions and instructions which specify operations in terms of the location of data in memory and the operations to be performed on the data and by the use of names to represent operands in the instructions. Since the names refer to name table entries containing location, length, and type information, complicated references are possible in spite of the simplicity of the names. The use of standard sizes for operation codes and operand syllables in all of the S-languages, finally, allows the construction of specialized hardware devices for parsing instructions.

The combination of uniform call and return S-instructions with base-displacement addressing from base pointers whose values may be changed only by a call or a return S-instruction, finally, ensures that a program's addressing environment remains constant throughout the execution of a procedure and allows name table entries to specify locations as offsets from the base pointers.

Experience with the original digital data processing systems of the type described above has, however, revealed a number of problems and shortcomings which reduce the speed and efficiency of execution of programs executed on such systems. These problems and shortcomings involve pointers, names and name table entries, the form of the S-language instructions, the kinds of operations which an opcode in an S-language may specify, the call and return operations, and the resolution of names in a procedure specifying the arguments with which the procedure was invoked.

Beginning with problems associated with object addressing, a pointer which directly specifies an address must specify both an object identifier and an offset, and pointers must therefore contain a large number of bits. Operations involving large pointers are therefore expensive both in terms of fetching and storing the pointers and in terms of processing them. While the extra overhead involved in these operations is not important in the infrequent cases in which a pointer specifies an address indirectly or specifies a location in another object, it interferes markedly with speed and efficiency in the frequent cases in which the pointer simply specifies another address in the object which contains the pointer. Indeed, in these cases, the only relevant information in the pointer is the offset, since the object identifier required for the pointer's value may be obtained from the pointer's own address.

The problems associated with names are similar to those associated with pointers. While a name and its associated name table entry offers a powerful means for dealing with complex references, no name can be resolved without reference to a name table entry and the need to retrieve information from a name table entry markedly increases the number of memory references needed to execute a program. The problems are increased by the fact that a large number of programs do not form complex references and therefore do not need the power provided by the use of names and name table entires. Furthermore, the arrangement of the information in the name table entry is crucial in a digital data system using names, since the length of time required to resolve a name is dependent on the number of fetches from memory required to obtain the information in the name's name table entry.

The problems associated with the S-languages stem from two main sources: first, the physical form of the S-languages is still too complicated to allow the construction of low-cost and efficient hardware parsing devices, and second, the simplicity of the operations described by the S-languages make it difficult to separate certain special types of operations capable of particularly efficient treatment from other operations capable of less efficient treatment.

In the original systems, the S-languages have operation codes of a fixed size, but the operand syllables in a given procedure may have one of a number of sizes. Thus, the hardware parsing device must cope with opcodes and operand syllables which differ in size and with a number of different sizes of operand syllables. Furthermore, it may be necessary to reset the hardware parsing device when a call or return instruction is executed, and it is therefore necessary to save the size of the operand syllables in the calling procedure.

As described above, S-instructions in the original systems specify operations in terms of an operation, locations in memory containing operands for the operation, and a location for the result of the operation. In certain frequent cases, in which the result of a first operation is used immediately as an operand in a second operation, it is more efficient to keep the result of the first operation in the central processing unit, without storing it in memory and retrieving it for the second operation. S-instructions in the original systems have no means of specifying that a result be retained in the central processing unit or that a succeeding S-instruction use the retained result as an operand. Consequently, the S-instruction for the first operation must specify that the result be stored at some location in memory and the S-instruction for the second operation must specify that location as the location of one of the operands. This results in three kinds of inefficiencies: first, additional memory operations are required to store the result of the first operation and fetch it for use in the second operation. Second, additional operand syllables are required to specify the location at which the result of the first operation is to be stored and from which it is to be retrieved, and third, additional memory is required for the temporary storage of the result of the first operation.

Similarly, the use of a single Call instruction requires the inefficient treatment of certain simple cases. At its simplest, a call operation in the original systems requires only the following:

Saving FP, a base pointer specifying the calling procedure's stack frame, SP, a pointer to the top of the calling procedure's stack frame, and the calling procedure's program counter value.

Calculating a new value for the program counter.

Constructing a new frame on the stack for the called procedure and calculating new values for FP and SP.

A return operation need only restore the saved values of the program counter, FP, and SP. Other calls, however, require the retention of much more state. Examples in order of increasing complexity are calls to procedures using different name tables, calls to procedures using different S-languages, calls to procedures contained in different procedure objects, and calls which affect the access control system. Returns from such calls must of course restore the retained state. In the original systems, all Calls and Returns commence as if they are one of the complex cases and do more than is required for the simplest case. Since simple Calls and Returns occur with higher frequency than the others, the result is again slow and inefficient execution of programs.

The fact that names in the original system are nothing more than indexes of name table entries also prevents maximum use of encachement means for descriptors. Many names in a procedure's S-instructions refer to arguments to the procedure, and these names are resolved by forming a descriptor from a pointer to the argument's location. The pointer to the argument's location must be formed when a call is made and as a linkage pointer, its value will not change during the execution of the called procedure. The pointer is therefore encacheable and the descriptor corresponding to it is available for encachement when the Call S-instruction is executed, but in the original systems, there is no way of determining when the call is made what names the called procedure will refer to the pointers by. Consequently, the pointers cannot be encached when the call is made, but must be encached when a name whose resolution requires the value is presented to the name cache and the value is not present.

The present invention provides data processing system improvements and features which solve the above-described problems and limitations of the original systems.

SUMMARY OF THE INVENTION

The present invention relates to means for increasing the efficiency of operation of the original digital data processing systems while retaining the original systems' capabilities. The original digital data processing systems have shown themselves more powerful than traditional digital data processing systems with regard to certain operations which are difficult or impossible on these traditional systems, but have also shown themselves to be less efficient than traditional digital data processing systems with regard to certain frequently-occurring simple operations. By providing means for distinguishing these frequently-occurring operations from those requiring the full power of the original systems, the present invention allows the construction of digital data processing systems which retain the full capabilities of the original digital data processing systems and also attain or exceed the efficiency of traditional digital data processing systems.

The problems with names are solved in the present invention by creating two classes of names, table names, which work in the same manner as names in the prior art, and immediate names, which contain in themselves all the information needed for a simple data reference. Immediate names therefore need no name table entries and may may be resolved without reference to the name table. In many programs, most of the names are immediate names. In such programs, the amount of information which must be fetched from the name table is greatly reduced and the speed of program execution is correspondingly increased. A further benefit of immediate names is a reduction in the size of the name table. In the present invention, the name table entries themselves have been improved to reduce the number of bits which must be fetched to resolve a table name and to speed the operations performed in the course of the resolution of a table name. The improved name table entries consist at least of a basic name table entry and may also include up to three suffixes. The basic name table entry includes an architectural base pointer code and a base or displacement field. The architectural base pointer code either specifies one of the architectural base pointers as a base address or that the base address is not an architectural base pointer. When one of the architectural base pointers is the base address, the base or displacement field provides the displacement; otherwise, the base or displacement field specifies the base address. When the base or displacement field specifies the base address, it does so by means of either a table name or an immediate name. The table name or immediate name is resolved using the name table and the architerctural base pointers to obtain the base address.

BRIEF DESCRIPTION OF DRAWINGS

FIG. 13 is a conceptual diagram of linkage pointer encachement in the present invention.

DESCRIPTION OF THE PREFERRED EMBODIMENT

Introduction

Figure 1:
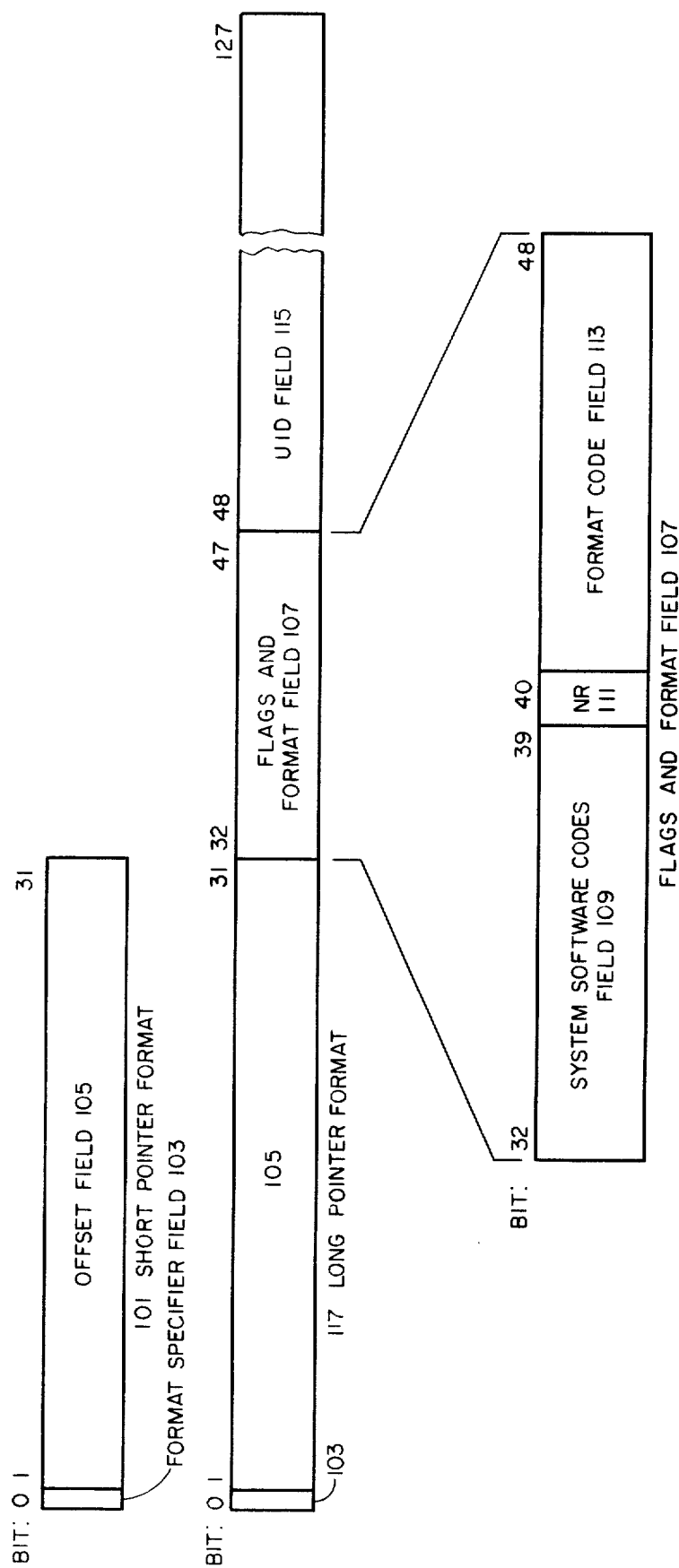
FIG. 1 is a diagram of the improved pointer formats of the present invention.

The inventions disclosed herein were made in the course of continuing development of the original data processing systems described in U.S. patent application Ser. No. 266,539 and related patent applications and may be best understood in the light of U.S. patent application Ser. No. 266,539. U.S. patent application Ser. No. 266,539 is accordingly incorporated by reference into the present application and is referred to throughout the present application. In particular, reference numbers having five digits in the present application refer to figures from U.S. patent application Ser. No. patent application 266,539, while those having three or four digits refer to figures in the present application. In both sets of figures, the rightmost two digits indicate items in the figure whose number is specified by the leftmost digits. Thus, 201 is a reference number specifying FIG. 2 of the present application, while 46865 is a reference number specifying FIG. 468 of U.S. patent application Ser. No. 266,539. Certain reference numbers in U.S. patent application Ser. No. 266,539 have three or four digits. To distinguish these reference numbers from those referring to figures of the present application, the present application expands the former reference numbers to five digits by adding leading 0's. For example, reference number 602 of U.S. patent application Ser. No. 266,539 appears herein as reference number 00602, specifying FIG. 6 of U.S. patent application Ser. No. 266,539.

The digital data processing system (CS 10110) of U.S. patent application Ser. No. 266,539 was described in U.S. patent application Ser. No. 266,539 as a system including hardware and a micromachine, described in Chapter 2 of U.S. patent application Ser. No. 266,539, an S-interpreter for interpreting S-instructions (SINs), described in Chapter 3 of U.S. patent application Ser. No. 266,539, and KOS procedures and microcode for providing object addressing, control of access to objects, and processes for executing procedures, all described in Chapter 4 of U.S. patent application Ser. No. 266,539. The inventions described in the present application concern only the S-interpreter portion of CS 10110. The other portions of CS 10110 remain as described in U.S. patent application Ser. No. 266,539. In particular, the embodiment of the inventions described in the present application employs the hardware of CS 10110; the hardware is made to perform the new functions described in the present application by means of microcode specific to this embodiment. The new microcode is included in Appendix A of the present application. As may be seen in the ensuing discussions, other embodiments of the inventions may employ different hardware means.

The inventions described in the present application concern 6 different parts of the S-interpreter portion of the digital data processing system described in U.S. patent application Ser. No. 266,539:

A. Pointers: Pointers in the present invention have two main format types: a 32-bit short format for resolved object-relative pointers and a 128-bit long format for all other kinds of pointers.

B. Namespace: Namespace in the present invention now resolves two kinds of Names: Table Names, corresponding to the Names of CS 10110, and immediate Names, which may be received without reference to a Name Table.

C. The Instruction Stream: All syllables in the Instruction Stream of the present invention are 16-bits long. SOPs now include an 8-bit Opcode Modifier Field as well as an 8-bit Opcode.

D. Accumulator SOPs: The present invention includes an Accumulator which receives the result on every operation involving EU 10122 and which SOPs may specify as a source of data for an operation.

E. General Call, Neighborhood Call, and common Return: The present invention includes General Call SINs for Calls between Procedures which do not share Procedure Environment Descriptors (PEDs) and Neighborhood Call SINs for Calls between Procedures which do share PEDs. The MAS Stack Frame produced by a General Call SIN is an expanded version of the MAS Stack Frame produced by a Neighborhood Call SIN, and the common Return SIN reads flags in the MAS Stack Frame to determine which kind of Call created the MAS Stack Frame and what actions are necessary on return.

F. Linkage Pointer Encachement: Pointer values located at negative offsets from SDP and FP may be encached and may be accessed in the cache by means of Immediate Names.

The parts are described in the order listed above.

A. Pointers

A pointer is a data item which represents an address. In U.S. patent application Ser. No. 266,539 filed May 22, 1981, pointers in CS 10110 are described in Part A of Chapter 3. The following discussion begins with a short summary of pointers in CS 10110 and then presents pointers in the present invention.

1. Pointers in CS 10110

In CS 10110, pointers represent UID-offset addresses. They may do so in two ways; by specifying the UID-offset address they represent directly, or by specifying values which identify information from which the UID-offset address represented by the pointer may be derived by user Procedures 00602 executing on CS 10110. Pointers which specify a UID-offset address directly are termed resolved pointers, and those which do not are termed unresolved pointers. In an unresolved pointer, the information from which the UID-offset address represented by the pointer may be derived may be represented in many different ways. For example, the information may be a UID and offset which is the address of the information required to derive the UID-offset address represented by the pointer, or it may be a value which serves as a key to locate the information in a hash table. Certain unresolved pointers are associative pointers. The UID offset address represented by an associative pointer may be derived and then placed in a table called the Associated Address Table (AAT) 30201 accessible to microcode executing on FU 10120, thus accelerating subsequent derivations of the UID-offset address represented by the associative pointer.

The operation of deriving a UID-offset address from an unresolved pointer is called resolving the pointer. The operation begins when microcode executing on FU 10120 detects an unresolved pointer. If the unresolved pointer is not an associative pointer, the microcode performs a microcode-to-software Call to a Procedure 00602 which derives the UID-offset address represented by the unresolved pointer and returns it to the microcode; if the unresolved pointer is an associative pointer, the microcode first attempts to lock up the UID-offset address represented by the associative pointer in AAT 30201; if the UID-offset address is not present, it then performs a microcode-to-software Call to a Procedure 00602 which derives the UID-offset address represented by the associative pointer and places it in AAT 30201; on return from the Call, the microcode again looks up the associative pointer in AAT 30201. Pointer resolution is described in detail in Section 3.A.c in U.S. patent application Ser. No. 266,539.

If a resolved or unresolved pointer is located in the same object as that specified by the UID-offset address the pointer represents, the UID specifying the pointer's location and the UID for the address represented by the pointer are the same, and the pointer can represent the UID by means of a flag indicating that the pointer is in the same object as the address it represents. Such pointers are termed object-relative pointers.

In CS 10110, the type of a pointer is determined from its format. FIG. 301 of U.S. patent application Ser. No. 266,539 presents the formats of pointers in CS 10110. Pointers in CS 10110 are 128 bits long and have three main divisions: a 32-bit Offset Field 30103, a 16-bit Flags and Format Field 30105, and an 80-bit UID Field 30115. In resolved pointers, Offset Field 30103 contains the offset of the UID-offset address represented by the pointer. In unresolved pointers, Offset Field 30103 is simply part of the value which identifies the information from which the UID-offset address represented by the pointer may be derived.

Flags and Format Field 30105 is the means by which FU 10120 microcode determines what kind of pointer it is dealing with. The value of NR 30109 indicates whether a pointer is resolved or unresolved, and the value of Format Code 30113 indicates whether the pointer is an object-relative pointer and whether an unresolved pointer is an ordinary unresolved pointer or an associative pointer. The meaning of UID Field 30115, finally, depends on the kind of pointer. In object-relative resolved pointers, UID Field 30115 is meaningless; in UID resolved pointers, UID Field 30115 contains the UID of the UID-offset address represented by the pointer. In unresolved pointers, UID Field 30115, like Offset Field 30103, contains information from which the UID-offset address represented by the pointer may be derived.

As explained in detail in Introductory Overview.B.1 and 2.F.b.2.d.d. of U.S. patent application Ser. No. 266,539, the UID-offset addresses represented by pointers cannot be used directly inside FU 10120, but must instead be converted to Logical Descriptors 27116 in which the address specified by Logical Descriptor 27116's AON Field 27111 and OFF Field 27113 correspond to the UID-offset address specified by the pointer. Consequently, when FU 10120 obtains the UID-offset address of a data item from a pointer, microcode must first resolve the pointer as described above, if the pointer is unresolved, and then convert the UID-offset address represented by the pointer to its corresponding AON-offset address. Similarly, when a resolved pointer value is stored in MEM 10112, microcode must convert the address to be stored from the AON-offset form it has in FU 10120 to the UID-offset form it has in MEM 10112. The conversion from UID-offset address to AON-offset address is termed pointer-to-descriptor conversion, and the inverse conversion is termed descriptor-to-pointer conversion. The manner in which these operations are performed in CS 10110 is described in detail in Section 3.A.d of U.S. patent application Ser. No. 266,539.

2. Improved Pointers

The present invention provides improvements in pointers and pointer operations, retaining the kinds of pointers used in CS 11010 and providing new formats in order to facilitate descriptor-to-pointer conversion and pointer-to-descriptor conversion. The present invention thereby increases the speed of execution of programs.

FIG. 1 is a representation of pointer formats in the present invention. There are two basic pointer formats: Short Pointer Format 101 and Long Pointer Format 117. Short Pointer Format 101 is used for resolved object-relative pointers. Short Pointer Format 101 is 32 bits long and has two fields: the left most bit is Format Specifier Field 103, and the remaining 31 bits are Offset Field 105. The value of Format Specifier Field 103 indicates whether a pointer has Short Pointer Format 101 or Long Pointer Format 117. If the field has the value 0, the pointer has Short Pointer Format 101. The value of Offset Field 105 is the offset of the UID-offset address represented by the pointer. Since Offset Field 105 may only contain 31 bits, the maximum number of bits which may be addressed in an object is 2\*\*31-2 bits, instead of of the 2\*\*32-1 bits specified in CS 10110.

Long Pointer Format 117 is used for resolved UID pointers and unresolved pointers. Long Pointer Format 117 contains four major fields: Format Specifier Field 103, Offset Field 105, Flags and Format Field 107, and UID Field 115. Format Specifier Field 103 and Offset Field 105 are identical in size to their equivalents in Short Pointer Format 101. When Format Specifier Field 103 has the value 1, it specifies Long Pointer Format 117. In resolved UID pointers, Offset Field 105 specifies the offset in the UID-offset address represented by the pointer; in unresolved pointers it merely provides information from which the digital computer system may derive the UID-offset address. Flags and Format Field 107 is 16 bits long. It contains information required by the digital computer system of the present invention to interpret Long Pointer Format 117. It will be discussed in more detail below. In UID resolved pointers, UID Field 115 contains a UID. Together with the value of Offset Field 105, the UID specifies the UID-offset address represented by the pointer. In unresolved pointers, UID Field 115, like Offset Field 105 merely provides information from which the digital computer system may derive the UID-offset address represented by the pointer.

Flags and Format Field 107 has three subfields: NR Field 111, System Software Codes Field 109, and Format Code Field 113. Beginning with NR Field 111, NR Field 111 is a single bit which indicates whether the pointer is resolved or unresolved. In Long Pointer Formats 117 for resolved pointers, NR Field 111 has the value 0; in those for unresolved pointers, NR Field 111 has the value 1. In Long Pointer Formats 117 for unresolved pointers, System Software Codes Field 109 contains information used by Procedures 00602 invoked by pointer resolve microde to derive the UID-offset address represented by the pointer. Format Code Field 113, finally, specifies binary values which, together with NR Field 111 and Format Specifier Field 103, determine how the digital computer system of the present invention is to interpret a pointer having Long Pointer Format 117. The following table shows how Fields 103, 111, and 113 cooperate to specify a pointer's type in the present invention:

| Field: | 103 | 111 | 113 | Meaning |
|---|---|---|---|---|
| | 0 | — | — | Short Pointer Format: |
| | | | | Resolved Object-Relative Pointer |
| | | | | Long Pointer Format: |
| | 1 | 0 | 0 | Resolved UID Pointer |
| | 1 | 1 | 0 | Associative UID Pointer |
| | 1 | 1 | 1 | Associative Object-Relative Pointer |
| | | | 2..128 | Reserved Codes for Other Resolved and Unresolved Pointer Formats |

3. Null Pointers

A null pointer is a pointer whose value indicates that the pointer does not represent an address. In CS 10110, a null pointer was indicated by setting Format Code Field 30113 to 0; in the present invention, a null pointer is indicated by setting Offset Field 105 to (2\*\*31)−1, i.e., by setting all of the bits in Offset Field 105 to 1. Since only (2\*\*31)−2 bits of an object may be addressed in the present invention, the value of the null pointer does not address a bit in an object.

4. Advantages of Improved Pointer Formats

The advantages of the improved pointer formats of the present invention stem from the fact that the first bit of any pointer indicates whether the pointer is a resolved object relative pointer. Consequently, in the present invention, pointer processing microcode can determine on the first fetch of a pointer value from MEM 10112 whether extended processing will be required. In CS 10110 as described in U.S. patent application Ser. No. 266,539 by contrast, bits 40 through 47 indicated whether extended processing was required, and thus those bits had to be fetched even when the pointer was a resolved object-relative pointer and consequently contained all of the information actually required to form an AON-offset address in Offset Field 30103. The fact that a resolved object-relative pointer may be identified from the value of Format Specifier Field 103 is particularly important because pointers are most frequently used in CS 10110 and the present invention to specify arguments to Procedures 00602. Generally speaking, arguments used in an invocation of a Procedure 00602 by a Process 00610 are local data contained in other frames of Process 00610's MAS 00502, and are therefore often in the same object as the frame for invoked Procedure 00602. When this is the case, the pointers specifying the arguments are resolved object-relative pointers and have Short Pointer Format 101.

5. Pointer-to-Descriptor Conversion with Improved Pointer Formats

The improved pointer formats of the present invention greatly simplify pointer-to-descriptor conversion for resolved object relative pointers. In the present invention, pointer-to-descriptor conversion is carried out by a microroutine called PTR__TO__DESC. This microroutine's listing appears in Appendix A. PTR__TO__DESC takes a Logical Descriptor 27116 specifying the location of the pointer to be converted as its argument. When PTR__TO DESC returns, logical Descriptor 27116 specifies the AON-Offset address corresponding to the UID-offset address represented by the pointer to be converted.

PTR__TO DESC first uses Logical Descriptor 27116 to fetch the first 32 bit of the pointer which is to be converted to a descriptor from MEM 10112 to FU 10120. In the improved pointer formats of the present invention, these 32 bits are Format Specifier Field 103 and Offset Field 105. If Format Specifier Field 103 has the value 0, the pointer has Short Pointer Format 101 and is a resolved object-relative pointer. Consequently, to complete the conversion, PTR __TO DESC simply copies the 32 bits fetched from MEM 10112 into OFF Field 27113 of Logical Descriptor 27116 and returns.

If Format Specifier Field 103 of the fetched pointer has the value 1, PTR __TO__DESC then fetches the next 32 bits, which includes Flags and Format Field 107. Using the information in Flags and Format Field 107, PTR TO_ DESC then proceeds in substantially the same manner as in CS 10110. If NR Field 111 indicates a resolved pointer, PTR __TO__DESC microcode fetches UID Field 115 and uses LAR microcode (described in 4.B.e.3.c.c of U.S. patent application Ser. No. 266,539) to convert the UID field's value to an AON. Once it has obtained the AON, it copies the AON into Logical Descriptor 27116's AON Field 27111 and the offset from Offset Field 103 into OFF Field 27113. If NR Field 111 indicates an unresolved pointer and Format Code Field 113 an associated pointer, PTR__TO DESC uses AAT 30201 to obtain the UID-offset address represented by the associated pointer as described in U.S. patent application Ser. No. 266,539 3.A.b, and then converts the UID address to an AON and proceeds as described above. Finally, if NR Field 111 and Format Code Field 113 indicate an unresolved pointer other than an associated pointer, PTR __TO__DESC performs a microcode-to-software Call to Procedures 00602 which resolve the pointer as described in U.S. patent application Ser. No. 266,539 3.A.c.

6. Descriptor-to-Pointer Conversion with Improved Formats

Since all pointer formats in CS 10110 contained at least Offset Field 30103 and Flags and Format Field 30105, descriptor-to-pointer conversion in CS 10110 always stored at least a 48-bit value in MEM 10112. These conversions are described in U.S. patent application Ser. No. 266,539 3.A.d. In the present invention, resolved object relative pointers are completely described by Short Pointer Format 101, and consequently, when a Logical Descriptor 27116 is converted to a pointer, only 32 bits need be stored in MEM 10112.

In the present invention, descriptor-to-pointer conversion is carried out by the DESC__TO__PTR microroutine, listed in Appendix A. DESC TO PTR takes two arguments: a first Logical Descriptor 27116 which the microroutine is to convert to a pointer, and a second Logical Descriptor 27116 specifying the location in MEM 10112 where the pointer is to be stored. DESC__TO__PTR first places the value from the first Logical Descriptor 27116's OFF Field 27113 into a register and then sets the value's leftmost bit to 0 if necessary. DESC __TO __PTR next obtains the AONs of the first and second Logical Descriptors 27116 from their AON Fields 27111 and compares them by means of an exclusive or (XOR) operation. IF the AONs are the same, i.e., if the XOR operation has 0 as a result, the UID-offset address specifying the pointer's location and the UID-offset address represented by the pointer are in the same object and the pointer is a resolved object-relative pointer. When this is the case, the value of the first Logical Descriptor 27116's OFF Field 27113 is written to MEM 10112 at the location specified by the second Logical Descriptor 27116. At this location, the value forms Format Specifier Field 103 and Offset Field 105 of the pointer. If the AONs are different, the pointer is a resolved UID pointer and the descriptor-to-pointer conversion operation proceeds substantially as explained in U.S. patent application Ser. No. 266,539.

B. Namespace

In descriptions of digital computer systems of the type of CS 10110, Namespace is a collective term for those portions of the system involved in the interpretation of instruction stream syllables specifying operands. In U.S. patent application Ser. No. 266,539, Namespace is described in 3.B.a, b, and c. The following discussion presents improvements in certain elements of Namespace in the present invention. It begins with a summary of these elements as described in U.S. patent application Ser. No.

266,539 and then presents the improved elements of the present invention.

1. Names and Name Table Entries in CS 10110

In the S-instructions (SINs) executed by CS 10110, all operands which represent UID-offset addresses in MEM 10112 or data at locations specified by UID-offset addresses are represented by Names. SINs are contained in Procedures 00602, and as shown in FIG. 103 of U.S. patent application Ser. No. 266,539, each Procedure 00602 has associated with it a Name Table 10350. Each Name in a Procedure 00602 is an index of a Name Table Entry (NTE). The NTE associated with the Name contains information describing the location, length, and type of the operand represented by the Name. The location is described as a displacement from another location termed a base location. In the NTE, the base location, the length, and values used to calculate the location of array elements may be represented by Names referring to other NTEs in Name Table 10350 containing the NTE in operation. The NTE, together with UID-offset addresses specified by Architectural Base Pointers (ABPs), is used by CS 10110 to calculate a logical Descriptor 27116 specifying the location, length, and type of the operand represented by the Name. The operation of using a Name to locate the NTE associated with it and then deriving a Logical Descriptor 27116 from the NTE and from the ABRs is called Name Resolution; once a Name has been resolved, the data at the location specified by Logical Descriptor 27116 may be fetched from MEM 10112 to FU 10120. The operation combining Name Resolution and data fetching is called Name Evaluation. When a NTE itself contains a Name, the Name Resolution or Evaluation operations are performed recursively to obtain the location or value represented by the Name. Name Resolution and Name Evaluation are explained in detail in U.S. patent application Ser. No. 266,539 3.B.c.1 and 3.B.c.3. In CS 10110, information obtained by the Name Resolution operation for a given Name is encached in Name Cache (NC) 10226 in FU 10120. On subsequent Name Resolution operations for that Name, the Name is simply presented to NC 10226, which then automatically makes the encached information available. In simple cases, the encached information is Logical Descriptor 27116 corresponding to the Name; in more complicated cases,. a signal from NC 10226 invokes Name Resolve microcode executing on FU 10120. The microcode uses the encached information to produce Logical Descriptor 27116. If there is no information in NC 10226 for the Name, another signal from NC 10226 invokes Name Resolve microcode which performs a Name Resolution operation on the Name and then encaches the information resulting from the Name Resolution operation in NC 10226. Information produced by Name Resolution may be encached in NC 10226 and accessed by means of the Name because there is only one Name Table for a given Procedure 00602, because there is only one NTE in a given Name Table for a given Name, and because the values in the ABPs do not change during an execution of a given Procedure 00602. NC 10226 hardware is described in 2.B.2.b.b of U.S. patent application Ser. No. 266,539, and the method by which Name Resolution microcode maintains NC 10226 is described in 3.B.3.e.e and 3.B.3.f.f.

In CS 10110, a Name is an 8, 12, or 16-bit value with no internal structure, and a NTE has the format shown in FIG. 304 of U.S. patent application Ser. No. 266,539. The format is explained in detail in U.S. patent application Ser. No. 266,539 3.B.a.2; here, the format is explained only in sufficient detail to provide an understanding of the improved NTEs of the present invention. NTE 30401 of CS 10110 may be either a Short NTE 30403 containing 64 bits or a Long NTE 30405 containing 128 bits. As illustrated in FIG. 304, the first 64 bits of a Long NTE 30405 contain the same fields as a Short NTE 30403. Short NTEs 30403 are used for scalar references whose displacements from the base location can be expressed in 16 bits; Long NTEs 30405 are used for array references and scalar references whose displacements cannot be expressed in 16 bits.

The functions of the fields in NTE 30401 may be summarized as follows:

Flags and Format Field 30407 contains information from which Name Resolution microcode determines whether NTE 30403 is a Long NTE 30405 or a Short NTE 30403 and how NTE 30403 is to be interpreted.

Base Field 30425 specifies a base location. Base Field 30425 has three formats: in one, Base Field 30425 is a Name, in the second, Base Field 30425 specifies an ABP, and in the third, it specifies a pointer at a displacement from an ABP. Flags in Flags and Format Field 30407 determine how CS 10110 interpets Base Field 30425.

Length Field 30435 specifies a length in bits. Length Field 30435 may be either a Name or a literal value. A flag in Flags and Format Field 30407 specifies which it is.

DISP Field 30437 specifies a displacement from the base location specified by Base Field 30425. The displacement is always a literal value.

DISP EXT Field 30439 is used together with DISP Field 30437 for displacements which cannot be expressed in 16 bits.

Index Name Field 30441 contains a Name which is evaluated to obtain the value of an array index.

IES Field 30445 contains a Name or a literal value specifying the distance from the beginning of one element of an array to the beginning of the next element of the array. To locate an array element, Name Resolution microcode multiplies the literal value of the value obtained by evaluating the Name by the value obtained by evaluating Index Name Field 30441. Again, whether IES Field 30445 contains a Name or a literal value is specified by a flag in Flags and Format Field 30407.

While Names and Name Table 10350 provided CS 10110 with a powerful and flexible means for specifying operands, the power and flexibility had their price:

The fact that Names could have varying lengths greatly increased the complexity of CS 10110's I-stream parsing mechanisms.

The information required to resolve even simple Names, such as those referring to standard-sized operands located at offsets from ABPs, had to be obtained from Name Table 10350 in MEM 10112.

In order to obtain the information to resolve a Name, a minimum of 64 bits had to be fetched from MEM 10112 to FU 10120.

In the improved Namespace of the present invention, the power and flexibility of Namespace in CS 10110 is retained and the results of Name Resolution operations may still be encached, but Names and the Name Table are improved so that certain Names can be resolved without reference to the Name Table and so that many Names can be resolved by fetching only 32 bits from the Name Table. Further, certain special provisions are made for NTEs specifying string data. These improvements reduce the size of Name Table 10350 and speed Name Resolution and Evaluation, thereby improving the efficiency of CS 10110.

2. Improved Names

Figure 2:
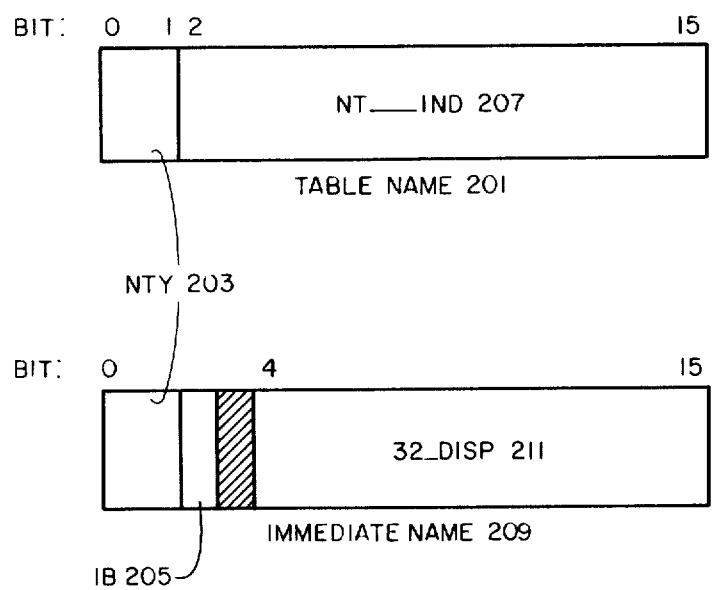
FIG. 2 is a diagram of the improved names of the present invention.

As described above, Names in CS 10110 could vary in length but were all indexes into Name Table 10350. Since Names in CS 10110 were simply index values, they had no internal structure. In the present invention, all Names are 16 bits long, but there are two distinct kinds of names: Table Names, which, like the Names in CS 10110, specify NTEs in Name Table 10350, and Immediate Names, which do not specify NTEs and are resolved without reference to Name Table 10350. FIG. 2 shows the formats of Table Names 201 and Immediate Names 209. Both Table Names 201 and Immediate Names 209 have NTY Field 203. NTY Field 203 specifies whether a Name is a Table Name 201 or an Immediate Name 209 and, in the case of Immediate Names 209, further specifies an ABP. The following table gives the codes in NTY Field 203 and their meanings:

| Code in NTY Field 203 | Meaning |
| --- | --- |
| 11 | The Name is a Table Name |
| 00 | Immediate Name; ABP = FP |
| 01 | Immediate Name; ABP = SDP |
| 10 | Immediate Name; ABP = PBP |

In a Table Name 201, the remaining 14 bits make up NT_IND Field 207, which specifies the index in a Name Table of the NTE corresponding to the Table Name. In an Immediate Name 209, the remaining 14 bits contain two fields: IB Field 205 and 32_DISP Field 211. IB Field 205 is a one-bit flag which indicates whether the operand represented by Immediate Name 209 may be located directly or indirectly. If IB Field 205 is set to 0, the operand represented by Immediate Name 209 is at the location specified by Immediate Name 209; if IB Field 205 is set to 1, the location specified by Immediate Name 209 contains a pointer and the pointer's value gives the location of the operand represented by Immediate Name 209. The bit following IB Field 205 is reserved, and the remainder of Immediate name 209 is occupied by 32_DISP Field 211. 32_DISP Field 211 contains a signed integer value which, when multiplied by 32, provides a displacement from the ABP specified in NTY Field 203.

3. Name Resolution

Figure 3:
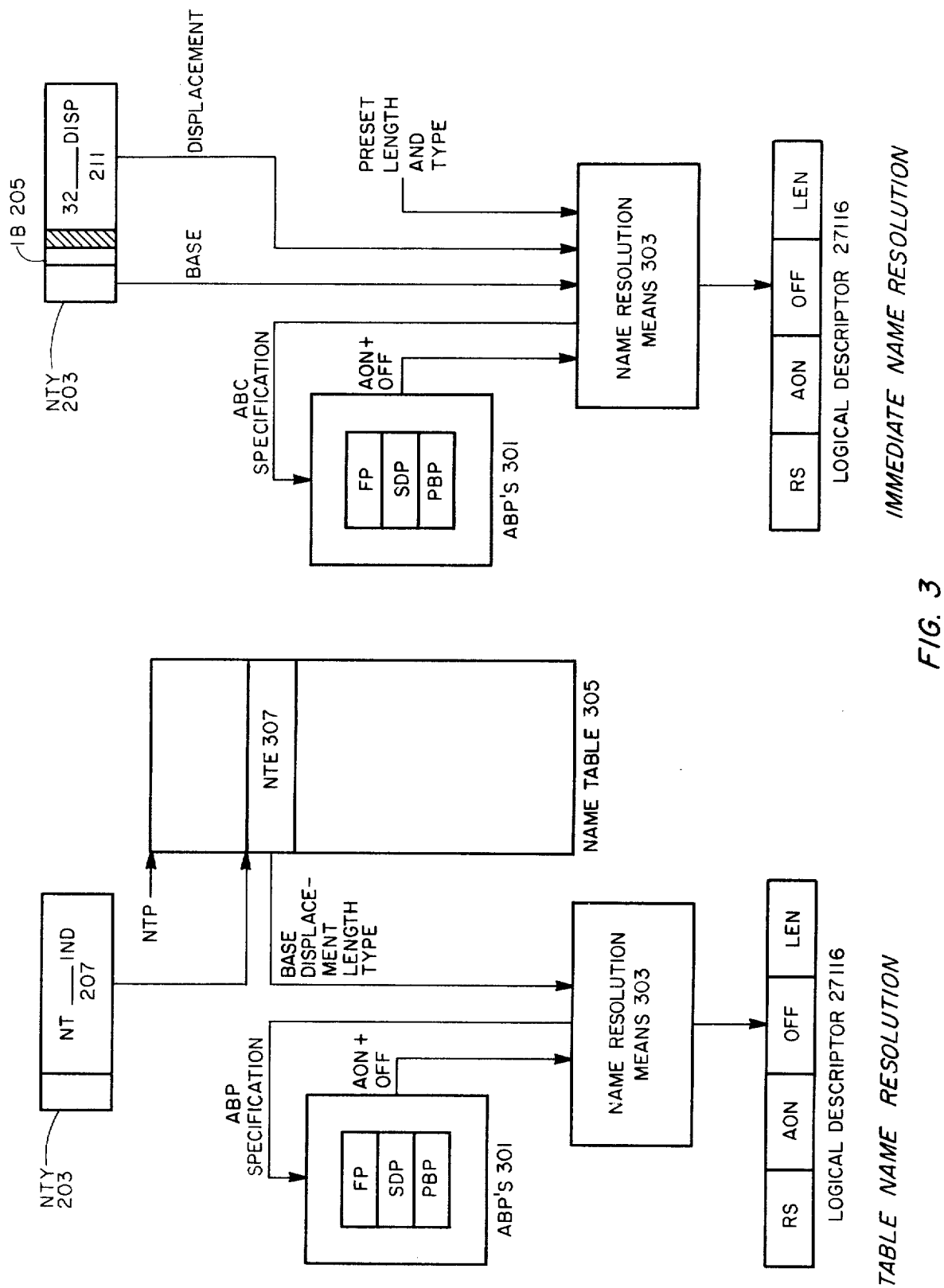
FIG. 3 is a diagram illustrating the resolution of table names and immediate names in the present invention.

In CS 10110, all Names were resolved by means of Name Table 10350; in the improved digital computer system of the present invention, Table Names 201 are resolved by means of the Name Table and Immediate Names are resolved without the Name Table. FIG. 3 provides a conceptual overview of the different methods of Name Resolution in the present invention. Name Resolution Means 303 in FIG. 3 corresponds to Name Resolution microcode and NC 10226 in the present implementation. Name Resolution Means 303 is responsive to the value of NTY Field 203 and determines which method to use by the value of that Field in the Name being resolved. Beginning with Table Name Resolution, this proceeds in the same manner as Name Resolution in CS 10110. Field NT_IND 207 of Table Name 201 contains an index indicating an NTE 307 in Name Table 305. NTE 307 contains information describing the base location, displacement, length, and type of the operand specified by Table Name 201, and Name Resolve Means 303 uses the information from NTE 307 together with the current values of ABPs 301 to produce Logical Descriptor 27116 for the operand represented by the Name.

Immediate Name Resolution, on the other hand, proceeds without reference to a NTE 307. The base and displacement information required to resolve an Immediate Name 209 is provided by Immediate Name 209, and the RS and LEN Fields of Logical Descriptor 27116 are set to standard values. To obtain the values of the AON and OFF fields, Name Resolve Means 303 multiplies the value of 32_DISP Field 211 by 32 to obtain a displacement and then adds this displacement to the AON-offset form of the UID address contained in the ABP. Under SOP control, FU 10120 can override the standard values in the RS and LEN Fields. For example, if Immediate Name 209 appears at a location specified for an arithmetic operand in an integer arithmetic SIN, the SOP microcode will treat Logical Descriptor 27116 produced by Name Resolve Means 303 as a Logical Descriptor 27116 specifying an integer value. Similarly, if Immediate Name 209 appears where an operand specifying a pointer is required, the SOP microcode will treat Logical Descriptor 27116 as a a Logical Descriptor 27116 specifying a pointer value.

If IB 205 is set to 1 in Immediate Name 209, the Name Resolution operation proceeds as just described, except that Name Resolution Means 303 responds to IB Field 205 by fetching the pointer at the location specified by Immediate Name 209's NTY Field 203 and 32_DISP Field 211 and performing a pointer-to-descriptor translation on that pointer in order to obtain Logical Descriptor 27116 for the operand represented by Immediate name 209.

4. Encachement of Information for Name Resolution

As already mentioned, Name Resolution in CS 10110 is speeded up by encaching information obtained by the Name Resolution operation in NC 10226. In the present invention, information obtained from the resolution of both Table Names 201 and Immediate Names 209 may be encached. Table Names 201 are equivalent to the Names of CS 10110 and may be encached as they are. Immediate Names 209 are not indexes into Name Table 305, but encachement is possible because the UID-offset addresses specified by ABPs 301 do not change their values while SINs in a given execution of a Procedure 00602 are being interpreted by FU 10120. Consequently, all Immediate Names 209 specifying a given ABP in NTY Field 203 and having a given value in 32_DISP Field 211 specify the same Logical Descriptor 27116 and that Logical Descriptor 27116 may be encached. Furthermore, since Immediate Names 209 and Table Names 201 have different codes in NTY Field 203, they may function as keys to the same cache. In the embodiment of the present invention described herein, both Immediate Names 209 and Table Names 201 are used as keys for NC 10226. If an Immediate Name 209 is presented to NC 10226 and NC 10226 contains no information for that Immediate Name 209, NC 10226 produces a signal invoking Name Resolution microcode. Name Resolution microcode then resolves Immediate Name 209 and places the resulting information in NC 10226. In other embodiments of the present invention, Logical Descriptors 27116 corresponding to certain Immediate Names 209 may be separately encached.

5. Improved NTEs 307

Figure 4:
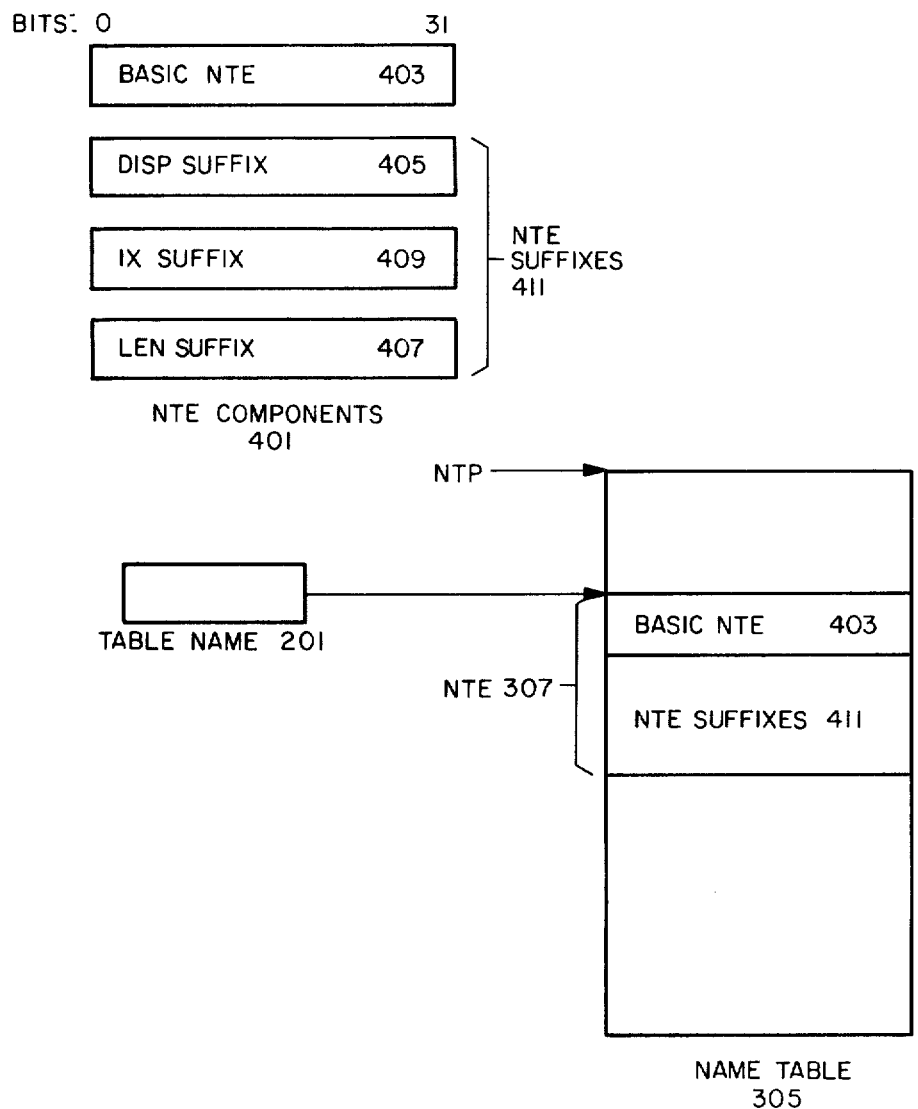
FIG. 4 is a diagram providing an overview of the improved name table of the present invention.

As previously mentioned, NTEs 307 in the present invention have formats which allow many Table Names 201 to be resolved after the first 32 bits of NTE 307 specified by Table Name 201 have been fetched from from MEM 10112 to FU 10120. FIG. 4 presents an overview of Name Table 305 and NTE 307 in the present invention. Table Name 201 specifies the location of a NTE 307 in Name Table 305. NTE 307 is made up at least of Basic NTE 403. In some cases, a NTE 307 consists only of a Basic NTE 403. Indexes in Table Names 201 always specify locations of Basic NTEs 403. However, if a NTE 307 is an NTE 307 for array or string data, if it specifies a large displacement, or if it specifies a long or non-constant length, a NTE 307 further consists of one or more NTE Suffixes 411. DISP Suffix 405 is used if NTE 307 specifies a large displacement, LEN Suffix 407 is used if NTE 305 has a large length or specifies certain string data, and IX Suffix 409 is used if NTE 305 is an array NTE 307. A given NTE 307 may have up to three NTE Suffixes 411. Only one NTE Suffix 411 of each kind may appear in a given NTE 307, and the suffixes always have the order in which they appear in FIG. 4. Flags in Basic NTE 403 specify which NTE Suffixes 411 follow Basic NTE 403 and how such NTE Suffixes 411 are to be interpreted.

Basic NTE 403, IX Suffix 409, and LEN Suffix 407 may themselves contain Table Names 201 or Immediate Names 209. When a Table Name 201 specifying an NTE 307 is resolved, the Names in NTE 307 are resolved or evaluated as required to produce Logical Descriptor 27116 corresponding to Table Name 201. Names in NTEs 307 differ from those in SINs in only one respect: Immediate Names 209 in NTEs 307 may not specify an indirect reference from PBP.

Figure 5:
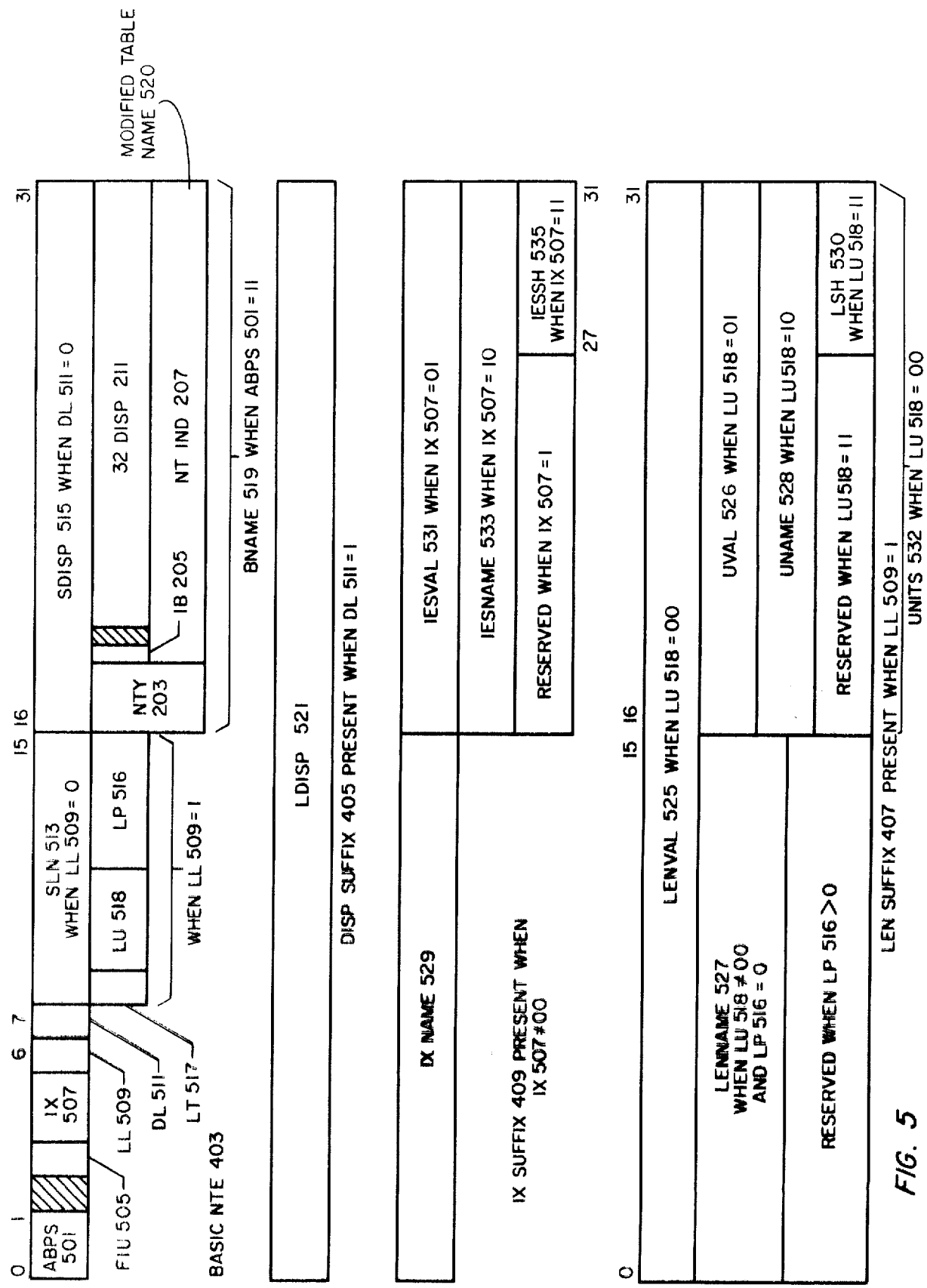
FIG. 5 is a detailed diagram of the improved name table entries of the present invention.

Turning now to FIG. 5, there is presented a detailed illustration of NTE 307 of the present invention. As explained above, NTE Suffixes 411 may or may not be present in a NTE 307, depending on the settings of flags in Basic NTE 403. In FIG. 5, the conditions under which each NTE Suffix 411 is present are specified with the suffix. Further, parts of Basic NTE 403, LEN Suffix 407, and IX Suffix 409 may have alternate fields, again depending on the settings of flags in Basic NTE 403. In FIG. 5, these alternate fields are represented by placing them below the parts of Basic NTE 403 or NTE Suffix 411 which they occupy. The conditions under which the field has the meaning is specified with the alternate. For example, bits 16 through 31 of Basic NTE 403 contain the field SDISP 515 when DL Field 511 is set to 0 and the field BNAME 519 when ABPS Field 501 is set to the value 11.

Beginning with Basic NTE 503, bits 1 through 7 of Basic NTE 503 contain flag fields which specify the form of NTE 307 containing Basic NTE 503 and the manner in which the fields of NTE 307 are to be interpreted. The first of these fields is ABPS Field 501. If NTE 307 specifies an ABP as its base and the data is referenced directly, then ABPS Field 501 specifies the ABP; otherwise, it specifies that the data represented by NTE 307 is referenced indirectly and/or that NTE 307 specifies its base by means of a Name. The codes in ABPS Field 501 and their meanings are the following:

| ABPS Code | Meaning |
| --- | --- |
| 00 | FP ABP |
| 01 | SDP ABP |
| 10 | PBP ABP |
| 11 | Base is a Name or NTE 307 specifies an indirect reference |

Bit 3 of Basic NTE 403 is reserved; bit 4 contains FIU Flag 505. FIU Flag 505 indicates whether data specified by NTE 307 is to be zero-filled or sign-filled when it is fetched from MEM 10112. A value of 0 specifies zero fill, and a value of 1 specifies sign fill.

IX Field 507 specifies whether NTE 307 has an IX Suffix 409 and the manner in which Name Resolution Means 303 is to interpret IX Suffix 409. The codes in IX Field 507 and their meanings will be discussed in detail together with IX Suffix 409. LL Field 509 specifies the location of length information in NTE 307. If LL Field 509 has the value 0, SLEN Field 513 in Basic NTE 403 contains a literal value specifying the length and there is no LEN Suffix 407. If LL Field 509 has the value 1, there is a LEN Suffix 407 and SLEN Field 513 is replaced by LU Field 518 and LP Field 616, which together specify how Name Resolution Means 303 is to interpret LEN Suffix 407. The meanings of these fields will be discussed in detail together with LEN Suffix 407. DL Field 511, finally, indicates the location of displacement information in NTE 307. If DL Field 511 has the value 0, SDISP Field 515 contains the displacement information and there is no DISP Suffix 405. Otherwise, DL Field 511 has the value 1, indicating the presence of DISP Suffix 405. DISP Suffix 405 contains a single field, LDISP 521, and this field's value is the displacement.

BNAME Field 519 contains base information when ABPS Field 501 has the value 11. As stated above, ABPS Field 501 has that value when NTE 307's base is a Name and/or the data specified by NTE 307 is referenced indirectly. BNAME Field 519 contains either an Immediate Name 209 or a modified version of Table Name 201. An Immediate Name 209 in BNAME Field 519 specifies an indirect reference using a pointer found at a displacement from either the FP or the SDP ABP. Consequently, Immediate Name 209's IB Field 205 is always set to 1 and its NTY Field 203 is set to either 00 or 01, specifying FP or SDP. Immediate Name 203 may not specify PBP. Modified Table Names 520 in BNAME Field 519 are Table Names 201 which have been modified to specify either a direct or indirect reference whose base location is obtained from NTE 307 specified by Modified Table Name 520. Modified Table Names 520 are distinguished from Table Names 201 by the use of NTY Field 203. In Table Names 201, NTY Field 203 must be set to 11; in Modified Table Names 520, it may have the values 11 and 10. The value 11 indicates that Modified Table Name 520 specifies a direct reference and the value 10 indicates that Modified Table Name 520 specifies an indirect reference. The latter value is available for use in Modified Table Names 520 because, as noted above, Immediate Means 209 in BNAME Field 519 cannot specify PBP.

Turning now to the detailed representations of NTE Suffixes 411, DISP Suffix 405 contains a single field, LDISP 521, which contains a signed 32-bit value specifying a displacement from the base indicated by NTE 307 to which DISP Suffix 405 belongs. As mentioned above, DISP Suffix 405 is present only if SDISP Field 515 is not present or is too short to specify the displacement. DISP Suffix 405's presence is specified by DL Field 511.

IX Suffix 409 has two parts. Bits 0 to 15 contain IX-NAME Field 529, while bits 16 to 31 contain three alternate fields: IESVAL 531, IESNAME 533, and IESSH 535. IXNAME Field 529 contains a Table Name 201 or an Immediate Name 209 which represents data used as an index in a reference to an element of an array. When Table Name 201 specifying NTE 307 containing IX Suffix 409 is resolved, the Name in IXNAME Field 529 is evaluated to obtain the index value. The alternate fields in bits 16 to 31 specify the distance separating the first bits of elements of the array. That distance, multiplied by the index value obtained by evaluating the Name in IXNAME Field 529, yields the location of an element of the array. Which of the alternate fields is present is indicated by codes in IX Field 507 in Basic NTE 403. The codes are as follows:

| Code in IX Field 507 | Meaning |
| --- | --- |
| 00 | IX Suffix 509 not present. |
| 01 | IX Suffix present, bits 16–31: IESVAL 531 |
| 10 | IX Suffix present, bits 16–31: IESNAME 533 |
| 11 | IX Suffix present, bits 27–31: IESSH 535 |

The alternate fields in bits 16 to 31 represent the distance between elements of arrays in three ways:
  IESVAL 531 contains a 16-bit literal value which specifies the distance between elements.
  IESNAME 533 contains a Table Name 201 or an Immediate Name 209 upon which a Name Evaluation Operation is performed to obtain a value specifying the distance between the elements.
  IESSH 535 contains a 5-bit value specifying a power of two. The value obtained from IXNAME 529 is multiplied by this power of 2 (i.e., shifted to the left that many bits) to obtain the location of the array element.

LEN Suffix 407, present only if LL Field 509 has the value 1, is used for two purposes:

- To specify data whose length in bits is greater than the length which can be specified by SLEN Field 513 in Basic NTE 403.
- To specify data whose length may vary during execution of the program.

Data whose length may vary during the execution of a program is typically string data, that is, data made up of an arbitrary sequence of elements of some data. Most high-level languages have character-string data, in which the elements making up the sequence are representations of characters. Other high-level languages additionally have bit-string data, in which the elements making up the sequence are single bits, and a few have string data whose elements may have any data type. Typically, string data whose length may vary contains a value specifying the number of elements currently in the string in addition to the elements making up the string data's current value. The value specifying the number of elements is termed a dope vector value. The dope vector value is generally located just ahead of the first element in the string. The address of a string generally specifies the location of the first element of the string, and the dope vector is located by means of an offset from the string's address. LEN Suffix 407 of the present invention make special provision for the facts that the elements of different kinds of string data may have different sizes, the 8-bit elements are particularly frequent, and that string data typically has a dope vector value.

In CS 10110, variable-length strings have NTEs specifying a Name which is evaluated to obtain the string's length in bits, The Name generally specifies a dope vector, and the dope vector must consequently specify the number of bits, not the number of elements in the string. Consequently, the frequent operations which interrogate the dope vector to determine the number of elements currently in the string must divide the dope vector by the size of the elements. In the present invention, a Name is no longer required to locate the dope vector. Furthermore, the length of a string is to be obtained by multiplying a value specifying a length by a value specifying the size of a unit, and the dope vector can thus specify the current number of elements in the string instead of the current number of bits. Finally, as with arrays, the present invention takes advantage of the fact that elements of many strings have sizes that are powers of 2 to accelerate the calculation of the string's length.

LEN Suffix 407 has three basic forms:

- It may contain the single 32-bit field LENVAL 525. LENVAL 525 contains an unsigned literal value specifying the length of the data item represented by Table Name 201 corresponding to NTE 307 to which LEN Suffix 407 belongs.
- It may be two 16-bit fields, one, LENNAME 527, containing a Table Name 201 or Immediate Name 209 which, when evaluated, yields the number of elements in the data item represented by Table Name 201 corresponding to NTE 305 to which LEN Suffix 407 belongs and another, UNITS 532, which yields a value specifying the size of the elements in the data item.
- It may be UNITS Field 532 by itself. In this case, the number of elements is obtained from the dope vector.

UNITS Field 532 contains three alternate sets of fields for representing the size of the elements:

- UVAL Field 526 contains a positive integer value representing the size of the elements.
- UNAME Field 528 contains either a Table Name 201 or an Immediate Name 209. When the Name is evaluated, it yields an integer value representing the size of the elements.
- LSH Field 530 contains a 5-bit value specifying a power of 2. The value specifying the number of elements in the data item is multiplied by this power of 2 (i.e. shifted to the left that many bits) to obtain the length of the data item.

The manner in which LEN suffix 407 is interpreted by Name Resolve microcode is determined by the values of LU Field 518 and LP Field 516 in Basic NTE 403. LU Field 518 has the primary role here, and LP Field 516 is interpreted only when the length information for the data item is contained in a dope vector. LU Field 518 has the following codes:

| Code in LU Field 518 | Meaning |
| --- | --- |
| 00 | LEN Suffix 407 consists of LENVAL 525 |
| 01 | UNITS 532 is UVAL 526 |
| 10 | UNITS 532 is UNAME 528 |
| 11 | UNITS 532 is LSH 530 |

If LU 518 has a value other than 0 and LP 516 has a value greater than 0, finally, the length information is contained in a dope vector. In this case, LP 516 is interpreted. LP 516 contains a positive integer value ranging from 0 to 32 which specifies the number of bits ahead of the data item's address at which the dope vector begins. LP 516 thus makes it possible to specify the location of the dope vector without using a name and to fetch the dope vector's value without a name resolution operation.

The advantages of NTEs 307 having the format just described may be summed up as follows:

- NTEs 307 for Table Names 201 representing scalar data with lengths of 127 bits or less and either a Name as a base or a displacement of up to $(2^{**}15)-1$ from an ABP are made up of a single 32-bit Basic NTE 403. In CS 10110, all NTEs were at least 64 bits long.
- Most other scalar data can be represented by a Basic NTE 403 with either a DISP Suffix 405 or a LEN Suffix 407, and therefore in the same 64 bits which was the minimum size of a NTE in CS 10110.
- Elements of many arrays can be represented by a Basic NTE 403 and an IX Suffix 409; elements of most other arrays can be represented by adding either a DISP Suffix 405 or a LEN suffix 407; in CS 10110, all array NTEs required 128 bits.
- Immediate Names 209 may be more quickly resolved than Table Names 201, and consequently, the use of Immediate names 209 in NTEs 307 speeds the resolution of these NTEs 403. Since Immediate Names 209 have no NTEs 307, their use also reduces the size of Name Table 305.
- IESSH Field 435 and LSH Field 530 both directly specify a shift operation therefore allow more rapid resolution of array NTEs and NTEs for strings in the frequent cases where the distance between the elements is a power of 2.

UNITS Field 532 allows the dope vector to contain the number of units in the string, instead of the number of bits.

LP Field 516 in Basic NTE 403 makes it possible to locate a dope vector for a string without resolving a Name.

6. Combined Advantages of Immediate Names 209 and NTEs 307

In combination; Immediate Names 209 and NTEs 307 are particularly powerful. This may be shown by repeating the FORTRAN example of U.S. patent application Ser. No. 266,539 3.B.c.3.a.a for the present invention. As shown in U.S. patent application Ser. No. 266,539 3.B.c.3.a.a, the FORTRAN compiler generated Names from the following declarations:

SUBROUTINE SORT (LIST)

INTEGER LIST (10)
INTEGER I, N, TEMP

Figure 6:
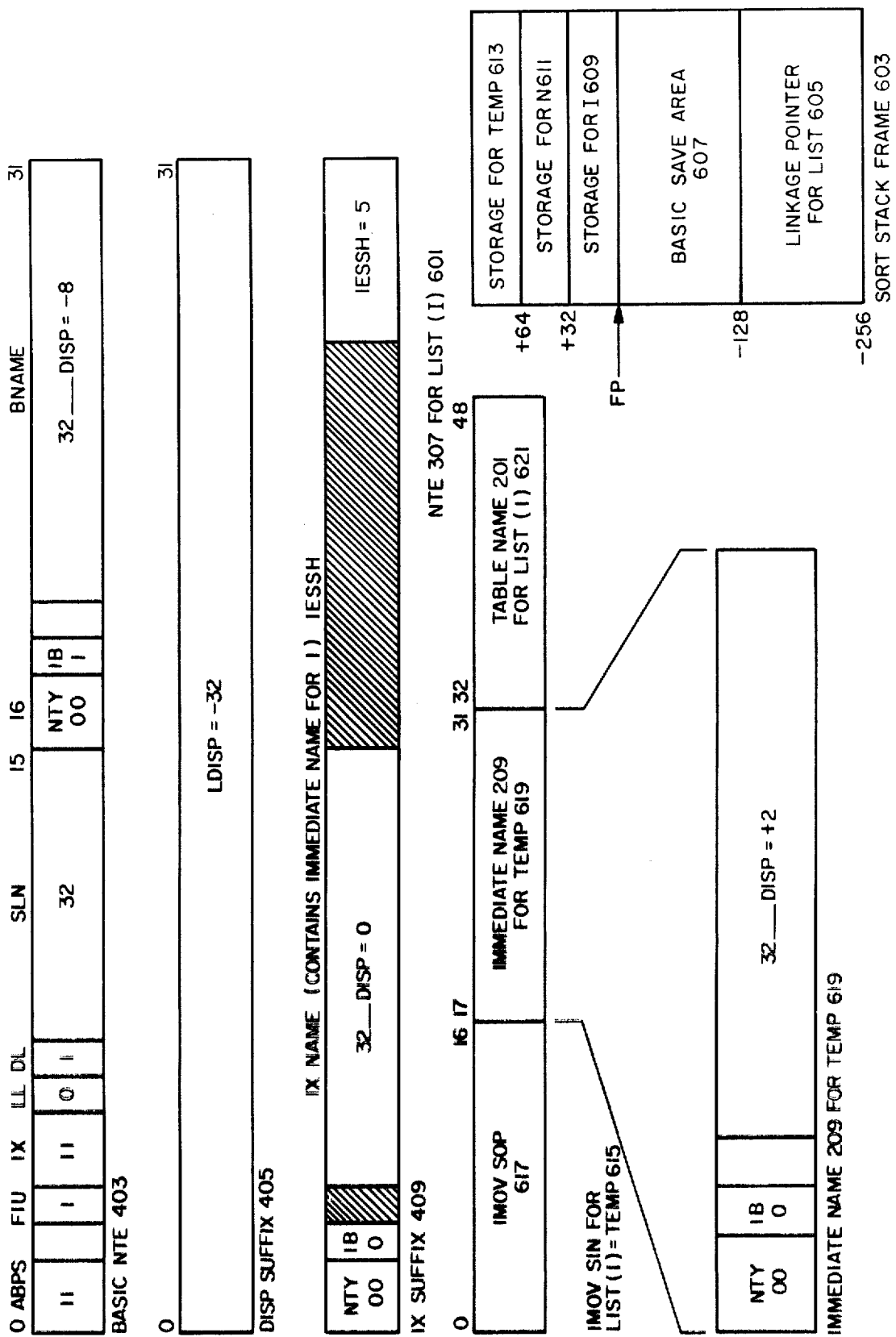
FIG. 6 is a diagram of a typical S-instruction, the name table entries for its names, and the stack frame for the procedure containing the S-instruction in the present invention.

FIG. 305 of U.S. patent application Ser. No. 266,539 shows the stack frame for an invocation of SORT and the NTEs for I and LIST(I). FIG. 6 of the present application shows Stack Frame for SORT 603 and NTE for LIST(I) 601 in the present invention. In addition, it shows the IMOV SIN for LIST (I)=TEMP 615. This SIN is generated by the FORTRAN compiler from the FORTRAN statement

LIST (I)=TEMP in SORT. The equivalent SIN is not shown in FIG. 305 of U.S. patent application Ser. No. 266,539, but as is obvious from the discussion of SINs in U.S. patent application Ser. No. 266,539, it consists of an SOP, a Name for TEMP, and a Name for LIST(I).

Turning first to SORT Stack Frame 603, it is substantially equivalent to SORT Stack Frame 30501. Storage for the 32-bit local data I, N, and TEMP is at positive displacements from FP and storage for the linkage pointer to the actual for the formal argument LIST is at a negative displacement from FP. An additional area, Basic Save Area 607 is located between FP and Linkage Pointer for LIST 607, but this area is relevant to this discussion only to the extent that it affects the location of Linkage Pointer for LIST 605.

Turning now to NTE for LIST(I) 601, NTE for LIST(I) 601 consists of a Basic NTE 403, a DISP Suffix 405, and an IX Suffix 409. DISP Suffix 405 is required because the index of the first element of a FORTRAN array is 1 instead of 0, and consequently, the address produced by multiplying the index value by the distance between the elements is always that of the element following the desired element. To correct for this, the compiler includes DISP Suffix 405 in NTE for LIST(I) 601, negates the distance between elements of the array, and sets DISP Suffix 405 to that value. In the Name Resolution operation, the value of DISP Suffix 405 is added to the value produced from the index value and the distance between element of the array, so that the address is that of the desired element instead of the following element.

Beginning with Field ABPS in NTE for LIST (I) 601, that field is set to 11. The setting is a consequence of the fact that LIST is a formal argument. Its base location is contained in Linkage Pointer for List 605 and reference to LIST are indirect. The FIU Field is set to 1 because integer values are sign extended. The IX Field is set to 11, indicating that there is an IX Suffix and that the IESSH Field is present in that suffix. The LL Field is set to 0, indicating that the SLEN Field contains the length information. The DL Field is set to 1, indicating the presence of a DISP Suffix, and the SLEN Field is set to 32, the length of the integer values in LIST. As indicated by the setting of the ABPS Field, the last 32 bits of the Basic NTE are occupied by Field BNAME. Since Linkage Pointer for LIST 605 is in SORT Stack Frame 603, Field BNAME contains an Immediate Name 209 specifying Linkage Pointer for List 605 and an indirect reference. The NYT Field in BNAME is therefore set to 00, specifying FP, the IB Field is set to 1, specifying an indirect reference, and the 32 DISP Field specifies −8, which, when multiplied by 32, gives the displacement of Linkage Pointer for List 605 from FP.

As previously mentioned, the DISP Suffix in NTE for LIST(I) 601 contains −32, the value required to correct for the fact that the index of the first element of a FORTRAN array is 1. Continuing with the IX Suffix, the IXNAME Field contains a Name representing I. Since I is local data, it may be located by a displacement from FP, and consequently, the IXNAME Field contains an Immediate Name 605. In that Immediate Name, the NTY Field is set to 00, specifying FP, the IB Field is set to 0, specifying a direct reference, and the 32_DISP Field is set to 0, specifying I's displacement from FP. The remaining 16 bits of the IX Suffix contain the IESSH Field, as specified by the IX Field in the Basic NTE. The IESSH Field contains the value 5, since 32, the distance between array elements in LIST, is 2 raised to the 5th power.

Turning now to IMOV SIN for LIST(I)=TEMP 615, the IMOV SIN consists of the SOP and two Names: one representing the source of the value to be assigned and the other representing the destination to which it is to be assigned. In the IMOV of FIG. 615, the first Name is Immediate Name for TEMP 619 and the second is Table Name for LIST(I) 621. The storage for TEMP is located at a displacement of 64 bits from FP, and consequently, the NTY Field in Immediate Name for TEMP 619 is set to 00, the IB Field is set to 0, and the 32_DISP Field is set to 2, which, when multipled by 32, yields 64. The contents of Table Name for LIST(I) 621 specify the location of NTE for LIST(I) 601 in Name Table 305 for SORT.

When IMOV SIN for List(I)=TEMP 615 is executed, the first Name is evaluated and the second is resolved. Since Immediate Name for TEMP 619 is an Immediate Name 209, it is resolved and evaluated without reference to Name Table 305. The resolution of Table Name for LIST(I) 621 requires NTE for LIST(I) 601. The resolution involves the following operations:

The base location is obtained by resolving Immediate Name 209 in the BNAME Field. Since Immediate Name 209 specifies an indirect reference, the Name Resolve Operation first locates and then evaluates Linkage Pointer for List 605.

The index value is obtained by evaluating Immediate Name 209 in the IXNAME Field of the IX Suffix.

The displacement is calculated by shifting the index value to the left as specified by the IESSH Field, subtracting the value of the LDISP Field, and adding the result to the base location.

Since the Names in NTE for LIST(I) 601 are all Immediate Names 209, they can be resolved without further reference to Name Table 305 and only NTE for LIST(I) 601 need be fetched from MEM 10112.

In the IMOV SIN of CS 10110, three NTEs were required for the Names in the SIN and the NTE; furthermore, references to Name Table 10350 were required to resolve all three names; with the improved Names and NTEs 307 of the present invention, only a single Table Name 201 is required and only one of the Name Resolution operations need refer to Name Table 305. Moreover, in CS 10110, two of the three references were to 64-bit NTEs, and the third was to a 128-bit NTE. Consequently, 256 bits of NTE had to be fetched from MEM 10112 to FU 10120. With the improved Name Table Entries of the present invention, only a single 96-bit NTE need be fetched.

7. Implementation of Name Resolution and Evaluation in the Present Invention

The implementation of Name Resolution and Evaluation in the present invention is substantially the same as in CS 10110. A Name is first presented to NC 10226. If a hit occurs, NC 10226 produces either the Logical Descriptor 27116 corresponding to the Name or a JAM signal which invokes FU 10120 Name Resolve Microcode. The microcode invoked by the JAM signal then produces a Logical Decriptor 27116 from the information in NC 10226 for the Name. If a miss occurs, another JAM signal invokes further FU 10120 NAME Resolve Microcode which resolves the Name as described above and then makes a NC 10226 Entry for the Name. Such changes in the microcode as are necessary to accomodate Immediate Names 201 and improved NTEs 305 are immediately apparent to one skilled in the art, as may be seen from the RESOLVER_TRAPS and RESOLVER microcode included in Appendix A.

C. The I-Stream

When JP 10114 executes a Procedure 00602, it fetches and executes a sequence of SINS from Procedure 00602. The sequence of SINs being executed by JP 10114 is termed the Instruction Stream (I-stream). As described in U.S. patent application Ser. No. 266,539, the I-stream of CS 10110 is made up of eight-bit SOPs and operand syllables having lengths of 8, 12, or 16 bits. All operand syllables in a given Procedure 00602 have the same size and a field in PED 30305 belonging to a given Procedure 00602 specifies the operand syllable size for that Procedure 00602. The operand syllables in the I-stream can be either Names specifying NTEs containing location, type, and length information for the operands represented by the Names or Literal Syllables containing signed values used directly as data by JP 10114. The I-stream in CS 10110 is described in detail in U.S. patent application Ser. No. 266,539 3.B.3.g.g. and h.h.

While the I-stream in CS 10110 was more regular, and therefore more adapted to high-speed parsing than the I-streams of other digital computer systems having S-languages, experience with CS 10110 showed that still more regularity was desirable:

The use of SOPs whose size differed from that of the operand syllables required complicated parsing mechanisms and made the task of building cost-effective small versions of CS 10110 more difficult.

Name Tables 10350 tended to be large, and consequently, 8-bit and 12-bit Names were infrequently used.

The restriction of opcodes to 8 bits made it necessary to place information required for the execution of certain SOPs in a Literal Syllable following the opcode. The Literal Syllable increased the size of the SIN and execution of the SIN was slowed because an additional parsing operation was required to obtain the information in the literal syllable.

Since different Procedures 00602 had different syllable sizes, the syllable size had to be saved and restored when Call and Return SINs were executed and when a Virtual Processor 00612 was removed from JP 10114 and then rebound to JP 10114.

1. The Improved I-stream

Figure 7:
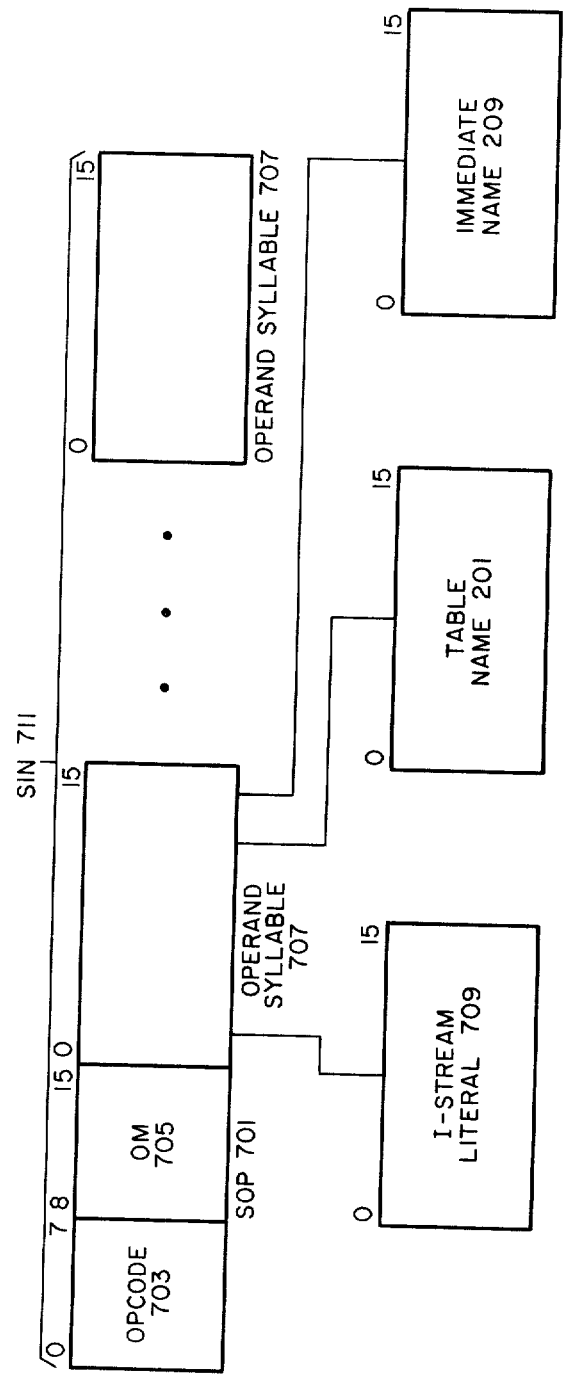
FIG. 7 is a diagram of the improved instruction stream of the present invention.

To overcome these problems, the present invention has made the SOP and all operand syllables 16 bits long. FIG. 7 illustrates the improved I-stream of the present invention. FIG. 7 represents a single SIN 711, consisting of an SOP 701 and a sequence of Operand Syllables 707. SOP 701 and Operand Syllables 707 are all 16 bits long. An Operand Syllable 707 may be an I-stream Literal 709, a Table Name 201, or an Immediate Name 209. Table Names 201 and Immediate Names 209 have already been described in detail; I-stream Literal 709 is a 16-bit signed integer value.

SOP 701 contains two eight-bit fields. Opcode Field 703 contains SOP 701's opcode. In most SINs, the opcode in Opcode Field 703 completely specifies the operation to be performed by JP 10114 when it executes SIN 711. OM Field 705 contains an additional eight-bit value which is used in the execution of the operation specified by Opcode Field 703. The value in OM Field 705 may have one of three functions, depending on SIN 711:

In SINs 711 specifying branches (i.e., non-sequential transfers of control from one SIN 711 to another within a Procedure 00602), OM Field 705 may contain a signed literal value specifying the location relative to the branch SIN 711's SOP 701 of the next SIN 711 to be executed.

In SINs 711 specifying Calls to other Procedures 00602, OM Field 705 contains a value specifying the number of arguments used in the Call.

In certain other SOPs, the value in OM Field is a secondary opcode. In these SOPs, Opcode Field 703 and OM Field 705 together form a single 16-bit opcode.

In the branch SINs of CS 10110, the literal value specifying the location of the next SIN to be executed is contained in a Literal Syllable following the SOP, and this Syllable had to be fetched and parsed before the SOP could perform the branch. One of the chief uses of branch SOPs is in loops, and since most of the execution time of many programs is spent executing loops, the additional overhead required to fetch the lateral syllable has an adverse effect on performance. In the present invention, the S-interpreter microcode executing a branch SIN 711 checks the value of OM Field 705; if OM Field 705's value is not equal to 0, the S-interpreter microcode multiplies OM Field 705's value by 16 and adds it to the current value of IPC 20272 to obtain the location of the next SIN 711. Otherwise, the S-interpreter microcode causes the next Operand Syllable 707 to be parsed. This Operand Syllable contains a 16-bit literal value, and the S-interpreter microcode multiplies that value by 16 and adds it to IPC 20272 as described above. Since OM Field 705's values may range from −255 to +255, it can specify branches to SINs 711 located within 266 16-bit syllables of the Branch SOP 701. Loops executed with very high frequency tend to have branches within this range of values, and consequently, the use of OM Field 705 for the literal value significantly increases the speed with which programs execute on the present invention.

Like branches, Calls are frequently-performed operations. In the Call SINs 711 of CS 10110, the number of arguments in the Call is specified by a literal operand syllable, and this syllable has to be fetched as part of every Call operation. Furthermore, since Procedures 00602 typically have only 2 or three arguments and virtually never take more than 10, the 8, 12, or 16 bits of the literal value were far more than required to specify the number of arguments. In the present invention, the number of arguments is specified by OM Field 705 and an I-stream Literal 709 is therefore no longer required in Call SINs 711 of the present invention. Since the number of arguments is always positive, OM Field 705 can specify up to 511 arguments, far more than required for any practical Procedure 00602.

In certain SINs 711 which are infrequently used or whose execution is generally of long duration, OM Field 705 is used as a secondary opcode. JP 10114 obtains the primary opcode from Opcode Field 703 and then, as specified by that opcode, obtains a secondary opcode from OM Field 705. The primary and secondary opcodes together define the operation. OM Field 705 is not so used in SINs 711 which are frequently used or may be quickly executed because of the additional time required to evaluate OM Field 705.

The intrinsic functions defined by the FORTRAN language provide an example of the use of OM Field 705 as a secondary opcode. These intrinsic functions perform complex mathematical operations such as the calculation of trigonometric functions and square roots. The time required to perform such operations is generally much greater than the time required to perform simple arithmetic operations, and the extra time required for the evaluation of OM Field 705 is insignificant compared with the time required to perform the intrinsic operation itself. Consequently, all SOPs specifying FORTRAN intrinsic operations have a primary opcode of decimal 14 in Opcode field 703 and the value of OM Field 705 specifies the specific intrinsic operation. For example, in the CGOS SOP for the cosine operation, OM Field 705 has the value decimal 4, and in the GSIN SOP for the sine operation, OM Field 705 has the value decimal 11.

In the present invention, the exclusive use of 16-bit Operand Syllables 707 has another advantage: as described above, Immediate names 209 require four bits for NTY Field 203, IB Field 205, and the reserved bit following IB Field 205. If Operand Syllables 707 could have lengths of 8, 12, or 16 bits, as in CS 10110, some immediate names 209 would have 32—DISP Fields 211 containing 4 bits and other would have 32_DISP Fields 211 containing 8 bits. The small range of displacement values possible in 4 or 8-bit 32_DISP Fields 211 would greatly reduce the utility of Immediate Names 209 in the present invention.

As may be seen from the above description, the improved I-stream of the present invention has five main advantages over the I-stream of CS 10110;

The exclusive use of 16-bit syllables simplifies parsing, thus reducing hardware costs for the machine.

There is no longer any need to save and restore a value specifying syllable size on Calls and Returns and when a Virtual Processor 00612 ceases and resumes execution on JP 10114.

The addition of OM Field 705 to the SOP syllable allows the elimination of I-stream Literals from certain frequently-executed SINs 711, thereby speeding the execution of these SINs 711.

The use of OM Field 705 for secondary opcodes allows longer opcodes for infrequent operations or operations of long duration without reducing the speed of other operations.

16-bit Names allow the extensive use of Immediate Names 209 and therefore speed up Name Resolution and reduce the size of Name Table 305 as previously described.

Taken together, these advantages allow significant cost reductions and performance improvements in computer systems of the present invention.

2. Implementation of the 16-bit I-stream in the Present Embodiment

The present embodiment still employs the parsing hardware of CS 10110. The hardware itself is described in Chapter 2.B.3.b.b.a.a.a, of U.S. patent application Ser. No. 266,539, and the microcommands which control the hardware in Chapter 3.B.3.h.h. In the present embodiment, parsing microcode modifies the behavior of the parsing hardware so that it correctly parses the I-stream of the present invention. On beginning the execution of a SIN 711, parsing microcode uses the parse_op_stage microcommand as in CS 10110 to fetch Opcode Field 703. Then it sets CSSR 24112, which contained the syllable size, K, in CS 10110, to 8 and uses the parse_k_load_epc command to fetch OM Field 705 and place its value on NAME 20224. Finally, it sets CSSR 24112 to 16 and fetches the SIN's Operand Syllables 707. In other embodiments, CSSR 24112 may be omitted and the parsing hardware may always fetch 16-bit syllables. The microcode which performs the above operations is contained in EMULATE_2400 of Appendix A.

D. Accumulator SOPs

Each instruction which may be executed on a digital computer system may be said to specify a machine upon which the operation indicated by the instruction is executed. For example, an ADD instruction on a typical traditional digital computer system specifies two registers which contain the value to be added, an ALU to perform the operation, and a third register to hold the result. These three registers and the ALU are the "machine" with which the addition operation is performed.

Taken together, the set of instructions which may be executed on a digital computer system specifies a conceptual machine consisting of all of the "machines" specified by the individual instructions. This conceptual machine is termed the digital computer system's architecture. If two digital computer systems have the same architecture, they will execute the same instructions in the same manner, regardless of any differences in the physical devices making up the digital computer systems.

1. Traditional Architectures

The conceptual machines specified by instruction sets for instructions for traditional digital computer systems of the prior art typically specify operations in terms of registers and operations performed by an ALU on the contents of those registers. Thus, the kind of operations typically specified by statements in high-level languages such as FORTRAN must be carried out by a sequence of several instructions. The following FORTRAN fragment can provide an example of this relationship between high-level language statements and instructions in traditional digital computer systems.

```
REAL SUM, VALA, VALB
...
SUM = VALA + VALB
```

The instructions corresponding to the statement
SUM=VALA+VALB
typically include the following:
(1) a first load instruction which loads the value at the location specified by VALA from memory into a first register.
(2) a second load instruction which loads the value at the location specified by VALB into a second register.
(3) a floating point add arithmetic instruction which specifies the first and second registers as sources for an ALU which performs floating point arithmetic. Output from the ALU goes to a result register.
(4) a store instruction which stores the contents of the result register at the location specified by SUM.
In many cases, further instructions preceding the above instructions may be required to set up addressing registers so that they specify the locations of the variables.

2. SIN Architecture of CS 10110

Figure 8:
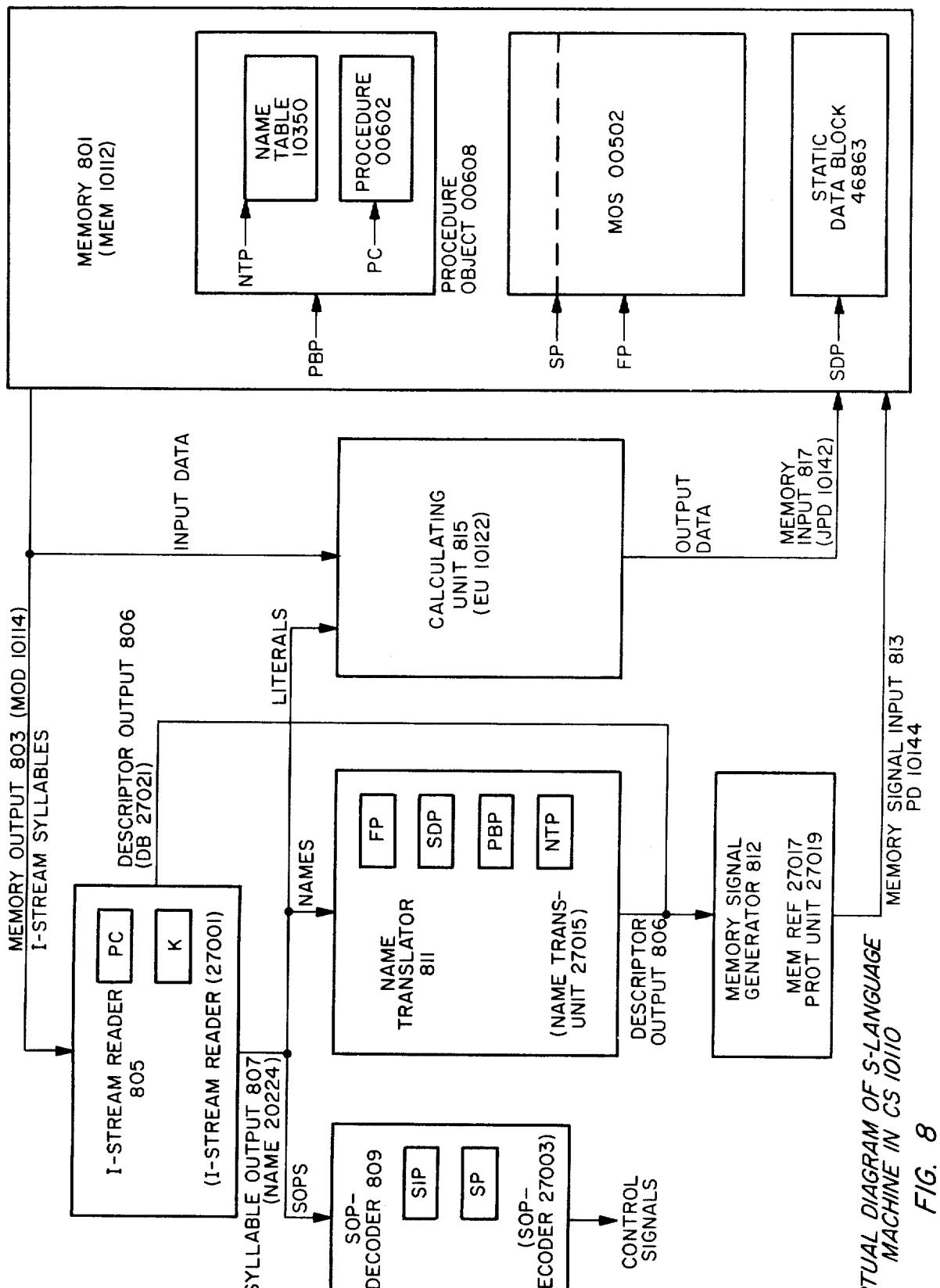
FIG. 8 is a conceptual diagram of the S-language machine in CS 10110 of the original digital data processing system.

The conceptual machine required to execute the SINS of CS 10110 described in U.S. patent application Ser. No. 266,539, is represented in FIG. 8. In order to establish the relationship between the conceptual machine and the devices in CS 10110 which actually perform the operations specified by the SINs, there is listed with each conceptual device the corresponding devices from FIG. 270 of U.S. patent application Ser. No. 266,539.

The devices of the conceptual machine of FIG. 8 include:
Memory 801 (MEM 10112), in which data and Procedure Objects 00608 are stored. Procedure Objects 00608 contain Procedures 00602, containing sequences of SINs, and Name Tables 10350, containing NTEs for the Names in the SINs of Procedures 00602. When a Procedure 00602 is being executed, it uses data contained in a stack, MOS 00502, and a Static Data Block 46863. A Procedure 00602 may also use other data in Memory 801.
Memory Output 803 (MOD 10114), which transmits data from Memory 801 to Calculating Unit 815 and SINs from Memory 801 to I-stream Reader 805.
I-stream Reader 805 (I-Stream Reader 27001), which parses SINs obtained from Memory 801 into SOPs, Names, and Literal Syllables. The syllables are output on Syllable Output 807. In addition, I-stream reader generates descriptions specifying the locations of syllables in Memory 801. These descriptors are output onto Descriptor Output 806 (DB 27021). I-stream Reader 805 further contains two registers whose values are used to generate descriptors: PC, specifying the address of the next SIN to be fetched in Procedure 00602 being executed, and K, specifying the syllable size of Operand Syllables in Procedure 00602.
Syllable Output 807 (NAME 20224), which delivers syllables parsed from the I-stream by I-stream Reader 805 to SOP Decoder 809, Name Translator 811, and Calculating Unit 815.
SOP Decoder 809 (SOP Decoder 27003), which decodes SOPs obtained from Syllable Output 807 and produces control signals to which the devices of the conceptual machine of FIG. 8 respond. SOP Decoder 809 also contains an SIP register containing a value which specifies the S-interpreter being used to decode the SOPs.
Name Translator 811 (Name Trans. Unit 27015), which resolves and evaluates Names obtained from Syllable Output 807 and produces descriptors (Logical Descriptors 27116) which it outputs to Descriptor Output 806. Name Translator 811 contains four registers: three contain the ABPs: FP, specifying the location in MOS 00502 of the frame for the current execution of Procedure 00602, SDP, specifying the location of Static Data Block 46863 being used for the current execution of Procedure 00602, and PBP, specifying a location in Procedure Object 00608 containing Procedure 00602. The fourth contains NTP, specifying the location of Name Table 10350 for Procedure 00602 in Procedure Object 00608.
Memory Signal Generator 812 (Memory Ref. Unit 27017, Prot. Unit 27019) takes descriptors from Descriptor Output 806 and produces memory signals containing addresses and indicating read, write, and execute operations. Memory Signal Input 813 (PD 10146) carries these signals to Memory 801.
Calculating Unit 815 (EU 10122), finally, receives data from Memory 801 via Memory Output 803 and I-stream Literals from I-stream Reader 805 via Syllable Output 807. It processes its inputs as specified by the SOP and outputs the result to Memory Input 817 and thereby to Memory 801.

Unlike the conceptual machines specified by instructions of the traditional digital data processing system, conceptual machine of FIG. 8 contains no general-purpose registers. The contents of the registers specified in FIG. 8 may be changed only by certain SINs, and only in narrowly-defined ways. Beginning with the PC register in I-stream Reader 805, only Branch SINs and Call and Return SINs may explicitly set the PC register to a new value. All other SINs merely implicitly increment the PC register to specify the next SIN.

The registers K in I-stream Reader 805, SIP in SOP Decoder 809, and FP, SDP, PBP, and NTP in Name Translator 811, may only be set to new values by Call and Return SINs. The Call SIN saves the current values of K, SIP, FP, SDP, PBP, and NTP on the frame in MOS 00502 for the execution of Procedure 00602 executing the Call SIN and then sets these registers to the new values required for Procedure 00602 being called. The Return SIN sets these registers to the values saved on the frame in MOS 00502 for the execution of Procedure 00602 to which the Return SIN returns.

The operations performed by the conceptual machine defined by CS 10110 corresponds closely to the operations specified by statements in high-level languages. Generally, therefore, few SINs are generally needed to carry out the operations specified by such a statement. For example, in CS 10110, the FORTRAN statement of the above example corresponds to a single FORTRAN SIN, specified as follows:

FADD n1, n2, n3

FADD indicates the opcode, in this case, 60, and n1, n2, and n3 indicate three Names. The operation specified for FADD is the addition of evaluated n1 to evaluated n2 and the storage of the result at resolved n3.

The operation is executed on the conceptual machine of FIG. 8 as follows: using the PC register, I-stream Reader 805 generates a descriptor for FADD's SOP. The descriptor is delivered via Descriptor Output 806 to Memory Signal Generator 812, which forms a memory signal from it. The memory signal is delivered via Memory Signal Input 813 to Memory 801. Memory 801 then outputs the SOP onto Memory Output 803 and I-stream Reader 805 parses the SOP and delivers it to SOP Decoder 809. SOP Decoder 809 decodes it to produce control signals directing further operations. In response to these control signals, I stream Reader 805 obtains the next syllable, i.e., the Name representing VALA as described for the SOP, and delivers the Name via Syllable Output 807 to Name Translator 811. Name Translator 811 resolves the Name to produce a descriptor specifying the location, length, and type of VALA, and outputs the descriptor to Descriptor Output 806. Memory Signal Generator 812 receives the descriptor from Descriptor Output 806, and since the SOP specifies an Evaluation operation, outputs a signal on Memory Signal Outut 813 specifying that the value at the location of VALA is to be delivered via Memory Output 803 to Calculating Unit 815. The operation described for VALA's Name is repeated with the Name representing VALB, and Calculating Unit 815 begins calculating VALA+VALB. Meanwhile, Name Translator 811 resolves the Name representing SUM and passes the descriptor for SUM to Memory Signal Generator 813, which produces a signal on Memory Signal Output 813 specifying that the value on Memory Input 817 is to be stored at the location specified in the memory signal. When Calculating Unit 815 is finished with the calculation, the result is output onto Memory Input 817 and stored at the location obtained by resolving n3. Finally, the PC register in I-stream Reader 805 is set to specify the location of the next SIN, and the execution of that SIN proceeds essentially as just described.

It is noteworthy here that the transfers specified by FADD are from Memory 801 to Calculating Unit 815 and then back to Memory 801, not from memory to a register and from a register to memory, as in the conceptual machines of traditional digital computer systems. Of course, the actual operation in CS 10110 does involve registers in FU 10120 and EU 10122, but the manner in which these registers are manipulated cannot be specified in the FADD SIN, and are thus not part of the "machine" described by the FADD SIN.

The advantages of the conceptual machine described by the SINs of CS 101110 for executing programs written in high-level languages are obvious when one compares the single FADD SIN used to execute the FORTRAN statement of the example with the sequence of instructions required to execute the statement in typical traditional digital computer systems. However, there is one respect in which the fact that instructions in traditional digital computer systems may specify registers is advantageous: if the result of one operation is required as input to the next operation, instructions in traditional digital computer systems can specify the register containing the results as a source of the input for the next operation. The advantages stemming from this capability can be seen by considering the FORTRAN statement

SUM = SUM + VALA + VALB

The execution of this statement in a traditional digital computer system of the prior art requires only two instructions more than the execution of the first example statement:

(1) A third load instruction which loads SUM into a register. The register may be one of those which contained VALA or VALB.
(2) An additional integer add arithmetic instruction which specifies the register containing SUM and the result register as sources for the ALU.

In CS 10110, SINs may only specify data in Memory 801, and consequently, the result must be stored in Memory 801 at the end of the first operation and retrieved from Memory 801 at the beginning of the next. The FORTRAN statement

SUM = SUM + VALA + VALB therefore requires two FADD SINs, one specifying Names for VALA, VALB, and a location in Memory 801 for the temporary storage of the result, and a second specifying the temporary location and SUM as the sources of the values to be added and SUM as the location at which the result is to be stored. The requirement in CS 10110 that the values operated on in SOPs must always come from Memory 801 and that the results be returned to Memory 801 has the following consequences:

(1) The compiler must frequently specify areas in Memory 801 to hold intermediate results and create Names and NTEs specifying these areas.
(2) SINs must always contain Names specifying sources and destinations of data. These Names increase the size of the SINs and their resolution and evaluation increases execution time.
(3) The need for extra Names and NTEs to specify storage for intermediate results increases the size of Procedures 00602 and Name Tables 10350.
(4) The need to store the result in Memory 801 at the end of one SIN and fetch it from Memory 801 at the beginning of the next slows the execution of the SIN.

3. SOPs Specifying an Accumulator

Figure 9:
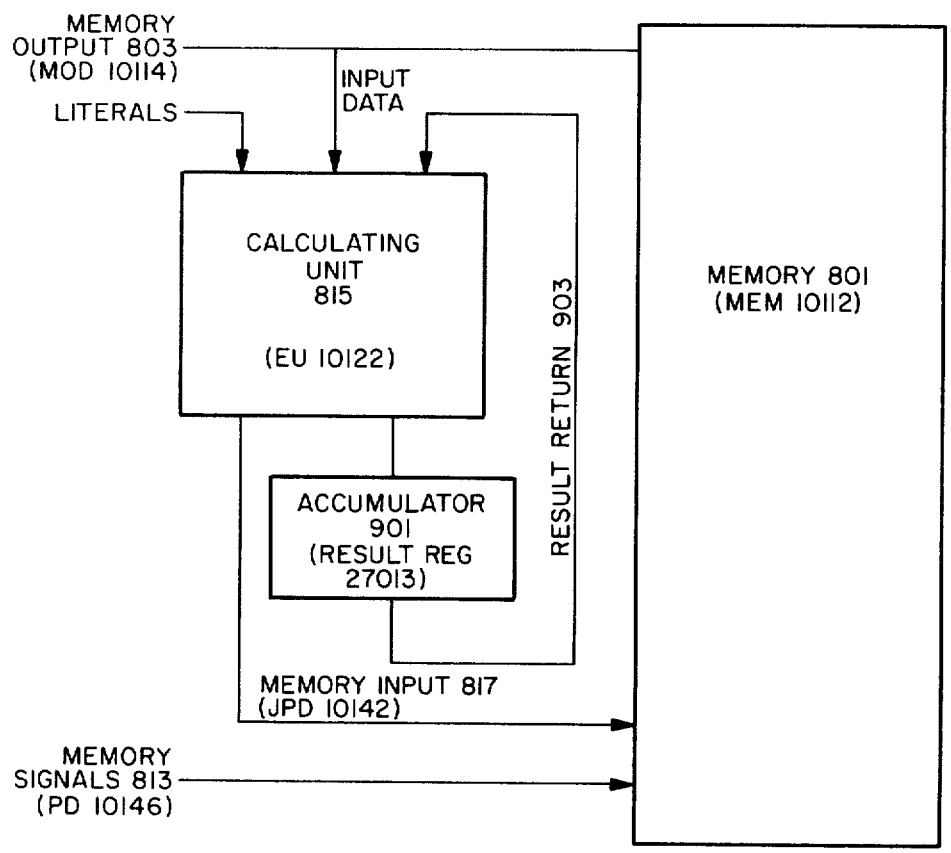
FIG. 9 is a conceptual diagram of the Calculating Unit and Accumulator in the improved S-language machine of the present invention.

The present invention improves the digital data system of U.S. patent application Ser. No. 266,539 by adding an accumulator. FIG. 9 illustrates this change. The conceptual machine of the present invention in general resembles that of CS 10110, but has an additional register, Accumulator 901. The results of any operation performed by Calculating Unit 815 are retained in Accumulator 901. Thus, in the present invention, all SOPs specifying operations performed by Calculating Unit 815 implicitly specify Accumulator 901 as a destination for the result of an operation. In addition, an SOP may specify a location in MEM 801 as a destination for the result of an operation and Accumulator 901 as a source for a value to be operated on. These new possibilities in the present invention are indicated by Calculating Unit 815's inputs and outputs in FIG. 9. Calculating Unit 815 is represented with two outputs instead of the single output of CS 10110. One output is connected to Accumulator 901 and the other to Memory Input 817, indicating that Calculating Unit 815 can output results to both Accumulator 901 and Memory 801. Calculating Unit 815 is further represented with three inputs instead of the two inputs of FIG. 8. The additional input, Result Return 903, is connected to Accumulator 901, indicating that Accumulator 901 may be used as a source of data for Calculating Unit 815.

Accumulator 901 of the present invention is a special-purpose register. It may contain only the results of a Calculating Unit 815 operation, is loaded only as a consequence of a Calculating Unit 815 operation, and may serve as a source of data only for Calculating Unit 815.

In particular, unlike the general-purpose registers of traditional digital computer systems, Accumulator 901 cannot be loaded from Memory 801 and Accumulator 901's contents cannot be output to Memory 801.

Since SINs in the present invention may specify Accumulator 901 as a source for Calculating Unit 815, operations that were specified by certain single SINs in CS 10110 are now specified by one of a group of SINs. For example, in the present invention, there are six variants of the FADD SIN:

(1) FADD n1, n2, n3: This SIN is like the FADD of CS 10110, except that the result is retained in Accumulator 901 in addition to being stored in Memory 801 at the location obtained by resolving n3.

(2) FADD.A n1, n2: This SIN adds operands obtained by evaluating n1 and n2 and retains the result in Accumulator 901. It does not store the result in Memory 801, and thus, no third name is necessary.

(3) FADD.M n1, n2: This SIN adds the operand obtained by evaluating n1 to the contents of Accumulator 901. The result is retained in Accumulator 901 and is also stored in Memory 801 at the location obtained by resolving n2.

(4) FADD2 n1, n2: This SIN adds operands obtained by evaluating n1 and n2, retains the result in Accumulator 901, and also stores the result in the location in Memory 801 obtained from the resolution of n2.

(5) FADD2.A n1: This SIN evaluates n1, adds the result to the contents of Accumulator 901, and retains the result in Accumulator 901.

(6) FADD2.M n1: This SIN evaluates n1, adds the result to the contents of Accumulator 901, retains the result in Accumulator 901, and also stores the result in the location in Memory 801 obtained from the resolution of n1.

The advantages obtained in the present invention by the use of a family of SINs in place of the single SIN of CS 10110 may be seen by comparing the manner in which CS 10110 and the present invention deal with the following FORTRAN example:

---

REAL X, Y, Z, A, B, C
...
A = B + C
X = A + Y + Z

---

In CS 10110 as described in U.S. patent application Ser. No. 266,539, all of the operations specified in the two statements of the above fragment would have been performed by FADD SINs. In the second statement, a location in Memory 801 would have been required to hold the result of Y+Z, and consequently, the compiler would have had to generate Names and NTEs not only for X, Y, Z, A, B, and C, but also for the temporary, which we will call TEMP. Using the names of the variables for the Names in the SINs which represent them, the SINs in CS 10110 required for the two statements in the fragment are the following:

FADD B,C,A
(Evaluate B, evaluate C, resolve A, do A+B, and store the result in A)
FADD A, Y, TEMP
(Evaluate A, Evaluate Y, resolve TEMP, do A+Y, and store the result in TEMP)
FADD Z, TEMP, X
(Evaluate Z, Evaluate TEMP, resolve X, do X+TEMP, and store the result in X)

Each of the above SINs contains 4 syllables, and thus 12 syllables must be fetched to perform the specified operation. Each of the SINs further specifies that 2 data items be fetched from Memory 801 to Calculating Unit 815 and 1 data item be written from Calculating Unit 815 to Memory 801. Consequently, 9 memory operations are required for the data. Furthermore, in executing the above SINs, CS 10110 of U.S. patent application Ser. No. 266,539 performs six Name Evaluation operations and three Name Resolution operations. Each of these operations requires information from Name Table 10350 and Name Table 10350 must have a NTE for each variable and for TEMP. Finally, storage must be provided in Memory 801 for the intermediate results.

In the present invention, the FORTRAN statements in the fragment are executed by the following three SINs:

FADD B, C, A
(Evaluate B, evaluate C, resolve A, do B+C, retain the result in Accumulator 901, and store the result to A)
FADD2.A Y
(Evaluate Y, add Y to the contents of Accumulator 901, and retain the result in Accumulator 901)
FADD.M Z, X
(Evaluate Z, resolve X, add Z to the contents of Accumulator 901, retain the result in Accumulator 901, and store the result to X)

Thus, in the present invention, the SINs contain 9 instead of 12 syllables, there are 6 instead of 9 fetches of data from Memory 801 or stores of data to Memory 801, 6 instead of 9 Name Resolution or Evaluation operations, no space is required in Memory 801 for storing intermediate results, and no Name is needed to refer to storage for intermediate results. Furthermore, if X, Y, Z, A, B, and C are local or static data, and may therefore be located by offsets from FP or SDP, their Names will be Immediate Names 209 in the present invention, there will be no NTEs 307 for the Names, and the Name Resolution and Evaluation operations can proceed without reference to information in Name Table 305.

4. Implementation of Accumulator 901

In the present embodiment of the present invention, Accumulator 901, Memory Input 817, and Result Return 903 are implemented by means of Result Reg 27013 of EU 10122, JPD Bus 10142, and data paths internal to EU 10122 which allow the results of one EU 10122 operation to be used as an operand for another EU 10122 operation respectively. The relationship between JPD Bus 10142, Result Reg 27013, and MEM 10112 may be seen in FIG. 270 of U.S. patent application Ser. No. 266,539; the data paths internal to EU 10122 may be seen in FIGS. 256 and 257 of #FHP__SPEC. Transfer of data from Result Reg. 27013 to MEM 10122 via JPD Bus 10142 is under control of FU 10120 microcode, and the use of data from Result Reg 27013 as an operand in EU 10122 is under control of EU 10122 microcode. Thus, it was physically possible in CS 10110 as described in U.S. patent application Ser. No. 266,539 to retain results of an operation in Result Reg 27013 while writing it to MEM 10112 and to then use the contents of Result Reg 27013 as an operand for EU 10122, but the SINs available in CS 10110 did not specify such operations. The SINs of the present invention, however, can specify Accumulator 901 as described above, and all that is required to implement them is new opcodes and FU 10120 and EU 10122 microcode responsive to these new opcodes. Examples of such microcode are provided in CSL.DISP__2 and ACCUMULATION__ENTRIES of Appendix A.

E. Call SINs and the Return SIN

In both CS 10110 of U.S. patent application Ser. No. 266,539 and the present invention, the execution of a Call SIN suspends the execution of the Procedure 00602 containing the Call SIN (the calling Procedure 00602) at the point of the Call SIN and commences an execution of another Procedure 00602 (the called Procedure 00602) specified in the Call SIN. While a called Procedure 00602 is executing, it may use data from calling Procedure 00602. Such data is called arguments, and the Call SIN specifies which data is to be used for a given execution of called Procedure 00602. The execution of a Return SIN terminates an execution of called Procedure 00602 containing the Return SIN and resumes the execution of calling Procedure 00602 whose execution was suspended by execution of the Call SIN. In terms of the Conceptual Machine of FIG. 8, the Call SIN sets registers PC, K, SIP, SP, FP, SDP, PBP, and NTP of FIG. 8 to values appropriate for called Procedure 00602 and the Return SIN resets those registers to the values they had at the time of the execution of the Call SIN. As may be seen from the above, a Call SIN must do five things:

It must save the contents of the registers of the conceptual S-language machine.

It must provide means by which called Procedure 00602 can locate the data used as arguments in the Call SIN.

It must locate called Procedure 00602.

It set the registers of the conceptual S-language machine to the values required for the execution of called Procedure 00602.

It must allocate storage in Memory 801 for the execution of called Procedure 00602.

It must begin execution of called Procedure 00602.

The Return SIN must do two things:

It must locate the register values for calling Procedure 00602 saved by the Call SIN.

It must set the registers in the conceptual S-language machine from these values.

In CS 10110 and the present invention, the Call SINs employ a Macro Stack (MAS) 00502 to save the register values for calling Procedure 00602, to provide called Procedure 00602 with access to the arguments specified in the Call SIN, and to provide the memory space required for called Procedure 00602's execution. MAS 00502 is made up of frames. Each frame contains state for an execution of a Procedure 00602. The topmost frame in MAS 00502 is that of Procedure 00602 currently being executed; the preceding frame in MAS 00502 is that of Procedure 00602 which was the caller of Procedure 00602 currently being executed, the frame preceding that frame is that of the caller of the caller, and so on. When a Call SIN is executed, it creates a new frame for called Procedure 00602 at the top of MAS 00502, and when a Return SIN is executed, it makes the preceding frame, which is that belonging to calling Procedure 00602 which called Procedure 00602 in which the Return SIN was executed, into the top frame of MAS 00502. While all Calls in CS 10110 and the present invention function logically as described above, certain characteristics of CS 10110 and the present invention make the execution of certain Call SINs much more complex that the execution of other Call SINs. The first of these characteristics is that more state must be changed in some Call SINs than in others. In CS 10110 and the present invention, a Procedure 00602 has associated with it a Procedure Environment Descriptor (PED). A Procedure 00602's PED contains the following:

NTP, A pointer to Name Table 10350 which contains NTEs for Procedure 00602's Names.

SIP, an identifier for the S-interpreter required to execute Procedure 00602's SOPs.

SDPP, a pointer which may be resolved to obtain the location of static data used by an execution of Procedure 00602.

PBP, a pointer to a location used as a base from which to calculate locations in Procedure 00602.

On a call, the SIP register in the conceptual S-language machine is set from SIP, the SDP register is set from a pointer obtained by resolving the pointer in SDPP, and the PBP register is set from PBP.

If a calling Procedure 00602 and a called Procedure 00602 share a PED, the call need not change the values contained in the SIP, SDP, and PBP registers. All that is required is that FP and SP be set to specify the proper locations in called Procedure 00602's frame and PC be set to the location of the first of called Procedure 00602's SINs. When calling Procedure 00602 and called Procedure 00602 do not share a PED, called Procedure 00602's PED must be located and the SIP, SDP, and PBP registers must be set to values obtained from the PED. The amount of time required to execute a Return SIN is similarly dependent upon the number of conceptual S-language machine registers which must be reset. The second of these characteristics is the access control system of CS 10110 and the present invention. As explained in detail in 4.C of U.S. Pat. Ser. No. 266,539, in CS 10110 and the present invention, Procedures 00602 are executed by entities called Subjects. A Procedure 00602 may access data only if an Access Control List associated with the object containing the data allows the Subject executing Procedure 00602 to have the kind of access to the data in the object required to perform the operation specified by the SIN in Procedure 00602 currently being executed. Each Procedure Object 00608 has associated with it a Domain of Execution attribute. When a Subject is executing a Procedure 00602 contained in that Procedure Object 00602, the Domain of Execution attribute is one component of the Subject. Thus, when a Call SIN invokes a Procedure 00602 contained in a Procedure Object 00608 with a different Domain of Execution attribute from that possessed by calling Procedure 00602's Procedure Object 00608, the Subject executing called Procedure 00602 changes. Such a call is termed a Cross-domain Call. Because a Cross-domain Call changes the Subject, the Called Procedure 00602 has no access to MAS Object (MASO) 46703 containing calling Procedure 00602's stack frame and the stack frame for called Procedure 00602 must be constructed in a MASO 46703 to which the new Subject has access. In order to construct the stack frame, the Call SIN must locate MASO 46703 for the new stack frame and copy state from MASO 46703 containing calling Procedure 00602's stack frame over to MASO 46703 containing the new stack frame. On a return from such a Call, the subject similarly changes and the Return SIN must locate MASO 46703 containing calling Procedure 00602's stack frame. The change of the Subject and the transitions from one object to another and back in Cross-domain Call are handled by KOS microcode components. The state required to locate the proper MASO 46703 is stored on a separate stack accessible only to KOS. This stack is contained in SS Object 10336.

1. Calls and Returns in CS 10110

Call and Return in CS 10110 is described in detail in Section 4.E.d of U.S. patent application Ser. No. 266,539. In CS 10110, SS Object 10336 and two Call SINs were used to deal with the differing degrees of state manipulation required in Call and Return operations. The two SINs were the Mediated Call SIN and the Neighborhood Call SIN. Mediated Call SINs were used for Calls involving Procedures 00602 which did not share PEDs; consequently, Mediated Call Sins set PC, K, SIP, SP, FP, SDP, PBP, and NTP in the conceptual S-language machine. Neighborhood Call SINs were used for Calls involving Procedures 00602 which did share PEDs; consequently, Neighborhood Call SINs set only PC, SP, and FP. However, this optimization was not possible with regard to the Return SIN. It was possible for a given Procedure 00602 to be called by both Mediated Call SINs and Neighborhood Call SINs, and the Return SIN therefore had to determine which Call SIN had called Procedure 00602 and in the case of the Mediated Call SIN, whether the Return SIN had to locate a new PED, a new Procedure Object 00608, or a new stack. The Mediated Call SIN stored this information in SS Object 10336 and the Return SIN examined this information to determine what actions it had to perform. Consequently, SS Object 10336 was involved in all Mediated Calls and in all Returns.

2. Calls and Returns in the Present Invention

In the present invention, there are one Mediated Call SIN and two Neighborhood Call SINs. The Mediated Call SIN is called GCALL. For the present discussion, it may be specified as follows:

GCALL n1, [n2, n3, . . . nm]

SOP 701 for the GCALL SIN contains the opcode and, in OM Field 705, the number of arguments. The first Operand Syllable 707 is a Name specifying Procedure 00602 being called; when the Name is evaluated, it yields a pointer specifying information from which called Procedure 00602 may be located. The remaining Names specify arguments used in the Call. Resolution of these Names and descriptor-to-pointer conversion yields pointers to the arguments. Since all Operand Syllables 707 have 16 bits, GCALL does not set the K register of the conceptual S-langauge machine; otherwise, like Mediated Call, it sets PC, SIP, SP, FP, SDP, PBP, and NTP.

The Neighborhood Call SIN may be specified for the present discussion like this:

NCALL litl, [n2, n3, . . . nm]

SOP 701 for the NCALL SIN also contains the opcode in Opcode Field 703 and the number of arguments in OM Field 705. The first Operand Syllable 707 is an I-stream Literal 709 which, when multiplied by 16, specifies the offset of called Procedure 00602 from the NCALL SIN. When this value is multiplied by 8 and added to PC, the result is the beginning of called Procedure 00602. The remaining Operand Syllables 707 are Names specifying arguments, as in GCALL.

I-stream Literals 709 are 16 bits long, and therefore cannot specify a Procedure 00602 which is located more than 2**15-1 bytes from the NCALL SIN. When two Procedures 00602 share a PED but are located too far apart for NCALL, the Neighborhood Call by Name SIN is used. It is specified as follows:

NCALLN n1, [n2, n3, . . . nm]

n1 is an Immediate Name 209 or a Table Name 201 which resolves to a location which is a displacement from PBP. The specified location is the beginning of Called Procedures 00602. The remaining Names specify arguments, as in the other Call SINs. Both NCALL and NCALLN set only PC, SP, and FP.

As explained in detail in U.S. patent application Ser. No. 266,539 4.E.d.7, a call may also result in CS 10110 and the present invention when microcode executing on JP 10114 requires assistance from programs written in high-level languages. In terms of the S-language conceptual machine, microcode to software calls behave like calls made by the GCALL SIN.

As in CS 10110, there is a single Return SIN:

RTN

The RTN SIN has no Operand Syllables 707. The conceptual S langauge machine registers changed by RTN depends on the number changed in the call.

3. Operation of Call and Return SINs

As described above, the Call and Return SINs use data contained in Procedure Objects and manipulate stack frames. The following discussion first presents Procedure Objects and Stack Frames in the present invention and then discloses the operation of Call and Return SINs with reference to these Procedure Objects and Stack Frames.

a. Procedure Objects 1001

Figure 10:
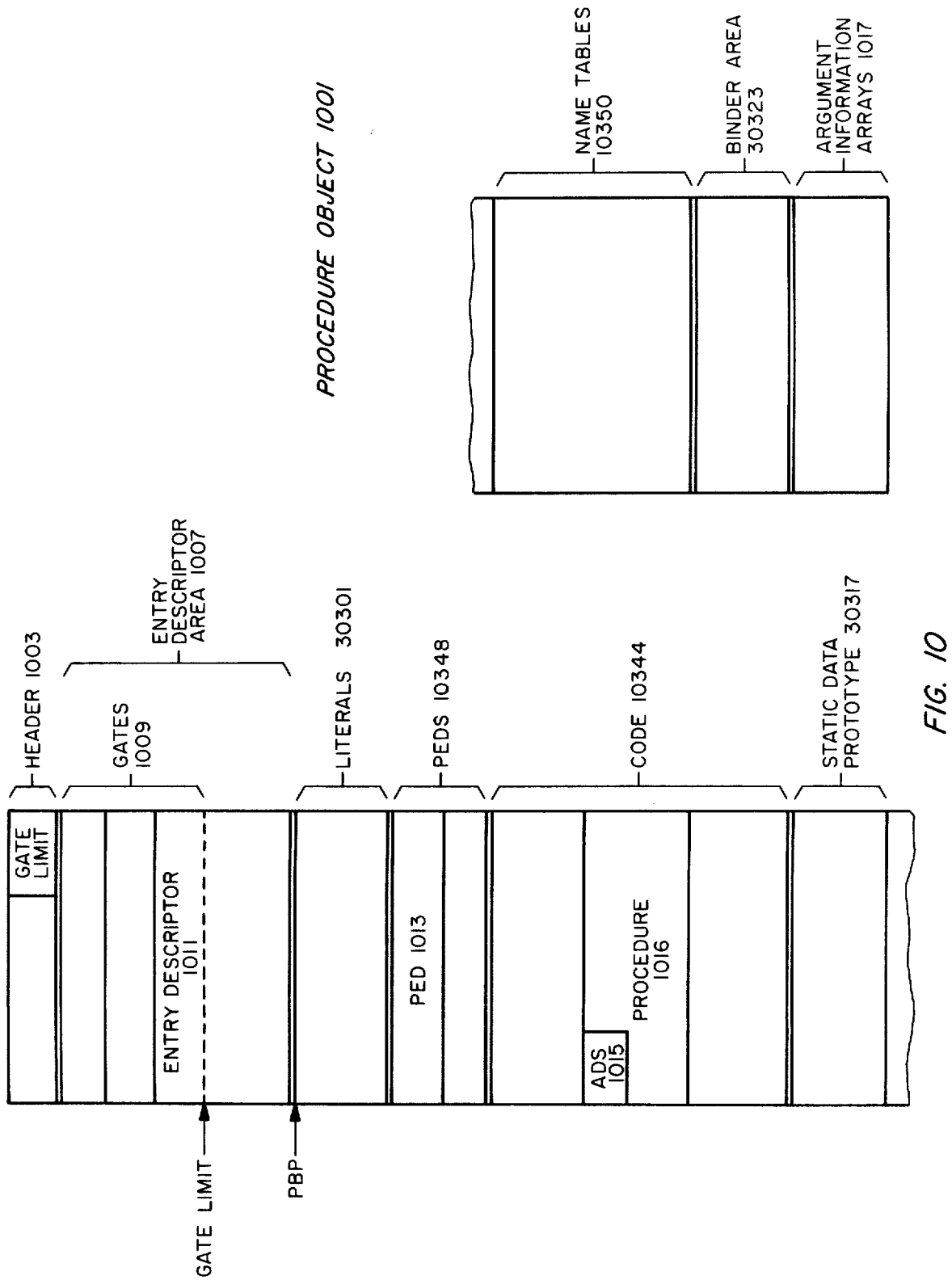
FIG. 10 is a diagram of the procedure object of the present invention.

FIG. 10 presents Procedure Object 1001 of the present invention. FIG. 10 may be compared with FIG. 472 of U.S. patent application Ser. No. 266,539, which shows Procedure Object 00608 of CS 10110. As may be seen from the comparison, Procedure Object 1001 is similar in its basic parts to Procedure Object 00608: both contain Literals 30301, PEDs 10348, Code 10344, Static Data Prototype 30317, Name Tables 10350, and Binder Area 30323. The differences are to be found in Header 1003, Gates 1009, Entry Descriptor AREA 1007, PED 1013, Procedures 1016, and Argument Information Arrays 1017. Header 1003 still contains Gate Limit 47203 specifying the number of Gates 1009 in Procedure Object 1001, but no longer contains AIA Offset 47203 specifying the location of argument information arrays. As will be seen, this information is at other locations in Procedure Object 1001. Entry Descriptor Area 1007 contains Entry Descriptors 1011. These in turn contain information required to locate Procedures 1016. A Gate in Procedure Object 1001 is simply as Entry Descriptor 1009 which is within the number of Entry Descriptors 1011 specified by the value of Gate Limit Field 47203. A calling Procedure 1016 in one Procedure Object 1001 may invoke a called Procedure 1016 in another Procedure Object 1001 only if called Procedure 1016's Entry Descriptor 1011 is in Gates 1009.

The function of PEDs 10348 has already been described; their structure in the present invention will be described later. Code 10344 contains Procedures 1016. These differ from Procedures 00602 in one respect only: the first 16 bits of a Procedure 1016 is ADS Field 1015. ADS Field 1015 contains a 16-bit unsigned value which, when multiplied by 128, specifies the amount of local storage initially required for Procedure 1016's local data. Argument Information Arrays 1017, finally, are a group of individual Argument Information Arrays rather than a single large Argument Information Array.

Figure 11:
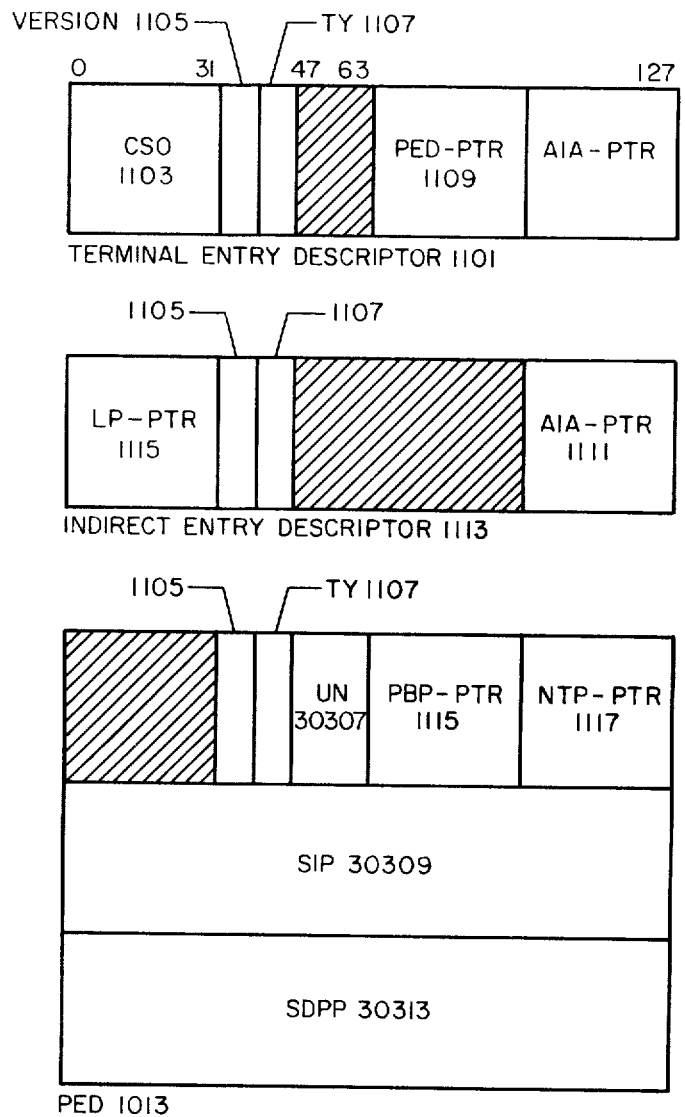
FIG. 11 is a diagram of entry descriptors and procedure environment descriptors of the present invention.

Turning now to FIG. 11, FIG. 11 gives detailed representations of Entry Descriptors 1011 and a PED 1013. There are two kinds of Entry Descriptors 1011: Terminal Entry Descriptors 1101, which contain the information required to locate a Procedure 1016, its PED 1013, and its Argument Information Array 10352, and Indirect Entry Descriptors 1113, which contain a resolved object relative pointer specifying the location of another pointer which in turn specifies the location of another Entry Descriptor 1011. Terminal Entry Descriptor 1101 contains the following fields:

CSO Field 1103: When the value of this Field is added to the base location contained in PBP, the result is the location of Field ADS 1015 of Procedure 1016 specified by Terminal Entry Descriptor 1101.

Version Field 1105 and TY Field 1107 specify the version of Terminal Entry Descriptor 1101 and identify it as a Terminal Entry Descriptor.

PED__PTR 1109 is a resolved object-relative pointer specifying the location of PED 1013 for Procedure 1016 specified by Terminal Entry Descriptor 1101.

AIA__PTR 1111 is a resolved object-relative pointer specifying the location of an Argument Information Array in Argument Information Arrays 1017 for Procedure 1016. If Procedure 1016 has no Argument Information Array, the pointer is a null pointer.

The fields of Indirect Entry Descriptor 1113 differ from those of Terminal Entry Descriptor 1101 as follows: The first 32 bits contain LP PTR 1115, a resolved Object Relative pointer specifying the location of a pointer which, when resolved, yields the location of another Entry Descriptor 1011. Version Field 1105 and TY Field 1107 specify the version of Indirect Entry Descriptor 1113 and that Indirect Entry Descriptor 1113 is an Indirect Entry Descriptor. The last 32 bits of Indirect Entry Descriptor 1113 contain AIA PTR 1111, which has the same function as in Terminal Entry Descriptor 1101.

PED 1013 of the present invention contains information required for the execution of Procedures 00602 sharing PED 1013, and thus has the same function as PED 30303 of CS 10110, described in 3.B.a of U.S. patent application Ser. No. 266,539, but certain fields have been eliminated and others are at different locations. SEPP Field 30316 and K Field 30305 have been eliminated. The latter field specified the syllable size of operand syllables in Procedures 00602 sharing PED 30303, and is thus no longer required in the present invention. The remaining fields are the following:

Version Field and TY Fields 1107 specify the version of PED 1013 and that the data item following TY Field 1107 is a PED 1013.

Three Fields are identical to their equivalents in PED 30303: LN Field 30307 specifies the location of the last NTE in Name Table 305 associated with PED 1013, SIP Field 30309 specifies the S-interpeter used by SINs in Procedures 1016 sharing PED 1013, and SDPP Field 30313 contains a pointer whose resolution yields the location of static data used by an execution of a Procedure 1016 sharing PED 1013.

PBP__PTR Field 1115 contains a resolved object-relative pointer specifying PBP for Procedures 1016 sharing PED 1013.

NTP__PTR Field 1117 contains a resolved object-relative pointer specifying NTP, the beginning of Name Table 305 for Procedures 1016 sharing Ped 1013.

The effects of the changes to Procedure Objects 00608 of CS 10110 in Procedure Objects 1016 may be summarized as follows: First, the addition of ADS Field 1015 makes it possible to allocate local storage for a Procedure 1016 without reference to Procedure 1016's Terminal Entry Descriptor 1101. Second, the AIA for a Procedure 1016 may be located from Terminal Entry Descriptor 1101 instead of from Header 1003. Third, a Procedure 1016's Entry Descriptor 1101 is located at the Gate for that Procedure 1016. The effect of all of these changes is to reduce the number of memory references required to perform a CALL SIN in the present invention.

b. MAS Frame 1201

Figure 12:
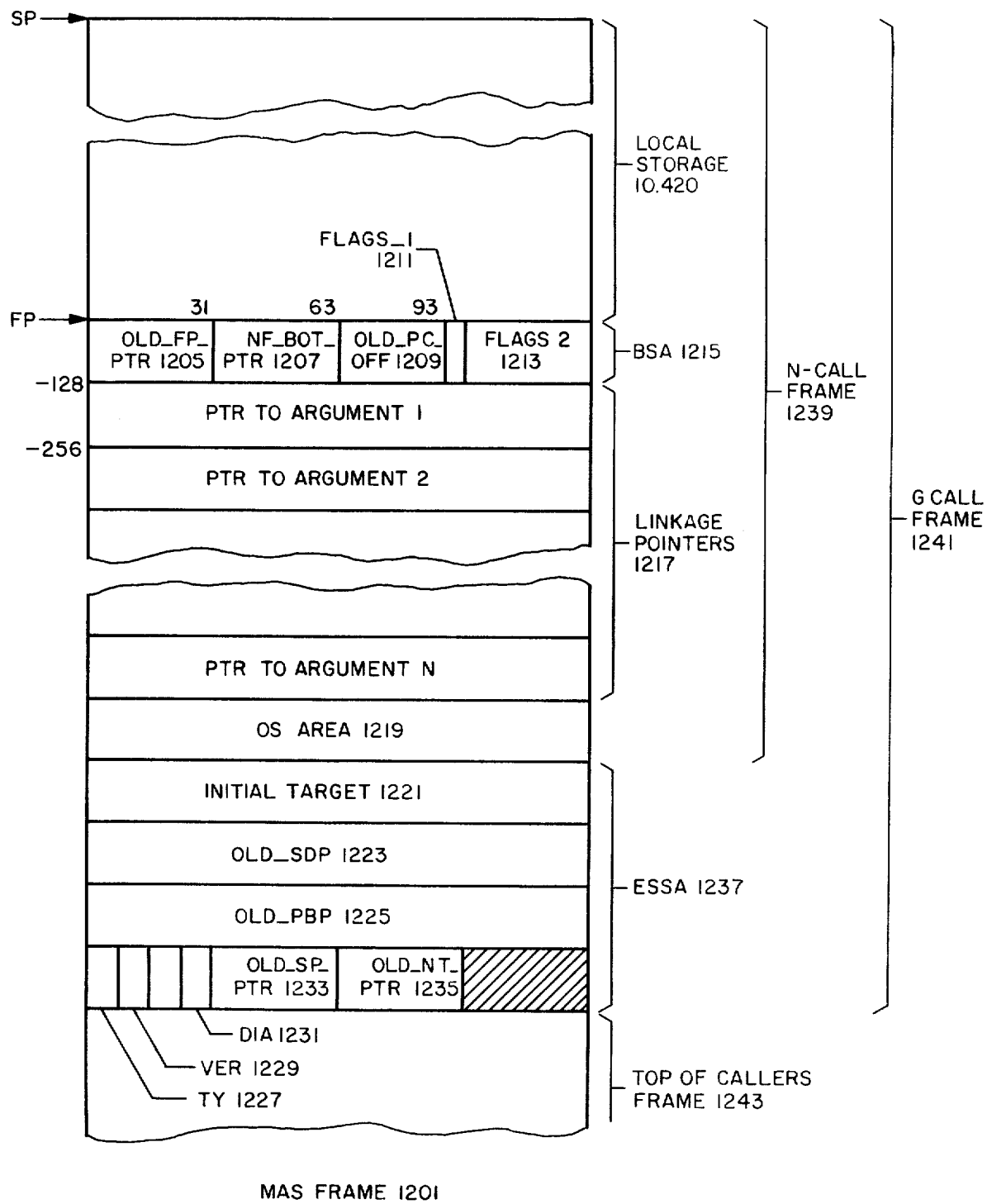
FIG. 12 is a diagram of macrostack frames in the present invention.

In CS 10110 and in the present invention, each execution of a Procedure has associated with it a frame in a MAS Object 46703. MAS Frame 46709 of CS 10110 is illustrated in FIG. 469 of U.S. patent application Ser. No. 266,539 and described in Section 4.E.d.2.c.c; FIG. 12 illustrates MAS Frame 1201 of the present invention. Like MAS Frames 46709, MAS Frame 1201 contains an area for local storage, an area for linkage pointers for arguments, and areas for information used during execution of a Return SIN. However, the complexity of the latter areas has been greatly reduced.

A MAS Frame 1201 may be either an NCALL Frame 1239 or a GCALL Frame 1241. NCALL Frames 1239 are produced by the execution of NCALL and NCALLN SINs; GCALL Frames 1241 are produced by the execution of GCALL SINs. As may be seen from FIG. 12, a GCALL Frame 1241 has the same fields as an NCALL Frame 1239, and in addition contains ESSA 1237. Beginning at the top of NCALL Frame 1239, there is Local Storage 10420, containing storage used for variables contained in Procedure 1016 called by the Call SIN. Next comes Basic State Area (BSA) 1215, which identifies the kind of Call SIN which created MAS Frame 1201 and contains the state required for a return to a calling Procedure 1016 which shares a PED 1013 with the called Procedure 1016. BSA 1215 has the following fields:

OLD__FP__PTR Field 1205 contains an object-relative pointer specifying the location of FP in MAS Frame 1201 belonging to calling Procedure 1016.

NF__BOT__PTR Field 1207 contains an object-relative pointer specifying the bottom of OS Area 1219 in MAS Frame 1201. In NCALL Frames 1239, this is the bottom of MAS Frame 1201; in GCALL Frames 1241, it is the top of ESSA 1237.

OLD__PC__OFF Field 1207 contains the offset from PBP of the SIN at which calling Procedure 1016 is to resume execution. This Field is 30 bits long.

Flags__1 Field 1211 and Flags__2 Field 1213 contain flags set by the Call SINs and used by the Return SIN to determine the kind of Call SIN which made MAS Frame 1201. These flags will be explained in more detail below.

Flags__1 Field 1211 contains two bits. The left bit specifies when set that Flags__2 Field 1213 is being used in this MAS Frame 1201. The right bit specifies the kind of MAS Frame 1201. If the bit is set, MAS Frame 1201 is a GCALL Frame 1241; otherwise, MAS Frame 1201 is an NCALL Frame 1239. NCALL sets these two bits to 00 and GCALL and microcode-to-software cell sets them to 11. In Flags__2 Field 1213, four bits are important for this discussion. The bits are numbered from the left, with the leftmost bit as bit 0:

- Bit 27, Microcode-to-software Call Flag; When this bit is set, the call which created GCALL Frame 1241 was a microcode-to-software call.
- Bit 28, Cross Domain Entry Flag: When this bit is set, the call which created GCALL Frame 1241 was the first of a sequence of calls to Procedures 1016 having the same Domain of Execution.
- Bit 29, Cross Domain Exit Flag: When this bit is set, the call which created GCALL Frame 1241 was the last of a sequence of calls to Procedures 1016 having the same Domain of Execution.
- Bit 30: Non-local GOTO Flag: Non-local GOTOs are explained in detail in U.S patent application Ser. No. 266,539 4.E.d.8.b.b. When this bit is set, it indicates that a non-local GOTO involving this MAS Frame 1201 is currently being executed.

The next portion of MAS Frame 1201 is Linkage Pointers 1217. There is one linkage pointer in Linkage Pointers 1217 for each Name specifying an argument in the Call SIN which created MAS Frame 1201. The Call SINs reverse the order of arguments in the high-level langauge procedure invocations corresponding to the Call SINs, and when the Call SIN creates MAS Frame 1201, it places the linkage pointer to the argument corresponding to the first Name specifying an argument in the Call SIN immediately above OS Area 1219, the next linkage pointer above the first and so on. Consequently, the order of argument pointers in Linkage Pointers 1217 relative to FP corresponds to the order of arguments in the high-level langauge procedure invocation corresponding to the Call SIN.

OS Area 1219 contains offsets from FP of information used by KOS to handle non-local GOTOs and conditions. These offsets correspond to Catch List Off 46927, Clean Up List Off 46925, and Frame Top Off 46921 of FIG. 469. For details, see the description of these fields in U.S. patent application Ser. No. 266,539 4.E.d.1.c.c.

Extended State Save Area (ESSA) 1237 is present only in GCALL Frames 1241. It contains the additional saved state required for returns from Procedures 1016 called by GCALL SINs. Initial Target Field 1221 contains a copy of the resolved pointer to called Procedure 1016 obtained from the evaluation of n1 in the GCALL SIN. It is present in GCALL Frame 1241 to enable a debugger to determine which Procedure 1016 was called by the GCALL SIN which produced GCALL Frame 1241. The remaining fields in ESSA 1237 contain saved state from the execution of calling Procedure 1016:

- OLD_SDP Field 1223 contains a resolved pointer specifying SDP for the execution of calling Procedure 1016.
- OLD_PBP Field 1225 contains a resolved pointer specifying PBP for the execution of calling Procedure 1016.
- TY Field 1227 indicates that the area following it is an ESSA 1237, and Ver Field 1229 indicates the version of ESSA 1237.
- DIA 1231 is an integer which corresponds to a value of SIP 30309 and specifies the S-language required by calling Procedure 1016's SINs.
- OLD_SP_PTR 1233 is a resolved object-relative pointer specifying the location of the topmost bit in calling Procedure 1016's MAS Frame 1201.
- OLD_NT_PTR, finally, is a resolved object-relative pointer specifying the location of Procedure 1016's Name Table 305.

The chief difference between MAS Frame 1201 of the present invention and MAS Frame 46709 of CS 10110 are the following: the information required to return from a NCALL or NCALLN has been separated from the information required to return from GCALL; the kind of MAS Frame 1201 and the kind of Call SIN which created it are specified by flags in BSA 1217; NCALL Frames 1239 and GCALL Frames 1241 are identical execept for the presence of ESSA 1237 in the latter.

4. Operation of the NCALL and NCALLN SINs

When a Call is made by an NCALL or NCALLN SIN, the following operations are performed by the FU 10120 microcode which interprets these SINs:

- The current PC, current FP, current PBP, and current SP are saved in FU 10120 registers.
- The number of arguments in the Call is obtained from OM Field 705 of SOP 701.
- The next Operand Syllable 707 is parsed. In the case of NCALL, Operand Syllable 707 is an I-stream Literal 709. Its value is multiplied by 16 and added to the current PC value, PC specifies the location of ADS Field 1015 of called Procedure 1016. In the case of NCALLN, Operand Syllable 707 is a Name specifying the location of ADS Field 1015 of Procedure 1016. The Name is resolved to obtain a descriptor for that location and PC is set from the descriptor.
- SP is incremented by SP MOD 128 and the resulting value, which is the location of the bottom of the new NCALL Frame 1239, is saved.
- OS Area 1219 is added to new MAS Frame 1201 and SP is incremented by 128.
- Beginning with the first Name representing an argument in the NCall SIN, for each Name, the Name is resolved, the resulting descriptor is converted to a pointer, the pointer is placed on NCALL Frame 1239, and SP is incremented by 128. At the end of these operations, Linkage Pointers 1217 are on new MAS FRame 1201.
- BSA 1215 is placed on NCALL Frame 1239 and SP is incremented by 128. Its Fields are set as follows: OLD_FP_PTR 1025 is set to the value of saved FP, that is, the value of FP in Caller's Frame 1243; NF_BOT_PTR 1207 is set to the saved value which specified the bottom of NCALL Frame 1239; OLD_PC_OFF 1209 is set to specify the SIN following the CALL SIN; Flags_1 1211 is set to 00.
- FP is set to the current value of SP.
- The I-stream Literal in ADS Field 1015 is parsed, its value is multiplied by 128, and that number of bits is allocated as Local Storage 10420, and SP is incremented to point to the top of Local Storage 10420.
- The first SIN of called Procedure 1016 is executed.

Since calling Procedure 1016 and called Procedure 1016 share a PED 1013, NCALL and NCALLN need not change or save NTP, PBP, SIP, or SDP.

5. Operation of the GCALL SIN

The operation of the GCALL SIN differs in four respects from that of the NCALL or NCALLN SINs: GCALL must locate a Terminal Entry Descriptor 1101 for called Procedure 1016, it must create an ESSA 1237 on called Procedure 1016's GCALL Frame 1241, and it must locate called Procedure 1016's PED 1013 and reset NTP, PBP, SIP, and SDP from values contained in called Procedure 1016's PED 1013.

After determining the number of arguments and saving FP, PC, and PBP as described for NCALL, FU 10120 microcode executing GCALL must locate Terminal Entry Descriptor 1101 for called Procedure 1016. The location of Terminal Entry Descriptor 1101 commences with the evaluation of n1 of GCALL. The evaluation of the Name yields a pointer containing the location of an Entry Descriptor 1011. If Entry Descriptor 1011 is not in the same Procedure Object 1001 as calling Procedure 1016, FU 10120 microcode first checks whether the Subject executing calling Procedure 1016 has Execute access to Procedure object 1001 containing called Procedure 1016. If not, the Call aborts. If the Subject does have Execute access, FU 10120 microcode checks the Domain of Execution Attribute of Procedure Object 1001 containing called Procedure 1016. If the Domain of Execution Attribute is different from that of Procedure Object 1001 containing calling Procedure 1016, the Call is a Cross-domain Call, described below. If the Call is not a cross-domain Call, FU Microcode examines Gate Limit Field 47203 to determine whether Entry Descriptor 1011 is a Gate. If it is not, the Call aborts. Otherwise, FU 10120 microcode executing GCALL examines TY Field 1107 to determine whether Entry Descriptor 1011 is a Terminal Entry Descriptor 1101 or an Indirect Entry Descriptor 1113. If it is the latter, FU 10120 microcode obtains the location of a linkage pointer to another Entry Descriptor 1101 from LP PTR Field 1115. It then performs a pointer resolution operation on the linkage pointer and uses the resulting resolved pointer to locate the new Entry Descriptor 1011. If Entry Descriptor 1011 is another Indirect Entry Descriptor 1113, the microcode repeats the operation just described.

If Entry Descriptor 1011 is a Terminal Entry Descriptor 1101, FU 10120 microcode begins constructing a GCALL Frame 1241. It first increments SP by SP MOD 128 and then builds ESSA 1237 as follows: It first sets TY Field 1227 and VER Field 1229 to the proper values and then saves an object-relative pointer to the top of Caller's Frame 1243 in OLD__SP__PTR 1233 and an object-relative pointer to Name Table 305 in OLD__NT__PTR 1235. Thereupon it copies current PBP into OLD__PBP 1225, current SDP into OLD__SDP 1223, and the pointer obtained from evaluating n1 of GCALL into Initial Target 1221. At the end of the operation, SP is set to point to the top of ESSA 1237. GCall then adds Linkage Pointers 1217 and BSA 1215 as described for NCALL, except that the rightmost bit of Flags 1 Field 1211 is set to 1.

This done, FU 10120 microcode uses the value in PED PTR Field 1109 of Terminal Entry Descriptor 1101 to locate PED 1013 for called Procedure 1016 and sets PBP, NTP, SIP, and SDP from PBP__PTR Field 1115, NTP__PTR Field 1117, SIP Field 30309, and SDPP Field 30313 respectively. Finally, FU 10120 microcode uses the value in CSO Field 1103 to set PC to the location of ADS Field 1015 in called Procedure 1016, fetch the I-stream Literal 709 in that field, and complete GCALL Frame 1241 as explained in the discussion of NCALL. Thereupon, FU 10120 microcode executes the first SIN of Called Procedure 1016.

On a Cross-domain Call, FU 10120 microcode first constructs ESSA 1237, Linkage Pointers 1217, and BSA 1215 as described above. In BSA 1215, the rightmost bit of Flags__1 is set to 1 and bit 29 of Flags 2 is set to 1, indicating a cross-domain exit. Then it stores a resolved UID Pointer to the top of BSA 1215 in Secure Stack Object 10336. The next step is examining AIA__PTR Field 1111 of Terminal Entry Descriptor 1111 to see whether an AIA Array for Procedure 1016 is present in Argument Information Arrays 1017. If it is, FU 10120 GCALL microcode performs a Trojan Horse Argument Check, as described in U.S. patent application Ser. No. 266,539 4.E.d.5.e.e. Then KOS microcode invoked by GCALL locates MAS Object 46703 belonging to the domain specified by the Domain of Execution Attribute of Procedure Object 1001 containing called Procedure 1016 and sets the SP register to the location of the top of MAS Stack 00502 in that object. The next step is to copy ESSA 1237, Linkage Pointers 1217, and BSA 1215 into that MAS Object 46703 above the location specified by SP, incrementing SP as it does so. The manner in which MAS Object 46703 is located is described in detail in U.S. patent application Ser. No. 266,539 4.E.d.5.e.e. On the copying operation, bit 28 of Flags__2 is set to 1, indicating a cross-domain entrance. After the copying operation has been completed, GCALL microcode completes the call as described above.

6. Operation of the Return SIN

The manner in which the Return SIN operates depends upon whether called Procedure 1016 was called by a NCALL or NCALLN SIN or by a GCALL SIN, and in the latter case, upon whether the call was a cross-domain call. As indicated above, the type of call which created a given MAS Frame 1201 is specified in Flags__1 Field 1211 and Flags__2 Field 1213 of BSA 1215. Consequently, the manner of operation of the Return SIN is determined by the settings of Flags__1 Field 1211 and Flags__2 Field 1213.

Beginning with returns from Procedures 1016 invoked with NCALL or NCALLN, in this case, the rightmost bit of Flags 1 Field 1211 is set to 0 and MAS Frame 1201 is an NCALL Frame 1239. Since the state specified by PED 1013 does not change on an NCALL, all that FU 10120 Return microcode which executes the Return SIN need do is set FP to the value contained in OLD__FP__PTR Field 1205, PC to the value specified in OLD__PC__OFF Field 1209, and SP to the value specified in NF__BOT__PTR 1207. Thus, at the end of the Return operation, PC specifies the SIN following the NCALL or NCALLN SIN in calling Procedure 1016 and FP specifies calling Procedure 1016's MAS Frame 1201.

In the case of non-cross-domain GCALL, the rightmost bit of Flags__1 Field 1213 is set to 1. Since calling Procedure 1016 and called Procedure 1016 do not share a PED in this case, FU 10120 Return microcode must not only restore FP, SP, and PC, but also PBP, SDP, SIP, and NTP. As shown above, the values required to do this are contained in ESSA 1237. Hence, FU 10120 Return Microcode restores FP from BSA 1215 and then uses the value in NF__BOT__PTR Field 1207 to locate ESSA 1237. Having found ESSA 1237, it restores SIP from DIA 1231, NTP from OLD__NTP__PTR 1235, PBP from OLD PBP 1225, SDP from OLD__SDP 1223, and SP from OLD__SP__PTR 1223. Then FU 10120 Return microcode restores PC by adding the value contained in OLD__PC__OFF 1209 to PBP and finishes as described above.

In the case of cross-domain GCALL, finally, the leftmost bit of Flags__1 Field 1213 is set to 1 and both bits 29 and 30 of Flags 2 Field 1213 are set to 1. In this case, FU 10120 Return microcode invokes KOS microcode, which restores SP from the value which cross-domain GCALL stored in Secure Stack Object 10336. Thereupon, the execution of the Return SIN continues as described above for returns from non-cross-domain GCALLs.

7. Summary of Improvements in Calls and Returns in the Present Invention

The improvements in calls and returns resulting from the changes in PO 1016 and MAS Frame 1201 in the present invention may be readily apprehended by comparing the description of calls and returns in U.S. patent application Ser. No. 266,539 4.E.d with the above description of the operations in the present invention. The improvements may be summarized as follows:

- The use of Entry Descriptors 1011 in Gates 1009 and the addition of AIA__PTR 1111 to Terminal Entry Descriptor 1101 have reduced the amount of time required to locate a called Procedure 1016 and determine whether a call is valid.
- The addition of ADS Field 1015 to Procedure 1016 allows NCALL and NCALLN to allocate Local Storage 10420 without reference to Terminal Entry Descriptor 1101.
- Since NCALL and NCALLN need not refer to Terminal Entry Descriptor 1101, NCALL can reset PC directly from the I-stream Literal 709 following the NCALL SOP 701 and NCALLN can reset PC after resolving nl.
- Making GCALL Frame 1241 an extension of NCALL Frame 1239 allows all Return SINs to begin in the same fashion.
- Placing flags indicating the kind of MAS Frame 1201 and the state which must be restored by a return from NCALL or NCALLN in BSA 1215 makes it possible for Return SINS in Procedures 1016 called by NCALL or NCALLN to complete the return simply by restoring state from BSA 1215.
- Placing flags indicating whether a GCALL is a cross-domain call in BSA 1215 and the state which must be restored in a non-cross-domain call makes it possible for Return SINs in Procedures 1016 called by non-cross-domain GCALL to complete the return by restoring state from BSA 1215 and ESSA 1237. Only returns from cross-domain GCALL involve SS Object 10336.

In addition, calls and returns of the present invention benefit from other improvements already discussed. In CS 10110, literal syllables in the Call SINs specified the number of arguments; in the present invention, the last 8 bits of the SOP specifies the number of arguments. In CS 10110, there was only one kind of Name, and all arguments were specified by these Names; in the present invention, arguments may be specified by either Table Names or Immediate Names. In CS 10110, finally, different Procedures 00602 could have operand syllables with different sizes, and a Mediated Call SIN therefore had to first save K, the value representing syllable size, for calling Procedure 00602, and then set K to its value for called Procedure 00602. A Return SIN had to restore calling Procedure 00602's value for K. In the present invention, all Procedures 00602 have syllables containing 16 bits, and it is no longer necessary to save, set, or restore K.

F. Linkage Pointer Encachement

In CS 10110 and the present invention, linkage pointers are pointers to items which cannot be located by means of displacements from the ABPs. Three large classes of items which are located by means of linkage pointers are arguments for a Procedure 1016, pointers to Entry Descriptors 1011 in different Procedure Objects 1001, and static data which is not located in Static Data Block 46863. As was explained with regard to FIG. 12, linkage pointers for arguments are contained in Linkage Pointers 1217 in MAS Frame 1201. Since Linkage Pointers 1217 are located below FP, Names representing argument pointers in Linkage Pointers 1217 specify negative displacements from FP. Linkage Pointers to Entry Descriptors 1011 and to static data not located in Static Data Block 46863 are similarly located at negative displacements from SDP in Static Data Block 46863, as can be seen from FIG. 468 of U.S. patent application Ser. No. 266,539. In the following discussion, the part of Static Data Block 46863 containing linkage pointers is termed Static Linkage Pointers 46865 to distinguish it from Linkage Pointers 1217 in MAS Frame 1201.

Compilers generating SINs for Computer System 10110 and the present invention do not produce SINs which specify addresses at negative displacements from SDP and FP as destinations for data. Thus, as long as a MAS Frame 1201 or a Static Data Block 46863 exists in Memory 801, the values of the linkage pointers contained therein will not change. Because linkage pointers are always located at negative offsets from SDP or FP and do not change as long as SDP or FP is valid, the values of linkage pointers may be encached in Name Translator 811. The fact that the linkage pointers do not change value means that a linkage pointer may be copied into a cache without concern for future changes in the original, and the fact that linkage pointers are located at negative offsets means that the FU 10120 microcode which maintains the cache containing the linkage pointers can detect NTEs or Immediate Names 209 specifying linkage pointers and place the values of the pointers instead of their locations in the cache.

Encachement of the values of linkage pointers in Name Translator 811 is advantageous because it allows both Immediate Names 209 specifying negative displacements from FP or SDP and Names whose NTEs specify indirect references using linkage pointers as the base location to be resolved without fetching the value of the linkage pointer from Memory 801. All that is necessary to create a descriptor for the data at the location specified by the linkage pointer's value is to add the length and type information for the data to the location specified by the encached linkage pointer value. Consequently, the resolution of such an Immediate Name 209 or Name takes no longer than the resolution of a Name or Immediate Name 209 which specifies a direct reference. When a pointer cannot be encached, on the other hand, only a descriptor for the pointer's location may be encached, and the Name Resolution operation must first fetch the pointer from the location in Memory 801 specified by the descriptor and then perform a pointer-to-descriptor conversion to obtain the descriptor for the data item represented by the Name or Immediate Name 209.

The increased efficiency offered by the encachement of linkage pointers is particularly important with regard to linkage pointers to arguments. Since the purpose of a Procedure 1016 is to process the data used as arguments to it, there will be frequent references to the arguments in Procedure 1016 and consequently many SINs containing Names specifying indirect references from the linkage pointers. Efficient resolution of these Names is thus a prerequisite to efficient execution of most Procedures 1016 in CS 10110 and the present invention.

While encachement of linkage pointers was possible in CS 10110, implementing it was difficult because Names were nothing but indexes into NTE 10350, and there was therefore neither a way of distinguishing a Name whose NTE specified a linkage pointer as a base location for the data represented by the Name from any other Name nor of determining what Names would refer to a given linkage pointer. This fact had two consequences:

Separate caches could not be employed for descriptors corresponding to linkage pointers, since Names specifying linkage pointers were not distinguishable from other Names.

There was no way of determining during the execution of a Call SIN what Names in called Procedure 1016 corresponded to the arguments; consequently, there was no way of pre-encaching descriptors corresponding to argument pointers, even though the descriptors had to be calculated as part of the execution of the Call SIN. Encachement could only occur on a miss, and at that time, the descriptor was no longer available. Name Resolve cache miss microcode therefore had to fetch the argument pointer from Memory 801 and convert it to a descriptor in order to encache it.

As will be seen in the ensuing discussion, the presence of Immediate Names 209 in the present invention solves both of these problems and greatly simplifies the encachement of linkage pointer values in the present invention.

1. Linkage Pointer Encachement in the Present Invention

As explained in the discussion of the Call and Return SINs, the position of linkage pointers relative to FP in Linkage Pointers 1217 is determined by the order of arguments in the Call SIN, and this order is in turn determined by the order of arguments in the high-level language procedure invocation corresponding to the Call SIN. In CS 10110 and the present invention, the relationship between the order of linkage pointers relative to FP and the order of arguments in the high-level language procedure invocation is the same for all invocations, regardless of the high-level language used. The order of arguments used in the high-level language procedure invocation of a given Procedure 1016 is determined by the source text for Procedure 1016 and is therefore known to the compiler when it compiles Procedure 1016. Given the order of arguments and the common formats of all MAS Frames 1201 in the present invention, the high-level language compiler can generate Immediate Names 209 for references to arguments in Procedure 1016's SINs. For example, as may be seen from FIG. 12, the linkage pointer for the first argument to a given Procedure 1016 is always at offset −256 from FP. Consequently, a reference to the first argument may always be expressed by an Immediate Name 209 with fields set as follows:

NTY 203: 00, specifying FP.
IB 205: 1, specifying an indirect reference.
32_DISP 211: −8, which, when multiplied by 32, yields −256, the offset of the linkage pointer for the first argument.

An Immediate Name 209 specifying the second argument would have fields set as described above, except that 32_DISP 211 would be set to −12, an Immediate Name 209 specifying the third argument would have 32_DISP 211 set to −16, and so forth.

While the locations of linkage pointers in MAS Frame 201 are a consequence of the manner in which Call SINs are executed in the present invention, the locations of linkage pointers in Static Data Block 46863 are directly under the control of the compilers. As explained in detail in Section 4.E.d.4 of U.S. patent application Ser. No. 266,539, the first time that a Process 00610 executes a SIN in a given Procedure Object 1001 which contains a Name specifying the SDP ABP, SDPP 30313 in PED 1013 belonging to the SIN's Procedure 1016 is resolved, and in the process of resolving SDPP 30313, a Static Data Block 46863 is created using information in Static Data Prototype 30317 specified by SDPP 30313. By convention, all compilers in CS 10110 and the present invention specify that negative offsets from SDP in Static Data Block 46863 contain Static Linkage Pointers 46865. Since the location of individual Static Linkage Pointers 46865 in Static Data Block 46863 is controlled by the compiler, the compiler can generate Immediate Names 209 as described above, but specifying SDP, for references to Procedures 1016 and data specified by Static Linkage Pointers 46865.

As explained above, Names specifying NTEs which in turn specified linkage pointers as base locations could not be differentiated from other Names in CS 10110 without reference to the NTE. In the present invention, however, Immediate Names 209 specify linkage pointers as base locations, and as described above, Immediate Names 209 which do so all contain NTY Fields 203 specifying SDP or FP, an IB Field 205 which is set to 1, and a 32_DISP Field 211 which, when multiplied by 32, specifies an offset which is evenly divisible by 128. This is thus only a single Immediate Name 209 which may specify a given Linkage pointer in a given execution of a Procedure 1016, and more important, if a linkage pointer's position relative to FP or SDP is known, it is possible to calculate its Immediate Name 209. Furthermore, an Immediate name 209 specifying a linkage pointer may be differentiated not only from Table Names 201, but also from other Immediate Names 209.

The above facts have two important consequences: First, the fact that Immediate Names 209 specifying linkage pointers may be differentiated from other Names makes it possible in the present invention to employ special cache means for linkage pointers. Second, the fact that there is only a single Immediate Name 209 which may specify a given linkage pointer in a given execution of a Procedure 1016 makes it possible to preload caches of argument pointers when a Call SIN is executed. As represented in FIG. 13, the present invention takes advantage of both these facts. FIG. 13 is a conceptual block diagram of linkage pointer encachement in the present invention. FIG. 13 has two main parts: Name Translator 811 and Memory 801. In Name Translator 811 there is shown Cache Means 1301. Cache Means 1301 is subdivided into three parts:

General Cache Entries 1303, containing information required to resolve all Table Names 201 and those Immediate Names 209 which do not specify indirect reference by means of linkage pointers.

Entries for FP-Negative Immediate Names 1305, containing argument pointers, i.e., linkage pointers at negative offsets from FP.

Entries for SDP-Negative Immediate Names 1307, containing linkage pointers at negative offsets from SDP.

Memory 801 contains MAS 00502, with Linkage Pointers, 1217, as previously described, and Static Data Block 46863, with Static Linkage Pointers 46865. As indicated by the brackets and arrows, descriptors derived from argument pointers in Linkage Pointers 1217 are encached in Entries for FP-Negative Immediate Names 1305 and descriptors derived from Static Linkage Pointers 46865 are encached in Entries for SDP-Negative Immediate Names 1307.

In the present embodiment of the present invention, cache Means 1301 corresponds to NC 10226. NC 10226 is an associative cache, and thus, the subdivision into three parts is a simple consequence of the fact that Immediate Names 209 specifying linkage pointers have the special forms described above. In other embodiments, Cache Means 1301 may in fact comprise two or more caches: General Cache Entries 1303 may be an associative cache responsive to Table Names 201 and Immediate Names 209 which do not specify indirect references involving linkage pointers, while Entries for FP-Negative Immediate Names 1305 and Entries for SDP-Negative Immediate Names 1307 may be caches addressable by 32__DISP Field 211 for Immediate Names 209 which do specify indirect references involving linkage pointers. The latter type of cache is possible in the present invention for two reasons: first, the values of NTY Field 203 and IB Field 205 in such Immediate Names 209 immediately distinguish them from other Names and distinguish such Immediate Names 209 specifying FP from such Immediate Names 209 specifying SDP. It is thus possible to construct special caches which respond only to such Immediate Names or indeed only to such Immediate Names 209 specifying SDP or those specifying FP and to present a Name simultaneously to such specialized caches and to a general associative cache. Second, 32__DISP Field 21 in such immediate Names 209 is in fact the FP or SDP-relative address of the linkage pointer. If the linkage pointers are encached in caches corresponding to Entries for FP-Negative Immediate names 1305 or Entries for SDP-Negative Immediate Names 1307 an order corresponding to their orders in Linkage Pointers 1217 or Static Linkage Pointers 46865 respectively, then 32__DISP Field 211 may serve directly as the address of the encached linkage pointer in Cache Means 1301.

In the present invention, Entries for FP-Negative Immediate Names 1305 may be preloaded by Call Microcode as part of the execution of a Call SIN. As pointed out in the discussion of the Call SINs, when a Call SIN is executed, Call microcode resolves each Name specifying an argument in the Call SIN, converts the descriptor to a pointer, and places the pointer on Linkage Pointers 1217. The descriptor corresponding to the pointer is of course the value which should be encached in Entries for FP Negative Immediate Names 1305. In CS 10110, there was no way of determining during a Call what Name in called Procedure 1016 corresponded to the argument, and thus, there was no way for Call microcode in CS 10110 to encache the descriptor in NC 10226. In the present invention, on the other hand, Call microcode can determine from an argument pointer's position in Linkage Pointers 1217 in the new MAS Frame 1201 being constructed by the Call microcode what value 32__DISP Field 211 in Immediate Names 209 referring to the argument has. Since the values of NTY Field 203 and IB Field 205 are given in Immediate Names 209 referring to argument pointers, if the value of 32__DISP Field 211 is known, the form of Immediate Name 209 in called Procedure 1016 referring to the argument is known. If, as in the present embodiment of the present invention, Cache Means 1301 is an associative cache, Call microcode may encache the descriptor corresponding to the argument pointer by constructing Immediate Name 209 corresponding to the argument pointer, using Immediate Name 209 to locate an entry in Cache Means 1301, and placing the descriptor in the entry. If entries for FP-Negative Immediate Names 1305 is a cache addressable by the value of 32__DISP Field 211, on the other hand, the descriptor may be placed directly at the proper location in Entries for FP-negative Immediate Names 1305 without constructing Immediate Name 209. In either case, preloading reduces the number of misses in Cache Means 1301 during the execution of a Procedure 1016. Furthermore, since the descriptors corresponding to the argument pointers are available during the execution of the Call SINs, preloading may be done without fetching the value of the argument pointer from Memory 801. Both the reduction in the number of misses in Cache Means 1301 and the increased efficiency of loading increase the speed with which the present invention executes Procedures 1016.

2. Implementation of Linkage Pointer Encachement in the Present Embodiment

In the present embodiment, Cache Means 1301 is implemented by means of NC 10226. A single descriptor, that corresponding to the argument pointer for the first argument of the Call SIN, is preloaded by Call microcode. Otherwise, NC 10226 is loaded as in CS 10110 by Name Resolve cache miss microcode. In the present embodiment, Name Resolve cache miss microcode examines the Name which caused the miss. If the Name is an Immediate Name 209 specifying a linkage pointer, Name Resolve cache miss microcode obtains the value of the linkage pointer from Memory 801, converts the pointer to the AON and Offset portions of a descriptor, and adds the necessary type and length information. Cache miss microcode then encaches the resulting descriptor for the argument in NC 10226. The entry RES__C__Miss in RESOLVER__TRAPS of Appendix A illustrates encachement of linkage pointers in the present invention, and the entry NCALL__END of NEIGHBORHOOD__CALL illustrates preloading. As mentioned above, other embodiments of the present invention may preload additional argument pointers and may employ special caches for linkage pointers.

The invention may be embodied in yet other specific forms without departing from the spirit or essential characteristics thereof. Thus, the present embodiments are to be considered in all respects as illustrative and not restrictive, the scope of the invention being indicated by the appended claims rather than the foregoing description, and all changes which come within the meaning and range of equivalency of the claims are therefore intended to be embraced therein.

APPENDIX A

This appendix contains the source texts for the FU 10120 microcode used to implement the present invention on the hardware of CS 10110. For a description of how to read FU 10120 microcode source tests, see Section 2.F.d of U.S. patent application Ser. No. 266,539. A detailed description of the FU 10120 microword is contained in Appendix A of U.S. Pat. Ser. No. 266,539. Taking Section 2.F.d. together with Appendix A, one skilled in the art may read the source texts in this appendix. The source texts are arranged in the order in which the inventions they implement are discussed in the Description of the Preferred Embodiment:

Microcode for Section A:
PIR_TO_DESC and DESC_TO_PTR: These implement descriptor- to-pointer and pointer-to-descriptor conversion using the pointer formats of the present invention.

Microcode for Section B:
RESOLVER_TRAPS and RESOLVER implement Name resolution and Name Cache 10226 maintenance in the present invention. The microcode resolves and evaluates Table Names 201 and Immediate Names 209, and performs these operations for Table Names 201 using NTEs 307. RESOLVER TRAPS is microcode invoked by Name Cache 10226 misses and jams, as described in U.S. Pat. Ser. No. 266,539 3.B.c.3.d.d. and e.e., and RESOLVER is microcode used by RESOLVER_TRAPS.

Microcode for Section C:
EMULATE_2400 is microcode which forces FU 10120 to read a 16-bit SOP by reading the first 8 bits of the SOP, forcing K to 8, reading the second 8 bits of the SOP, and then resetting K to 16.

Microcode for Section D:
CSL.DISP_2 and ACCUMULATION_ENTRIES are source texts for the microcode implementing the accumulator SOPs. CSL.DISP_2 specifies the dispatch table loaded into FDISP 24218 and ACCUMULATION_ENTRIES specify the actual operations of the accumulator SOPs. The discussion of SPL S-language microcode in Appendix B of U.S. Pat. Ser. No. 266,539 describes how CSL.DISP_2 and ACCUMULATION_ENTRIES may be read together.

Microcode for Section E
The microcode for Section E is the microcode which carries out the GCALL, NCALL, NCALLN, and RTN SINs. It consists of the following: CALL_Entries, containing the entries RTN, NCALL, and GCALL for those SINs, and SET UP N-CALL for NCALLN; NEIGHBORHOOD-CALL, containing the microcode for the NCALL SIN, LEVELS_S_RETURN, containing the microcode for the RTN SIN, and level-S CALL, COMMON_CALL, _CALL-STATE, and GENERATE_MACRO STATE, containing the microcode for the GCALL SIN.

Microcode for Section F
The microcode implementing linkage pointer enchachement is contained in RESOLVER TRAPS and in NCALL_END of of NEIGHBORHOOD_CALL.

```
DATA GENERAL F H P - FFICH MICROCUDE GENERATOR, REV. 6.0  (3/16/79)
 6/15/81 AT 15:34:17

INPUT FILE:   PTR_TO_DESC
OBJECT FILE:  PTR_TO_DESC.UB

LINE  NC:SOURCE 1 0  :$NO LIST
 167 0  :$INCLUDE FRUX_INCLUDES:MACROS
 168 0  :$NO LIST
 194 0  :$INCLUDE FRUX_INCLUDES:SIGNAL
 195 0  :$NO LIST
 321 0  :$INCLUDE FRUX_INCLUDES:SIGNAL_PKT.DEF
 322 0  :$NO LIST
 350 0  :$INCLUDE FRUX_INCLUDES:STACK_HEADER.DEF
 351 0  :$NO LIST
 396 0  :$LIST
 397 0  :/***********************************************************/
 398 0  :/*   PTR_TO_DESC:                                           */
 399 0  :/*       This CALLED SUBROUTINE takes the logical address of*/
 400 0  :/*       a pointer in memory and converts it to internal,   */
 401 0  :/*       "descriptor" format.                                */
 402 0  :/*                                                          */
 403 0  :/*       If the input address does not point to a pointer   */
 404 0  :/*       or the pointer to which it refers is invalid, then */
 405 0  :/*       a pointer fault is signalled.                      */
 406 0  :/*                                                          */
 407 0  :/*                                                          */
 408 0  :/*   INPUT: The address of the beginning of a pointer in    */
 409 0  :/*          callers CURRENT(7).                             */
 410 0  :/*                                                          */
 411 0  :/*   OUTPUT: The descriptor which corresponds to the log.   */
 412 0  :/*           adar. to which that pointer refers in          */
 413 0  :/*           callers CURRENT(7).                            */
 414 0  :/*                                                          */
 415 0  :/*           ACC is also loaded with the offset of the desc.*/
 416 0  :/*                                                          */
 417 0  :/*   NOTE:  If the NUM of the result descriptor is going to */
 418 0  :/*          be zero, then an offset of a7FFFFFFFu will also */
 419 0  :/*          be returned.                                    */
```

```
420 0 :/*                                                                              */
421 0 :/*                                                    G.D. 8/16/80              */
422 0 :/*      Converted to new pointer formats              G.D. 1/09/81              */
423 0 :/*                                                                              */
424 0 :/********************************************************************************/
425 0 :
426 0 :           MACRO    UID_ADDR        MEANS    CURRENT(1)           ENDMAC;
427 0 :           MACRO    PTR_OFFSET      MEANS    CURRENT(2)           ENDMAC;
428 0 :           MACRO    UID_0..15       MEANS    CURRENT(3)           ENDMAC;
429 0 :           MACRO    _UID_0..15      MEANS    CURRENT_3            ENDMAC;
430 0 :           MACRO    UID_16..47      MEANS    CURRENT(4)           ENDMAC;
431 0 :           MACRO    _UID_16..47     MEANS    CURRENT_4            ENDMAC;
432 0 :           MACRO    UID_48..79      MEANS    CURRENT(5)           ENDMAC;
433 0 :           MACRO    _UID_48..79     MEANS    CURRENT_5            ENDMAC;
434 0 :
435 0 :           MACRO    VIA             MEANS    1                    ENDMAC;
436 0 :
437 0 :ENTRY PTR_TO_DESC:
438 0 :           READ TO ACCUMULATOR USING DESCRIPTOR PREVIOUS(7),
439 0 :           LOAD_ADN (CURRENT(7)) WITH 0,           CON_LENGTH(32);
440 0 :
441 0 :ENTRY READ_STARTED:
442 0 :           OFF_ALU_OUT = ACC XOR CON_80000000,
443 0 :           LOAD_OFF (PTR_OFFSET) WITH OFFSET,
444 0 :           CASE ON ACC_BYTE(0)  MASK 9800 ROTATE(1);
445 0 :
446 0 :/* 0 - Intra Object Pointer */
447 0 :           DISABLE_ADN_WRITE,
448 0 :           OFF_ALU_OUT = ACC OR CON_0,
449 0 :           LOAD_OFF (PREVIOUS(7)) WITH OFFSET,
450 0 :           RETURN;
451 0 :
452 0 :/* 1 - General Pointer */
453 0 :           READ TO ACCUMULATOR USING OFF_ALU WITH PREVIOUS(7)
454 0 :                   CON_LENGTH(32),
455 0 :           OFF_ALU_OUT = BIASED_LENGTH PLUS PREVIOUS(7),
456 0 :           LOAD_ADN(UID_ADDR) WITH ADN(PREVIOUS(7)),
457 0 :           LOAD_OFF(UID_ADDR) WITH OFFSET;
458 0 :
459 0 :           OFF_ALU_OUT = ZERO OR PTR_OFFSET,
460 0 :           LOAD_OFF(PREVIOUS(7)) WITH OFFSET,
461 0 :           LOAD_ADN(PREVIOUS(7)) WITH 0;
462 0 :
463 0 :           OFF_ALU_OUT = ACC OR CON_0,              /* UID 0..15 */
464 0 :           SOURCE(OFF_ALU_DATA) TO JPD_BUS(DATA_TRAP),
465 0 :           LOAD_LEN (CURRENT(7)) WITH OFF,
466 0 :           LOAD_OFF (CURRENT(7)) WITH ADN(CON_0),
467 0 :           CASE ON ACC_BYTE(1) MASK #810 ROTATE(1);
468 0 :
469 0 :/* 00 - UID Pointer */
470 0 :           OFF_ALU_OUT = ZERO OR ACC_HI,
471 0 :           IF OFF_EQ_0 THEN GOTO UID_PTR;
472 0 :
473 0 :/* 80 - Associated UID pointer */
474 0 :           OFF_ALU_OUT = ONE LEFT_SHIFTED(7) XOR ACC_HI,
475 0 :           IF OFF_EQ_0 THEN GOTO ASSOC_UID;
476 0 :
477 0 :/* 01 - Intra Object Pointer */
478 0 :           LOAD_ADN(PREVIOUS(7)) WITH ADN(UID_ADDR),
479 0 :           OFF_ALU_OUT = ONE XOR ACC_HI,
480 0 :           IF OFF_EQ_0 THEN GOTO INTRA_OBJECT;
481 0 :
482 0 :/* 81 - Associated Intra Object Pointer */
483 0 :           OFF_ALU_OUT = LIT16(8181) XOR ACC_HI,
484 0 :           LOAD (ACCUMULATOR) WITH OFFSET;
485 0 :
486 0 :           OFF_ALU_OUT = ACC OR CON_0,
487 0 :           IF OFF_EQ_0 THEN GOTO ASSOC_INTRA_OBJECT;
488 0 :
489 0 :           /* Back up UID_ADDR to address the first bit in the pointer
490 0C:           so the signal will pass out the correct data. */
491 0 :           OFF_ALU_OUT = BIASED_LENGTH CON_LENGTH(32) REV_MINUS UID_ADDR,
```

```
492 0 :          LOAD_OFF(CURRENT(7)) WITH OFFSET,
493 0 :          LOAD_AON(CURRENT(7)) WITH AON(UID_ADDR),
494 0 :          LONG_CALL SUPPORT*SAVE_ACC_AND_TRAPS;
495 0 :
496 0 :          SIGNAL_NO_POP(POINTER_FAULT,CURRENT(7),RETURNABLE);
497 0 :
498 0 :RETURN_FROM_SIGNAL:
499 0 :          LOAD_AON(UID_ADDR) WITH 0,
500 0 :          LONG_CALL SUPPORT*RESTORE_ACC_AND_TRAPS;
501 0 :
502 0 :          OFF_ALU_OUT = ONE LEFT_SHIFTED(7) REV_MINUS SP,
503 0 :          LOAD_AON(CURRENT(7)) WITH AON(SP),
504 0 :          LOAD_OFF(CURRENT(7)) WITH OFFSET,
505 0 :          LONG_CALL PTR_TO_DESC;              /* retry after signal */
506 0 :
507 0 :          COPY(PREVIOUS(7),CURRENT(7)),
508 0 :          LOAD(ACCUMULATOR) WITH OFFSET;
509 0 :
510 0 :          /* Get old SP offset from signal packet where it was
511 0C:          put by the return path of invoke_signaller. */
512 0 :          READ TO CURRENT_7 USING OFF_ALU WITH SP CON_LENGTH(32),
513 0 :          OFF_ALU_OUT = LIT16(SIGNAL_PKT.BK_SP) REV_MINUS SP;
514 0 :
515 0 :          /* Pop the signal packet off the stack. */
516 0 :          OFF_ALU_OUT = BIASED_LENGTH CON_LENGTH(0) OR CURRENT(7),
517 0 :          LOAD_OFF(SP) WITH OFFSET,
518 0 :          DISABLE_AON_WRITE,
519 0 :          RETURN;
520 0 :
521 0 :INTRA_OBJECT:
522 0 :          OFF_ALU_OUT = ZERO OR PREVIOUS(7),
523 0 :          LOAD (ACCUMULATOR) WITH OFFSET,
524 0 :          LOAD_AON(UID_ADDR) WITH 0,
525 0 :          RETURN;
526 0 :
527 0 :
528 0 :UID_PIP:
529 0 :          READ TO ACCUMULATOR USING OFF_ALU, CON_LENGTH(32),
530 0 :          OFF_ALU_OUT = BIASED_LENGTH PLUS UID_ADDR;
531 0 :
532 0 :          READ TO CURRENT_6 USING OFF_ALU CON_LENGTH(32),
533 0 :          OFF_ALU_OUT = LIT16(64) PLUS UID_ADDR,
534 0 :          LOAD_AON(UID_ADDR) WITH 0;
535 0 :
536 0 :          SET_MON_MASK,
537 0 :          OFF_ALU_OUT = ACC OR CURRENT(7),
538 0 :          LOAD_LEN (CURRENT(7)) WITH OFF,
539 0 :          LOAD(ACCUMULATOR) WITH JPD(LEN(CURRENT(7))),
540 0 :          LOAD_OFF(CURRENT(7)) WITH JPD(LEN(CURRENT(7))),
541 0 :          LONG_CALL AON_UID*UID_TO_AON;
542 0 :
543 0 :          CLR_MON_MASK,
544 0 :          LOAD_AON (PREVIOUS(7)) WITH AON (CURRENT(7)),
545 0 :          IF AON_EQ_0 THEN GOTO UID_ZERO;
546 0 :
547 0 :          LOAD_AON (CURRENT(7)) WITH 0,
548 0 :          OFF_ALU_OUT = ZERO OR PREVIOUS(7),
549 0 :          LOAD (ACCUMULATOR) WITH OFFSET,
550 0 :          RETURN;
551 0 :
552 0 :UID_ZERO:
553 0 :          OFF_ALU_OUT = ONE REV_MINUS CON_80000000,
554 0 :          LOAD_OFF (PREVIOUS(7)) WITH OFFSET,
555 0 :          LOAD (ACCUMULATOR) WITH OFFSET,
556 0 :          LOAD_AON (PREVIOUS(7)) WITH 0,
557 0 :          RETURN;
558 0 :
559 0 :$PAGE
560 0 :ASSOC_INTRA_OBJECT:              /* convert AON to UID */
561 0 :          SET_MON_MASK,
562 0 :          LOAD(ACCUMULATOR) WITH AON(UID_ADDR),
563 0 :          LONG_CALL AON_UID*AON_TO_UID;
564 0 :
```

```
565 0 :          CLR_MON_MASK,
566 0 :          OFF_ALU_OUT = ZERO OR CURRENT(7),
567 0 :          LOAD_OFF(UID_0..15) WITH OFFSET,
568 0 :          LOAD_AON(UID_0..15) WITH 0;
569 0 :
570 0 :          OFF_ALU_OUT = ZERO OR CURRENT(6),
571 0 :          LOAD_OFF (UID_16..47) WITH OFFSET,
572 0 :          LOAD_AON (UID_16..47) WITH 0,
573 0 :          LONG_GOTO ASSOC_SEARCH;
574 0 :
575 0 :
576 0 :ASSOC_UID:                        /* fetch the UID */
577 0 :          READ TO _UID_0..15 USING OFF_ALU CON_LENGTH(16) FILL(RIGHT,ZERO)
578 0 :          OFF_ALU_OUT = LIT16(16) PLUS UID_ADDR;
579 0 :
580 0 :          READ TO _UID_16..47 USING OFF_ALU, CON_LENGTH(32),
581 0 :          OFF_ALU_OUT = LIT16(32) PLUS UID_ADDR;
582 0 :
583 0 :          READ TO _UID_48..79 USING OFF_ALU CON_LENGTH(32),
584 0 :          OFF_ALU_OUT = LIT16(64) PLUS UID_ADDR;
585 0 :
586 0 :
587 0 :ASSOC_SEARCH:
588 0 :
589 0 :          /* get address of assoc addr table */
590 0 :
591 0 :          OFF_ALU_OUT = LIT16(STACK_HEADER.SDLP) OR CON_0,
592 0 :          LOAD_OFF (CURRENT(7)) WITH OFFSET;
593 0 :
594 0 :          LOAD_AON (CURRENT(7)) WITH AON (SIP),
595 0 :          LONG_CALL PTR_TO_DESC; /* this better not be an AAT pointer */
596 0 :
597 0 :          LONG_CALL AAT_LOOKUP*AAT_LOOKUP;
598 0 :
599 0 :          WITH CURRENT(7),
600 0 :          IF LEN_NE_0 THEN GOTO FOUND_ENTRY;
601 0 :
602 0 :          /* Back up UID_ADDR to point to beginning of pointer so signal
603 0C:          will pass out correct parameter. */
604 0 :          OFF_ALU_OUT = BIASED_LENGTH CON_LENGTH(32) REV_MINUS UID_ADDR,
605 0 :          LOAD_OFF(CURRENT(7)) WITH OFFSET,
606 0 :          LOAD_AON(CURRENT(7)) WITH AON(UID_ADDR),
607 0 :          LONG_CALL SUPPORT*SAVE_ACC_AND_TRAPS;
608 0 :
609 0 :          SIGNAL_NO_POP(NO_ASSOCIATED_ADDRESS,CURRENT(7),RETURNABLE);
610 0 :
611 0 :          LOAD_AON(CURRENT(7)) WITH 0,
612 0 :          LONG_GOTO RETURN_FROM_SIGNAL;
613 0 :
614 0 :FOUND_ENTRY:
615 0 :          COPY(PREVIOUS(7),CURRENT(7)),
616 0 :          LONG_GOTO PTR_TO_DESC;
NPUT FILE:  ?21.I_FILE1A
BJECT FILE: PTR_TO_DESC.OB

INE N :SOURCE 437 0 : ENTRY PTR_TO_DESC :
438 0 : READ TO ACCUMULATOR USING DESCRIPTOR PREVIOUS ( 7 ) ,
  M 0 : mem 1    md 1    db_ctrl 0   src_frame 3 , r_source 7 ,
439 0 : LOAD_AON ( CURRENT ( 7 ) ) WITH 0 , CON_LENGTH ( 32 )
  M 0 : dest_frame 0 , r_dest 7 , r_w 1   a_in    0 , len_ctrl 6
439 0 : ;
441 0 : ENTRY READ_STARTED :
442 0 : OFF_ALU_OUT = ACC XOR COMMON ( aca , 3 ) ,
  M 0 :    alu_in 2   alu_op 4   src_frame 2 , r_source 3 , com_ext aca ,
443 0 : LOAD_OFF ( CURRENT ( 2 ) ) WITH OFFSET ,
  M 0 : dest_frame 0 , r_dest 2 , r_w 1   o_in    3 ,
444 0 : CASE ON ACC_BYTE ( 0 ) MASK a80a ROTATE ( 1 )
  M 0 : nac 3    src 4    mask  a80a sc 6
444 0 : ;
447 0 : DISABLE_AON_WRT ,
```

```
  M 0 :  rand 8  ,
448 0 :  OFF_ALU_OUT = ACC OR COMMON ( 981a , 0 ) ,
  M 0 :     alu_in 2  alu_op 5  src_frame 2 , r_source 0 , com_ext 98a  ,
449 0 :  LOAD_OFF ( PREVIOUS ( 7 ) ) WITH OFFSET ,
  M 0 :  dest_frame 3 , r_dest 7 , r_w 1  o_in  3  ,
450 0 :  RETURN
  M 0 :  nac 2
450 0 :  ;
453 0 :  READ TO ACCUMULATOR USING OFF_ALU WITH PREVIOUS ( 7 )
  M 0 :  mem 1   nd 1   do_ctrl 1   src_frame 3 , r_source 7
454 0 :  COM_LENGTH ( 32 ) ,
  M 0 :  len_ctrl 6  ,
455 0 :  OFF_ALU_OUT = BIASED_LENGTH PLUS PREVIOUS ( 7 ) ,
  M 0 :     alu_in 1  alu_op 3  src_frame 3 , r_source 7  ,
456 0 :  LOAD_AUN ( CURRENT ( 1 ) ) WITH AON ( PREVIOUS ( 7 ) ) ,
  M 0 :  dest_frame 0 , r_dest 1 , r_w 1  a_in  2 , src_frame
  M 0 :  3 , r_source 7   ,
457 0 :  LOAD_OFF ( CURRENT ( 1 ) ) WITH OFFSET
  M 0 :  dest_frame 0 , r_dest 1 , r_w 1  o_in   3
457 0 :  ;
459 0 :  OFF_ALU_OUT = ZERO OR CURRENT ( 2 ) ,
  M 0 :     alu_in 2 , rand 2  alu_op 5  src_frame 0 , r_source 2  ,
460 0 :  LOAD_OFF ( PREVIOUS ( 7 ) ) WITH OFFSET ,
  M 0 :  dest_frame 3 , r_dest 7 , r_w 1  o_in   3  ,
461 0 :  LOAD_AUN ( PREVIOUS ( 7 ) ) WITH 0
  M 0 :  dest_frame 3 , r_dest 7 , r_w 1  a_in   0
461 0 :  ;
463 0 :  OFF_ALU_OUT = ACC OR COMMON ( 98a , 0 ) ,
  M 0 :     alu_in 2  alu_op 5  src_frame 2 , r_source 0 , com_ext 98a  ,
464 0 :  SOURCE ( OFF_ALU_DATA ) TO IPD_BUS ( DATA_TRAP ) ,
  M 0 :  ipd_ctrl 7   dev_cmd 29  ,
465 0 :  LOAD_LEN ( CURRENT ( 7 ) ) WITH OFF ,
  M 0 :  dest_frame 0 , r_dest 7 , r_w 1  l_in  3 , ob_ctrl 1  ,
466 0 :  LOAD_OFF ( CURRENT ( 7 ) ) WITH AON ( COMMON ( 98a , 0 ) ) ,
  M 0 :  dest_frame 0 , r_dest 7 , r_w 1  o_in  2 , src_frame
  M 0 :  2 , r_source 0 , com_ext 98a   ,
467 0 :  CASE ON ACC_BYTE ( 1 ) MASK 981a ROTATE ( 1 )
  M 0 :  nac 3  src 5   mask 981a sc 6
467 0 :  ;
470 0 :  OFF_ALU_OUT = ZERO OR ACC_HI ,
  M 0 :     alu_in 2 , rand 2  alu_op 5   dev_cmd 1  ,
471 0 :  IF OFF_EQ_0 THEN GOTO UID_PTR
  M 0 :  test  6 , polarity 0   nac 4 , lit8 UID_PTR
471 0 :  ;
474 0 :  OFF_ALU_OUT = ONE LEFT_SHIFTED ( 7 ) XOR ACC_HI ,
  M 0 :     alu_in 2 , rand 3  sf 7  alu_op 4  dev_cmd 1  ,
475 0 :  IF OFF_EQ_0 THEN GOTO ASSOC_UID
  M 0 :  test  6 , polarity 0   nac 4 , lit8 ASSOC_UID
475 0 :  ;
478 0 :  LOAD_AUN ( PREVIOUS ( 7 ) ) WITH AON ( CURRENT ( 1 ) ) ,
  M 0 :  dest_frame 3 , r_dest 7 , r_w 1  a_in  2 , src_frame
  M 0 :  0 , r_source 1   ,
479 0 :  OFF_ALU_OUT = ONE XOR ACC_HI ,
  M 0 :     alu_in 2 , rand 3  alu_op 4  dev_cmd 1  ,
480 0 :  IF OFF_EQ_0 THEN GOTO INTRA_OBJECT
  M 0 :  test  6 , polarity 0   nac 4 , lit8 INTRA_OBJECT
480 0 :  ;
483 0 :  OFF_ALU_OUT = LIT16 ( 981a ) XOR ACC_HI ,
  M 0 :     alu_in 3 , 1 0 , lit16 981a   alu_op 4  dev_cmd 1  ,
484 0 :  LOAD ( ACCUMULATOR ) WITH OFFSET
  M 0 :  a_w 1 , o_in   3
484 0 :  ;
486 0 :  OFF_ALU_OUT = ACC OR COMMON ( 98a , 0 ) ,
  M 0 :     alu_in 2  alu_op 5  src_frame 2 , r_source 0 , com_ext 98a  ,
487 0 :  IF OFF_EQ_0 THEN GOTO ASSOC_INTRA_OBJ
  M 0 :  test  6 , polarity 0   nac 4 , lit8 ASSOC_INTRA_OBJ
487 0 :  ;
491 0 :  OFF_ALU_OUT = BIASED_LENGTH COM_LENGTH ( 32 ) REV_MINUS
491 0 :  CURRENT ( 1 ) ,
  M 0 :  alu_in 1  len_ctrl 6   alu_op 1  src_frame 0 , r_source 1  ,
492 0 :  LOAD_OFF ( CURRENT ( 7 ) ) WITH OFFSET ,
  M 0 :  dest_frame 0 , r_dest 7 , r_w 1  o_in   3  ,
493 0 :  LOAD_AUN ( CURRENT ( 7 ) ) WITH AON ( CURRENT ( 1 ) ) ,
```

```
 M 0 : dest_frame 0 , r_dest 7 , r_w 1  a_in   2 , src_frame
 M 0 : 0 , r_source 1 ,
494 0 : LONG_CALL SUPPORT * SAVE_ACC_AND_TR
 M 0 : nac 7 , lit14  SUPPORT * SAVE_ACC_AND_TR
494 0 : ;
496 0 : INDIVISIBLE , OFF_ALU_OUT = LIT16 ( »8122» ) OR COMMON
496 0 : ( 0 , 2 ) , LOAD_OFF ( COMMON ( 0 , 3 ) )
 M 0 : rand 15 ,  alu_in 3 , 1 0 , lit16 »8122»  alu_op
 M 0 : 5  src_frame 2 , r_source 2 , com_ext 0 , dest_frame
 M 0 : 2 , r_dest 3 , com_ext 0 , r_w 1  o_in
496 0 : WITH OFFSET , LOAD_LEN ( COMMON ( 0 , 3 ) ) WITH
496 0 : LITERAL ( CON_LENGTH ( 0 ) ) , LOAD_AON ( COMMON ( 0 , 3 ) )
 M 0 : 3 , dest_frame 2 , r_dest 5 , com_ext 0 , r_w 1
 M 0 : l_in 1 , len_ctrl 0    , dest_frame 2 , r_dest
 M 0 : 5 , com_ext 0 , r_w 1  a_in
496 0 : WITH 0
 M 0 : 0
496 0 : ; INDIVISIBLE , OFF_ALU_OUT = BIASED_LENGTH CON_LENGTH
496 0 : ( 0 ) OR CURRENT ( 7 ) LOAD_OFF ( COMMON ( 0 , 4 ) )
 M 0 : ; rand 15 ,  alu_in 1 len_ctrl 0  alu_op 5
 M 0 : src_frame 0 , r_source 7  dest_frame 2 , r_dest 4
 M 0 : , com_ext 0 , r_w 1  o_in
496 0 : WITH OFFSET , LOAD_AON ( COMMON ( 0 , 4 ) ) WITH
496 0 : AON ( CURRENT ( 7 ) ) LONG_CALL INVOKE_SIGNALLE *
 M 0 : 3 , dest_frame 2 , r_dest 4 , com_ext 0 , r_w 1
 M 0 : a_in  2 , src_frame 0 , r_source 7   nac 7 , lit14
 M 0 : INVOKE_SIGNALLE *
496 0 : INVOKE_SIGNALLE
496 0 : ;
498 0 : RETURN_FROM_SIG :
499 0 : LOAD_AON ( CURRENT ( 1 ) ) WITH 0 ,
 M 0 : dest_frame 0 , r_dest 1 , r_w 1  a_in   0 ,
500 0 : LONG_CALL SUPPORT * RESTORE_ACC_AND
 M 0 : nac 7 , lit14  SUPPORT * RESTORE_ACC_AND
500 0 : ;
502 0 : OFF_ALU_OUT = ONE LEFT_SHIFTED ( 7 ) REV_MINUS COMMON ( 2 , 5 ) ,
 M 0 :   alu_in 2 , rand 3 st 7  alu_op 1  src_frame 2
 M 0 : , r_source 5 , com_ext 2 ,
503 0 : LOAD_AON ( CURRENT ( 7 ) ) WITH AON ( COMMON ( 2 , 5 ) ) ,
 M 0 : dest_frame 0 , r_dest 7 , r_w 1  a_in  2 , src_frame
 M 0 : 2 , r_source 5 , com_ext 2   ,
504 0 : LOAD_OFF ( CURRENT ( 7 ) ) WITH OFFSET ,
 M 0 : dest_frame 0 , r_dest 7 , r_w 1  o_in  3 ,
505 0 : LONG_CALL PTR_TO_DESC
 M 0 : nac 7 , lit14  PTR_TO_DESC
505 0 : ;
507 0 : OFF_ALU_OUT = ZERO OR CURRENT ( 7 ) , LOAD_AON (
507 0 : PREVIOUS ( 7 ) ) WITH AON ( CURRENT ( 7 ) )
 M 0 :   alu_in 2 , rand 2  alu_op 5  src_frame 0 , r_source
 M 0 : 7 , dest_frame 3 , r_dest 7 , r_w 1  a_in  2 ,
 M 0 : src_frame 0 , r_source 7
507 0 : , LOAD_LEN ( PREVIOUS ( 7 ) ) WITH LEN ( CURRENT
507 0 : ( 7 ) ) , LOAD_OFF ( PREVIOUS ( 7 ) ) WITH
 M 0 : , dest_frame 3 , r_dest 7 , r_w 1  l_in  2 , src_frame
 M 0 : 0 , r_source 7   , dest_frame 3 , r_dest 7 , r_w 1  o_in
507 0 : OFFSET ,
 M 0 : 3 ,
508 0 : LOAD ( ACCUMULATOR ) WITH OFFSET
 M 0 : a_w 1 , o_in   3
508 0 : ;
512 0 : READ TO CURRENT_7 USING OFF_ALU WITH COMMON ( 2 ,
512 0 : 5 ) CON_LENGTH ( 32 ) ,
 M 0 : mem 1  md 15  ar_ctrl 1   src_frame 2 , r_source
 M 0 : 5 , com_ext 2  len_ctrl 6
513 0 : OFF_ALU_OUT = LIT16 ( 192 ) REV_MINUS COMMON ( 2 , 5 )
 M 0 :   alu_in 3 , 1 0 , lit16 192  alu_op 1   src_frame
 M 0 : 2 , r_source 5 , com_ext 2
513 0 : ;
516 0 : OFF_ALU_OUT = BIASED_LENGTH CON_LENGTH ( 0 ) OR CURRENT ( 7 ) ,
 M 0 :   alu_in 1 len_ctrl 0   alu_op 5  src_frame 0 , r_source 7 ,
517 0 : LOAD_OFF ( COMMON ( 2 , 5 ) ) WITH OFFSET ,
 M 0 : dest_frame 2 , r_dest 5 , com_ext 2 , r_w 1  o_in  3 ,
```

```
518 0 : DISABLE_AON_WRI ,
  M 0 :   rand 8    ,
519 0 : RETURN
  M 0 :   nac 2
519 0 : ;
521 0 : INTRA_OBJECT :
522 0 : OFF_ALU_OUT = ZERO OR PREVIOUS ( 7 ) ,
  M 0 :   alu_in 2 , rand 2  alu_op 5  src_frame 3 , r_source 7 ,
523 0 : LOAD ( ACCUMULATOR ) WITH OFFSET ,
  M 0 :   a_w 1 , o_in     3 ,
524 0 : LOAD_AON ( CURRENT ( 7 ) ) WITH 0 ,
  M 0 :   dest_frame 0 , r_dest 7 , r_w 1  a_in    0 ,
525 0 : RETURN
  M 0 :   nac 2
525 0 : ;
528 0 : UID_PTR :
529 0 : READ TO ACCUMULATOR USING OFF_ALU , CON_LENGTH ( 32 ) ,
  M 0 :   mem 1   md 1    db_ctrl 1 , len_ctrl 6    ,
530 0 : OFF_ALU_OUT = BIASED_LENGTH PLUS CURRENT ( 7 )
  M 0 :   alu_in 1  alu_op 3  src_frame 0 , r_source 7
530 0 : ;
532 0 : READ TO CURRENT_6 USING OFF_ALU CON_LENGTH ( 32 ) ,
  M 0 :   mem 1   md 14   db_ctrl 1  len_ctrl 6    ,
533 0 : OFF_ALU_OUT = LIT16 ( 64 ) PLUS CURRENT ( 7 ) ,
  M 0 :   alu_in 3 , 1 0 , lit16 64  alu_op 3  src_frame 0 , r_source 7 ,
534 0 : LOAD_AON ( CURRENT ( 7 ) ) WITH 0
  M 0 :   dest_frame 0 , r_dest 7 , r_w 1  a_in    0
534 0 : ;
536 0 : SET_AON_MASK ,
  M 0 :   dev_cmd 12  ,
537 0 : OFF_ALU_OUT = ACC OR CURRENT ( 7 ) ,
  M 0 :   alu_in 2  alu_op 5  src_frame 0 , r_source 7 ,
538 0 : LOAD_LEN ( CURRENT ( 7 ) ) WITH OFF ,
  M 0 :   dest_frame 0 , r_dest 7 , r_w 1  l_in   3 , db_ctrl 1  ,
539 0 : LOAD ( ACCUMULATOR ) WITH JPD ( LEN ( CURRENT ( 7 ) ) ) ,
  M 0 :   a_w 1 , o_in    3 , src_frame 0 , r_source 7 , jpd_ctrl 6 ,
540 0 : LOAD_OFF ( CURRENT ( 7 ) ) WITH JPD ( LEN ( CURRENT ( 7 ) ) ) ,
  M 0 :   dest_frame 0 , r_dest 7 , r_w 1  o_in   3 , src_frame
  M 0 :   0 , r_source 7 , jpd_ctrl 6  ,
541 0 : LONG_CALL AON_UID * UID_TO_AON
  M 0 :   nac 7 , lit14  AON_UID * UID_TO_AON,
541 0 : ;
543 0 : CLR_AON_MASK ,
  M 0 :   dev_cmd 73  ,
544 0 : LOAD_AON ( PREVIOUS ( 7 ) ) WITH AON ( CURRENT ( 7 ) ) ,
  M 0 :   dest_frame 3 , r_dest 7 , r_w 1  a_in   2 , src_frame
  M 0 :   0 , r_source 7    ,
545 0 : IF AON_EQ_0 THEN GOTO UID_ZERO
  M 0 :   test 4 , polarity 0  nac 4 , lit5 UID_ZERO
545 0 : ;
547 0 : LOAD_AON ( CURRENT ( 7 ) ) WITH 0 ,
  M 0 :   dest_frame 0 , r_dest 7 , r_w 1  a_in    0 ,
548 0 : OFF_ALU_OUT = ZERO OR PREVIOUS ( 7 ) ,
  M 0 :   alu_in 2 , rand 2  alu_op 5  src_frame 3 , r_source 7 ,
549 0 : LOAD ( ACCUMULATOR ) WITH OFFSET ,
  M 0 :   a_w 1 , o_in    3 ,
550 0 : RETURN
  M 0 :   nac 2
550 0 : ;
552 0 : UID_ZERO :
553 0 : OFF_ALU_OUT = ONE REV_MINUS COMMON ( @C@ , 3 ) ,
  M 0 :   alu_in 2 , rand 3  alu_op 1   src_frame 2 , r_source
  M 0 :   3 , com_ext @C@ ,
554 0 : LOAD_OFF ( PREVIOUS ( 7 ) ) WITH OFFSET ,
  M 0 :   dest_frame 3 , r_dest 7 , r_w 1  o_in   3 ,
555 0 : LOAD ( ACCUMULATOR ) WITH OFFSET ,
  M 0 :   a_w 1 , o_in    3 ,
556 0 : LOAD_AON ( PREVIOUS ( 7 ) ) WITH 0 ,
  M 0 :   dest_frame 3 , r_dest 7 , r_w 1  a_in    0 ,
557 0 : RETURN
  M 0 :   nac 2
557 0 : ;
```

```
560 0 : ASSOC_INTRA_OBJ :
561 0 : SFT_MON_MASK ,
  M 0 : dev_cmd 72 ,
562 0 : LOAD ( ACCUMULATOR ) WITH AON ( CURRENT ( 1 ) ) ,
  M 0 : a_w 1 , o_in     , src_frame 0 , r_source 1   ,
563 0 : LONG_CALL AON_UID * AON_TO_UID
  M 0 : nac 7 , lit14  AON_UID * AON_TO_UID
563 0 : ;
565 0 : CLR_MON_MASK ,
  M 0 : dev_cmd 73 ,
566 0 : OFF_ALU_OUT = ZERO OR CURRENT ( 7 ) ,
  M 0 :   alu_in 2 , rand 2  alu_op 5  src_frame 0 , r_source 7 ,
567 0 : LOAD_OFF ( CURRENT ( 3 ) ) WITH OFFSET ,
  M 0 : dest_frame 0 , r_dest 3 , r_w 1  o_in    3 ,
568 0 : LOAD_AON ( CURRENT ( 3 ) ) WITH 0
  M 0 : dest_frame 0 , r_dest 3 , r_w 1  a_in    0
568 0 : ;
570 0 : OFF_ALU_OUT = ZERO OR CURRENT ( 6 ) ,
  M 0 :   alu_in 2 , rand 2  alu_op 5  src_frame 0 , r_source 6 ,
571 0 : LOAD_OFF ( CURRENT ( 4 ) ) WITH OFFSET ,
  M 0 : dest_frame 0 , r_dest 4 , r_w 1  o_in    3 ,
572 0 : LOAD_AON ( CURRENT ( 4 ) ) WITH 0 ,
  M 0 : dest_frame 0 , r_dest 4 , r_w 1  a_in    0 ,
573 0 : LONG_GOTO ASSOC_SEARCH
  M 0 : nac 6 , lit14  ASSOC_SEARCH
573 0 : ;
576 0 : ASSOC_UID :
577 0 : READ TO CURRENT_3 USING OFF_ALU CON_LENGTH ( 16 )
577 0 : FTU ( RIGHT , ZERO )
  M 0 : mem 1   md 11   oh_ctrl 1  len_ctrl 5    rand 4
578 0 : OFF_ALU_OUT = LIT16 ( 16 ) PLUS CURRENT ( 1 )
  M 0 :   alu_in 3 , 1 0 , lit16 16   alu_op 3  src_frame 0 , r_source 1
578 0 : ;
580 0 : READ TO CURRENT_4 USING OFF_ALU , CON_LENGTH ( 32 ) ,
  M 0 : mem 1   md 12 , oh_ctrl 1 , len_ctrl 6 ,
581 0 : OFF_ALU_OUT = LIT16 ( 32 ) PLUS CURRENT ( 1 )
  M 0 :   alu_in 3 , 1 0 , lit16 32  alu_op 3  src_frame 0 , r_source 1
581 0 : ;
583 0 : READ TO CURRENT_5 USING OFF_ALU CON_LENGTH ( 32 ) ,
  M 0 : mem 1   md 13  oh_ctrl 1  len_ctrl 6    ,
584 0 : OFF_ALU_OUT = LIT16 ( 64 ) PLUS CURRENT ( 1 )
  M 0 :   alu_in 3 , 1 0 , lit16 64  alu_op 3  src_frame 0 , r_source 1
584 0 : ;
587 0 : ASSOC_SEARCH :
591 0 : OFF_ALU_OUT = LIT16 ( 544 ) OR COMMON ( @BR , 0 ) ,
  M 0 :   alu_in 3 , 1 0 , lit16 544   alu_op 5  src_frame
  M 0 : 2 , r_source 0 , com_ext @BR ,
592 0 : LOAD_OFF ( CURRENT ( 7 ) ) WITH OFFSET
  M 0 : dest_frame 0 , r_dest 7 , r_w 1  o_in    3
592 0 : ;
594 0 : LOAD_AON ( CURRENT ( 7 ) ) WITH AON ( COMMON ( 2 , 5 ) ) ,
  M 0 : dest_frame 0 , r_dest 7 , r_w 1  a_in    2 , src_frame
  M 0 : 2 , r_source 5 , com_ext 2   ,
595 0 : LONG_CALL PTR_TO_DESC
  M 0 : nac 7 , lit14  PTR_TO_DESC
595 0 : ;
597 0 : LONG_CALL AAT_LOOKUP * AAT_LOOKUP
  M 0 : nac 7 , lit14  AAT_LOOKUP * AAT_LOOKUP
597 0 : ;
599 0 : WITH CURRENT ( 7 ) ,
  M 0 :  src_frame 0 , r_source 7 ,
600 0 : IF LEN_NE_0 THEN GOTO FOUND_ENTRY
  M 0 : test E , polarity 0  nac 4 , lit6  FOUND_ENTRY
600 0 : ;
604 0 : OFF_ALU_OUT = BIASED_LENGTH CON_LENGTH ( 32 ) REV_MINUS
604 0 : CURRENT ( 1 ) ,
  M 0 : alu_in 1  len_ctrl 6    alu_op 1  src_frame 0 , r_source 1 ,
605 0 : LOAD_OFF ( CURRENT ( 7 ) ) WITH OFFSET ,
  M 0 : dest_frame 0 , r_dest 7 , r_w 1  o_in    3 ,
606 0 : LOAD_AON ( CURRENT ( 7 ) ) WITH AON ( CURRENT ( 1 ) ) ,
  M 0 : dest_frame 0 , r_dest 7 , r_w 1  a_in    2 , src_frame
  M 0 : 0 , r_source 1   ,
```

```
607 0 : LONG_CALL SUPPORT * SAVE_ACC_AND_TR
  M 0 : nac 7 , lit14  SUPPORT * SAVE_ACC_AND_TR
607 0 : ;
609 0 : INDIVISIBLE , OFF_ALU_OUT = LIT15 ( oR12C9 ) OR COMMON
609 0 : ( 0 , 2 ) , LOAD_OFF ( COMMON ( 0 , 3 ) )
  M 0 : rand 15 ,    alu_in 3 , 1 0 , lit16 oR12C9    alu_op
  M 0 : 5  src_frame 2 , r_source 2 , com_ext 0 , dest_frame
  M 0 : 2 , r_dest 3 , com_ext 0 , r_w 1  o_in
609 0 : WITH OFFSET , LOAD_LEN ( COMMON ( 0 , 3 ) ) WITH
609 0 : LITERAL ( CON_LENGTH ( 0 ) ) , LOAD_AON ( COMMON ( 0 , 3 ) )
  M 0 : 3 , dest_frame 2 , r_dest 3 , com_ext 0 , r_w 1
  M 0 : l_in   1 , len_ctrl 0    , dest_frame 2 , r_dest
  M 0 : 3 , com_ext 0 , r_w 1  a_in
609 0 : WITH 0
  M 0 :  0
609 0 : ; INDIVISIBLE , OFF_ALU_OUT = BIASED_LENGTH CON_LENGTH
609 0 : ( 0 ) OR CURRENT ( 7 ) LOAD_OFF ( COMMON ( 0 , 4 ) )
  M 0 : ; rand 15 ,    alu_in 1 len_ctrl 0    alu_op 5
  M 0 : src_frame 0 , r_source 7  dest_frame 2 , r_dest 4
  M 0 : , com_ext 0 , r_w 1  o_in
609 0 : WITH OFFSET , LOAD_AON ( COMMON ( 0 , 4 ) ) WITH
609 0 : AON ( CURRENT ( 7 ) ) LONG_CALL INVOKE_SIGNALLE *
  M 0 :  3 , dest_frame 2 , r_dest 4 , com_ext 0 , r_w 1
  M 0 :  a_in   2 , src_frame 0 , r_source 7    nac 7 , lit14
  M 0 :  INVOKE_SIGNALLE *
609 0 : INVOKE_SIGNALLE
609 0 : ;
611 0 : LOAD_AON ( CURRENT ( 7 ) ) WITH 0 ,
  M 0 : dest_frame 0 , r_dest 7 , r_w 1  a_in    0 ,
612 0 : LONG_GOTO RETURN_FROM_SIG
  M 0 : nac 6 , lit14  RETURN_FROM_SIG
612 0 : ;
614 0 : FOUND_ENTRY :
615 0 : OFF_ALU_OUT = ZERO OR CURRENT ( 7 ) , LOAD_AON (
615 0 : PREVIOUS ( 7 ) ) WITH AON ( CURRENT ( 7 ) )
  M 0 :   alu_in 2 , rand 2  alu_op 5  src_frame 0 , r_source
  M 0 : 7 , dest_frame 3 , r_dest 7 , r_w 1  a_in   2 ,
  M 0 : src_frame 0 , r_source 7
615 0 : , LOAD_LEN ( PREVIOUS ( 7 ) ) WITH LEN ( CURRENT
615 0 : ( 7 ) ) , LOAD_OFF ( PREVIOUS ( 7 ) ) WITH
  M 0 : , dest_frame 3 , r_dest 7 , r_w 1  l_in   2 , src_frame
  M 0 : 0 , r_source 7    , dest_frame 3 , r_dest 7 , r_w 1  o_in
615 0 : OFFSET ,
  M 0 : 3 ,
616 0 : LONG_GOTO PTR_TO_DESC
  M 0 : nac 6 , lit14  PTR_TO_DESC
616 0 : ;
616 0 :

COMPILATION COMPLETE, 41 STATEMENTS PROCESSED

DATA GENERAL F H P - FETCH MICROCODE GENERATOR, REV. 6.0 (3/16/79)
   6/25/81 AT 2:45:10

INPUT FILE:  DESC_TO_PTR
OBJECT FILE: DESC_TO_PTR.OB

LINE NC:SOURCE 1 0 :$NO LIST
 167 0 :$LIST
 168 0 :/********************************************************/
 169 0 :/*   DESC_TO_PTR / DESC_TO_UID_PTR                      */
 170 0 :/*                                                      */
 171 0 :/*           WRITE CURRENT(7) AT CURRENT(6)             */
 172 0 :/*                                                      */
 173 0 :/*       This CALLED SUBROUTINE takes a descriptor in a */
 174 0 :/*       callers register frame and converts it to a pointer */
 175 0 :/*       which it places in memory.                     */
 176 0 :/*                                                      */
 177 0 :/*       The memory location at which the pointer is written */
```

```
178 0 :/*         is given in another users register as a descriptor.   */
179 0 :/*         If the AON of the destination is the same as that     */
180 0 :/*         of the pointer, an intra object pointer is created,   */
181 0 :/*         otherwise a UID or NULL pointer is created.           */
182 0 :/*                                                               */
183 0 :/*         DESC_TO_UID_PTR will always write a UID pointer.      */
184 0 :/*                                                               */
185 0 :/*                                                               */
186 0 :/*   INPUT: The address of the beginning of a pointer in         */
187 0 :/*         callers CURRENT(6).                                   */
188 0 :/*         A descriptor to be made into a pointer and            */
189 0 :/*         written at the above address in CURRENT(7).           */
190 0 :/*                                                               */
191 0 :/*   OUTPUT: NONE                                                */
192 0 :/*                                                               */
193 0 :/*   NOTE:   ACC is not saved or restored                        */
194 0 :/*                                                               */
195 0 :/*                                                G.D. 8/17/80   */
196 0 :/*         Converted to new pointer formats       G.D. 1/09/81   */
197 0 :/*                                                               */
198 0 :/***************************************************************/
199 0 :
200 0 :       MACRO   TEMP        MEANS   CURRENT(0)    ENDMAC;
201 0 :       MACRO   UID_16..47  MEANS   CURRENT_6     ENDMAC ;
202 0 :       MACRO   UID_16..47  MEANS   CURRENT(6)    ENDMAC ;
203 0 :       MACRO   OUT_ADDR    MEANS   CURRENT(1)    ENDMAC ;
204 0 :
205 0 :
206 0 :ENTRY DESC_TO_PTR:
207 0 :       INDIVISIBLE,
208 0 :       OFF_ALU_OUT = BIASED_LENGTH CON_LENGTH(0) OR PREVIOUS(7),
209 0 :       SOURCE (OFF_ALU_DATA) TO JPD_BUS(DATA_TRAP),
210 0 :       LOAD_OFF (TEMP) WITH AON(PREVIOUS(7)),
211 0 :       LOAD_AON (TEMP) WITH AON(PREVIOUS(7)),
212 0 :       IF OFF_SIGN_EQ_0 THEN GOTO OFF_OK;
213 0 :
214 0 :       INDIVISIBLE,
215 0 :       OFF_ALU_OUT = LIT32(07FFFFFFFw) AND PREVIOUS(7),
216 0 :       LOAD (ACCUMULATOR) WITH OFFSET;
217 0 :
218 0 :       INDIVISIBLE,
219 0 :       OFF_ALU_OUT = ACC OR CON_0,
220 0 :       SOURCE (OFF_ALU_DATA) TO JPD_BUS(DATA_TRAP);
221 0 :
222 0 :OFF_OK:
223 0 :       INDIVISIBLE,
224 0 :       LOAD (ACCUMULATOR) WITH AON(PREVIOUS(6));
225 0 :
226 0 :       INDIVISIBLE,
227 0 :       OFF_ALU_OUT = ACC XOR TEMP,
228 0 :       LOAD_AON (TEMP) WITH OFFSET,
229 0 :       IF AON_EQ_0 THEN GOTO NULL_PTR;
230 0 :
231 0 :       INDIVISIBLE,
232 0 :       WITH TEMP,
233 0 :       LOAD_AON (TEMP) WITH 0,
234 0 :       IF AON_NE_0 THEN GOTO DESC_TO_UID_PTR;
235 0 :
236 0 :       WRITE FROM DATA_TRAP USING DESCRIPTOR PREVIOUS(6),
237 0 :       RETURN,                                    CON_LENGTH(32);
238 0 :
239 0 :
240 0 :
241 0 :ENTRY DESC_TO_UID_PTR:
242 0 :       OFF_ALU_OUT = LIT32(a8000000w) OR PREVIOUS(7),
243 0 :       LOAD_OFF (TEMP) WITH OFFSET,
244 0 :       LOAD_AON (TEMP) WITH 0;
245 0 :
246 0 :       OFF_ALU_OUT = ZERO OR TEMP,
247 0 :       SOURCE(OFF_ALU_DATA) TO JPD_BUS(DATA_TRAP);
248 0 :
249 0 :       WRITE FROM DATA_TRAP USING DESCRIPTOR PREVIOUS(6),
250 0 :                                                  CON_LENGTH(32);
```

```
251 0 :
252 0 :               LOAD (ACCUMULATOR) WITH AON(PREVIOUS(7));
253 0 :
254 0 :               /* AOIF is 256 bits wide. ACC contains the AON. */
255 0 :               INDIVISIBLE,
256 0 :               OFF_ALU_OUT = ACC LEFT_SHIFTED(2) AND CON_FFFF,
257 0 :               LOAD (ACCUMULATOR) WITH OFFSET;
258 0 :
259 0 :               /* Read UID[0:15] */
260 0 :               INDIVISIBLE,
261 0 :               READ_PHY TO ACCUMULATOR USING OFF_ALU CON_LENGTH(32),
262 0 :               OFF_ALU_OUT = ACC LEFT_SHIFTED(6) PLUS AOT_PTR,
263 0 :               LOAD_AON (AUT_ADDR) WITH AON(AOT_PTR),
264 0 :               LOAD_OFF (AUT_ADDR) WITH OFFSET;
265 0 :
266 0 :               /* Read UID[16:47] */
267 0 :               INDIVISIBLE,
268 0 :               READ_PHY TO UID_16..47 USING OFF_ALU CON_LENGTH(32),
269 0 :               OFF_ALU_OUT = LIT16(32) PLUS AOT_ADDR;
270 0 :
271 0 :               /* Pass UID[0:15] to DATA TRAP */
272 0 :               INDIVISIBLE,
273 0 :               OFF_ALU_OUT = ACC AND CON_FFFF,
274 0 :               SOURCE (OFF_ALU_DATA) TO JPD_BUS(DATA_TRAP);
275 0 :
276 0 :               /* Read UID[48:79] */
277 0 :               INDIVISIBLE,
278 0 :               READ_PHY TO ACCUMULATOR USING OFF_ALU CON_LENGTH(32),
279 0 :               OFF_ALU_OUT = LIT16(64) PLUS AOT_ADDR,
280 0 :               LOAD_AON (AUT_ADDR) WITH 0;
281 0 :
282 0 :               /* Write UID[0:15] */
283 0 :               WRITE FROM DATA_TRAP USING OFF_ALU WITH PREVIOUS(6),
284 0 :               OFF_ALU_OUT = LIT16(32) PLUS PREVIOUS(6),       CON_LENGTH(32),
285 0 :               LOAD_OFF (TEMP) WITH OFFSET,
286 0 :               LOAD_AON (TEMP) WITH AON(PREVIOUS(6));
287 0 :
288 0 :               OFF_ALU_OUT = ZERO OR UID.16..47,
289 0 :               SOURCE (OFF_ALU_DATA) TO JPD_BUS(DATA_TRAP);
290 0 :
291 0 :               /* Write UID[16:47] */
292 0 :               WRITE FROM DATA_TRAP USING OFF_ALU WITH PREVIOUS(6),
293 0 :               OFF_ALU_OUT = LIT16(64) PLUS PREVIOUS(6),       CON_LENGTH(32),
294 0 :               LOAD_OFF (TEMP) WITH OFFSET,
295 0 :               LOAD_AON (TEMP) WITH AON(PREVIOUS(6));
296 0 :
297 0 :               OFF_ALU_OUT = ACC OR CON_0,
298 0 :               SOURCE (OFF_ALU_DATA) TO JPD_BUS(DATA_TRAP);
299 0 :
300 0 :               /* Write UID[48:79] */
301 0 :               WRITE FROM DATA_TRAP USING OFF_ALU WITH TEMP,
302 0 :               OFF_ALU_OUT = BIASED_LENGTH PLUS TEMP,          CON_LENGTH(32),
303 0 :               LOAD_AON (TEMP) WITH 0,
304 0 :               RETURN;
305 0 :
306 0 :
307 0 :NULL_PTR:
308 0 :               INDIVISIBLE,
309 0 :               LOAD_AON (TEMP) WITH 0,
310 0 :               OFF_ALU_OUT = ZEROS,
311 0 :               SOURCE (OFF_ALU_DATA) TO JPD_BUS(DATA_TRAP);
312 0 :
313 0 :               WRITE FROM DATA_TRAP USING OFF_ALU WITH PREVIOUS(6),
314 0 :               OFF_ALU_OUT = BIASED_LENGTH PLUS PREVIOUS(6),   CON_LENGTH(32);
315 0 :
316 0 :               WRITE FROM DATA_TRAP USING OFF_ALU WITH PREVIOUS(6),
317 0 :               OFF_ALU_OUT = LIT16(64) PLUS PREVIOUS(6),       CON_LENGTH(32);
318 0 :
319 0 :               WRITE FROM DATA_TRAP USING OFF_ALU WITH PREVIOUS(6),
320 0 :               OFF_ALU_OUT = LIT16(96) PLUS PREVIOUS(6),       CON_LENGTH(32);
```

```
521  0 :
522  0 :         WRITE FROM OFF_ALU_DATA USING DESCRIPTOR PREVIOUS(6),
523  0 :         OFF_ALU_OUT = ONES,                              CON_LENGTH(32),
524  0 :         RETURN;
IPUT FILE:  ?13.I_FILE1A
IJECT FILE: DESC_TO_PTR.OB

INE  N :SOURCE 206  0 : ENTRY DESC_TO_PTR :
207  0 : INDIVISIBLE ,
  M  0 : rand 15 ,
208  0 : OFF_ALU_OUT = BIASED_LENGTH CON_LENGTH ( 0 ) OR PREVIOUS ( 7 ) ,
  M  0 :    alu_in 1   len_ctrl 0   alu_op 5  src_frame 3 , r_source 7 ,
209  0 : SOURCE ( OFF_ALU_DATA ) TO JPD_BUS ( DATA_TRAP ) ,
  M  0 : jpd_ctrl 7    dev_cmd 28  ,
210  0 : LOAD_OFF ( CURRENT ( 0 ) ) WITH AON ( PREVIOUS ( 7 ) ) ,
  M  0 : dest_frame 0 , r_dest 0 , r_w 1   o_in    2 , src_frame
  M  0 : 3 , r_source 7   ,
211  0 : LOAD_AON ( CURRENT ( 0 ) ) WITH AON ( PREVIOUS ( 7 ) ) ,
  M  0 : dest_frame 0 , r_dest 0 , r_w 1   a_in    2 , src_frame
  M  0 : 3 , r_source 7   ,
212  0 : IF OFF_SIGN_EQ_0 THEN GOTO OFF_OK
  M  0 : test  3 , polarity 0    nac 4 , lit8  OFF_OK
212  0 : ;
214  0 : INDIVISIBLE ,
  M  0 : rand 15 ,
215  0 : OFF_ALU_OUT = LIT32 ( a7FFFFFFFa ) AND PREVIOUS ( 7 ) ,
  M  0 :    alu_in 3 , 1 1 , lit32 a7FFFFFFFa  alu_op 6  src_frame
  M  0 : 3 , r_source 7 ,
216  0 : LOAD ( ACCUMULATOR ) WITH OFFSET
  M  0 : a_w 1 , o_in    3
216  0 : ;
218  0 : INDIVISIBLE ,
  M  0 : rand 15 ,
219  0 : OFF_ALU_OUT = ACC OR COMMON ( aBa , 0 ) ,
  M  0 :    alu_in 2  alu_op 5  src_frame 2 , r_source 0 , com_ext aBa ,
220  0 : SOURCE ( OFF_ALU_DATA ) TO JPD_BUS ( DATA_TRAP )
  M  0 : jpd_ctrl 7    dev_cmd 28
220  0 : ;
222  0 : OFF_OK :
223  0 : INDIVISIBLE ,
  M  0 : rand 15 ,
224  0 : LOAD ( ACCUMULATOR ) WITH AON ( PREVIOUS ( 6 ) )
  M  0 : a_w 1 , o_in    2 , src_frame 3 , r_source 6
224  0 : ;
226  0 : INDIVISIBLE ,
  M  0 : rand 15 ,
227  0 : OFF_ALU_OUT = ACC XOR CURRENT ( 0 ) ,
  M  0 :    alu_in 2  alu_op 4  src_frame 0 , r_source 0 ,
228  0 : LOAD_AON ( CURRENT ( 0 ) ) WITH OFFSET ,
  M  0 : dest_frame 0 , r_dest 0 , r_w 1   a_in    3 ,
229  0 : IF AON_EQ_0 THEN GOTO NULL_PTR
  M  0 : test  4 , polarity 0    nac 4 , lit8  NULL_PTR
229  0 : ;
231  0 : INDIVISIBLE ,
  M  0 : rand 15 ,
232  0 : WITH CURRENT ( 0 ) ,
  M  0 :    src_frame 0 , r_source 0 ,
233  0 : LOAD_AON ( CURRENT ( 0 ) ) WITH 0 ,
  M  0 : dest_frame 0 , r_dest 0 , r_w 1   a_in    0 ,
234  0 : IF AON_NE_0 THEN GOTO DESC_TO_UID_PTR
  M  0 : test  4 , polarity 1    nac 4 , lit8  DESC_TO_UID_PTR
234  0 : ;
236  0 : WRITE FROM DATA_TRAP USING DESCRIPTOR PREVIOUS ( 6 ) ,
  M  0 : mem 4    jpd_ctrl 0    db_ctrl 0  src_frame 3 , r_source 6 ,
237  0 : RETURN , CON_LENGTH ( 32 )
  M  0 : nac 2 , len_ctrl 6
237  0 : ;
241  0 : ENTRY DESC_TO_UID_PTR :
242  0 : OFF_ALU_OUT = LIT32 ( a80000000a ) OR PREVIOUS ( 7 ) ,
  M  0 :    alu_in 3 , 1 1 , lit32 a80000000a  alu_op 5  src_frame
```

```
    M 0 :  3 , r_source 7 ,
  243 0 :  LOAD_OFF ( CURRENT ( 0 ) ) WITH OFFSET ,
    M 0 :  dest_frame 0 , r_dest 0 , r_w 1  o_in    3 ,
  244 0 :  LOAD_AUN ( CURRENT ( 0 ) ) WITH 0
    M 0 :  dest_frame 0 , r_dest 0 , r_w 1  a_in    0
  244 0 :  ;
  246 0 :  OFF_ALU_OUT = ZERO OR CURRENT ( 0 ) ,
    M 0 :    alu_in 2 , rand 2  alu_op 5  src_frame 0 , r_source 0 ,
  247 0 :  SOURCE ( OFF_ALU_DATA ) TO IPD_BUS ( DATA_TRAP )
    M 0 :  jod_ctrl 7    dev_cmd 28
  247 0 :  ;
  249 0 :  WRITE FROM DATA_TRAP USING DESCRIPTOR PREVIOUS ( 6 ) ,
    M 0 :  mem 4   jod_ctrl 4   db_ctrl 0  src_frame 3 , r_source 6 ,
  250 0 :  CON_LENGTH ( 32 )
    M 0 :  len_ctrl 6
  250 0 :  ;
  252 0 :  LOAD ( ACCUMULATOR ) WITH ADN ( PREVIOUS ( 7 ) )
    M 0 :  a_w 1 , o_in    2 , src_frame 3 , r_source 7
  252 0 :  ;
  255 0 :  INDIVISIBLE ,
    M 0 :  rand 15 ,
  256 0 :  OFF_ALU_OUT = ACC LEFT_SHIFTED ( 2 ) AND COMMON ( aCw , 6 ) ,
    M 0 :    alu_in 2  sf 2  alu_op 6  src_frame 2 , r_source
    M 0 :  6 , com_ext aCw ,
  257 0 :  LOAD ( ACCUMULATOR ) WITH OFFSET
    M 0 :  a_w 1 , o_in    3
  257 0 :  ;
  260 0 :  INDIVISIBLE ,
    M 0 :  rand 15 ,
  261 0 :  READ_PHY TO ACCUMULATOR USING OFF_ALU CON_LENGTH ( 32 ) ,
    M 0 :  mem 3   md 1   db_ctrl 1  len_ctrl 6    ,
  262 0 :  OFF_ALU_OUT = ACC LEFT_SHIFTED ( 6 ) PLUS COMMON ( 4 , 4 ) ,
    M 0 :    alu_in 2  sf 6  alu_op 3  src_frame 2 , r_source 4 , com_ext 4 ,
  263 0 :  LOAD_AUN ( CURRENT ( 1 ) ) WITH ADN ( COMMON ( 4 , 4 ) ) ,
    M 0 :  dest_frame 0 , r_dest 1 , r_w 1  a_in    2 , src_frame
    M 0 :  2 , r_source 4 , com_ext 4
  264 0 :  LOAD_OFF ( CURRENT ( 1 ) ) WITH OFFSET
    M 0 :  dest_frame 0 , r_dest 1 , r_w 1  o_in    3
  264 0 :  ;
  267 0 :  INDIVISIBLE ,
    M 0 :  rand 15 ,
  268 0 :  READ_PHY TO CURRENT_6 USING OFF_ALU CON_LENGTH ( 32 ) ,
    M 0 :  mem 3   md 14  db_ctrl 1  len_ctrl 6    ,
  269 0 :  OFF_ALU_OUT = LIT16 ( 32 ) PLUS CURRENT ( 1 )
    M 0 :    alu_in 3 , 1 0 , lit16 32   alu_op 3  src_frame 0 , r_source 1
  269 0 :  ;
  272 0 :  INDIVISIBLE ,
    M 0 :  rand 15 ,
  273 0 :  OFF_ALU_OUT = ACC AND COMMON ( aCa , 6 ) ,
    M 0 :    alu_in 2  alu_op 6  src_frame 2 , r_source 6 , com_ext aCa ,
  274 0 :  SOURCE ( OFF_ALU_DATA ) TO IPD_BUS ( DATA_TRAP )
    M 0 :  jod_ctrl 7    dev_cmd 28
  274 0 :  ;
  277 0 :  INDIVISIBLE ,
    M 0 :  rand 15 ,
  278 0 :  READ_PHY TO ACCUMULATOR USING OFF_ALU CON_LENGTH ( 32 ) ,
    M 0 :  mem 3   md 1   db_ctrl 1  len_ctrl 6    ,
  279 0 :  OFF_ALU_OUT = LIT16 ( 64 ) PLUS CURRENT ( 1 ) ,
    M 0 :    alu_in 3 , 1 0 , lit16 64   alu_op 3  src_frame 0 , r_source 1 ,
  280 0 :  LOAD_AUN ( CURRENT ( 1 ) ) WITH 0
    M 0 :  dest_frame 0 , r_dest 1 , r_w 1  a_in    0
  280 0 :  ;
  283 0 :  WRITE FROM DATA_TRAP USING OFF_ALU WITH PREVIOUS ( 6 ) ,
    M 0 :  mem 4   jod_ctrl 4   db_ctrl 1  src_frame 3 , r_source 6 ,
  284 0 :  OFF_ALU_OUT = LIT16 ( 32 ) PLUS PREVIOUS ( 6 ) ,
  284 0 :  CON_LENGTH ( 32 ) ,
    M 0 :    alu_in 3 , 1 0 , lit16 32   alu_op 3  src_frame
    M 0 :  3 , r_source 6  , len_ctrl 6    ,
  285 0 :  LOAD_OFF ( CURRENT ( 0 ) ) WITH OFFSET ,
    M 0 :  dest_frame 0 , r_dest 0 , r_w 1  o_in    3 ,
  286 0 :  LOAD_AUN ( CURRENT ( 0 ) ) WITH ADN ( PREVIOUS ( 6 ) )
    M 0 :  dest_frame 0 , r_dest 0 , r_w 1  a_in    2 , src_frame
    M 0 :  3 , r_source 6
```

```
286 0 : ;
288 0 : OFF_ALU_OUT = ZERO OR CURRENT ( 6 ) ,
  M 0 :    alu_in 2 , rand 2  alu_op 5  src_frame 0 , r_source 6 ,
289 0 : SOURCE ( OFF_ALU_DATA ) TO JPD_BUS ( DATA_TRAP )
  M 0 : jpd_ctrl 7   dev_cmd 28
289 0 : ;
292 0 : WRITE FROM DATA_TRAP USING OFF_ALU WITH PREVIOUS ( 6 ) ,
  M 0 : mem 4   jpd_ctrl 4   db_ctrl 1   src_frame 3 , r_source 6 ,
293 0 : OFF_ALU_OUT = LIT16 ( 64 ) PLUS PREVIOUS ( 6 ) ,
293 0 : CON_LENGTH ( 32 ) ,
  M 0 :    alu_in 3 , 1 0 , lit16 64  alu_op 3  src_frame
  M 0 : 3 , r_source 6 , len_ctrl 6 ,
294 0 : LOAD_OFF ( CURRENT ( 0 ) ) WITH OFFSET ,
  M 0 : dest_frame 0 , r_dest 0 , r_w 1  o_in  3 ,
295 0 : LOAD_AUN ( CURRENT ( 0 ) ) WITH AUN ( PREVIOUS ( 6 ) )
  M 0 : dest_frame 0 , r_dest 0 , r_w 1  a_in  2 , src_frame
  M 0 : 3 , r_source 6
295 0 : ;
297 0 : OFF_ALU_OUT = ACC OF COMMON ( 438 , 0 ) ,
  M 0 :    alu_in 2  alu_op 5  src_frame 2 , r_source 0 , com_ext 808 ,
298 0 : SOURCE ( OFF_ALU_DATA ) TO JPD_BUS ( DATA_TRAP )
  M 0 : jpd_ctrl 7   dev_cmd 28
298 0 : ;
301 0 : WRITE FROM DATA_TRAP USING OFF_ALU WITH CURRENT ( 0 ) ,
  M 0 : mem 4   jpd_ctrl 4   db_ctrl 1   src_frame 0 , r_source 0 ,
302 0 : OFF_ALU_OUT = BIASED_LENGTH PLUS CURRENT ( 0 ) ,
302 0 : CON_LENGTH ( 32 ) ,
  M 0 :    alu_in 1  alu_op 3  src_frame 0 , r_source 0 , len_ctrl 6 ,
303 0 : LOAD_AUN ( CURRENT ( 0 ) ) WITH 0 ,
  M 0 : dest_frame 0 , r_dest 0 , r_w 1  a_in   0 ,
304 0 : RETURN
  M 0 : nac 2
304 0 : ;
307 0 : NULL_PTR :
308 0 : INDIVISIBLE ,
  M 0 : rand 15 ,
309 0 : LOAD_AUN ( CURRENT ( 0 ) ) WITH 0 ,
  M 0 : dest_frame 0 , r_dest 0 , r_w 1  a_in   0 ,
310 0 : OFF_ALU_OUT = ZEROS ,
  M 0 :    alu_op 0 ,
311 0 : SOURCE ( OFF_ALU_DATA ) TO JPD_BUS ( DATA_TRAP )
  M 0 : jpd_ctrl 7   dev_cmd 28
311 0 : ;
313 0 : WRITE FROM DATA_TRAP USING OFF_ALU WITH PREVIOUS ( 6 ) ,
  M 0 : mem 4   jpd_ctrl 4   db_ctrl 1   src_frame 3 , r_source 6 ,
314 0 : OFF_ALU_OUT = BIASED_LENGTH PLUS PREVIOUS ( 6 ) , CON_LENGTH ( 32 )
  M 0 :    alu_in 1  alu_op 3  src_frame 3 , r_source 6 , len_ctrl 6
314 0 : ;
316 0 : WRITE FROM DATA_TRAP USING OFF_ALU WITH PREVIOUS ( 6 ) ,
  M 0 : mem 4   jpd_ctrl 4   db_ctrl 1   src_frame 3 , r_source 6 ,
317 0 : OFF_ALU_OUT = LIT16 ( 64 ) PLUS PREVIOUS ( 6 ) , CON_LENGTH ( 32 )
  M 0 :    alu_in 3 , 1 0 , lit16 64  alu_op 3  src_frame
  M 0 : 3 , r_source 6 , len_ctrl 6
317 0 : ;
319 0 : WRITE FROM DATA_TRAP USING OFF_ALU WITH PREVIOUS ( 6 ) ,
  M 0 : mem 4   jpd_ctrl 4   db_ctrl 1   src_frame 3 , r_source 6 ,
320 0 : OFF_ALU_OUT = LIT16 ( 96 ) PLUS PREVIOUS ( 6 ) , CON_LENGTH ( 32 )
  M 0 :    alu_in 3 , 1 0 , lit16 96  alu_op 3  src_frame
  M 0 : 3 , r_source 6 , len_ctrl 6
320 0 : ;
322 0 : WRITE FROM OFF_ALU_DATA USING DESCRIPTOR PREVIOUS ( 6 ) ,
  M 0 : mem 4   jpd_ctrl 7   db_ctrl 0   src_frame 3 , r_source 6 ,
323 0 : OFF_ALU_OUT = ONES , CON_LENGTH ( 32 ) ,
  M 0 :    alu_op 7 , len_ctrl 6 ,
324 0 : RETURN
  M 0 : nac 2
324 0 : ;
324 0 :

COMPILATION COMPLETE, 26 STATEMENTS PROCESSED
```

```
DATA GENERAL F H P - FFTCH MICROCODE GENERATOR, REV. 6.0 (3/16/79)
   6/6/81 AT 4:9:36

INPUT FILE:  RESOLVER_TRAPS
OBJECT FILE: RESOLVER_TRAPS.OB

LINE NO:SOURCE 1 0 :$NO DOLLAR
  238 0 :BEGIN    /************** name resolve traps ******************/
  239 1 :/*tmp*/ MACRO  AON_VIA_DESCRIPTOR_BUS  MEANS     1 #1      ENDMAC;
  240 1 :
  241 1 :        MACRO   PREV_A            MEANS  PREVIOUS(0)       ENDMAC;
  242 1 :        MACRO   PREV_B            MEANS  PREVIOUS(1)       ENDMAC;
  243 1 :        MACRO   PREV_C            MEANS  PREVIOUS(2)       ENDMAC;
  244 1 :
  245 1 :        MACRO   TRACE_FLAG        MEANS  CURRENT(0)        ENDMAC;
  246 1 :        MACRO   NTE_PTR           MEANS  CURRENT(6)        ENDMAC;
  247 1 :        MACRO   FIU.TYPE          MEANS  CURRENT(6)        ENDMAC;
ESOLVER_TRAPS - RESOLVE (C) Handler 250 1 :/*      0100    Resolve (2) Jam - Name Cache Hit, Entry is a Weird  */
  251 1 :@000@ :
  252 1 :ENTRY RES_C_WEIRD_HIT:
  253 1 :        OFF_ALU_OUT = ACC AND CON_FFFF,
  254 1 :        LOAD_LEN (REG_A) WITH OFF,
  255 1 :        LONG_CALL RESOLVER*COMMON_WEIRD_HIT;
  256 1 :
  257 1 :        COPY (PREV_C,REG_A);
  258 1 :
  259 1 :RES_C_END:
  260 1 :        OFF_ALU_OUT = ZERO OR PREV_C,
  261 1 :        LOAD (ACCUMULATOR) WITH OFFSET,
  262 1 :        LOAD_AON (REG_A) WITH 0,
  263 1 :        RETURN;
  264 1 :
  265 1 :
  266 1 :
  267 1 :RES_C_VEC_END:
  268 1 :        IES_MULTIPLY,                      /*use cache.1 as scale factor*/
  269 1 :        OFF_ALU_OUT = ACC PLUS PREV_C,     /* acc = index value */
  270 1 :        LOAD_OFF (PREV_C) WITH OFFSET,
  271 1 :        LOAD (ACCUMULATOR) WITH OFFSET,
  272 1 :        LOAD_AON (PREV_C) WITH AON(PREV_C),
  273 1 :        RETURN;
  274 1 :
  275 1 :/*      0104    Resolve (2) Jam - Name Cache Hit, Entry is a Vector */
  276 1 :@004@ :
  277 1 :ENTRY RES_C_VEC_HIT:
  278 1 :        LOAD (PREV_C) WITH NAME_CACHE_2(NAME_TRAP),
  279 1 :        WITH PREV_C,
  280 1 :        IF LEN_LE_32 THEN GOTO RES_C_VEC_END;
  281 1 :
  282 1 :RES_C_IND_HIT:
  283 1 :        LOAD_OFF (FIU.TYPE) WITH AON(PREV_C),
  284 1 :        CASE ON ACC_BYTE(0) MASK @R0@ ROTATE(1);
  285 1 :
  286 1 :/* 0 - Intra Object */
  287 1 :        DISABLE_AON_WRITE,
  288 1 :        OFF_ALU_OUT = ACC PLUS PREV_C,
  289 1 :        LOAD_OFF (PREV_C) WITH OFFSET,
  290 1 :        LOAD (ACCUMULATOR) WITH OFFSET,
  291 1 :        RETURN;
  292 1 :
  293 1 :/* 1 - General Pointer */
  294 1 :        LOAD (CURRENT(7)) WITH NAME_CACHE_0(NAME_TRAP),
  295 1 :        LONG_CALL PTR_TO_DESC*READ_STARTED;
  296 1 :
  297 1 :        OFF_ALU_OUT = ACC PLUS PREV_C,
  298 1 :        LOAD_OFF (PREV_C) WITH OFFSET;
  299 1 :
  300 1 :        LOAD (ACCUMULATOR) WITH AON(CURRENT(7)),
  301 1 :        LOAD_AON (CURRENT(7)) WITH 0;
  302 1 :
```

```
503 1 :          INDIVISIBLE,
504 1 :          OFF_ALU_OUT = LIT32(#FFFF0000#) AND FIU.TYPE,
505 1 :          LOAD_OFF (FIU.TYPE) WITH OFFSET;
506 1 :
507 1 :          INDIVISIBLE,
508 1 :          OFF_ALU_OUT = ACC ZERO_HI OR FIU.TYPE,
509 1 :          LOAD_AON (PREV_C) WITH OFFSET,
510 1 :          LONG_GOTO RES_C_END;
511 1 :
512 1 :/*       010C     Resolve (2) Jam - Name Cache Miss */
513 1 :@00CA :
514 1 :RES_C_MISS:
515 1 :          INDIVISIBLE,
516 1 :          LOAD_AON (PREV_C) WITH 0,
517 1 :          OFF_ALU_OUT =
518 1 :               NAME_TRAP (ZERO_EXTEND) LEFT_SHIFTED(4) XOR CON_20000,
519 1 :          LOAD (ACCUMULATOR) WITH OFFSET;
520 1 :
521 1 :          OFF_ALU_OUT = ACC SIGN_EXTEND_LU_HALF LEFT_SHIFTED(1)
522 1 :                         OR ZERO_VAL,
523 1 :          LOAD (ACCUMULATOR) WITH OFFSET,
524 1 :          LOAD_LEN (TRACE_FLAG) WITH LEN(READ_TRACING),
525 1 :          CASE ON ACC_BYTE(1) MASK #0E# ROTATE(7);
526 1 :
527 1 :/* 001 - FP Indirect */
528 1 :          READ TO ACCUMULATOR USING OFF_ALU WITH FP CON_LENGTH(32),
529 1 :          OFF_ALU_OUT = ACC PLUS FP,
530 1 :          LOAD_LEN (PREV_C) WITH LITERAL(CON_LENGTH(32)),
531 1 :          LOAD_AON (PREV_C) WITH AON(FP),
532 1 :          TEST_TO_CC (ACC_BYTE0_NE_0),         /* test neg pre-disp */
533 1 :          GOTO RES_C_INDIRECT;
534 1 :
535 1 :/* 000 - FP Direct */
536 1 :          OFF_ALU_OUT = ACC PLUS FP,
537 1 :          LOAD_OFF (PREV_C) WITH OFFSET,
538 1 :          LOAD (ACCUMULATOR) WITH OFFSET,
539 1 :          LOAD_LEN (PREV_C) WITH LITERAL(CON_LENGTH(32)),
540 1 :          LOAD_AON (PREV_C) WITH AON_VIA_DESCRIPTOR_BUS(FP),
541 1 :          SOURCE (OFF_ALU WITH FP)
542 1 :               TO DESCRIPTOR_BUS (NAME_CACHE_0(NAME_TRAP)),
543 1 :          FIU(RIGHT,SIGN),
544 1 :          RETURN;
545 1 :
546 1 :/* 011 - SDP Indirect */
547 1 :          READ TO ACCUMULATOR USING OFF_ALU WITH SDP CON_LENGTH(32),
548 1 :          OFF_ALU_OUT = ACC PLUS SDP,
549 1 :          LOAD_LEN (PREV_C) WITH LITERAL(CON_LENGTH(32)),
550 1 :          LOAD_AON (PREV_C) WITH AON(SDP),
551 1 :          TEST_TO_CC (ACC_BYTE0_NE_0),         /* test neg pre-disp */
552 1 :          GOTO RES_C_INDIRECT;
553 1 :
554 1 :/* 010 - SDP Direct */
555 1 :          OFF_ALU_OUT = ACC PLUS SDP,
556 1 :          LOAD_OFF (PREV_C) WITH OFFSET,
557 1 :          LOAD (ACCUMULATOR) WITH OFFSET,
558 1 :          LOAD_LEN (PREV_C) WITH LITERAL(CON_LENGTH(32)),
559 1 :          LOAD_AON (PREV_C) WITH AON_VIA_DESCRIPTOR_BUS(SDP),
560 1 :          SOURCE (OFF_ALU WITH SDP)
561 1 :               TO DESCRIPTOR_BUS (NAME_CACHE_0(NAME_TRAP)),
562 1 :          FIU(RIGHT,SIGN),
563 1 :          RETURN;
564 1 :
565 1 :/* 101 - PRP Indirect   (Really illegal) */
566 1 :RES_C_IND_END:
567 1 :          LOAD_AON (CURRENT(7)) WITH 0,
568 1 :          RETURN;
569 1 :
570 1 :/* 100 - PRP Direct */
571 1 :          OFF_ALU_OUT = ACC PLUS PRP,
572 1 :          LOAD_OFF (PREV_C) WITH OFFSET,
573 1 :          LOAD (ACCUMULATOR) WITH OFFSET,
```

```
374 1 :           LOAD_LEN (PREV_C) WITH LITERAL(CON_LENGTH(32)),
375 1 :           LOAD_AON (PREV_C) WITH AON_VIA_DESCRIPTOR_BUS(PBP),
376 1 :           SOURCE (OFF_ALU WITH PBP)
377 1 :               TO DESCRIPTOR_BUS (NAME_CACHE_0(NAME_TRAP)),
378 1 :           FIU(RIGHT,SIGN),
379 1 :           RETURN;
380 1 :
381 1 :/* 111 - Name */
382 1 :           NOP;
383 1 :
384 1 :/* 110 - Name */
385 1 :           READ TO ACCUMULATOR USING OFF_ALU WITH NT_PTR CON_LENGTH(32),
386 1 :           OFF_ALU_OUT =
387 1 :               NAME_TRAP (ZERO_EXTEND) LEFT_SHIFTED(5) PLUS NT_PTR,
388 1 :           LONG_CALL RESOLVER*COMMON_MISS;
389 1 :
390 1 :           COPY (PREV_C, REG_A),
391 1 :           LONG_GOTO RES_C_END;
392 1 :
393 1 :
394 1 :RES_C_INDIRECT:
395 1 :           WITH TRACE_FLAG,
396 1 :           IF CC_AND_LEN_LE_32 THEN GOTO RES_C_IND_ENCACHE;
397 1 :
398 1 :           DISABLE_AON_WRITE,
399 1 :           OFF_ALU_OUT = ACC OR CON_0,
400 1 :           LOAD_OFF (PREV_C) WITH OFFSET,
401 1 :           CASE ON ACC_BYTE(0) MASK @80@ ROTATE(1);
402 1 :
403 1 :/* 0 - Intra Object Pointer */
404 1 :           LOAD_AON (PREV_C) WITH AON_VIA_DESCRIPTOR_BUS(PREV_C),
405 1 :           FIU(RIGHT,SIGN),
406 1 :           RETURN;
407 1 :
408 1 :/* 1 - General Pointer */
409 1 :           LOAD (CURRENT(7)) WITH DESC_TRAP,
410 1 :           LONG_CALL PTR_TO_DESC*READ_STARTED;
411 1 :
412 1 :           OFF_ALU_OUT = ACC OR CURRENT(7),
413 1 :           LOAD_OFF (PREV_C) WITH OFFSET,
414 1 :           LOAD (ACCUMULATOR) WITH OFFSET,
415 1 :           LOAD_AON (PREV_C) WITH AON_VIA_DESCRIPTOR_BUS(CURRENT(7)),
416 1 :           FIU(RIGHT,SIGN),
417 1 :           LONG_GOTO RES_C_IND_END;
418 1 :
419 1 :
420 1 :RES_C_IND_ENCACHE:
421 1 :           DISABLE_AON_WRITE,
422 1 :           OFF_ALU_OUT = ACC OR CON_0,
423 1 :           LOAD_OFF (PREV_C) WITH OFFSET,
424 1 :           CASE ON ACC_BYTE(0) MASK @80@ ROTATE(1);
425 1 :
426 1 :/* 0 - Intra Object Pointer */
427 1 :           SOURCE (DESCRIPTOR PREV_C)
428 1 :               TO DESCRIPTOR_BUS (NAME_CACHE_0(NAME_TRAP)),
429 1 :           LOAD_AON (PREV_C) WITH AON_VIA_DESCRIPTOR_BUS(PREV_C),
430 1 :           FIU(RIGHT,SIGN),
431 1 :           RETURN;
432 1 :
433 1 :/* 1 - General Pointer */
434 1 :           LOAD (CURRENT(7)) WITH DESC_TRAP,
435 1 :           LONG_CALL PTR_TO_DESC*READ_STARTED;
436 1 :
437 1 :           OFF_ALU_OUT = ACC OR CURRENT(7),
438 1 :           LOAD_OFF (PREV_C) WITH OFFSET,
439 1 :           LOAD (ACCUMULATOR) WITH OFFSET,
440 1 :           LOAD_AON (PREV_C) WITH AON_VIA_DESCRIPTOR_BUS(CURRENT(7)),
441 1 :           FIU(RIGHT,SIGN),
442 1 :           SOURCE (OFF_ALU WITH CURRENT(7))
443 1 :               TO DESCRIPTOR_BUS (NAME_CACHE_0(NAME_TRAP)),
444 1 :           LONG_GOTO RES_C_IND_END;
445 1 :
```

```
447 1 :/*       016C    Resolve Pointer Jam - Name Cache Miss
448 1C:a06Ca :
449 1C:RES_POINTER_MISS:
450 1C:         INDIVISIBLE,
451 1C:         LOAD_AON (PREV_A) WITH 0,
452 1C:         LONG_GOTO RESOLVER*RES_PTR_MISS; */
:SOLVER_TRAPS - RESOLVE (A) Handler 455 1 :/*       0180    Resolve (0) Jam - Name Cache Hit, Entry is a Weird  */
456 1 :a080a :
457 1 :ENTRY RES_A_WEIRD_HIT:
458 1 :         OFF_ALU_OUT = ACC AND CON_FFFF,
459 1 :         LOAD_LEN (PREV_A) WITH OFF,
460 1 :         LONG_GOTO RESOLVER*COMMON_WEIRD_HIT;
461 1 :
462 1 :RES_A_END:
463 1 :         OFF_ALU_OUT = ZERO OP PREV_A,
464 1 :         LOAD (ACCUMULATOR) WITH OFFSET,
465 1 :         LOAD_AON (REG_A) WITH 0,
466 1 :         RETURN;
467 1 :
468 1 :
469 1 :RES_A_VEC_END:
470 1 :         IES_MULTIPLY,                   /*use cache.1 as scale factor*/
471 1 :         OFF_ALU_OUT = ACC PLUS PREV_A,  /* acc = index value */
472 1 :         LOAD_OFF (PREV_A) WITH OFFSET,
473 1 :         LOAD (ACCUMULATOR) WITH OFFSET,
474 1 :         LOAD_AON (PREV_A) WITH AON(PREV_A),
475 1 :         RETURN;
476 1 :
477 1 :/*       0184    Resolve (0) Jam - Name Cache Hit, Entry is a Vector */
478 1 :a084a :
479 1 :ENTRY RES_A_VEC_HIT:
480 1 :         LOAD (PREV_A) WITH NAME_CACHE_2(NAME_TRAP),
481 1 :         WITH PREV_A,
482 1 :         IF LEN_LE_32 THEN GOTO RES_A_VEC_END;
483 1 :
484 1 :RES_A_IND_HIT:
485 1 :         LOAD_OFF (FIU.TYPE) WITH AON(PREV_A),
486 1 :         CASE ON ACC_BYTE(0) MASK a80a ROTATE(1);
487 1 :
488 1 :/* 0 - Intra object */
489 1 :         DISABLE_AON_WRITE,
490 1 :         OFF_ALU_OUT = ACC PLUS PREV_A,
491 1 :         LOAD_OFF (PREV_A) WITH OFFSET,
492 1 :         LOAD (ACCUMULATOR) WITH OFFSET,
493 1 :         RETURN;
494 1 :
495 1 :/* 1 - General Pointer */
496 1 :         LOAD (CURRENT(7)) WITH NAME_CACHE_0(NAME_TRAP),
497 1 :         LONG_CALL PTR_TO_DESC*READ_STARTED;
498 1 :
499 1 :ENTRY RES_A_IND_DONE:
500 1 :         OFF_ALU_OUT = ACC PLUS PREV_A,
501 1 :         LOAD_OFF (PREV_A) WITH OFFSET;
502 1 :
503 1 :         LOAD (ACCUMULATOR) WITH AON(CURRENT(7)),
504 1 :         LOAD_AON (CURRENT(7)) WITH 0;
505 1 :
506 1 :         INDIVISIBLE,
507 1 :         OFF_ALU_OUT = LIT32(aFFFF0000a) AND FIU.TYPE,
508 1 :         LOAD_OFF (FIU.TYPE) WITH OFFSET;
509 1 :
510 1 :         INDIVISIBLE,
511 1 :         OFF_ALU_OUT = ACC ZERO_HI OR FIU.TYPE,
512 1 :         LOAD_AON (PREV_A) WITH OFFSET,
513 1 :         LONG_GOTO RES_A_END;
514 1 :
515 1 :
516 1 :/*       018C    Resolve (0) Jam - Name Cache Miss */
517 1 :a08Ca :
```

```
518 1 :RES_A_MISS:
519 1 :        INDIVISIBLE,
520 1 :        LOAD_AON (PREV_A) WITH 0,
521 1 :        OFF_ALU_OUT =
522 1 :            NAME_TRAP (ZERO_EXTEND) LEFT_SHIFTED(4) XOR CON_20000,
523 1 :        LOAD (ACCUMULATOR) WITH OFFSET;
524 1 :
525 1 :        OFF_ALU_OUT = ACC SIGN_EXTEND_LO_HALF LEFT_SHIFTED(1)
526 1 :            OR ZERO_VAL,
527 1 :        LOAD (ACCUMULATOR) WITH OFFSET,
528 1 :        LOAD_LEN (TRACE_FLAG) WITH LEN(READ_TRACING),
529 1 :        CASE ON ACC_BYTE(1) MASK 60E0 ROTATE(7);
530 1 :
531 1 :/* 001 - FP Indirect */
532 1 :        READ TO ACCUMULATOR USING OFF_ALU WITH FP CON_LENGTH(32),
533 1 :        OFF_ALU_OUT = ACC PLUS FP,
534 1 :        LOAD_LEN (PREV_A) WITH LITERAL(CON_LENGTH(32)),
535 1 :        LOAD_AON (PREV_A) WITH AON(FP),
536 1 :        TEST_TO_CC (ACC_BYTE0_NE_0),              /* test neg pre-disp */
537 1 :        GOTO RES_A_INDIRECT;
538 1 :
539 1 :/* 000 - FP Direct */
540 1 :        OFF_ALU_OUT = ACC PLUS FP,
541 1 :        LOAD_OFF (PREV_A) WITH OFFSET,
542 1 :        LOAD (ACCUMULATOR) WITH OFFSET,
543 1 :        LOAD_LEN (PREV_A) WITH LITERAL(CON_LENGTH(32)),
544 1 :        LOAD_AON (PREV_A) WITH AON_VIA_DESCRIPTOR_BUS(FP),
545 1 :        SOURCE (OFF_ALU WITH FP)
546 1 :            TO DESCRIPTOR_BUS (NAME_CACHE_0(NAME_TRAP)),
547 1 :        FIU(RIGHT,SIGN),
548 1 :        RETURN;
549 1 :
550 1 :/* 011 - SDP Indirect */
551 1 :        READ TO ACCUMULATOR USING OFF_ALU WITH SDP CON_LENGTH(32),
552 1 :        OFF_ALU_OUT = ACC PLUS SDP,
553 1 :        LOAD_LEN (PREV_A) WITH LITERAL(CON_LENGTH(32)),
554 1 :        LOAD_AON (PREV_A) WITH AON(SDP),
555 1 :        TEST_TO_CC (ACC_BYTE0_NE_0),              /* test neg pre-disp */
556 1 :        GOTO RES_A_INDIRECT;
557 1 :
558 1 :/* 010 - SDP Direct */
559 1 :        OFF_ALU_OUT = ACC PLUS SDP,
560 1 :        LOAD_OFF (PREV_A) WITH OFFSET,
561 1 :        LOAD (ACCUMULATOR) WITH OFFSET,
562 1 :        LOAD_LEN (PREV_A) WITH LITERAL(CON_LENGTH(32)),
563 1 :        LOAD_AON (PREV_A) WITH AON_VIA_DESCRIPTOR_BUS(SDP),
564 1 :        SOURCE (OFF_ALU WITH SDP)
565 1 :            TO DESCRIPTOR_BUS (NAME_CACHE_0(NAME_TRAP)),
566 1 :        FIU(RIGHT,SIGN),
567 1 :        RETURN;
568 1 :
569 1 :/* 101 - PBP Indirect  (Really illegal) */
570 1 :RES_A_IND_END:
571 1 :        LOAD_AON (CURRENT(7)) WITH 0,
572 1 :        RETURN;
573 1 :
574 1 :/* 100 - PBP Direct */
575 1 :        OFF_ALU_OUT = ACC PLUS PBP,
576 1 :        LOAD_OFF (PREV_A) WITH OFFSET,
577 1 :        LOAD (ACCUMULATOR) WITH OFFSET,
578 1 :        LOAD_LEN (PREV_A) WITH LITERAL(CON_LENGTH(32)),
579 1 :        LOAD_AON (PREV_A) WITH AON_VIA_DESCRIPTOR_BUS(PBP),
580 1 :        SOURCE (OFF_ALU WITH PBP)
581 1 :            TO DESCRIPTOR_BUS (NAME_CACHE_0(NAME_TRAP)),
582 1 :        FIU(RIGHT,SIGN),
583 1 :        RETURN;
584 1 :
585 1 :/* 111 - Name */
586 1 :        READ TO ACCUMULATOR USING OFF_ALU WITH NT_PTR CON_LENGTH(32),
587 1 :        OFF_ALU_OUT =
588 1 :            NAME_TRAP (ZERO_EXTEND) LEFT_SHIFTED(5) PLUS NT_PTR,
```

```
589 1 :          LOAD_OFF (NTE_PTR) WITH OFFSET,
590 1 :          LOAD_AON (NTE_PTR) WITH AON(NT_PTR),
591 1 :          LONG_GOTO RESOLVER*COMMON_MISS_A;
592 1 :
593 1 :/* 110 - Name */
594 1 :          READ TO ACCUMULATOR USING OFF_ALU WITH NT_PTR CON_LENGTH(32),
595 1 :          OFF_ALU_OUT =
596 1 :              NAME_TRAP (ZERO_EXTEND) LEFT_SHIFTED(5) PLUS NT_PTR,
597 1 :          LOAD_OFF (NTE_PTR) WITH OFFSET,
598 1 :          LOAD_AON (NTE_PTR) WITH AON(NT_PTR),
599 1 :          LONG_GOTO RESOLVER*COMMON_MISS_A;
600 1 :
601 1 :
602 1 :RES_A_INDIRECT:
603 1 :          WITH TRACE_FLAG,
604 1 :          IF CC_AND_LEN_LE_32 THEN GOTO RES_A_IND_ENCACHE;
605 1 :
606 1 :          DISABLE_AON_WRITE,
607 1 :          OFF_ALU_OUT = ACC OR CON_0,
608 1 :          LOAD_OFF (PREV_A) WITH OFFSET,
609 1 :          CASE ON ACC_BYTE(0) MASK a80a ROTATE(1);
610 1 :
611 1 :/* 0 - Intra Object Pointer */
612 1 :          LOAD_AON (PREV_A) WITH AON_VIA_DESCRIPTOR_BUS(PREV_A),
613 1 :          FIU(RIGHT,SIGN),
614 1 :          RETURN;
615 1 :
616 1 :/* 1 - General Pointer */
617 1 :          LOAD (CURRENT(7)) WITH DESC_TRAP,
618 1 :          LONG_CALL PTR_TO_DESC*READ_STARTED;
619 1 :
620 1 :          OFF_ALU_OUT = ACC OR CURRENT(7),
621 1 :          LOAD_OFF (PREV_A) WITH OFFSET,
622 1 :          LOAD (ACCUMULATOR) WITH OFFSET,
623 1 :          LOAD_AON (PREV_A) WITH AON_VIA_DESCRIPTOR_BUS(CURRENT(7)),
624 1 :          FIU(RIGHT,SIGN),
625 1 :          LONG_GOTO RES_A_IND_END;
626 1 :
627 1 :RES_A_IND_ENCACHE:
628 1 :          DISABLE_AON_WRITE,
629 1 :          OFF_ALU_OUT = ACC OR CON_0,
630 1 :          LOAD_OFF (PREV_A) WITH OFFSET,
631 1 :          CASE ON ACC_BYTE(0) MASK a80a ROTATE(1);
632 1 :
633 1 :/* 0 - Intra Object Pointer */
634 1 :          SOURCE (DESCRIPTOR PREV_A)
635 1 :              TO DESCRIPTOR_BUS (NAME_CACHE_0(NAME_TRAP)),
636 1 :          LOAD_AON (PREV_A) WITH AON_VIA_DESCRIPTOR_BUS(PREV_A),
637 1 :          FIU(RIGHT,SIGN),
638 1 :          RETURN;
639 1 :
640 1 :/* 1 - General Pointer */
641 1 :          LOAD (CURRENT(7)) WITH DESC_TRAP,
642 1 :          LONG_CALL PTR_TO_DESC*READ_STARTED;
643 1 :
644 1 :          OFF_ALU_OUT = ACC OR CURRENT(7),
645 1 :          LOAD_OFF (PREV_A) WITH OFFSET,
646 1 :          LOAD (ACCUMULATOR) WITH OFFSET,
647 1 :          LOAD_AON (PREV_A) WITH AON_VIA_DESCRIPTOR_BUS(CURRENT(7)),
648 1 :          FIU(RIGHT,SIGN),
649 1 :          SOURCE (OFF_ALU WITH CURRENT(7))
650 1 :              TO DESCRIPTOR_BUS (NAME_CACHE_0(NAME_TRAP)),
651 1 :          LONG_GOTO RES_A_IND_END;
RESOLVER_TRAPS - EVAL (A) Handler 654 1 :/*       01A0    Eval (0) Jam - Name Cache Hit, Entry is a Weird   */
655 1 :a0A0a :
656 1 :ENTRY EVAL_A_WEIRD_HIT:
657 1 :          OFF_ALU_OUT = ACC AND CON_FFFF,
658 1 :          LOAD_LEN (REG_A) WITH OFF,
659 1 :          LONG_CALL RESOLVER*COMMON_WEIRD_HIT;
660 1 :
```

```
661  1 :          COPY (PREV_A,REG_A);
662  1 :
663  1 :EVAL_A_END:
664  1 :          READ TO EBOX_DATA_Q USING DESCRIPTOR PREV_A BIAS_LENGTH,
665  1 :          OFF_ALU_OUT = ZERO OR PREV_A,
666  1 :          LOAD (ACCUMULATOR) WITH OFFSET,
667  1 :          LOAD_AON (REG_A) WITH 0,
668  1 :          RETURN;
669  1 :
670  1 :
671  1 :
672  1 :EVAL_A_VEC_END:
673  1 :          READ TO EBOX_DATA_Q USING OFF_ALU WITH PREV_A BIAS_LENGTH,
674  1 :          IES_MULTIPLY,                  /*use cache.1 as scale factor*/
675  1 :          OFF_ALU_OUT = ACC PLUS PREV_A, /* acc = index value */
676  1 :          LOAD_OFF (PREV_A) WITH OFFSET,
677  1 :          LOAD (ACCUMULATOR) WITH OFFSET,
678  1 :          LOAD_AON (PREV_A) WITH AON(PREV_A),
679  1 :          RETURN;
680  1 :
681  1 :/*       01A4      Eval (0) Jam - Name Cache Hit, Entry is a Vector */
682  1 :@0A4@ :
683  1 :ENTRY EVAL_A_VEC_HIT:
684  1 :          LOAD (PREV_A) WITH NAME_CACHE_2(NAME_TRAP),
685  1 :          WITH PREV_A,
686  1 :          IF LEN_LE_32 THEN GOTO EVAL_A_VEC_END;
687  1 :
688  1 :EVAL_A_IND_HIT:
689  1 :          LOAD_OFF (FIU.TYPE) WITH AON(PREV_A),
690  1 :          CASE ON ACC_BYTE(0) MASK @80@ ROTATE(1);
691  1 :
692  1 :/* 0 - Intra Object */
693  1 :          READ TO EBOX_DATA_Q USING OFF_ALU WITH PREV_A, BIAS_LENGTH,
694  1 :          DISABLE_AON_WRITE,
695  1 :          OFF_ALU_OUT = ACC PLUS PREV_A,
696  1 :          LOAD_OFF (PREV_A) WITH OFFSET,
697  1 :          LOAD (ACCUMULATOR) WITH OFFSET,
698  1 :          RETURN;
699  1 :
700  1 :/* 1 - General Pointer */
701  1 :          LOAD (CURRENT(7)) WITH NAME_CACHE_0(NAME_TRAP),
702  1 :          LONG_CALL PTR_TO_DESC*READ_STARTED;
703  1 :
704  1 :          OFF_ALU_OUT = ACC PLUS PREV_A,
705  1 :          LOAD_OFF (PREV_A) WITH OFFSET;
706  1 :
707  1 :          LOAD (ACCUMULATOR) WITH AON(CURRENT(7)),
708  1 :          LOAD_AON (CURRENT(7)) WITH 0;
709  1 :
710  1 :          INDIVISIBLE,
711  1 :          OFF_ALU_OUT = LIT32(@FFFF0000@) AND FIU.TYPE,
712  1 :          LOAD_OFF (FIU.TYPE) WITH OFFSET;
713  1 :
714  1 :          INDIVISIBLE,
715  1 :          OFF_ALU_OUT = ACC ZERO_HI OR FIU.TYPE,
716  1 :          LOAD_AON (PREV_A) WITH OFFSET,
717  1 :          LONG_GOTO EVAL_A_END;
718  1 :
719  1 :/*       01AC      Eval (0) Jam - Name Cache Miss */
720  1 :@0AC@ :
721  1 :EVAL_A_MISS:
722  1 :          INDIVISIBLE,
723  1 :          LOAD_AON (PREV_A) WITH 0,
724  1 :          OFF_ALU_OUT =
725  1 :               NAME_TRAP (ZERO_EXTEND) LEFT_SHIFTED(4) XOR CON_20000,
726  1 :          LOAD (ACCUMULATOR) WITH OFFSET;
727  1 :
728  1 :          OFF_ALU_OUT = ACC SIGN_EXTEND_LO_HALF LEFT_SHIFTED(1)
729  1 :               OR ZERO_VAL,
730  1 :          LOAD (ACCUMULATOR) WITH OFFSET,
731  1 :          LOAD_LEN (TRACE_FLAG) WITH LEN(READ_TRACING),
732  1 :          CASE ON ACC_BYTE(1) MASK @0E@ ROTATE(7);
```

```
733 1 :
734 1 :/* 001 - FP Indirect */
735 1 :       READ TO ACCUMULATOR USING OFF_ALU WITH FP CON_LENGTH(32),
736 1 :       OFF_ALU_OUT = ACC PLUS FP,
737 1 :       LOAD_LEN (PREV_A) WITH LITERAL(CON_LENGTH(32)),
738 1 :       LOAD_AON (PREV_A) WITH AON(FP),
739 1 :       TEST_TO_CC (ACC_BYTE0_NE_0),            /* test neq pre-disp */
740 1 :       GOTO EVAL_A_INDIRECT;
741 1 :
742 1 :/* 000 - FP Direct */
743 1 :       READ TO EBOX_DATA_Q USING OFF_ALU WITH FP CON_LENGTH(32),
744 1 :       OFF_ALU_OUT = ACC PLUS FP,
745 1 :       LOAD_OFF (PREV_A) WITH OFFSET,
746 1 :       LOAD (ACCUMULATOR) WITH OFFSET,
747 1 :       LOAD_LEN (PREV_A) WITH LITERAL(CON_LENGTH(32)),
748 1 :       LOAD_AON (PREV_A) WITH AON_VIA_DESCRIPTOR_BUS(FP),
749 1 :       SOURCE (OFF_ALU WITH FP)
750 1 :           TO DESCRIPTOR_BUS (NAME_CACHE_0(NAME_TRAP)),
751 1 :       FIU(RIGHT,SIGN),
752 1 :       RETURN;
753 1 :
754 1 :/* 011 - SDP Indirect */
755 1 :       READ TO ACCUMULATOR USING OFF_ALU WITH SDP CON_LENGTH(32),
756 1 :       OFF_ALU_OUT = ACC PLUS SDP,
757 1 :       LOAD_LEN (PREV_A) WITH LITERAL(CON_LENGTH(32)),
758 1 :       LOAD_AON (PREV_A) WITH AON(SDP),
759 1 :       TEST_TO_CC (ACC_BYTE0_NE_0),            /* test neq pre-disp */
760 1 :       GOTO EVAL_A_INDIRECT;
761 1 :
762 1 :/* 010 - SDP Direct */
763 1 :       READ TO EBOX_DATA_Q USING OFF_ALU WITH SDP CON_LENGTH(32),
764 1 :       OFF_ALU_OUT = ACC PLUS SDP,
765 1 :       LOAD_OFF (PREV_A) WITH OFFSET,
766 1 :       LOAD (ACCUMULATOR) WITH OFFSET,
767 1 :       LOAD_LEN (PREV_A) WITH LITERAL(CON_LENGTH(32)),
768 1 :       LOAD_AON (PREV_A) WITH AON_VIA_DESCRIPTOR_BUS(SDP),
769 1 :       SOURCE (OFF_ALU WITH SDP)
770 1 :           TO DESCRIPTOR_BUS (NAME_CACHE_0(NAME_TRAP)),
771 1 :       FIU(RIGHT,SIGN),
772 1 :       RETURN;
773 1 :
774 1 :/* 101 - PBP Indirect  (Really illegal) */
775 1 :EVAL_A_IND_END:
776 1 :       LOAD_AON (CURRENT(7)) WITH 0,
777 1 :       RETURN;
778 1 :
779 1 :/* 100 - PBP Direct */
780 1 :       READ TO EBOX_DATA_Q USING OFF_ALU WITH PBP CON_LENGTH(32),
781 1 :       OFF_ALU_OUT = ACC PLUS PBP,
782 1 :       LOAD_OFF (PREV_A) WITH OFFSET,
783 1 :       LOAD (ACCUMULATOR) WITH OFFSET,
784 1 :       LOAD_LEN (PREV_A) WITH LITERAL(CON_LENGTH(32)),
785 1 :       LOAD_AON (PREV_A) WITH AON_VIA_DESCRIPTOR_BUS(PBP),
786 1 :       SOURCE (OFF_ALU WITH PBP)
787 1 :           TO DESCRIPTOR_BUS (NAME_CACHE_0(NAME_TRAP)),
788 1 :       FIU(RIGHT,SIGN),
789 1 :       RETURN;
790 1 :
791 1 :/* 111 - Name */
792 1 :       NOP;
793 1 :
794 1 :/* 110 - Name */
795 1 :       READ TO ACCUMULATOR USING OFF_ALU WITH NT_PTR CON_LENGTH(32),
796 1 :       OFF_ALU_OUT =
797 1 :           NAME_TRAP (ZERO_EXTEND) LEFT_SHIFTED(5) PLUS NT_PTR,
798 1 :       LONG_CALL RESOLVER*COMMON_MISS;
799 1 :
800 1 :       COPY (PREV_A, REG_A),
801 1 :       LONG_GOTO EVAL_A_END;
802 1 :
803 1 :
```

```
804 1 :EVAL_A_INDIRECT:
805 1 :        WITH TRACE_FLAG,
806 1 :        IF CC_AND_LEN_LE_32 THEN GOTO EVAL_A_IND_ENCACHE;
807 1 :
808 1 :        DISABLE_AON_WRITE,
809 1 :        OFF_ALU_OUT = ACC OR CON_0,
810 1 :        LOAD_OFF (PREV_A) WITH OFFSET,
811 1 :        CASE ON ACC_BYTE(0) MASK @80@ ROTATE(1);
812 1 :
813 1 :/* 0 - Intra Object Pointer */
814 1 :        READ TO EBOX_DATA_Q USING DESCRIPTOR PREV_A BIAS_LENGTH,
815 1 :        LOAD_AON (PREV_A) WITH AON_VIA_DESCRIPTOR_BUS(PREV_A),
816 1 :        FIU(RIGHT,SIGN),
817 1 :        RETURN;
818 1 :
819 1 :/* 1 - General Pointer */
820 1 :        LOAD (CURRENT(7)) WITH DESC_TRAP,
821 1 :        LONG_CALL PTR_TO_DESC*READ_STARTED;
822 1 :
823 1 :        READ TO EBOX_DATA_Q USING OFF_ALU WITH CURRENT(7),
824 1 :        OFF_ALU_OUT = ACC OR CURRENT(7),           CON_LENGTH(32),
825 1 :        LOAD_OFF (PREV_A) WITH OFFSET,
826 1 :        LOAD (ACCUMULATOR) WITH OFFSET,
827 1 :        LOAD_AON (PREV_A) WITH AON_VIA_DESCRIPTOR_BUS(CURRENT(7)),
828 1 :        FIU(RIGHT,SIGN),
829 1 :        LONG_GOTO RES_A_IND_END;
830 1 :
831 1 :EVAL_A_IND_ENCACHE:
832 1 :        DISABLE_AON_WRITE,
833 1 :        OFF_ALU_OUT = ACC OR CON_0,
834 1 :        LOAD_OFF (PREV_A) WITH OFFSET,
835 1 :        CASE ON ACC_BYTE(0) MASK @80@ ROTATE(1);
836 1 :
837 1 :/* 0 - Intra Object Pointer */
838 1 :        READ TO EBOX_DATA_Q USING DESCRIPTOR PREV_A BIAS_LENGTH,
839 1 :        SOURCE (DESCRIPTOR PREV_A)
840 1 :            TO DESCRIPTOR_BUS (NAME_CACHE_0(NAME_TRAP)),
841 1 :        LOAD_AON (PREV_A) WITH AON_VIA_DESCRIPTOR_BUS(PREV_A),
842 1 :        FIU(RIGHT,SIGN),
843 1 :        RETURN;
844 1 :
845 1 :/* 1 - General Pointer */
846 1 :        LOAD (CURRENT(7)) WITH DESC_TRAP,
847 1 :        LONG_CALL PTR_TO_DESC*READ_STARTED;
848 1 :
849 1 :        READ TO EBOX_DATA_Q USING OFF_ALU WITH CURRENT(7),
850 1 :        OFF_ALU_OUT = ACC OR CURRENT(7),           CON_LENGTH(32),
851 1 :        LOAD_OFF (PREV_A) WITH OFFSET,
852 1 :        LOAD (ACCUMULATOR) WITH OFFSET,
853 1 :        LOAD_AON (PREV_A) WITH AON_VIA_DESCRIPTOR_BUS(CURRENT(7)),
854 1 :        FIU(RIGHT,SIGN),
855 1 :        SOURCE (OFF_ALU WITH CURRENT(7))
856 1 :            TO DESCRIPTOR_BUS (NAME_CACHE_0(NAME_TRAP)),
857 1 :        LONG_GOTO RES_A_IND_END;

RESOLVER_TRAPS - RESOLVE (B) Handler 860 1 :/*     01C0    Resolve (1) Jam - Name Cache Hit, Entry is a Weird  */
861 1 :@0C0@ :
862 1 :ENTRY RES_B_WEIRD_HIT:
863 1 :        OFF_ALU_OUT = ACC AND CON_FFFF,
864 1 :        LOAD_LEN (REG_A) WITH OFF,
865 1 :        LONG_CALL RESOLVER*COMMON_WEIRD_HIT;
866 1 :
867 1 :        COPY (PREV_B,REG_A);
868 1 :
869 1 :RES_B_END:
870 1 :        OFF_ALU_OUT = ZERO OR PREV_B,
871 1 :        LOAD (ACCUMULATOR) WITH OFFSET,
872 1 :        LOAD_AON (REG_A) WITH 0,
873 1 :        RETURN;
874 1 :
875 1 :
```

```
876 1 :
877 1 :RES_B_VEC_END:
878 1 :        IES_MULTIPLY,                          /*use cache.1 as scale factor*/
879 1 :        OFF_ALU_OUT = ACC PLUS PREV_B,         /* acc = index value */
880 1 :        LOAD_OFF (PREV_B) WITH OFFSET,
881 1 :        LOAD (ACCUMULATOR) WITH OFFSET,
882 1 :        LOAD_AON (PREV_B) WITH AON(PREV_B),
883 1 :        RETURN;
884 1 :
885 1 :/*     01C4    Resolve (1) Jam - Name Cache Hit, Entry is a Vector */
886 1 :@0C4@ :
887 1 :ENTRY RES_B_VEC_HIT:
888 1 :        LOAD (PREV_B) WITH NAME_CACHE_2(NAME_TRAP),
889 1 :        WITH PREV_B,
890 1 :        IF LEN_LE_32 THEN GOTO RES_B_VEC_END;
891 1 :
892 1 :RES_B_IND_HIT:
893 1 :        LOAD_OFF (FIU.TYPE) WITH AON(PREV_B),
894 1 :        CASE ON ACC_BYTE(0) MASK @80@ ROTATE(1);
895 1 :
896 1 :/* 0 - Intra Object */
897 1 :        DISABLE_AON_WRITE,
898 1 :        OFF_ALU_OUT = ACC PLUS PREV_B,
899 1 :        LOAD_OFF (PREV_B) WITH OFFSET,
900 1 :        LOAD (ACCUMULATOR) WITH OFFSET,
901 1 :        RETURN;
902 1 :
903 1 :/* 1 General Pointer */
904 1 :        LOAD (CURRENT(7)) WITH NAME_CACHE_0(NAME_TRAP),
905 1 :        LONG_CALL PTR_TO_DESC*READ_STARTED;
906 1 :
907 1 :        OFF_ALU_OUT = ACC PLUS PREV_B,
908 1 :        LOAD_OFF (PREV_B) WITH OFFSET;
909 1 :
910 1 :        LOAD (ACCUMULATOR) WITH AON(CURRENT(7)),
911 1 :        LOAD_AON (CURRENT(7)) WITH 0;
912 1 :
913 1 :        INDIVISIBLE,
914 1 :        OFF_ALU_OUT = LIT32(@FFFF0000@) AND FIU.TYPE,
915 1 :        LOAD_OFF (FIU.TYPE) WITH OFFSET;
916 1 :
917 1 :        INDIVISIBLE,
918 1 :        OFF_ALU_OUT = ACC ZERO_HI OR FIU.TYPE,
919 1 :        LOAD_AON (PREV_B) WITH OFFSET,
920 1 :        LONG_GOTO RES_B_END;
921 1 :
922 1 :/*     01CC    Resolve (1) Jam - Name Cache Miss */
923 1 :@0CC@ :
924 1 :RES_B_MISS:
925 1 :        INDIVISIBLE,
926 1 :        LOAD_AON (PREV_B) WITH 0,
927 1 :        OFF_ALU_OUT =
928 1 :            NAME_TRAP (ZERO_EXTEND) LEFT_SHIFTED(4) XOR CON_20000,
929 1 :        LOAD (ACCUMULATOR) WITH OFFSET;
930 1 :
931 1 :        OFF_ALU_OUT = ACC SIGN_EXTEND_LO_HALF LEFT_SHIFTED(1)
932 1 :            OR ZERO_VAL,
933 1 :        LOAD (ACCUMULATOR) WITH OFFSET,
934 1 :        LOAD_LEN (TRACE_FLAG) WITH LEN(READ_TRACING),
935 1 :        CASE ON ACC_BYTE(1) MASK @0E@ ROTATE(7);
936 1 :
937 1 :/* 001 - FP Indirect */
938 1 :        READ TO ACCUMULATOR USING OFF_ALU WITH FP CON_LENGTH(32),
939 1 :        OFF_ALU_OUT = ACC PLUS FP,
940 1 :        LOAD_LEN (PREV_B) WITH LITERAL(CON_LENGTH(32)),
941 1 :        LOAD_AON (PREV_B) WITH AON(FP),
942 1 :        TEST_TO_CC (ACC_BYTE0_NE_0),           /* test neg pre-disp */
943 1 :        GOTO RES_B_INDIRECT;
944 1 :
945 1 :/* 000 - FP Direct */
946 1 :        OFF_ALU_OUT = ACC PLUS FP,
947 1 :        LOAD_OFF (PREV_B) WITH OFFSET,
```

```
948  1 :         LOAD (ACCUMULATOR) WITH OFFSET,
949  1 :         LOAD_LEN (PREV_B) WITH LITERAL(CON_LENGTH(32)),
950  1 :         LOAD_AON (PREV_B) WITH AON_VIA_DESCRIPTOR_BUS(FP),
951  1 :         SOURCE (OFF_ALU WITH FP)
952  1 :             TO DESCRIPTOR_BUS (NAME_CACHE_0(NAME_TRAP)),
953  1 :         FIU(RIGHT,SIGN),
954  1 :         RETURN;
955  1 :
956  1 :/* 011 - SDP Indirect */
957  1 :         READ TO ACCUMULATOR USING OFF_ALU WITH SDP CON_LENGTH(32),
958  1 :         OFF_ALU_OUT = ACC PLUS SDP,
959  1 :         LOAD_LEN (PREV_B) WITH LITERAL(CON_LENGTH(32)),
960  1 :         LOAD_AON (PREV_B) WITH AON(SDP),
961  1 :         TEST_TO_CC (ACC_BYTE0_NE_0),           /* test neg pre-disp */
962  1 :         GOTO RES_B_INDIRECT;
963  1 :
964  1 :/* 010 - SDP Direct */
965  1 :         OFF_ALU_OUT = ACC PLUS SDP,
966  1 :         LOAD_OFF (PREV_B) WITH OFFSET,
967  1 :         LOAD (ACCUMULATOR) WITH OFFSET,
968  1 :         LOAD_LEN (PREV_B) WITH LITERAL(CON_LENGTH(32)),
969  1 :         LOAD_AON (PREV_B) WITH AON_VIA_DESCRIPTOR_BUS(SDP),
970  1 :         SOURCE (OFF_ALU WITH SDP)
971  1 :             TO DESCRIPTOR_BUS (NAME_CACHE_0(NAME_TRAP)),
972  1 :         FIU(RIGHT,SIGN),
973  1 :         RETURN;
974  1 :
975  1 :/* 101 - PBP Indirect   (Really illegal) */
976  1 :RES_B_IND_END:
977  1 :         LOAD_AON (CURRENT(7)) WITH 0,
978  1 :         RETURN;
979  1 :
980  1 :/* 100 - PBP Direct */
981  1 :         OFF_ALU_OUT = ACC PLUS PBP,
982  1 :         LOAD_OFF (PREV_B) WITH OFFSET,
983  1 :         LOAD (ACCUMULATOR) WITH OFFSET,
984  1 :         LOAD_LEN (PREV_B) WITH LITERAL(CON_LENGTH(32)),
985  1 :         LOAD_AON (PREV_B) WITH AON_VIA_DESCRIPTOR_BUS(PBP),
986  1 :         SOURCE (OFF_ALU WITH PBP)
987  1 :             TO DESCRIPTOR_BUS (NAME_CACHE_0(NAME_TRAP)),
988  1 :         FIU(RIGHT,SIGN),
989  1 :         RETURN;
990  1 :
991  1 :/* 111 - Name */
992  1 :         NOP;
993  1 :
994  1 :/* 110 - Name */
995  1 :         READ TO ACCUMULATOR USING OFF_ALU WITH NT_PTR CON_LENGTH(32),
996  1 :         OFF_ALU_OUT =
997  1 :             NAME_TRAP (ZERO_EXTEND) LEFT_SHIFTED(5) PLUS NT_PTR,
998  1 :         LONG_CALL RESOLVER*COMMON_MISS;
999  1 :
1000 1 :         COPY (PREV_B, REG_A),
1001 1 :         LONG_GOTO RES_B_END;
1002 1 :
1003 1 :
1004 1 :RES_B_INDIRECT:
1005 1 :         WITH TRACE_FLAG,
1006 1 :         IF CC_AND_LEN_LE_32 THEN GOTO RES_B_IND_ENCACHE;
1007 1 :
1008 1 :         DISABLE_AON_WRITE,
1009 1 :         OFF_ALU_OUT = ACC OR CON_0,
1010 1 :         LOAD_OFF (PREV_B) WITH OFFSET,
1011 1 :         CASE ON ACC_BYTE(0) MASK @B0@ ROTATE(1);
1012 1 :
1013 1 :/* 0 - Intra Object Pointer */
1014 1 :         LOAD_AON (PREV_B) WITH AON_VIA_DESCRIPTOR_BUS(PREV_B),
1015 1 :         FIU(RIGHT,SIGN),
1016 1 :         RETURN;
1017 1 :
1018 1 :/* 1 - General Pointer */
```

RESOLVER_TRAPS - RESOLVE (B) Handler

```
1019 1 :        LOAD (CURRENT(7)) WITH DESC_TRAP,
1020 1 :        LONG_CALL PTR_TO_DESC*READ_STARTED;
1021 1 :
1022 1 :        OFF_ALU_OUT = ACC OR CURRENT(7),
1023 1 :        LOAD_OFF (PREV_B) WITH OFFSET,
1024 1 :        LOAD (ACCUMULATOR) WITH OFFSET,
1025 1 :        LOAD_AON (PREV_B) WITH AON_VIA_DESCRIPTOR_BUS(CURRENT(7)),
1026 1 :        FIU(RIGHT,SIGN),
1027 1 :        LONG_GOTO RES_B_IND_END;
1028 1 :
1029 1 :RES_B_IND_ENCACHE:
1030 1 :        DISABLE_AON_WRITE,
1031 1 :        OFF_ALU_OUT = ACC OR CON_0,
1032 1 :        LOAD_OFF (PREV_B) WITH OFFSET,
1033 1 :        CASE ON ACC_BYTE(0) MASK @80@ ROTATE(1);
1034 1 :
1035 1 :/* 0 - Intra Object Pointer */
1036 1 :        SOURCE (DESCRIPTOR PREV_B)
1037 1 :            TO DESCRIPTOR_BUS (NAME_CACHE_0(NAME_TRAP)),
1038 1 :        LOAD_AON (PREV_B) WITH AON_VIA_DESCRIPTOR_BUS(PREV_B),
1039 1 :        FIU(RIGHT,SIGN),
1040 1 :        RETURN;
1041 1 :
1042 1 :/* 1 - General Pointer */
1043 1 :        LOAD (CURRENT(7)) WITH DESC_TRAP,
1044 1 :        LONG_CALL PTR_TO_DESC*READ_STARTED;
1045 1 :
1046 1 :        OFF_ALU_OUT = ACC OR CURRENT(7),
1047 1 :        LOAD_OFF (PREV_B) WITH OFFSET,
1048 1 :        LOAD (ACCUMULATOR) WITH OFFSET,
1049 1 :        LOAD_AON (PREV_B) WITH AON_VIA_DESCRIPTOR_BUS(CURRENT(7)),
1050 1 :        FIU(RIGHT,SIGN),
1051 1 :        SOURCE (OFF_ALU WITH CURRENT(7))
1052 1 :            TO DESCRIPTOR_BUS (NAME_CACHE_0(NAME_TRAP)),
1053 1 :        LONG_GOTO RES_B_IND_END;
```

RESOLVER_TRAPS - EVAL (B) Handler

```
1056 1 :/*     01E0    Eval (1) Jam - Name Cache Hit, Entry is a Weird  */
1057 1 :@0E0@ :
1058 1 :ENTRY EVAL_B_WEIRD_HIT:
1059 1 :        OFF_ALU_OUT = ACC AND CON_FFFF,
1060 1 :        LOAD_LEN (REG_A) WITH OFF,
1061 1 :        LONG_CALL RESOLVER*COMMON_WEIRD_HIT;
1062 1 :
1063 1 :        COPY (PREV_B,REG_A);
1064 1 :
1065 1 :EVAL_B_END:
1066 1 :        READ TO EBOX_DATA_Q USING DESCRIPTOR PREV_B BIAS_LENGTH,
1067 1 :        OFF_ALU_OUT = ZERO OR PREV_B,
1068 1 :        LOAD (ACCUMULATOR) WITH OFFSET,
1069 1 :        LOAD_AON (REG_A) WITH 0,
1070 1 :        RETURN;
1071 1 :
1072 1 :
1073 1 :
1074 1 :EVAL_B_VEC_END:
1075 1 :        READ TO EBOX_DATA_Q USING OFF_ALU WITH PREV_B BIAS_LENGTH,
1076 1 :        IES_MULTIPLY,                   /*use cache.1 as scale factor*/
1077 1 :        OFF_ALU_OUT = ACC PLUS PREV_B,  /* acc = index value */
1078 1 :        LOAD_OFF (PREV_B) WITH OFFSET,
1079 1 :        LOAD (ACCUMULATOR) WITH OFFSET,
1080 1 :        LOAD_AON (PREV_B) WITH AON(PREV_B),
1081 1 :        RETURN;
1082 1 :
1083 1 :/*     01E4    Eval (1) Jam - Name Cache Hit, Entry is a Vector */
1084 1 :@0E4@ :
1085 1 :ENTRY EVAL_B_VEC_HIT:
1086 1 :        LOAD (PREV_B) WITH NAME_CACHE_2(NAME_TRAP),
1087 1 :        WITH PREV_B,
1088 1 :        IF LEN_LE_32 THEN GOTO EVAL_B_VEC_END;
1089 1 :
```

```
1090 1 :EVAL_B_IND_HIT:
1091 1 :        LOAD_OFF (FIU.TYPE) WITH AON(PREV_B),
1092 1 :        CASE ON ACC_BYTE(0) MASK @80@ ROTATE(1);
1093 1 :
1094 1 :/* 0 - Intra Object */
1095 1 :        READ TO EBOX_DATA_Q USING OFF_ALU WITH PREV_B BIAS_LENGTH,
1096 1 :        DISABLE_AON_WRITE,
1097 1 :        OFF_ALU_OUT = ACC PLUS PREV_B,
1098 1 :        LOAD_OFF (PREV_B) WITH OFFSET,
1099 1 :        LOAD (ACCUMULATOR) WITH OFFSET,
1100 1 :        RETURN;
1101 1 :
1102 1 :/* 1 - General Pointer */
1103 1 :        LOAD (CURRENT(7)) WITH NAME_CACHE_0(NAME_TRAP),
1104 1 :        LONG_CALL PTR_TO_DESC*READ_STARTED;
1105 1 :
1106 1 :        OFF_ALU_OUT = ACC PLUS PREV_B,
1107 1 :        LOAD_OFF (PREV_B) WITH OFFSET;
1108 1 :
1109 1 :        LOAD (ACCUMULATOR) WITH AON(CURRENT(7)),
1110 1 :        LOAD_AON (CURRENT(7)) WITH 0;
1111 1 :
1112 1 :        INDIVISIBLE,
1113 1 :        OFF_ALU_OUT = LIT32(@FFFF0000@) AND FIU.TYPE,
1114 1 :        LOAD_OFF (FIU.TYPE) WITH OFFSET;
1115 1 :
1116 1 :        INDIVISIBLE,
1117 1 :        OFF_ALU_OUT = ACC ZERO_HI OR FIU.TYPE,
1118 1 :        LOAD_AON (PREV_B) WITH OFFSET,
1119 1 :        LONG_GOTO FVAL_B_END;
1120 1 :
1121 1 :
1122 1 :/*      01FC    Eval (1) Jam - Name Cache Miss */
1123 1 :@0FC@ :
1124 1 :EVAL_B_MISS:
1125 1 :        INDIVISIBLE,
1126 1 :        LOAD_AON (PREV_B) WITH 0,
1127 1 :        OFF_ALU_OUT =
1128 1 :            NAME_TRAP (ZERO_EXTEND) LEFT_SHIFTED(4) XOR CON_20000,
1129 1 :        LOAD (ACCUMULATOR) WITH OFFSET;
1130 1 :
1131 1 :        OFF_ALU_OUT = ACC SIGN_EXTEND_LO_HALF LEFT_SHIFTED(1)
1132 1 :            OR ZERO_VAL,
1133 1 :        LOAD (ACCUMULATOR) WITH OFFSET,
1134 1 :        LOAD_LEN (TRACE_FLAG) WITH LEN(READ_TRACING),
1135 1 :        CASE ON ACC_BYTE(1) MASK @0E@ ROTATE(7);
1136 1 :
1137 1 :/* 001 - FP Indirect */
1138 1 :        READ TO ACCUMULATOR USING OFF_ALU WITH FP CON_LENGTH(32),
1139 1 :        OFF_ALU_OUT = ACC PLUS FP,
1140 1 :        LOAD_LEN (PREV_B) WITH LITERAL(CON_LENGTH(32)),
1141 1 :        LOAD_AON (PREV_B) WITH AON(FP),
1142 1 :        TEST_TO_CC (ACC_BYTE0_NE_0),          /* test neg pre-disp */
1143 1 :        GOTO EVAL_B_INDIRECT;
1144 1 :
1145 1 :/* 000 - FP Direct */
1146 1 :        READ TO EBOX_DATA_Q USING OFF_ALU WITH FP CON_LENGTH(32),
1147 1 :        OFF_ALU_OUT = ACC PLUS FP,
1148 1 :        LOAD_OFF (PREV_B) WITH OFFSET,
1149 1 :        LOAD (ACCUMULATOR) WITH OFFSET,
1150 1 :        LOAD_LEN (PREV_B) WITH LITERAL(CON_LENGTH(32)),
1151 1 :        LOAD_AON (PREV_B) WITH AON_VIA_DESCRIPTOR_BUS(FP),
1152 1 :        SOURCE (OFF_ALU WITH FP)
1153 1 :            TO DESCRIPTOR_BUS (NAME_CACHE_0(NAME_TRAP)),
1154 1 :        FIU(RIGHT,SIGN),
1155 1 :        RETURN;
1156 1 :
1157 1 :/* 011 - SDP Indirect */
1158 1 :        READ TO ACCUMULATOR USING OFF_ALU WITH SDP CON_LENGTH(32),
1159 1 :        OFF_ALU_OUT = ACC PLUS SDP,
1160 1 :        LOAD_LEN (PREV_B) WITH LITERAL(CON_LENGTH(32)),
1161 1 :        LOAD_AON (PREV_B) WITH AON(SDP),
```

RESOLVER_TRAPS - EVAL (B) Handler

```
1162 1 :          TEST_TO_CC (ACC_BYTE0_NE_0),            /* test neg pre-disp */
1163 1 :          GOTO EVAL_B_INDIRECT;
1164 1 :
1165 1 :/* 010 - SDP Direct */
1166 1 :          READ TO EBOX_DATA_Q USING OFF_ALU WITH SDP CON_LENGTH(32),
1167 1 :          OFF_ALU_OUT = ACC PLUS SDP,
1168 1 :          LOAD_OFF (PREV_B) WITH OFFSET,
1169 1 :          LOAD (ACCUMULATOR) WITH OFFSET,
1170 1 :          LOAD_LEN (PREV_B) WITH LITERAL(CON_LENGTH(32)),
1171 1 :          LOAD_AON (PREV_B) WITH AON_VIA_DESCRIPTOR_BUS(SDP),
1172 1 :          SOURCE (OFF_ALU WITH SDP)
1173 1 :              TO DESCRIPTOR_BUS (NAME_CACHE_O(NAME_TRAP)),
1174 1 :          FIU(RIGHT,SIGN),
1175 1 :          RETURN;
1176 1 :
1177 1 :/* 101 - PBP Indirect  (Really illegal) */
1178 1 :EVAL_B_IND_END:
1179 1 :          LOAD_AON (CURRENT(7)) WITH 0,
1180 1 :          RETURN;
1181 1 :
1182 1 :/* 100 - PBP Direct */
1183 1 :          READ TO EBOX_DATA_Q USING OFF_ALU WITH PBP CON_LENGTH(32),
1184 1 :          OFF_ALU_OUT = ACC PLUS PBP,
1185 1 :          LOAD_OFF (PREV_B) WITH OFFSET,
1186 1 :          LOAD (ACCUMULATOR) WITH OFFSET,
1187 1 :          LOAD_LEN (PREV_B) WITH LITERAL(CON_LENGTH(32)),
1188 1 :          LOAD_AON (PREV_B) WITH AON_VIA_DESCRIPTOR_BUS(PBP),
1189 1 :          SOURCE (OFF_ALU WITH PBP)
1190 1 :              TO DESCRIPTOR_BUS (NAME_CACHE_O(NAME_TRAP)),
1191 1 :          FIU(RIGHT,SIGN),
1192 1 :          RETURN;
1193 1 :
1194 1 :/* 111 - Name */
1195 1 :          NOP;
1196 1 :
1197 1 :/* 110 - Name */
1198 1 :          READ TO ACCUMULATOR USING OFF_ALU WITH NT_PTR CON_LENGTH(32),
1199 1 :          OFF_ALU_OUT =
1200 1 :              NAME_TRAP (ZERO_EXTEND) LEFT_SHIFTED(5) PLUS NT_PTR,
1201 1 :          LONG_CALL RESOLVER*COMMON_MISS;
1202 1 :
1203 1 :          COPY (PREV_B, REG_A),
1204 1 :          LONG_GOTO EVAL_B_END;
1205 1 :
1206 1 :
1207 1 :EVAL_B_INDIRECT:
1208 1 :          WITH TRACE_FLAG,
1209 1 :          IF CC_AND_LEN_LE_32 THEN GOTO EVAL_B_IND_ENCACHE;
1210 1 :
1211 1 :          DISABLE_AON_WRITE,
1212 1 :          OFF_ALU_OUT = ACC OR CON_0,
1213 1 :          LOAD_OFF (PREV_B) WITH OFFSET,
1214 1 :          CASE ON ACC_BYTE(0) MASK #80A ROTATE(1);
1215 1 :
1216 1 :/* 0 - Intra Object Pointer */
1217 1 :          READ TO EBOX_DATA_Q USING DESCRIPTOR PREV_B BIAS_LENGTH,
1218 1 :          LOAD_AON (PREV_B) WITH AON_VIA_DESCRIPTOR_BUS(PREV_B),
1219 1 :          FIU(RIGHT,SIGN),
1220 1 :          RETURN;
1221 1 :
1222 1 :/* 1 - General Pointer */
1223 1 :          LOAD (CURRENT(7)) WITH DESC_TRAP,
1224 1 :          LONG_CALL PTR_TO_DESC*READ_STARTED;
1225 1 :
1226 1 :          READ TO EBOX_DATA_Q USING OFF_ALU WITH CURRENT(7),
1227 1 :          OFF_ALU_OUT = ACC OR CURRENT(7),              CON_LENGTH(32),
1228 1 :          LOAD_OFF (PREV_B) WITH OFFSET,
1229 1 :          LOAD (ACCUMULATOR) WITH OFFSET,
1230 1 :          LOAD_AON (PREV_B) WITH AON_VIA_DESCRIPTOR_BUS(CURRENT(7)),
1231 1 :          FIU(RIGHT,SIGN),
1232 1 :          LONG_GOTO RES_B_IND_END;
1233 1 :
```

```
1234 1 :EVAL_B_IND_ENCACHE:
1235 1 :         DISABLE_AON_WRITE,
1236 1 :         OFF_ALU_OUT = ACC OR CON_0,
1237 1 :         LOAD_OFF (PREV_B) WITH OFFSET,
1238 1 :         CASE ON ACC_BYTE(0) MASK @80@ ROTATE(1);
1239 1 :
1240 1 :/* 0 - Intra Object Pointer */
1241 1 :         READ TO EBOX_DATA_Q USING DESCRIPTOR PREV_B BIAS_LENGTH,
1242 1 :         SOURCE (DESCRIPTOR PREV_B)
1243 1 :             TO DESCRIPTOR_BUS (NAME_CACHE_0(NAME_TRAP)),
1244 1 :         LOAD_AON (PREV_B) WITH AON_VIA_DESCRIPTOR_BUS(PREV_B),
1245 1 :         FIU(RIGHT,SIGN),
1246 1 :         RETURN;
1247 1 :
1248 1 :/* 1 - General Pointer */
1249 1 :         LOAD (CURRENT(7)) WITH DESC_TRAP,
1250 1 :         LONG_CALL PTR_TO_DESC*READ_STARTED;
1251 1 :
1252 1 :         READ TO EBOX_DATA_Q USING OFF_ALU WITH CURRENT(7),
1253 1 :         OFF_ALU_OUT = ACC OR CURRENT(7),              CON_LENGTH(32),
1254 1 :         LOAD_OFF (PREV_B) WITH OFFSET,
1255 1 :         LOAD (ACCUMULATOR) WITH OFFSET,
1256 1 :         LOAD_AON (PREV_B) WITH AON_VIA_DESCRIPTOR_BUS(CURRENT(7)),
1257 1 :         FIU(RIGHT,SIGN),
1258 1 :         SOURCE (OFF_ALU WITH CURRENT(7))
1259 1 :             TO DESCRIPTOR_BUS (NAME_CACHE_0(NAME_TRAP)),
1260 1 :         LONG_GOTO RES_B_IND_END;
1261 1 :
1262 1 :END      /************** name resolve traps **************/

IPUT FILE:   ?11.I_FILE1A
JJECT FILE: RESOLVER_TRAPS.OB

INE N :SOURCE 238 0 : BEGIN
251 1 : @000@ :
252 1 : ENTRY RES_C_WEIRD_HIT :
253 1 : OFF_ALU_OUT = ACC AND COMMON ( @C@ , 6 ) ,
  M 1 :   alu_in 2  alu_op 6  src_frame 2 , r_source 6 , com_ext @C@ ,
254 1 : LOAD_LEN ( CURRENT ( 0 ) ) WITH OFF ,
  M 1 : dest_frame 0 , r_dest 0 , r_w 1  l_in    3 , db_ctrl 1    ,
255 1 : LONG_CALL RESOLVER * COMMON_WEIRD_HI
  M 1 : nac 7 , lit14  RESOLVER * COMMON_WEIRD_HI
255 1 : ;
257 1 : OFF_ALU_OUT = ZERO OR CURRENT ( 0 ) , LOAD_OFF (
257 1 : PREVIOUS ( 2 ) ) WITH OFFSET , LOAD_LEN ( PREVIOUS ( 2 ) )
  M 1 :   alu_in 2 , rand 2  alu_op 5  src_frame 0 , r_source
  M 1 : 0 , dest_frame 3 , r_dest 2 , r_w 1  o_in    3 ,
  M 1 : dest_frame 3 , r_dest 2 , r_w 1  l_in
257 1 : WITH LEN ( CURRENT ( 0 ) ) , LOAD_AON ( PREVIOUS
257 1 : ( 2 ) ) WITH AON ( CURRENT ( 0 ) )
  M 1 :  2 , src_frame 0 , r_source 0    , dest_frame 3 ,
  M 1 : r_dest 2 , r_w 1  a_in   2 , src_frame 0 , r_source 0
257 1 : ;
259 1 : RES_C_END :
260 1 : OFF_ALU_OUT = ZERO OR PREVIOUS ( 2 ) ,
  M 1 :   alu_in 2 , rand 2  alu_op 5  src_frame 3 , r_source 2   ,
261 1 : LOAD ( ACCUMULATOR ) WITH OFFSET ,
  M 1 : a_w 1 , o_in   3   ,
262 1 : LOAD_AON ( CURRENT ( 0 ) ) WITH 0 ,
  M 1 : dest_frame 0 , r_dest 0 , r_w 1  a_in    0 ,
263 1 : RETURN
  M 1 : nac 2
263 1 : ;
267 1 : RES_C_VEC_END :
268 1 : IES_MULTIPLY ,
  M 1 : rand 9 , nb_ctrl 2 , dev_cmd 61 ,
269 1 : OFF_ALU_OUT = ACC PLUS PREVIOUS ( 2 ) ,
  M 1 :   alu_in 2  alu_op 3  src_frame 3 , r_source 2  ,
270 1 : LOAD_OFF ( PREVIOUS ( 2 ) ) WITH OFFSET ,
  M 1 : dest_frame 3 , r_dest 2 , r_w 1  o_in   3 ,
```

```
271 1 : LOAD ( ACCUMULATOR ) WITH OFFSET ,
  M 1 : a_w 1 , o_in    3 ,
272 1 : LOAD_AON ( PREVIOUS ( 2 ) ) WITH AON ( PREVIOUS ( 2 ) ) ,
  M 1 : dest_frame 3 , r_dest 2 , r_w 1  a_in   2 , src_frame
  M 1 : 3 , r_source 2   ,
273 1 : RETURN
  M 1 : nac 2
273 1 : ;
276 1 : @004@ :
277 1 : ENTRY RES_C_VEC_HIT :
278 1 : LOAD ( PREVIOUS ( 2 ) ) WITH NAME_CACHE_2 ( NAME_TRAP ) ,
  M 1 : dest_frame 3 , r_dest 2 , r_w 1 , a_in 1 , o_in 1
  M 1 : , l_in 1    dev_cmd 54 , nb_ctrl 2   ,
279 1 : WITH PREVIOUS ( 2 ) ,
  M 1 :  src_frame 3 , r_source 2 ,
280 1 : IF LEN_LE_3? THEN GOTO RES_C_VEC_END
  M 1 : test  9 , polarity 1   nac 4 , lit8  RES_C_VEC_END
280 1 : ;
282 1 : RES_C_IND_HIT :
283 1 : LOAD_OFF ( CURRENT ( 6 ) ) WITH AON ( PREVIOUS ( 2 ) ) ,
  M 1 : dest_frame 0 , r_dest 6 , r_w 1  o_in   2 , src_frame
  M 1 : 3 , r_source 2   ,
284 1 : CASE ON ACC_BYTE ( 0 ) MASK @80@ ROTATE ( 1 )
  M 1 : nac 3   srce 4   mask  @80@ sc 6
284 1 : ;
287 1 : DISABLE_AON_WRI ,
  M 1 : rand 8 ,
288 1 : OFF_ALU_OUT = ACC PLUS PREVIOUS ( 2 ) ,
  M 1 :   alu_in 2  alu_op 3  src_frame 3 , r_source 2 ,
289 1 : LOAD_OFF ( PREVIOUS ( 2 ) ) WITH OFFSET ,
  M 1 : dest_frame 3 , r_dest 2 , r_w 1  o_in   3 ,
290 1 : LOAD ( ACCUMULATOR ) WITH OFFSET ,
  M 1 : a_w 1 , o_in   3 ,
291 1 : RETURN
  M 1 : nac 2
291 1 : ;
294 1 : LOAD ( CURRENT ( 7 ) ) WITH NAME_CACHE_0 ( NAME_TRAP ) ,
  M 1 : dest_frame 0 , r_dest 7 , r_w 1 , a_in 1 , o_in 1
  M 1 : , l_in 1    dev_cmd 52 , nb_ctrl 2   ,
295 1 : LONG_CALL PTR_TO_DESC * READ_STARTED
  M 1 : nac 7 , lit14  PTR_TO_DESC * READ_STARTED
295 1 : ;
297 1 : OFF_ALU_OUT = ACC PLUS PREVIOUS ( 2 ) ,
  M 1 :   alu_in 2  alu_op 3  src_frame 3 , r_source 2 ,
298 1 : LOAD_OFF ( PREVIOUS ( 2 ) ) WITH OFFSET
  M 1 : dest_frame 3 , r_dest 2 , r_w 1  o_in   3
298 1 : ;
300 1 : LOAD ( ACCUMULATOR ) WITH AON ( CURRENT ( 7 ) ) ,
  M 1 : a_w 1 , o_in   2 , src_frame 0 , r_source 7   ,
301 1 : LOAD_AUN ( CURRENT ( 7 ) ) WITH 0
  M 1 : dest_frame 0 , r_dest 7 , r_w 1  a_in   0
301 1 : ;
303 1 : INDIVISIBLE ,
  M 1 : rand 15 ,
304 1 : OFF_ALU_OUT = LIT32 ( @FFFF0000@ ) AND CURRENT ( 6 ) ,
  M 1 :   alu_in 3 , 1 1 , lit32 @FFFF0000@  alu_op 6  src_frame
  M 1 : 0 , r_source 6 ,
305 1 : LOAD_OFF ( CURRENT ( 6 ) ) WITH OFFSET
  M 1 : dest_frame 0 , r_dest 6 , r_w 1  o_in   3
305 1 : ;
307 1 : INDIVISIBLE ,
  M 1 : rand 15 ,
308 1 : OFF_ALU_OUT = ACC ZERO_HI OR CURRENT ( 6 ) ,
  M 1 :   alu_in 2  dev_cmd 3  alu_op 5  src_frame 0 , r_source 6 ,
309 1 : LOAD_AUN ( PREVIOUS ( 2 ) ) WITH OFFSET ,
  M 1 : dest_frame 3 , r_dest 2 , r_w 1  a_in   3 ,
310 1 : LONG_GOTO RES_C_END
  M 1 : nac 6 , lit14  RES_C_END
310 1 : ;
313 1 : @00C@ :
314 1 : RES_C_MISS :
```

```
315 1 : INDIVISIBLE ,
  M 1 : rand 15 ,
316 1 : LOAD_AON ( PREVIOUS ( 2 ) ) WITH 0 ,
  M 1 : dest_frame 3 , r_dest 2 , r_w 1  a_in   0 ,
317 1 : OFF_ALU_OUT =
  M 1 :
318 1 : NAME_TRAP ( ZERO_EXTEND ) LEFT_SHIFTED ( 4 ) XOR
318 1 : COMMON ( @C@ , 2 ) ,
  M 1 : alu_in 2 , nb_ctrl 2 , dev_cmd 4  sf 4  alu_op 4
  M 1 :  src_frame 2 , r_source 2 , com_ext @C@ ,
319 1 : LOAD ( ACCUMULATOR ) WITH OFFSET
  M 1 : a_w 1 , o_in    3
319 1 : ;
321 1 : OFF_ALU_OUT = ACC SIGN_EXTEND_LO_ LEFT_SHIFTED ( 1 )
  M 1 :   alu_in 2  dev_cmd 5  sf 1
322 1 : OR COMMON ( 2 , 6 ) ,
  M 1 : alu_op 5  src_frame 2 , r_source 6 , com_ext 2 ,
323 1 : LOAD ( ACCUMULATOR ) WITH OFFSET ,
  M 1 : a_w 1 , o_in    3 ,
324 1 : LOAD_LEN ( CURRENT ( 0 ) ) WITH LEN ( COMMON ( 2 , 6 ) ) ,
  M 1 : dest_frame 0 , r_dest 0 , r_w 1  l_in   2 , src_frame
  M 1 : 2 , r_source 6 , com_ext 2  ,
325 1 : CASE ON ACC_BYTE ( 1 ) MASK @0E@ PUTATE ( 7 )
  M 1 : nac 3  srce 5  mask  @0E@ sc 0
325 1 : ;
328 1 : READ TU ACCUMULATOR USING OFF_ALU WITH COMMON ( 2
328 1 : , 1 ) CON_LENGTH ( 32 ) ,
  M 1 : mem 1   md 1   db_ctrl 1  src_frame 2 , r_source
  M 1 : 1 , com_ext 2  len_ctrl 6  ,
329 1 : OFF_ALU_OUT = ACC PLUS COMMON ( 2 , 1 ) ,
  M 1 :   alu_in 2  alu_op 3  src_frame 2 , r_source 1 , com_ext 2 ,
330 1 : LOAD_LEN ( PREVIOUS ( 2 ) ) WITH LITERAL ( CON_LENGTH ( 32 ) ) ,
  M 1 : dest_frame 3 , r_dest 2 , r_w 1  l_in   1 , len_ctrl 6  ,
331 1 : LOAD_AON ( PREVIOUS ( 2 ) ) WITH AON ( COMMON ( 2 , 1 ) ) ,
  M 1 : dest_frame 3 , r_dest 2 , r_w 1  a_in   2 , src_frame
  M 1 : 2 , r_source 1 , com_ext 2  ,
332 1 : TEST_TO_CC ( ACC_BYTE0_NE_0 ) ,
  M 1 : rand 10 , test 7 , lit@ 1 ,
333 1 : GOTO RES_C_INDIRECT
  M 1 : nac 4 , lit@ RES_C_INDIRECT
333 1 : ;
336 1 : OFF_ALU_OUT = ACC PLUS COMMON ( 2 , 1 ) ,
  M 1 :   alu_in 2  alu_op 3  src_frame 2 , r_source 1 , com_ext 2 ,
337 1 : LOAD_OFF ( PREVIOUS ( 2 ) ) WITH OFFSET ,
  M 1 : dest_frame 3 , r_dest 2 , r_w 1  o_in   3 ,
338 1 : LOAD ( ACCUMULATOR ) WITH OFFSET ,
  M 1 : a_w 1 , o_in    3 ,
339 1 : LOAD_LEN ( PREVIOUS ( 2 ) ) WITH LITERAL ( CON_LENGTH ( 32 ) ) ,
  M 1 : dest_frame 3 , r_dest 2 , r_w 1  l_in   1 , len_ctrl 6  ,
340 1 : LOAD_AON ( PREVIOUS ( 2 ) ) WITH 1 COMMON ( 2 , 1 ) ,
  M 1 : dest_frame 3 , r_dest 2 , r_w 1  a_in   1  src_frame
  M 1 : 2 , r_source 1 , com_ext 2 ,
341 1 : SOURCE ( OFF_ALU WITH COMMON ( 2 , 1 ) )
  M 1 : db_ctrl 1   src_frame 2 , r_source 1 , com_ext 2
342 1 : TO DESCRIPTOR_BUS ( NAME_CACHE_0 ( NAME_TRAP ) ) ,
  M 1 :   dev_cmd 48 , nb_ctrl 2   ,
343 1 : FIU ( RIGHT , SIGN ) ,
  M 1 : rand 5   ,
344 1 : RETURN
  M 1 : nac 2
344 1 : ;
347 1 : READ TU ACCUMULATOR USING OFF_ALU WITH COMMON ( 2
347 1 : , 2 ) CON_LENGTH ( 32 ) ,
  M 1 : mem 1   md 1   db_ctrl 1  src_frame 2 , r_source
  M 1 : 2 , com_ext 2  len_ctrl 6  ,
348 1 : OFF_ALU_OUT = ACC PLUS COMMON ( 2 , 2 ) ,
  M 1 :   alu_in 2  alu_op 3  src_frame 2 , r_source 2 , com_ext 2 ,
349 1 : LOAD_LEN ( PREVIOUS ( 2 ) ) WITH LITERAL ( CON_LENGTH ( 32 ) ) ,
  M 1 : dest_frame 3 , r_dest 2 , r_w 1  l_in   1 , len_ctrl 6  ,
350 1 : LOAD_AON ( PREVIOUS ( 2 ) ) WITH AON ( COMMON ( 2 , 2 ) ) ,
  M 1 : dest_frame 3 , r_dest 2 , r_w 1  a_in   2 , src_frame
  M 1 : 2 , r_source 2 , com_ext 2 ,
351 1 : TEST_TO_CC ( ACC_BYTE0_NE_0 ) ,
```

```
  M 1 : rand 10 , test 7 , lit8 1       ,
552 1 : GOTO RES_C_INDIRECT
  M 1 : nac 4 , lit8 RES_C_INDIRECT
352 1 : ;
555 1 : OFF_ALU_OUT = ACC PLUS COMMON ( 2 , 2 ) ,
  M 1 :    alu_in 2  alu_op 3  src_frame 2 , r_source 2 , com_ext 2 ,
356 1 : LOAD_OFF ( PREVIOUS ( 2 ) ) WITH OFFSET ,
  M 1 : dest_frame 3 , r_dest 2 , r_w 1  o_in   3  ,
357 1 : LOAD ( ACCUMULATOR ) WITH OFFSET ,
  M 1 : a_w 1 , o_in    3  ,
358 1 : LOAD_LEN ( PREVIOUS ( 2 ) ) WITH LITERAL ( CON_LENGTH ( 32 ) ) ,
  M 1 : dest_frame 3 , r_dest 2 , r_w 1  l_in   1 , len_ctrl 6       ,
359 1 : LOAD_AON ( PREVIOUS ( 2 ) ) WITH 1 COMMON ( 2 , 2 ) ,
  M 1 : dest_frame 3 , r_dest 2 , r_w 1  a_in   1 src_frame
  M 1 : 2 , r_source 2 , com_ext 2  ,
360 1 : SOURCE ( OFF_ALU WITH COMMON ( 2 , 2 ) )
  M 1 : db_ctrl 1    src_frame 2 , r_source 2 , com_ext 2
361 1 : TO DESCRIPTOR_BUS ( NAME_CACHE_0 ( NAME_TRAP ) ) ,
  M 1 :   dev_cmd 48 , nb_ctrl 2     ,
362 1 : FIU ( RIGHT , SIGN ) ,
  M 1 : rand 5    ,
563 1 : RETURN
  M 1 : nac 2
563 1 : ;
566 1 : RES_C_IND_END :
567 1 : LOAD_AON ( CURRENT ( 7 ) ) WITH 0 ,
  M 1 : dest_frame 0 , r_dest 7 , r_w 1  a_in    0 ,
368 1 : RETURN
  M 1 : nac 2
368 1 : ;
371 1 : OFF_ALU_OUT = ACC PLUS COMMON ( 2 , 0 ) ,
  M 1 :    alu_in 2  alu_op 3  src_frame 2 , r_source 0 , com_ext 2 ,
372 1 : LOAD_OFF ( PREVIOUS ( 2 ) ) WITH OFFSET ,
  M 1 : dest_frame 3 , r_dest 2 , r_w 1  o_in   3  ,
373 1 : LOAD ( ACCUMULATOR ) WITH OFFSET ,
  M 1 : a_w 1 , o_in    3  ,
374 1 : LOAD_LEN ( PREVIOUS ( 2 ) ) WITH LITERAL ( CON_LENGTH ( 32 ) ) ,
  M 1 : dest_frame 3 , r_dest 2 , r_w 1  l_in   1 , len_ctrl 6       ,
375 1 : LOAD_AON ( PREVIOUS ( 2 ) ) WITH 1 COMMON ( 2 , 0 ) ,
  M 1 : dest_frame 3 , r_dest 2 , r_w 1  a_in   1 src_frame
  M 1 : 2 , r_source 0 , com_ext 2  ,
376 1 : SOURCE ( OFF_ALU WITH COMMON ( 2 , 0 ) )
  M 1 : db_ctrl 1    src_frame 2 , r_source 0 , com_ext 2
377 1 : TO DESCRIPTOR_BUS ( NAME_CACHE_0 ( NAME_TRAP ) ) ,
  M 1 :   dev_cmd 48 , nb_ctrl 2     ,
378 1 : FIU ( RIGHT , SIGN ) ,
  M 1 : rand 5    ,
379 1 : RETURN
  M 1 : nac 2
379 1 : ;
382 1 : NOP
  M 1 : timing 0
382 1 : ;
385 1 : READ TO ACCUMULATOR USING OFF_ALU WITH COMMON ( 2
385 1 : , 4 ) CON_LENGTH ( 32 ) ,
  M 1 : mem 1   md 1   db_ctrl 1    src_frame 2 , r_source
  M 1 : 4 , com_ext 2  len_ctrl 6      ,
386 1 : OFF_ALU_OUT =
  M 1 :
387 1 : NAME_TRAP ( ZERO_EXTEND ) LEFT_SHIFTED ( 5 ) PLUS
387 1 : COMMON ( 2 , 4 ) ,
  M 1 : alu_in 2 , nb_ctrl 2 , dev_cmd 4   st 5  alu_op 3
  M 1 :  src_frame 2 , r_source 4 , com_ext 2  ,
388 1 : LONG_CALL RESOLVER * COMMON_MISS
  M 1 : nac 7 , lit14 RESOLVER * COMMON_MISS
388 1 : ;
390 1 : OFF_ALU_OUT = ZERO OR CURRENT ( 0 ) , LOAD_OFF (
390 1 : PREVIOUS ( 2 ) ) WITH OFFSET , LOAD_LEN ( PREVIOUS ( 2 ) )
  M 1 :    alu_in 2 , rand 2   alu_op 5  src_frame 0 , r_source
  M 1 : 0 , dest_frame 3 , r_dest 2 , r_w 1  o_in   3  ,
  M 1 : dest_frame 3 , r_dest 2 , r_w 1  l_in
390 1 : WITH LEN ( CURRENT ( 0 ) ) , LOAD_AON ( PREVIOUS
390 1 : ( 2 ) ) WITH AON ( CURRENT ( 0 ) )
```

```
        M 1 :    2 , src_frame 0 , r_source 0     , dest_frame 3 ,
        M 1 :  r_dest 2 , r_w 1   a_in    2 , src_frame 0 , r_source 0
  390   1 : ;
  391   1 : LONG_GOTO RES_C_END
        M 1 : nac 6 , lit14  RES_C_END
  391   1 : ;
  394   1 : RES_C_INDIRECT :
  395   1 : WITH CURRENT ( 0 ) ,
        M 1 :   src_frame 0 , r_source 0 ,
  396   1 : IF CC_AND_LEN_LS_3 THEN GOTO RES_C_IND_ENCAC
        M 1 : test 10 , polarity 0   nac 4 , lit8  RES_C_IND_ENCAC
  396   1 : ;
  398   1 : DISABLE_AON_WRI ,
        M 1 : rand 8 ,
  399   1 : OFF_ALU_OUT = ACC OR CURRENT ( @R@ , 0 ) ,
        M 1 :   alu_in 2  alu_op 5  src_frame 2 , r_source 0 , com_ext @B@ ,
  400   1 : LOAD_OFF ( PREVIOUS ( 2 ) ) WITH OFFSET ,
        M 1 : dest_frame 3 , r_dest 2 , r_w 1  o_in   3 ,
  401   1 : CASE ON ACC_BYTE ( 0 ) MASK @R0@ ROTATE ( 1 )
        M 1 : nac 3   srce 4    mask  @80@ sc 6
  401   1 : ;
  404   1 : LOAD_AON ( PREVIOUS ( 2 ) ) WITH 1 PREVIOUS ( 2 ) ,
        M 1 : dest_frame 3 , r_dest 2 , r_w 1   a_in   1 src_frame
        M 1 : 3 , r_source 2 ,
  405   1 : FTU ( RIGHT , SIGN ) ,
        M 1 : rand 5 ,
  406   1 : RETURN
        M 1 : nac 2
  406   1 : ;
  409   1 : LOAD ( CURRENT ( 7 ) ) WITH DFSC_TRAP ,
        M 1 : dest_frame 0 , r_dest 7 , r_w 1 , a_in 1 , o_in 1
        M 1 : , l_in 1    dev_cmd 32 ,
  410   1 : LONG_CALL PTR_TO_DESC * READ_STARTED
        M 1 : nac 7 , lit14  PTR_TO_DESC * READ_STARTED
  410   1 : ;
  412   1 : OFF_ALU_OUT = ACC OR CURRENT ( 7 ) ,
        M 1 :   alu_in 2  alu_op 5  src_frame 0 , r_source 7 ,
  413   1 : LOAD_OFF ( PREVIOUS ( 2 ) ) WITH OFFSET ,
        M 1 : dest_frame 3 , r_dest 2 , r_w 1  o_in   3 ,
  414   1 : LOAD ( ACCUMULATOR ) WITH OFFSET ,
        M 1 : a_w 1 , o_in   3 ,
  415   1 : LOAD_AON ( PREVIOUS ( 2 ) ) WITH 1 CURRENT ( 7 ) ,
        M 1 : dest_frame 3 , r_dest 2 , r_w 1   a_in   1 src_frame
        M 1 : 0 , r_source 7 ,
  416   1 : FTU ( RIGHT , SIGN ) ,
        M 1 : rand 5 ,
  417   1 : LONG_GOTO RES_C_IND_END
        M 1 : nac 6 , lit14  RES_C_IND_END
  417   1 : ;
  420   1 : RES_C_IND_ENCAC :
  421   1 : DISABLE_AON_WRI ,
        M 1 : rand 8 ,
  422   1 : OFF_ALU_OUT = ACC OR CURRENT ( @R@ , 0 ) ,
        M 1 :   alu_in 2  alu_op 5  src_frame 2 , r_source 0 , com_ext @B@ ,
  423   1 : LOAD_OFF ( PREVIOUS ( 2 ) ) WITH OFFSET ,
        M 1 : dest_frame 3 , r_dest 2 , r_w 1  o_in   3 ,
  424   1 : CASE ON ACC_BYTE ( 0 ) MASK @R0@ ROTATE ( 1 )
        M 1 : nac 3   srce 4    mask  @80@ sc 6
  424   1 : ;
  427   1 : SOURCE ( DESCRIPTOR PREVIOUS ( 2 ) )
        M 1 : nb_ctrl 0   src_frame 3 , r_source 2
  428   1 : TO DESCRIPTOR_BUS ( NAME_CACHE_0 ( NAME_TRAP ) ) ,
        M 1 :   dev_cmd 4@ , nb_ctrl 2 ,
  429   1 : LOAD_AON ( PREVIOUS ( 2 ) ) WITH 1 PREVIOUS ( 2 ) ,
        M 1 : dest_frame 3 , r_dest 2 , r_w 1   a_in   1 src_frame
        M 1 : 3 , r_source 2 ,
  430   1 : FTU ( RIGHT , SIGN ) ,
        M 1 : rand 5 ,
  431   1 : RETURN
        M 1 : nac 2
  431   1 : ;
  434   1 : LOAD ( CURRENT ( 7 ) ) WITH DFSC_TRAP ,
```

```
  M 1 :   dest_frame 0 , r_dest 7 , r_w 1 , a_in 1 , o_in 1
  M 1 : , l_in 1      dev_cmd 32 ,
435 1 : LONG_CALL PTR_TO_DESC * READ_STARTED
  M 1 :   nac 7 , lit14  PTR_TO_DESC * READ_STARTED
435 1 : ;
437 1 : OFF_ALU_OUT = ACC OR CURRENT ( 7 ) ,
  M 1 :    alu_in 2  alu_op 5  src_frame 0 , r_source 7 ,
438 1 : LOAD_OFF ( PREVIOUS ( 2 ) ) WITH OFFSET ,
  M 1 :   dest_frame 3 , r_dest 2 , r_w 1  o_in    3 ,
439 1 : LOAD ( ACCUMULATOR ) WITH OFFSET ,
  M 1 :   a_w 1 , o_in     3 ,
440 1 : LOAD_AON ( PREVIOUS ( 2 ) ) WITH CURRENT ( 7 ) ,
  M 1 :   dest_frame 3 , r_dest 2 , r_w 1  a_in   1 src_frame
  M 1 : 0 , r_source 7 ,
441 1 : FIO ( RIGHT , SIGN ) ,
  M 1 :   rand 5 ,
442 1 : SOURCE ( OFF_ALU WITH CURRENT ( 7 ) )
  M 1 :   nb_ctrl 1    src_frame 0 , r_source 7
443 1 : TO DESCRIPTOR_BUS ( NAME_CACHE_0 ( NAME_TRAP ) ) ,
  M 1 :   dev_cmd 48 , nb_ctrl 2 ,
444 1 : LONG_GOTO RES_C_IND_END
  M 1 :   nac 0 , lit14  RES_C_IND_END
444 1 : ;
456 1 : a060a :
457 1 : ENTRY RES_A_WEIRD_HIT :
458 1 : OFF_ALU_OUT = ACC AND COMMON ( aCa , 6 ) ,
  M 1 :    alu_in 2  alu_op 6  src_frame 2 , r_source 6 , com_ext aCa ,
459 1 : LOAD_LEN ( PREVIOUS ( 0 ) ) WITH OFF ,
  M 1 :   dest_frame 3 , r_dest 0 , r_w 1  l_in   3 , db_ctrl 1 ,
460 1 : LONG_GOTO RESOLVER * COMMON_WEIRD_HI
  M 1 :   nac 6 , lit14  RESOLVER * COMMON_WEIRD_HI
460 1 : ;
462 1 : RES_A_END :
463 1 : OFF_ALU_OUT = ZERO OR PREVIOUS ( 0 ) ,
  M 1 :    alu_in 2 , rand 2  alu_op 5  src_frame 3 , r_source 0 ,
464 1 : LOAD ( ACCUMULATOR ) WITH OFFSET ,
  M 1 :   a_w 1 , o_in    3 ,
465 1 : LOAD_AON ( CURRENT ( 0 ) ) WITH 0 ,
  M 1 :   dest_frame 0 , r_dest 0 , r_w 1  a_in    0 ,
466 1 : RETURN
  M 1 :   nac 2
466 1 : ;
469 1 : RES_A_VEC_END :
470 1 : IFS_MULTIPLY ,
  M 1 :   rand 9 , nb_ctrl 2 , dev_cmd 61 ,
471 1 : OFF_ALU_OUT = ACC PLUS PREVIOUS ( 0 ) ,
  M 1 :    alu_in 2  alu_op 3  src_frame 3 , r_source 0 ,
472 1 : LOAD_OFF ( PREVIOUS ( 0 ) ) WITH OFFSET ,
  M 1 :   dest_frame 3 , r_dest 0 , r_w 1  o_in    3 ,
473 1 : LOAD ( ACCUMULATOR ) WITH OFFSET ,
  M 1 :   a_w 1 , o_in    3 ,
474 1 : LOAD_AON ( PREVIOUS ( 0 ) ) WITH AON ( PREVIOUS ( 0 ) ) ,
  M 1 :   dest_frame 3 , r_dest 0 , r_w 1  a_in   2 , src_frame
  M 1 : 3 , r_source 0 ,
475 1 : RETURN
  M 1 :   nac 2
475 1 : ;
478 1 : a084a :
479 1 : ENTRY RES_A_VEC_HIT :
480 1 : LOAD ( PREVIOUS ( 0 ) ) WITH NAME_CACHE_2 ( NAME_TRAP ) ,
  M 1 :   dest_frame 3 , r_dest 0 , r_w 1 , a_in 1 , o_in 1
  M 1 : , l_in 1      dev_cmd 54 , nb_ctrl 2 ,
481 1 : WITH PREVIOUS ( 0 ) ,
  M 1 :   src_frame 3 , r_source 0 ,
482 1 : IF LEN_LE_32 THEN GOTO RES_A_VEC_END
  M 1 :   test 9 , polarity 1   nac 0 , lit8  RES_A_VEC_END
482 1 : ;
484 1 : RES_A_IND_HIT :
485 1 : LOAD_OFF ( CURRENT ( 6 ) ) WITH AON ( PREVIOUS ( 0 ) ) ,
  M 1 :   dest_frame 0 , r_dest 6 , r_w 1  o_in   2 , src_frame
  M 1 : 3 , r_source 0 ,
486 1 : CASE ON ACC_BYTE ( 0 ) MASK a80a ROTATE ( 1 )
  M 1 :   nac 5   srce 4   mask  a80a  sc 6
```

```
486 1 : ;
489 1 : DISABLE_AON_API ,
  M 1 :   rand 8 ,
490 1 : OFF_ALU_OUT = ACC PLUS PREVIOUS ( 0 ) ,
  M 1 :     alu_in 2  alu_op 3  src_frame 3 , r_source 0 ,
491 1 : LOAD_OFF ( PREVIOUS ( 0 ) ) WITH OFFSET ,
  M 1 : dest_frame 3 , r_dest 0 , r_w 1  o_in   3 ,
492 1 : LOAD ( ACCUMULATOR ) WITH OFFSET ,
  M 1 : a_w 1 , o_in    3 ,
493 1 : RETURN
  M 1 : nac 2
493 1 : ;
496 1 : LOAD ( CURRENT ( 7 ) ) WITH NAME_CACHE_0 ( NAME_TRAP ) ,
  M 1 : dest_frame 0 , r_dest 7 , r_w 1 , a_in 1 , o_in 1
  M 1 : , l_in 1     dev_cmd 52 , nb_ctrl 2   ,
497 1 : LONG_CALL PTR_TO_DESC * READ_STARTED
  M 1 : nac 7 , lit14  PTR_TO_DESC * READ_STARTED
497 1 : ;
499 1 : ENTRY RES_A_IND_DONE :
500 1 : OFF_ALU_OUT = ACC PLUS PREVIOUS ( 0 ) ,
  M 1 :     alu_in 2  alu_op 3  src_frame 3 , r_source 0 ,
501 1 : LOAD_OFF ( PREVIOUS ( 0 ) ) WITH OFFSET
  M 1 : dest_frame 3 , r_dest 0 , r_w 1  o_in  3
501 1 : ;
503 1 : LOAD ( ACCUMULATOR ) WITH AON ( CURRENT ( 7 ) ) ,
  M 1 : a_w 1 , o_in    2 , src_frame 0 , r_source 7   ,
504 1 : LOAD_AON ( CURRENT ( 7 ) ) WITH 0
  M 1 : dest_frame 0 , r_dest 7 , r_w 1  a_in   0
504 1 : ;
506 1 : INDIVISIBLE ,
  M 1 : rand 15 ,
507 1 : OFF_ALU_OUT = LIT32 ( @FFFF0000@ ) AND CURRENT ( 6 ) ,
  M 1 :     alu_in 3 , 1 1 , lit32 @FFFF0000@  alu_op 6  src_frame
  M 1 : 0 , r_source 6 ,
508 1 : LOAD_OFF ( CURRENT ( 6 ) ) WITH OFFSET
  M 1 : dest_frame 0 , r_dest 6 , r_w 1  o_in   3
508 1 : ;
510 1 : INDIVISIBLE ,
  M 1 : rand 15 ,
511 1 : OFF_ALU_OUT = ACC ZERO_HI OR CURRENT ( 6 ) ,
  M 1 :     alu_in 2  dev_cmd 3  alu_op 5  src_frame 0 , r_source 6 ,
512 1 : LOAD_AON ( PREVIOUS ( 0 ) ) WITH OFFSET ,
  M 1 : dest_frame 3 , r_dest 0 , r_w 1  a_in   3 ,
513 1 : LONG_GOTO RES_A_END
  M 1 : nac 0 , lit14  RES_A_END
513 1 : ;
517 1 : @08C@ :
518 1 : RES_A_MISS :
519 1 : INDIVISIBLE ,
  M 1 : rand 15 ,
520 1 : LOAD_AON ( PREVIOUS ( 0 ) ) WITH 0 ,
  M 1 : dest_frame 3 , r_dest 0 , r_w 1  a_in   0 ,
521 1 : OFF_ALU_OUT =
  M 1 :
522 1 : NAME_TRAP ( ZERO_EXTEND ) LEFT_SHIFTED ( 4 ) XOR
522 1 : COMMON ( ?C@ , 2 ) ,
  M 1 : alu_in 2 , nb_ctrl 2 , dev_cmd 4   sf 4   alu_op 4
  M 1 :  src_frame 2 , r_source 2 , com_ext @C@ ,
523 1 : LOAD ( ACCUMULATOR ) WITH OFFSET
  M 1 : a_w 1 , o_in    3
523 1 : ;
525 1 : OFF_ALU_OUT = ACC SIGN_EXTEND_LO_ LEFT_SHIFTED ( 1 )
  M 1 :     alu_in 2  dev_cmd 5  sf 1
526 1 : OR COMMON ( 2 , 6 ) ,
  M 1 : alu_op 5  src_frame 2 , r_source 6 , com_ext 2 ,
527 1 : LOAD ( ACCUMULATOR ) WITH OFFSET ,
  M 1 : a_w 1 , o_in    3 ,
528 1 : LOAD_LEN ( CURRENT ( 0 ) ) WITH LEN ( COMMON ( 2 , 6 ) ) ,
  M 1 : dest_frame 0 , r_dest 0 , r_w 1  l_in   2 , src_frame
  M 1 : 2 , r_source 6 , com_ext 2 ,
529 1 : CASE ON ACC_BYTE ( 1 ) MASK @0E@ ROTATE ( 7 )
```

```
    M 1 : nac 3    srce 5    mask  9Uhd  sc 0
529 1 : ;
532 1 : READ TO ACCUMULATOR USING OFF_ALU WITH COMMON ( 2
532 1 : , 1 ) CON_LENGTH ( 32 ) ,
    M 1 : mem 1    md 1    db_ctrl 1    src_frame 2 , r_source
    M 1 : 1 , com_ext 2   len_ctrl 6    ,
533 1 : OFF_ALU_OUT = ACC PLUS COMMON ( 2 , 1 ) ,
    M 1 :    alu_in 2    alu_op 3  src_frame 2 , r_source 1 , com_ext 2 ,
534 1 : LOAD_LEN ( PREVIOUS ( 0 ) ) WITH LITERAL ( CON_LENGTH ( 32 ) ) ,
    M 1 : dest_frame 3 , r_dest 0 , r_w 1   l_in    1 , len_ctrl 6      ,
535 1 : LOAD_AON ( PREVIOUS ( 0 ) ) WITH AON ( COMMON ( 2 , 1 ) ) ,
    M 1 : dest_frame 3 , r_dest 0 , r_w 1   a_in    2 , src_frame
    M 1 : 2 , r_source 1 , com_ext 2     ,
536 1 : TEST_TO_CC ( ACC_BYTE0_NE_0 ) ,
    M 1 : rand 10 , test 7 , litA 1    ,
537 1 : GOTO RES_A_INDIRECT
    M 1 : nac 4 , litA   RES_A_INDIRECT
537 1 : ;
540 1 : OFF_ALU_OUT = ACC PLUS COMMON ( 2 , 1 ) ,
    M 1 :    alu_in 2    alu_op 3  src_frame 2 , r_source 1 , com_ext 2 ,
541 1 : LOAD_OFF ( PREVIOUS ( 0 ) ) WITH OFFSET ,
    M 1 : dest_frame 3 , r_dest 0 , r_w 1   o_in    3 ,
542 1 : LOAD ( ACCUMULATOR ) WITH OFFSET ,
    M 1 : a_w 1 , o_in    3 ,
543 1 : LOAD_LEN ( PREVIOUS ( 0 ) ) WITH LITERAL ( CON_LENGTH ( 32 ) ) ,
    M 1 : dest_frame 3 , r_dest 0 , r_w 1   l_in    1 , len_ctrl 6      ,
544 1 : LOAD_AON ( PREVIOUS ( 0 ) ) WITH 1 COMMON ( 2 , 1 ) ,
    M 1 : dest_frame 3 , r_dest 0 , r_w 1   a_in    1 src_frame
    M 1 : 2 , r_source 1 , com_ext 2 ,
545 1 : SOURCE ( OFF_ALU WITH COMMON ( 2 , 1 ) )
    M 1 : db_ctrl 1    src_frame 2 , r_source 1 , com_ext 2
546 1 : TO DESCRIPTOR_BUS ( NAME_CACHE_0 ( NAME_TRAP ) ) ,
    M 1 :  dev_cmd 48 , nb_ctrl 2    ,
547 1 : FIU ( RIGHT , SIGN ) ,
    M 1 : rand 5    ,
548 1 : RETURN
    M 1 : nac 2
548 1 : ;
551 1 : READ TO ACCUMULATOR USING OFF_ALU WITH COMMON ( 2
551 1 : , 2 ) CON_LENGTH ( 32 ) ,
    M 1 : mem 1    md 1    db_ctrl 1    src_frame 2 , r_source
    M 1 : 2 , com_ext 2   len_ctrl 6    ,
552 1 : OFF_ALU_OUT = ACC PLUS COMMON ( 2 , 2 ) ,
    M 1 :    alu_in 2    alu_op 3  src_frame 2 , r_source 2 , com_ext 2 ,
553 1 : LOAD_LEN ( PREVIOUS ( 0 ) ) WITH LITERAL ( CON_LENGTH ( 32 ) ) ,
    M 1 : dest_frame 3 , r_dest 0 , r_w 1   l_in    1 , len_ctrl 6      ,
554 1 : LOAD_AON ( PREVIOUS ( 0 ) ) WITH AON ( COMMON ( 2 , 2 ) ) ,
    M 1 : dest_frame 3 , r_dest 0 , r_w 1   a_in    2 , src_frame
    M 1 : 2 , r_source 2 , com_ext 2     ,
555 1 : TEST_TO_CC ( ACC_BYTE0_NE_0 ) ,
    M 1 : rand 10 , test 7 , litA 1    ,
556 1 : GOTO RES_A_INDIRECT
    M 1 : nac 4 , litA   RES_A_INDIRECT
556 1 : ;
559 1 : OFF_ALU_OUT = ACC PLUS COMMON ( 2 , 2 ) ,
    M 1 :    alu_in 2    alu_op 3  src_frame 2 , r_source 2 , com_ext 2 ,
560 1 : LOAD_OFF ( PREVIOUS ( 0 ) ) WITH OFFSET ,
    M 1 : dest_frame 3 , r_dest 0 , r_w 1   o_in    3 ,
561 1 : LOAD ( ACCUMULATOR ) WITH OFFSET ,
    M 1 : a_w 1 , o_in    3 ,
562 1 : LOAD_LEN ( PREVIOUS ( 0 ) ) WITH LITERAL ( CON_LENGTH ( 32 ) ) ,
    M 1 : dest_frame 3 , r_dest 0 , r_w 1   l_in    1 , len_ctrl 6      ,
563 1 : LOAD_AON ( PREVIOUS ( 0 ) ) WITH 1 COMMON ( 2 , 2 ) ,
    M 1 : dest_frame 3 , r_dest 0 , r_w 1   a_in    1 src_frame
    M 1 : 2 , r_source 2 , com_ext 2 ,
564 1 : SOURCE ( OFF_ALU WITH COMMON ( 2 , 2 ) )
    M 1 : db_ctrl 1    src_frame 2 , r_source 2 , com_ext 2
565 1 : TO DESCRIPTOR_BUS ( NAME_CACHE_0 ( NAME_TRAP ) ) ,
    M 1 :  dev_cmd 49 , nb_ctrl 2    ,
566 1 : FTU ( RIGHT , SIGN ) ,
    M 1 : rand 5    ,
567 1 : RETURN
```

```
  M 1 : nac 2
567 1 : ;
570 1 : RES_A_IND_END :
571 1 : LOAD_AON ( CURRENT ( 7 ) ) WITH 0 ,
  M 1 : dest_frame 0 , r_dest 7 , r_w 1  a_in   0 ,
572 1 : RETURN
  M 1 : nac 2
572 1 : ;
575 1 : OFF_ALU_OUT = ACC PLUS COMMON ( 2 , 0 ) ,
  M 1 :    alu_in 2  alu_op 3  src_frame 2 , r_source 0 , com_ext 2 ,
576 1 : LOAD_OFF ( PREVIOUS ( 0 ) ) WITH OFFSET ,
  M 1 : dest_frame 3 , r_dest 0 , r_w 1  o_in   3 ,
577 1 : LOAD ( ACCUMULATOR ) WITH OFFSET ,
  M 1 : a_w 1 , o_in   3 ,
578 1 : LOAD_LEN ( PREVIOUS ( 0 ) ) WITH LITERAL ( CON_LENGTH ( 32 ) ) ,
  M 1 : dest_frame 3 , r_dest 0 , r_w 1  l_in   1 , len_ctrl 6       ,
579 1 : LOAD_AON ( PREVIOUS ( 0 ) ) WITH 1 COMMON ( 2 , 0 ) ,
  M 1 : dest_frame 3 , r_dest 0 , r_w 1  a_in   1 src_frame
  M 1 : 2 , r_source 0 , com_ext 2 ,
580 1 : SOURCE ( OFF_ALU WITH COMMON ( 2 , 0 ) )
  M 1 : db_ctrl 1    src_frame 2 , r_source 0 , com_ext 2
581 1 : TO DESCRIPTOR_BUS ( NAME_CACHE_0 ( NAME_TRAP ) ) ,
  M 1 :  dev_cmd 45 , nb_ctrl 2    ,
582 1 : FIU ( RIGHT , SIGN ) ,
  M 1 : rand 5   ,
583 1 : RETURN
  M 1 : nac 2
583 1 : ;
586 1 : READ TO ACCUMULATOR USING OFF_ALU WITH COMMON ( 2
586 1 : , 4 ) CON_LENGTH ( 32 ) ,
  M 1 : mem 1    md 1    db_ctrl 1    src_frame 2 , r_source
  M 1 : 4 , com_ext 2  len_ctrl 6    ,
587 1 : OFF_ALU_OUT =
  M 1 :
588 1 : NAME_TRAP ( ZERO_EXTEND ) LEFT_SHIFTED ( 5 ) PLUS
588 1 : COMMON ( 2 , 4 ) ,
  M 1 : alu_in 2 , nb_ctrl 2 , dev_cmd 4   sf 5  alu_op 3
  M 1 :  src_frame 2 , r_source 4 , com_ext 2 ,
589 1 : LOAD_OFF ( CURRENT ( 6 ) ) WITH OFFSET ,
  M 1 : dest_frame 0 , r_dest 6 , r_w 1  o_in  3 ,
590 1 : LOAD_AON ( CURRENT ( 6 ) ) WITH AON ( COMMON ( 2 , 4 ) ) ,
  M 1 : dest_frame 0 , r_dest 6 , r_w 1  a_in   2 , src_frame
  M 1 : 2 , r_source 4 , com_ext 2
591 1 : LONG_GOTO RESOLVER * COMMON_MISS_A
  M 1 : nac 6 , lit14  RESOLVER * COMMON_MISS_A
591 1 : ;
594 1 : READ TO ACCUMULATOR USING OFF_ALU WITH COMMON ( 2
594 1 : , 4 ) CON_LENGTH ( 32 ) ,
  M 1 : mem 1    md 1    db_ctrl 1    src_frame 2 , r_source
  M 1 : 4 , com_ext 2  len_ctrl 6    ,
595 1 : OFF_ALU_OUT =
  M 1 :
596 1 : NAME_TRAP ( ZERO_EXTEND ) LEFT_SHIFTED ( 5 ) PLUS
596 1 : COMMON ( 2 , 4 ) ,
  M 1 : alu_in 2 , nb_ctrl 2 , dev_cmd 4   sf 5  alu_op 3
  M 1 :  src_frame 2 , r_source 4 , com_ext 2 ,
597 1 : LOAD_OFF ( CURRENT ( 6 ) ) WITH OFFSET ,
  M 1 : dest_frame 0 , r_dest 6 , r_w 1  o_in   3 ,
598 1 : LOAD_AON ( CURRENT ( 6 ) ) WITH AON ( COMMON ( 2 , 4 ) ) ,
  M 1 : dest_frame 0 , r_dest 6 , r_w 1  a_in   2 , src_frame
  M 1 : 2 , r_source 4 , com_ext 2 ,
599 1 : LONG_GOTO RESOLVER * COMMON_MISS_A
  M 1 : nac 6 , lit14  RESOLVER * COMMON_MISS_A
599 1 : ;
602 1 : RES_A_INDIRECT :
603 1 : WITH CURRENT ( 0 ) ,
  M 1 :  src_frame 0 , r_source 0 ,
604 1 : IF CC_AND_LEN_LE_3 THEN GOTO RES_A_IND_ENCAC
  M 1 : test 10 , polarity 0   nac 4 , lit8  RES_A_IND_ENCAC
604 1 : ;
606 1 : DISABLE_AON_WRI ,
  M 1 : rand 8 ,
```

```
607 1 : OFF_ALU_OUT = ACC OR COMMON ( aBa , 0 ) ,
  M 1 :    alu_in 2  alu_op 5  src_frame 2 , r_source 0 , com_ext aBa ,
608 1 : LOAD_OFF ( PREVIOUS ( 0 ) ) WITH OFFSET ,
  M 1 : dest_frame 3 , r_dest 0 , r_w 1  o_in   3 ,
609 1 : CASE ON ACC_BYTE ( 0 ) MASK aBOa ROTATE ( 1 )
  M 1 : nac 3   srce 4   mask  aBOa sc 6
609 1 : ;
612 1 : LOAD_AON ( PREVIOUS ( 0 ) ) WITH 1 PREVIOUS ( 0 ) ,
  M 1 : dest_frame 3 , r_dest 0 , r_w 1  a_in   1 src_frame
  M 1 : 3 , r_source 0 ,
613 1 : FIU ( RIGHT , SIGN ) ,
  M 1 : rand 5 ,
614 1 : RETURN
  M 1 : nac 2
614 1 : ;
617 1 : LOAD ( CURRENT ( 7 ) ) WITH DESC_TRAP ,
  M 1 : dest_frame 0 , r_dest 7 , r_w 1 , a_in 1 , o_in 1
  M 1 : , l_in 1     dev_cmd 32 ,
618 1 : LONG_CALL PTR_TO_DESC * READ_STARTED
  M 1 : nac 7 , lit14  PTR_TO_DESC * READ_STARTED
618 1 : ;
620 1 : OFF_ALU_OUT = ACC OR CURRENT ( 7 ) ,
  M 1 :    alu_in 2  alu_op 5  src_frame 0 , r_source 7 ,
621 1 : LOAD_OFF ( PREVIOUS ( 0 ) ) WITH OFFSET ,
  M 1 : dest_frame 3 , r_dest 0 , r_w 1  o_in   3 ,
622 1 : LOAD ( ACCUMULATOR ) WITH OFFSET ,
  M 1 : a_w 1 , o_in    3 ,
623 1 : LOAD_AON ( PREVIOUS ( 0 ) ) WITH 1 CURRENT ( 7 ) ,
  M 1 : dest_frame 3 , r_dest 0 , r_w 1  a_in   1 src_frame
  M 1 : 0 , r_source 7 ,
624 1 : FIU ( RIGHT , SIGN ) ,
  M 1 : rand 5 ,
625 1 : LONG_GOTO RES_A_IND_END
  M 1 : nac 6 , lit14  RES_A_IND_END
625 1 : ;
627 1 : RES_A_IND_ENCAC :
628 1 : DISABLE_AON_WRI ,
  M 1 : rand 8 ,
629 1 : OFF_ALU_OUT = ACC OR COMMON ( aBa , 0 ) ,
  M 1 :    alu_in 2  alu_op 5  src_frame 2 , r_source 0 , com_ext aBa ,
630 1 : LOAD_OFF ( PREVIOUS ( 0 ) ) WITH OFFSET ,
  M 1 : dest_frame 3 , r_dest 0 , r_w 1  o_in   3 ,
631 1 : CASE ON ACC_BYTE ( 0 ) MASK aBOa ROTATE ( 1 )
  M 1 : nac 3   srce 4   mask  aBOa sc 6
631 1 : ;
634 1 : SOURCE ( DESCRIPTOR PREVIOUS ( 0 ) )
  M 1 : db_ctrl 0   src_frame 3 , r_source 0
635 1 : TO DESCRIPTOR_BUS ( NAME_CACHE_0 ( NAME_TRAP ) ) ,
  M 1 :    dev_cmd 46 , nb_ctrl 2 ,
636 1 : LOAD_AON ( PREVIOUS ( 0 ) ) WITH 1 PREVIOUS ( 0 ) ,
  M 1 : dest_frame 3 , r_dest 0 , r_w 1  a_in   1 src_frame
  M 1 : 3 , r_source 0 ,
637 1 : FIU ( RIGHT , SIGN ) ,
  M 1 : rand 5 ,
638 1 : RETURN
  M 1 : nac 2
638 1 : ;
641 1 : LOAD ( CURRENT ( 7 ) ) WITH DESC_TRAP ,
  M 1 : dest_frame 0 , r_dest 7 , r_w 1 , a_in 1 , o_in 1
  M 1 : , l_in 1     dev_cmd 32 ,
642 1 : LONG_CALL PTR_TO_DESC * READ_STARTED
  M 1 : nac 7 , lit14  PTR_TO_DESC * READ_STARTED
642 1 : ;
644 1 : OFF_ALU_OUT = ACC OR CURRENT ( 7 ) ,
  M 1 :    alu_in 2  alu_op 5  src_frame 0 , r_source 7 ,
645 1 : LOAD_OFF ( PREVIOUS ( 0 ) ) WITH OFFSET ,
  M 1 : dest_frame 3 , r_dest 0 , r_w 1  o_in   3 ,
646 1 : LOAD ( ACCUMULATOR ) WITH OFFSET ,
  M 1 : a_w 1 , o_in    3 ,
647 1 : LOAD_AON ( PREVIOUS ( 0 ) ) WITH 1 CURRENT ( 7 ) ,
  M 1 : dest_frame 3 , r_dest 0 , r_w 1  a_in   1 src_frame
  M 1 : 0 , r_source 7 ,
```

```
648 1 : FTU ( RIGHT , SIGN ) ,
  M 1 :   rand 5     ,
649 1 : SOURCE ( OFF_ALU WITH CURPENT ( 7 ) )
  M 1 :   db_ctrl 1    src_frame 0 , r_source 7
650 1 : TO DESCRIPTOR_BUS ( NAME_CACHE_0 ( NAME_TRAP ) ) ,
  M 1 :   dev_cmd 48 , nb_ctrl 2     ,
651 1 : LONG_GOTO RES_A_IND_END
  M 1 :   nac 6 , lit14  RES_A_IND_END
651 1 : ;
655 1 : wOA0w :
656 1 : ENTRY EVAL_A_WEIRD_HI :
657 1 : OFF_ALU_OUT = ACC AND COMMON ( ACQ , 6 ) ,
  M 1 :    alu_in 2   alu_op 6  src_frame 2 , r_source 6 , com_ext ACQ ,
658 1 : LOAD_LEN ( CURRENT ( 0 ) ) WITH OFF ,
  M 1 :   dest_frame 0 , r_dest 0 , r_w 1  l_in   3 , db_ctrl 1    ,
659 1 : LONG_CALL RESOLVER & COMMON_WEIRD_HI
  M 1 :   nac 7 , lit14  RESOLVER & COMMON_WEIRD_HI
659 1 : ;
661 1 : OFF_ALU_OUT = ZERO OR CURPENT ( 0 ) , LOAD_OFF (
661 1 : PREVIOUS ( 0 ) ) WITH OFFSET , LOAD_LEN ( PREVIOUS ( 0 ) )
  M 1 :    alu_in 2 , rand 2  alu_op 5  src_frame 0 , r_source
  M 1 :   0  , dest_frame 3 , r_dest 0 , r_w 1  o_in   3 ,
  M 1 :   dest_frame 3 , r_dest 0 , r_w 1  l_in
661 1 : WITH LEN ( CURRENT ( 0 ) ) , LOAD_AON ( PREVIOUS
661 1 : ( 0 ) ) WITH AON ( CURRENT ( 0 ) )
  M 1 :   2 , src_frame 0 , r_source 0    , dest_frame 3 ,
  M 1 :   r_dest 0 , r_w 1  a_in    2 , src_frame 0 , r_source 0
661 1 : ;
663 1 : EVAL_A_END :
664 1 : READ TO EBOX_DATA_0 USING DESCRIPTOR PREVIOUS ( 0 ) BIAS_LENGTH ,
  M 1 :   mem 1   md 0   db_ctrl 0  src_frame 3 , r_source 0  len_ctrl 12   ,
665 1 : OFF_ALU_OUT = ZERO OR PREVIOUS ( 0 ) ,
  M 1 :    alu_in 2 , rand 2  alu_op 5  src_frame 3 , r_source 0  ,
666 1 : LOAD ( ACCUMULATOR ) WITH OFFSET ,
  M 1 :   a_w 1 , o_in   3 ,
667 1 : LOAD_AON ( CURRENT ( 0 ) ) WITH 0 ,
  M 1 :   dest_frame 0 , r_dest 0 , r_w 1  a_in   0 ,
668 1 : RETURN
  M 1 :   nac 2
668 1 : ;
672 1 : EVAL_A_VEC_END :
673 1 : READ TO EBOX_DATA_0 USING OFF_ALU WITH PREVIOUS ( 0 ) BIAS_LENGTH ,
  M 1 :   mem 1   md 0   db_ctrl 1  src_frame 3 , r_source
  M 1 :   0  len_ctrl 12   ,
674 1 : IES_MULTIPLY ,
  M 1 :   rand 0 , nb_ctrl 2 , dev_cmd 61  ,
675 1 : OFF_ALU_OUT = ACC PLUS PREVIOUS ( 0 ) ,
  M 1 :    alu_in 2  alu_op 3  src_frame 3 , r_source 0  ,
676 1 : LOAD_OFF ( PREVIOUS ( 0 ) ) WITH OFFSET ,
  M 1 :   dest_frame 3 , r_dest 0 , r_w 1  o_in   3 ,
677 1 : LOAD ( ACCUMULATOR ) WITH OFFSET ,
  M 1 :   a_w 1 , o_in   3 ,
678 1 : LOAD_AON ( PREVIOUS ( 0 ) ) WITH AON ( PREVIOUS ( 0 ) ) ,
  M 1 :   dest_frame 3 , r_dest 0 , r_w 1  a_in   2 , src_frame
  M 1 :   3 , r_source 0   ,
679 1 : RETURN
  M 1 :   nac 2
679 1 : ;
682 1 : wOA4w :
683 1 : ENTRY EVAL_A_VEC_HIT :
684 1 : LOAD ( PREVIOUS ( 0 ) ) WITH NAME_CACHE_2 ( NAME_TRAP ) ,
  M 1 :   dest_frame 3 , r_dest 0 , r_w 1 , a_in 1 , o_in 1
  M 1 :   , l_in 1    dev_cmd 54 , nb_ctrl 2   ,
685 1 : WITH PREVIOUS ( 0 ) ,
  M 1 :   src_frame 3 , r_source 0  ,
686 1 : IF LEN_LE_32 THEN GOTO EVAL_A_VEC_END
  M 1 :   test 9 , polarity 1   nac 4 , lit8  EVAL_A_VEC_END
686 1 : ;
688 1 : EVAL_A_IND_HIT :
689 1 : LOAD_OFF ( CURRENT ( 6 ) ) WITH AON ( PREVIOUS ( 0 ) ) ,
  M 1 :   dest_frame 0 , r_dest 6 , r_w 1  o_in   2 , src_frame
  M 1 :   3 , r_source 0   ,
```

```
690 1 : CASE ON ACC_BYTE ( 0 ) MASK aBOa ROTATE ( 1 )
  M 1 : nac 3     srce 4     mask  a80a  sc 6
690 1 : ;
693 1 : READ TO EPOX_DATA_Q USING OFF_ALU WITH PREVIOUS (
693 1 : 0 ) , BIAS_LENGTH ,
  M 1 : mem 1    md 0    db_ctrl 1    src_frame 3 , r_source
  M 1 : 0 , len_ctrl 12   ,
694 1 : DISABLE_AON_WRI ,
  M 1 : rand 8  ,
695 1 : OFF_ALU_OUT = ACC PLUS PREVIOUS ( 0 ) ,
  M 1 :    alu_in 2   alu_op 3   src_frame 3 , r_source 0 ,
696 1 : LOAD_OFF ( PREVIOUS ( 0 ) ) WITH OFFSET ,
  M 1 : dest_frame 3 , r_dest 0 , r_w 1   o_in    3 ,
697 1 : LOAD ( ACCUMULATOR ) WITH OFFSET ,
  M 1 : a_w 1 , o_in    3 ,
698 1 : RETURN
  M 1 : nac 2
698 1 : ;
701 1 : LOAD ( CURRENT ( 7 ) ) WITH NAME_CACHE_0 ( NAME_TRAP ) ,
  M 1 : dest_frame 0 , r_dest 7 , r_w 1 , a_in 1 , o_in 1
  M 1 : , l_in 1    dev_cmd 52 , nb_ctrl 2   ,
702 1 : LONG_CALL PTR_TO_DESC * READ_STARTED
  M 1 : nac 7 , lit14  PTR_TO_DESC * READ_STARTED
702 1 : ;
704 1 : OFF_ALU_OUT = ACC PLUS PREVIOUS ( 0 ) ,
  M 1 :    alu_in 2   alu_op 3   src_frame 3 , r_source 0 ,
705 1 : LOAD_OFF ( PREVIOUS ( 0 ) ) WITH OFFSET
  M 1 : dest_frame 3 , r_dest 0 , r_w 1   o_in    3
705 1 : ;
707 1 : LOAD ( ACCUMULATOR ) WITH AON ( CURRENT ( 7 ) ) ,
  M 1 : a_w 1 , o_in   2 , src_frame 0 , r_source 7    ,
708 1 : LOAD_AON ( CURRENT ( 7 ) ) WITH 0
  M 1 : dest_frame 0 , r_dest 7 , r_w 1   a_in    0
708 1 : ;
710 1 : INDIVISIBLE ,
  M 1 : rand 15  ,
711 1 : OFF_ALU_OUT = LIT32 ( aFFFF0000a ) AND CURRENT ( 6 ) ,
  M 1 :    alu_in 3 , 1 1 , lit32 aFFFF0000a  alu_op 6   src_frame
  M 1 : 0 , r_source 6 ,
712 1 : LOAD_OFF ( CURRENT ( 6 ) ) WITH OFFSET
  M 1 : dest_frame 0 , r_dest 6 , r_w 1   o_in    3
712 1 : ;
714 1 : INDIVISIBLE ,
  M 1 : rand 15 ,
715 1 : OFF_ALU_OUT = ACC ZERO_HI OR CURRENT ( 6 ) ,
  M 1 :    alu_in 2   dev_cmd 3   alu_op 5   src_frame 0 , r_source 6 ,
716 1 : LOAD_AON ( PREVIOUS ( 0 ) ) WITH OFFSET ,
  M 1 : dest_frame 3 , r_dest 0 , r_w 1   a_in    3 ,
717 1 : LONG_GOTO EVAL_A_END
  M 1 : nac 6 , lit14   EVAL_A_END
717 1 : ;
720 1 : a0ACa :
721 1 : EVAL_A_MISS :
722 1 : INDIVISIBLE ,
  M 1 : rand 15 ,
723 1 : LOAD_AON ( PREVIOUS ( 0 ) ) WITH 0 ,
  M 1 : dest_frame 3 , r_dest 0 , r_w 1   a_in    0 ,
724 1 : OFF_ALU_OUT =
  M 1 :
725 1 : NAME_TRAP ( ZERO_EXTEND ) LEFT_SHIFTED ( 4 ) XOR
725 1 : COMMON ( aCa , 2 ) ,
  M 1 : alu_in 2 , nb_ctrl 2 , dev_cmd 4    sf 4   alu_op 4
  M 1 :   src_frame 2 , r_source 2 , com_ext aCa ,
726 1 : LOAD ( ACCUMULATOR ) WITH OFFSET
  M 1 : a_w 1 , o_in    3
726 1 : ;
728 1 : OFF_ALU_OUT = ACC SIGN_EXTEND_LO_ LEFT_SHIFTED ( 1 )
  M 1 :    alu_in 2   dev_cmd 5   sf 1
729 1 : OR COMMON ( 2 , 6 ) ,
  M 1 :  alu_op 5   src_frame 2 , r_source 6 , com_ext 2 ,
730 1 : LOAD ( ACCUMULATOR ) WITH OFFSET ,
  M 1 : a_w 1 , o_in    3 ,
```

```
731 1 : LOAD_LEN ( CURRENT ( 0 ) ) WITH LEN ( COMMON ( 2 , 6 ) ) ,
  M 1 : dest_frame 0 , r_dest 0 , r_w 1  l_in   2 , src_frame
  M 1 : 2 , r_source 6 , com_ext 2     ,
732 1 : CASE ON ACC_BYTE ( 1 ) MASK @0E@ ROTATE ( 7 )
  M 1 : nac 3   srce 5   mask  @0F@ sc 0
732 1 : ;
735 1 : READ TO ACCUMULATOR USING OFF_ALU WITH COMMON ( 2
735 1 : , 1 ) CON_LENGTH ( 32 ) ,
  M 1 : mem 1   md 1   db_ctrl 1   src_frame 2 , r_source
  M 1 : 1 , com_ext 2  len_ctrl 6   ,
736 1 : OFF_ALU_OUT = ACC PLUS COMMON ( 2 , 1 ) ,
  M 1 :   alu_in 2  alu_op 3  src_frame 2 , r_source 1 , com_ext 2 ,
737 1 : LOAD_LEN ( PREVIOUS ( 0 ) ) WITH LITERAL ( CON_LENGTH ( 32 ) ) ,
  M 1 : dest_frame 3 , r_dest 0 , r_w 1  l_in   1 , len_ctrl 6    ,
738 1 : LOAD_AON ( PREVIOUS ( 0 ) ) WITH AON ( COMMON ( 2 , 1 ) ) ,
  M 1 : dest_frame 3 , r_dest 0 , r_w 1  a_in   2 , src_frame
  M 1 : 2 , r_source 1 , com_ext 2 ,
739 1 : TEST_TO_CC ( ACC_BYTE0_NE_0 ) ,
  M 1 : rand 10 , test 7 , litR 1  ,
740 1 : GOTO EVAL_A_INDIRECT
  M 1 : nac 4 , litR  EVAL_A_INDIRECT
740 1 : ;
743 1 : READ TO EBUX_DATA_0 USING OFF_ALU WITH COMMON ( 2
743 1 : , 1 ) CON_LENGTH ( 32 ) ,
  M 1 : mem 1   md 0   db_ctrl 1   src_frame 2 , r_source
  M 1 : 1 , com_ext 2  len_ctrl 6   ,
744 1 : OFF_ALU_OUT = ACC PLUS COMMON ( 2 , 1 ) ,
  M 1 :   alu_in 2  alu_op 3  src_frame 2 , r_source 1 , com_ext 2 ,
745 1 : LOAD_OFF ( PREVIOUS ( 0 ) ) WITH OFFSET ,
  M 1 : dest_frame 3 , r_dest 0 , r_w 1  o_in   3 ,
746 1 : LOAD ( ACCUMULATOR ) WITH OFFSET ,
  M 1 : a_w 1 , o_in   3 ,
747 1 : LOAD_LEN ( PREVIOUS ( 0 ) ) WITH LITERAL ( CON_LENGTH ( 32 ) ) ,
  M 1 : dest_frame 3 , r_dest 0 , r_w 1  l_in   1 , len_ctrl 6    ,
748 1 : LOAD_AON ( PREVIOUS ( 0 ) ) WITH 1 COMMON ( 2 , 1 ) ,
  M 1 : dest_frame 3 , r_dest 0 , r_w 1  a_in   1 src_frame
  M 1 : 2 , r_source 1 , com_ext 2 ,
749 1 : SOURCE ( OFF_ALU WITH COMMON ( 2 , 1 ) )
  M 1 : db_ctrl 1   src_frame 2 , r_source 1 , com_ext 2
750 1 : TO DESCRIPTOR_BUS ( NAME_CACHE_0 ( NAME_TRAP ) ) ,
  M 1 :  dev_cmd 4d , nb_ctrl 2   ,
751 1 : FIU ( RIGHT , SIGN ) ,
  M 1 : rand 5  ,
752 1 : RETURN
  M 1 : nac 2
752 1 : ;
755 1 : READ TO ACCUMULATOR USING OFF_ALU WITH COMMON ( 2
755 1 : , 2 ) CON_LENGTH ( 32 ) ,
  M 1 : mem 1   md 1   db_ctrl 1   src_frame 2 , r_source
  M 1 : 2 , com_ext 2  len_ctrl 6   ,
756 1 : OFF_ALU_OUT = ACC PLUS COMMON ( 2 , 2 ) ,
  M 1 :   alu_in 2  alu_op 3  src_frame 2 , r_source 2 , com_ext 2 ,
757 1 : LOAD_LEN ( PREVIOUS ( 0 ) ) WITH LITERAL ( CON_LENGTH ( 32 ) ) ,
  M 1 : dest_frame 3 , r_dest 0 , r_w 1  l_in   1 , len_ctrl 6    ,
758 1 : LOAD_AON ( PREVIOUS ( 0 ) ) WITH AON ( COMMON ( 2 , 2 ) ) ,
  M 1 : dest_frame 3 , r_dest 0 , r_w 1  a_in   2 , src_frame
  M 1 : 2 , r_source 2 , com_ext 2 ,
759 1 : TEST_TO_CC ( ACC_BYTE0_NE_0 ) ,
  M 1 : rand 10 , test 7 , litR 1  ,
760 1 : GOTO EVAL_A_INDIRECT
  M 1 : nac 4 , litR  EVAL_A_INDIRECT
760 1 : ;
763 1 : READ TO EBUX_DATA_0 USING OFF_ALU WITH COMMON ( 2
763 1 : , 2 ) CON_LENGTH ( 32 ) ,
  M 1 : mem 1   md 0   db_ctrl 1   src_frame 2 , r_source
  M 1 : 2 , com_ext 2  len_ctrl 6   ,
764 1 : OFF_ALU_OUT = ACC PLUS COMMON ( 2 , 2 ) ,
  M 1 :   alu_in 2  alu_op 3  src_frame 2 , r_source 2 , com_ext 2 ,
765 1 : LOAD_OFF ( PREVIOUS ( 0 ) ) WITH OFFSET ,
  M 1 : dest_frame 3 , r_dest 0 , r_w 1  o_in   3 ,
766 1 : LOAD ( ACCUMULATOR ) WITH OFFSET ,
  M 1 : a_w 1 , o_in   3 ,
```

```
767 1 : LOAD_LEN ( PREVIOUS ( 0 ) ) WITH LITERAL ( CON_LENGTH ( 32 ) ) ,
  M 1 : dest_frame 3 , r_dest 0 , r_w 1   l_in   1 , len_ctrl 6         ,
768 1 : LOAD_AON ( PREVIOUS ( 0 ) ) WITH 1 COMMON ( 2 , 2 ) ,
  M 1 : dest_frame 3 , r_dest 0 , r_w 1   a_in   1 src_frame
  M 1 : 2 , r_source 2 , com_ext 2          ,
769 1 : SOURCE ( OFF_ALU WITH COMMON ( 2 , 2 ) )
  M 1 : db_ctrl 1    src_frame 2 , r_source 2 , com_ext 2
770 1 : TO DESCRIPTOR_BUS ( NAME_CACHE_0 ( NAME_TRAP ) ) ,
  M 1 :  dev_cmd 48 , nb_ctrl 2       ,
771 1 : FIU ( RIGHT , SIGN ) ,
  M 1 : rand 5     ,
772 1 : RETURN
  M 1 : nac 2
772 1 : ;
775 1 : EVAL_A_IND_END :
776 1 : LOAD_AON ( CURRENT ( 7 ) ) WITH 0 ,
  M 1 : dest_frame 0 , r_dest 7 , r_w 1   a_in   0 ,
777 1 : RETURN
  M 1 : nac 2
777 1 : ;
780 1 : READ TO EROM_DATA_0 USING OFF_ALU WITH COMMON ( 2
780 1 : , 0 ) CON_LENGTH ( 32 ) ,
  M 1 : mem 1   md 0   db_ctrl 1   src_frame 2 , r_source
  M 1 : 0 , com_ext 2   len_ctrl 6    ,
781 1 : OFF_ALU_OUT = ACC PLUS COMMON ( 2 , 0 ) ,
  M 1 :   alu_in 2   alu_op 3  src_frame 2 , r_source 0 , com_ext 2 ,
782 1 : LOAD_OFF ( PREVIOUS ( 0 ) ) WITH OFFSET ,
  M 1 : dest_frame 3 , r_dest 0 , r_w 1   o_in   3 ,
783 1 : LOAD ( ACCUMULATOR ) WITH OFFSET ,
  M 1 : a_w 1 , o_in   3 ,
784 1 : LOAD_LEN ( PREVIOUS ( 0 ) ) WITH LITERAL ( CON_LENGTH ( 32 ) ) ,
  M 1 : dest_frame 3 , r_dest 0 , r_w 1   l_in   1 , len_ctrl 6        ,
785 1 : LOAD_AON ( PREVIOUS ( 0 ) ) WITH 1 COMMON ( 2 , 0 ) ,
  M 1 : dest_frame 3 , r_dest 0 , r_w 1   a_in   1 src_frame
  M 1 : 2 , r_source 0 , com_ext 2 ,
786 1 : SOURCE ( OFF_ALU WITH COMMON ( 2 , 0 ) )
  M 1 : db_ctrl 1    src_frame 2 , r_source 0 , com_ext 2
787 1 : TO DESCRIPTOR_BUS ( NAME_CACHE_0 ( NAME_TRAP ) ) ,
  M 1 :  dev_cmd 46 , nb_ctrl 2       ,
788 1 : FIU ( RIGHT , SIGN ) ,
  M 1 : rand 5     ,
789 1 : RETURN
  M 1 : nac 2
789 1 : ;
792 1 : NOP
  M 1 : timing 0
792 1 : ;
795 1 : READ TO ACCUMULATOR USING OFF_ALU WITH COMMON ( 2
795 1 : , 4 ) CON_LENGTH ( 32 ) ,
  M 1 : mem 1   md 1   db_ctrl 1   src_frame 2 , r_source
  M 1 : 4 , com_ext 2   len_ctrl 6    ,
796 1 : OFF_ALU_OUT =
  M 1 :
797 1 : NAME_TRAP ( ZERO_EXTEND ) LEFT_SHIFTED ( 5 ) PLUS
797 1 : COMMON ( 2 , 4 ) ,
  M 1 : alu_in 2 , no_ctrl 2 , dev_cmd 0   sf 5   alu_op 3
  M 1 :  src_frame 2 , r_source 4 , com_ext 2 ,
798 1 : LONG_CALL RESOLVER * COMMON_MISS
  M 1 : nac 7 , lit14   RESOLVER * COMMON_MISS
798 1 : ;
800 1 : OFF_ALU_OUT = ZERO OR CURRENT ( 0 ) , LOAD_OFF (
800 1 : PREVIOUS ( 0 ) ) WITH OFFSET , LOAD_LEN ( PREVIOUS ( 0 ) )
  M 1 :   alu_in 2 , rand 2   alu_op 5  src_frame 0 , r_source
  M 1 : 0 , dest_frame 3 , r_dest 0 , r_w 1   o_in   3 ,
  M 1 : dest_frame 3 , r_dest 0 , r_w 1   l_in
800 1 : WITH LEN ( CURRENT ( 0 ) ) , LOAD_AON ( PREVIOUS
800 1 : ( 0 ) ) WITH AON ( CURRENT ( 0 ) )
  M 1 :  2 , src_frame 0 , r_source 0    , dest_frame 3 ,
  M 1 : r_dest 0 , r_w 1   a_in   2 , src_frame 0 , r_source 0
800 1 : ,
801 1 : LONG_GOTO EVAL_A_END
  M 1 : nac 6 , lit14   EVAL_A_END
801 1 : ;
```

```
804 1 : EVAL_A_INDIRECT :
805 1 : WITH CURRENT ( 0 ) ,
  M 1 :   src_frame 0 , r_source 0 ,
806 1 : IF CC_AND_LEN_LE_3 THEN GOTO EVAL_A_IND_ENCA
  M 1 :   test 10 , polarity 0   nac 4 , lit8  EVAL_A_IND_ENCA
806 1 : ;
808 1 : DISABLE_AON_WRI ,
  M 1 :   rand 8 ,
809 1 : OFF_ALU_OUT = ACC OP COMMON ( ABW , 0 ) ,
  M 1 :     alu_in 2  alu_op 5  src_frame 2 , r_source 0 , com_ext 28a ,
810 1 : LOAD_OFF ( PREVIOUS ( 0 ) ) WITH OFFSET ,
  M 1 :   dest_frame 3 , r_dest 0 , r_w 1  o_in   3 ,
811 1 : CASE ON ACC_BYTE ( 0 ) MASK 380A ROTATE ( 1 )
  M 1 :   nac 3   srce 4    mask 380w sc 6
811 1 : ;
814 1 : READ TO EBOX_DATA_0 USING DESCRIPTOR PREVIOUS ( 0 ) BIAS_LENGTH ,
  M 1 :   mem 1    md 0   db_ctrl 0   src_frame 3 , r_source 0  len_ctrl 12 ,
815 1 : LOAD_AON ( PREVIOUS ( 0 ) ) WITH 1 PREVIOUS ( 0 ) ,
  M 1 :   dest_frame 3 , r_dest 0 , r_w 1  a_in   1 src_frame
  M 1 : 3 , r_source 0 ,
816 1 : FIU ( RIGHT , SIGN ) ,
  M 1 :   rand 5 ,
817 1 : RETURN
  M 1 :   nac 2
817 1 : ;
820 1 : LOAD ( CURRENT ( 7 ) ) WITH DESC_TRAP ,
  M 1 :   dest_frame 0 , r_dest 7 , r_w 1 , a_in 1 , o_in 1
  M 1 : , l_in 1    dev_cmd 32 ,
821 1 : LONG_CALL PTR_TO_DESC * READ_STARTED
  M 1 :   nac 7 , lit14  PTR_TO_DESC * READ_STARTED
821 1 : ;
823 1 : READ TO EBOX_DATA_0 USING OFF_ALU WITH CURRENT ( 7 ) ,
  M 1 :   mem 1   md 0   db_ctrl 1   src_frame 0 , r_source 7 ,
824 1 : OFF_ALU_OUT = ACC OR CURRENT ( 7 ) , CON_LENGTH ( 32 ) ,
  M 1 :     alu_in 2  alu_op 5  src_frame 0 , r_source 7 , len_ctrl 6 ,
825 1 : LOAD_OFF ( PREVIOUS ( 0 ) ) WITH OFFSET ,
  M 1 :   dest_frame 3 , r_dest 0 , r_w 1  o_in   3 ,
826 1 : LOAD ( ACCUMULATOR ) WITH OFFSET ,
  M 1 :   a_w 1 , o_in   3 ,
827 1 : LOAD_AON ( PREVIOUS ( 0 ) ) WITH 1 CURRENT ( 7 ) ,
  M 1 :   dest_frame 3 , r_dest 0 , r_w 1  a_in   1 src_frame
  M 1 : 0 , r_source 7 ,
828 1 : FIU ( RIGHT , SIGN ) ,
  M 1 :   rand 5 ,
829 1 : LONG_GOTO RES_A_IND_END
  M 1 :   nac 6 , lit14  RES_A_IND_END
829 1 : ;
831 1 : EVAL_A_IND_ENCA :
832 1 : DISABLE_AON_WRI ,
  M 1 :   rand 8 ,
833 1 : OFF_ALU_OUT = ACC OP COMMON ( ABW , 0 ) ,
  M 1 :     alu_in 2  alu_op 5  src_frame 2 , r_source 0 , com_ext 28a ,
834 1 : LOAD_OFF ( PREVIOUS ( 0 ) ) WITH OFFSET ,
  M 1 :   dest_frame 3 , r_dest 0 , r_w 1  o_in   3 ,
835 1 : CASE ON ACC_BYTE ( 0 ) MASK 380A ROTATE ( 1 )
  M 1 :   nac 3   srce 4    mask 380w sc 6
835 1 : ;
838 1 : READ TO EBOX_DATA_0 USING DESCRIPTOR PREVIOUS ( 0 ) BIAS_LENGTH ,
  M 1 :   mem 1    md 0   db_ctrl 0   src_frame 3 , r_source 0  len_ctrl 12 ,
839 1 : SOURCE ( DESCRIPTOR PREVIOUS ( 0 ) )
  M 1 :   db_ctrl 0   src_frame 3 , r_source 0
840 1 : TO DESCRIPTOR_BUS ( NAME_CACHE_0 ( NAME_TRAP ) ) ,
  M 1 :    dev_cmd 48 , nb_ctrl 2 ,
841 1 : LOAD_AON ( PREVIOUS ( 0 ) ) WITH 1 PREVIOUS ( 0 ) ,
  M 1 :   dest_frame 3 , r_dest 0 , r_w 1  a_in   1 src_frame
  M 1 : 3 , r_source 0 ,
842 1 : FIU ( RIGHT , SIGN ) ,
  M 1 :   rand 5 ,
843 1 : RETURN
  M 1 :   nac 2
843 1 : ;
```

```
846 1 : LOAD ( CURRENT ( 7 ) ) WITH DESC_TRAP ,
  M 1 : dest_frame 0 , r_dest 7 , r_w 1 , a_in 1 , o_in 1
  M 1 : , l_in 1    dev_cmd 32 ,
847 1 : LONG_CALL PTR_TO_DESC * READ_STARTED
  M 1 : nac 7 , lit14  PTR_TO_DESC * READ_STARTED
847 1 : ;
849 1 : READ TO EBOX_DATA_B USING OFF_ALU WITH CURRENT ( 7 ) ,
  M 1 : mem 1   md 0   db_ctrl 1   src_frame 0 , r_source 7 ,
850 1 : OFF_ALU_OUT = ACC OR CURRENT ( 7 ) , CON_LENGTH ( 32 ) ,
  M 1 :    alu_in 2  alu_op 5  src_frame 0 , r_source 7  , len_ctrl 6    ,
851 1 : LOAD_OFF ( PREVIOUS ( 0 ) ) WITH OFFSET ,
  M 1 : dest_frame 3 , r_dest 0 , r_w 1  o_in   3 ,
852 1 : LOAD ( ACCUMULATOR ) WITH OFFSET ,
  M 1 : a_w 1 , o_in   3 ,
853 1 : LOAD_AON ( PREVIOUS ( 0 ) ) WITH 1 CURRENT ( 7 ) ,
  M 1 : dest_frame 3 , r_dest 0 , r_w 1  a_in   1 src_frame
  M 1 : 0 , r_source 7 ,
854 1 : FIU ( RIGHT , SIGN ) ,
  M 1 : rand 5    ,
855 1 : SOURCE ( OFF_ALU WITH CURRENT ( 7 ) )
  M 1 : db_ctrl 1    src_frame 0 , r_source 7
856 1 : TO DESCRIPTOR_BUS ( NAME_CACHE_0 ( NAME_TRAP ) ) ,
  M 1 :  dev_cmd 48 , nb_ctrl 2    ,
857 1 : LONG_GOTO RES_A_IND_END
  M 1 : nac 6 , lit14  RES_A_IND_END
857 1 : ;
861 1 : @0C0@ :
862 1 : ENTRY RES_B_WEIRD_HIT :
863 1 : OFF_ALU_OUT = ACC AND COMMON ( @C@ , 6 ) ,
  M 1 :    alu_in 2  alu_op 6  src_frame 2 , r_source 6 , com_ext @C@ ,
864 1 : LOAD_LEN ( CURRENT ( 0 ) ) WITH OFF ,
  M 1 : dest_frame 0 , r_dest 0 , r_w 1  l_in   3 , db_ctrl 1   ,
865 1 : LONG_CALL RESOLVER * COMMON_WEIRD_HI
  M 1 : nac 7 , lit14  RESOLVER * COMMON_WEIRD_HI
865 1 : ;
867 1 : OFF_ALU_OUT = ZERO OR CURRENT ( 0 ) , LOAD_OFF (
867 1 : PREVIOUS ( 1 ) ) WITH OFFSET , LOAD_LEN ( PREVIOUS ( 1 ) )
  M 1 :    alu_in 2 , rand 2  alu_op 5  src_frame 0 , r_source
  M 1 : 0 , dest_frame 3 , r_dest 1 , r_w 1  o_in   3 ,
  M 1 : dest_frame 3 , r_dest 1 , r_w 1  l_in
867 1 : WITH LEN ( CURRENT ( 0 ) ) , LOAD_AON ( PREVIOUS
867 1 : ( 1 ) ) WITH AON ( CURRENT ( 0 ) )
  M 1 : 2 , src_frame 0 , r_source 0   , dest_frame 3 ,
  M 1 : r_dest 1 , r_w 1  a_in   2 , src_frame 0 , r_source 0
867 1 : ;
869 1 : RES_B_END :
870 1 : OFF_ALU_OUT = ZERO OR PREVIOUS ( 1 ) ,
  M 1 :    alu_in 2 , rand 2  alu_op 5  src_frame 3 , r_source 1 ,
871 1 : LOAD ( ACCUMULATOR ) WITH OFFSET ,
  M 1 : a_w 1 , o_in   3 ,
872 1 : LOAD_AON ( CURRENT ( 0 ) ) WITH 0 ,
  M 1 : dest_frame 0 , r_dest 0 , r_w 1  a_in   0 ,
873 1 : RETURN
  M 1 : nac 2
873 1 : ;
877 1 : RES_B_VEC_END :
878 1 : IES_MULTIPLY ,
  M 1 : rand 9 , nb_ctrl 2 , dev_cmd 61 ,
879 1 : OFF_ALU_OUT = ACC PLUS PREVIOUS ( 1 ) ,
  M 1 :    alu_in 2  alu_op 3  src_frame 3 , r_source 1 ,
880 1 : LOAD_OFF ( PREVIOUS ( 1 ) ) WITH OFFSET ,
  M 1 : dest_frame 3 , r_dest 1 , r_w 1  o_in   3 ,
881 1 : LOAD ( ACCUMULATOR ) WITH OFFSET ,
  M 1 : a_w 1 , o_in   3 ,
882 1 : LOAD_AON ( PREVIOUS ( 1 ) ) WITH AON ( PREVIOUS ( 1 ) ) ,
  M 1 : dest_frame 3 , r_dest 1 , r_w 1  a_in   2 , src_frame
  M 1 : 3 , r_source 1    ,
883 1 : RETURN
  M 1 : nac 2
883 1 : ;
886 1 : @0C4@ :
887 1 : ENTRY RES_B_VEC_HIT :
```

```
888 1 : LOAD ( PREVIOUS ( 1 ) ) WITH NAME_CACHE_2 ( NAME_TRAP ) ,
  M 1 : dest_frame 3 , r_dest 1 , r_w 1 , a_in 1 , o_in 1
  M 1 : , l_in 1    dev_cmd 54 , nb_ctrl 2    ,
889 1 : WITH PREVIOUS ( 1 ) ,
  M 1 :   src_frame 3 , r_source 1 ,
890 1 : IF LEN_LE_32 THEN GOTO RES_B_VEC_END
  M 1 : test  9 , polarity 1   nac 4 , lit8  RES_B_VEC_END
890 1 : ;
892 1 : RES_B_IND_HIT :
893 1 : LOAD_OFF ( CURRENT ( 6 ) ) WITH AON ( PREVIOUS ( 1 ) ) ,
  M 1 : dest_frame 0 , r_dest 6 , r_w 1  o_in   2 , src_frame
  M 1 : 3 , r_source 1 ,
894 1 : CASE ON ACC_BYTE ( 0 ) MASK @80@ ROTATE ( 1 )
  M 1 : nac 3   src 4    mask  @80@ sc 6
894 1 : ;
897 1 : DISABLE_AON_WRI ,
  M 1 : rand 8 ,
898 1 : OFF_ALU_OUT = ACC PLUS PREVIOUS ( 1 ) ,
  M 1 :    alu_in 2  alu_op 3  src_frame 3 , r_source 1 ,
899 1 : LOAD_OFF ( PREVIOUS ( 1 ) ) WITH OFFSET ,
  M 1 : dest_frame 3 , r_dest 1 , r_w 1  o_in    3 ,
900 1 : LOAD ( ACCUMULATOR ) WITH OFFSET ,
  M 1 : a_w 1 , o_in    3 ,
901 1 : RETURN
  M 1 : nac 2
901 1 : ;
904 1 : LOAD ( CURRENT ( 7 ) ) WITH NAME_CACHE_0 ( NAME_TRAP ) ,
  M 1 : dest_frame 0 , r_dest 7 , r_w 1 , a_in 1 , o_in 1
  M 1 : , l_in 1    dev_cmd 52 , nb_ctrl 2    ,
905 1 : LONG_CALL PTR_TO_DESC + READ_STARTED
  M 1 : nac 7 , lit14  PTR_TO_DESC + READ_STARTED
905 1 : ;
907 1 : OFF_ALU_OUT = ACC PLUS PREVIOUS ( 1 ) ,
  M 1 :    alu_in 2  alu_op 3  src_frame 3 , r_source 1 ,
908 1 : LOAD_OFF ( PREVIOUS ( 1 ) ) WITH OFFSET
  M 1 : dest_frame 3 , r_dest 1 , r_w 1  o_in    3
908 1 : ;
910 1 : LOAD ( ACCUMULATOR ) WITH AON ( CURRENT ( 7 ) ) ,
  M 1 : a_w 1 , o_in   2 , src_frame 0 , r_source 7 ,
911 1 : LOAD_AON ( CURRENT ( 7 ) ) WITH 0
  M 1 : dest_frame 0 , r_dest 7 , r_w 1  a_in    0
911 1 : ;
913 1 : INDIVISIBLE ,
  M 1 : rand 15 ,
914 1 : OFF_ALU_OUT = LIT32 ( @FFFF0000@ ) AND CURRENT ( 6 ) ,
  M 1 :    alu_in 3 , l 1 , lit32 @FFFF0000@  alu_op 0   src_frame
  M 1 : 0 , r_source 6 ,
915 1 : LOAD_OFF ( CURRENT ( 6 ) ) WITH OFFSET
  M 1 : dest_frame 0 , r_dest 6 , r_w 1  o_in    3
915 1 : ;
917 1 : INDIVISIBLE ,
  M 1 : rand 15 ,
918 1 : OFF_ALU_OUT = ACC ZERO_HI OR CURRENT ( 6 ) ,
  M 1 :    alu_in 2   dev_cmd 3  alu_op 5  src_frame 0 , r_source 6 ,
919 1 : LOAD_AON ( PREVIOUS ( 1 ) ) WITH OFFSET ,
  M 1 : dest_frame 3 , r_dest 1 , r_w 1  a_in    3 ,
920 1 : LONG_GOTO RES_B_END
  M 1 : nac 6 , lit14  RES_B_END
920 1 : ;
923 1 : @OLC@ :
924 1 : RES_B_MISS :
925 1 : INDIVISIBLE ,
  M 1 : rand 15 ,
926 1 : LOAD_AON ( PREVIOUS ( 1 ) ) WITH 0 ,
  M 1 : dest_frame 3 , r_dest 1 , r_w 1  a_in    0 ,
927 1 : OFF_ALU_OUT =
  M 1 :
928 1 : NAME_TRAP ( ZERO_EXTEND ) LEFT_SHIFTED ( 4 ) XOR
928 1 : COMMON ( @C@ , 2 ) ,
  M 1 : alu_in 2 , nb_ctrl 2 , dev_cmd 4   sf 4   alu_op 4
  M 1 :  src_frame 2 , r_source 2 , com_ext @C@ ,
929 1 : LOAD ( ACCUMULATOR ) WITH OFFSET
```

```
 M 1 : a_w 1 , o_in    3  ,
929 1 : ;
931 1 : OFF_ALU_OUT = ACC SIGN_EXTENDED_0_ LEFT_SHIFTED ( 1 )
 M 1 :    alu_in 2  dev_cmd 5  sf 1
932 1 : OR COMMON ( 2 , 6 ) ,
 M 1 : alu_op 5  src_frame 2 , r_source 6 , com_ext 2 ,
933 1 : LOAD ( ACCUMULATOR ) WITH OFFSET ,
 M 1 : a_w 1 , o_in    3 ,
934 1 : LOAD_LEN ( CURRENT ( 0 ) ) WITH LEN ( COMMON ( 2 , 6 ) ) ,
 M 1 : dest_frame 0 , r_dest 0 , r_w 1  l_in   2 , src_frame
 M 1 : 2 , r_source 6 , com_ext 2    ,
935 1 : CASE ON ACC_BYTE ( 1 ) MASK AREA ROTATE ( 7 )
 M 1 : nac 3   srce 5    mask  a0Fw sc 0
935 1 : ;
936 1 : READ TO ACCUMULATOR USING OFF_ALU WITH COMMON ( 2
938 1 : , 1 ) CON_LENGTH ( 32 ) ,
 M 1 : mem 1    md 1    db_ctrl 1   src_frame 2 , r_source
 M 1 : 1 , com_ext 2  len_ctrl 6   ,
939 1 : OFF_ALU_OUT = ACC PLUS COMMON ( 2 , 1 ) ,
 M 1 :    alu_in 2  alu_op 3  src_frame 2 , r_source 1 , com_ext 2 ,
940 1 : LOAD_LEN ( PREVIOUS ( 1 ) ) WITH LITERAL ( CON_LENGTH ( 32 ) ) ,
 M 1 : dest_frame 3 , r_dest 1 , r_w 1    1_in    1 , len_ctrl 6   ,
941 1 : LOAD_AON ( PREVIOUS ( 1 ) ) WITH AON ( COMMON ( 2 , 1 ) ) ,
 M 1 : dest_frame 3 , r_dest 1 , r_w 1  a_in   2 , src_frame
 M 1 : 2 , r_source 1 , com_ext 2    ,
942 1 : TEST_TO_LC ( ACC_BYTE0_NE_0 ) ,
 M 1 : rand 10 , test 7  , litA 1   ,
943 1 : GOTO RES_B_INDIRECT
 M 1 : nac 4 , litA RES_B_INDIRECT
943 1 : ;
946 1 : OFF_ALU_OUT = ACC PLUS COMMON ( 2 , 1 ) ,
 M 1 :    alu_in 2  alu_op 3  src_frame 2 , r_source 1 , com_ext 2 ,
947 1 : LOAD_OFF ( PREVIOUS ( 1 ) ) WITH OFFSET ,
 M 1 : dest_frame 3 , r_dest 1 , r_w 1  o_in   3  ,
948 1 : LOAD ( ACCUMULATOR ) WITH OFFSET ,
 M 1 : a_w 1 , o_in    3 ,
949 1 : LOAD_LEN ( PREVIOUS ( 1 ) ) WITH LITERAL ( CON_LENGTH ( 32 ) ) ,
 M 1 : dest_frame 3 , r_dest 1 , r_w 1    1_in    1 , len_ctrl 6   ,
950 1 : LOAD_AON ( PREVIOUS ( 1 ) ) WITH 1 COMMON ( 2 , 1 ) ,
 M 1 : dest_frame 3 , r_dest 1 , r_w 1  a_in   1 src_frame
 M 1 : 2 , r_source 1 , com_ext 2   ,
951 1 : SOURCE ( OFF_ALU WITH COMMON ( 2 , 1 ) )
 M 1 : db_ctrl 1    src_frame 2 , r_source 1 , com_ext 2
952 1 : TO DESCRIPTOR_BUS ( NAME_CACHE_0 ( NAME_TRAP ) ) ,
 M 1 :  dev_cmd 48 , nh_ctrl 2     ,
953 1 : FIU ( RIGHT , SIGN ) ,
 M 1 : rand 5   ,
954 1 : RETURN
 M 1 : nac 2
954 1 : ;
957 1 : READ TO ACCUMULATOR USING OFF_ALU WITH COMMON ( 2
957 1 : , 2 ) CON_LENGTH ( 32 ) ,
 M 1 : mem 1    md 1    db_ctrl 1   src_frame 2 , r_source
 M 1 : 2 , com_ext 2  len_ctrl 6   ,
958 1 : OFF_ALU_OUT = ACC PLUS COMMON ( 2 , 2 ) ,
 M 1 :    alu_in 2  alu_op 3  src_frame 2 , r_source 2 , com_ext 2 ,
959 1 : LOAD_LEN ( PREVIOUS ( 1 ) ) WITH LITERAL ( CON_LENGTH ( 32 ) ) ,
 M 1 : dest_frame 3 , r_dest 1 , r_w 1    1_in    1 , len_ctrl 6   ,
960 1 : LOAD_AON ( PREVIOUS ( 1 ) ) WITH AON ( COMMON ( 2 , 2 ) ) ,
 M 1 : dest_frame 3 , r_dest 1 , r_w 1  a_in   2 , src_frame
 M 1 : 2 , r_source 2 , com_ext 2   ,
961 1 : TEST_TO_LC ( ACC_BYTE0_NE_0 ) ,
 M 1 : rand 10 , test 7  , litA 1   ,
962 1 : GOTO RES_B_INDIRECT
 M 1 : nac 4 , litA RES_B_INDIRECT
962 1 : ;
965 1 : OFF_ALU_OUT = ACC PLUS COMMON ( 2 , 2 ) ,
 M 1 :    alu_in 2  alu_op 3  src_frame 2 , r_source 2 , com_ext 2 ,
966 1 : LOAD_OFF ( PREVIOUS ( 1 ) ) WITH OFFSET ,
 M 1 : dest_frame 3 , r_dest 1 , r_w 1  o_in   3  ,
967 1 : LOAD ( ACCUMULATOR ) WITH OFFSET ,
 M 1 : a_w 1 , o_in    3 ,
```

```
 965 1 : LOAD_LEN ( PREVIOUS ( 1 ) ) WITH LITERAL ( CON_LENGTH ( 32 ) ) ,
   M 1 : dest_frame 3 , r_dest 1 , r_w 1 , l_in  1 , len_ctrl 6       ,
 969 1 : LOAD_AON ( PREVIOUS ( 1 ) ) WITH 1 COMMON ( 2 , 2 ) ,
   M 1 : dest_frame 3 , r_dest 1 , r_w 1 a_in   1 src_frame
   M 1 : 2 , r_source 2 , com_ext 2 ,
 970 1 : SOURCE ( OFF_ALU WITH COMMON ( 2 , 2 ) )
   M 1 : db_ctrl 1    src_frame 2 , r_source 2 , com_ext 2
 971 1 : TO DESCRIPTOR_BUS ( NAME_CACHE_0 ( NAME_TRAP ) ) ,
   M 1 :  dev_cmd 48 , nb_ctrl 2        ,
 972 1 : FIU ( RIGHT , SIGN ) ,
   M 1 : rand 5     ,
 973 1 : RETURN
   M 1 : nac 2
 973 1 : ;
 976 1 : RES_B_IND_END :
 977 1 : LOAD_AON ( CURRENT ( 7 ) ) WITH 0 ,
   M 1 : dest_frame 0 , r_dest 7 , r_w 1 a_in   0 ,
 978 1 : RETURN
   M 1 : nac 2
 978 1 : ;
 981 1 : OFF_ALU_OUT = ACC PLUS COMMON ( 2 , 0 ) ,
   M 1 :   alu_in 2  alu_op 3  src_frame 2 , r_source 0 , com_ext 2 ,
 982 1 : LOAD_OFF ( PREVIOUS ( 1 ) ) WITH OFFSET ,
   M 1 : dest_frame 3 , r_dest 1 , r_w 1 , o_in   3 ,
 983 1 : LOAD ( ACCUMULATOR ) WITH OFFSET ,
   M 1 : a_w 1 , o_in   3 ,
 984 1 : LOAD_LEN ( PREVIOUS ( 1 ) ) WITH LITERAL ( CON_LENGTH ( 32 ) ) ,
   M 1 : dest_frame 3 , r_dest 1 , r_w 1 , l_in  1 , len_ctrl 6       ,
 985 1 : LOAD_AON ( PREVIOUS ( 1 ) ) WITH 1 COMMON ( 2 , 0 ) ,
   M 1 : dest_frame 3 , r_dest 1 , r_w 1 a_in   1 src_frame
   M 1 : 2 , r_source 0 , com_ext 2 ,
 986 1 : SOURCE ( OFF_ALU WITH COMMON ( 2 , 0 ) )
   M 1 : db_ctrl 1    src_frame 2 , r_source 0 , com_ext 2
 987 1 : TO DESCRIPTOR_BUS ( NAME_CACHE_0 ( NAME_TRAP ) ) ,
   M 1 :  dev_cmd 48 , nb_ctrl 2        ,
 988 1 : FIU ( RIGHT , SIGN ) ,
   M 1 : rand 5     ,
 989 1 : RETURN
   M 1 : nac 2
 989 1 : ;
 992 1 : NOP
   M 1 : timing 0
 992 1 : ;
 995 1 : READ TO ACCUMULATOR USING OFF_ALU WITH COMMON ( 2
 995 1 : , 4 ) CON_LENGTH ( 32 ) ,
   M 1 : mem 1   md 1   db_ctrl 1    src_frame 2 , r_source
   M 1 : 4 , com_ext 2  len_ctrl 6    ,
 996 1 : OFF_ALU_OUT =
   M 1 :
 997 1 : NAME_TRAP ( ZERO_EXTEND ) LEFT_SHIFTED ( 5 ) PLUS
 997 1 : COMMON ( 2 , 4 ) ,
   M 1 : alu_in 2 , nb_ctrl 2 , dev_cmd 4   sf 5  alu_op 3
   M 1 : src_frame 2 , r_source 4 , com_ext 2 ,
 998 1 : LONG_CALL RESOLVER * COMMON_MISS
   M 1 : nac 7 , lit14  RESOLVER * COMMON_MISS
 998 1 : ;
1000 1 : OFF_ALU_OUT = ZERO OF CURRENT ( 0 ) , LOAD_OFF (
1000 1 : PREVIOUS ( 1 ) ) WITH OFFSET , LOAD_LEN ( PREVIOUS ( 1 ) )
   M 1 :   alu_in 2 , rand 2  alu_op 5  src_frame 0 , r_source
   M 1 : 0 , dest_frame 3 , r_dest 1 , r_w 1  o_in   3 ,
   M 1 : dest_frame 3 , r_dest 1 , r_w 1  l_in
1000 1 : WITH LEN ( CURRENT ( 0 ) ) , LOAD_AON ( PREVIOUS
1000 1 : ( 1 ) ) WITH AON ( CURRENT ( 0 ) )
   M 1 : 2 , src_frame 0 , r_source 0    , dest_frame 3 ,
   M 1 : r_dest 1 , r_w 1 a_in   2 , src_frame 0 , r_source 0
1000 1 : ,
1001 1 : LONG_GOTO RES_B_END
   M 1 : nac 6 , lit14  RES_B_END
1001 1 : ;
1004 1 : RES_B_INDIRECT :
1005 1 : WITH CURRENT ( 0 ) ,
   M 1 : src_frame 0 , r_source 0 ,
```

```
1006 1 : IF CC_AND_LEN_LE_3 THEN GOTO RES_B_IND_ENCAC
   M 1 : test  10 , polarity 0    nac 4 , lit8  RES_B_IND_ENCAC
1006 1 : ;
1008 1 : DISABLE_ADN_WR1 ,
   M 1 : rand 8  ,
1009 1 : OFF_ALU_OUT = ACC OR COMMON ( @R@ , 0 ) ,
   M 1 :    alu_in 2  alu_op 5  src_frame 2 , r_source 0 , com_ext @B@ ,
1010 1 : LOAD_OFF ( PREVIOUS ( 1 ) ) WITH OFFSET ,
   M 1 : dest_frame 3 , r_dest 1 , r_w 1  o_in   3 ,
1011 1 : CASE ON ACC_BYTE ( 0 ) MASK @R0@ ROTATE ( 1 )
   M 1 : nac 3   srce 4    mask  @80@ sc 6
1011 1 : ;
1014 1 : LOAD_AON ( PREVIOUS ( 1 ) ) WITH 1 PREVIOUS ( 1 ) ,
   M 1 : dest_frame 3 , r_dest 1 , r_w 1   a_in    1 src_frame
   M 1 : 3 , r_source 1  ,
1015 1 : FIU ( RIGHT , SIGN ) ,
   M 1 : rand 5   ,
1016 1 : RETURN
   M 1 : nac 2
1016 1 : ;
1019 1 : LOAD ( CURRENT ( 7 ) ) WITH DESC_TRAP ,
   M 1 : dest_frame 0 , r_dest 7 , r_w 1 , a_in 1 , o_in 1
   M 1 : , l_in 1     dev_cmd 32 ,
1020 1 : LONG_CALL PTR_TO_DESC * READ_STARTED
   M 1 : nac 7 , lit14  PTR_TO_DESC * READ_STARTED
1020 1 : ;
1022 1 : OFF_ALU_OUT = ACC OR CURRENT ( 7 ) ,
   M 1 :    alu_in 2  alu_op 5  src_frame 0 , r_source 7 ,
1023 1 : LOAD_OFF ( PREVIOUS ( 1 ) ) WITH OFFSET ,
   M 1 : dest_frame 3 , r_dest 1 , r_w 1  o_in   3 ,
1024 1 : LOAD ( ACCUMULATOR ) WITH OFFSET ,
   M 1 : a_w 1 , o_in   3 ,
1025 1 : LOAD_AON ( PREVIOUS ( 1 ) ) WITH 1 CURRENT ( 7 ) ,
   M 1 : dest_frame 3 , r_dest 1 , r_w 1   a_in    1 src_frame
   M 1 : 0 , r_source 7 ,
1026 1 : FIU ( RIGHT , SIGN ) ,
   M 1 : rand 5   ,
1027 1 : LONG_GOTO RES_B_IND_END
   M 1 : nac 6 , lit14  RES_B_IND_END
1027 1 : ;
1029 1 : RES_B_IND_ENCAC :
1030 1 : DISABLE_AON_WR1 ,
   M 1 : rand 8  ,
1031 1 : OFF_ALU_OUT = ACC OR COMMON ( @R@ , 0 ) ,
   M 1 :    alu_in 2  alu_op 5  src_frame 2 , r_source 0 , com_ext @B@ ,
1032 1 : LOAD_OFF ( PREVIOUS ( 1 ) ) WITH OFFSET ,
   M 1 : dest_frame 3 , r_dest 1 , r_w 1  o_in   3 ,
1033 1 : CASE ON ACC_BYTE ( 0 ) MASK @R0@ ROTATE ( 1 )
   M 1 : nac 3   srce 4    mask  @80@ sc 6
1033 1 : ;
1036 1 : SOURCE ( DESCRIPTOR PREVIOUS ( 1 ) )
   M 1 : db_ctrl 0   src_frame 3 , r_source 1
1037 1 : TO DESCRIPTOR_BUS ( NAME_CACHE_0 ( NAME_TRAP ) ) ,
   M 1 :   dev_cmd 48 , nb_ctrl 2    ,
1038 1 : LOAD_AON ( PREVIOUS ( 1 ) ) WITH 1 PREVIOUS ( 1 ) ,
   M 1 : dest_frame 3 , r_dest 1 , r_w 1   a_in    1 src_frame
   M 1 : 3 , r_source 1  ,
1039 1 : FIU ( RIGHT , SIGN ) ,
   M 1 : rand 5   ,
1040 1 : RETURN
   M 1 : nac 2
1040 1 : ;
1043 1 : LOAD ( CURRENT ( 7 ) ) WITH DESC_TRAP ,
   M 1 : dest_frame 0 , r_dest 7 , r_w 1 , a_in 1 , o_in 1
   M 1 : , l_in 1     dev_cmd 32 ,
1044 1 : LONG_CALL PTR_TO_DESC * READ_STARTED
   M 1 : nac 7 , lit14  PTR_TO_DESC * READ_STARTED
1044 1 : ;
1046 1 : OFF_ALU_OUT = ACC OR CURRENT ( 7 ) ,
   M 1 :    alu_in 2  alu_op 5  src_frame 0 , r_source 7 ,
1047 1 : LOAD_OFF ( PREVIOUS ( 1 ) ) WITH OFFSET ,
   M 1 : dest_frame 3 , r_dest 1 , r_w 1  o_in   3 ,
```

```
1046 1 : LOAD ( ACCUMULATOR ) WITH OFFSET ,
   M 1 : a_w 1 , o_in    3 ,
1049 1 : LOAD_AON ( PREVIOUS ( 1 ) ) WITH 1 CURRENT ( 7 ) ,
   M 1 : dest_frame 3 , r_dest 1 , r_w 1   a_in   1 src_frame
   M 1 : 0 , r_source 7 ,
1050 1 : FIU ( RIGHT , SIGN ) ,
   M 1 : rand 5 ,
1051 1 : SOURCE ( OFF_ALU WITH CURRENT ( 7 ) )
   M 1 : db_ctrl 1    src_frame 0 , r_source 7
1052 1 : TO DESCRIPTOR_BUS ( NAME_CACHE_0 ( NAME_TRAP ) ) ,
   M 1 :  dev_cmd 48 , nb_ctrl 2    ,
1053 1 : LONG_GOTO RES_B_IND_END
   M 1 : nac 6 , lit14 RES_B_IND_END
1053 1 : ;
1057 1 : @0E0w :
1058 1 : ENTRY EVAL_B_WEIRD_HI :
1059 1 : OFF_ALU_OUT = ACC AND COMMON ( ACA , 6 ) ,
   M 1 :    alu_in 2  alu_op 6  src_frame 2 , r_source 6 , com_ext ACA ,
1060 1 : LOAD_LEN ( CURRENT ( 0 ) ) WITH OFF ,
   M 1 : dest_frame 0 , r_dest 0 , r_w 1  l_in   3 , db_ctrl 1    ,
1061 1 : LONG_CALL RESOLVER + COMMON_WEIRD_HI
   M 1 : nac 7 , lit14  RESOLVER + COMMON_WEIRD_HI
1061 1 : ;
1063 1 : OFF_ALU_OUT = ZERO OR CURRENT ( 0 ) , LOAD_OFF (
1063 1 : PREVIOUS ( 1 ) ) WITH OFFSET , LOAD_LEN ( PREVIOUS ( 1 ) )
   M 1 :    alu_in 2 , rand 2  alu_op 5  src_frame 0 , r_source
   M 1 : 0 , dest_frame 3 , r_dest 1 , r_w 1  o_in   3 ,
   M 1 : dest_frame 3 , r_dest 1 , r_w 1  l_in
1063 1 : WITH LEN ( CURRENT ( 0 ) ) , LOAD_AON ( PREVIOUS
1063 1 : ( 1 ) ) WITH AON ( CURRENT ( 0 ) )
   M 1 : 2 , src_frame 0 , r_source 0   , dest_frame 3 ,
   M 1 : r_dest 1 , r_w 1  a_in   2 , src_frame 0 , r_source 0
1063 1 : ;
1065 1 : EVAL_B_END :
1066 1 : READ TO EBOX_DATA_0 USING DESCRIPTOR PREVIOUS ( 1 ) BIAS_LENGTH ,
   M 1 : mem 1   md 0   db_ctrl 0  src_frame 3 , r_source 1  len_ctrl 12   ,
1067 1 : OFF_ALU_OUT = ZERO OR PREVIOUS ( 1 ) ,
   M 1 :    alu_in 2 , rand 2  alu_op 5  src_frame 3 , r_source 1 ,
1068 1 : LOAD ( ACCUMULATOR ) WITH OFFSET ,
   M 1 : a_w 1 , o_in   3 ,
1069 1 : LOAD_AON ( CURRENT ( 0 ) ) WITH 0 ,
   M 1 : dest_frame 0 , r_dest 0 , r_w 1  a_in    0 ,
1070 1 : RETURN
   M 1 : nac 2
1070 1 : ;
1074 1 : EVAL_B_VEC_END :
1075 1 : READ TO EBOX_DATA_0 USING OFF_ALU WITH PREVIOUS ( 1 ) BIAS_LENGTH ,
   M 1 : mem 1   md 0   db_ctrl 1   src_frame 3 , r_source
   M 1 : 1  len_ctrl 12    ,
1076 1 : IES_MULTIPLY ,
   M 1 : rand 9 , nb_ctrl 2 , dev_cmd 61   ,
1077 1 : OFF_ALU_OUT = ACC PLUS PREVIOUS ( 1 ) ,
   M 1 :    alu_in 2  alu_op 3  src_frame 3 , r_source 1 ,
1078 1 : LOAD_OFF ( PREVIOUS ( 1 ) ) WITH OFFSET ,
   M 1 : dest_frame 3 , r_dest 1 , r_w 1  o_in   3 ,
1079 1 : LOAD ( ACCUMULATOR ) WITH OFFSET ,
   M 1 : a_w 1 , o_in   3 ,
1080 1 : LOAD_AON ( PREVIOUS ( 1 ) ) WITH AON ( PREVIOUS ( 1 ) ) ,
   M 1 : dest_frame 3 , r_dest 1 , r_w 1  a_in   2 , src_frame
   M 1 : 3 , r_source 1    ,
1081 1 : RETURN
   M 1 : nac 2
1081 1 : ;
1084 1 : @0E4w :
1085 1 : ENTRY EVAL_B_VEC_HIT :
1086 1 : LOAD ( PREVIOUS ( 1 ) ) WITH NAME_CACHE_2 ( NAME_TRAP ) ,
   M 1 : dest_frame 3 , r_dest 1 , r_w 1 , a_in 1 , o_in 1
   M 1 : , l_in 1    dev_cmd 54 , nb_ctrl 2   ,
1087 1 : WITH PREVIOUS ( 1 ) ,
   M 1 :  src_frame 3 , r_source 1 ,
1088 1 : IF LEN_LE_32 THEN GOTO FVAL_B_VEC_END
   M 1 : test  9 , polarity 1   nac 4 , lit8 FVAL_B_VEC_END
```

```
1088 1 : ;
1090 1 : EVAL_B_IND_HIT :
1091 1 : LOAD_OFF ( CURRENT ( 6 ) ) WITH AON ( PREVIOUS ( 1 ) ) ,
   M 1 : dest_frame 0 , r_dest 6 , r_w 1  o_in    2 , src_frame
   M 1 : 3 , r_source 1  ,
1092 1 : CASE ON ACC_BYTE ( 0 ) MASK @B0@ ROTATE ( 1 )
   M 1 : nac 3   srce 4    mask   @b0@ sc 6
1092 1 : ;
1095 1 : READ TO EBOX_DATA_0 USING OFF_ALU WITH PREVIOUS ( 1 ) BIAS_LENGTH ,
   M 1 : mem 1   md 0   db_ctrl 1   src_frame 3 , r_source
   M 1 : 1   len_ctrl 12  ,
1096 1 : DISABLE_AON_WRT ,
   M 1 : rand 8 ,
1097 1 : OFF_ALU_OUT = ACC PLUS PREVIOUS ( 1 ) ,
   M 1 :    alu_in 2   alu_op 3  src_frame 3 , r_source 1 ,
1098 1 : LOAD_OFF ( PREVIOUS ( 1 ) ) WITH OFFSET ,
   M 1 : dest_frame 3 , r_dest 1 , r_w 1   o_in    3 ,
1099 1 : LOAD ( ACCUMULATOR ) WITH OFFSET ,
   M 1 : a_w 1 , o_in    3 ,
1100 1 : RETURN
   M 1 : nac 2
1100 1 : ;
1103 1 : LOAD ( CURRENT ( 7 ) ) WITH NAME_CACHE_0 ( NAME_TRAP ) ,
   M 1 : dest_frame 0 , r_dest 7 , r_w 1 , a_in 1 , o_in 1
   M 1 : , l_in 1    dev_cmd 52 , nb_ctrl 2  ,
1104 1 : LONG_CALL PTR_TO_DESC * READ_STARTED
   M 1 : nac 7 , lit14  PTR_TO_DESC * READ_STARTED
1104 1 : ;
1106 1 : OFF_ALU_OUT = ACC PLUS PREVIOUS ( 1 ) ,
   M 1 :    alu_in 2   alu_op 3  src_frame 3 , r_source 1 ,
1107 1 : LOAD_OFF ( PREVIOUS ( 1 ) ) WITH OFFSET
   M 1 : dest_frame 3 , r_dest 1 , r_w 1   o_in    3
1107 1 : ;
1109 1 : LOAD ( ACCUMULATOR ) WITH AON ( CURRENT ( 7 ) ) ,
   M 1 : a_w 1 , o_in    2 , src_frame 0 , r_source 7  ,
1110 1 : LOAD_AON ( CURRENT ( 7 ) ) WITH 0
   M 1 : dest_frame 0 , r_dest 7 , r_w 1   a_in    0
1110 1 : ;
1112 1 : INDIVISIBLE ,
   M 1 : rand 15 ,
1113 1 : OFF_ALU_OUT = LIT32 ( @FFFF0000@ ) AND CURRENT ( 6 ) ,
   M 1 :    alu_in 3 , l 1 , lit32 @FFFF0000@  alu_op 6  src_frame
   M 1 : 0 , r_source 6 ,
1114 1 : LOAD_OFF ( CURRENT ( 6 ) ) WITH OFFSET
   M 1 : dest_frame 0 , r_dest 6 , r_w 1   o_in    3
1114 1 : ;
1116 1 : INDIVISIBLE ,
   M 1 : rand 15 ,
1117 1 : OFF_ALU_OUT = ACC ZERO_HI OR CURRENT ( 6 ) ,
   M 1 :    alu_in 2  dev_cmd 3  alu_op 5  src_frame 0 , r_source 6 ,
1118 1 : LOAD_AON ( PREVIOUS ( 1 ) ) WITH OFFSET ,
   M 1 : dest_frame 3 , r_dest 1 , r_w 1   a_in    3 ,
1119 1 : LONG_GOTO EVAL_B_END
   M 1 : nac 6 , lit14  EVAL_B_END
1119 1 : ;
1123 1 : @0E0@ :
1124 1 : EVAL_B_MISS :
1125 1 : INDIVISIBLE ,
   M 1 : rand 15 ,
1126 1 : LOAD_AON ( PREVIOUS ( 1 ) ) WITH 0 ,
   M 1 : dest_frame 3 , r_dest 1 , r_w 1   a_in    0 ,
1127 1 : OFF_ALU_OUT =
   M 1 :
1128 1 : NAME_TRAP ( ZERO_EXTEND ) LEFT_SHIFTED ( 4 ) XOR
1128 1 : COMMON ( @C@ , 2 ) ,
   M 1 : alu_in 2 , nb_ctrl 2 , dev_cmd 4   sf 4   alu_op 4
   M 1 :   src_frame 2 , r_source 2 , com_ext @C@ ,
1129 1 : LOAD ( ACCUMULATOR ) WITH OFFSET
   M 1 : a_w 1 , o_in    3
1129 1 : ;
1131 1 : OFF_ALU_OUT = ACC SIGN_EXTEND_LO_ LEFT_SHIFTED ( 1 )
   M 1 :    alu_in 2  dev_cmd 5  sf 1
1132 1 : OR COMMON ( 2 , 6 ) ,
```

```
  M  1 : alu_op 5   src_frame 2 , r_source 6 , com_ext 2 ,
1133  1 : LOAD ( ACCUMULATOR ) WITH OFFSET ,
  M  1 : a_w 1 , o_in    3 ,
1134  1 : LOAD_LEN ( CURRENT ( 0 ) ) WITH LEN ( COMMON ( 2 , 6 ) ) ,
  M  1 : dest_frame 0 , r_dest 0 , r_w 1   l_in   2 , src_frame
  M  1 : 2 , r_source 6 , com_ext 2   ,
1135  1 : CASE ON ACC_BYTE ( 1 ) MASK @0E@ ROTATE ( 7 )
  M  1 : nac 3   srce 5    mask  @0E@  sc 0
1135  1 : ;
1138  1 : READ TO ACCUMULATOR USING OFF_ALU WITH COMMON ( 2
1138  1 : , 1 ) CON_LENGTH ( 32 ) ,
  M  1 : mem 1    md 1    db_ctrl 1    src_frame 2 , r_source
  M  1 : 1 , com_ext 2   len_ctrl 6     ,
1139  1 : OFF_ALU_OUT = ACC PLUS COMMON ( 2 , 1 ) ,
  M  1 :    alu_in 2   alu_op 3   src_frame 2 , r_source 1 , com_ext 2 ,
1140  1 : LOAD_LEN ( PREVIOUS ( 1 ) ) WITH LITERAL ( CON_LENGTH ( 32 ) ) ,
  M  1 : dest_frame 3 , r_dest 1 , r_w 1   l_in   1 , len_ctrl 6     ,
1141  1 : LOAD_AON ( PREVIOUS ( 1 ) ) WITH AON ( COMMON ( 2 , 1 ) ) ,
  M  1 : dest_frame 3 , r_dest 1 , r_w 1   a_in   2 , src_frame
  M  1 : 2 , r_source 1 , com_ext 2   ,
1142  1 : TEST_TO_CC ( ACC_BYTE0_NE_0 ) ,
  M  1 : rand 10 , test 7 , lit8 1   ,
1143  1 : GOTO EVAL_B_INDIRECT
  M  1 : nac 4 , lit8  EVAL_B_INDIRECT
1143  1 : ;
1146  1 : READ TO EBUX_DATA_0 USING OFF_ALU WITH COMMON ( 2
1146  1 : , 1 ) CON_LENGTH ( 32 ) ,
  M  1 : mem 1    md 0    db_ctrl 1   src_frame 2 , r_source
  M  1 : 1 , com_ext 2   len_ctrl 6     ,
1147  1 : OFF_ALU_OUT = ACC PLUS COMMON ( 2 , 1 ) ,
  M  1 :    alu_in 2   alu_op 3   src_frame 2 , r_source 1 , com_ext 2 ,
1148  1 : LOAD_OFF ( PREVIOUS ( 1 ) ) WITH OFFSET ,
  M  1 : dest_frame 3 , r_dest 1 , r_w 1   o_in   3 ,
1149  1 : LOAD ( ACCUMULATOR ) WITH OFFSET ,
  M  1 : a_w 1 , o_in    3 ,
1150  1 : LOAD_LEN ( PREVIOUS ( 1 ) ) WITH LITERAL ( CON_LENGTH ( 32 ) ) ,
  M  1 : dest_frame 3 , r_dest 1 , r_w 1   l_in   1 , len_ctrl 6     ,
1151  1 : LOAD_AON ( PREVIOUS ( 1 ) ) WITH 1 COMMON ( 2 , 1 ) ,
  M  1 : dest_frame 3 , r_dest 1 , r_w 1   a_in   1 src_frame
  M  1 : 2 , r_source 1 , com_ext 2   ,
1152  1 : SOURCE ( OFF_ALU WITH COMMON ( 2 , 1 ) )
  M  1 : db_ctrl 1    src_frame 2 , r_source 1 , com_ext 2
1153  1 : TO DESCRIPTOR_BUS ( NAME_CACHE_0 ( NAME_TRAP ) ) ,
  M  1 :   dev_cmd 48 , nb_ctrl 2    ,
1154  1 : FIU ( RIGHT , SIGN ) ,
  M  1 : rand 5   ,
1155  1 : RETURN
  M  1 : nac 2
1155  1 : ;
1158  1 : READ TO ACCUMULATOR USING OFF_ALU WITH COMMON ( 2
1158  1 : , 2 ) CON_LENGTH ( 32 ) ,
  M  1 : mem 1    md 1    db_ctrl 1    src_frame 2 , r_source
  M  1 : 2 , com_ext 2   len_ctrl 6     ,
1159  1 : OFF_ALU_OUT = ACC PLUS COMMON ( 2 , 2 ) ,
  M  1 :    alu_in 2   alu_op 3   src_frame 2 , r_source 2 , com_ext 2 ,
1160  1 : LOAD_LEN ( PREVIOUS ( 1 ) ) WITH LITERAL ( CON_LENGTH ( 32 ) ) ,
  M  1 : dest_frame 3 , r_dest 1 , r_w 1   l_in   1 , len_ctrl 6     ,
1161  1 : LOAD_AON ( PREVIOUS ( 1 ) ) WITH AON ( COMMON ( 2 , 2 ) ) ,
  M  1 : dest_frame 3 , r_dest 1 , r_w 1   a_in   2 , src_frame
  M  1 : 2 , r_source 2 , com_ext 2   ,
1162  1 : TEST_TO_CC ( ACC_BYTE0_NE_0 ) ,
  M  1 : rand 10 , test 7 , lit8 1   ,
1163  1 : GOTO EVAL_B_INDIRECT
  M  1 : nac 4 , lit8  EVAL_B_INDIRECT
1163  1 : ;
1166  1 : READ TO EBUX_DATA_0 USING OFF_ALU WITH COMMON ( 2
1166  1 : , 2 ) CON_LENGTH ( 32 ) ,
  M  1 : mem 1    md 0    db_ctrl 1   src_frame 2 , r_source
  M  1 : 2 , com_ext 2   len_ctrl 6     ,
1167  1 : OFF_ALU_OUT = ACC PLUS COMMON ( 2 , 2 ) ,
  M  1 :    alu_in 2   alu_op 3   src_frame 2 , r_source 2 , com_ext 2 ,
1168  1 : LOAD_OFF ( PREVIOUS ( 1 ) ) WITH OFFSET ,
```

```
         M  1 : dest_frame 3 , r_dest 1 , r_w 1  o_in   3 ,
      1169 1 : LOAD ( ACCUMULATOR ) WITH OFFSET ,
         M  1 : a_w 1 , o_in   3 ,
      1170 1 : LOAD_LEN ( PREVIOUS ( 1 ) ) WITH LITERAL ( CON_LENGTH ( 32 ) ) ,
         M  1 : dest_frame 3 , r_dest 1 , r_w 1  l_in   1 , len_ctrl 6      ,
      1171 1 : LOAD_AON ( PREVIOUS ( 1 ) ) WITH 1 COMMON ( 2 , 2 ) ,
         M  1 : dest_frame 3 , r_dest 1 , r_w 1  a_in    1 src_frame
         M  1 : 2 , r_source 2 , com_ext 2 ,
      1172 1 : SOURCE ( OFF_ALU WITH COMMON ( 2 , 2 ) )
         M  1 : db_ctrl 1    src_frame 2 , r_source 2 , com_ext 2
      1173 1 : TO DESCRIPTOR_BUS ( NAME_CACHE_0 ( NAME_TRAP ) ) ,
         M  1 :   dev_cmd 48 , nb_ctrl 2    ,
      1174 1 : FTU ( RIGHT , SIGN ) ,
         M  1 : rand 5    ,
      1175 1 : RETURN
         M  1 : nac 2
      1175 1 : ;
      1178 1 : EVAL_B_IND_END :
      1179 1 : LOAD_AON ( CURRENT ( 7 ) ) WITH 0 ,
         M  1 : dest_frame 0 , r_dest 7 , r_w 1  a_in    0 ,
      1180 1 : RETURN
         M  1 : nac 2
      1180 1 : ;
      1183 1 : READ TO EBOX_DATA_W USING OFF_ALU WITH COMMON ( 2
      1183 1 : , 0 ) CON_LENGTH ( 32 ) ,
         M  1 : mem 1    md 0    db_ctrl 1    src_frame 2 , r_source
         M  1 : 0 , com_ext 2    len_ctrl 6     ,
      1184 1 : OFF_ALU_OUT = ACC PLUS COMMON ( 2 , 0 ) ,
         M  1 :    alu_in 2    alu_op 3 src_frame 2 , r_source 0 , com_ext 2 ,
      1185 1 : LOAD_OFF ( PREVIOUS ( 1 ) ) WITH OFFSET ,
         M  1 : dest_frame 3 , r_dest 1 , r_w 1  o_in   3 ,
      1186 1 : LOAD ( ACCUMULATOR ) WITH OFFSET ,
         M  1 : a_w 1 , o_in   3 ,
      1187 1 : LOAD_LEN ( PREVIOUS ( 1 ) ) WITH LITERAL ( CON_LENGTH ( 32 ) ) ,
         M  1 : dest_frame 3 , r_dest 1 , r_w 1  l_in   1 , len_ctrl 6      ,
      1188 1 : LOAD_AON ( PREVIOUS ( 1 ) ) WITH 1 COMMON ( 2 , 0 ) ,
         M  1 : dest_frame 3 , r_dest 1 , r_w 1  a_in    1 src_frame
         M  1 : 2 , r_source 0 , com_ext 2 ,
      1189 1 : SOURCE ( OFF_ALU WITH COMMON ( 2 , 0 ) )
         M  1 : db_ctrl 1    src_frame 2 , r_source 0 , com_ext 2
      1190 1 : TO DESCRIPTOR_BUS ( NAME_CACHE_0 ( NAME_TRAP ) ) ,
         M  1 :   dev_cmd 48 , nb_ctrl 2    ,
      1191 1 : FTU ( RIGHT , SIGN ) ,
         M  1 : rand 5    ,
      1192 1 : RETURN
         M  1 : nac 2
      1192 1 : ;
      1195 1 : NOP
         M  1 : timing 0
      1195 1 : ;
      1198 1 : READ TO ACCUMULATOR USING OFF_ALU WITH COMMON ( 2
      1198 1 : , 4 ) CON_LENGTH ( 32 ) ,
         M  1 : mem 1    md 1    db_ctrl 1    src_frame 2 , r_source
         M  1 : 4 , com_ext 2    len_ctrl 6     ,
      1199 1 : OFF_ALU_OUT =
         M  1 :
      1200 1 : NAME_TRAP ( ZERO_EXTEND ) LEFT_SHIFTED ( 5 ) PLUS
      1200 1 : COMMON ( 2 , 4 ) ,
         M  1 : alu_in 2 , nb_ctrl 2 , dev_cmd 4   sf 5   alu_op 3
         M  1 :   src_frame 2 , r_source 4 , com_ext 2  ,
      1201 1 : LONG_CALL RESOLVER * COMMON_MISS
         M  1 : nac 7 , lit14   RESOLVER * COMMON_MISS
      1201 1 : ;
      1203 1 : OFF_ALU_OUT = ZERO OR CURRENT ( 0 ) , LOAD_OFF (
      1203 1 : PREVIOUS ( 1 ) ) WITH OFFSET , LOAD_LEN ( PREVIOUS ( 1 ) )
         M  1 :    alu_in 2 , rand 2   alu_op 5 src_frame 0 , r_source
         M  1 : 0 , dest_frame 3 , r_dest 1 , r_w 1  o_in   3 ,
         M  1 : dest_frame 3 , r_dest 1 , r_w 1  l_in
      1203 1 : WITH LEN ( CURRENT ( 0 ) ) , LOAD_AON ( PREVIOUS
      1203 1 : ( 1 ) ) WITH AON ( CURRENT ( 0 ) )
```

```
  M 1 :   2 , src_frame 0 , r_source 0      , dest_frame 3 ,
  M 1 :   r_dest 1 , r_w 1  a_in   2 , src_frame 0 , r_source 0
1203 1 : ;
1204 1 : LONG_GOTO EVAL_B_END
  M 1 :   nac 6 , lit14  EVAL_B_END
1204 1 : ;
1207 1 : EVAL_B_INDIRECT :
1208 1 : WITH CURRENT ( 0 ) ,
  M 1 :   src_frame 0 , r_source 0 ,
1209 1 : IF CC_AND_LEN_LE_3 THEN GOTO EVAL_B_IND_ENCA
  M 1 :   test 10 , polarity 0    nac 4 , lit8  EVAL_B_IND_ENCA
1209 1 : ;
1211 1 : DISABLE_AON_WRI ,
  M 1 :   rand 8 ,
1212 1 : OFF_ALU_OUT = ACC OR COMMON ( @B@ , 0 ) ,
  M 1 :    alu_in 2  alu_op 5  src_frame 2 , r_source 0 , com_ext @B@  ,
1213 1 : LOAD_OFF ( PREVIOUS ( 1 ) ) WITH OFFSET ,
  M 1 :   dest_frame 3 , r_dest 1 , r_w 1   o_in    3 ,
1214 1 : CASE ON ACC_BYTE ( 0 ) MASK @B0@ ROTATE ( 1 )
  M 1 :   nac 3   srce 4   mask  @80@ sc 6
1214 1 : ;
1217 1 : READ TO EBOX_DATA_0 USING DESCRIPTOR PREVIOUS ( 1 ) BIAS_LENGTH ,
  M 1 :   mem 1    md 0    db_ctrl 0   src_frame 3 , r_source 1  len_ctrl 12   ,
1218 1 : LOAD_AON ( PREVIOUS ( 1 ) ) WITH 1 PREVIOUS ( 1 ) ,
  M 1 :   dest_frame 3 , r_dest 1 , r_w 1   a_in    1 src_frame
  M 1 :   3 , r_source 1 ,
1219 1 : FTU ( RIGHT , SIGN ) ,
  M 1 :   rand 5 ,
1220 1 : RETURN
  M 1 :   nac 2
1220 1 : ;
1223 1 : LOAD ( CURRENT ( 7 ) ) WITH DESC_TRAP ,
  M 1 :   dest_frame 0 , r_dest 7 , r_w 1 , a_in 1 , o_in 1
  M 1 :   , l_in 1     dev_cmd 32 ,
1224 1 : LONG_CALL PTR_TO_DESC * READ_STARTED
  M 1 :   nac 7 , lit14  PTR_TO_DESC * READ_STARTED
1224 1 : ;
1226 1 : READ TO EBOX_DATA_0 USING OFF_ALU WITH CURRENT ( 7 ) ,
  M 1 :   mem 1   md 0   db_ctrl 1    src_frame 0 , r_source 7 ,
1227 1 : OFF_ALU_OUT = ACC OR CURRENT ( 7 ) , CON_LENGTH ( 32 ) ,
  M 1 :    alu_in 2  alu_op 5  src_frame 0 , r_source 7  , len_ctrl 6    ,
1228 1 : LOAD_OFF ( PREVIOUS ( 1 ) ) WITH OFFSET ,
  M 1 :   dest_frame 3 , r_dest 1 , r_w 1   o_in    3 ,
1229 1 : LOAD ( ACCUMULATOR ) WITH OFFSET ,
  M 1 :   a_w 1 , o_in    3 ,
1230 1 : LOAD_AON ( PREVIOUS ( 1 ) ) WITH 1 CURRENT ( 7 ) ,
  M 1 :   dest_frame 3 , r_dest 1 , r_w 1   a_in    1 src_frame
  M 1 :   0 , r_source 7 ,
1231 1 : FTU ( RIGHT , SIGN ) ,
  M 1 :   rand 5 ,
1232 1 : LONG_GOTO RES_B_IND_END
  M 1 :   nac 6 , lit14  RES_B_IND_END
1232 1 : ;
1234 1 : EVAL_B_IND_ENCA :
1235 1 : DISABLE_AON_WRI ,
  M 1 :   rand 8 ,
1236 1 : OFF_ALU_OUT = ACC OR COMMON ( @B@ , 0 ) ,
  M 1 :    alu_in 2  alu_op 5  src_frame 2 , r_source 0 , com_ext @B@  ,
1237 1 : LOAD_OFF ( PREVIOUS ( 1 ) ) WITH OFFSET ,
  M 1 :   dest_frame 3 , r_dest 1 , r_w 1   o_in    3 ,
1238 1 : CASE ON ACC_BYTE ( 0 ) MASK @B0@ ROTATE ( 1 )
  M 1 :   nac 3   srce 4   mask  @80@ sc 6
1238 1 : ;
1241 1 : READ TO EBOX_DATA_0 USING DESCRIPTOR PREVIOUS ( 1 ) BIAS_LENGTH ,
  M 1 :   mem 1    md 0    db_ctrl 0   src_frame 3 , r_source 1  len_ctrl 12   ,
1242 1 : SOURCE ( DESCRIPTOR PREVIOUS ( 1 ) )
  M 1 :   db_ctrl 0   src_frame 3 , r_source 1
1243 1 : TO DESCRIPTOR_BUS ( NAME_CACHE_0 ( NAME_TRAP ) ) ,
  M 1 :    dev_cmd 48 , nb_ctrl 2 ,
1244 1 : LOAD_AON ( PREVIOUS ( 1 ) ) WITH 1 PREVIOUS ( 1 ) ,
  M 1 :   dest_frame 3 , r_dest 1 , r_w 1   a_in    1 src_frame
  M 1 :   3 , r_source 1 ,
```

```
1245 1 : FIU ( RIGHT , SIGN ) ,
   M 1 : rand 5      ,
1246 1 : RETURN
   M 1 : nac 2
1246 1 : ;
1249 1 : LOAD ( CURRENT ( 7 ) ) WITH DESC_TRAP ,
   M 1 : dest_frame 0 , r_dest 7 , r_w 1 , a_in 1 , o_in 1
   M 1 : , l_in 1      dev_cmd 32 ,
1250 1 : LONG_CALL PTR_TO_DESC * READ_STARTED
   M 1 : nac 7 , lit14  PTR_TO_DESC * READ_STARTED
1250 1 : ;
1252 1 : READ TO EBOX_DATA_O USING OFF_ALU WITH CURRENT ( 7 ) ,
   M 1 : mem 1   md 0   db_ctrl 1    src_frame 0 , r_source 7 ,
1253 1 : OFF_ALU_OUT = ACC OR CURRENT ( 7 ) , CON_LENGTH ( 32 ) ,
   M 1 :    alu_in 2   alu_op 5   src_frame 0 , r_source 7 , len_ctrl 6    ,
1254 1 : LOAD_OFF ( PREVIOUS ( 1 ) ) WITH OFFSET ,
   M 1 : dest_frame 3 , r_dest 1 , r_w 1  o_in    3  ,
1255 1 : LOAD ( ACCUMULATOR ) WITH OFFSET ,
   M 1 : a_w 1 , o_in    3  ,
1256 1 : LOAD_AON ( PREVIOUS ( 1 ) ) WITH 1 CURRENT ( 7 ) ,
   M 1 : dest_frame 3 , r_dest 1 , r_w 1   a_in   1 src_frame
   M 1 : 0 , r_source 7 ,
1257 1 : FIU ( RIGHT , SIGN ) ,
   M 1 : rand 5   ,
1258 1 : SOURCE ( OFF_ALU WITH CURRENT ( 7 ) )
   M 1 : db_ctrl 1     src_frame 0 , r_source 7
1259 1 : TO DESCRIPTOR_BUS ( NAME_CACHE_0 ( NAME_TRAP ) ) ,
   M 1 :   dev_cmd 48 , nb_ctrl 2    ,
1260 1 : LONG_GOTO RES_B_IND_END
   M 1 : nac 6 , lit14  RES_B_IND_END
1260 1 : ;
1262 1 : END
1262 0 :

COMPILATION COMPLETE, 158 STATEMENTS PROCESSED

DATA GENERAL F H P - FETCH MICROCODE GENERATOR, REV. 6.0 (3/16/79)
  6/6/81 AT 3:37:30

INPUT FILE:  RESOLVER
OBJECT FILE: RESOLVER.OB

LINE NO:SOURCE 1 0 :$NO DOLLAR
 238 0 :/*tmp*/ MACRO    AON_VIA_DESCRIPTOR_BUS  MEANS   1 #1       ENDMAC;
 239 0 :
 240 0 :        MACRO    RESULT          MEANS    PREVIOUS(0)       ENDMAC;
 241 0 :        MACRO    NC_1            MEANS    CURRENT(1)        ENDMAC;
 242 0 :        MACRO    NC_2            MEANS    CURRENT(2)        ENDMAC;
 243 0 :        MACRO    TEMP            MEANS    CURRENT(7)        ENDMAC;

RESOLVER - Direct Cache Access Miss Handler 246 0 :ENTRY CACHE_RELOAD:
 247 0 :        OFF_ALU_OUT = NAME_TRAP(ZERO_EXTEND) OP CON_0,
 248 0 :        LOAD_OFF (TEMP) WITH OFFSET;         /* save trap */
 249 0 :
 250 0 :        RESOLVE (A,NAME_TRAP);               /* load cache */
 251 0 :
 252 0 :        OFF_ALU_OUT = ZERO OR TEMP,
 253 0 :        SOURCE (OFF_ALU_IS_16) TO NAME_BUS(NAME_TRAP); /* restore */
 254 0 :
 255 0 :        LOAD_AON (REG_A) WITH 0,             /* cleanup */
 256 0 :        OFF_ALU_OUT = ZERO OP CURRENT(1),
 257 0 :        LOAD (ACCUMULATOR) WITH OFFSET,                 /* restore */
 258 0 :        RETURN;
 259 0 :
```

RESOLVER - MISS Handler - Decode

```
262 0 :BEGIN
263 1 :         MACRO   NC_0            MEANS   CURRENT(4)      ENDMAC;
264 1 :         MACRO   NTF_1           MEANS   CURRENT(5)      ENDMAC;
265 1 :         MACRO   TRACE_FLAG      MEANS   CURRENT(5)      ENDMAC;
266 1 :         MACRO   NTF_PTR         MEANS   CURRENT(6)      ENDMAC;
267 1 :         MACRO   FIU_TYPE        MEANS   CURRENT(6)      ENDMAC;
268 1 :         MACRO   NAME_TRAP_SAVE  MEANS   TEMP            ENDMAC;
269 1 :         MACRO   INDEX_NAME      MEANS   NTF_1           ENDMAC;
270 1 :
271 1 :ENTRY COMMON_MISS:
272 1 :         OFF_ALU_OUT =
273 1 :              NAME_TRAP(ZERO_EXTEND) LEFT_SHIFTED(5) PLUS NT_PTR,
274 1 :         LOAD_OFF (NTF_PTR) WITH OFFSET,
275 1 :         LOAD_AON (NTF_PTR) WITH AON(NT_PTR);
276 1 :
277 1 :ENTRY COMMON_MISS_A:
278 1 :         OFF_ALU_OUT = ACC OR ZERO_VAL,
279 1 :         LOAD_OFF (NTF_1) WITH OFFSET,
280 1 :         LOAD_LEN (TRACE_FLAG) WITH LEN(READ_TRACING),
281 1 :         CASE ON ACC_BYTE(0) MASK WCSR ROTATE(2);
282 1 :
283 1 :/* 0000 - Short Displacement, Short Length, FP */
284 1 :         OFF_ALU_OUT = ACC SIGN_EXTEND_LO_HALF PLUS FP,
285 1 :         LOAD_OFF (RESULT) WITH OFFSET,
286 1 :         LOAD_AON (RESULT) WITH AON_VIA_DESCRIPTOR_BUS(FP),
287 1 :         FIU(RIGHT,SIGN),
288 1 :         LONG_GOTO SD_SL_ABP;
289 1 :
290 1 :/* 0001 - Short Displacement, Short Length, SDP */
291 1 :         OFF_ALU_OUT = ACC SIGN_EXTEND_LO_HALF PLUS SDP,
292 1 :         LOAD_OFF (RESULT) WITH OFFSET,
293 1 :         LOAD_AON (RESULT) WITH AON_VIA_DESCRIPTOR_BUS(SDP),
294 1 :         FIU(RIGHT,SIGN),
295 1 :         LONG_GOTO SD_SL_ABP;
296 1 :
297 1 :/* 0010 - Short Displacement, Short Length, PBP */
298 1 :         OFF_ALU_OUT = ACC SIGN_EXTEND_LO_HALF PLUS PBP,
299 1 :         LOAD_OFF (RESULT) WITH OFFSET,
300 1 :         LOAD_AON (RESULT) WITH AON_VIA_DESCRIPTOR_BUS(PBP),
301 1 :         FIU(RIGHT,SIGN),
302 1 :         LONG_GOTO SD_SL_ABP;
303 1 :
304 1 :/* 0011 - No Displacement, Short Length, Based */
305 1 :         OFF_ALU_OUT = ACC LEFT_SHIFTED(4) AND CON_8000,
306 1 :         TEST_IO_CC (OFF_NE_0),
307 1 :         GOTO SD_SL_BASED;
308 1 :
309 1 :/* 0100 - Short Displacement, Long Length, FP */
310 1 :         OFF_ALU_OUT = ACC SIGN_EXTEND_LO_HALF PLUS FP,
311 1 :         LOAD_OFF (RESULT) WITH OFFSET,
312 1 :         LOAD_AON (RESULT) WITH AON_VIA_DESCRIPTOR_BUS(FP),
313 1 :         FIU(RIGHT,SIGN),
314 1 :         LONG_GOTO SD_LL_ABP;
315 1 :
316 1 :/* 0101 - Short Displacement, Long Length, SDP */
317 1 :         OFF_ALU_OUT = ACC SIGN_EXTEND_LO_HALF PLUS SDP,
318 1 :         LOAD_OFF (RESULT) WITH OFFSET,
319 1 :         LOAD_AON (RESULT) WITH AON_VIA_DESCRIPTOR_BUS(SDP),
320 1 :         FIU(RIGHT,SIGN),
321 1 :         LONG_GOTO SD_LL_ABP;
322 1 :
323 1 :/* 0110 - Short Displacement, Long Length, PBP */
324 1 :         OFF_ALU_OUT = ACC SIGN_EXTEND_LO_HALF PLUS PBP,
325 1 :         LOAD_OFF (RESULT) WITH OFFSET,
326 1 :         LOAD_AON (RESULT) WITH AON_VIA_DESCRIPTOR_BUS(PBP),
327 1 :         FIU(RIGHT,SIGN),
328 1 :         LONG_GOTO SD_LL_ABP;
329 1 :
330 1 :/* 0111 - No Displacement, Long Length, Based */
331 1 :         OFF_ALU_OUT = ACC LEFT_SHIFTED(4) AND CON_8000,
```

```
332 1 :          TEST_IO_CC (OFF_NE_0),
333 1 :          GOTO SD_LL_BASED;
334 1 :
335 1 :/* 1000 - Long Displacement, Short Length, FP */
336 1 :          READ IO ACCUMULATOR USING OFF_ALU WITH NTE_PTR CON_LENGTH(32),
337 1 :          OFF_ALU_OUT = BIASED_LENGTH PLUS NTE_PTR,
338 1 :          LOAD_OFF (NIF_PIP) WITH OFFSET,
339 1 :          LOAD_ADN (NIF_PIP) WITH ADN(NIF_PIP),
340 1 :          LONG_GOTO LD_SL_FP;
341 1 :
342 1 :/* 1001 - Long Displacement, Short Length, SDP */
343 1 :          READ IO ACCUMULATOR USING OFF_ALU WITH NTE_PTR CON_LENGTH(32),
344 1 :          OFF_ALU_OUT = BIASED_LENGTH PLUS NTE_PTR,
345 1 :          LOAD_OFF (NIF_PIP) WITH OFFSET,
346 1 :          LOAD_ADN (NIF_PIP) WITH ADN(NIF_PIP),
347 1 :          LONG_GOTO LD_SL_SDP;
348 1 :
349 1 :/* 1010 - Long Displacement, Short Length, PBP */
350 1 :          READ IO ACCUMULATOR USING OFF_ALU WITH NTE_PTR CON_LENGTH(32),
351 1 :          OFF_ALU_OUT = BIASED_LENGTH PLUS NTE_PTR,
352 1 :          LOAD_OFF (NIF_PIP) WITH OFFSET,
353 1 :          LOAD_ADN (NIF_PIP) WITH ADN(NIF_PIP),
354 1 :          LONG_GOTO LD_SL_PBP;
355 1 :
356 1 :/* 1011 - Long Displacement, Short Length, Based */
357 1 :          OFF_ALU_OUT = ACC LEFT_SHIFTED(4) AND CON_8000,
358 1 :          TEST_IO_CC (OFF_NE_0),
359 1 :          GOTO LD_SL_BASED;
360 1 :
361 1 :/* 1100 - Long Displacement, Long Length, FP */
362 1 :          READ IO ACCUMULATOR USING OFF_ALU WITH NTE_PTR CON_LENGTH(32),
363 1 :          OFF_ALU_OUT = BIASED_LENGTH PLUS NTE_PTR,
364 1 :          LOAD_OFF (NIF_PIP) WITH OFFSET,
365 1 :          LOAD_ADN (NIF_PIP) WITH ADN(NIF_PIP),
366 1 :          LONG_GOTO LD_LL_FP;
367 1 :
368 1 :/* 1101 - Long Displacement, Long Length, SDP */
369 1 :          READ IO ACCUMULATOR USING OFF_ALU WITH NTE_PTR CON_LENGTH(32),
370 1 :          OFF_ALU_OUT = BIASED_LENGTH PLUS NTE_PTR,
371 1 :          LOAD_OFF (NIF_PIP) WITH OFFSET,
372 1 :          LOAD_ADN (NIF_PIP) WITH ADN(NTE_PTR),
373 1 :          LONG_GOTO LD_LL_SDP;
374 1 :
375 1 :/* 1110 - Long Displacement, Long Length, PBP */
376 1 :          READ IO ACCUMULATOR USING OFF_ALU WITH NTE_PTR CON_LENGTH(32),
377 1 :          OFF_ALU_OUT = BIASED_LENGTH PLUS NTE_PTR,
378 1 :          LOAD_OFF (NIF_PIP) WITH OFFSET,
379 1 :          LOAD_ADN (NIF_PIP) WITH ADN(NIF_PIP),
380 1 :          LONG_GOTO LD_LL_PBP;
381 1 :
382 1 :/* 1111 - Long Displacement, Long Length, Based */
383 1 :          OFF_ALU_OUT = ACC LEFT_SHIFTED(4) AND CON_8000,
384 1 :          TEST_IO_CC (OFF_NE_0),
385 1 :          GOTO LD_LL_BASED;

RESOLVER - MISS Handler - No Displacement, Short Length, BASED 388 1 :SD_SL_BASED:
389 1 :          OFF_ALU_OUT = NAME_TRAP(ZERO_EXTEND) OR CON_0,
390 1 :          LOAD_OFF (NAME_TRAP_SAVE) WITH OFFSET,
391 1 :          IF NOT_CC THEN GOTO SD_SL_METRD;
392 1 :
393 1 :          OFF_ALU_OUT = ACC AND CON_FFFF,
394 1 :          SOURCE (OFF_ALU_LS_16) TO NAME_BUS(NAME_TRAP),
395 1 :          LOAD_OFF (NC_2) WITH OFFSET,
396 1 :          CASE ON ACC_BYTE(2) MASK 900D ROTATE(3);
397 1 :
398 1 :/* 0 - FP, SDP Indirect */
399 1 :          RESOLVE (A,NAME_TRAP);
400 1 :
401 1 :          OFF_ALU_OUT = ZERO OR NAME_TRAP_SAVE,
```

```
402 1 :          SOURCE (OFF_ALU_LS_16) TO NAME_BUS(NAME_TRAP);
403 1 :
404 1 :          OFF_ALU_OUT = ZERO OR REG_A,
405 1 :          LOAD_OFF (RESULT) WITH OFFSET,
406 1 :          LOAD_ADN (RESULT) WITH ADN(REG_A);
407 1 :
408 1 :SD_SL_BASED_1:
409 1 :          OFF_ALU_OUT = ZERO OR NTF_1,
410 1 :          LOAD (ACCUMULATOR) WITH OFFSET,
411 1 :          LOAD_ADN (REG_A) WITH 0,
412 1 :          WITH TRACE_FLAG,
413 1 :          IF LEV_LE_12 THEN GOTO SD_SL_ABR;
414 1 :
415 1 :/* 1 - Base is a Name / Indirect */
416 1 :          OFF_ALU_OUT = ZERO OR NAME_TRAP_SAVE,
417 1 :          SOURCE (OFF_ALU_LS_16) TO NAME_BUS(NAME_TRAP);
418 1 :
419 1 :SD_SL_WEIRD:
420 1 :          OFF_ALU_OUT = LIT16(800FFF) AND ACC_HI,
421 1 :          LOAD_LEN (RESULT) WITH OFF;
422 1 :
423 1 :          OFF_ALU_OUT = ACC LEFT_SHIFTED(4) OR CON_0,
424 1 :          LOAD (ACCUMULATOR) WITH OFFSET,
425 1 :          CASE ON ACC_BYTE(2) MASK 0C0R ROTATE(2);
426 1 :
427 1 :/* 00 - FP Indirect */
428 1 :          OFF_ALU_OUT = ACC SIGN_EXTEND_LO_HALF LEFT_SHIFTED(1) PLUS FP,
429 1 :          LOAD_OFF (NC_0) WITH OFFSET,
430 1 :          LOAD_ADN (NC_0) WITH ADN(FP),
431 1 :          LOAD_LEN (NC_0) WITH LEN(FP) CON_LENGTH(1,INC),
432 1 :          LONG_GOTO SD_SL_WEIRD_3;
433 1 :
434 1 :/* 01 - SDP Indirect */
435 1 :          OFF_ALU_OUT = ACC SIGN_EXTEND_LO_HALF LEFT_SHIFTED(1) PLUS SDP,
436 1 :          LOAD_OFF (NC_0) WITH OFFSET,
437 1 :          LOAD_ADN (NC_0) WITH ADN(SDP),
438 1 :          LOAD_LEN (NC_0) WITH LEN(SDP) CON_LENGTH(1,INC),
439 1 :          LONG_GOTO SD_SL_WEIRD_3;
440 1 :
```

RESOLVER - MISS Handler - No Displacement, Short Length, BASED

```
441 1 :/* 10 - Base is a Name Indirect */
442 1 :          OFF_ALU_OUT = ZEROS,
443 1 :          LOAD_OFF (RESULT) WITH OFFSET,
444 1 :          LONG_GOTO SD_SL_WEIRD_4;
445 1 :
446 1 :/* 11 - Base is a Name */
447 1 :          OFF_ALU_OUT = ZEROS,
448 1 :          LOAD_OFF (RESULT) WITH OFFSET;
449 1 :
450 1 :SD_SL_WEIRD_1:
451 1 :          OFF_ALU_OUT = ZERO OR NTF_1,
452 1 :          LOAD (ACCUMULATOR) WITH OFFSET;
453 1 :
454 1 :          OFF_ALU_OUT = LIT16(800FFF) AND ACC_HI,
455 1 :          LOAD_OFF (NC_0) WITH OFFSET;
456 1 :
457 1 :SD_SL_WEIRD_2:
458 1 :          OFF_ALU_OUT = ACC ZERO_HI OR CON_0,
459 1 :          LOAD_OFF (NC_2) WITH OFFSET,
460 1 :          LONG_GOTO LOAD_WEIRD_BASE;
461 1 :
462 1 :SD_SL_WEIRD_3:
463 1 :          OFF_ALU_OUT = ZEROS,
464 1 :          LOAD_OFF (RESULT) WITH OFFSET,
465 1 :          LONG_GOTO SD_SL_WEIRD_5;
466 1 :
467 1 :SD_SL_WEIRD_4:
468 1 :          OFF_ALU_OUT = LIT16(84000) OR NTE_1,
469 1 :          LOAD_OFF (NC_2) WITH OFFSET,
470 1 :          SOURCE (OFF_ALU_LS_16) TO NAME_BUS(NAME_TRAP);
```

```
471 1 :
472 1 :          RESOLVE (A,NAME_TRAP);
473 1 :
474 1 :          OFF_ALU_OUT = ZERO OR REG_A,
475 1 :          LOAD_OFF (NC_0) WITH OFFSET,
476 1 :          LOAD_AON (NC_0) WITH AON(REG_A),
477 1 :          LOAD_LEN (NC_0) WITH LITERAL(LIT_LENGTH(33));
478 1 :
479 1 :          OFF_ALU_OUT = ZERO OR NC_2,
480 1 :          LOAD_AON (REG_A) WITH 0,          /* See if it was a scalar   */
481 1 :          mem 0, nac 0, snac 4, op_ctrl 0,/* RESOLVE(A,OFF_ALU_LS_16) */
482 1 :          o_in 1, a_w 1, l_in 1;            /* aon will be 0 if it hits */
483 1 :
484 1 :          OFF_ALU_OUT = ZERO OR NAME_TRAP_SAVE,
485 1 :          SOURCE (OFF_ALU_LS_16) TO NAME_BUS(NAME_TRAP);
486 1 :
487 1 :          WITH REG_A,
488 1 :          LOAD_AON (REG_A) WITH 0,
489 1 :          IF AON_NE_0 THEN GOTO SD_SL_WEIRD_1; /* if base not in cache */
490 1 :
491 1 :SD_SL_WEIRD_S:
492 1 :          OFF_ALU_OUT = ZERO OR NIF_1,
493 1 :          LOAD (ACCUMULATOR) WITH OFFSET;
494 1 :
495 1 :          LOAD_AON (RESULT) WITH AON_VIA_DESCRIPTOR_BUS(NC_0),
496 1 :          FIU(RIGHT,SIGN),
497 1 :          CASE ON ACC_BYTE(0) MASK WICR ROTATE(6);
498 1 :
499 1 :/* 000 - Unsigned, Not Indexed */
500 1 :          LOAD_AON (RESULT) WITH AON_VIA_DESCRIPTOR_BUS(RESULT),
501 1 :          FIU(RIGHT,ZERO),
502 1 :          LONG_GOTO SD_SL_WEIRD_100;
503 1 :
504 1 :/* 001 - Unsigned, les is a Literal */
505 1 :          LOAD_AON (RESULT) WITH AON_VIA_DESCRIPTOR_BUS(RESULT),
506 1 :          FIU(RIGHT,ZERO),
507 1 :          LONG_GOTO SD_SL_WEIRD_101;
508 1 :
509 1 :/* 010 - Unsigned, les is a Name */
510 1 :          LOAD_AON (RESULT) WITH AON_VIA_DESCRIPTOR_BUS(RESULT),
511 1 :          FIU(RIGHT,ZERO),
512 1 :          LONG_GOTO SD_SL_WEIRD_110;
513 1 :
514 1 :/* 011 - Unsigned, les is a Power of 2 */
515 1 :          LOAD_AON (RESULT) WITH AON_VIA_DESCRIPTOR_BUS(RESULT),
516 1 :          FIU(RIGHT,ZERO),
517 1 :          LONG_GOTO SD_SL_WEIRD_111;
518 1 :
519 1 :/* 100 - Signed, not indexed */
520 1 :SD_SL_WEIRD_100:
521 1 :          READ TO ACCUMULATOR USING DESCRIPTOR NC_0 CON_LENGTH(32),
522 1 :          SOURCE (DESCRIPTOR NC_0)
523 1 :             TO DESCRIPTOR_BUS(NAME_CACHE_0(NAME_TRAP)),
524 1 :          LOAD_AON (NC_0) WITH 0,
525 1 :          LONG_GOTO SD_SL_WEIRD_T_0;
526 1 :
527 1 :/* 101 - Signed, les is a Literal */
528 1 :SD_SL_WEIRD_101:
529 1 :          READ TO ACCUMULATOR USING OFF_ALU WITH NTE_PTR CON_LENGTH(32),
530 1 :          OFF_ALU_OUT = BIASED_LENGTH PLUS NTE_PTR,
531 1 :          LOAD_AON (NIF_PIP) WITH 0,
532 1 :          LONG_GOTO SD_SL_W_101_A;
533 1 :
534 1 :/* 110 - Signed, les is a Name */
535 1 :SD_SL_WEIRD_110:
536 1 :          READ TO ACCUMULATOR USING OFF_ALU WITH NTE_PTR CON_LENGTH(32),
537 1 :          OFF_ALU_OUT = BIASED_LENGTH PLUS NTE_PTR,
538 1 :          LOAD_AON (NIF_PIP) WITH 0,
539 1 :          LONG_GOTO SD_SL_W_110_A;
540 1 :
541 1 :/* 111 - Signed, les is a Power of 2 */
```

```
542  1  :SU_SL_WEIRD_111:
543  1  :      READ TO ACCUMULATOR USING OFF_ALU WITH NTE_PTR CON_LENGTH(32),
544  1  :      OFF_ALU_OUT = READED_LENGTH PLUS NTE_PTR,
545  1  :      LOAD_AON (NTE_PTR) WITH 0,
546  1  :      LONG_GOTO SU_SL_M_111_A;
547  1  :
548  1  :SU_SL_WEIRD_IND:
549  1  :      SOURCE (DESCRIPTOR RESULT)
550  1  :          TO DESCRIPTOR_BUS(NAME_CACHE_2(NAME_TRAP)),
551  1  :      LOAD_AON (NTE_PTR) WITH 0,
552  1  :      CASE ON ACC_BYTE(0) MASK BRUB PUTATE(1);
553  1  :
554  1  :/* 0 - Intra Object Pointer */
555  1  :      SOURCE (DESCRIPTOR RESULT)
556  1  :          TO DESCRIPTOR_BUS(NAME_CACHE_1(NAME_TRAP)),
557  1  :      OFF_ALU_OUT = ACC PLUS RESULT,
558  1  :      LOAD_OFF (RESULT) WITH OFFSET,
559  1  :      LOAD_AON (RESULT) WITH AON(RESULT),
560  1  :      LOAD (ACCUMULATOR) WITH OFFSET,
561  1  :      RETURN;
562  1  :
563  1  :/* 1 - General Pointer */
564  1  :      SOURCE (DESCRIPTOR NC_0)
565  1  :          TO DESCRIPTOR_BUS(NAME_CACHE_1(NAME_TRAP)),
566  1  :      OFF_ALU_OUT = ZERO OR NC_0,
567  1  :      LOAD_OFF (CURRENT(7)) WITH OFFSET;
568  1  :
569  1  :      LOAD_AON (CURRENT(7)) WITH AON(RESULT),
570  1  :      LONG_CALL PTR_TO_DESCREAD_STARTED;
571  1  :
572  1  :      LOAD_OFF (FIU.TYPE) WITH AON(RESULT),
573  1  :      LONG_GOTO RESOLVER_TRAPS*RES_A_IND_DONE;
574  1  :
575  1  :SU_SL_M_101_A:
576  1  :      OFF_ALU_OUT = ACC OR CON_0,
577  1  :      LOAD_OFF (NC_1) WITH OFFSET,
578  1  :      LOAD_LEN (NC_1) WITH LITERAL(LON_LENGTH(32)),
579  1  :      CASE ON ACC_BYTE(2) MASK BRUB PUTATE(1);              /* IFS Sign */
580  1  :
581  1  :/* 0 - Positive IES */
582  1  :      COPY (NC_2,NC_0),
583  1  :      LONG_GOTO SD_SL_M_END_1;
584  1  :
585  1  :/* 1 - Negative IES */
586  1  :      OFF_ALU_OUT = ACC XOR CON_FFFF,
587  1  :      LOAD_OFF (NC_1) WITH OFFSET,
588  1  :      LOAD_LEN (NC_1) WITH LITERAL(LIT_LENGTH(34));
589  1  :
590  1  :      OFF_ALU_OUT = ONE PLUS NC_1,
591  1  :      LOAD_OFF (NC_1) WITH OFFSET,
592  1  :      LONG_GOTO SD_SL_M_END;
593  1  :
594  1  :SU_SL_M_111_A:
595  1  :      OFF_ALU_OUT = ACC OR CON_0,
596  1  :      LOAD_OFF (NC_1) WITH OFFSET,
597  1  :      LOAD_LEN (NC_1) WITH OFF,
598  1  :      LONG_GOTO SU_SL_M_END;
599  1  :
600  1  :SU_SL_M_110_A:
601  1  :      OFF_ALU_OUT = ACC OR CON_0,
602  1  :      LOAD_OFF (NC_1) WITH OFFSET,
603  1  :      LOAD_LEN (NC_1) WITH LITERAL(LIT_LENGTH(36));
604  1  :
605  1  :SU_SL_M_END:
606  1  :      COPY (NC_2,NC_0);
607  1  :
608  1  :SU_SL_M_END_1:
609  1  :      LOAD_OFF (NC_0) WITH JPU(LEN(RESULT)),
610  1  :      LOAD_AON (NC_0) WITH 0;
611  1  :
612  1  :      OFF_ALU_OUT = LIT32(950000000w) OR NC_0,
613  1  :      LOAD_OFF (NC_0) WITH OFFSET;
```

```
614 1 :
615 1 :          SOURCE (DESCRIPTOR NC_0)
616 1 :               TO DESCRIPTOR_BUS(NAME_CACHE_0(NAME_TRAP));
617 1 :
618 1 :          SOURCE (DESCRIPTOR NC_1)
619 1 :               TO DESCRIPTOR_BUS(NAME_CACHE_1(NAME_TRAP));
620 1 :
621 1 :          READ TO ACCUMULATOR USING DESCRIPTOR NC_2 CON_LENGTH(32),
622 1 :          SOURCE (DESCRIPTOR NC_2)
623 1 :               TO DESCRIPTOR_BUS(NAME_CACHE_2(NAME_TRAP));
624 1 :
625 1 :          SOURCE (DESCRIPTOR RESULT)
626 1 :               TO DESCRIPTOR_BUS(NAME_CACHE_3(NAME_TRAP)),
627 1 :          LONG_GOTO L_V_BASE_ENC_END;
630 1 :LD_SL_BASED:
631 1 :          OFF_ALU_OUT = NAME_TRAP(ZERO_EXTEND) OR ZERO_VAL,
632 1 :          LOAD_OFF (NAME_TRAP_SAVE) WITH OFFSET,
633 1 :          LOAD_LEN (NAME_TRAP_SAVE) WITH LEN(READ_TRACING),
634 1 :          IF NOT_CC THEN GOTO LD_SL_WEIRD;
635 1 :
636 1 :          OFF_ALU_OUT = ACC AND CON_FFFF,
637 1 :          SOURCE (OFF_ALU_LS_16) TO NAME_BUS(NAME_TRAP),
638 1 :          LOAD_OFF (NC_2) WITH OFFSET,
639 1 :          CASE ON ACC_BYTE(2) MASK #C0# ROTATE(3);
640 1 :
641 1 :/* 0 - FP, SDP Indirect */
642 1 :          RESOLVE (A,NAME_TRAP);
643 1 :
644 1 :          READ TO ACCUMULATOR USING OFF_ALU WITH NTE_PTR CON_LENGTH(32),
645 1 :          OFF_ALU_OUT = BIASED_LENGTH PLUS NTE_PTR,
646 1 :          LOAD_OFF (NTE_PTR) WITH OFFSET,
647 1 :          LOAD_ADN (NTE_PTR) WITH ADN(NTE_PTR);
648 1 :
649 1 :          OFF_ALU_OUT = ZERO OR NAME_TRAP_SAVE,
650 1 :          SOURCE (OFF_ALU_LS_16) TO NAME_BUS(NAME_TRAP),
651 1 :          IF LEN_GT_32 THEN GOTO LD_SL_WEIRD_1;
652 1 :
653 1 :          OFF_ALU_OUT = ACC PLUS REG_A,
654 1 :          LOAD_OFF (RESULT) WITH OFFSET,
655 1 :          LOAD_ADN (RESULT) WITH ADN(REG_A),
656 1 :          LONG_GOTO SO_SL_BASED_1;
657 1 :
658 1 :/* 1 - Base is a Name / Indirect */
659 1 :          OFF_ALU_OUT = ZERO OR NAME_TRAP_SAVE,
660 1 :          SOURCE (OFF_ALU_LS_16) TO NAME_BUS(NAME_TRAP);
661 1 :
662 1 :LD_SL_WEIRD:
663 1 :          OFF_ALU_OUT = LIT16(#00FF#) AND ACC_HI,
664 1 :          LOAD_LEN (RESULT) WITH OFF;
665 1 :
666 1 :          OFF_ALU_OUT = ACC LEFT_SHIFTED(4) OR CON_0,
667 1 :          LOAD (ACCUMULATOR) WITH OFFSET,
668 1 :          CASE ON ACC_BYTE(2) MASK #C0# ROTATE(2);
669 1 :
670 1 :/* 00 - FP Indirect */
671 1 :          OFF_ALU_OUT = ACC SIGN_EXTEND_LO_HALF LEFT_SHIFTED(1) PLUS FP,
672 1 :          LOAD_OFF (NC_0) WITH OFFSET,
673 1 :          LOAD_ADN (NC_0) WITH ADN(FP),
674 1 :          LOAD_LEN (NC_0) WITH LEN(FP) CON_LENGTH(1,INC),
675 1 :          LONG_GOTO LD_SL_WEIRD_2;
676 1 :
677 1 :/* 01 - SDP Indirect */
678 1 :          OFF_ALU_OUT = ACC SIGN_EXTEND_LO_HALF LEFT_SHIFTED(1) PLUS SDP,
679 1 :          LOAD_OFF (NC_0) WITH OFFSET,
680 1 :          LOAD_ADN (NC_0) WITH ADN(SDP),
681 1 :          LOAD_LEN (NC_0) WITH LEN(SDP) CON_LENGTH(1,INC),
682 1 :          LONG_GOTO LD_SL_WEIRD_2;
683 1 :
684 1 :/* 10 - Base is a Name Indirect */
685 1 :          READ TO ACCUMULATOR USING OFF_ALU WITH NTE_PTR CON_LENGTH(32),
686 1 :          OFF_ALU_OUT = BIASED_LENGTH PLUS NTE_PTR,
687 1 :          LOAD_OFF (NTE_PTR) WITH OFFSET,
```

```
688 1 :          LOAD_AON (NTF_PIP) WITH AON(NTE_PTR),
689 1 :          LONG_GOTO LD_SL_WETRD_3;
690 1 :
691 1 :/* 11 - Base is a Name */
692 1 :          READ TO ACCUMULATOR USING OFF_ALU WITH NTE_PTR CON_LENGTH(32),
693 1 :          OFF_ALU_OUT = BIASED_LENGTH PLUS NTE_PTR,
694 1 :          LOAD_OFF (NTE_PIR) WITH OFFSET,
695 1 :          LOAD_AON (NTE_PTR) WITH AON(NTE_PIP);
696 1 :
697 1 :          OFF_ALU_OUT = ACC OR CON_0,
698 1 :          LOAD_OFF (RESULT) WITH OFFSET,
699 1 :          LONG_GOTO SD_SL_WETRD_1;
700 1 :
701 1 :LD_SL_WETRD_1:
702 1 :          OFF_ALU_OUT = ACC OR CON_0,
703 1 :          LOAD_OFF (RESULT) WITH OFFSET;
704 1 :
705 1 :          OFF_ALU_OUT = LIT32(300FF0000) AND NTF_1,
706 1 :          LOAD (ACCUMULATOR) WITH OFFSET;
707 1 :
708 1 :          OFF_ALU_OUT = ZERO OR ACC_HI,
709 1 :          LOAD_OFF (NC_0) WITH OFFSET,
710 1 :          LONG_GOTO LOAD_RETRD_BASE;
711 1 :
712 1 :LD_SL_WETRD_2:
713 1 :          READ TO ACCUMULATOR USING OFF_ALU WITH NTE_PTR CON_LENGTH(32),
714 1 :          OFF_ALU_OUT = BIASED_LENGTH PLUS NTE_PTR,
715 1 :          LOAD_OFF (NTE_PIR) WITH OFFSET,
716 1 :          LOAD_AON (NTE_PIP) WITH AON(NTE_PIP);
717 1 :
718 1 :          OFF_ALU_OUT = ACC OR CON_0,
719 1 :          LOAD_OFF (RESULT) WITH OFFSET,
720 1 :          LONG_GOTO SD_SL_WETRD_5;
721 1 :
722 1 :LD_SL_WETRD_3:
723 1 :          OFF_ALU_OUT = ACC OR CON_0,
724 1 :          LOAD_OFF (RESULT) WITH OFFSET,
725 1 :          LONG_GOTO SD_SL_WETRD_4;
```

RESOLVER - MTSS Handler - No Displacement, Long Length, BASED

```
728 1 :SD_LL_BASED:
729 1 :          OFF_ALU_OUT = NAME_TRAP(ZERO_EXTEND) OR CON_0,
730 1 :          LOAD_OFF (NAME_TRAP_SAVE) WITH OFFSET,
731 1 :          IF NOT_CC THEN GOTO SD_LL_WETRD;
732 1 :
733 1 :          OFF_ALU_OUT = ACC AND CON_FFFF,
734 1 :          SOURCE (OFF_ALU_LS_16) TO NAME_BUS(NAME_TRAP),
735 1 :          LOAD_OFF (NC_2) WITH OFFSET,
736 1 :          CASE ON ACC_BYTE(2) MASK 3ROR ROTATE(3);
737 1 :
738 1 :/* 0 - FP, SDP Indirect */
739 1 :          RESOLVE (A,NAME_TRAP);
740 1 :
741 1 :          OFF_ALU_OUT = ZERO OR NAME_TRAP_SAVE,
742 1 :          SOURCE (OFF_ALU_LS_16) TO NAME_BUS(NAME_TRAP);
743 1 :
744 1 :          OFF_ALU_OUT = ZERO OR REG_A,
745 1 :          LOAD_OFF (RESULT) WITH OFFSET,
746 1 :          LOAD_AON (RESULT) WITH AON(REG_A);
747 1 :
748 1 :SD_LL_BASED_1:
749 1 :          OFF_ALU_OUT = ZERO OR NIF_1,
750 1 :          LOAD (ACCUMULATOR) WITH OFFSET,
751 1 :          LOAD_AON (REG_A) WITH 0,
752 1 :          WITH TRACE_FLAG,
753 1 :          IF LEN_LE_32 THEN GOTO SD_LL_ARR;
754 1 :
755 1 :/* 1 - Case is a Name / Indirect */
756 1 :          OFF_ALU_OUT = ZERO OR NAME_TRAP_SAVE,
757 1 :          SOURCE (OFF_ALU_LS_16) TO NAME_BUS(NAME_TRAP),
758 1 :          LONG_GOTO SD_LL_WETRD_1;
759 1 :
```

```
760 1 :SD_LL_WEIRD:
761 1 :         OFF_ALU_OUT = ACC ZERO_HI OR CON_0,
762 1 :         LOAD_OFF (NC_2) WITH OFFSET;
763 1 :
764 1 :SD_LL_WEIRD_1:
765 1 :         OFF_ALU_OUT = ZEROS,
766 1 :         LOAD_OFF (RESULT) WITH OFFSET;
767 1 :
768 1 :SD_LL_WEIRD_2:
769 1 :         READ TO ACCUMULATOR USING OFF_ALU WITH NTE_PTR CON_LENGTH(32),
770 1 :         OFF_ALU_OUT = BIASED_LENGTH PLUS NTE_PTR,
771 1 :         LOAD_OFF (NTF_PTR) WITH OFFSET,
772 1 :         LOAD_ADN (NTE_PTR) WITH ADN(NTF_PTR),
773 1 :         CASE ON ACC_BYTE(1) MASK _AND ROTATE(1); /* length is a name */
774 1 :
775 1 :/* 0 - Length is a Literal */
776 1 :         OFF_ALU_OUT = ACC ZERO_HI OR CON_0,
777 1 :         LOAD_OFF (NC_0) WITH OFFSET,
778 1 :         LONG_GOTO SD_LL_WEIRD_2;
779 1 :
780 1 :/* 1 - Length is a name */
781 1 :         OFF_ALU_OUT = ACC ZERO_HI OR CON_80000000,
782 1 :         LOAD_OFF (NC_0) WITH OFFSET;
783 1 :
784 1 :SD_LL_WEIRD_3:
785 1 :         OFF_ALU_OUT = ACC ZERO_LO AND CON_FF0FF00,
786 1 :         IF OFF_EQ_0 THEN GOTO SD_LL_WEIRD_4;   /* If type < 15 */
787 1 :
788 1 :         OFF_ALU_OUT = LIT32(0000F0000w) OR CON_0, /* use type 15 */
789 1 :         LOAD (ACCUMULATOR) WITH OFFSET;
790 1 :
791 1 :SD_LL_WEIRD_4:
792 1 :         OFF_ALU_OUT = ACC ZERO_LO LEFT_SHIFTED(2) OR NC_2,
793 1 :         LOAD_OFF (NC_2) WITH OFFSET,
794 1 :         LONG_GOTO LOAD_WEIRD_BASE;
797 1 :LD_LL_BASED:
798 1 :         OFF_ALU_OUT = NAME_TRAP(ZERO_EXTEND) OR ZERO_VAL,
799 1 :         LOAD_OFF (NAME_TRAP_SAVE) WITH OFFSET,
800 1 :         LOAD_LEN (NAME_TRAP_SAVE) WITH LEN(READ_TRACING),
801 1 :         IF NOT_CC THEN GOTO LD_LL_WEIRD;
802 1 :
803 1 :         OFF_ALU_OUT = ACC AND CON_FFFF,
804 1 :         SOURCE (OFF_ALU_LS_16) TO NAME_BUS(NAME_TRAP),
805 1 :         LOAD_OFF (NC_2) WITH OFFSET,
806 1 :         CASE ON ACC_BYTE(2) MASK _AND ROTATE(3);
807 1 :
808 1 :/* 0 - FP, SDP Indirect */
809 1 :         RESOLVE (A,NAME_TRAP);
810 1 :
811 1 :         READ TO ACCUMULATOR USING OFF_ALU WITH NTE_PTR CON_LENGTH(32),
812 1 :         OFF_ALU_OUT = BIASED_LENGTH PLUS NTE_PTR,
813 1 :         LOAD_OFF (NTE_PTR) WITH OFFSET,
814 1 :         LOAD_ADN (NTE_PTR) WITH ADN(NTE_PTR);
815 1 :
816 1 :         OFF_ALU_OUT = ZERO OR NAME_TRAP_SAVE,
817 1 :         SOURCE (OFF_ALU_LS_16) TO NAME_BUS(NAME_TRAP),
818 1 :         IF LEN_GT_32 THEN GOTO LD_LL_WEIRD_2;
819 1 :
820 1 :         OFF_ALU_OUT = ACC PLUS REG_A,
821 1 :         LOAD_OFF (RESULT) WITH OFFSET,
822 1 :         LOAD_ADN (RESULT) WITH ADN(REG_A),
823 1 :         LONG_GOTO SD_LL_BASED_1;
824 1 :
825 1 :/* 1 - base is a name / Indirect */
826 1 :         OFF_ALU_OUT = ZERO OR NAME_TRAP_SAVE,
827 1 :         SOURCE (OFF_ALU_LS_16) TO NAME_BUS(NAME_TRAP),
828 1 :         LONG_GOTO LD_LL_WEIRD_1;
829 1 :
830 1 :LD_LL_WEIRD:
831 1 :         OFF_ALU_OUT = ACC ZERO_HI OR CON_0,
832 1 :         LOAD_OFF (NC_2) WITH OFFSET;
833 1 :
```

```
834 1 :LD_LL_METRD_1:
835 1 :       READ TO ACCUMULATOR USING OFF_ALU WITH NTE_PTR CON_LENGTH(32),
836 1 :       OFF_ALU_OUT = BIASED_LENGTH PLUS NTE_PTR,
837 1 :       LOAD_OFF (NTE_PTR) WITH OFFSET,
838 1 :       LOAD_AON (NTE_PTR) WITH AON(NTE_PTR);
839 1 :
840 1 :LD_LL_METRD_2:
841 1 :       OFF_ALU_OUT = ACC OR CON_0,
842 1 :       LOAD_OFF (RESULT) WITH OFFSET;
843 1 :
844 1 :       OFF_ALU_OUT = ZERO OR NTE_1,
845 1 :       LOAD (ACCUMULATOR) WITH OFFSET,
846 1 :       LONG_GOTO SD_LL_METRD_2;
```
RESOLVER - MISS Handler - Short Displacement, Short Length, ABR
```
849 1 :SD_SL_ABR:
850 1 :       OFF_ALU_OUT = LIT16(800FFw) AND ACC_HI,
851 1 :       LOAD_LEN (RESULT) WITH OFF,
852 1 :       LOAD_AON (RESULT) WITH AON(RESULT);
853 1 :
854 1 :SD_SL_ABR_1:
855 1 :       OFF_ALU_OUT = BIASED_LENGTH CON_LENGTH(32) PLUS NTE_PTR,
856 1 :       LOAD (ACCUMULATOR) WITH OFFSET,
857 1 :       LOAD_AON (NTE_PTR) WITH 0,
858 1 :       CASE ON ACC_BYTE(0) MASK w1C9 ROTATE(6);
859 1 :
860 1 :/* 000 - Unsigned, Not Indexed */
861 1 :       SOURCE (DESCRIPTOR RESULT)
862 1 :           TO DESCRIPTOR_BUS(NAME_CACHE_0(NAME_TRAP)),
863 1 :       OFF_ALU_OUT = BIASED_LENGTH CON_LENGTH(0) OR RESULT,
864 1 :       LOAD (ACCUMULATOR) WITH OFFSET,
865 1 :       LOAD_AON (RESULT) WITH AON_VIA_DESCRIPTOR_BUS(RESULT),
866 1 :       FILL(RIGHT,ZERO),
867 1 :       RETURN;
868 1 :
869 1 :/* 001 - Unsigned, IES is a Literal */
870 1 :       LOAD_AON (RESULT) WITH AON_VIA_DESCRIPTOR_BUS(RESULT),
871 1 :       FILL(RIGHT,ZERO),
872 1 :       LONG_GOTO SD_SL_ABR_101;
873 1 :
874 1 :/* 010 - Unsigned, IFS is a Name */
875 1 :       LOAD_AON (RESULT) WITH AON_VIA_DESCRIPTOR_BUS(RESULT),
876 1 :       FILL(RIGHT,ZERO),
877 1 :       LONG_GOTO SD_SL_ABR_110;
878 1 :
879 1 :/* 011 - Unsigned, IFS is a Power of 2 */
880 1 :       LOAD_AON (RESULT) WITH AON_VIA_DESCRIPTOR_BUS(RESULT),
881 1 :       FILL(RIGHT,ZERO),
882 1 :       LONG_GOTO SD_SL_ABR_111;
883 1 :
884 1 :/* 100 - Signed, Not Indexed */
885 1 :       SOURCE (DESCRIPTOR RESULT)
886 1 :           TO DESCRIPTOR_BUS(NAME_CACHE_0(NAME_TRAP)),
887 1 :       OFF_ALU_OUT = ZERO OR RESULT,
888 1 :       LOAD (ACCUMULATOR) WITH OFFSET,
889 1 :       RETURN;
890 1 :
891 1 :/* 101 - Signed, IES is a Literal */
892 1 :SD_SL_ABR_101:
893 1 :       READ TO ACCUMULATOR USING OFF_ALU WITH PC.AON CON_LENGTH(32),
894 1 :       OFF_ALU_OUT = ACC OR ZERO_VAL,
895 1 :       LONG_GOTO F_VEC_IES_LIT;
896 1 :
897 1 :/* 110 - Signed, IFS is a Name */
898 1 :SD_SL_ABR_110:
899 1 :       READ TO ACCUMULATOR USING OFF_ALU WITH PC.AON CON_LENGTH(32),
900 1 :       OFF_ALU_OUT = ACC OR ZERO_VAL,
901 1 :       LONG_GOTO F_VEC_IES_NAME;
902 1 :
903 1 :/* 111 - Signed, IFS is a Power of 2 */
```

```
904 1 :SD_SL_ABR_111:
905 1 :        READ TO ACCUMULATOR USING OFF_ALU WITH PC.AON CON_LENGTH(32),
906 1 :        OFF_ALU_OUT = ACC OR ZERO_VAL,
907 1 :        LONG_GOTO E_VEC_TES_PWR2;
```

RESOLVER - MISS Handler - Long Displacement, Short Length, ABR

```
910 1 :LD_SL_FP:
911 1 :        OFF_ALU_OUT = ACC PLUS FP,
912 1 :        LOAD_OFF (RESULT) WITH OFFSET,
913 1 :        LOAD_AON (RESULT) WITH AON_VIA_DESCRIPTOR_BUS(FP),
914 1 :        FIll(RIGHT,SIGN),
915 1 :        LONG_GOTO LD_SL_ABR;
916 1 :
917 1 :LD_SL_SDP:
918 1 :        OFF_ALU_OUT = ACC PLUS SDP,
919 1 :        LOAD_OFF (RESULT) WITH OFFSET,
920 1 :        LOAD_AON (RESULT) WITH AON_VIA_DESCRIPTOR_BUS(SDP),
921 1 :        FIll(RIGHT,SIGN),
922 1 :        LONG_GOTO LD_SL_ABR;
923 1 :
924 1 :LD_SL_PBP:
925 1 :        OFF_ALU_OUT = ACC PLUS PBP,
926 1 :        LOAD_OFF (RESULT) WITH OFFSET,
927 1 :        LOAD_AON (RESULT) WITH AON_VIA_DESCRIPTOR_BUS(PBP),
928 1 :        FIll(RIGHT,SIGN),
929 1 :        LONG_GOTO LD_SL_ABR;
930 1 :
931 1 :LD_SL_ABR:
932 1 :        OFF_ALU_OUT = ZERO OR NTF_1,
933 1 :        LOAD (ACCUMULATOR) WITH OFFSET,
934 1 :        LONG_GOTO SD_SL_ABR;
```

RESOLVER - MISS Handler - Short Displacement, Long Length, ABR

```
937 1 :SD_LL_ABR:
938 1 :        READ TO ACCUMULATOR USING OFF_ALU WITH NTE_PTR CON_LENGTH(32),
939 1 :        OFF_ALU_OUT = BIASED_LENGTH PLUS NTE_PTR,
940 1 :        LOAD_OFF (NTE_PTR) WITH OFFSET,
941 1 :        LOAD_AON (NTE_PTR) WITH AON(NTE_PTR),
942 1 :        CASE ON ACC_BYTE(1) MASK #80# ROTATE(5); /* length is a name */
943 1 :
944 1 :/* 0 - Length is a Literal */
945 1 :        OFF_ALU_OUT = ACC AND CON_FFF0FF00,
946 1 :        IF OFF_NE_0 THEN GOTO WEIRD_LEN_TYPE;
947 1 :
948 1 :SD_LL_ABR_1:
949 1 :        DISABLE_AON_WRTIF,
950 1 :        OFF_ALU_OUT = ACC ZERO_HI OR CON_0,
951 1 :        LOAD_LEN (RESULT) WITH OFF;
952 1 :
953 1 :        LOAD_OFF (TEMP) WITH AON(RESULT);
954 1 :
955 1 :        INDIVISIBLE,
956 1 :        OFF_ALU_OUT = ACC ZERO_LO LEFT_SHIFTED(2) OR TEMP,
957 1 :        LOAD_AON (RESULT) WITH OFFSET,
958 1 :        LONG_GOTO SD_LL_ABR_2;
959 1 :
960 1 :/* 1 - Length is a Name */
961 1 :        OFF_ALU_OUT = ACC ZERO_LO AND CON_FFF0FF00,
962 1 :        IF OFF_EQ_0 THEN GOTO L_NAME_1;          /* if type < 15 */
963 1 :
964 1 :        OFF_ALU_OUT = LIT32(900F000000) OR CON_0,
965 1 :        LOAD_OFF (TEMP) WITH OFFSET;
966 1 :
967 1 :        OFF_ALU_OUT = ACC ZERO_HI OR TEMP,       /* use type 15 */
968 1 :        LOAD (ACCUMULATOR) WITH OFFSET;
969 1 :
970 1 :L_NAME_1:
971 1 :        OFF_ALU_OUT = ACC ZERO_HI OR CON_80000000,
972 1 :        LOAD_OFF (NC_0) WITH OFFSET,
973 1 :        LONG_GOTO WEIRD_L_T_2;
```

```
974 1 :
975 1 :
976 1 :SU_LL_ABR_2:
977 1 :         OFF_ALU_OUT = ZERO OR NTF_1,
978 1 :         LOAD (ACCUMULATOR) WITH OFFSET,
979 1 :         LONG_GOTO SU_SL_ABR_1;
980 1 :
981 1 :WETRD_LEN_TYPE:
982 1 :         OFF_ALU_OUT = ACC ZERO_LO AND CON_FFF0FF00,
983 1 :         IF OFF_EQ_0 THEN GOTO WETRD_L_T_1;     /* if type < 15 */
984 1 :
985 1 :         OFF_ALU_OUT = LIT32(00000F000000) OR CON_0, /* use type 15 */
986 1 :         LOAD_OFF (TEMP) WITH OFFSET;
987 1 :
988 1 :         OFF_ALU_OUT = ACC ZERO_HI OR TEMP,
989 1 :         LOAD (ACCUMULATOR) WITH OFFSET;

RESOLVER - MISS Handler - Short Displacement, Long Length, ABR 990 1 :
991 1 :WETRD_L_T_1:
992 1 :         OFF_ALU_OUT = ACC AND CON_FFF0FF00,
993 1 :         IF OFF_EQ_0 THEN GOTO SU_LL_ABR_1;
994 1 :
995 1 :         OFF_ALU_OUT = ACC ZERO_HI OR CON_0,
996 1 :         LOAD_OFF (NC_0) WITH OFFSET;
997 1 :
998 1 :WETRD_L_T_2:
999 1 :         DISABLE_ADN_WRITE,
1000 1 :        OFF_ALU_OUT = ACC ZERO_HI OR CON_0,
1001 1 :        LOAD_LEN (RESULT) WITH OFF;
1002 1 :
1003 1 :        LOAD_OFF (TEMP) WITH ADN(RESULT);
1004 1 :
1005 1 :        INDIVISIBLE,
1006 1 :        OFF_ALU_OUT = ACC ZERO_LO LEFT_SHIFTED(2) OR TEMP,
1007 1 :        LOAD_ADN (RESULT) WITH OFFSET;
1008 1 :
1009 1 :        OFF_ALU_OUT = ZERO OR NTF_1,
1010 1 :        LOAD (ACCUMULATOR) WITH OFFSET;
1011 1 :
1012 1 :        LOAD_ADN (RESULT) WITH ADN_VIA_DESCRIPTOR_BUS(RESULT),
1013 1 :        FIU(RIGHT,SIGN),
1014 1 :        CASE ON ACC_BYTE(0) MASK 11C0 ROTATE(6);
1015 1 :
1016 1 :/* 000 - Unsigned, Not Indexed */
1017 1 :        LOAD_ADN (RESULT) WITH ADN_VIA_DESCRIPTOR_BUS(RESULT),
1018 1 :        FIU(RIGHT,ZERO),
1019 1 :        LONG_GOTO WETRD_L_T_100;
1020 1 :
1021 1 :/* 001 - Unsigned, IES is a Literal */
1022 1 :        LOAD_ADN (RESULT) WITH ADN_VIA_DESCRIPTOR_BUS(RESULT),
1023 1 :        FIU(RIGHT,ZERO),
1024 1 :        LONG_GOTO WETRD_L_T_101;
1025 1 :
1026 1 :/* 010 - Unsigned, IES is a Name */
1027 1 :        LOAD_ADN (RESULT) WITH ADN_VIA_DESCRIPTOR_BUS(RESULT),
1028 1 :        FIU(RIGHT,ZERO),
1029 1 :        LONG_GOTO WETRD_L_T_110;
1030 1 :
1031 1 :/* 011 - Unsigned, IES is a Power of 2 */
1032 1 :        LOAD_ADN (RESULT) WITH ADN_VIA_DESCRIPTOR_BUS(RESULT),
1033 1 :        FIU(RIGHT,ZERO),
1034 1 :        LONG_GOTO WETRD_L_T_111;
1035 1 :
1036 1 :/* 100 - Signed, Not Indexed */
1037 1 :WETRD_L_T_100:
1038 1 :        SOURCE (DESCRIPTOR_NC_0)
1039 1 :            TO DESCRIPTOR_BUS(NAME_CACHE_0(NAME_TRAP)),
1040 1 :        OFF_ALU_OUT = FIXED_LENGTH CON_LENGTH(0) OR NC_0,
1041 1 :        LOAD (ACCUMULATOR) WITH OFFSET,
1042 1 :        LOAD_ADN (NIF_PTR) WITH 0,
```

RESOLVER - MISS Handler - Short Displacement, Long Length, ABR

```
1043 1 :        TEST_TO_CC (OFF_SIGN_EQ_1),
1044 1 :        GOTO WEIRD_L_T_END;
1045 1 :
1046 1 :/* 101 - Signed, IES is a Literal */
1047 1 :WEIRD_L_T_101:
1048 1 :        READ TO ACCUMULATOR USING OFF_ALU WITH NTE_PTR CON_LENGTH(32),
1049 1 :        OFF_ALU_OUT = BIASED_LENGTH PLUS NTE_PTR,
1050 1 :        LOAD_AON (NTE_PTR) WITH 0,
1051 1 :        LONG_GOTO L_VEC_TES_LIT;
1052 1 :
1053 1 :/* 110 - Signed, IES is a Name */
1054 1 :WEIRD_L_T_110:
1055 1 :        READ TO ACCUMULATOR USING OFF_ALU WITH NTE_PTR CON_LENGTH(32),
1056 1 :        OFF_ALU_OUT = BIASED_LENGTH PLUS NTE_PTR,
1057 1 :        LOAD_AON (NTE_PTR) WITH 0,
1058 1 :        LONG_GOTO L_VEC_TES_NAME;
1059 1 :
1060 1 :/* 111 - Signed, IES is a Power of 2 */
1061 1 :WEIRD_L_T_111:
1062 1 :        READ TO ACCUMULATOR USING OFF_ALU WITH NTE_PTR CON_LENGTH(32),
1063 1 :        OFF_ALU_OUT = BIASED_LENGTH PLUS NTE_PTR,
1064 1 :        LOAD_AON (NTE_PTR) WITH 0,
1065 1 :        LONG_GOTO L_VEC_TES_PWR2;
1066 1 :
1067 1 :
1068 1 :WEIRD_L_T_END:
1069 1 :        SOURCE (DESCRIPTOR_RESULT)
1070 1 :           TO DESCRIPTOR_BUS(NAME_CACHE_3(NAME_TRAP)),
1071 1 :        IF CC THEN GOTO WEIRD_L_NAME;
1072 1 :
1073 1 :        OFF_ALU_OUT = ZERO UP RESULT,
1074 1 :        LOAD (ACCUMULATOR) WITH OFFSET,
1075 1 :        RETURN;
1076 1 :
1077 1 :WEIRD_L_NAME:
1078 1 :        OFF_ALU_OUT = ACC OR CON_0,
1079 1 :        LOAD_OFF (TEMP) WITH OFFSET,
1080 1 :        SOURCE (OFF_ALU_IS_16) TO NAME_BUS(NAME_TRAP),
1081 1 :        LONG_GOTO LEN_TS_A_NAME;
```

RESOLVER - MISS Handler - Long Displacement, Long Length, ABR

```
1084 1 :LD_LL_FP:
1085 1 :        OFF_ALU_OUT = ACC PLUS FP,
1086 1 :        LOAD_OFF (RESULT) WITH OFFSET,
1087 1 :        LOAD_AON (RESULT) WITH AON_VIA_DESCRIPTOR_BUS(FP),
1088 1 :        FIU(RIGHT,SIGN),
1089 1 :        LONG_GOTO LD_LL_ABR;
1090 1 :
1091 1 :LD_LL_SDP:
1092 1 :        OFF_ALU_OUT = ACC PLUS SDP,
1093 1 :        LOAD_OFF (RESULT) WITH OFFSET,
1094 1 :        LOAD_AON (RESULT) WITH AON_VIA_DESCRIPTOR_BUS(SDP),
1095 1 :        FIU(RIGHT,SIGN),
1096 1 :        LONG_GOTO LD_LL_ABR;
1097 1 :
1098 1 :LD_LL_PBP:
1099 1 :        OFF_ALU_OUT = ACC PLUS PBP,
1100 1 :        LOAD_OFF (RESULT) WITH OFFSET,
1101 1 :        LOAD_AON (RESULT) WITH AON_VIA_DESCRIPTOR_BUS(PBP),
1102 1 :        FIU(RIGHT,SIGN),
1103 1 :        LONG_GOTO LD_LL_ABR;
1104 1 :
1105 1 :LD_LL_ABR:
1106 1 :        OFF_ALU_OUT = ZERO UP NTE_1,
1107 1 :        LOAD (ACCUMULATOR) WITH OFFSET,
1108 1 :        LONG_GOTO SD_LL_ABR;
1109 1 :
```

RESOLVER - MISS Handler - Vector - Base is Encachable - Simple Length

```
1112 1 :E_VEC_IES_LIT:
1113 1 :        LOAD_OFF (NC_0) WITH JPD(LEN(RESULT));
1114 1 :
1115 1 :        OFF_ALU_OUT = LIT32(94000000W) OR NC_0,
1116 1 :        LOAD_OFF (NC_0) WITH OFFSET;
1117 1 :
1118 1 :        SOURCE (DESCRIPTOR NC_0)
1119 1 :            TO DESCRIPTOR_BUS(NAME_CACHE_0(NAME_TRAP)),
1120 1 :        CASE ON ACC_BYTE(2) MASK #80# ROTATE(1);         /* IES Sign  */
1121 1 :
1122 1 :/* 0 - Positive IES */
1123 1 :        OFF_ALU_OUT = ACC OR CON_0,
1124 1 :        LOAD_OFF (NC_1) WITH OFFSET,
1125 1 :        LOAD_LEN (NC_1) WITH LITERAL(CON_LENGTH(32)),
1126 1 :        LONG_GOTO E_VEC_LOAD_NC_1;
1127 1 :
1128 1 :/* 1 - Negative IES */
1129 1 :        OFF_ALU_OUT = ACC XOR CON_FFFF,        /* complement */
1130 1 :        LOAD_OFF (NC_1) WITH OFFSET,
1131 1 :        LOAD_LEN (NC_1) WITH LITERAL(LIT_LENGTH(34));
1132 1 :
1133 1 :        SOURCE (OFF_ALU WITH NC_1)
1134 1 :            TO DESCRIPTOR_BUS(NAME_CACHE_1(NAME_TRAP)),
1135 1 :        OFF_ALU_OUT = ONE PLUS NC_1,                /* abs(IES) */
1136 1 :        LOAD_OFF (NC_1) WITH OFFSET,
1137 1 :        LOAD (ACCUMULATOR) WITH OFFSET,
1138 1 :        LONG_GOTO E_VEC_END;
```

RESOLVER - MISS Handler - Vector - Base is Encachable - Simple Length

```
1140 1 :F_VEC_IES_NAME:
1141 1 :        LOAD_OFF (NC_0) WITH JPD(LEN(RESULT));
1142 1 :
1143 1 :        OFF_ALU_OUT = LIT32(94000000W) OR NC_0,
1144 1 :        LOAD_OFF (NC_0) WITH OFFSET;
1145 1 :
1146 1 :        SOURCE (DESCRIPTOR NC_0)
1147 1 :            TO DESCRIPTOR_BUS(NAME_CACHE_0(NAME_TRAP));
1148 1 :
1149 1 :        OFF_ALU_OUT = ACC OR CON_0,
1150 1 :        LOAD_OFF (NC_1) WITH OFFSET,
1151 1 :        LOAD_LEN (NC_1) WITH LITERAL(LIT_LENGTH(36));
1152 1 :
1153 1 :E_VEC_LOAD_NC_1:
1154 1 :        SOURCE (DESCRIPTOR NC_1)
1155 1 :            TO DESCRIPTOR_BUS(NAME_CACHE_1(NAME_TRAP));
1156 1 :
1157 1 :E_VEC_END:
1158 1 :        SOURCE (DESCRIPTOR RESULT)
1159 1 :            TO DESCRIPTOR_BUS(NAME_CACHE_3(NAME_TRAP)),
1160 1 :        LONG_GOTO WEIRD_VECTOR;
```

RESOLVER - MISS Handler - Vector - Base is Encachable - Simple Length

```
1162 1 :E_VEC_IES_PAR2:
1163 1 :        OFF_ALU_OUT = NAME_TRAP(ZERO_EXTEND) OR CON_0,
1164 1 :        LOAD_OFF (NAME_TRAP_SAVE) WITH OFFSET;
1165 1 :
1166 1 :        OFF_ALU_OUT = ACC OR CON_0,
1167 1 :        LOAD_OFF (NC_1) WITH OFFSET,
1168 1 :        LOAD_LEN (NC_1) WITH OFF,
1169 1 :        CASE ON ACC_BYTE(3) MASK #18# ROTATE(5);
1170 1 :
1171 1 :/* Shift 0 - 7 */
1172 1 :        OFF_ALU_OUT = ZERO OR ACC_HI,
1173 1 :        LOAD_OFF (INDEX_NAME) WITH OFFSET,
1174 1 :        LONG_GOTO CHECK_HARD_VEC;
1175 1 :
1176 1 :/* Shift 8 - 15 */
1177 1 :        LONG_GOTO E_VEC_PAR2_END;
```

```
1178 1 :
1179 1 :/* Shift 16 - 23 */
1180 1 :          LONG_GOTO F_VEC_PWR2_END;
1181 1 :
1182 1 :/* Shift 24 - 31 */
1183 1 :F_VEC_PWR2_END:
1184 1 :          LOAD_OFF (NC_0) WITH JPD(LEN(RESULT));
1185 1 :
1186 1 :          OFF_ALU_OUT = LIT32(24000000000) OR NC_0,
1187 1 :          LOAD_OFF (NC_0) WITH OFFSET;
1188 1 :
1189 1 :          SOURCE (DESCRIPTOR NC_0)
1190 1 :             TO DESCRIPTOR_BUS(NAME_CACHE_0(NAME_TRAP));
1191 1 :
1192 1 :          SOURCE (DESCRIPTOR NC_1)
1193 1 :             TO DESCRIPTOR_BUS(NAME_CACHE_1(NAME_TRAP)),
1194 1 :          OFF_ALU_OUT = ZERO OR NC_1,
1195 1 :          LOAD (ACCUMULATOR) WITH OFFSET,
1196 1 :          LONG_GOTO F_VEC_END;

RESOLVER - MISS Handler - Vector - base is Encachable - Simple Length 1198 1 :CHECK_HARD_VEC:
1199 1 :          OFF_ALU_OUT = ZERO OR INDEX_NAME,
1200 1 :          RESOLVE (A,OFF_ALU_LS_16);        /* Get Index into cache */
1201 1 :
1202 1 :          COPY (NC_0,REG_A);
1203 1 :/*        IF LEN_LE_32 THEN GOTO LEN_OK;
1204 1C:
1205 1C:          LOAD (ACCUMULATOR) WITH JPD(LEN(NC_0));
1206 1C:
1207 1C:          OFF_ALU_OUT = ACC PLUS NC_0,
1208 1C:          LOAD_OFF (NC_0) WITH OFFSET,
1209 1C:          LOAD_AON (NC_0) WITH AON(NC_0);
1210 1C:
1211 1C:          OFF_ALU_OUT = BIASED_LENGTH REV_MINUS NC_0,
1212 1C:          LOAD_OFF (NC_0) WITH OFFSET,
1213 1C:          LOAD_LEN (NC_0) WITH LITERAL(CON_LENGTH(32)),
1214 1C:          LOAD_AON (NC_0) WITH AON(NC_0);
1215 1C:
1216 1C:LEN_OK:*/
1217 1 :          OFF_ALU_OUT = ZERO OR INDEX_NAME,
1218 1 :          LOAD_AON (REG_A) WITH 0,          /* See if it was a scalar   */
1219 1 :          mem 0, nac 0, snac 4, nb_ctrl 0, /* RESOLVE(A,OFF_ALU_LS_16) */
1220 1 :          o_in 1, a_w 1, l_in 1;           /* aon will be 0 if it hits */
1221 1 :
1222 1 :          OFF_ALU_OUT = ZERO OR NAME_TRAP_SAVE,
1223 1 :          SOURCE (OFF_ALU_LS_16) TO NAME_BUS(NAME_TRAP);
1224 1 :
1225 1 :          WITH REG_A,
1226 1 :          LOAD_AON (REG_A) WITH 0,
1227 1 :          IF AON_NE_0 THEN GOTO F_VEC_PWR2_END;/*if cant encache index */
1228 1 :
1229 1 :          SOURCE (DESCRIPTOR NC_0)
1230 1 :             TO DESCRIPTOR_BUS(NAME_CACHE_0(NAME_TRAP)), /* index */
1231 1 :          COPY (REG_A,NC_0);
1232 1 :
1233 1 :          SOURCE (DESCRIPTOR RESULT)
1234 1 :             TO DESCRIPTOR_BUS(NAME_CACHE_2(NAME_TRAP)), /* base */
1235 1 :          LOAD_AON (NC_0) WITH 0;
1236 1 :
1237 1 :          SOURCE (DESCRIPTOR NC_1)
1238 1 :             TO DESCRIPTOR_BUS(NAME_CACHE_1(NAME_TRAP)), /* ies */
1239 1 :          OFF_ALU_OUT = ZERO OR NC_1,
1240 1 :          LOAD (ACCUMULATOR) WITH OFFSET,
1241 1 :          LONG_GOTO WEIRD_VEC_CASE;

RESOLVER - MISS Handler - Vector - base is Encachable - Weird Length 1244 1 :L_VEC_IES_LIT:
1245 1 :          OFF_ALU_OUT = LIT32(24000000000) OR NC_0,
1246 1 :          LOAD_OFF (NC_0) WITH OFFSET;
```

```
1247 1 :
1248 1 :         SOURCE (DESCRIPTOR NC_0)
1249 1 :             TO DESCRIPTOR_BUS(NAME_CACHE_0(NAME_TRAP)),
1250 1 :         CASE ON ACC_BYTE(2) MASK @80@ ROTATE(1);            /* IES Sign */
1251 1 :
1252 1 :/* 0 - Positive IES */
1253 1 :         OFF_ALU_OUT = ACC OR CON_0,
1254 1 :         LOAD_OFF (NC_1) WITH OFFSET,
1255 1 :         LOAD_LEN (NC_1) WITH LITERAL(CON_LENGTH(32)),
1256 1 :         LONG_GOTO L_VEC_LOAD_NC_1;
1257 1 :
1258 1 :/* 1 - Negative IES */
1259 1 :         OFF_ALU_OUT = ACC XOR CON_FFFF,           /* complement */
1260 1 :         LOAD_OFF (NC_1) WITH OFFSET,
1261 1 :         LOAD_LEN (NC_1) WITH LITERAL(LIT_LENGTH(34));
1262 1 :
1263 1 :         SOURCE (OFF_ALU WITH NC_1)
1264 1 :             TO DESCRIPTOR_BUS(NAME_CACHE_1(NAME_TRAP)),
1265 1 :         OFF_ALU_OUT = ONE PLUS NC_1,              /* abs(IFS) */
1266 1 :         LOAD_OFF (NC_1) WITH OFFSET,
1267 1 :         LOAD (ACCUMULATOR) WITH OFFSET,
1268 1 :         LONG_GOTO L_VEC_END;
```

RESOLVER - MISS Handler - Vector - Base is Encachable - Weird Length

```
1270 1 :L_VEC_IES_NAME:
1271 1 :         OFF_ALU_OUT = LIT32(@40000000@) OR NC_0,
1272 1 :         LOAD_OFF (NC_0) WITH OFFSET;
1273 1 :
1274 1 :         SOURCE (DESCRIPTOR NC_0)
1275 1 :             TO DESCRIPTOR_BUS(NAME_CACHE_0(NAME_TRAP));
1276 1 :
1277 1 :         OFF_ALU_OUT = ACC OR CON_0,
1278 1 :         LOAD_OFF (NC_1) WITH OFFSET,
1279 1 :         LOAD_LEN (NC_1) WITH LITERAL(LIT_LENGTH(36));
1280 1 :
1281 1 :L_VEC_LOAD_NC_1:
1282 1 :         SOURCE (DESCRIPTOR NC_1)
1283 1 :             TO DESCRIPTOR_BUS(NAME_CACHE_1(NAME_TRAP));
1284 1 :
1285 1 :L_VEC_END:
1286 1 :         SOURCE (DESCRIPTOR RESULT)
1287 1 :             TO DESCRIPTOR_BUS(NAME_CACHE_3(NAME_TRAP));
1288 1 :
1289 1 :         OFF_ALU_OUT = ZERO OR NC_0,
1290 1 :         IF OFF_SIGN_EQ_0 THEN GOTO WEIRD_VECTOR;
1291 1 :
1292 1 :         OFF_ALU_OUT = ZERO OR NC_0,
1293 1 :         LOAD (ACCUMULATOR) WITH OFFSET,
1294 1 :         LONG_GOTO L_NAME_ARX;
```

RESOLVER - MISS Handler - Vector - Base is Encachable - Weird Length

```
1296 1 :L_VEC_IES_PWR2:
1297 1 :         OFF_ALU_OUT = LIT32(@40000000@) OR NC_0,
1298 1 :         LOAD_OFF (NC_0) WITH OFFSET;
1299 1 :
1300 1 :         OFF_ALU_OUT = ACC OR CON_0,
1301 1 :         LOAD_OFF (NC_1) WITH OFFSET,
1302 1 :         LOAD_LEN (NC_1) WITH OFF;
1303 1 :
1304 1 :         SOURCE (DESCRIPTOR NC_0)
1305 1 :             TO DESCRIPTOR_BUS(NAME_CACHE_0(NAME_TRAP));
1306 1 :
1307 1 :         SOURCE (DESCRIPTOR NC_1)
1308 1 :             TO DESCRIPTOR_BUS(NAME_CACHE_1(NAME_TRAP)),
1309 1 :         LONG_GOTO L_VEC_END;
```

RESOLVER - MISS Handler - Load Weird Base

```
1312 1 :LOAD_WEIRD_BASE:
1313 1 :         OFF_ALU_OUT = LIT32(@20000000@) OR NC_0,
1314 1 :         LOAD_OFF (NC_0) WITH OFFSET;
```

```
1315 1 :
1316 1 :          OFF_ALU_OUT = LIT32(@1C000000@) XOR NTE_1,
1317 1 :          LOAD (ACCUMULATOR) WITH OFFSET;
1318 1 :
1319 1 :          OFF_ALU_OUT = ZERO OR NC_2,
1320 1 :          LOAD (ACCUMULATOR) WITH OFFSET,
1321 1 :          CASE ON ACC_BYTE(0) MASK @1C0@ ROTATE(6);
1322 1 :
1323 1 :/* 111 - Signed, IFS is a Power of 2 */
1324 1 :          OFF_ALU_OUT = ACC OR CON_400000,
1325 1 :          LOAD_OFF (NC_2) WITH OFFSET,
1326 1 :          LOAD (ACCUMULATOR) WITH OFFSET,
1327 1 :          LONG_GOTO WEIRD_BASE_011;
1328 1 :
1329 1 :/* 110 - Signed, IFS is a Name */
1330 1 :          OFF_ALU_OUT = ACC OR CON_400000,
1331 1 :          LOAD_OFF (NC_2) WITH OFFSET,
1332 1 :          LOAD (ACCUMULATOR) WITH OFFSET,
1333 1 :          LONG_GOTO WEIRD_BASE_010;
1334 1 :
1335 1 :/* 101 - Signed, IFS is a Literal */
1336 1 :          OFF_ALU_OUT = ACC OR CON_400000,
1337 1 :          LOAD_OFF (NC_2) WITH OFFSET,
1338 1 :          LOAD (ACCUMULATOR) WITH OFFSET,
1339 1 :          LONG_GOTO WEIRD_BASE_001;
1340 1 :
1341 1 :/* 100 - Signed, Not Indexed */
1342 1 :          OFF_ALU_OUT = ACC OR CON_400000,
1343 1 :          LOAD_OFF (NC_2) WITH OFFSET,
1344 1 :          LOAD (ACCUMULATOR) WITH OFFSET,
1345 1 :          LONG_GOTO WEIRD_BASE_000;
1346 1 :
1347 1 :/* 011 - Unsigend, IFS is a Power of 2 */
1348 1 :WEIRD_BASE_011:
1349 1 :          READ TO ACCUMULATOR USING OFF_ALU WITH NTE_PTR CON_LENGTH(32),
1350 1 :          OFF_ALU_OUT = BIASED_LENGTH PLUS NTE_PTR,
1351 1 :          LOAD_ADN (NTE_PTR) WITH 0,
1352 1 :          LONG_GOTO B_VEC_TES_PWR2;
1353 1 :
1354 1 :/* 010 - Unsigned, IFS is a Name */
1355 1 :WEIRD_BASE_010:
1356 1 :          READ TO ACCUMULATOR USING OFF_ALU WITH NTE_PTR CON_LENGTH(32),
1357 1 :          OFF_ALU_OUT = BIASED_LENGTH PLUS NTE_PTR,
1358 1 :          LOAD_ADN (NTE_PTR) WITH 0,
1359 1 :          LONG_GOTO B_VEC_TES_NAME;
1360 1 :
1361 1 :/* 001 - Unsigned, IFS is a Literal */
1362 1 :WEIRD_BASE_001:
1363 1 :          READ TO ACCUMULATOR USING OFF_ALU WITH NTE_PTR CON_LENGTH(32),
1364 1 :          OFF_ALU_OUT = BIASED_LENGTH PLUS NTE_PTR, RESOLVER - MISS Handler - Load Weird Base 1365 1 :          LOAD_ADN (NTE_PTR) WITH 0,
1366 1 :          LONG_GOTO B_VEC_TES_LIT;
1367 1 :
1368 1 :/* 000 - Unsigned, Not Indexed */
1369 1 :WEIRD_BASE_000:
1370 1 :          OFF_ALU_OUT = ZERO OR NC_0,
1371 1 :          LOAD (ACCUMULATOR) WITH OFFSET,
1372 1 :          CASE ON ACC_BYTE(2) MASK @C0@ ROTATE(3);
1373 1 :
1374 1 :/* 00 - FP Indirect */
1375 1 :          OFF_ALU_OUT = LIT16(@2000@) XOR NC_2,
1376 1 :          LOAD_OFF (NC_2) WITH OFFSET;
1377 1 :
1378 1 :          SOURCE (OFF_ALU WITH CON_F_ZEROS)
1379 1 :              TO DESCRIPTOR_BUS(NAME_CACHE_0(NAME_TRAP)),
1380 1 :          OFF_ALU_OUT = ACC MINUS CON_F_ZEROS,
1381 1 :          LOAD_OFF (NC_0) WITH OFFSET,
1382 1 :          LOAD (ACCUMULATOR) WITH OFFSET,
1383 1 :          TEST_TO_CC (OFF_SIGN_EQ_1),
1384 1 :          GOTO LOAD_NC_2;
```

```
1385 1 :
1386 1 :/* 01 - SUP Indirect */
1387 1 :        OFF_ALU_OUT = LIT16(32000w) XOR NC_2,
1388 1 :        LOAD_OFF (NC_2) WITH OFFSET;
1389 1 :
1390 1 :        SOURCE (OFF_ALU WITH CON_F_ZEROS)
1391 1 :            TO DESCRIPTOR_BUS(NAME_CACHE_0(NAME_TRAP)),
1392 1 :        OFF_ALU_OUT = ACC MINUS CON_F_ZEROS,
1393 1 :        LOAD_OFF (NC_0) WITH OFFSET,
1394 1 :        LOAD (ACCUMULATOR) WITH OFFSET,
1395 1 :        TEST_TO_CC (OFF_SIGN_EQ_1),
1396 1 :        GOTO LOAD_NC_2;
1397 1 :
1398 1 :/* 10 - Base is a Name, Indirect */
1399 1 :        OFF_ALU_OUT = LIT16(34000J) OR NC_2,
1400 1 :        LOAD_OFF (NC_2) WITH OFFSET;
1401 1 :
1402 1 :        SOURCE (OFF_ALU WITH CON_F_ZEROS)
1403 1 :            TO DESCRIPTOR_BUS(NAME_CACHE_0(NAME_TRAP)),
1404 1 :        OFF_ALU_OUT = ACC MINUS CON_F_ZEROS,
1405 1 :        LOAD_OFF (NC_0) WITH OFFSET,
1406 1 :        LOAD (ACCUMULATOR) WITH OFFSET,
1407 1 :        TEST_TO_CC (OFF_SIGN_EQ_1),
1408 1 :        GOTO LOAD_NC_2;
1409 1 :
1410 1 :/* 11 - Base is a Name */
1411 1 :        SOURCE (DESCRIPTOR NC_0)
1412 1 :            TO DESCRIPTOR_BUS(NAME_CACHE_0(NAME_TRAP)),
1413 1 :        OFF_ALU_OUT = ACC OR NC_0,
1414 1 :        TEST_TO_CC (OFF_SIGN_EQ_1),
1415 1 :        GOTO LOAD_NC_2;
1416 1 :
1417 1 :LOAD_NC_2:

RESOLVER - MISS Handler - Load Weird Base 1418 1 :        SOURCE (DESCRIPTOR NC_2)
1419 1 :            TO DESCRIPTOR_BUS(NAME_CACHE_2(NAME_TRAP)),
1420 1 :        CASE ON ACC_BYTE(0) MASK 3408 ROTATE(3); /* vector */
1421 1 :
1422 1 :LOAD_NC_3:
1423 1 :        SOURCE (DESCRIPTOR RESULT)
1424 1 :            TO DESCRIPTOR_BUS(NAME_CACHE_3(NAME_TRAP)),
1425 1 :        LOAD_AON (NIE_PIR) WITH 0,
1426 1 :        IF CC THEN GOTO L_NAME_ARR;    /* if Length is a Name */
1427 1 :
1428 1 :        OFF_ALU_OUT = ACC ZERO_HI OR CON_0,
1429 1 :        LOAD_LEN (RESULT) WITH OFF,
1430 1 :        CASE ON ACC_BYTE(0) MASK 070a ROTATE(4);
1431 1 :
1432 1 :        SOURCE (DESCRIPTOR NC_1)
1433 1 :            TO DESCRIPTOR_BUS(NAME_CACHE_1(NAME_TRAP)),
1434 1 :        LONG_GOTO LOAD_NC_3;
1435 1 :
1436 1 :/* 001 - Base is Encachable Indirect */
1437 1 :        READ TO ACCUMULATOR USING DESCRIPTOR NC_2 CON_LENGTH(32),
1438 1 :        LONG_GOTO BASE_ENC_IND;
1439 1 :
1440 1 :/* 010 - Base is a Name */
1441 1 :        OFF_ALU_OUT = ZERO OR NC_2,
1442 1 :        LOAD (ACCUMULATOR) WITH OFFSET,
1443 1 :        LONG_GOTO BASE_NAME;
1444 1 :
1445 1 :/* 011 - Base is a Name, Indirect */
1446 1 :        OFF_ALU_OUT = ZERO OR NC_2,
1447 1 :        LOAD (ACCUMULATOR) WITH OFFSET,
1448 1 :        LONG_GOTO BASE_NAME_IND;
1449 1 :
1450 1 :/* 100 - ILLEGAL */
1451 1 :        NOP;
1452 1 :
1453 1 :/* 101 - Vector, Base is Encachable Indirect */
1454 1 :        READ TO ACCUMULATOR USING DESCRIPTOR NC_2 CON_LENGTH(32),
```

```
1455 1 :          LONG_GOTO L_V_BASE_ENC_IND;
1456 1 :
1457 1 :/* 110 - Vector, Base is a Name */
1458 1 :          OFF_ALU_OUT = ZERO OR NC_2,
1459 1 :          LOAD (ACCUMULATOR) WITH OFFSET,
1460 1 :          LONG_GOTO V_BASE_NAME;
1461 1 :
1462 1 :/* 111 - Vector, Base is a Name, Indirect */
1463 1 :          OFF_ALU_OUT = ZERO OR NC_2,
1464 1 :          LOAD (ACCUMULATOR) WITH OFFSET,
1465 1 :          LONG_GOTO V_BASE_NAME_IND;
```

RESOLVER - MISS Handler - Load Weird Base

```
1467 1 :B_VEC_TES_LIT:
1468 1 :          OFF_ALU_OUT = LIT32(840000000) OR NC_0,
1469 1 :          LOAD_OFF (NC_0) WITH OFFSET;
1470 1 :
1471 1 :          OFF_ALU_OUT = ACC OR CON_0,
1472 1 :          LOAD_OFF (NC_1) WITH OFFSET,
1473 1 :          LOAD_LEN (NC_1) WITH LITERAL(CON_LENGTH(32)),
1474 1 :          CASE ON ACC_BYTE(2) MASK @80@ ROTATE(1);   /* IES Sign */
1475 1 :
1476 1 :/* 0 - Positive IES */
1477 1 :          OFF_ALU_OUT = ZERO OR NC_2,
1478 1 :          LOAD (ACCUMULATOR) WITH OFFSET,
1479 1 :          LONG_GOTO WEIRD_BASE_000;
1480 1 :
1481 1 :/* 1 - Negative IES */
1482 1 :          OFF_ALU_OUT = ACC XOR CON_FFFF,
1483 1 :          LOAD_OFF (NC_1) WITH OFFSET,
1484 1 :          LOAD_LEN (NC_1) WITH LITERAL(LIT_LENGTH(34));
1485 1 :
1486 1 :          OFF_ALU_OUT = ONE PLUS NC_1,
1487 1 :          LOAD_OFF (NC_1) WITH OFFSET,
1488 1 :          LONG_GOTO B_VEC_END;
1489 1 :
1490 1 :B_VEC_TES_NAME:
1491 1 :          OFF_ALU_OUT = LIT32(840000000) OR NC_0,
1492 1 :          LOAD_OFF (NC_0) WITH OFFSET;
1493 1 :
1494 1 :          OFF_ALU_OUT = ACC OR CON_0,
1495 1 :          LOAD_OFF (NC_1) WITH OFFSET,
1496 1 :          LOAD_LEN (NC_1) WITH LITERAL(LIT_LENGTH(36));
1497 1 :
1498 1 :B_VEC_END:
1499 1 :          OFF_ALU_OUT = ZERO OR NC_2,
1500 1 :          LOAD (ACCUMULATOR) WITH OFFSET,
1501 1 :          LONG_GOTO WEIRD_BASE_000;
1502 1 :
1503 1 :B_VEC_TES_PWR2:
1504 1 :          OFF_ALU_OUT = LIT32(840000000) OR NC_0,
1505 1 :          LOAD_OFF (NC_0) WITH OFFSET;
1506 1 :
1507 1 :          OFF_ALU_OUT = ACC OR CON_0,
1508 1 :          LOAD_OFF (NC_1) WITH OFFSET,
1509 1 :          LOAD_LEN (NC_1) WITH OFF,
1510 1 :          LONG_GOTO B_VEC_END;
1511 1 :End
1512 0 :
```

RESOLVER - Support Subroutines

```
1515 0 :/*
1516 0C:FIX_DESCP:
1517 0C:          DISABLE_AON_WRITE,
1518 0C:          OFF_ALU_OUT = ACC PLUS PREVIOUS(0),
1519 0C:          LOAD_OFF (PREVIOUS(0)) WITH OFFSET;      /* point to end */
1520 0C:
1521 0C:          DISABLE_AON_WRITE,
1522 0C:          LOAD_LEN (PREVIOUS(0)) WITH LITERAL(CON_LENGTH(32)),
1523 0C:          OFF_ALU_OUT = BIASED_LENGTH PEV_MINUS PREVIOUS(0),
1524 0C:          LOAD_OFF (PREVIOUS(0)) WITH OFFSET,
1525 0C:          RETURN;
1526 0C:*/
```

RESOLVER - WEIRD HIT Handler - Decode

```
1529 0 :BEGIN
1530 1 :
1531 1 :          MACRO    FILL.TYPE        MEANS    CURRENT(6)       ENDMAC;
1532 1 :
1533 1 :ENTRY COMMON_WEIRD_HIT:
1534 1 :          LOAD_AON (RESULT) WITH AON(NAME_CACHE_3(NAME_TRAP)),
1535 1 :          LOAD_OFF (RESULT) WITH OFF(NAME_CACHE_3(NAME_TRAP)),
1536 1 :          CASE ON ACC_BYTE(0) MASK wF0@ ROTATE (4);
1537 1 :
1538 1 :/* 0000 - Base is Encacnable */
1539 1 :BASE_DONE:
1540 1 :          OFF_ALU_OUT = ZERO OR RESULT,
1541 1 :          LOAD (ACCUMULATOR) WITH OFFSET,
1542 1 :          LOAD_AON (REG_A) WITH 0,
1543 1 :          RETURN;
1544 1 :
1545 1 :/* 0001 - Base is Encachable Indirect */
1546 1 :          READ TO ACCUMULATOR
1547 1 :                USING DESCRIPTOR NAME_CACHE_2(NAME_TRAP), CON_LENGTH(32),
1548 1 :          LOAD_OFF (NC_2) WITH OFF(NAME_CACHE_2(NAME_TRAP)),
1549 1 :          LOAD_AON (NC_2) WITH AON(NAME_CACHE_2(NAME_TRAP)),
1550 1 :          LONG_GOTO BASE_ENC_IND;
1551 1 :
1552 1 :/* 0010 - Base is a Name */
1553 1 :          LOAD_OFF (NC_2) WITH OFF(NAME_CACHE_2(NAME_TRAP)),
1554 1 :          LOAD (ACCUMULATOR) WITH OFF(NAME_CACHE_2(NAME_TRAP)),
1555 1 :          LONG_GOTO BASE_NAME;
1556 1 :
1557 1 :/* 0011 - Base is a Name Indirect */
1558 1 :          LOAD_OFF (NC_2) WITH OFF(NAME_CACHE_2(NAME_TRAP)),
1559 1 :          LOAD (ACCUMULATOR) WITH OFF(NAME_CACHE_2(NAME_TRAP)),
1560 1 :          LONG_GOTO BASE_NAME_IND;
1561 1 :
1562 1 :/* 0100 - Vector, Base is Encachable */
1563 1 :          LOAD_OFF (NC_1) WITH OFF(NAME_CACHE_1(NAME_TRAP)),
1564 1 :          LOAD (ACCUMULATOR) WITH OFF(NAME_CACHE_1(NAME_TRAP)),
1565 1 :          LOAD_LEN (NC_1) WITH LEN(NAME_CACHE_1(NAME_TRAP)),
1566 1 :          LONG_GOTO WEIRD_VECTOR;
1567 1 :
1568 1 :/* 0101 - Vector, Base is Encachable Indirect */
1569 1 :          LOAD_OFF (NC_1) WITH OFF(NAME_CACHE_1(NAME_TRAP)),
1570 1 :          LOAD_LEN (NC_1) WITH LEN(NAME_CACHE_1(NAME_TRAP)),
1571 1 :          LONG_GOTO VEC_BASE_ENC_IND;
1572 1 :
1573 1 :/* 0110 - Vector, Base is a Name */
1574 1 :          LOAD_OFF (NC_1) WITH OFF(NAME_CACHE_1(NAME_TRAP)),
1575 1 :          LOAD_LEN (NC_1) WITH LEN(NAME_CACHE_1(NAME_TRAP)),
1576 1 :          LONG_GOTO VEC_BASE_NAME;
1577 1 :
1578 1 :/* 0111 - Vector, Base is a Name Indirect */
1579 1 :          LOAD_OFF (NC_1) WITH OFF(NAME_CACHE_1(NAME_TRAP)),
1580 1 :          LOAD_LEN (NC_1) WITH LEN(NAME_CACHE_1(NAME_TRAP)),
1581 1 :          LONG_GOTO VEC_BASE_NAME_IND;
1582 1 :
1583 1 :/* 1000 - Length is a Name, Base is Encachable */
1584 1 :L_NAME_ABR:
1585 1 :          OFF_ALU_OUT = ACC OR CON_0,
1586 1 :          LOAD_OFF (TEMP) WITH OFFSET,
1587 1 :          SOURCE (OFF_ALU_LS_16) TO NAME_BUS(NAME_TRAP),
1588 1 :          LONG_GOTO LEN_IS_A_NAME;
1589 1 :
1590 1 :/* 1001 - Length is a Name, Base is Encachable Indirect */
1591 1 :L_NAME_B_IND:
1592 1 :          LOAD_OFF (NC_2) WITH OFF(NAME_CACHE_2(NAME_TRAP)),
1593 1 :          LOAD_AON (NC_2) WITH AON(NAME_CACHE_2(NAME_TRAP)),
1594 1 :          LONG_GOTO L_NAME_ABR;
1595 1 :
1596 1 :/* 1010 - Length is a Name, Base is a Name */
1597 1 :L_NAME_BASE:
1598 1 :          LOAD_OFF (NC_2) WITH OFF(NAME_CACHE_2(NAME_TRAP)),
1599 1 :          LONG_GOTO L_NAME_ABR;
```

```
1600 1 :
1601 1 :/* 1011 - Length is a Name, Base is a Name Indirect */
1602 1 :         LOAD_OFF (NC_2) WITH OFF(NAME_CACHE_2(NAME_TRAP)),
1603 1 :         LONG_GOTO L_NAME_ABR;
1604 1 :
1605 1 :/* 1100 - Length is a Name, Vector, Base is Encachable */
1606 1 :         LOAD_OFF (NC_1) WITH OFF(NAME_CACHE_1(NAME_TRAP)),
1607 1 :         LOAD_LEN (NC_1) WITH LEN(NAME_CACHE_1(NAME_TRAP)),
1608 1 :         LONG_GOTO L_NAME_ABR;
1609 1 :
1610 1 :/* 1101 - Length is a Name, Vector, Base is Encachable Indirect */
1611 1 :         LOAD_OFF (NC_1) WITH OFF(NAME_CACHE_1(NAME_TRAP)),
1612 1 :         LOAD_LEN (NC_1) WITH LEN(NAME_CACHE_1(NAME_TRAP)),
1613 1 :         LONG_GOTO L_NAME_B_IND;
1614 1 :
1615 1 :/* 1110 - Length is a Name, Vector, Base is a Name */
1616 1 :         LOAD_OFF (NC_1) WITH OFF(NAME_CACHE_1(NAME_TRAP)),
1617 1 :         LOAD_LEN (NC_1) WITH LEN(NAME_CACHE_1(NAME_TRAP)),
1618 1 :         LONG_GOTO L_NAME_BASE;
1619 1 :
1620 1 :/* 1111 - Length is a Name, Vector, Base is a Name Indirect */
1621 1 :         LOAD_OFF (NC_1) WITH OFF(NAME_CACHE_1(NAME_TRAP)),
1622 1 :         LOAD_LEN (NC_1) WITH LEN(NAME_CACHE_1(NAME_TRAP)),
1623 1 :         LONG_GOTO L_NAME_BASE;

RESOLVER - WEIRD HIT Handler - Length is a Name 1626 1 :LEN_IS_A_NAME:
1627 1 :         RESOLVE (A,NAME_TRAP);
1628 1 :
1629 1 :         READ TO ACCUMULATOR USING DESCRIPTOR REG_A BIAS_LENGTH;
1630 1 :/*       OFF_ALU_OUT = BIASED_LENGTH REV_MINUS REG_A,
1631 1C:         LOAD_OFF (REG_A) WITH OFFSET,
1632 1C:         LOAD_AON (REG_A) WITH AON(REG_A),
1633 1C:         IF LEN_LE_32 THEN GOTO LEN_LEN_OK;
1634 1C:
1635 1C:         LOAD (ACCUMULATOR) WITH JPD(LEN(REG_A));
1636 1C:
1637 1C:         READ TO ACCUMULATOR USING OFF_ALU WITH REG_A CON_LENGTH(32),
1638 1C:         OFF_ALU_OUT = ACC PLUS REG_A;
1639 1C:
1640 1C:LEN_LEN_OK:*/
1641 1 :         DISABLE_AON_WRITE,
1642 1 :         OFF_ALU_OUT = ACC OR CON_0,
1643 1 :         LOAD_LEN (RESULT) WITH OFF;
1644 1 :
1645 1 :         OFF_ALU_OUT = ZERO OR TEMP,
1646 1 :         LOAD (ACCUMULATOR) WITH OFFSET,
1647 1 :         LOAD_AON (REG_A) WITH 0;
1648 1 :
1649 1 :         OFF_ALU_OUT = ZERO OR NC_2,
1650 1 :         LOAD (ACCUMULATOR) WITH OFFSET,
1651 1 :         CASE ON ACC_BYTE(0) MASK #70? ROTATE(4);
1652 1 :
1653 1 :/* 000 - base is Encachable */
1654 1 :         OFF_ALU_OUT = ZERO OR RESULT,
1655 1 :         LOAD (ACCUMULATOR) WITH OFFSET,
1656 1 :         RETURN;
1657 1 :
1658 1 :/* 001 - base is Encachable Indirect */
1659 1 :         READ TO ACCUMULATOR USING DESCRIPTOR NC_2 CON_LENGTH(32),
1660 1 :         LONG_GOTO BASE_ENC_IND;
1661 1 :
1662 1 :/* 010 - base is a Name */
1663 1 :         OFF_ALU_OUT = ACC ZERO_LO OR CON_0,
1664 1 :         LOAD_OFF (FIU.TYPE) WITH OFFSET,
1665 1 :         LONG_GOTO L_BASE_NAME;
1666 1 :
1667 1 :/* 011 - base is a Name Indirect */
1668 1 :         OFF_ALU_OUT = ACC ZERO_LO OR CON_0,
1669 1 :         LOAD_OFF (FIU.TYPE) WITH OFFSET,
1670 1 :         LONG_GOTO L_BASE_NAME_IND;
```

```
1671 1 :
1672 1 :/* 100 - Vector, Base is Encachable */
1673 1 :        OFF_ALU_OUT = ZERO OR NC_1,
1674 1 :        LOAD (ACCUMULATOR) WITH OFFSET,
1675 1 :        LONG_GOTO WEIRD_VECTOR;
1676 1 :
1677 1 :/* 101 - Vector, Base is Encachable Indirect */
1678 1 :        READ TO ACCUMULATOR USING DESCRIPTOR NC_2 CON_LENGTH(32),
```

RESOLVER - WEIRD HIT Handler - Length is a Name

```
1679 1 :        LONG_GOTO L_V_BASE_ENC_IND;
1680 1 :
1681 1 :/* 110 - Vector, Base is a Name */
1682 1 :        OFF_ALU_OUT = ACC ZERO_LO OR CON_0,
1683 1 :        LOAD_OFF (FIU.TYPE) WITH OFFSET,
1684 1 :        LONG_GOTO L_V_BASE_NAME;
1685 1 :
1686 1 :/* 111 - Vector, Base is a Name Indirect */
1687 1 :        OFF_ALU_OUT = ACC ZERO_LO OR CON_0,
1688 1 :        LOAD_OFF (FIU.TYPE) WITH OFFSET,
1689 1 :        LONG_GOTO L_V_BASE_NAME_IND;
```

RESOLVER - WEIRD HIT Handler - Base is Encachable Indirect

```
1692 1 :BASE_ENC_IND:
1693 1 :        OFF_ALU_OUT = ACC PLUS RESULT,
1694 1 :        LOAD_OFF (RESULT) WITH OFFSET,
1695 1 :        LOAD_AON (RESULT) WITH AON(RESULT),
1696 1 :        CASE ON ACC_BYTE(0) MASK @80@ ROTATE(1);
1697 1 :
1698 1 :/* 0 - Intra Object Pointer */
1699 1 :        OFF_ALU_OUT = ZERO OR RESULT,
1700 1 :        LOAD (ACCUMULATOR) WITH OFFSET,
1701 1 :        LOAD_AON (NC_2) WITH 0,
1702 1 :        RETURN;
1703 1 :
1704 1 :/* 1 - General Pointer */
1705 1 :        COPY (CURRENT(7),NC_2);
1706 1 :
1707 1 :        LOAD_OFF (NC_2) WITH AON(RESULT),
1708 1 :        LOAD_AON (NC_2) WITH 0,
1709 1 :        LONG_GOTO B_ENC_IND_END;
1710 1 :
1711 1 :VEC_BASE_ENC_IND:
1712 1 :        READ TO ACCUMULATOR
1713 1 :           USING DESCRIPTOR NAME_CACHE_2(NAME_TRAP), CON_LENGTH(32),
1714 1 :        LOAD_OFF (NC_2) WITH OFF(NAME_CACHE_2(NAME_TRAP)),
1715 1 :        LOAD_AON (NC_2) WITH AON(NAME_CACHE_2(NAME_TRAP));
1716 1 :
1717 1 :L_V_BASE_ENC_IND:
1718 1 :        OFF_ALU_OUT = ACC PLUS RESULT,
1719 1 :        LOAD_OFF (RESULT) WITH OFFSET,
1720 1 :        LOAD_AON (RESULT) WITH AON(RESULT),
1721 1 :        CASE ON ACC_BYTE(0) MASK @80@ ROTATE(1);
1722 1 :
1723 1 :/* 0 - Intra Object Pointer */
1724 1 :        OFF_ALU_OUT = ZERO OR NC_1,
1725 1 :        LOAD (ACCUMULATOR) WITH OFFSET,
1726 1 :        LOAD_AON (NC_2) WITH 0,
1727 1 :        LONG_GOTO WEIRD_VECTOR;
1728 1 :
1729 1 :/* 1 - General Pointer */
1730 1 :        COPY (CURRENT(7),NC_2);
1731 1 :
1732 1 :        LOAD_OFF (NC_2) WITH AON(RESULT),
1733 1 :        LOAD_AON (NC_2) WITH 0,
1734 1 :        LONG_GOTO V_B_ENC_IND_END;
```

RESOLVER - WEIRD HIT Handler - Base is a Name

```
1737 1 :BASE_NAME:
1738 1 :        OFF_ALU_OUT = ACC ZERO_LO OR CON_0,
1739 1 :        LOAD_OFF (FIU.TYPE) WITH OFFSET;
```

```
1740 1 :
1741 1 :L_BASE_NAME:
1742 1 :        OFF_ALU_OUT = ZERO OR NC_2,
1743 1 :        RESOLVE (A,OFF_ALU_LS_16);
1744 1 :
1745 1 :        OFF_ALU_OUT = ACC PLUS RESULT,
1746 1 :        LOAD_OFF (RESULT) WITH OFFSET;
1747 1 :
1748 1 :        LOAD (ACCUMULATOR) WITH AON(REG_A);
1749 1 :
1750 1 :BASE_END:
1751 1 :        INDIVISIBLE,
1752 1 :        OFF_ALU_OUT = ACC ZERO_HI OR FIU.TYPE,
1753 1 :        LOAD_AON (RESULT) WITH OFFSET,
1754 1 :        LONG_GOTO BASE_DONE;
1755 1 :
1756 1 :
1757 1 :VEC_BASE_NAME:
1758 1 :        LOAD_OFF (NC_2) WITH OFF(NAME_CACHE_2(NAME_TRAP)),
1759 1 :        LOAD (ACCUMULATOR) WITH OFF(NAME_CACHE_2(NAME_TRAP));
1760 1 :
1761 1 :V_BASE_NAME:
1762 1 :        OFF_ALU_OUT = ACC ZERO_LO OR CON_0,
1763 1 :        LOAD_OFF (FIU.TYPE) WITH OFFSET;
1764 1 :
1765 1 :L_V_BASE_NAME:
1766 1 :        OFF_ALU_OUT = ZERO OR NC_2,
1767 1 :        RESOLVE (A,OFF_ALU_LS_16);
1768 1 :
1769 1 :        OFF_ALU_OUT = ACC PLUS RESULT,
1770 1 :        LOAD_OFF (RESULT) WITH OFFSET;
1771 1 :
1772 1 :        LOAD (ACCUMULATOR) WITH AON(REG_A);
1773 1 :
1774 1 :VEC_BASE_END:
1775 1 :        INDIVISIBLE,
1776 1 :        OFF_ALU_OUT = ACC ZERO_HI OR FIU.TYPE,
1777 1 :        LOAD_AON (RESULT) WITH OFFSET;
1778 1 :
1779 1 :        OFF_ALU_OUT = ZERO OR NC_1,
1780 1 :        LOAD (ACCUMULATOR) WITH OFFSET,
1781 1 :        LONG_GOTO WEIRD_VECTOR;
RESOLVER - WEIRD HIT Handler - base is a Name Indirect 1784 1 :BASE_NAME_IND:
1785 1 :        OFF_ALU_OUT = ACC ZERO_LO OR CON_0,
1786 1 :        LOAD_OFF (FIU.TYPE) WITH OFFSET;
1787 1 :
1788 1 :L_BASE_NAME_IND:
1789 1 :        OFF_ALU_OUT = ZERO OR NC_2,
1790 1 :        RESOLVE (A,OFF_ALU_LS_16);
1791 1 :
1792 1 :        READ TO ACCUMULATOR USING DESCRIPTOR REG_A CON_LENGTH(32),
1793 1 :        COPY (CURRENT(7),REG_A);
1794 1 :
1795 1 :        OFF_ALU_OUT = ACC PLUS RESULT,
1796 1 :        LOAD_OFF (RESULT) WITH OFFSET,
1797 1 :        CASE ON ACC_BYTE(0) MASK @80@ ROTATE(2);
1798 1 :
1799 1 :/* 0 - Intra Object Pointer */
1800 1 :        LOAD (ACCUMULATOR) WITH AON(REG_A),
1801 1 :        LOAD_AON (CURRENT(7)) WITH 0,
1802 1 :        LONG_GOTO BASE_END;
1803 1 :
1804 1 :B_ENC_IND_END:
1805 1 :        OFF_ALU_OUT = LIT32(@FFFF0000@) AND NC_2,
1806 1 :        LOAD_OFF (FIU.TYPE) WITH OFFSET;
1807 1 :
1808 1 :/* 1 - General Pointer */
1809 1 :        OFF_ALU_OUT = ACC REV_MINUS RESULT,
1810 1 :        LOAD_OFF (RESULT) WITH OFFSET,
1811 1 :        LONG_CALL PTR_TO_DESC*READ_STARTED;
```

```
1812 1 :
1813 1 :          OFF_ALU_OUT = ACC PLUS RESULT,
1814 1 :          LOAD_OFF (RESULT) WITH OFFSET;
1815 1 :
1816 1 :          LOAD (ACCUMULATOR) WITH AON(CURRENT(7)),
1817 1 :          LOAD_AON (CURRENT(7)) WITH 0,
1818 1 :          LONG_GOTO BASE_END;
1819 1 :
1820 1 :
1821 1 :VEC_BASE_NAME_IND:
1822 1 :          LOAD_OFF (NC_2) WITH OFF(NAME_CACHE_2(NAME_TRAP)),
1823 1 :          LOAD (ACCUMULATOR) WITH OFF(NAME_CACHE_2(NAME_TRAP));
1824 1 :
1825 1 :V_BASE_NAME_IND:
1826 1 :          OFF_ALU_OUT = ACC ZERO_LO OR CON_0,
1827 1 :          LOAD_OFF (FIU.TYPE) WITH OFFSET;
1828 1 :
1829 1 :L_V_BASE_NAME_IND:
1830 1 :          OFF_ALU_OUT = ZERO OR NC_2,
1831 1 :          RESOLVE (A,OFF_ALU_LS_16);
1832 1 :
1833 1 :          READ TO ACCUMULATOR USING DESCRIPTOR REG_A CON_LENGTH(32),
1834 1 :          COPY (CURRENT(7),REG_A);
1835 1 :
1836 1 :          OFF_ALU_OUT = ACC PLUS RESULT,
1837 1 :          LOAD_OFF (RESULT) WITH OFFSET,
1838 1 :          CASE ON ACC_BYTE(0) MASK @80@ ROTATE(2);
1839 1 :
1840 1 :/* 0 - Intra Object Pointer */
1841 1 :          LOAD (ACCUMULATOR) WITH AON(REG_A),
1842 1 :          LOAD_AON (CURRENT(7)) WITH 0,
1843 1 :          LONG_GOTO VEC_BASE_END;
1844 1 :
1845 1 :V_B_ENC_IND_END:
1846 1 :          OFF_ALU_OUT = LIT32(@FFFF0000@) AND NC_2,
1847 1 :          LOAD_OFF (FIU.TYPE) WITH OFFSET;
1848 1 :
1849 1 :/* 1 - General Pointer */
1850 1 :          OFF_ALU_OUT = ACC REV_MINUS RESULT,
1851 1 :          LOAD_OFF (RESULT) WITH OFFSET,
1852 1 :          LONG_CALL PTR_TO_DESC*READ_STARTED;
1853 1 :
1854 1 :          OFF_ALU_OUT = ACC PLUS RESULT,
1855 1 :          LOAD_OFF (RESULT) WITH OFFSET;
1856 1 :
1857 1 :          LOAD (ACCUMULATOR) WITH AON(CURRENT(7)),
1858 1 :          LOAD_AON (CURRENT(7)) WITH 0,
1859 1 :          LONG_GOTO VEC_BASE_END;

RESOLVER - WEIRD HIT Handler - Vector 1862 1 :WEIRD_VECTOR:
1863 1 :          OFF_ALU_OUT = ZERO OR ACC_HI,
1864 1 :          RESOLVE (A,OFF_ALU_LS_16);              /* Index */
1865 1 :/*
1866 1C:          LOAD (ACCUMULATOR) WITH JPD(LEN(REG_A)),
1867 1C:          IF LEN_GT_32 THEN CALL FIX_DESCR;
1868 1C:*/
1869 1 :          LOAD (ACCUMULATOR) WITH JPD(LEN(NC_1)); /* 0-31 Encoded IES */
1870 1 :                                                  /* 32 IES pos literal*/
1871 1 :                                                  /* 34 IES neg literal*/
1872 1 :                                                  /* 36 IES is a Name  */
1873 1 :
1874 1 :WEIRD_VEC_CASE:
1875 1 :          READ TO ACCUMULATOR USING DESCRIPTOR REG_A BIAS_LENGTH,
1876 1 :          LOAD_AON (REG_A) WITH 0,
1877 1 :          CASE ON ACC_BYTE(3) MASK @3F@ ROTATE(0);
1878 1 :
1879 1 :/* 000000 - IES = 1 */
1880 1 :VEC_SHIFT_0:
1881 1 :          OFF_ALU_OUT = ACC LEFT_SHIFTED(0) PLUS RESULT,
1882 1 :          LOAD_OFF (RESULT) WITH OFFSET,
```

```
1883 1 :         LOAD (ACCUMULATOR) WITH OFFSET,
1884 1 :         LOAD_AON (RESULT) WITH AON(RESULT),
1885 1 :         RETURN;
1886 1 :
1887 1 :/* 000001 - TES = 2 */
1888 1 :         OFF_ALU_OUT = ACC LEFT_SHIFTED(1) PLUS RESULT,
1889 1 :         LOAD_OFF (RESULT) WITH OFFSET,
1890 1 :         LOAD (ACCUMULATOR) WITH OFFSET,
1891 1 :         LOAD_AON (RESULT) WITH AON(RESULT),
1892 1 :         RETURN;
1893 1 :
1894 1 :/* 000010 - TES = 4 */
1895 1 :         OFF_ALU_OUT = ACC LEFT_SHIFTED(2) PLUS RESULT,
1896 1 :         LOAD_OFF (RESULT) WITH OFFSET,
1897 1 :         LOAD (ACCUMULATOR) WITH OFFSET,
1898 1 :         LOAD_AON (RESULT) WITH AON(RESULT),
1899 1 :         RETURN;
1900 1 :
1901 1 :/* 000011 - TES = 8 */
1902 1 :         OFF_ALU_OUT = ACC LEFT_SHIFTED(3) PLUS RESULT,
1903 1 :         LOAD_OFF (RESULT) WITH OFFSET,
1904 1 :         LOAD (ACCUMULATOR) WITH OFFSET,
1905 1 :         LOAD_AON (RESULT) WITH AON(RESULT),
1906 1 :         RETURN;
1907 1 :
1908 1 :/* 000100 - TES = 16 */
1909 1 :         OFF_ALU_OUT = ACC LEFT_SHIFTED(4) PLUS RESULT,
1910 1 :         LOAD_OFF (RESULT) WITH OFFSET,
1911 1 :         LOAD (ACCUMULATOR) WITH OFFSET,
1912 1 :         LOAD_AON (RESULT) WITH AON(RESULT),
1913 1 :         RETURN;
1914 1 :
1915 1 :/* 000101 - TES = 32 */
1916 1 :         OFF_ALU_OUT = ACC LEFT_SHIFTED(5) PLUS RESULT,
1917 1 :         LOAD_OFF (RESULT) WITH OFFSET,
1918 1 :         LOAD (ACCUMULATOR) WITH OFFSET,
1919 1 :         LOAD_AON (RESULT) WITH AON(RESULT),
1920 1 :         RETURN;
1921 1 :
1922 1 :/* 000110 - TES = 64 */
1923 1 :         OFF_ALU_OUT = ACC LEFT_SHIFTED(6) PLUS RESULT,
1924 1 :         LOAD_OFF (RESULT) WITH OFFSET,
1925 1 :         LOAD (ACCUMULATOR) WITH OFFSET,
1926 1 :         LOAD_AON (RESULT) WITH AON(RESULT),
1927 1 :         RETURN;
1928 1 :
1929 1 :/* 000111 - TES = 128 */
1930 1 :VEC_SHIFT_7:
1931 1 :         OFF_ALU_OUT = ACC LEFT_SHIFTED(7) PLUS RESULT,
1932 1 :         LOAD_OFF (RESULT) WITH OFFSET,
1933 1 :         LOAD (ACCUMULATOR) WITH OFFSET,
1934 1 :         LOAD_AON (RESULT) WITH AON(RESULT),
1935 1 :         RETURN;
1936 1 :
1937 1 :/* 001000 - TES = 256 */
1938 1 :         OFF_ALU_OUT = ACC LEFT_SHIFTED(1) OR CON_0,
1939 1 :         LOAD (ACCUMULATOR) WITH OFFSET,
1940 1 :         LONG_GOTO VEC_SHIFT_7;
1941 1 :
1942 1 :/* 001001 - TES = 512 */
1943 1 :         OFF_ALU_OUT = ACC LEFT_SHIFTED(2) OR CON_0,
1944 1 :         LOAD (ACCUMULATOR) WITH OFFSET,
1945 1 :         LONG_GOTO VEC_SHIFT_7;
1946 1 :
1947 1 :/* 001010 - TES = 1024 */
1948 1 :         OFF_ALU_OUT = ACC LEFT_SHIFTED(3) OR CON_0,
1949 1 :         LOAD (ACCUMULATOR) WITH OFFSET,
1950 1 :         LONG_GOTO VEC_SHIFT_7;
1951 1 :
1952 1 :/* 001011 - TES = 2048 */
1953 1 :         OFF_ALU_OUT = ACC LEFT_SHIFTED(4) OR CON_0,
1954 1 :         LOAD (ACCUMULATOR) WITH OFFSET,
1955 1 :         LONG_GOTO VEC_SHIFT_7;
```

```
1956  1 :
1957  1 :/* 001100 - TES = 4096 */
1958  1 :         OFF_ALU_OUT = ACC LEFT_SHIFTED(5) OR CON_0,
1959  1 :         LOAD (ACCUMULATOR) WITH OFFSET,
1960  1 :         LONG_GOTO VEC_SHIFT_7;
1961  1 :
1962  1 :/* 001101 - TES = 8192 */
1963  1 :         OFF_ALU_OUT = ACC LEFT_SHIFTED(6) OR CON_0,
1964  1 :         LOAD (ACCUMULATOR) WITH OFFSET,
1965  1 :         LONG_GOTO VEC_SHIFT_7;
1966  1 :
1967  1 :/* 001110 - TES = 16384 */
1968  1 :VEC_SHIFT_14:
1969  1 :         OFF_ALU_OUT = ACC LEFT_SHIFTED(7) OR CON_0,
1970  1 :         LOAD (ACCUMULATOR) WITH OFFSET,
1971  1 :         LONG_GOTO VEC_SHIFT_7;
1972  1 :
1973  1 :/* 001111 - TES = 32768 */
1974  1 :         OFF_ALU_OUT = ACC LEFT_SHIFTED(1) OR CON_0,
1975  1 :         LOAD (ACCUMULATOR) WITH OFFSET,
1976  1 :         LONG_GOTO VEC_SHIFT_14;
1977  1 :
1978  1 :/* 010000 - TES = 65536 */
1979  1 :         OFF_ALU_OUT = ACC LEFT_SHIFTED(2) OR CON_0,
1980  1 :         LOAD (ACCUMULATOR) WITH OFFSET,
1981  1 :         LONG_GOTO VEC_SHIFT_14;
1982  1 :
1983  1 :/* 010001 - TES = 131072 */
1984  1 :         OFF_ALU_OUT = ACC LEFT_SHIFTED(3) OR CON_0,
1985  1 :         LOAD (ACCUMULATOR) WITH OFFSET,
1986  1 :         LONG_GOTO VEC_SHIFT_14;
1987  1 :
1988  1 :/* 010010 - TES = 262144 */
1989  1 :         OFF_ALU_OUT = ACC LEFT_SHIFTED(4) OR CON_0,
1990  1 :         LOAD (ACCUMULATOR) WITH OFFSET,
1991  1 :         LONG_GOTO VEC_SHIFT_14;
1992  1 :
1993  1 :/* 010011 - TES = 524288 */
1994  1 :         OFF_ALU_OUT = ACC LEFT_SHIFTED(5) OR CON_0,
1995  1 :         LOAD (ACCUMULATOR) WITH OFFSET,
1996  1 :         LONG_GOTO VEC_SHIFT_14;
1997  1 :
1998  1 :/* 010100 - TES = 1048576 */
1999  1 :         OFF_ALU_OUT = ACC LEFT_SHIFTED(6) OR CON_0,
2000  1 :         LOAD (ACCUMULATOR) WITH OFFSET,
2001  1 :         LONG_GOTO VEC_SHIFT_14;
2002  1 :
2003  1 :/* 010101 - TES = 2097152 */
2004  1 :VEC_SHIFT_21:
2005  1 :         OFF_ALU_OUT = ACC LEFT_SHIFTED(7) OR CON_0,
2006  1 :         LOAD (ACCUMULATOR) WITH OFFSET,
2007  1 :         LONG_GOTO VEC_SHIFT_14;
2008  1 :
2009  1 :/* 010110 - TES = 4194304 */
2010  1 :         OFF_ALU_OUT = ACC LEFT_SHIFTED(1) OR CON_0,
2011  1 :         LOAD (ACCUMULATOR) WITH OFFSET,
2012  1 :         LONG_GOTO VEC_SHIFT_21;
2013  1 :
2014  1 :/* 010111 - TES = 8388608 */
2015  1 :         OFF_ALU_OUT = ACC LEFT_SHIFTED(2) OR CON_0,
2016  1 :         LOAD (ACCUMULATOR) WITH OFFSET,
2017  1 :         LONG_GOTO VEC_SHIFT_21;
2018  1 :
2019  1 :/* 011000 - TES = 16777216 */
2020  1 :         OFF_ALU_OUT = ACC LEFT_SHIFTED(3) OR CON_0,
2021  1 :         LOAD (ACCUMULATOR) WITH OFFSET,
2022  1 :         LONG_GOTO VEC_SHIFT_21;
2023  1 :
2024  1 :/* 011001 - TES = 33554432 */
2025  1 :         OFF_ALU_OUT = ACC LEFT_SHIFTED(4) OR CON_0,
2026  1 :         LOAD (ACCUMULATOR) WITH OFFSET,
2027  1 :         LONG_GOTO VEC_SHIFT_21;
```

```
2028 1 :
2029 1 :/* 011010 - TES = 67108864 */
2030 1 :       OFF_ALU_OUT = ACC LEFT_SHIFTED(5) OR CON_0,
2031 1 :       LOAD (ACCUMULATOR) WITH OFFSET,
2032 1 :       LONG_GOTO VEC_SHIFT_21;
2033 1 :
2034 1 :/* 011011 - TES = 134217728 */
2035 1 :       OFF_ALU_OUT = ACC LEFT_SHIFTED(6) OR CON_0,
2036 1 :       LOAD (ACCUMULATOR) WITH OFFSET,
2037 1 :       LONG_GOTO VEC_SHIFT_21;
2038 1 :
2039 1 :/* 011100 - TES = 268435456 */
2040 1 :VEC_SHIFT_28:
2041 1 :       OFF_ALU_OUT = ACC LEFT_SHIFTED(7) OR CON_0,
2042 1 :       LOAD (ACCUMULATOR) WITH OFFSET,
2043 1 :       LONG_GOTO VEC_SHIFT_21;
2044 1 :
2045 1 :/* 011101 - TES = 536870912 */
2046 1 :       OFF_ALU_OUT = ACC LEFT_SHIFTED(1) OR CON_0,
2047 1 :       LOAD (ACCUMULATOR) WITH OFFSET,
2048 1 :       LONG_GOTO VEC_SHIFT_26;
2049 1 :
2050 1 :/* 011110 - TES = 1073741824 */
2051 1 :       OFF_ALU_OUT = ACC LEFT_SHIFTED(2) OR CON_0,
2052 1 :       LOAD (ACCUMULATOR) WITH OFFSET,
2053 1 :       LONG_GOTO VEC_SHIFT_28;
2054 1 :
2055 1 :/* 011111 - TES = 2147483648 */
2056 1 :       OFF_ALU_OUT = ACC LEFT_SHIFTED(3) OR CON_0,
2057 1 :       LOAD (ACCUMULATOR) WITH OFFSET,
2058 1 :       LONG_GOTO VEC_SHIFT_26;
2059 1 :
2060 1 :/* 100000 - TES is a Positive Literal */
2061 1 :       LONG_CALL MULTIPLY*MULT_16_32;
2062 1 :
2063 1 :       OFF_ALU_OUT = ACC PLUS RESULT,
2064 1 :       LOAD_OFF (RESULT) WITH OFFSET,
2065 1 :       LOAD (ACCUMULATOR) WITH OFFSET,
2066 1 :       LOAD_ADN (RESULT) WITH ADN(RESULT),
2067 1 :       RETURN;
2068 1 :
2069 1 :/* 100010 - TES is a Negative Literal */
2070 1 :       LONG_CALL MULTIPLY*MULT_16_32;
2071 1 :
2072 1 :       OFF_ALU_OUT = ACC REV_MINUS RESULT,
2073 1 :       LOAD_OFF (RESULT) WITH OFFSET,
2074 1 :       LOAD (ACCUMULATOR) WITH OFFSET,
2075 1 :       LOAD_ADN (RESULT) WITH ADN(RESULT),
2076 1 :       RETURN;
2077 1 :
2078 1 :/* 100100 - TES is a Name */
2079 1 :       OFF_ALU_OUT = ACC OR CON_0,
2080 1 :       LOAD_OFF (TEMP) WITH OFFSET;      /* save index value */
2081 1 :
2082 1 :       OFF_ALU_OUT = BIASED_LENGTH CON_LENGTH(0) OR ACC_HI,
2083 1 :       LOAD_LEN (NL_1) WITH OFF,         /* upper half of index value */
2084 1 :       TEST_TO_CC (OFF_NE_0);            /* test for zero */
2085 1 :
2086 1 :       OFF_ALU_OUT = ZERO OR NL_1,
2087 1 :       RESOLVE (A,OFF_ALU_LS_16);        /* TES */
2088 1 :/*
2089 1C:      LOAD (ACCUMULATOR) WITH JPD(LEN(REG_A)),
2090 1C:      IF LEN_GT_32 THEN CALL FIX_DESCR;
2091 1C:*/
2092 1 :       READ TO ACCUMULATOR USING DESCRIPTOR REG_A BIAS_LENGTH,
2093 1 :       LOAD_ADN (REG_A) WITH 0;
2094 1 :
2095 1 :       OFF_ALU_OUT = ZERO OR TEMP,
2096 1 :       LOAD_OFF (NL_1) WITH OFFSET;      /* index value */
2097 1 :
2098 1 :       OFF_ALU_OUT = ACC OR CON_0,
2099 1 :       LOAD_OFF (TEMP) WITH OFFSET,      /* save TES value */
2100 1 :       LONG_CALL MULTIPLY*MULT_16_32;
```

```
2101 1 :
2102 1 :           LOAD_OFF(NC_1) WITH JPD(LEN(NC_1)),    /* hi bits of index */
2103 1 :           IF NOT_CC THEN GOTO VEC_SHIFT_0;       /* if zero */
2104 1 :
2105 1 :           OFF_ALU_OUT = ACC PLUS RESULT,
2106 1 :           LOAD_OFF (RESULT) WITH OFFSET,
2107 1 :           LOAD_AON (RESULT) WITH AON(RESULT);
2108 1 :
2109 1 :           OFF_ALU_OUT = ZERO OR TEMP,
2110 1 :           LOAD (ACCUMULATOR) WITH OFFSET,
2111 1 :           LONG_CALL MULTIPLY*MULT_16_32;
2112 1 :
2113 1 :           OFF_ALU_OUT = ACC LEFT_SHIFTED(2) OR CON_0,
2114 1 :           LOAD (ACCUMULATOR) WITH OFFSET,
2115 1 :           LONG_GOTO VEC_SHIFT_14;
2116 1 :END

INPUT FILE: ?11.I_FILE1A
OBJECT FILE: RESOLVER.OB

LINE N :SOURCE 246 0 : ENTRY CACHE_RELOAD :
 247 0 : OFF_ALU_OUT = NAME_TRAP ( ZERO_EXTEND ) OR COMMON ( 0B0 , 0 ) ,
   M 0 :    alu_in 2 , nb_ctrl 2 , dev_cmd 4   alu_op 5   src_frame
   M 0 : 2 , r_source 0 , com_ext 0B0 ,
 248 0 : LOAD_OFF ( CURRENT ( 7 ) ) WITH OFFSET
   M 0 : dest_frame 0 , r_dest 7 , r_w 1   o_in    3
 248 0 : ;
 250 0 : RESOLVE ( 0 , NAME_TRAP )
   M 0 : mem 0 , nac 0 , snac 4 , dest_frame 0 , r_dest 0
   M 0 : , r_w 1 , nb_ctrl 2 , l_in 1 , o_in 1 , a_in 1 , a_w 1
 250 0 : ;
 252 0 : OFF_ALU_OUT = ZERO OR CURRENT ( 7 ) ,
   M 0 :    alu_in 2 , rand 2  alu_op 5  src_frame 0 , r_source 7 ,
 253 0 : SOURCE ( OFF_ALU_LS_16 ) TO NAME_BUS ( NAME_TRAP )
   M 0 : nb_ctrl 0    dev_cmd 117
 253 0 : ;
 255 0 : LOAD_AON ( CURRENT ( 0 ) ) WITH 0 ,
   M 0 : dest_frame 0 , r_dest 0 , r_w 1   a_in    0 ,
 256 0 : OFF_ALU_OUT = ZERO OR CURRENT ( 1 ) ,
   M 0 :    alu_in 2 , rand 2  alu_op 5  src_frame 0 , r_source 1 ,
 257 0 : LOAD ( ACCUMULATOR ) WITH OFFSET ,
   M 0 : a_w 1 , o_in   3 ,
 258 0 : RETURN
   M 0 : nac 2
 258 0 : ;
 262 0 : BEGIN
 271 1 : ENTRY COMMON_MISS :
 272 1 : OFF_ALU_OUT =
   M 1 :
 273 1 : NAME_TRAP ( ZERO_EXTEND ) LEFT_SHIFTED ( 5 ) PLUS
 273 1 : COMMON ( 2 , 4 ) ,
   M 1 : alu_in 2 , nb_ctrl 2 , dev_cmd 4   st 5  alu_op 3
   M 1 :   src_frame 2 , r_source 4 , com_ext 2 ,
 274 1 : LOAD_OFF ( CURRENT ( 6 ) ) WITH OFFSET ,
   M 1 : dest_frame 0 , r_dest 6 , r_w 1   o_in    3 ,
 275 1 : LOAD_AON ( CURRENT ( 6 ) ) WITH AON ( COMMON ( 2 , 4 ) )
   M 1 : dest_frame 0 , r_dest 6 , r_w 1   a_in    2 , src_frame
   M 1 : 2 , r_source 4 , com_ext 2
 275 1 : ;
 277 1 : ENTRY COMMON_MISS_A :
 278 1 : OFF_ALU_OUT = ACC OR COMMON ( 2 , 6 ) ,
   M 1 :    alu_in 2   alu_op 5   src_frame 2 , r_source 6 , com_ext 2 ,
 279 1 : LOAD_OFF ( CURRENT ( 5 ) ) WITH OFFSET ,
   M 1 : dest_frame 0 , r_dest 5 , r_w 1   o_in    3 ,
 280 1 : LOAD_LEN ( CURRENT ( 5 ) ) WITH LEN ( COMMON ( 2 , 6 ) ) ,
   M 1 : dest_frame 0 , r_dest 5 , r_w 1   l_in    2 , src_frame
   M 1 : 2 , r_source 6 , com_ext 2
 281 1 : CASE ON ACC_BYTE ( 0 ) MASK 0C3R ROTATE ( 2 )
   M 1 : nac 3   src 4   mask 0C3H  sc 5
 281 1 : ;
```

```
284 1 : OFF_ALU_OUT = ACC SIGN_EXTEND_LO_ PLUS COMMON ( 2 , 1 ) ,
  M 1 :    alu_in 2  dev_cmd 5  alu_op 3  src_frame 2 , r_source
  M 1 : 1 , com_ext 2 ,
285 1 : LOAD_OFF ( PREVIOUS ( 0 ) ) WITH OFFSET ,
  M 1 : dest_frame 3 , r_dest 0 , r_w 1  o_in   3 ,
286 1 : LOAD_AON ( PREVIOUS ( 0 ) ) WITH 1 COMMON ( 2 , 1 ) ,
  M 1 : dest_frame 3 , r_dest 0 , r_w 1  a_in   1 src_frame
  M 1 : 2 , r_source 1 , com_ext 2 ,
287 1 : FTU ( RIGHT , SIGN ) ,
  M 1 : rand 5 ,
288 1 : LONG_GOTO SD_SL_ABR
  M 1 : nac 6 , lit14  SD_SL_ABR
288 1 : ;
291 1 : OFF_ALU_OUT = ACC SIGN_EXTEND_LO_ PLUS COMMON ( 2 , 2 ) ,
  M 1 :    alu_in 2  dev_cmd 5  alu_op 3  src_frame 2 , r_source
  M 1 : 2 , com_ext 2 ,
292 1 : LOAD_OFF ( PREVIOUS ( 0 ) ) WITH OFFSET ,
  M 1 : dest_frame 3 , r_dest 0 , r_w 1  o_in   3 ,
293 1 : LOAD_AON ( PREVIOUS ( 0 ) ) WITH 1 COMMON ( 2 , 2 ) ,
  M 1 : dest_frame 3 , r_dest 0 , r_w 1  a_in   1 src_frame
  M 1 : 2 , r_source 2 , com_ext 2 ,
294 1 : FTU ( RIGHT , SIGN ) ,
  M 1 : rand 5 ,
295 1 : LONG_GOTO SD_SL_ABR
  M 1 : nac 6 , lit14  SD_SL_ABR
295 1 : ;
298 1 : OFF_ALU_OUT = ACC SIGN_EXTEND_LO_ PLUS COMMON ( 2 , 0 ) ,
  M 1 :    alu_in 2  dev_cmd 5  alu_op 3  src_frame 2 , r_source
  M 1 : 0 , com_ext 2 ,
299 1 : LOAD_OFF ( PREVIOUS ( 0 ) ) WITH OFFSET ,
  M 1 : dest_frame 3 , r_dest 0 , r_w 1  o_in   3 ,
300 1 : LOAD_AON ( PREVIOUS ( 0 ) ) WITH 1 COMMON ( 2 , 0 ) ,
  M 1 : dest_frame 3 , r_dest 0 , r_w 1  a_in   1 src_frame
  M 1 : 2 , r_source 0 , com_ext 2 ,
301 1 : FTU ( RIGHT , SIGN ) ,
  M 1 : rand 5 ,
302 1 : LONG_GOTO SD_SL_ABR
  M 1 : nac 6 , lit14  SD_SL_ABR
302 1 : ;
305 1 : OFF_ALU_OUT = ACC LEFT_SHIFTED ( 4 ) AND COMMON ( @Ca , 1 ) ,
  M 1 :    alu_in 2  sf 4  alu_op 6  src_frame 2 , r_source
  M 1 : 1 , com_ext @Cv ,
306 1 : TEST_TO_CC ( OFF_NE_0 ) ,
  M 1 : rand 10 , test 6 , lit8 1 ,
307 1 : GOTO SD_SL_BASED
  M 1 : nac 4 , lit8  SD_SL_BASED
307 1 : ;
310 1 : OFF_ALU_OUT = ACC SIGN_EXTEND_LO_ PLUS COMMON ( 2 , 1 ) ,
  M 1 :    alu_in 2  dev_cmd 5  alu_op 3  src_frame 2 , r_source
  M 1 : 1 , com_ext 2 ,
311 1 : LOAD_OFF ( PREVIOUS ( 0 ) ) WITH OFFSET ,
  M 1 : dest_frame 3 , r_dest 0 , r_w 1  o_in   3 ,
312 1 : LOAD_AON ( PREVIOUS ( 0 ) ) WITH 1 COMMON ( 2 , 1 ) ,
  M 1 : dest_frame 3 , r_dest 0 , r_w 1  a_in   1 src_frame
  M 1 : 2 , r_source 1 , com_ext 2 ,
313 1 : FTU ( RIGHT , SIGN ) ,
  M 1 : rand 5 ,
314 1 : LONG_GOTO SD_LL_ABR
  M 1 : nac 6 , lit14  SD_LL_ABR
314 1 : ;
317 1 : OFF_ALU_OUT = ACC SIGN_EXTEND_LO_ PLUS COMMON ( 2 , 2 ) ,
  M 1 :    alu_in 2  dev_cmd 5  alu_op 3  src_frame 2 , r_source
  M 1 : 2 , com_ext 2 ,
318 1 : LOAD_OFF ( PREVIOUS ( 0 ) ) WITH OFFSET ,
  M 1 : dest_frame 3 , r_dest 0 , r_w 1  o_in   3 ,
319 1 : LOAD_AON ( PREVIOUS ( 0 ) ) WITH 1 COMMON ( 2 , 2 ) ,
  M 1 : dest_frame 3 , r_dest 0 , r_w 1  a_in   1 src_frame
  M 1 : 2 , r_source 2 , com_ext 2 ,
320 1 : FTU ( RIGHT , SIGN ) ,
  M 1 : rand 5 ,
321 1 : LONG_GOTO SD_LL_ABR
  M 1 : nac 6 , lit14  SD_LL_ABR
321 1 : ;
```

```
324 1 : OFF_ALU_OUT = ACC SIGN_EXTEND_LO_ PLUS COMMON ( 2 , 0 ) ,
  M 1 :    alu_in 2  dev_cmd 5  alu_op 3  src_frame 2 , r_source
  M 1 : 0 , com_ext 2 ,
325 1 : LOAD_OFF ( PREVIOUS ( 0 ) ) WITH OFFSET ,
  M 1 : dest_frame 3 , r_dest 0 , r_w 1  o_in    3 ,
326 1 : LOAD_AON ( PREVIOUS ( 0 ) ) WITH 1 COMMON ( 2 , 0 ) ,
  M 1 : dest_frame 3 , r_dest 0 , r_w 1  a_in    1 src_frame
  M 1 : 2 , r_source 0 , com_ext 2 ,
327 1 : FTU ( RIGHT , SIGN ) ,
  M 1 : rand 5 ,
328 1 : LONG_GOTO SD_LL_APR
  M 1 : nac 6 , lit14  SD_LL_APR
328 1 : ;
331 1 : OFF_ALU_OUT = ACC LEFT_SHIFTED ( 4 ) AND COMMON ( 0C0 , 1 ) ,
  M 1 :    alu_in 2  sf 4  alu_op 6  src_frame 2 , r_source
  M 1 : 1 , com_ext 0C0 ,
332 1 : TEST_TO_CC ( OFF_NE_0 ) ,
  M 1 : rand 10 , test 6 , lit8 1   ,
333 1 : GOTO SD_LL_BASED
  M 1 : nac 4 , lit8  SD_LL_BASED
333 1 : ;
336 1 : READ TO ACCUMULATOR USING OFF_ALU WITH CURRENT (
336 1 : 6 ) CON_LENGTH ( 32 ) ,
  M 1 : mem 1   md 1   db_ctrl 1   src_frame 0 , r_source
  M 1 : 6  len_ctrl 6  ,
337 1 : OFF_ALU_OUT = BIASED_LENGTH PLUS CURRENT ( 6 ) ,
  M 1 :    alu_in 1  alu_op 3  src_frame 0 , r_source 6 ,
338 1 : LOAD_OFF ( CURRENT ( 6 ) ) WITH OFFSET ,
  M 1 : dest_frame 0 , r_dest 6 , r_w 1  o_in    3 ,
339 1 : LOAD_AON ( CURRENT ( 6 ) ) WITH AON ( CURRENT ( 6 ) ) ,
  M 1 : dest_frame 0 , r_dest 6 , r_w 1  a_in    2 , src_frame
  M 1 : 0 , r_source 6 ,
340 1 : LONG_GOTO LD_SL_FF
  M 1 : nac 6 , lit14  LD_SL_FF
340 1 : ;
343 1 : READ TO ACCUMULATOR USING OFF_ALU WITH CURRENT (
343 1 : 6 ) CON_LENGTH ( 32 ) ,
  M 1 : mem 1   md 1   db_ctrl 1   src_frame 0 , r_source
  M 1 : 6  len_ctrl 6  ,
344 1 : OFF_ALU_OUT = BIASED_LENGTH PLUS CURRENT ( 6 ) ,
  M 1 :    alu_in 1  alu_op 3  src_frame 0 , r_source 6 ,
345 1 : LOAD_OFF ( CURRENT ( 6 ) ) WITH OFFSET ,
  M 1 : dest_frame 0 , r_dest 6 , r_w 1  o_in    3 ,
346 1 : LOAD_AON ( CURRENT ( 6 ) ) WITH AON ( CURRENT ( 6 ) ) ,
  M 1 : dest_frame 0 , r_dest 6 , r_w 1  a_in    2 , src_frame
  M 1 : 0 , r_source 6 ,
347 1 : LONG_GOTO LD_SL_SDP
  M 1 : nac 6 , lit14  LD_SL_SDP
347 1 : ;
350 1 : READ TO ACCUMULATOR USING OFF_ALU WITH CURRENT (
350 1 : 6 ) CON_LENGTH ( 32 ) ,
  M 1 : mem 1   md 1   db_ctrl 1   src_frame 0 , r_source
  M 1 : 6  len_ctrl 6  ,
351 1 : OFF_ALU_OUT = BIASED_LENGTH PLUS CURRENT ( 6 ) ,
  M 1 :    alu_in 1  alu_op 3  src_frame 0 , r_source 6 ,
352 1 : LOAD_OFF ( CURRENT ( 6 ) ) WITH OFFSET ,
  M 1 : dest_frame 0 , r_dest 6 , r_w 1  o_in    3 ,
353 1 : LOAD_AON ( CURRENT ( 6 ) ) WITH AON ( CURRENT ( 6 ) ) ,
  M 1 : dest_frame 0 , r_dest 6 , r_w 1  a_in    2 , src_frame
  M 1 : 0 , r_source 6 ,
354 1 : LONG_GOTO LD_SL_PRP
  M 1 : nac 6 , lit14  LD_SL_PRP
354 1 : ;
357 1 : OFF_ALU_OUT = ACC LEFT_SHIFTED ( 4 ) AND COMMON ( 0C0 , 1 ) ,
  M 1 :    alu_in 2  sf 4  alu_op 6  src_frame 2 , r_source
  M 1 : 1 , com_ext 0C0 ,
358 1 : TEST_TO_CC ( OFF_NE_0 ) ,
  M 1 : rand 10 , test 6 , lit8 1   ,
359 1 : GOTO LD_SL_BASED
  M 1 : nac 4 , lit8  LD_SL_BASED
359 1 : ;
362 1 : READ TO ACCUMULATOR USING OFF_ALU WITH CURRENT (
```

```
362 1 : 6 ) CON_LENGTH ( 32 ) ,
  M 1 : mem 1    md 1    nb_ctrl 1    src_frame 0 , r_source
  M 1 : 6 len_ctrl 6     ,
363 1 : OFF_ALU_OUT = BIASED_LENGTH PLUS CURRENT ( 6 ) ,
  M 1 :    alu_in 1   alu_op 3  src_frame 0 , r_source 6  ,
364 1 : LOAD_OFF ( CURRENT ( 6 ) ) WITH OFFSET ,
  M 1 : dest_frame 0 , r_dest 6 , r_w 1  o_in   3 ,
365 1 : LOAD_AON ( CURRENT ( 6 ) ) WITH AON ( CURRENT ( 6 ) ) ,
  M 1 : dest_frame 0 , r_dest 6 , r_w 1  a_in   2 , src_frame
  M 1 : 0 , r_source 6    ,
366 1 : LONG_GOTO LD_LL_FP
  M 1 : nac 6 , lit14  LD_LL_FP
366 1 : ;
369 1 : READ TO ACCUMULATOR USING OFF_ALU WITH CURRENT (
369 1 : 6 ) CON_LENGTH ( 32 ) ,
  M 1 : mem 1    md 1    do_ctrl 1    src_frame 0 , r_source
  M 1 : 6 len_ctrl 6     ,
370 1 : OFF_ALU_OUT = BIASED_LENGTH PLUS CURRENT ( 6 ) ,
  M 1 :    alu_in 1   alu_op 3  src_frame 0 , r_source 6  ,
371 1 : LOAD_OFF ( CURRENT ( 6 ) ) WITH OFFSET ,
  M 1 : dest_frame 0 , r_dest 6 , r_w 1  o_in   3 ,
372 1 : LOAD_AON ( CURRENT ( 6 ) ) WITH AON ( CURRENT ( 6 ) ) ,
  M 1 : dest_frame 0 , r_dest 6 , r_w 1  a_in   2 , src_frame
  M 1 : 0 , r_source 6    ,
373 1 : LONG_GOTO LD_LL_SOP
  M 1 : nac 6 , lit14  LD_LL_SOP
373 1 : ;
376 1 : READ TO ACCUMULATOR USING OFF_ALU WITH CURRENT (
376 1 : 6 ) CON_LENGTH ( 32 ) ,
  M 1 : mem 1    md 1    nb_ctrl 1    src_frame 0 , r_source
  M 1 : 6 len_ctrl 6     ,
377 1 : OFF_ALU_OUT = BIASED_LENGTH PLUS CURRENT ( 6 ) ,
  M 1 :    alu_in 1   alu_op 3  src_frame 0 , r_source 6  ,
378 1 : LOAD_OFF ( CURRENT ( 6 ) ) WITH OFFSET ,
  M 1 : dest_frame 0 , r_dest 6 , r_w 1  o_in   3 ,
379 1 : LOAD_AON ( CURRENT ( 6 ) ) WITH AON ( CURRENT ( 6 ) ) ,
  M 1 : dest_frame 0 , r_dest 6 , r_w 1  a_in   2 , src_frame
  M 1 : 0 , r_source 6    ,
380 1 : LONG_GOTO LD_LL_PBP
  M 1 : nac 6 , lit14  LD_LL_PBP
380 1 : ;
383 1 : OFF_ALU_OUT = ACC LEFT_SHIFTED ( 4 ) AND COMMON ( aCa , 1 ) ,
  M 1 :    alu_in 2   sf 4  alu_op 6  src_frame 2 , r_source
  M 1 : 1 , com_ext aCa  ,
384 1 : TEST_TO_CC ( OFF_NE_0 ) ,
  M 1 : rand 10 , test 6 , lit8 1    ,
385 1 : GOTO LD_LL_BASED
  M 1 : nac 4 , lit8  LD_LL_BASED
385 1 : ;
388 1 : SD_SL_BASED :
389 1 : OFF_ALU_OUT = NAME_TRAP ( ZERO_EXTEND ) OR COMMON ( aBa , 0 ) ,
  M 1 :    alu_in 2 , nb_ctrl 2 , dev_cmd 4   alu_op 5  src_frame
  M 1 : 2 , r_source 0 , com_ext aBa ,
390 1 : LOAD_OFF ( CURRENT ( 7 ) ) WITH OFFSET ,
  M 1 : dest_frame 0 , r_dest 7 , r_w 1  o_in   3 ,
391 1 : IF NOT_CC THEN GOTO SD_SL_WEIRD
  M 1 : test  13 , polarity 0   nac 4 , lit8 SD_SL_WEIRD
391 1 : ;
393 1 : OFF_ALU_OUT = ACC AND COMMON ( aCa , 6 ) ,
  M 1 :    alu_in 2   alu_op 6  src_frame 2 , r_source 6 , com_ext aCa ,
394 1 : SOURCE ( OFF_ALU_LS_16 ) TO NAME_BUS ( NAME_TRAP ) ,
  M 1 : nb_ctrl 0    dev_cmd 117   ,
395 1 : LOAD_OFF ( CURRENT ( 2 ) ) WITH OFFSET ,
  M 1 : dest_frame 0 , r_dest 2 , r_w 1  o_in   3 ,
396 1 : CASE ON ACC_BYTE ( 2 ) MASK DROP ROTATE ( 3 )
  M 1 : nac 3   srce 6   mask  addw  sc 4
396 1 : ;
399 1 : RESOLVE ( 0 , NAME_TRAP )
  M 1 : mem 0 , nac 0 , snac 4 , dest_frame 0 , r_dest 0
  M 1 : , r_w 1 , nb_ctrl 2 , l_in 1 , o_in 1 , a_in 1 , a_w 1
399 1 : ;
401 1 : OFF_ALU_OUT = ZERO OR CURRENT ( 7 ) ,
```

```
   M 1 :    alu_in 2 , rand 2  alu_op 5  src_frame 0 , r_source 7 ,
 402 1 : SOURCE ( OFF_ALU_LS_16 ) TO NAME_BUS ( NAME_TRAP )
   M 1 : nh_ctrl 0    dev_cmd 117
 402 1 : ;
 404 1 : OFF_ALU_OUT = ZERO OR CURRENT ( 0 ) ,
   M 1 :    alu_in 2 , rand 2  alu_op 5  src_frame 0 , r_source 0 ,
 405 1 : LOAD_OFF ( PREVIOUS ( 0 ) ) WITH OFFSET ,
   M 1 : dest_frame 3 , r_dest 0 , r_w 1  o_in    3 ,
 406 1 : LOAD_AON ( PREVIOUS ( 0 ) ) WITH AON ( CURRENT ( 0 ) )
   M 1 : dest_frame 3 , r_dest 0 , r_w 1  a_in    2 , src_frame
   M 1 : 0 , r_source 0
 406 1 : ;
 408 1 : SD_SL_BASED_1 :
 409 1 : OFF_ALU_OUT = ZERO OR CURRENT ( 5 ) ,
   M 1 :    alu_in 2 , rand 2  alu_op 5  src_frame 0 , r_source 5 ,
 410 1 : LOAD ( ACCUMULATOR ) WITH OFFSET ,
   M 1 : a_w 1 , o_in    3 ,
 411 1 : LOAD_AON ( CURRENT ( 0 ) ) WITH 0 ,
   M 1 : dest_frame 0 , r_dest 0 , r_w 1  a_in    0 ,
 412 1 : WITH CURRENT ( 5 ) ,
   M 1 :  src_frame 0 , r_source 5 ,
 413 1 : IF LEN_LE_32 THEN GOTO SD_SL_ABR
   M 1 : test 4 , polarity 1   nac 4 , lit6   SD_SL_ABR
 413 1 : ;
 416 1 : OFF_ALU_OUT = ZERO OR CURRENT ( 7 ) ,
   M 1 :    alu_in 2 , rand 2  alu_op 5  src_frame 0 , r_source 7 ,
 417 1 : SOURCE ( OFF_ALU_LS_16 ) TO NAME_BUS ( NAME_TRAP )
   M 1 : nh_ctrl 0    dev_cmd 117
 417 1 : ;
 419 1 : SD_SL_WEIRD :
 420 1 : OFF_ALU_OUT = LIT16 ( @00FF@ ) AND ACC_HI ,
   M 1 :    alu_in 3 , 1 0 , lit16 @00FF@   alu_op 6  dev_cmd 1 ,
 421 1 : LOAD_LEN ( PREVIOUS ( 0 ) ) WITH OFF
   M 1 : dest_frame 3 , r_dest 0 , r_w 1  l_in    3 , ob_ctrl 1
 421 1 : ;
 423 1 : OFF_ALU_OUT = ACC LEFT_SHIFTED ( 4 ) OR COMMON ( @B@ , 0 ) ,
   M 1 :    alu_in 2  sf 4  alu_op 5  src_frame 2 , r_source
   M 1 : 0 , com_ext @B@ ,
 424 1 : LOAD ( ACCUMULATOR ) WITH OFFSET ,
   M 1 : a_w 1 , o_in    3 ,
 425 1 : CASE ON ACC_BYTE ( 2 ) MASK @C0@ ROTATE ( 2 )
   M 1 : nac 3   srce 6   mask @C0@ sc 5
 425 1 : ;
 428 1 : OFF_ALU_OUT = ACC SIGN_EXTEND_LO_ LEFT_SHIFTED (
 428 1 : 1 ) PLUS COMMON ( 2 , 1 ) ,
   M 1 :    alu_in 2  dev_cmd 5  sf 1  alu_op 3  src_frame
   M 1 : 2 , r_source 1 , com_ext 2 ,
 429 1 : LOAD_OFF ( CURRENT ( 4 ) ) WITH OFFSET ,
   M 1 : dest_frame 0 , r_dest 4 , r_w 1  o_in    3 ,
 430 1 : LOAD_AON ( CURRENT ( 4 ) ) WITH AON ( COMMON ( 2 , 1 ) ) ,
   M 1 : dest_frame 0 , r_dest 4 , r_w 1  a_in    2 , src_frame
   M 1 : 2 , r_source 1 , com_ext 2 ,
 431 1 : LOAD_LEN ( CURRENT ( 4 ) ) WITH LEN ( COMMON ( 2
 431 1 : , 1 ) ) CON_LENGTH ( 1 , INC )
   M 1 : dest_frame 0 , r_dest 4 , r_w 1  l_in    2 , src_frame
   M 1 : 2 , r_source 1 , com_ext 2   len_ctrl 8
 431 1 : ;
 432 1 : LONG_GOTO SD_SL_WEIRD_3
   M 1 : nac 6 , lit14  SD_SL_WEIRD_3
 432 1 : ;
 435 1 : OFF_ALU_OUT = ACC SIGN_EXTEND_LO_ LEFT_SHIFTED (
 435 1 : 1 ) PLUS COMMON ( 2 , 2 ) ,
   M 1 :    alu_in 2  dev_cmd 5  sf 1  alu_op 3  src_frame
   M 1 : 2 , r_source 2 , com_ext 2 ,
 436 1 : LOAD_OFF ( CURRENT ( 4 ) ) WITH OFFSET ,
   M 1 : dest_frame 0 , r_dest 4 , r_w 1  o_in    3 ,
 437 1 : LOAD_AON ( CURRENT ( 4 ) ) WITH AON ( COMMON ( 2 , 2 ) ) ,
   M 1 : dest_frame 0 , r_dest 4 , r_w 1  a_in    2 , src_frame
   M 1 : 2 , r_source 2 , com_ext 2 ,
 438 1 : LOAD_LEN ( CURRENT ( 4 ) ) WITH LEN ( COMMON ( 2
 438 1 : , 2 ) ) CON_LENGTH ( 1 , INC )
   M 1 : dest_frame 0 , r_dest 4 , r_w 1  l_in    2 , src_frame
```

```
M 1 :   2 , r_source 2 , com_ext 2       len_ctrl 8
438 1 : ;
439 1 : LONG_GOTO SD_SL_WEIRD_3
  M 1 : nac 6 , lit14  SD_SL_WEIRD_3
439 1 : ;
442 1 : OFF_ALU_OUT = ZEROS ,
  M 1 :    alu_op 0 ,
443 1 : LOAD_OFF ( PREVIOUS ( 0 ) ) WITH OFFSET ,
  M 1 : dest_frame 3 , r_dest 0 , r_w 1  o_in   3 ,
444 1 : LONG_GOTO SD_SL_WEIRD_4
  M 1 : nac 6 , lit14  SD_SL_WEIRD_4
444 1 : ;
447 1 : OFF_ALU_OUT = ZEROS ,
  M 1 :    alu_op 0 ,
448 1 : LOAD_OFF ( PREVIOUS ( 0 ) ) WITH OFFSET
  M 1 : dest_frame 3 , r_dest 0 , r_w 1  o_in   3
448 1 : ;
450 1 : SD_SL_WEIRD_1 :
451 1 : OFF_ALU_OUT = ZERO OR CURRENT ( 5 ) ,
  M 1 :    alu_in 2 , rand 2  alu_op 5  src_frame 0 , r_source 5 ,
452 1 : LOAD ( ACCUMULATOR ) WITH OFFSET
  M 1 : a_w 1 , o_in    3
452 1 : ;
454 1 : OFF_ALU_OUT = LIT16 ( 900FF9 ) AND ACC_HI ,
  M 1 :    alu_in 3 , 1 0 , lit16 900FF9   alu_op 6  dev_cmd 1 ,
455 1 : LOAD_OFF ( CURRENT ( 4 ) ) WITH OFFSET
  M 1 : dest_frame 0 , r_dest 4 , r_w 1  o_in   3
455 1 : ;
457 1 : SD_SL_WEIRD_2 :
458 1 : OFF_ALU_OUT = ACC ZERO_HI OR COMMON ( @8@ , 0 ) ,
  M 1 :    alu_in 2  dev_cmd 3  alu_op 5  src_frame 2 , r_source
  M 1 : 0 , com_ext @8@ ,
459 1 : LOAD_OFF ( CURRENT ( 2 ) ) WITH OFFSET ,
  M 1 : dest_frame 0 , r_dest 2 , r_w 1  o_in   3 ,
460 1 : LONG_GOTO LOAD_WEIRD_BASE
  M 1 : nac 6 , lit14  LOAD_WEIRD_BASE
460 1 : ;
462 1 : SD_SL_WEIRD_3 :
463 1 : OFF_ALU_OUT = ZEROS ,
  M 1 :    alu_op 0 ,
464 1 : LOAD_OFF ( PREVIOUS ( 0 ) ) WITH OFFSET ,
  M 1 : dest_frame 3 , r_dest 0 , r_w 1  o_in   3 ,
465 1 : LONG_GOTO SD_SL_WEIRD_5
  M 1 : nac 6 , lit14  SD_SL_WEIRD_5
465 1 : ;
467 1 : SD_SL_WEIRD_4 :
468 1 : OFF_ALU_OUT = LIT16 ( @4000@ ) OR CURRENT ( 5 ) ,
  M 1 :    alu_in 3 , 1 0 , lit16 @4000@   alu_op 5  src_frame
  M 1 : 0 , r_source 5 ,
469 1 : LOAD_OFF ( CURRENT ( 2 ) ) WITH OFFSET ,
  M 1 : dest_frame 0 , r_dest 2 , r_w 1  o_in   3 ,
470 1 : SOURCE ( OFF_ALU_LS_16 ) TO NAME_BUS ( NAME_TRAP )
  M 1 : nb_ctrl 0    dev_cmd 117
470 1 : ;
472 1 : RESOLVE ( 0 , NAME_TRAP )
  M 1 : mem 0 , nac 0 , snac 4 , dest_frame 0 , r_dest 0
  M 1 : , r_w 1 , nb_ctrl 2 , l_in 1 , o_in 1 , a_in 1 , a_w 1
472 1 : ;
474 1 : OFF_ALU_OUT = ZERO OR CURRENT ( 0 ) ,
  M 1 :    alu_in 2 , rand 2  alu_op 5  src_frame 0 , r_source 0 ,
475 1 : LOAD_OFF ( CURRENT ( 4 ) ) WITH OFFSET ,
  M 1 : dest_frame 0 , r_dest 4 , r_w 1  o_in   3 ,
476 1 : LOAD_AON ( CURRENT ( 4 ) ) WITH AON ( CURRENT ( 0 ) ) ,
  M 1 : dest_frame 0 , r_dest 4 , r_w 1  a_in   2 , src_frame
  M 1 : 0 , r_source 0 ,
477 1 : LOAD_LEN ( CURRENT ( 4 ) ) WITH LITERAL ( LIT_LENGTH ( 33 ) )
  M 1 : dest_frame 0 , r_dest 4 , r_w 1  l_in   1 , len_ctrl
  M 1 : 15 , lit8 33 , nac 4 , test 15 , polarity 0
477 1 : ;
479 1 : OFF_ALU_OUT = ZERO OR CURRENT ( 2 ) ,
  M 1 :    alu_in 2 , rand 2  alu_op 5  src_frame 0 , r_source 2 ,
480 1 : LOAD_AON ( CURRENT ( 0 ) ) WITH 0 ,
```

```
 M 1 :  dest_frame 0 , r_dest 0 , r_w 1   a_in   0 ,
481 1 :  mem 0 , nac 0 , snac 0 , nb_ctrl 0 ,
482 1 :  o_in 1 , a_w 1 , l_in 1
483 1 :  ;
484 1 :  OFF_ALU_OUT = ZERO OR CURRENT ( 7 ) ,
 M 1 :    alu_in 2 , rand 2   alu_op 5   src_frame 0 , r_source 7 ,
485 1 :  SOURCE ( OFF_ALU_LS_16 ) TO NAME_BUS ( NAME_TRAP )
 M 1 :  nh_ctrl 0   dev_cmd 117
486 1 :  ;
487 1 :  WITH CURRENT ( 0 ) ,
 M 1 :    src_frame 0 , r_source 0 ,
488 1 :  LOAD_AON ( CURRENT ( 0 ) ) WITH 0 ,
 M 1 :  dest_frame 0 , r_dest 0 , r_w 1   a_in   0 ,
489 1 :  IF AON_NE_0 THEN GOTO SD_SL_WEIRD_1
 M 1 :  test  4 , polarity 1   nac 4 , lit8  SD_SL_WEIRD_1
489 1 :  ;
491 1 :  SD_SL_WEIRD_5 :
492 1 :  OFF_ALU_OUT = ZERO OR CURRENT ( 5 ) ,
 M 1 :    alu_in 2 , rand 2   alu_op 5   src_frame 0 , r_source 5 ,
493 1 :  LOAD ( ACCUMULATOR ) WITH OFFSET
 M 1 :  a_w 1 , o_in    3
493 1 :  ;
495 1 :  LOAD_AON ( PREVIOUS ( 0 ) ) WITH 1 CURRENT ( 4 ) ,
 M 1 :  dest_frame 3 , r_dest 0 , r_w 1   a_in   1 src_frame
 M 1 :  0 , r_source 4 ,
496 1 :  FIU ( RIGHT , SIGN ) ,
 M 1 :  rand 5
497 1 :  CASE ON ACC_BYTE ( 0 ) MASK #1C9 ROTATE ( 6 )
 M 1 :  nac 3   srce 4   mask #1C9  sc 1
497 1 :  ;
500 1 :  LOAD_AON ( PREVIOUS ( 0 ) ) WITH 1 PREVIOUS ( 0 ) ,
 M 1 :  dest_frame 3 , r_dest 0 , r_w 1   a_in   1 src_frame
 M 1 :  3 , r_source 0 ,
501 1 :  FIU ( RIGHT , ZERO ) ,
 M 1 :  rand 4
502 1 :  LONG_GOTO SD_SL_WEIRD_100
 M 1 :  nac 6 , lit14  SD_SL_WEIRD_100
502 1 :  ;
505 1 :  LOAD_AON ( PREVIOUS ( 0 ) ) WITH 1 PREVIOUS ( 0 ) ,
 M 1 :  dest_frame 3 , r_dest 0 , r_w 1   a_in   1 src_frame
 M 1 :  3 , r_source 0 ,
506 1 :  FIU ( RIGHT , ZERO ) ,
 M 1 :  rand 4
507 1 :  LONG_GOTO SD_SL_WEIRD_101
 M 1 :  nac 6 , lit14  SD_SL_WEIRD_101
507 1 :  ;
510 1 :  LOAD_AON ( PREVIOUS ( 0 ) ) WITH 1 PREVIOUS ( 0 ) ,
 M 1 :  dest_frame 3 , r_dest 0 , r_w 1   a_in   1 src_frame
 M 1 :  3 , r_source 0 ,
511 1 :  FIU ( RIGHT , ZERO ) ,
 M 1 :  rand 4
512 1 :  LONG_GOTO SD_SL_WEIRD_110
 M 1 :  nac 6 , lit14  SD_SL_WEIRD_110
512 1 :  ;
515 1 :  LOAD_AON ( PREVIOUS ( 0 ) ) WITH 1 PREVIOUS ( 0 ) ,
 M 1 :  dest_frame 3 , r_dest 0 , r_w 1   a_in   1 src_frame
 M 1 :  3 , r_source 0 ,
516 1 :  FIU ( RIGHT , ZERO ) ,
 M 1 :  rand 4
517 1 :  LONG_GOTO SD_SL_WEIRD_111
 M 1 :  nac 6 , lit14  SD_SL_WEIRD_111
517 1 :  ;
520 1 :  SD_SL_WEIRD_100 :
521 1 :  READ TO ACCUMULATOR USING DESCRIPTOR CURRENT ( 4
521 1 :  ) CON_LENGTH ( 32 ) ,
 M 1 :  mem 1   md 1   db_ctrl 0  src_frame 0 , r_source 4  len_ctrl 6 ,
522 1 :  SOURCE ( DESCRIPTOR CURRENT ( 4 ) )
 M 1 :  nh_ctrl 0   src_frame 0 , r_source 4
523 1 :  TO DESCRIPTOR_BUS ( NAME_CACHE_0 ( NAME_TRAP ) ) ,
 M 1 :    dev_cmd 48 , nh_ctrl 2
524 1 :  LOAD_AON ( CURRENT ( 4 ) ) WITH 0 ,
 M 1 :  dest_frame 0 , r_dest 4 , r_w 1   a_in   0 ,
```

```
525 1 : LONG_GOTO SD_SL_WEIRD_IND
  M 1 : nac 6 , lit14   SD_SL_WEIRD_IND
525 1 : ;
528 1 : SD_SL_WEIRD_101 :
529 1 : READ TO ACCUMULATOR USING OFF_ALU WITH CURRENT (
529 1 : 6 ) CON_LENGTH ( 32 ) ,
  M 1 : mem 1    md 1    db_ctrl 1    src_frame 0 , r_source
  M 1 : 6  len_ctrl 6           ,
530 1 : OFF_ALU_OUT = BIASED_LENGTH PLUS CURRENT ( 6 ) ,
  M 1 :    alu_in 1   alu_op 3  src_frame 0 , r_source 6 ,
531 1 : LOAD_AON ( CURRENT ( 6 ) ) WITH 0 ,
  M 1 : dest_frame 0 , r_dest 6 , r_w 1   a_in    0 ,
532 1 : LONG_GOTO SD_SL_W_101_A
  M 1 : nac 6 , lit14   SD_SL_W_101_A
532 1 : ;
535 1 : SD_SL_WEIRD_110 :
536 1 : READ TO ACCUMULATOR USING OFF_ALU WITH CURRENT (
536 1 : 6 ) CON_LENGTH ( 32 ) ,
  M 1 : mem 1    md 1    db_ctrl 1    src_frame 0 , r_source
  M 1 : 6  len_ctrl 6           ,
537 1 : OFF_ALU_OUT = BIASED_LENGTH PLUS CURRENT ( 6 ) ,
  M 1 :    alu_in 1   alu_op 3  src_frame 0 , r_source 6 ,
538 1 : LOAD_AON ( CURRENT ( 6 ) ) WITH 0 ,
  M 1 : dest_frame 0 , r_dest 6 , r_w 1   a_in    0 ,
539 1 : LONG_GOTO SD_SL_W_110_A
  M 1 : nac 6 , lit14   SD_SL_W_110_A
539 1 : ;
542 1 : SD_SL_WEIRD_111 :
543 1 : READ TO ACCUMULATOR USING OFF_ALU WITH CURRENT (
543 1 : 6 ) CON_LENGTH ( 32 ) ,
  M 1 : mem 1    md 1    db_ctrl 1    src_frame 0 , r_source
  M 1 : 6  len_ctrl 6           ,
544 1 : OFF_ALU_OUT = BIASED_LENGTH PLUS CURRENT ( 6 ) ,
  M 1 :    alu_in 1   alu_op 3  src_frame 0 , r_source 6 ,
545 1 : LOAD_AON ( CURRENT ( 6 ) ) WITH 0 ,
  M 1 : dest_frame 0 , r_dest 6 , r_w 1   a_in    0 ,
546 1 : LONG_GOTO SD_SL_W_111_A
  M 1 : nac 6 , lit14   SD_SL_W_111_A
546 1 : ;
548 1 : SD_SL_WEIRD_IND :
549 1 : SOURCE ( DESCRIPTOR PREVIOUS ( 0 ) )
  M 1 : db_ctrl 0   src_frame 3 , r_source 0
550 1 : TO DESCRIPTOR_BUS ( NAME_CACHE_2 ( NAME_TRAP ) ) ,
  M 1 :   dev_cmd 50 , nb_ctrl 2          ,
551 1 : LOAD_AON ( CURRENT ( 6 ) ) WITH 0 ,
  M 1 : dest_frame 0 , r_dest 6 , r_w 1   a_in    0 ,
552 1 : CASE ON ACC_BYTE ( 0 ) MASK 980W ROTATE ( 1 )
  M 1 : nac 3    srce 4    mask   980w sc 6
552 1 : ;
555 1 : SOURCE ( DESCRIPTOR PREVIOUS ( 0 ) )
  M 1 : db_ctrl 0   src_frame 3 , r_source 0
556 1 : TO DESCRIPTOR_BUS ( NAME_CACHE_1 ( NAME_TRAP ) ) ,
  M 1 :   dev_cmd 49 , nb_ctrl 2          ,
557 1 : OFF_ALU_OUT = ACC PLUS PREVIOUS ( 0 ) ,
  M 1 :    alu_in 2   alu_op 3  src_frame 3 , r_source 0 ,
558 1 : LOAD_OFF ( PREVIOUS ( 0 ) ) WITH OFFSET ,
  M 1 : dest_frame 3 , r_dest 0 , r_w 1   o_in    3 ,
559 1 : LOAD_AON ( PREVIOUS ( 0 ) ) WITH AON ( PREVIOUS ( 0 ) ) ,
  M 1 : dest_frame 3 , r_dest 0 , r_w 1   a_in    2 , src_frame
  M 1 : 3 , r_source 0    ,
560 1 : LOAD ( ACCUMULATOR ) WITH OFFSET ,
  M 1 : a_w 1 , o_in    3 ,
561 1 : RETURN
  M 1 : nac 2
561 1 : ;
564 1 : SOURCE ( DESCRIPTOR CURRENT ( 4 ) )
  M 1 : db_ctrl 0   src_frame 0 , r_source 4
565 1 : TO DESCRIPTOR_BUS ( NAME_CACHE_1 ( NAME_TRAP ) ) ,
  M 1 :   dev_cmd 49 , nb_ctrl 2          ,
566 1 : OFF_ALU_OUT = ZERO OR CURRENT ( 4 ) ,
  M 1 :    alu_in 2 , rand 2  alu_op 5  src_frame 0 , r_source 4 ,
567 1 : LOAD_OFF ( CURRENT ( 7 ) ) WITH OFFSET
```

```
  M 1 : dest_frame 0 , r_dest 7 , r_w 1  o_in   3
567 1 : ;
569 1 : LOAD_AON ( CURRENT ( 7 ) ) WITH AON ( PREVIOUS ( 0 ) ) ,
  M 1 : dest_frame 0 , r_dest 7 , r_w 1  a_in   2 , src_frame
  M 1 : 3 , r_source 0    ,
570 1 : LONG_CALL PTR_TO_DESC * READ_STARTED
  M 1 : nac 7 , lit14  PTR_TO_DESC * READ_STARTED
570 1 : ;
572 1 : LOAD_OFF ( CURRENT ( 6 ) ) WITH AON ( PREVIOUS ( 0 ) ) ;
  M 1 : dest_frame 0 , r_dest 6 , r_w 1  o_in   2 , src_frame
  M 1 : 3 , r_source 0    ,
573 1 : LONG_GOTO RESOLVER_TRAPS * RES_A_IND_DONE
  M 1 : nac 6 , lit14  RESOLVER_TRAPS * RES_A_IND_DONE
573 1 : ;
575 1 : SD_SL_W_101_A :
576 1 : OFF_ALU_OUT = ACC OR COMMON ( aRa , 0 ) ,
  M 1 :    alu_in 2  alu_op 5  src_frame 2 , r_source 0 , com_ext aaa .
577 1 : LOAD_OFF ( CURRENT ( 1 ) ) WITH OFFSET ,
  M 1 : dest_frame 0 , r_dest 1 , r_w 1  o_in   3 ,
578 1 : LOAD_LEN ( CURRENT ( 1 ) ) WITH LITERAL ( CON_LENGTH ( 32 ) ) .
  M 1 : dest_frame 0 , r_dest 1 , r_w 1  l_in   1 , len_ctrl 6
579 1 : CASE ON ACC_BYTE ( 2 ) MASK aRaa ROTATE ( 1 )
  M 1 : nac 3   srce 6   mask aaaw sc 6
579 1 : ;
582 1 : OFF_ALU_OUT = ZERO OR CURRENT ( 4 ) , LOAD_OFF (
582 1 : CURRENT ( 2 ) ) WITH OFFSET , LOAD_LEN ( CURRENT ( 2 ) )
  M 1 :    alu_in 2 , rand 2  alu_op 5  src_frame 0 , r_source
  M 1 : 4 , dest_frame 0 , r_dest 2 , r_w 1  o_in   3 ,
  M 1 : dest_frame 0 , r_dest 2 , r_w 1  l_in
582 1 : WITH LEN ( CURRENT ( 4 ) ) , LOAD_AON ( CURRENT (
582 1 : 2 ) ) WITH AON ( CURRENT ( 4 ) )
  M 1 : 2 , src_frame 0 , r_source 4    , dest_frame 0 ,
  M 1 : r_dest 2 , r_w 1  a_in   2 , src_frame 0 , r_source 4
582 1 : ,
583 1 : LONG_GOTO SD_SL_W_END_1
  M 1 : nac 6 , lit14  SD_SL_W_END_1
583 1 : ;
586 1 : OFF_ALU_OUT = ACC XOR COMMON ( aca , 6 ) ,
  M 1 :    alu_in 2  alu_op 4  src_frame 2 , r_source 6 , com_ext aca .
587 1 : LOAD_OFF ( CURRENT ( 1 ) ) WITH OFFSET ,
  M 1 : dest_frame 0 , r_dest 1 , r_w 1  o_in   3 ,
588 1 : LOAD_LEN ( CURRENT ( 1 ) ) WITH LITERAL ( LIT_LENGTH ( 34 ) )
  M 1 : dest_frame 0 , r_dest 1 , r_w 1  l_in   1 , len_ctrl
  M 1 : 15 , lit8 34 , nac 4 , test 15 , polarity 0
588 1 : ;
590 1 : OFF_ALU_OUT = ONE PLUS CURRENT ( 1 ) ,
  M 1 :    alu_in 2 , rand 3  alu_op 3  src_frame 0 , r_source 1 .
591 1 : LOAD_OFF ( CURRENT ( 1 ) ) WITH OFFSET ,
  M 1 : dest_frame 0 , r_dest 1 , r_w 1  o_in   3 ,
592 1 : LONG_GOTO SD_SL_W_END
  M 1 : nac 6 , lit14  SD_SL_W_END
592 1 : ;
594 1 : SD_SL_W_111_A :
595 1 : OFF_ALU_OUT = ACC OR COMMON ( aRa , 0 ) ,
  M 1 :    alu_in 2  alu_op 5  src_frame 2 , r_source 0 , com_ext aaa .
596 1 : LOAD_OFF ( CURRENT ( 1 ) ) WITH OFFSET ,
  M 1 : dest_frame 0 , r_dest 1 , r_w 1  o_in   3 ,
597 1 : LOAD_LEN ( CURRENT ( 1 ) ) WITH OFF ,
  M 1 : dest_frame 0 , r_dest 1 , r_w 1  l_in   3 , dh_ctrl 1   ,
598 1 : LONG_GOTO SD_SL_W_END
  M 1 : nac 6 , lit14  SD_SL_W_END
598 1 : ;
600 1 : SD_SL_W_110_A :
601 1 : OFF_ALU_OUT = ACC OR COMMON ( aRa , 0 ) ,
  M 1 :    alu_in 2  alu_op 5  src_frame 2 , r_source 0 , com_ext aaa .
602 1 : LOAD_OFF ( CURRENT ( 1 ) ) WITH OFFSET ,
  M 1 : dest_frame 0 , r_dest 1 , r_w 1  o_in   3 ,
603 1 : LOAD_LEN ( CURRENT ( 1 ) ) WITH LITERAL ( LIT_LENGTH ( 36 ) )
  M 1 : dest_frame 0 , r_dest 1 , r_w 1  l_in   1 , len_ctrl
  M 1 : 15 , lit8 36 , nac 4 , test 15 , polarity 0
603 1 : ;
605 1 : SD_SL_W_END :
```

```
606 1 : OFF_ALU_OUT = ZERO OR CURRENT ( 4 ) , LOAD_OFF (
606 1 : CURRENT ( 2 ) ) WITH OFFSET , LOAD_LEN ( CURRENT ( 2 ) )
  M 1 :    alu_in 2 , rand 2  alu_op 5  src_frame 0 , r_source
  M 1 : 4 , dest_frame 0 , r_dest 2 , r_w 1  o_in   3 ,
  M 1 : dest_frame 0 , r_dest 2 , r_w 1  l_in
606 1 : WITH LEN ( CURRENT ( 4 ) ) , LOAD_AON ( CURRENT (
606 1 : 2 ) ) WITH AON ( CURRENT ( 4 ) )
  M 1 : 2 , src_frame 0 , r_source 4   , dest_frame 0 ,
  M 1 : r_dest 2 , r_w 1  a_in   2 , src_frame 0 , r_source 4
606 1 : ;
608 1 : SD_SL_W_END_1 :
609 1 : LOAD_OFF ( CURRENT ( 4 ) ) WITH JPD ( LEN ( PREVIOUS ( 0 ) ) ) ,
  M 1 : dest_frame 0 , r_dest 4 , r_w 1  o_in   3 , src_frame
  M 1 : 3 , r_source 0  , jpd_ctrl 6 ,
610 1 : LOAD_AON ( CURRENT ( 4 ) ) WITH 0
  M 1 : dest_frame 0 , r_dest 4 , r_w 1  a_in    0
610 1 : ;
612 1 : OFF_ALU_OUT = LIT32 ( a50000000a ) OR CURRENT ( 4 ) ,
  M 1 :    alu_in 3 , l 1 , lit32 a50000000a  alu_op 5  src_frame
  M 1 : 0 , r_source 4 ,
613 1 : LOAD_OFF ( CURRENT ( 4 ) ) WITH OFFSET
  M 1 : dest_frame 0 , r_dest 4 , r_w 1  o_in    3
613 1 : ;
615 1 : SOURCE ( DESCRIPTOR CURRENT ( 4 ) )
  M 1 : db_ctrl 0   src_frame 0 , r_source 4
616 1 : TO DESCRIPTOR_BUS ( NAME_CACHE_0 ( NAME_TRAP ) )
  M 1 :  dev_cmd 48 , nb_ctrl 2
616 1 : ;
618 1 : SOURCE ( DESCRIPTOR CURRENT ( 1 ) )
  M 1 : db_ctrl 0   src_frame 0 , r_source 1
619 1 : TO DESCRIPTOR_BUS ( NAME_CACHE_1 ( NAME_TRAP ) )
  M 1 :  dev_cmd 49 , nb_ctrl 2
619 1 : ;
621 1 : READ TO ACCUMULATOR USING DESCRIPTOR CURRENT ( 2
621 1 : ) CON_LENGTH ( 32 ) ,
  M 1 : mem 1   md 1   db_ctrl 0  src_frame 0 , r_source 2  len_ctrl 6
622 1 : SOURCE ( DESCRIPTOR CURRENT ( 2 ) )
  M 1 : db_ctrl 0   src_frame 0 , r_source 2
623 1 : TO DESCRIPTOR_BUS ( NAME_CACHE_2 ( NAME_TRAP ) )
  M 1 :  dev_cmd 50 , nb_ctrl 2
623 1 : ;
625 1 : SOURCE ( DESCRIPTOR PREVIOUS ( 0 ) )
  M 1 : db_ctrl 0   src_frame 3 , r_source 0
626 1 : TO DESCRIPTOR_BUS ( NAME_CACHE_3 ( NAME_TRAP ) ) ,
  M 1 :  dev_cmd 51 , nb_ctrl 2    ,
627 1 : LONG_GOTO L_V_BASE_ENC_IN
  M 1 : nac 0 , lit14  L_V_BASE_ENC_IN
627 1 : ;
630 1 : LD_SL_BASE0 :
631 1 : OFF_ALU_OUT = NAME_TRAP ( ZERO_EXTEND ) OR COMMON ( 2 , 6 ) ,
  M 1 :    alu_in 2 , nb_ctrl 2 , dev_cmd 4   alu_op 5  src_frame
  M 1 : 2 , r_source 6 , com_ext 2 ,
632 1 : LOAD_OFF ( CURRENT ( 7 ) ) WITH OFFSET ,
  M 1 : dest_frame 0 , r_dest 7 , r_w 1  o_in   3 ,
633 1 : LOAD_LEN ( CURRENT ( 7 ) ) WITH LEN ( COMMON ( 2 , 6 ) ) ,
  M 1 : dest_frame 0 , r_dest 7 , r_w 1  l_in   2 , src_frame
  M 1 : 2 , r_source 6 , com_ext 2 ,
634 1 : IF NOT_CC THEN GOTO LD_SL_WEIRD
  M 1 : test 13 , polarity 0  nac 4 , lit8  LD_SL_WEIRD
634 1 : ;
636 1 : OFF_ALU_OUT = ACC AND COMMON ( aCa , 6 ) ,
  M 1 :    alu_in 2  alu_op 6  src_frame 2 , r_source 6 , com_ext aCa ,
637 1 : SOURCE ( OFF_ALU_LS_16 ) TO NAME_BUS ( NAME_TRAP ) ,
  M 1 : nb_ctrl 0    dev_cmd 117 ,
638 1 : LOAD_OFF ( CURRENT ( 2 ) ) WITH OFFSET ,
  M 1 : dest_frame 0 , r_dest 2 , r_w 1  o_in    3 ,
639 1 : CASE ON ACC_BYTE ( 2 ) MASK a80a ROTATE ( 3 )
  M 1 : nac 3 ' srce 6    mask  a80a sc 4
639 1 : ;
642 1 : RESOLVE ( 0 , NAME_TRAP )
  M 1 : mem 0 , nac 0 , snac 4 , dest_frame 0 , r_dest 0
  M 1 : , r_w 1  , nb_ctrl 2 , l_in 1 , o_in 1 , a_in 1 , a_w 1
```

```
642 1 : ;
644 1 : READ TO ACCUMULATOR USING OFF_ALU WITH CURRENT (
644 1 : 6 ) CON_LENGTH ( 32 ) ,
  M 1 : mem 1    md 1    nb_ctrl 1    src_frame 0 , r_source
  M 1 : 6  len_ctrl 6     ,
645 1 : OFF_ALU_OUT = BIASED_LENGTH PLUS CURRENT ( 6 ) ,
  M 1 :    alu_in 1  alu_op 3  src_frame 0 , r_source 6 ,
646 1 : LOAD_OFF ( CURRENT ( 6 ) ) WITH OFFSET ,
  M 1 : dest_frame 0 , r_dest 6 , r_w 1  o_in   3 ,
647 1 : LOAD_AON ( CURRENT ( 6 ) ) WITH AON ( CURRENT ( 6 ) )
  M 1 : dest_frame 0 , r_dest 6 , r_w 1  a_in   2 , src_frame
  M 1 : 0 , r_source 6
647 1 : ;
649 1 : OFF_ALU_OUT = ZERO OR CURRENT ( 7 ) ,
  M 1 :    alu_in 2 , rand 2  alu_op 5  src_frame 0 , r_source 7 ,
650 1 : SOURCE ( OFF_ALU_LS_16 ) TO NAME_BUS ( NAME_TRAP ) ,
  M 1 : nb_ctrl 0    dev_cmd 117  ,
651 1 : IF LEN_GT_32 THEN GOTO LD_SL_WEIRD_1
  M 1 : test 9 , polarity 0   nac 4 , lit8   LD_SL_WEIRD_1
651 1 : ;
653 1 : OFF_ALU_OUT = ACC PLUS CURRENT ( 0 ) ,
  M 1 :    alu_in 2  alu_op 3  src_frame 0 , r_source 0 ,
654 1 : LOAD_OFF ( PREVIOUS ( 0 ) ) WITH OFFSET ,
  M 1 : dest_frame 3 , r_dest 0 , r_w 1  o_in   3 ,
655 1 : LOAD_AON ( PREVIOUS ( 0 ) ) WITH AON ( CURRENT ( 0 ) ) ,
  M 1 : dest_frame 3 , r_dest 0 , r_w 1  a_in   2 , src_frame
  M 1 : 0 , r_source 0   ,
656 1 : LONG_GOTO SD_SL_BASED_1
  M 1 : nac 6 , lit14  SD_SL_BASED_1
656 1 : ;
659 1 : OFF_ALU_OUT = ZERO OR CURRENT ( 7 ) ,
  M 1 :    alu_in 2 , rand 2  alu_op 5  src_frame 0 , r_source 7 ,
660 1 : SOURCE ( OFF_ALU_LS_16 ) TO NAME_BUS ( NAME_TRAP )
  M 1 : nb_ctrl 0    dev_cmd 117
660 1 : ;
662 1 : LD_SL_WEIRD :
663 1 : OFF_ALU_OUT = LIT16 ( @00FF@ ) AND ACC_HI ,
  M 1 :    alu_in 3 , 1 0 , lit16 @00FF@   alu_op 6  dev_cmd 1 ,
664 1 : LOAD_LEN ( PREVIOUS ( 0 ) ) WITH OFF
  M 1 : dest_frame 3 , r_dest 0 , r_w 1  l_in   3 , ob_ctrl 1
664 1 : ;
666 1 : OFF_ALU_OUT = ACC LEFT_SHIFTED ( 4 ) OR COMMON ( @8@ , 0 ) ,
  M 1 :    alu_in 2  sf 4  alu_op 5  src_frame 2 , r_source
  M 1 : 0 , com_ext @8@ ,
667 1 : LOAD ( ACCUMULATOR ) WITH OFFSET ,
  M 1 : a_w 1 , o_in   3 ,
668 1 : CASE ON ACC_BYTE ( 2 ) MASK @C0@ ROTATE ( 2 )
  M 1 : nac 5   srce 6   mask @C0@ sc 5
668 1 : ;
671 1 : OFF_ALU_OUT = ACC SIGN_EXTEND_LO_ LEFT_SHIFTED (
671 1 : 1 ) PLUS COMMON ( 2 , 1 ) ,
  M 1 :    alu_in 2  dev_cmd 5  sf 1  alu_op 3  src_frame
  M 1 : 2 , r_source 1 , com_ext 2 ,
672 1 : LOAD_OFF ( CURRENT ( 4 ) ) WITH OFFSET ,
  M 1 : dest_frame 0 , r_dest 4 , r_w 1  o_in   3 ,
673 1 : LOAD_AON ( CURRENT ( 4 ) ) WITH AON ( COMMON ( 2 , 1 ) ) ,
  M 1 : dest_frame 0 , r_dest 4 , r_w 1  a_in   2 , src_frame
  M 1 : 2 , r_source 1 , com_ext 2  ,
674 1 : LOAD_LEN ( CURRENT ( 4 ) ) WITH LEN ( COMMON ( 2
674 1 : , 1 ) ) CON_LENGTH ( 1 , INC )
  M 1 : dest_frame 0 , r_dest 4 , r_w 1  l_in   2 , src_frame
  M 1 : 2 , r_source 1 , com_ext 2   len_ctrl 8
674 1 : ,
675 1 : LONG_GOTO LD_SL_WEIRD_2
  M 1 : nac 6 , lit14  LD_SL_WEIRD_2
675 1 : ;
678 1 : OFF_ALU_OUT = ACC SIGN_EXTEND_LO_ LEFT_SHIFTED (
678 1 : 1 ) PLUS COMMON ( 2 , 2 ) ,
  M 1 :    alu_in 2  dev_cmd 5  sf 1  alu_op 3  src_frame
  M 1 : 2 , r_source 2 , com_ext 2 ,
679 1 : LOAD_OFF ( CURRENT ( 4 ) ) WITH OFFSET ,
  M 1 : dest_frame 0 , r_dest 4 , r_w 1  o_in   3 ,
```

```
680 1 : LOAD_AON ( CURRENT ( 0 ) ) WITH AON ( COMMON ( 2 , 2 ) ) ,
  M 1 : dest_frame 0 , r_dest 4 , r_w 1   a_in   2 , src_frame
  M 1 : 2 , r_source 2 , com_ext 2       ,
681 1 : LOAD_LEN ( CURRENT ( 0 ) ) WITH LEN ( COMMON ( 2
681 1 : , 2 ) ) CON_LENGTH ( 1 , INC )
  M 1 : dest_frame 0 , r_dest 4 , r_w 1   l_in   2 , src_frame
  M 1 : 2 , r_source 2 , com_ext 2     len_ctrl 8
681 1 : ,
682 1 : LONG_GOTO LD_SL_WEIRD_2
  M 1 : nac 6 , lit14  LD_SL_WEIRD_2
682 1 : ;                             ,
685 1 : READ TO ACCUMULATOR USING OFF_ALU WITH CURRENT (
685 1 : 6 ) CON_LENGTH ( 32 ) ,
  M 1 : mem 1   md 1   db_ctrl 1   src_frame 0 , r_source
  M 1 : 6  len_ctrl 6      ,
686 1 : OFF_ALU_OUT = BIASED_LENGTH PLUS CURRENT ( 6 ) ,
  M 1 :    alu_in 1   alu_op 3  src_frame 0 , r_source 6  ,
687 1 : LOAD_OFF ( CURRENT ( 6 ) ) WITH OFFSET ,
  M 1 : dest_frame 0 , r_dest 6 , r_w 1   o_in   3 ,
688 1 : LOAD_AON ( CURRENT ( 6 ) ) WITH AON ( CURRENT ( 6 ) ) ,
  M 1 : dest_frame 0 , r_dest 6 , r_w 1   a_in   2 , src_frame
  M 1 : 0 , r_source 6       ,
689 1 : LONG_GOTO LD_SL_WEIRD_3
  M 1 : nac 6 , lit14  LD_SL_WEIRD_3
689 1 : ;
692 1 : READ TO ACCUMULATOR USING OFF_ALU WITH CURRENT (
692 1 : 6 ) CON_LENGTH ( 32 ) ,
  M 1 : mem 1   md 1   db_ctrl 1   src_frame 0 , r_source
  M 1 : 6  len_ctrl 6      ,
693 1 : OFF_ALU_OUT = BIASED_LENGTH PLUS CURRENT ( 6 ) ,
  M 1 :    alu_in 1   alu_op 3  src_frame 0 , r_source 6  ,
694 1 : LOAD_OFF ( CURRENT ( 6 ) ) WITH OFFSET ,
  M 1 : dest_frame 0 , r_dest 6 , r_w 1   o_in   3 ,
695 1 : LOAD_AON ( CURRENT ( 6 ) ) WITH AON ( CURRENT ( 6 ) )
  M 1 : dest_frame 0 , r_dest 6 , r_w 1   a_in   2 , src_frame
  M 1 : 0 , r_source 6
695 1 : ;
697 1 : OFF_ALU_OUT = ACC OR COMMON ( @B@ , 0 ) ,
  M 1 :    alu_in 2   alu_op 5  src_frame 2 , r_source 0 , com_ext @B@  ,
698 1 : LOAD_OFF ( PREVIOUS ( 0 ) ) WITH OFFSET ,
  M 1 : dest_frame 3 , r_dest 0 , r_w 1   o_in   3 ,
699 1 : LONG_GOTO SD_SL_WEIRD_1
  M 1 : nac 6 , lit14  SD_SL_WEIRD_1
699 1 : ;
701 1 : LD_SL_WEIRD_1 :
702 1 : OFF_ALU_OUT = ACC OR COMMON ( @B@ , 0 ) ,
  M 1 :    alu_in 2   alu_op 5  src_frame 2 , r_source 0 , com_ext @B@  ,
703 1 : LOAD_OFF ( PREVIOUS ( 0 ) ) WITH OFFSET
  M 1 : dest_frame 3 , r_dest 0 , r_w 1   o_in   3
703 1 : ;
705 1 : OFF_ALU_OUT = LIT32 ( @00FF0000@ ) AND CURRENT ( 5 ) ,
  M 1 :    alu_in 3 , 1 1 , lit32 @00FF0000@  alu_op 6  src_frame
  M 1 : 0 , r_source 5  ,
706 1 : LOAD ( ACCUMULATOR ) WITH OFFSET
  M 1 : a_w 1 , o_in    3
706 1 : ;
708 1 : OFF_ALU_OUT = ZERO OR ACC_HI ,
  M 1 :    alu_in 2 , rand 2  alu_op 5  dev_cmd 1  ,
709 1 : LOAD_OFF ( CURRENT ( 4 ) ) WITH OFFSET ,
  M 1 : dest_frame 0 , r_dest 4 , r_w 1   o_in   3 ,
710 1 : LONG_GOTO LOAD_WEIRD_BASE
  M 1 : nac 6 , lit14  LOAD_WEIRD_BASE
710 1 : ;
712 1 : LD_SL_WEIRD_2 :
713 1 : READ TO ACCUMULATOR USING OFF_ALU WITH CURRENT (
713 1 : 6 ) CON_LENGTH ( 32 ) ,
  M 1 : mem 1   md 1   db_ctrl 1   src_frame 0 , r_source
  M 1 : 6  len_ctrl 6      ,
714 1 : OFF_ALU_OUT = BIASED_LENGTH PLUS CURRENT ( 6 ) ,
  M 1 :    alu_in 1   alu_op 3  src_frame 0 , r_source 6  ,
715 1 : LOAD_OFF ( CURRENT ( 6 ) ) WITH OFFSET ,
  M 1 : dest_frame 0 , r_dest 6 , r_w 1   o_in   3 ,
```

```
716 1 : LOAD_AON ( CURRENT ( 6 ) ) WITH AON ( CURRENT ( 6 ) )
  M 1 : dest_frame 0 , r_dest 6 , r_w 1  a_in   2 , src_frame
  M 1 : 0 , r_source 6
716 1 : ;
718 1 : OFF_ALU_OUT = ACC OR COMMON ( aBa , 0 ) ,
  M 1 :    alu_in 2  alu_op 5  src_frame 2 , r_source 0 , com_ext aBa    .
719 1 : LOAD_OFF ( PREVIOUS ( 0 ) ) WITH OFFSET ,
  M 1 : dest_frame 3 , r_dest 0 , r_w 1  o_in   3  ,
720 1 : LONG_GOTO SD_SL_WEIRD_5
  M 1 : nac 6 , lit14  SD_SL_WEIRD_5
720 1 : ;
722 1 : LD_SL_WEIRD_3 :
723 1 : OFF_ALU_OUT = ACC OR COMMON ( aBa , 0 ) ,
  M 1 :    alu_in 2  alu_op 5  src_frame 2 , r_source 0 , com_ext aBa   .
724 1 : LOAD_OFF ( PREVIOUS ( 0 ) ) WITH OFFSET ,
  M 1 : dest_frame 3 , r_dest 0 , r_w 1  o_in   3  ,
725 1 : LONG_GOTO SD_SL_WEIRD_4
  M 1 : nac 6 , lit14  SD_SL_WEIRD_4
725 1 : ;
728 1 : SD_LL_BASED :
729 1 : OFF_ALU_OUT = NAME_TRAP ( ZERO_EXTEND ) OR COMMON ( aBa , 0 ) .
  M 1 :    alu_in 2 , nb_ctrl 2 , dev_cmd 4  alu_op 5  src_frame
  M 1 : 2 , r_source 0 , com_ext aBa  ,
730 1 : LOAD_OFF ( CURRENT ( 7 ) ) WITH OFFSET ,
  M 1 : dest_frame 0 , r_dest 7 , r_w 1  o_in   3  ,
731 1 : IF NOT_CC THEN GOTO SD_LL_WEIRD
  M 1 : test  13 , polarity 0  nac 4 , lit8  SD_LL_WEIRD
731 1 : ;
733 1 : OFF_ALU_OUT = ACC AND COMMON ( aCa , 6 ) ,
  M 1 :    alu_in 2  alu_op 6  src_frame 2 , r_source 6 , com_ext aCa   .
734 1 : SOURCE ( OFF_ALU_LS_16 ) TO NAME_BUS ( NAME_TRAP ) ,
  M 1 : nb_ctrl 0   dev_cmd 117   ,
735 1 : LOAD_OFF ( CURRENT ( 2 ) ) WITH OFFSET ,
  M 1 : dest_frame 0 , r_dest 2 , r_w 1  o_in   3  ,
736 1 : CASE ON ACC_BYTE ( 2 ) MASK aR0a ROTATE ( 3 )
  M 1 : nac 3  srce 6   mask  ad0a sc 4
736 1 : ;
739 1 : RESOLVE ( 0 , NAME_TRAP )
  M 1 : mem 0 , nac 0 , snac 4 , dest_frame 0 , r_dest 0
  M 1 : , r_w 1   , nb_ctrl 2 , l_in 1 , o_in 1 , a_in 1 , a_w 1
739 1 : ;
741 1 : OFF_ALU_OUT = ZERO OR CURRENT ( 7 ) ,
  M 1 :    alu_in 2 , rand 2  alu_op 5  src_frame 0 , r_source 7  ,
742 1 : SOURCE ( OFF_ALU_LS_16 ) TO NAME_BUS ( NAME_TRAP )
  M 1 : nb_ctrl 0   dev_cmd 117
742 1 : ;
744 1 : OFF_ALU_OUT = ZERO OR CURRENT ( 0 ) ,
  M 1 :    alu_in 2 , rand 2  alu_op 5  src_frame 0 , r_source 0  ,
745 1 : LOAD_OFF ( PREVIOUS ( 0 ) ) WITH OFFSET ,
  M 1 : dest_frame 3 , r_dest 0 , r_w 1  o_in   3  ,
746 1 : LOAD_AON ( PREVIOUS ( 0 ) ) WITH AON ( CURRENT ( 0 ) )
  M 1 : dest_frame 3 , r_dest 0 , r_w 1  a_in   2 , src_frame
  M 1 : 0 , r_source 0
746 1 : ;
748 1 : SD_LL_BASED_1 :
749 1 : OFF_ALU_OUT = ZERO OR CURRENT ( 5 ) ,
  M 1 :    alu_in 2 , rand 2  alu_op 5  src_frame 0 , r_source 5  .
750 1 : LOAD ( ACCUMULATOR ) WITH OFFSET ,
  M 1 : a_w 1 , o_in   3  ,
751 1 : LOAD_AON ( CURRENT ( 0 ) ) WITH 0 ,
  M 1 : dest_frame 0 , r_dest 0 , r_w 1  a_in   0 ,
752 1 : WITH CURRENT ( 5 ) ,
  M 1 :   src_frame 0 , r_source 5  ,
753 1 : IF LEN_LE_32 THEN GOTO SD_LL_ABR
  M 1 : test  9 , polarity 1  nac 4 , lit8  SD_LL_ABR
753 1 : ;
756 1 : OFF_ALU_OUT = ZERO OR CURRENT ( 7 ) ,
  M 1 :    alu_in 2 , rand 2  alu_op 5  src_frame 0 , r_source 7  .
757 1 : SOURCE ( OFF_ALU_LS_16 ) TO NAME_BUS ( NAME_TRAP ) ,
  M 1 : nb_ctrl 0   dev_cmd 117   ,
758 1 : LONG_GOTO SD_LL_WEIRD_1
  M 1 : nac 6 , lit14  SD_LL_WEIRD_1
758 1 : ;
```

```
760 1 : SD_LL_WEIRD :
761 1 : UFF_ALU_OUT = ACC ZERO_HI OR COMMON ( @B@ , 0 ) ,
  M 1 :    alu_in 2  dev_cmd 3  alu_op 5  src_frame 2 , r_source
  M 1 : 0 , com_ext @B@ ,
762 1 : LOAD_OFF ( CURRENT ( 2 ) ) WITH OFFSET
  M 1 : dest_frame 0 , r_dest 2 , r_w 1  o_in    3
762 1 : ;
764 1 : SD_LL_WEIRD_1 :
765 1 : UFF_ALU_OUT = ZEROS ,
  M 1 :    alu_op 0 ,
766 1 : LOAD_OFF ( PREVIOUS ( 0 ) ) WITH OFFSET
  M 1 : dest_frame 3 , r_dest 0 , r_w 1  o_in    3
766 1 : ;
768 1 : SD_LL_WEIRD_2 :
769 1 : READ TO ACCUMULATOR USING UFF_ALU WITH CURRENT (
769 1 : 6 ) COM_LENGTH ( 32 ) ,
  M 1 : mem 1   md 1   nb_ctrl 1   src_frame 0 , r_source
  M 1 : 6   len_ctrl 6
770 1 : UFF_ALU_OUT = BIASED_LENGTH PLUS CURRENT ( 6 ) ,
  M 1 :    alu_in 1   alu_op 3  src_frame 0 , r_source 6 ,
771 1 : LOAD_OFF ( CURRENT ( 6 ) ) WITH OFFSET ,
  M 1 : dest_frame 0 , r_dest 6 , r_w 1  o_in    3 ,
772 1 : LOAD_ADM ( CURRENT ( 6 ) ) WITH ADM ( CURRENT ( 6 ) ) ,
  M 1 : dest_frame 0 , r_dest 6 , r_w 1  a_in    2 , src_frame
  M 1 : 0 , r_source 6 ,
773 1 : CASE ON ACC_BYTE ( 1 ) MASK @R0@ ROTATE ( 1 )
  M 1 : nac 5   srce 5    mask  @R0@  sc 6
775 1 : ;
776 1 : UFF_ALU_OUT = ACC ZERO_HI OR COMMON ( @B@ , 0 ) ,
  M 1 :    alu_in 2  dev_cmd 3  alu_op 5  src_frame 2 , r_source
  M 1 : 0 , com_ext @B@ ,
777 1 : LOAD_OFF ( CURRENT ( 4 ) ) WITH OFFSET ,
  M 1 : dest_frame 0 , r_dest 4 , r_w 1  o_in    3 ,
778 1 : LONG_GOTO SD_LL_WEIRD_3
  M 1 : nac 6 , lit14  SD_LL_WEIRD_3
778 1 : ;
781 1 : UFF_ALU_OUT = ACC ZERO_HI OR COMMON ( @C@ , 5 ) ,
  M 1 :    alu_in 2  dev_cmd 3  alu_op 5  src_frame 2 , r_source
  M 1 : 5 , com_ext @C@ ,
782 1 : LOAD_OFF ( CURRENT ( 4 ) ) WITH OFFSET
  M 1 : dest_frame 0 , r_dest 4 , r_w 1  o_in    3
782 1 : ;
784 1 : SD_LL_WEIRD_3 :
785 1 : UFF_ALU_OUT = ACC ZERO_LO AND COMMON ( @D@ , 6 ) ,
  M 1 :    alu_in 2  dev_cmd 2  alu_op 6  src_frame 2 , r_source
  M 1 : 6 , com_ext @D@ ,
786 1 : IF OFF_EW_0 THEN GOTO SD_LL_WEIRD_4
  M 1 : test 0 , polarity 0   nac 4 , lit8  SD_LL_WEIRD_4
786 1 : ;
788 1 : UFF_ALU_OUT = LIT32 ( @00DF0000@ ) OR COMMON ( @B@ , 0 ) ,
  M 1 :    alu_in 3 , 1 1 , lit32 @00DF0000@  alu_op 5  src_frame
  M 1 : 2 , r_source 0 , com_ext @B@ ,
789 1 : LOAD ( ACCUMULATOR ) WITH OFFSET
  M 1 : a_w 1 , o_in    3
789 1 : ;
791 1 : SD_LL_WEIRD_4 :
792 1 : UFF_ALU_OUT = ACC ZERO_LO LEFT_SHIFTED ( 2 ) OR CURRENT ( 2 ) ,
  M 1 :    alu_in 2  dev_cmd 2  sf 2  alu_op 5  src_frame 0 , r_source 2 ,
793 1 : LOAD_OFF ( CURRENT ( 2 ) ) WITH OFFSET ,
  M 1 : dest_frame 0 , r_dest 2 , r_w 1  o_in    3 ,
794 1 : LONG_GOTO LOAD_WEIRD_BASE
  M 1 : nac 6 , lit14  LOAD_WEIRD_BASE
794 1 : ;
797 1 : LD_LL_BASED :
798 1 : UFF_ALU_OUT = NAME_TRAP ( ZERO_EXTEND ) OR COMMON ( 2 , 6 ) ,
  M 1 :    alu_in 2 , nb_ctrl 2 , dev_cmd 4  alu_op 5  src_frame
  M 1 : 2 , r_source 6 , com_ext 2 ,
799 1 : LOAD_OFF ( CURRENT ( 7 ) ) WITH OFFSET ,
  M 1 : dest_frame 0 , r_dest 7 , r_w 1  o_in    3 ,
800 1 : LOAD_LEN ( CURRENT ( 7 ) ) WITH LEN ( COMMON ( 2 , 6 ) ) ,
  M 1 : dest_frame 0 , r_dest 7 , r_w 1  l_in    2 , src_frame
  M 1 : 2 , r_source 6 , com_ext 2 ,
801 1 : IF NOT_CC THEN GOTO LD_LL_WEIRD
```

```
  M 1 : test  13 , polarity 0    nac 4 , lit8  LD_LL_WEIRD
801 1 : ;
803 1 : OFF_ALU_OUT = ACC AND COMMON ( @C@ , 6 ) ,
  M 1 :   alu_in 2  alu_op 6  src_frame 2 , r_source 6 , com_ext @C@ ,
804 1 : SOURCE ( OFF_ALU_LS_16 ) TO NAME_BUS ( NAME_TRAP ) ,
  M 1 : nb_ctrl 0    dev_cmd 117  ,
805 1 : LOAD_OFF ( CURRENT ( 2 ) ) WITH OFFSET ,
  M 1 : dest_frame 0 , r_dest 2 , r_w 1  o_in   3 ,
806 1 : CASE ON ACC_BYTE ( 2 ) MASK @80@ ROTATE ( 3 )
  M 1 : nac 3   srce 6   mask @80@ sc 4
806 1 : ;
809 1 : RESOLVE ( 0 , NAME_TRAP )
  M 1 : mem 0 , nac 0 , snac 4 , dest_frame 0 , r_dest 0
  M 1 : , r_w 1 , nb_ctrl 2 , l_in 1 , o_in 1 , a_in 1 , a_w 1
809 1 : ;
811 1 : READ TO ACCUMULATOR USING OFF_ALU WITH CURRENT (
811 1 : 6 ) CON_LENGTH ( 32 ) ,
  M 1 : mem 1   md 1   nb_ctrl 1   src_frame 0 , r_source
  M 1 : 6   len_ctrl 6   ,
812 1 : OFF_ALU_OUT = BIASED_LENGTH PLUS CURRENT ( 6 ) ,
  M 1 :   alu_in 1  alu_op 3  src_frame 0 , r_source 6 ,
813 1 : LOAD_OFF ( CURRENT ( 6 ) ) WITH OFFSET ,
  M 1 : dest_frame 0 , r_dest 6 , r_w 1  o_in   3 ,
814 1 : LOAD_AON ( CURRENT ( 6 ) ) WITH AON ( CURRENT ( 6 ) )
  M 1 : dest_frame 0 , r_dest 6 , r_w 1  a_in   2 , src_frame
  M 1 : 0 , r_source 6
814 1 : ;
816 1 : OFF_ALU_OUT = ZERO OR CURRENT ( 7 ) ,
  M 1 :   alu_in 2 , rand 2  alu_op 5  src_frame 0 , r_source 7 ,
817 1 : SOURCE ( OFF_ALU_LS_16 ) TO NAME_BUS ( NAME_TRAP ) ,
  M 1 : nb_ctrl 0    dev_cmd 117  ,
818 1 : IF LEN_GT_32 THEN GOTO LD_LL_WEIRD_2
  M 1 : test  9 , polarity 0    nac 4 , lit8 LD_LL_WEIRD_2
818 1 : ;
820 1 : OFF_ALU_OUT = ACC PLUS CURRENT ( 0 ) ,
  M 1 :   alu_in 2  alu_op 3  src_frame 0 , r_source 0 ,
821 1 : LOAD_OFF ( PREVIOUS ( 0 ) ) WITH OFFSET ,
  M 1 : dest_frame 3 , r_dest 0 , r_w 1  o_in   3 ,
822 1 : LOAD_AON ( PREVIOUS ( 0 ) ) WITH AON ( CURRENT ( 0 ) ) ,
  M 1 : dest_frame 3 , r_dest 0 , r_w 1  a_in   2 , src_frame
  M 1 : 0 , r_source 0     ,
823 1 : LONG_GOTO SD_LL_BASED_1
  M 1 : nac 6 , lit14 SD_LL_BASED_1
823 1 : ;
826 1 : OFF_ALU_OUT = ZERO OR CURRENT ( 7 ) ,
  M 1 :   alu_in 2 , rand 2  alu_op 5  src_frame 0 , r_source 7 ,
827 1 : SOURCE ( OFF_ALU_LS_16 ) TO NAME_BUS ( NAME_TRAP ) ,
  M 1 : nb_ctrl 0    dev_cmd 117  ,
828 1 : LONG_GOTO LD_LL_WEIRD_1
  M 1 : nac 6 , lit14 LD_LL_WEIRD_1
828 1 : ;
830 1 : LD_LL_WEIRD :
831 1 : OFF_ALU_OUT = ACC ZERO_HI OR COMMON ( @B@ , 0 ) ,
  M 1 :   alu_in 2  dev_cmd 3  alu_op 5  src_frame 2 , r_source
  M 1 : 0 , com_ext @B@ ,
832 1 : LOAD_OFF ( CURRENT ( 2 ) ) WITH OFFSET
  M 1 : dest_frame 0 , r_dest 2 , r_w 1  o_in   3
832 1 : ;
834 1 : LD_LL_WEIRD_1 :
835 1 : READ TO ACCUMULATOR USING OFF_ALU WITH CURRENT (
835 1 : 6 ) CON_LENGTH ( 32 ) ,
  M 1 : mem 1   md 1   nb_ctrl 1   src_frame 0 , r_source
  M 1 : 6   len_ctrl 6   ,
836 1 : OFF_ALU_OUT = BIASED_LENGTH PLUS CURRENT ( 6 ) ,
  M 1 :   alu_in 1  alu_op 3  src_frame 0 , r_source 6 ,
837 1 : LOAD_OFF ( CURRENT ( 6 ) ) WITH OFFSET ,
  M 1 : dest_frame 0 , r_dest 6 , r_w 1  o_in   3 ,
838 1 : LOAD_AON ( CURRENT ( 6 ) ) WITH AON ( CURRENT ( 6 ) )
  M 1 : dest_frame 0 , r_dest 6 , r_w 1  a_in   2 , src_frame
  M 1 : 0 , r_source 6
838 1 : ;
840 1 : LD_LL_WEIRD_2 :
```

```
841 1 : OFF_ALU_OUT = ACC OP COMMON ( vRa , 0 ) ,
  M 1 :    alu_in 2   alu_op 5   src_frame 2 , r_source 0 , com_ext aBa ,
842 1 : LOAD_OFF ( PREVIOUS ( 0 ) ) WITH OFFSET
  M 1 : dest_frame 3 , r_dest 0 , r_w 1  o_in    3
842 1 : ;
844 1 : OFF_ALU_OUT = ZERO OR CURRENT ( S ) ,
  M 1 :    alu_in 2 , rand 2  alu_op 5  src_frame 0 , r_source 5 ,
845 1 : LOAD ( ACCUMULATOR ) WITH OFFSET ,
  M 1 : a_w 1 , o_in    3 ,
846 1 : LONG_GOTO SD_LL_WEIRD_2
  M 1 : nac 6 , lit14  SD_LL_WEIRD_2
846 1 : ;
849 1 : SD_SL_ABR :
850 1 : OFF_ALU_OUT = LIT16 ( a00FFa ) AND ACC_HI ,
  M 1 :    alu_in 3 , 1 0 , lit16 a00FFa   alu_op 6  dev_cmd 1 ,
851 1 : LOAD_LEN ( PREVIOUS ( 0 ) ) WITH OFF ,
  M 1 : dest_frame 3 , r_dest 0 , r_w 1  l_in    3 , db_ctrl 1 ,
852 1 : LOAD_AON ( PREVIOUS ( 0 ) ) WITH AON ( PREVIOUS ( 0 ) )
  M 1 : dest_frame 3 , r_dest 0 , r_w 1   a_in    2 , src_frame
  M 1 : 3 , r_source 0
852 1 : ;
854 1 : SD_SL_ABR_1 :
855 1 : OFF_ALU_OUT = BIASED_LENGTH CON_LENGTH ( 32 ) PLUS CURRENT ( 6 ) ,
  M 1 :    alu_in 1  len_ctrl 6    alu_op 3  src_frame 0 , r_source 6 ,
856 1 : LOAD ( ACCUMULATOR ) WITH OFFSET ,
  M 1 : a_w 1 , o_in    3 ,
857 1 : LOAD_AON ( CURRENT ( 6 ) ) WITH 0 ,
  M 1 : dest_frame 0 , r_dest 0 , r_w 1  a_in    0 ,
858 1 : CASE ON ACC_BYTE ( 0 ) MASK a1Ca ROTATE ( 6 )
  M 1 : nac 3  srce 4   mask a1Ca sc 1
858 1 : ;
861 1 : SOURCE ( DESCRIPTOR PREVIOUS ( 0 ) )
  M 1 : db_ctrl 0   src_frame 3 , r_source 0
862 1 : TO DESCRIPTOR_BUS ( NAME_CACHE_0 ( NAME_TRAP ) ) ,
  M 1 :    dev_cmd 48 , nb_ctrl 2
863 1 : OFF_ALU_OUT = BIASED_LENGTH CON_LENGTH ( 0 ) OR PREVIOUS ( 0 ) ,
  M 1 :    alu_in 1  len_ctrl 0    alu_op 5  src_frame 3 , r_source 0 ,
864 1 : LOAD ( ACCUMULATOR ) WITH OFFSET ,
  M 1 : a_w 1 , o_in    3 ,
865 1 : LOAD_AON ( PREVIOUS ( 0 ) ) WITH 1 PREVIOUS ( 0 ) ,
  M 1 : dest_frame 3 , r_dest 0 , r_w 1  a_in    1 src_frame
  M 1 : 3 , r_source 0 ,
866 1 : FIU ( RIGHT , ZERO ) ,
  M 1 : rand 4 ,
867 1 : RETURN
  M 1 : nac 2
867 1 : ;
870 1 : LOAD_AON ( PREVIOUS ( 0 ) ) WITH 1 PREVIOUS ( 0 ) ,
  M 1 : dest_frame 3 , r_dest 0 , r_w 1  a_in    1 src_frame
  M 1 : 3 , r_source 0 ,
871 1 : FIU ( RIGHT , ZERO ) ,
  M 1 : rand 4 ,
872 1 : LONG_GOTO SD_SL_ABR_101
  M 1 : nac 6 , lit14  SD_SL_ABR_101
872 1 : ;
875 1 : LOAD_AON ( PREVIOUS ( 0 ) ) WITH 1 PREVIOUS ( 0 ) ,
  M 1 : dest_frame 3 , r_dest 0 , r_w 1  a_in    1 src_frame
  M 1 : 3 , r_source 0 ,
876 1 : FIU ( RIGHT , ZERO ) ,
  M 1 : rand 4 ,
877 1 : LONG_GOTO SD_SL_ABR_110
  M 1 : nac 6 , lit14  SD_SL_ABR_110
877 1 : ;
880 1 : LOAD_AON ( PREVIOUS ( 0 ) ) WITH 1 PREVIOUS ( 0 ) ,
  M 1 : dest_frame 3 , r_dest 0 , r_w 1  a_in    1 src_frame
  M 1 : 3 , r_source 0 ,
881 1 : FIU ( RIGHT , ZERO ) ,
  M 1 : rand 4 ,
882 1 : LONG_GOTO SD_SL_ABR_111
  M 1 : nac 6 , lit14  SD_SL_ABR_111
882 1 : ;
885 1 : SOURCE ( DESCRIPTOR PREVIOUS ( 0 ) )
```

```
 M 1 : db_ctrl 0    src_frame 3 , r_source 0
886 1 : TO DESCRIPTOR_BUS ( NAME_CACHE_0 ( NAME_TRAP ) ) ,
 M 1 : dev_cmd 48 , nb_ctrl 2       ,
887 1 : OFF_ALU_OUT = ZERO OR PREVIOUS ( 0 ) ,
 M 1 :   alu_in 2 , rand 2  alu_op 5  src_frame 3 , r_source 0   ,
888 1 : LOAD ( ACCUMULATOR ) WITH OFFSET ,
 M 1 : a_w 1 , o_in   3 ,
889 1 : RETURN
 M 1 : nac 2
889 1 : ;
892 1 : SD_SL_APR_101 :
893 1 : READ TO ACCUMULATOR USING OFF_ALU WITH COMMON ( 2
893 1 : , 6 ) CON_LENGTH ( 32 ) ,
 M 1 : mem 1   md 1   db_ctrl 1    src_frame 2 , r_source
 M 1 : 6 , com_ext 2  len_ctrl 6     ,
894 1 : OFF_ALU_OUT = ACC OR COMMON ( 2 , 6 ) ,
 M 1 :    alu_in 2  alu_op 5  src_frame 2 , r_source 6 , com_ext 2 ,
895 1 : LONG_GOTO E_VEC_IES_LIT
 M 1 : nac 6 , lit14  E_VEC_IES_LIT
895 1 : ;
898 1 : SD_SL_APR_110 :
899 1 : READ TO ACCUMULATOR USING OFF_ALU WITH COMMON ( 2
899 1 : , 6 ) CON_LENGTH ( 32 ) ,
 M 1 : mem 1   md 1   db_ctrl 1    src_frame 2 , r_source
 M 1 : 6 , com_ext 2  len_ctrl 6     ,
900 1 : OFF_ALU_OUT = ACC OR COMMON ( 2 , 6 ) ,
 M 1 :    alu_in 2  alu_op 5  src_frame 2 , r_source 6 , com_ext 2 ,
901 1 : LONG_GOTO E_VEC_IES_NAME
 M 1 : nac 6 , lit14  E_VEC_IES_NAME
901 1 : ;
904 1 : SD_SL_APR_111 :
905 1 : READ TO ACCUMULATOR USING OFF_ALU WITH COMMON ( 2
905 1 : , 6 ) CON_LENGTH ( 32 ) ,
 M 1 : mem 1   md 1   db_ctrl 1    src_frame 2 , r_source
 M 1 : 6 , com_ext 2  len_ctrl 6     ,
906 1 : OFF_ALU_OUT = ACC OR COMMON ( 2 , 6 ) ,
 M 1 :    alu_in 2  alu_op 5  src_frame 2 , r_source 6 , com_ext 2 ,
907 1 : LONG_GOTO E_VEC_IES_PWR2
 M 1 : nac 6 , lit14  E_VEC_IES_PWR2
907 1 : ;
910 1 : LD_SL_FP :
911 1 : OFF_ALU_OUT = ACC PLUS COMMON ( 2 , 1 ) ,
 M 1 :    alu_in 2  alu_op 3  src_frame 2 , r_source 1 , com_ext 2 ,
912 1 : LOAD_OFF ( PREVIOUS ( 0 ) ) WITH OFFSET ,
 M 1 : dest_frame 3 , r_dest 0 , r_w 1  o_in   3  ,
913 1 : LOAD_ADN ( PREVIOUS ( 0 ) ) WITH 1 COMMON ( 2 , 1 ) ,
 M 1 : dest_frame 3 , r_dest 0 , r_w 1  a_in   1  src_frame
 M 1 : 2 , r_source 1 , com_ext 2  ,
914 1 : FIU ( RIGHT , SIGN ) ,
 M 1 : rand 5   ,
915 1 : LONG_GOTO LD_SL_ABR
 M 1 : nac 6 , lit14  LD_SL_ABR
915 1 : ;
917 1 : LD_SL_SDP :
918 1 : OFF_ALU_OUT = ACC PLUS COMMON ( 2 , 2 ) ,
 M 1 :    alu_in 2  alu_op 3  src_frame 2 , r_source 2 , com_ext 2 ,
919 1 : LOAD_OFF ( PREVIOUS ( 0 ) ) WITH OFFSET ,
 M 1 : dest_frame 3 , r_dest 0 , r_w 1  o_in   3  ,
920 1 : LOAD_ADN ( PREVIOUS ( 0 ) ) WITH 1 COMMON ( 2 , 2 ) ,
 M 1 : dest_frame 3 , r_dest 0 , r_w 1  a_in   1  src_frame
 M 1 : 2 , r_source 2 , com_ext 2  ,
921 1 : FIU ( RIGHT , SIGN ) ,
 M 1 : rand 5   ,
922 1 : LONG_GOTO LD_SL_ABR
 M 1 : nac 6 , lit14  LD_SL_ABR
922 1 : ;
924 1 : LD_SL_PRP :
925 1 : OFF_ALU_OUT = ACC PLUS COMMON ( 2 , 0 ) ,
 M 1 :    alu_in 2  alu_op 3  src_frame 2 , r_source 0 , com_ext 2 ,
926 1 : LOAD_OFF ( PREVIOUS ( 0 ) ) WITH OFFSET ,
 M 1 : dest_frame 3 , r_dest 0 , r_w 1  o_in   3  ,
927 1 : LOAD_ADN ( PREVIOUS ( 0 ) ) WITH 1 COMMON ( 2 , 0 ) ,
```

```
 M 1 : dest_frame 3 , r_dest 0 , r_w 1   a_in    1 src_frame
 M 1 : 2 , r_source 0 , com_ext 2   ,
928 1 : FIU ( RIGHT , SIGN ) ,
 M 1 : rand 5   ,
929 1 : LONG_GOTO LD_SL_ARR
 M 1 : nac 6 , lit14  LD_SL_ARR
929 1 : ;
931 1 : LD_SL_ARR :
932 1 : OFF_ALU_OUT = ZERO OR CURRENT ( 5 ) ,
 M 1 :    alu_in 2 , rand 2  alu_op 5  src_frame 0 , r_source 5   ,
933 1 : LOAD ( ACCUMULATOR ) WITH OFFSET ,
 M 1 : a_w 1 , o_in    3  ,
934 1 : LONG_GOTO SD_SL_ARR
 M 1 : nac 6 , lit14  SD_SL_ARR
934 1 : ;
937 1 : SD_LL_ARR :
938 1 : READ TO ACCUMULATOR USING OFF_ALU WITH CURRENT (
938 1 : 6 ) CON_LENGTH ( 32 ) ,
 M 1 : mem 1   md 1   db_ctrl 1   src_frame 0 , r_source
 M 1 : 6  len_ctrl 6   ,
939 1 : OFF_ALU_OUT = BIASED_LENGTH PLUS CURRENT ( 6 ) ,
 M 1 :    alu_in 1  alu_op 3  src_frame 0 , r_source 6  ,
940 1 : LOAD_OFF ( CURRENT ( 6 ) ) WITH OFFSET ,
 M 1 : dest_frame 0 , r_dest 6 , r_w 1   o_in    3   ,
941 1 : LOAD_AON ( CURRENT ( 6 ) ) WITH AON ( CURRENT ( 6 ) ) ,
 M 1 : dest_frame 0 , r_dest 6 , r_w 1   a_in    2 , src_frame
 M 1 : 0 , r_source 6     ,
942 1 : CASE ON ACC_BYTE ( 1 ) MASK @80@ ROTATE ( 3 )
 M 1 : nac 3   srce 5   mask  @80@ sc 4
942 1 : ;
945 1 : OFF_ALU_OUT = ACC AND COMMON ( @0@ , 6 ) ,
 M 1 :    alu_in 2  alu_op 6  src_frame 2 , r_source 6 , com_ext @0@   ,
946 1 : IF OFF_NE_0 THEN GOTO WEIRD_LEN_TYPE
 M 1 : test  6 , polarity 1   nac 4 , lit8  WEIRD_LEN_TYPE
946 1 : ;
948 1 : SD_LL_ARR_1 :
949 1 : DISABLE_AON_WRT ,
 M 1 : rand 8  ,
950 1 : OFF_ALU_OUT = ACC ZERO_HI OR COMMON ( @0@ , 0 ) ,
 M 1 :    alu_in 2  dev_cmd 3  alu_op 5  src_frame 2 , r_source
 M 1 : 0 , com_ext @0@  ,
951 1 : LOAD_LEN ( PREVIOUS ( 0 ) ) WITH OFF
 M 1 : dest_frame 3 , r_dest 0 , r_w 1   l_in    3 , db_ctrl 1
951 1 : ;
953 1 : LOAD_OFF ( CURRENT ( 7 ) ) WITH AON ( PREVIOUS ( 0 ) )
 M 1 : dest_frame 0 , r_dest 7 , r_w 1   o_in    2 , src_frame
 M 1 : 3 , r_source 0
953 1 : ;
955 1 : INDIVISIBLE ,
 M 1 : rand 15  ,
956 1 : OFF_ALU_OUT = ACC ZERO_LO LEFT_SHIFTED ( 2 ) OR CURRENT ( 7 ) ,
 M 1 :    alu_in 2  dev_cmd 2   sf 2   alu_op 5  src_frame 0 , r_source 7   ,
957 1 : LOAD_AON ( PREVIOUS ( 0 ) ) WITH OFFSET ,
 M 1 : dest_frame 3 , r_dest 0 , r_w 1   a_in    3  ,
958 1 : LONG_GOTO SD_LL_ARR_2
 M 1 : nac 6 , lit14  SD_LL_ARR_2
958 1 : ;
961 1 : OFF_ALU_OUT = ACC ZERO_LO AND COMMON ( @0@ , 6 ) ,
 M 1 :    alu_in 2  dev_cmd 2  alu_op 6  src_frame 2 , r_source
 M 1 : 6 , com_ext @0@  ,
962 1 : IF OFF_EQ_0 THEN GOTO L_NAME_1
 M 1 : test  6 , polarity 0   nac 4 , lit8  L_NAME_1
962 1 : ;
964 1 : OFF_ALU_OUT = LIT32 ( @00F00000@ ) OR COMMON ( @0@ , 0 ) ,
 M 1 :    alu_in 3 , l 1 , lit32 @00F00000@  alu_op 5  src_frame
 M 1 : 2 , r_source 0 , com_ext @0@  ,
965 1 : LOAD_OFF ( CURRENT ( 7 ) ) WITH OFFSET
 M 1 : dest_frame 0 , r_dest 7 , r_w 1   o_in    3
965 1 : ;
967 1 : OFF_ALU_OUT = ACC ZERO_HI OR CURRENT ( 7 ) ,
 M 1 :    alu_in 2  dev_cmd 3  alu_op 5  src_frame 0 , r_source 7   ,
968 1 : LOAD ( ACCUMULATOR ) WITH OFFSET
```

```
        M 1 : a_w 1 , o_in    3
   968  1 : ;
   970  1 : L_NAME_1 :
   971  1 : OFF_ALU_OUT = ACC ZERO_HI OR COMMON ( @C@ , 3 ) ,
        M 1 :    alu_in 2   dev_cmd 3   alu_op 5   src_frame 2 , r_source
        M 1 : 3 , com_ext @C@ ,
   972  1 : LOAD_OFF ( CURRENT ( 4 ) ) WITH OFFSET ,
        M 1 : dest_frame 0 , r_dest 4 , r_w 1   o_in    3 ,
   973  1 : LONG_GOTO WEIRD_L_T_2
        M 1 : nac 6 , lit14  WEIRD_L_T_2
   973  1 : ;
   976  1 : SD_LL_ARR_2 :
   977  1 : OFF_ALU_OUT = ZERO OR CURRENT ( 5 ) ,
        M 1 :    alu_in 2 , rand 2   alu_op 5   src_frame 0 , r_source 5 ,
   978  1 : LOAD ( ACCUMULATOR ) WITH OFFSET ,
        M 1 : a_w 1 , o_in    3 ,
   979  1 : LONG_GOTO SD_SL_ARR_1
        M 1 : nac 0 , lit14  SD_SL_ARR_1
   979  1 : ;
   981  1 : WEIRD_LEN_TYPE :
   982  1 : OFF_ALU_OUT = ACC ZERO_LO AND COMMON ( @D@ , 6 ) ,
        M 1 :    alu_in 2   dev_cmd 2   alu_op 6   src_frame 2 , r_source
        M 1 : 6 , com_ext @D@ ,
   983  1 : IF OFF_FG_0 THEN GOTO WEIRD_L_T_1
        M 1 : test 6 , polarity 0   nac 4 , lit8  WEIRD_L_T_1
   983  1 : ;
   985  1 : OFF_ALU_OUT = LIT32 ( @000F0000@ ) OR COMMON ( @B@ , 0 ) ,
        M 1 :    alu_in 3 , 1 1 , lit32 @000F0000@  alu_op 5   src_frame
        M 1 : 2 , r_source 0 , com_ext @B@ ,
   986  1 : LOAD_OFF ( CURRENT ( 7 ) ) WITH OFFSET
        M 1 : dest_frame 0 , r_dest 7 , r_w 1   o_in    3
   986  1 : ;
   988  1 : OFF_ALU_OUT = ACC ZERO_HI OR CURRENT ( 7 ) ,
        M 1 :    alu_in 2   dev_cmd 3   alu_op 5   src_frame 0 , r_source 7 ,
   989  1 : LOAD ( ACCUMULATOR ) WITH OFFSET
        M 1 : a_w 1 , o_in    3
   989  1 : ;
   991  1 : WEIRD_L_T_1 :
   992  1 : OFF_ALU_OUT = ACC AND COMMON ( @D@ , 6 ) ,
        M 1 :    alu_in 2   alu_op 6   src_frame 2 , r_source 6 , com_ext @D@ ,
   993  1 : IF OFF_FG_0 THEN GOTO SD_LL_ARR_1
        M 1 : test 0 , polarity 0   nac 4 , lit8  SD_LL_ARR_1
   993  1 : ;
   995  1 : OFF_ALU_OUT = ACC ZERO_HI OR COMMON ( @B@ , 0 ) ,
        M 1 :    alu_in 2   dev_cmd 3   alu_op 5   src_frame 2 , r_source
        M 1 : 0 , com_ext @B@ ,
   996  1 : LOAD_OFF ( CURRENT ( 4 ) ) WITH OFFSET
        M 1 : dest_frame 0 , r_dest 4 , r_w 1   o_in    3
   996  1 : ;
   998  1 : WEIRD_L_T_2 :
   999  1 : DISABLE_ADV_WR1 ,
        M 1 : rand 8 ,
  1000  1 : OFF_ALU_OUT = ACC ZERO_HI OR COMMON ( @B@ , 0 ) ,
        M 1 :    alu_in 2   dev_cmd 3   alu_op 5   src_frame 2 , r_source
        M 1 : 0 , com_ext @B@ ,
  1001  1 : LOAD_LEN ( PREVIOUS ( 0 ) ) WITH OFF
        M 1 : dest_frame 3 , r_dest 0 , r_w 1   l_in    3 , db_ctrl 1
  1001  1 : ;
  1003  1 : LOAD_OFF ( CURRENT ( 7 ) ) WITH ADV ( PREVIOUS ( 0 ) )
        M 1 : dest_frame 0 , r_dest 7 , r_w 1   o_in    2 , src_frame
        M 1 : 3 , r_source 0
  1003  1 : ;
  1005  1 : INDIVISIBLE ,
        M 1 : rand 15 ,
  1006  1 : OFF_ALU_OUT = ACC ZERO_LO LEFT_SHIFTED ( 2 ) OR CURRENT ( 7 ) ,
        M 1 :    alu_in 2   dev_cmd 2   sf 2   alu_op 5   src_frame 0 , r_source 7 ,
  1007  1 : LOAD_ADR ( PREVIOUS ( 0 ) ) WITH OFFSET
        M 1 : dest_frame 3 , r_dest 0 , r_w 1   a_in    3
  1007  1 : ;
  1009  1 : OFF_ALU_OUT = ZERO OR CURRENT ( 5 ) ,
        M 1 :    alu_in 2 , rand 2   alu_op 5   src_frame 0 , r_source 5 ,
  1010  1 : LOAD ( ACCUMULATOR ) WITH OFFSET
```

```
       M 1 : a_w 1 , o_in    3
1010 1 : ;
1012 1 : LOAD_AUN ( PREVIOUS ( 0 ) ) WITH 1 PREVIOUS ( 0 ) ,
       M 1 : dest_frame 3 , r_dest 0 , r_w 1  a_in   1 src_frame
       M 1 : 3 , r_source 0 ,
1013 1 : FTU ( RIGHT , SIGN ) ,
       M 1 : rand 5 ,
1014 1 : CASE ON ACC_BYTE ( 0 ) MASK @1C@ ROTATE ( 6 )
       M 1 : nac 3   srce 4    mask  @1C@ sc 1
1014 1 : ;
1017 1 : LOAD_AUN ( PREVIOUS ( 0 ) ) WITH 1 PREVIOUS ( 0 ) ,
       M 1 : dest_frame 3 , r_dest 0 , r_w 1  a_in   1 src_frame
       M 1 : 3 , r_source 0 ,
1018 1 : FTU ( RIGHT , ZERO ) ,
       M 1 : rand 4 ,
1019 1 : LONG_GOTO WEIRD_L_T_100
       M 1 : nac 6 , lit14  WEIRD_L_T_100
1019 1 : ;
1022 1 : LOAD_AUN ( PREVIOUS ( 0 ) ) WITH 1 PREVIOUS ( 0 ) ,
       M 1 : dest_frame 3 , r_dest 0 , r_w 1  a_in   1 src_frame
       M 1 : 3 , r_source 0 ,
1023 1 : FTU ( RIGHT , ZERO ) ,
       M 1 : rand 4 ,
1024 1 : LONG_GOTO WEIRD_L_T_101
       M 1 : nac 6 , lit14  WEIRD_L_T_101
1024 1 : ;
1027 1 : LOAD_AUN ( PREVIOUS ( 0 ) ) WITH 1 PREVIOUS ( 0 ) ,
       M 1 : dest_frame 3 , r_dest 0 , r_w 1  a_in   1 src_frame
       M 1 : 3 , r_source 0 ,
1028 1 : FTU ( RIGHT , ZERO ) ,
       M 1 : rand 4 ,
1029 1 : LONG_GOTO WEIRD_L_T_110
       M 1 : nac 6 , lit14  WEIRD_L_T_110
1029 1 : ;
1032 1 : LOAD_AUN ( PREVIOUS ( 0 ) ) WITH 1 PREVIOUS ( 0 ) ,
       M 1 : dest_frame 3 , r_dest 0 , r_w 1  a_in   1 src_frame
       M 1 : 3 , r_source 0 ,
1033 1 : FTU ( RIGHT , ZERO ) ,
       M 1 : rand 4 ,
1034 1 : LONG_GOTO WEIRD_L_T_111
       M 1 : nac 6 , lit14  WEIRD_L_T_111
1034 1 : ;
1037 1 : WEIRD_L_T_100 :
1038 1 : SOURCE ( DESCRIPTOR CURRENT ( 4 ) )
       M 1 : db_ctrl 0   src_frame 0 , r_source 4
1039 1 : TO DESCRIPTOR_BUS ( NAME_CACHE_0 ( NAME_IPAP ) ) ,
       M 1 :  dev_cmd 08 , db_ctrl 2 ,
1040 1 : OFF_ALU_OUT = BIASED_LENGTH CON_LENGTH ( 0 ) OR CURRENT ( 4 ) ,
       M 1 :   alu_in 1  len_ctrl 0    alu_op 5  src_frame 0 , r_source 4 ,
1041 1 : LOAD ( ACCUMULATOR ) WITH OFFSET ,
       M 1 : a_w 1 , o_in    3 ,
1042 1 : LOAD_AUN ( CURRENT ( 6 ) ) WITH 0 ,
       M 1 : dest_frame 0 , r_dest 6 , r_w 1  a_in   0 ,
1043 1 : TEST_TO_LC ( OFF_SIGN_ED_1 ) ,
       M 1 : rand 10 , test 3 , lit8 1 ,
1044 1 : GOTO WEIRD_L_T_END
       M 1 : nac 4 , lit8  WEIRD_L_T_END
1044 1 : ;
1047 1 : WEIRD_L_T_101 :
1048 1 : READ TO ACCUMULATOR USING OFF_ALU WITH CURRENT (
1048 1 : 6 ) CON_LENGTH ( 32 ) ,
       M 1 : mem 1   md 1   db_ctrl 1   src_frame 0 , r_source
       M 1 : 6  len_ctrl 6 ,
1049 1 : OFF_ALU_OUT = BIASED_LENGTH PLUS CURRENT ( 6 ) ,
       M 1 :   alu_in 1  alu_op 3  src_frame 0 , r_source 6 ,
1050 1 : LOAD_AUN ( CURRENT ( 6 ) ) WITH 0 ,
       M 1 : dest_frame 0 , r_dest 6 , r_w 1  a_in   0 ,
1051 1 : LONG_GOTO L_VEC_IES_LIT
       M 1 : nac 6 , lit14  L_VEC_IES_LIT
1051 1 : ;
1054 1 : WEIRD_L_T_110 :
1055 1 : READ TO ACCUMULATOR USING OFF_ALU WITH CURRENT (
1055 1 : 6 ) CON_LENGTH ( 32 ) ,
```

```
        M 1 : mem 1    md 1    db_ctrl 1    src_frame 0 , r_source
        M 1 : o  len_ctrl 6    ,
     1056 1 : OFF_ALU_OUT = BIASED_LENGTH PLUS CURRENT ( 6 ) ,
        M 1 :    alu_in 1   alu_op 3   src_frame 0 , r_source 6 ,
     1057 1 : LOAD_AON ( CURRENT ( 6 ) ) WITH 0 ,
        M 1 : dest_frame 0 , r_dest 6 , r_w 1   a_in    0 ,
     1058 1 : LONG_GOTO L_VEC_IES_NAME
        M 1 : nac 6 , lit14   L_VEC_IES_NAME
     1058 1 : ;
     1061 1 : WEIRD_L_T_111 :
     1062 1 : READ TO ACCUMULATOR USING OFF_ALU WITH CURRENT (
     1062 1 : 6 ) COM_LENGTH ( 32 ) ,
        M 1 : mem 1    md 1    db_ctrl 1    src_frame 0 , r_source
        M 1 : o  len_ctrl 6    ,
     1063 1 : OFF_ALU_OUT = BIASED_LENGTH PLUS CURRENT ( 6 ) ,
        M 1 :    alu_in 1   alu_op 3   src_frame 0 , r_source 6 ,
     1064 1 : LOAD_AON ( CURRENT ( 6 ) ) WITH 0 ,
        M 1 : dest_frame 0 , r_dest 6 , r_w 1   a_in    0 ,
     1065 1 : LONG_GOTO L_VEC_IES_PWR2
        M 1 : nac 6 , lit14   L_VEC_IES_PWR2
     1065 1 : ;
     1068 1 : WEIRD_L_T_END :
     1069 1 : SOURCE ( DESCRIPTOR PREVIOUS ( 0 ) )
        M 1 : db_ctrl 0   src_frame 3 , r_source 0
     1070 1 : TO DESCRIPTOR_BUS ( NAME_CACHE_3 ( NAME_TRAP ) ) ,
        M 1 : dev_cmd 51 , nb_ctrl 2     ,
     1071 1 : IF CC THEN GOTO WEIRD_L_NAME
        M 1 : test 13 , polarity 1   nac 4 , lit8  WEIRD_L_NAME
     1071 1 : ;
     1073 1 : OFF_ALU_OUT = ZERO OR PREVIOUS ( 0 ) ,
        M 1 :    alu_in 2 , rand 2   alu_op 5   src_frame 3 , r_source 0 .
     1074 1 : LOAD ( ACCUMULATOR ) WITH OFFSET ,
        M 1 : a_w 1 , o_in    3 ,
     1075 1 : RETURN
        M 1 : nac 2
     1075 1 : ;
     1077 1 : WEIRD_L_NAME :
     1078 1 : OFF_ALU_OUT = ACC OR COMMON ( WM , 0 ) ,
        M 1 :    alu_in 2   alu_op 5   src_frame 2 , r_source 0 , com_ext 3q3 .
     1079 1 : LOAD_OFF ( CURRENT ( 7 ) ) WITH OFFSET ,
        M 1 : dest_frame 0 , r_dest 7 , r_w 1   o_in    3 ,
     1080 1 : SOURCE ( OFF_ALU_LS_16 ) TO NAME_BUS ( NAME_TRAP ) ,
        M 1 : nb_ctrl 0    dev_cmd 117   ,
     1081 1 : LONG_GOTO LEN_IS_A_NAME
        M 1 : nac 6 , lit14   LEN_IS_A_NAME
     1081 1 : ;
     1084 1 : LD_LL_FP :
     1085 1 : OFF_ALU_OUT = ACC PLUS COMMON ( 2 , 1 ) ,
        M 1 :    alu_in 2   alu_op 3   src_frame 2 , r_source 1 , com_ext 2 .
     1086 1 : LOAD_OFF ( PREVIOUS ( 0 ) ) WITH OFFSET ,
        M 1 : dest_frame 3 , r_dest 0 , r_w 1   o_in    3 ,
     1087 1 : LOAD_AON ( PREVIOUS ( 0 ) ) WITH 1 COMMON ( 2 , 1 ) ,
        M 1 : dest_frame 3 , r_dest 0 , r_w 1   a_in    1 src_frame
        M 1 : 2 , r_source 1 , com_ext 2 ,
     1088 1 : FIU ( RIGHT , SIGN ) ,
        M 1 : rand 5   ,
     1089 1 : LONG_GOTO LD_LL_ARR
        M 1 : nac 6 , lit14   LD_LL_ARR
     1089 1 : ;
     1091 1 : LD_LL_SDP :
     1092 1 : OFF_ALU_OUT = ACC PLUS COMMON ( 2 , 2 ) ,
        M 1 :    alu_in 2   alu_op 3   src_frame 2 , r_source 2 , com_ext 2 .
     1093 1 : LOAD_OFF ( PREVIOUS ( 0 ) ) WITH OFFSET ,
        M 1 : dest_frame 3 , r_dest 0 , r_w 1   o_in    3 ,
     1094 1 : LOAD_AON ( PREVIOUS ( 0 ) ) WITH 1 COMMON ( 2 , 2 ) ,
        M 1 : dest_frame 3 , r_dest 0 , r_w 1   a_in    1 src_frame
        M 1 : 2 , r_source 2 , com_ext 2 ,
     1095 1 : FIU ( RIGHT , SIGN ) ,
        M 1 : rand 5   ,
     1096 1 : LONG_GOTO LD_LL_ARR
        M 1 : nac 6 , lit14   LD_LL_ARR
     1096 1 : ;
     1098 1 : LD_LL_PBP :
```

```
1099 1 : OFF_ALU_OUT = ACC PLUS COMMON ( 2 , 0 ) ,
   M 1 :    alu_in 2  alu_op 3  src_frame 2 , r_source 0 , com_ext 2 ,
1100 1 : LOAD_OFF ( PREVIOUS ( 0 ) ) WITH OFFSET ,
   M 1 : dest_frame 3 , r_dest 0 , r_w 1  o_in   3 ,
1101 1 : LOAD_ADN ( PREVIOUS ( 0 ) ) WITH 1 COMMON ( 2 , 0 ) ,
   M 1 : dest_frame 3 , r_dest 0 , r_w 1  a_in   1 src_frame
   M 1 : 2 , r_source 0 , com_ext 2 ,
1102 1 : FTU ( RIGHT , SIGN ) ,
   M 1 : rand 5 ,
1103 1 : LONG_GOTO LD_LL_ABR
   M 1 : nac 6 , lit14 LD_LL_ABR
1103 1 : ;
1105 1 : LD_LL_ABR :
1106 1 : OFF_ALU_OUT = ZERO OR CURRENT ( 5 ) ,
   M 1 :    alu_in 2 , rand 2  alu_op 5  src_frame 0 , r_source 5 ,
1107 1 : LOAD ( ACCUMULATOR ) WITH OFFSET ,
   M 1 : a_w 1 , o_in   3 ,
1108 1 : LONG_GOTO SD_LL_ABR
   M 1 : nac 6 , lit14 SD_LL_ABR
1108 1 : ;
1112 1 : E_VEC_IES_LIT :
1113 1 : LOAD_OFF ( CURRENT ( 4 ) ) WITH JPD ( LEN ( PREVIOUS ( 0 ) ) )
   M 1 : dest_frame 0 , r_dest 4 , r_w 1  o_in   3 , src_frame
   M 1 : 3 , r_source 0 , jpd_ctrl 6
1113 1 : ;
1115 1 : OFF_ALU_OUT = LIT32 ( @40000000@ ) OR CURRENT ( 4 ) ,
   M 1 :    alu_in 3 , 1 1 , lit32 @40000000@  alu_op 5  src_frame
   M 1 : 0 , r_source 4 ,
1116 1 : LOAD_OFF ( CURRENT ( 4 ) ) WITH OFFSET
   M 1 : dest_frame 0 , r_dest 4 , r_w 1  o_in   3
1116 1 : ;
1118 1 : SOURCE ( DESCRIPTOR CURRENT ( 4 ) )
   M 1 : db_ctrl 0  src_frame 0 , r_source 4
1119 1 : TO DESCRIPTOR_BUS ( NAME_CACHE_0 ( NAME_TRAP ) ) ,
   M 1 : dev_cmd 48 , nb_ctrl 2 ,
1120 1 : CASE ON ACC_BYTE ( 2 ) MASK @B0@ ROTATE ( 1 )
   M 1 : nac 3  srce 6   mask  @B0@ sc 6
1120 1 : ;
1123 1 : OFF_ALU_OUT = ACC OR COMMON ( @B@ , 0 ) ,
   M 1 :    alu_in 2  alu_op 5  src_frame 2 , r_source 0 , com_ext @B@ ,
1124 1 : LOAD_OFF ( CURRENT ( 1 ) ) WITH OFFSET ,
   M 1 : dest_frame 0 , r_dest 1 , r_w 1  o_in   3 ,
1125 1 : LOAD_LEN ( CURRENT ( 1 ) ) WITH LITERAL ( CON_LENGTH ( 32 ) ) ,
   M 1 : dest_frame 0 , r_dest 1 , r_w 1  l_in   1 , len_ctrl 6 ,
1126 1 : LONG_GOTO E_VEC_LOAD_NC_1
   M 1 : nac 6 , lit14 E_VEC_LOAD_NC_1
1126 1 : ;
1129 1 : OFF_ALU_OUT = ACC XOR COMMON ( @C@ , 6 ) ,
   M 1 :    alu_in 2  alu_op 4  src_frame 2 , r_source 6 , com_ext @C@ ,
1130 1 : LOAD_OFF ( CURRENT ( 1 ) ) WITH OFFSET ,
   M 1 : dest_frame 0 , r_dest 1 , r_w 1  o_in   3 ,
1131 1 : LOAD_LEN ( CURRENT ( 1 ) ) WITH LITERAL ( LIT_LENGTH ( 34 ) )
   M 1 : dest_frame 0 , r_dest 1 , r_w 1  l_in   1 , len_ctrl
   M 1 : 15 , lit8 34 , nac 4 , test 15 , polarity 0
1131 1 : ;
1133 1 : SOURCE ( OFF_ALU WITH CURRENT ( 1 ) )
   M 1 : db_ctrl 1   src_frame 0 , r_source 1
1134 1 : TO DESCRIPTOR_BUS ( NAME_CACHE_1 ( NAME_TRAP ) ) ,
   M 1 : dev_cmd 49 , nb_ctrl 2 ,
1135 1 : OFF_ALU_OUT = ONE PLUS CURRENT ( 1 ) ,
   M 1 :    alu_in 2 , rand 3  alu_op 3  src_frame 0 , r_source 1 ,
1136 1 : LOAD_OFF ( CURRENT ( 1 ) ) WITH OFFSET ,
   M 1 : dest_frame 0 , r_dest 1 , r_w 1  o_in   3 ,
1137 1 : LOAD ( ACCUMULATOR ) WITH OFFSET ,
   M 1 : a_w 1 , o_in   3 ,
1138 1 : LONG_GOTO E_VEC_END
   M 1 : nac 6 , lit14 E_VEC_END
1138 1 : ;
1140 1 : E_VEC_IES_NAME :
1141 1 : LOAD_OFF ( CURRENT ( 4 ) ) WITH JPD ( LEN ( PREVIOUS ( 0 ) ) )
   M 1 : dest_frame 0 , r_dest 4 , r_w 1  o_in   3 , src_frame
   M 1 : 3 , r_source 0 , jpd_ctrl 6
1141 1 : ;
```

```
 143 1 : OFF_ALU_OUT = LIT32 ( a40000000a ) OR CURRENT ( 4 ) ,
   M 1 :    alu_in 3 , l 1 , lit32 a40000000a  alu_op 5   src_frame
   M 1 : 0 , r_source 0  ,
 144 1 : LOAD_OFF ( CURRENT ( 4 ) ) WITH OFFSET
   M 1 : dest_frame 0 , r_dest 4 , r_w 1  o_in   3
 144 1 : ;
 146 1 : SOURCE ( DESCRIPTOR CURRENT ( 4 ) )
   M 1 : db_ctrl 0   src_frame 0 , r_source 4
 147 1 : TO DESCRIPTOR_BUS ( NAME_CACHE_0 ( NAME_TRAP ) )
   M 1 :  dev_cmd 48 , nb_ctrl 2
 147 1 : ;
 149 1 : OFF_ALU_OUT = ACC OR COMMON ( aBa , 0 ) ,
   M 1 :    alu_in 2  alu_op 5   src_frame 2 , r_source 0 , com_ext aBa  ,
 150 1 : LOAD_OFF ( CURRENT ( 1 ) ) WITH OFFSET ,
   M 1 : dest_frame 0 , r_dest 1 , r_w 1  o_in   3  ,
 151 1 : LOAD_LEN ( CURRENT ( 1 ) ) WITH LITERAL ( LIT_LENGTH ( 36 ) )
   M 1 : dest_frame 0 , r_dest 1 , r_w 1  l_in   1 , len_ctrl
   M 1 : 15 , lit8 36 , nac 4 , test 15 , polarity 0
 151 1 : ;
 153 1 : E_VEC_LOAD_NC_1 :
 154 1 : SOURCE ( DESCRIPTOR CURRENT ( 1 ) )
   M 1 : db_ctrl 0   src_frame 0 , r_source 1
 155 1 : TO DESCRIPTOR_BUS ( NAME_CACHE_1 ( NAME_TRAP ) )
   M 1 :  dev_cmd 49 , nb_ctrl 2
 155 1 : ;
 157 1 : E_VEC_END :
 158 1 : SOURCE ( DESCRIPTOR PREVIOUS ( 0 ) )
   M 1 : db_ctrl 0   src_frame 3 , r_source 0
 159 1 : TO DESCRIPTOR_BUS ( NAME_CACHE_3 ( NAME_TRAP ) ) ,
   M 1 :  dev_cmd 51 , nb_ctrl 2   ,
 160 1 : LONG_GOTO WEIRD_VECTOR
   M 1 : nac 6 , lit14 WEIRD_VECTOR
 160 1 : ;
 162 1 : E_VEC_IES_PWR2 :
 163 1 : OFF_ALU_OUT = NAME_TRAP ( ZERO_EXTEND ) OR COMMON ( aBa , 0 ) ,
   M 1 :    alu_in 2 , nb_ctrl 2 , dev_cmd 4   alu_op 5  src_frame
   M 1 : 2 , r_source 0 , com_ext aBa   ,
 164 1 : LOAD_OFF ( CURRENT ( 7 ) ) WITH OFFSET
   M 1 : dest_frame 0 , r_dest 7 , r_w 1  o_in   3
 164 1 : ;
 166 1 : OFF_ALU_OUT = ACC OR COMMON ( aBa , 0 ) ,
   M 1 :    alu_in 2  alu_op 5   src_frame 2 , r_source 0 , com_ext aBa  ,
 167 1 : LOAD_OFF ( CURRENT ( 1 ) ) WITH OFFSET ,
   M 1 : dest_frame 0 , r_dest 1 , r_w 1  o_in   3  ,
 168 1 : LOAD_LEN ( CURRENT ( 1 ) ) WITH OFF ,
   M 1 : dest_frame 0 , r_dest 1 , r_w 1  l_in   3 , db_ctrl 1   ,
 169 1 : CASE ON ACC_BYTE ( 3 ) MASK a18a ROTATE ( 5 )
   M 1 : nac 3  srce 7   mask a18a sc 2
 169 1 : ;
 172 1 : OFF_ALU_OUT = ZERO OR ACC_HI ,
   M 1 :    alu_in 2 , rand 2  alu_op 5  dev_cmd 1   ,
 173 1 : LOAD_OFF ( CURRENT ( 5 ) ) WITH OFFSET ,
   M 1 : dest_frame 0 , r_dest 5 , r_w 1  o_in   3  ,
 174 1 : LONG_GOTO CHECK_HARD_VEC
   M 1 : nac 6 , lit14 CHECK_HARD_VEC
 174 1 : ;
 177 1 : LONG_GOTO E_VEC_PWR2_END
   M 1 : nac 6 , lit14 E_VEC_PWR2_END
 177 1 : ;
 180 1 : LONG_GOTO E_VEC_PWR2_END
   M 1 : nac 6 , lit14 E_VEC_PWR2_END
 180 1 : ;
 183 1 : E_VEC_PWR2_END :
 184 1 : LOAD_OFF ( CURRENT ( 4 ) ) WITH JPD ( LEN ( PREVIOUS ( 0 ) ) )
   M 1 : dest_frame 0 , r_dest 4 , r_w 1  o_in   3 , src_frame
   M 1 : 3 , r_source 0  , jpd_ctrl 6
 184 1 : ;
 186 1 : OFF_ALU_OUT = LIT32 ( a40000000a ) OR CURRENT ( 4 ) ,
   M 1 :    alu_in 3 , l 1 , lit32 a40000000a  alu_op 5   src_frame
   M 1 : 0 , r_source 0  ,
 187 1 : LOAD_OFF ( CURRENT ( 4 ) ) WITH OFFSET
   M 1 : dest_frame 0 , r_dest 4 , r_w 1  o_in   3
```

```
1187 1 : ;
1189 1 : SOURCE ( DESCRIPTOR CURRENT ( 4 ) )
   M 1 : db_ctrl 0   src_frame 0 , r_source 4
1190 1 : TO DESCRIPTOR_BUS ( NAME_CACHE_0 ( NAME_TRAP ) )
   M 1 :  dev_cmd 48 , nb_ctrl 2
1190 1 : ;
1192 1 : SOURCE ( DESCRIPTOR CURRENT ( 1 ) )
   M 1 : db_ctrl 0   src_frame 0 , r_source 1
1193 1 : TO DESCRIPTOR_BUS ( NAME_CACHE_1 ( NAME_TRAP ) ) ,
   M 1 :  dev_cmd 49 , nb_ctrl 2      ,
1194 1 : OFF_ALU_OUT = ZERO OR CURRENT ( 1 ) ,
   M 1 :   alu_in 2 , rand 2  alu_op 5  src_frame 0 , r_source 1 ,
1195 1 : LOAD ( ACCUMULATOR ) WITH OFFSET ,
   M 1 : a_w 1 , o_in    3  ,
1196 1 : LONG_GOTO E_VEC_END
   M 1 : nac 6 , lit14  E_VEC_END
1196 1 : ;
1198 1 : CHECK_HARD_VEC :
1199 1 : OFF_ALU_OUT = ZERO OR CURRENT ( 5 ) ,
   M 1 :   alu_in 2 , rand 2  alu_op 5  src_frame 0 , r_source 5 ,
1200 1 : RESOLVE ( 0 , OFF_ALU_LS_16 )
   M 1 : mem 0 , nac 0 , snac 4 , dest_frame 0 , r_dest 0
   M 1 : , r_w 1 , nb_ctrl 0 , l_in 1 , o_in 1 , a_in 1 , a_w 1
1200 1 : ;
1202 1 : OFF_ALU_OUT = ZERO OR CURRENT ( 0 ) , LOAD_OFF (
1202 1 : CURRENT ( 4 ) ) WITH OFFSET , LOAD_LEN ( CURRENT ( 4 ) )
   M 1 :   alu_in 2 , rand 2  alu_op 5  src_frame 0 , r_source
   M 1 : 0 , dest_frame 0 , r_dest 4 , r_w 1  o_in    3 ,
   M 1 : dest_frame 0 , r_dest 4 , r_w 1  l_in
1202 1 : WITH LEN ( CURRENT ( 0 ) ) , LOAD_AON ( CURRENT (
1202 1 : 4 ) ) WITH AON ( CURRENT ( 0 ) )
   M 1 : 2 , src_frame 0 , r_source 0  , dest_frame 0 ,
   M 1 : r_dest 4 , r_w 1  a_in   2 , src_frame 0 , r_source 0
1202 1 : ;
1217 1 : OFF_ALU_OUT = ZERO OR CURRENT ( 5 ) ,
   M 1 :   alu_in 2 , rand 2  alu_op 5  src_frame 0 , r_source 5 ,
1218 1 : LOAD_AON ( CURRENT ( 0 ) ) WITH 0 ,
   M 1 : dest_frame 0 , r_dest 0 , r_w 1  a_in    0 ,
1219 1 : mem 0 , nac 0 , snac 4 , nb_ctrl 0 ,
1220 1 : o_in 1 , a_w 1 , l_in 1
1220 1 : ;
1222 1 : OFF_ALU_OUT = ZERO OR CURRENT ( 7 ) ,
   M 1 :   alu_in 2 , rand 2  alu_op 5  src_frame 0 , r_source 7 ,
1223 1 : SOURCE ( OFF_ALU_LS_16 ) TO NAME_BUS ( NAME_TRAP )
   M 1 : nb_ctrl 0   dev_cmd 117
1223 1 : ;
1225 1 : WITH CURRENT ( 0 ) ,
   M 1 :  src_frame 0 , r_source 0 ,
1226 1 : LOAD_AON ( CURRENT ( 0 ) ) WITH 0 ,
   M 1 : dest_frame 0 , r_dest 0 , r_w 1  a_in    0 ,
1227 1 : IF AON_NE_0 THEN GOTO E_VEC_PWR2_END
   M 1 : test 4 , polarity 1   nac 4 , lit6  E_VEC_PWR2_END
1227 1 : ;
1229 1 : SOURCE ( DESCRIPTOR CURRENT ( 4 ) )
   M 1 : db_ctrl 0   src_frame 0 , r_source 4
1230 1 : TO DESCRIPTOR_BUS ( NAME_CACHE_0 ( NAME_TRAP ) ) ,
   M 1 :  dev_cmd 48 , nb_ctrl 2      ,
1231 1 : OFF_ALU_OUT = ZERO OR CURRENT ( 4 ) , LOAD_OFF (
1231 1 : CURRENT ( 0 ) ) WITH OFFSET , LOAD_LEN ( CURRENT ( 0 ) )
   M 1 :   alu_in 2 , rand 2  alu_op 5  src_frame 0 , r_source
   M 1 : 4 , dest_frame 0 , r_dest 0 , r_w 1  o_in    3 ,
   M 1 : dest_frame 0 , r_dest 0 , r_w 1  l_in
1231 1 : WITH LEN ( CURRENT ( 4 ) ) , LOAD_AON ( CURRENT (
1231 1 : 0 ) ) WITH AON ( CURRENT ( 4 ) )
   M 1 : 2 , src_frame 0 , r_source 4  , dest_frame 0 ,
   M 1 : r_dest 0 , r_w 1  a_in   2 , src_frame 0 , r_source 4
1231 1 : ;
1233 1 : SOURCE ( DESCRIPTOR PREVIOUS ( 0 ) )
   M 1 : db_ctrl 0   src_frame 3 , r_source 0
1234 1 : TO DESCRIPTOR_BUS ( NAME_CACHE_2 ( NAME_TRAP ) ) ,
   M 1 :  dev_cmd 50 , nb_ctrl 2
1235 1 : LOAD_AON ( CURRENT ( 4 ) ) WITH 0
   M 1 : dest_frame 0 , r_dest 4 , r_w 1  a_in    0
1235 1 : ;
```

```
1237 1 : SOURCE ( DESCRIPTOR CURRENT ( 1 ) )
   M 1 : db_ctrl 0    src_frame 0 , r_source 1
1238 1 : TO DESCRIPTOR_BUS ( NAME_CACHE_1 ( NAME_TRAP ) ) ,
   M 1 :   dev_cmd 49 , nb_ctrl 2      ,
1239 1 : OFF_ALU_OUT = ZERO OR CURRENT ( 1 ) ,
   M 1 :    alu_in 2 , rand 2  alu_op 5  src_frame 0 , r_source 1   .
1240 1 : LOAD ( ACCUMULATOR ) WITH OFFSET ,
   M 1 : a_w 1 , o_in    3 ,
1241 1 : LONG_GOTO WEIRD_VEC_CASE
   M 1 : nac 6 , lit14  WEIRD_VEC_CASE
1241 1 : ;
1244 1 : L_VEC_IFS_LIT :
1245 1 : OFF_ALU_OUT = LIT32 ( @40000000@ ) OR CURRENT ( 4 ) ,
   M 1 :    alu_in 3 , 1 1 , lit32 @40000000@  alu_op 5  src_frame
   M 1 : 0 , r_source 4 ,
1246 1 : LOAD_OFF ( CURRENT ( 4 ) ) WITH OFFSET
   M 1 : dest_frame 0 , r_dest 4 , r_w 1  o_in    3
1246 1 : ;
1248 1 : SOURCE ( DESCRIPTOR CURRENT ( 4 ) )
   M 1 : db_ctrl 0    src_frame 0 , r_source 4
1249 1 : TO DESCRIPTOR_BUS ( NAME_CACHE_0 ( NAME_TRAP ) ) ,
   M 1 :   dev_cmd 48 , nb_ctrl 2     ,
1250 1 : CASE ON ACC_BYTE ( 2 ) MASK @80@ ROTATE ( 1 )
   M 1 : nac 3    srce 6    mask @80@ sc 6
1250 1 : ;
1253 1 : OFF_ALU_OUT = ACC OR COMMON ( @8@ , 0 ) ,
   M 1 :    alu_in 2  alu_op 5  src_frame 2 , r_source 0 , com_ext @8@   .
1254 1 : LOAD_OFF ( CURRENT ( 1 ) ) WITH OFFSET ,
   M 1 : dest_frame 0 , r_dest 1 , r_w 1  o_in    3 ,
1255 1 : LOAD_LEN ( CURRENT ( 1 ) ) WITH LITERAL ( CON_LENGTH ( 32 ) ) .
   M 1 : dest_frame 0 , r_dest 1 , r_w 1  l_in   1 , len_ctrl 6
1256 1 : LONG_GOTO L_VEC_LOAD_NC_1
   M 1 : nac 6 , lit14  L_VEC_LOAD_NC_1
1256 1 : ;
1259 1 : OFF_ALU_OUT = ACC XOR COMMON ( @C@ ; 6 ) ,
   M 1 :    alu_in 2  alu_op 4  src_frame 2 , r_source 6 , com_ext @C@  ,
1260 1 : LOAD_OFF ( CURRENT ( 1 ) ) WITH OFFSET ,
   M 1 : dest_frame 0 , r_dest 1 , r_w 1  o_in    3 ,
1261 1 : LOAD_LEN ( CURRENT ( 1 ) ) WITH LITERAL ( LIT_LENGTH ( 34 ) )
   M 1 : dest_frame 0 , r_dest 1 , r_w 1  l_in   1 , len_ctrl
   M 1 : 15 , lit8 34 , nac 4 , test 15 , polarity 0
1261 1 : ;
1263 1 : SOURCE ( OFF_ALU WITH CURRENT ( 1 ) )
   M 1 : db_ctrl 1     src_frame 0 , r_source 1
1264 1 : TO DESCRIPTOR_BUS ( NAME_CACHE_1 ( NAME_TRAP ) ) ,
   M 1 :   dev_cmd 49 , nb_ctrl 2      ,
1265 1 : OFF_ALU_OUT = ONE PLUS CURRENT ( 1 ) ,
   M 1 :    alu_in 2 , rand 3  alu_op 3  src_frame 0 , r_source 1   .
1266 1 : LOAD_OFF ( CURRENT ( 1 ) ) WITH OFFSET ,
   M 1 : dest_frame 0 , r_dest 1 , r_w 1  o_in    3 ,
1267 1 : LOAD ( ACCUMULATOR ) WITH OFFSET ,
   M 1 : a_w 1 , o_in    3 ,
1268 1 : LONG_GOTO L_VEC_END
   M 1 : nac 6 , lit14  L_VEC_END
1268 1 : ;
1270 1 : L_VEC_IFS_NAME :
1271 1 : OFF_ALU_OUT = LIT32 ( @40000000@ ) OR CURRENT ( 4 ) ,
   M 1 :    alu_in 3 , 1 1 , lit32 @40000000@  alu_op 5  src_frame
   M 1 : 0 , r_source 4 ,
1272 1 : LOAD_OFF ( CURRENT ( 4 ) ) WITH OFFSET
   M 1 : dest_frame 0 , r_dest 4 , r_w 1  o_in    3
1272 1 : ;
1274 1 : SOURCE ( DESCRIPTOR CURRENT ( 4 ) )
   M 1 : db_ctrl 0    src_frame 0 , r_source 4
1275 1 : TO DESCRIPTOR_BUS ( NAME_CACHE_0 ( NAME_TRAP ) )
   M 1 :   dev_cmd 48 , nb_ctrl 2
1275 1 : ;
1277 1 : OFF_ALU_OUT = ACC OR COMMON ( @8@ , 0 ) ,
   M 1 :    alu_in 2  alu_op 5  src_frame 2 , r_source 0 , com_ext @8@   .
1278 1 : LOAD_OFF ( CURRENT ( 1 ) ) WITH OFFSET ,
   M 1 : dest_frame 0 , r_dest 1 , r_w 1  o_in    3 ,
1279 1 : LOAD_LEN ( CURRENT ( 1 ) ) WITH LITERAL ( LIT_LENGTH ( 36 ) )
```

```
   M 1 : dest_frame 0 , r_dest 1 , r_w 1  l_in   1 , len_ctrl
   M 1 : 15 , lit8 36 , nac 4 , test 15 , polarity 0
1279 1 : ;
1281 1 : L_VEC_LOAD_NC_1 :
1282 1 : SOURCE ( DESCRIPTOR CURRENT ( 1 ) )
   M 1 : db_ctrl 0   src_frame 0 , r_source 1
1283 1 : TO DESCRIPTOR_BUS ( NAME_CACHE_1 ( NAME_TRAP ) )
   M 1 :  dev_cmd 49 , nb_ctrl 2
1283 1 : ;
1285 1 : L_VEC_END :
1286 1 : SOURCE ( DESCRIPTOR PREVIOUS ( 0 ) )
   M 1 : db_ctrl 0   src_frame 3 , r_source 0
1287 1 : TO DESCRIPTOR_BUS ( NAME_CACHE_3 ( NAME_TRAP ) )
   M 1 :  dev_cmd 51 , nb_ctrl 2
1287 1 : ;
1289 1 : OFF_ALU_OUT = ZERO OR CURRENT ( 4 ) ,
   M 1 :    alu_in 2 , rand 2  alu_op 5  src_frame 0 , r_source 4 ,
1290 1 : IF OFF_SIGN_EQ_0 THEN GOTO WEIRD_VECTOR
   M 1 : test 3 , polarity 0   nac 4 , lit8 WEIRD_VECTOR
1290 1 : ;
1292 1 : OFF_ALU_OUT = ZERO OR CURRENT ( 4 ) ,
   M 1 :    alu_in 2 , rand 2  alu_op 5  src_frame 0 , r_source 4 ,
1293 1 : LOAD ( ACCUMULATOR ) WITH OFFSET ,
   M 1 :  a_w 1 , o_in   3 ,
1294 1 : LONG_GOTO L_NAME_ARR
   M 1 : nac 6 , lit14 L_NAME_ARR
1294 1 : ;
1296 1 : L_VEC_IFS_PWR2 :
1297 1 : OFF_ALU_OUT = LIT32 ( @40000000@ ) OR CURRENT ( 4 ) ,
   M 1 :    alu_in 3 , 1 1 , lit32 @40000000@ alu_op 5  src_frame
   M 1 : 0 , r_source 4 ,
1298 1 : LOAD_OFF ( CURRENT ( 4 ) ) WITH OFFSET
   M 1 : dest_frame 0 , r_dest 4 , r_w 1  o_in   3
1298 1 : ;
1300 1 : OFF_ALU_OUT = ACC OP COMMON ( @B@ , 0 ) ,
   M 1 :    alu_in 2  alu_op 5  src_frame 2 , r_source 0 , com_ext @B@ ,
1301 1 : LOAD_OFF ( CURRENT ( 1 ) ) WITH OFFSET ,
   M 1 : dest_frame 0 , r_dest 1 , r_w 1  o_in   3 ,
1302 1 : LOAD_LEN ( CURRENT ( 1 ) ) WITH OFF
   M 1 : dest_frame 0 , r_dest 1 , r_w 1  l_in   3 , db_ctrl 1
1302 1 : ;
1304 1 : SOURCE ( DESCRIPTOR CURRENT ( 4 ) )
   M 1 : db_ctrl 0   src_frame 0 , r_source 4
1305 1 : TO DESCRIPTOR_BUS ( NAME_CACHE_0 ( NAME_TRAP ) )
   M 1 :  dev_cmd 48 , nb_ctrl 2
1305 1 : ;
1307 1 : SOURCE ( DESCRIPTOR CURRENT ( 1 ) )
   M 1 : db_ctrl 0   src_frame 0 , r_source 1
1308 1 : TO DESCRIPTOR_BUS ( NAME_CACHE_1 ( NAME_TRAP ) ) ,
   M 1 :  dev_cmd 49 , nb_ctrl 2   ,
1309 1 : LONG_GOTO L_VEC_END
   M 1 : nac 6 , lit14 L_VEC_END
1309 1 : ;
1312 1 : LOAD_WEIRD_BASE :
1313 1 : OFF_ALU_OUT = LIT32 ( @20000000@ ) OR CURRENT ( 4 ) ,
   M 1 :    alu_in 3 , 1 1 , lit32 @20000000@ alu_op 5  src_frame
   M 1 : 0 , r_source 4 ,
1314 1 : LOAD_OFF ( CURRENT ( 4 ) ) WITH OFFSET
   M 1 : dest_frame 0 , r_dest 4 , r_w 1  o_in   3
1314 1 : ;
1316 1 : OFF_ALU_OUT = LIT32 ( @10000000@ ) XOR CURRENT ( 5 ) ,
   M 1 :    alu_in 3 , 1 1 , lit32 @10000000@ alu_op 4  src_frame
   M 1 : 0 , r_source 5 ,
1317 1 : LOAD ( ACCUMULATOR ) WITH OFFSET
   M 1 : a_w 1 , o_in   3
1317 1 : ;
1319 1 : OFF_ALU_OUT = ZERO OR CURRENT ( 2 ) ,
   M 1 :    alu_in 2 , rand 2  alu_op 5  src_frame 0 , r_source 2 ,
1320 1 :*LOAD ( ACCUMULATOR ) WITH OFFSET ,
   M 1 : a_w 1 , o_in   3 ,
1321 1 : CASE ON ACC_BYTE ( 0 ) MASK WITH ROTATE ( 6 )
   M 1 : nac 5   src 4   mask @1C@ sc 1
```

```
1321 1 : ;
1324 1 : OFF_ALU_OUT = ACC OR COMMON ( aCa , 5 ) ,
   M 1 :    alu_in 2  alu_op 5  src_frame 2 , r_source 5 , com_ext aCa ,
1325 1 : LOAD_OFF ( CURRENT ( 2 ) ) WITH OFFSET ,
   M 1 : dest_frame 0 , r_dest 2 , r_w 1   o_in   3 ,
1326 1 : LOAD ( ACCUMULATOR ) WITH OFFSET ,
   M 1 : a_w 1 , o_in   3 ,
1327 1 : LONG_GOTO WEIRD_BASE_011
   M 1 : nac 6 , lit14  WEIRD_BASE_011
1327 1 : ;
1330 1 : OFF_ALU_OUT = ACC OR COMMON ( aCa , 5 ) ,
   M 1 :    alu_in 2  alu_op 5  src_frame 2 , r_source 5 , com_ext aCa ,
1331 1 : LOAD_OFF ( CURRENT ( 2 ) ) WITH OFFSET ,
   M 1 : dest_frame 0 , r_dest 2 , r_w 1   o_in   3 ,
1332 1 : LOAD ( ACCUMULATOR ) WITH OFFSET ,
   M 1 : a_w 1 , o_in   3 ,
1333 1 : LONG_GOTO WEIRD_BASE_010
   M 1 : nac 6 , lit14  WEIRD_BASE_010
1335 1 : ;
1336 1 : OFF_ALU_OUT = ACC OR COMMON ( aCa , 5 ) ,
   M 1 :    alu_in 2  alu_op 5  src_frame 2 , r_source 5 , com_ext aCa ,
1337 1 : LOAD_OFF ( CURRENT ( 2 ) ) WITH OFFSET ,
   M 1 : dest_frame 0 , r_dest 2 , r_w 1   o_in   3 ,
1338 1 : LOAD ( ACCUMULATOR ) WITH OFFSET ,
   M 1 : a_w 1 , o_in   3 ,
1339 1 : LONG_GOTO WEIRD_BASE_001
   M 1 : nac 6 , lit14  WEIRD_BASE_001
1339 1 : ;
1342 1 : OFF_ALU_OUT = ACC OR COMMON ( aCa , 5 ) ,
   M 1 :    alu_in 2  alu_op 5  src_frame 2 , r_source 5 , com_ext aCa ,
1343 1 : LOAD_OFF ( CURRENT ( 2 ) ) WITH OFFSET ,
   M 1 : dest_frame 0 , r_dest 2 , r_w 1   o_in   3 ,
1344 1 : LOAD ( ACCUMULATOR ) WITH OFFSET ,
   M 1 : a_w 1 , o_in   3 ,
1345 1 : LONG_GOTO WEIRD_BASE_000
   M 1 : nac 6 , lit14  WEIRD_BASE_000
1345 1 : ;
1348 1 : WEIRD_BASE_011 :
1349 1 : READ TO ACCUMULATOR USING OFF_ALU WITH CURRENT (
1349 1 : 6 ) CON_LENGTH ( 32 ) ,
   M 1 : mem 1   md 1   db_ctrl 1    src_frame 0 , r_source
   M 1 : 6  len_ctrl 6     ,
1350 1 : OFF_ALU_OUT = BIASED_LENGTH PLUS CURRENT ( 6 ) ,
   M 1 :    alu_in 1  alu_op 3  src_frame 0 , r_source 6 ,
1351 1 : LOAD_AON ( CURRENT ( 6 ) ) WITH 0 ,
   M 1 : dest_frame 0 , r_dest 6 , r_w 1   a_in   0 ,
1352 1 : LONG_GOTO B_VEC_IES_PWR2
   M 1 : nac 6 , lit14  B_VEC_IES_PWR2
1352 1 : ;
1355 1 : WEIRD_BASE_010 :
1356 1 : READ TO ACCUMULATOR USING OFF_ALU WITH CURRENT (
1356 1 : 6 ) CON_LENGTH ( 32 ) ,
   M 1 : mem 1   md 1   db_ctrl 1    src_frame 0 , r_source
   M 1 : 6  len_ctrl 6     ,
1357 1 : OFF_ALU_OUT = BIASED_LENGTH PLUS CURRENT ( 6 ) ,
   M 1 :    alu_in 1  alu_op 3  src_frame 0 , r_source 6 ,
1358 1 : LOAD_AON ( CURRENT ( 6 ) ) WITH 0 ,
   M 1 : dest_frame 0 , r_dest 6 , r_w 1   a_in   0 ,
1359 1 : LONG_GOTO B_VEC_IES_NAME
   M 1 : nac 6 , lit14  B_VEC_IES_NAME
1359 1 : ;
1362 1 : WEIRD_BASE_001 :
1363 1 : READ TO ACCUMULATOR USING OFF_ALU WITH CURRENT (
1363 1 : 6 ) CON_LENGTH ( 32 ) ,
   M 1 : mem 1   md 1   db_ctrl 1    src_frame 0 , r_source
   M 1 : 6  len_ctrl 6     ,
1364 1 : OFF_ALU_OUT = BIASED_LENGTH PLUS CURRENT ( 6 ) ,
   M 1 :    alu_in 1  alu_op 3  src_frame 0 , r_source 6 ,
1365 1 : LOAD_AON ( CURRENT ( 6 ) ) WITH 0 ,
   M 1 : dest_frame 0 , r_dest 6 , r_w 1   a_in   0 ,
1366 1 : LONG_GOTO B_VEC_IES_LIT
   M 1 : nac 6 , lit14  B_VEC_IES_LIT
1366 1 : ;
```

```
1369 1 : WEIRD_BASE_000 :
1370 1 : OFF_ALU_OUT = ZERO OR CURRENT ( 4 ) ,
   M 1 :    alu_in 2 , rand 2   alu_op 5   src_frame 0 , r_source 4 ,
1371 1 : LOAD ( ACCUMULATOR ) WITH OFFSET ,
   M 1 : a_w 1 , o_in    3 ,
1372 1 : CASE ON ACC_BYTE ( 2 ) MASK @C0@ ROTATE ( 3 )
   M 1 : nac 3   srce 6    mask @C0@  sc 4
1372 1 : ;
1375 1 : OFF_ALU_OUT = LIT16 ( @2000@ ) XOR CURRENT ( 2 ) ,
   M 1 :    alu_in 3 , 1 0 , lit16 @2000@   alu_op 4   src_frame
   M 1 : 0 , r_source 2 ,
1376 1 : LOAD_OFF ( CURRENT ( 2 ) ) WITH OFFSET
   M 1 : dest_frame 0 , r_dest 2 , r_w 1  o_in    3
1376 1 : ;
1378 1 : SOURCE ( OFF_ALU WITH COMMON ( @D@ , 1 ) )
   M 1 : db_ctrl 1    src_frame 2 , r_source 1 , com_ext @D@
1379 1 : TO DESCRIPTOR_BUS ( NAME_CACHE_0 ( NAME_TRAP ) ) ,
   M 1 :  dev_cmd 48 , nb_ctrl 2     ,
1380 1 : OFF_ALU_OUT = ACC MINUS COMMON ( @D@ , 1 ) ,
   M 1 :    alu_in 2  alu_op 2  src_frame 2 , r_source 1 , com_ext @D@ ,
1381 1 : LOAD_OFF ( CURRENT ( 4 ) ) WITH OFFSET ,
   M 1 : dest_frame 0 , r_dest 4 , r_w 1  o_in    3 ,
1382 1 : LOAD ( ACCUMULATOR ) WITH OFFSET ,
   M 1 : a_w 1 , o_in    3 ,
1383 1 : TEST_TO_CC ( OFF_SIGN_EQ_1 ) ,
   M 1 : rand 10 , test 3 , lit8 1   ,
1384 1 : GOTO LOAD_NC_2
   M 1 : nac 4 , lit8  LOAD_NC_2
1384 1 : ;
1387 1 : OFF_ALU_OUT = LIT16 ( @2000@ ) XOR CURRENT ( 2 ) ,
   M 1 :    alu_in 3 , 1 0 , lit16 @2000@   alu_op 4   src_frame
   M 1 : 0 , r_source 2 ,
1388 1 : LOAD_OFF ( CURRENT ( 2 ) ) WITH OFFSET
   M 1 : dest_frame 0 , r_dest 2 , r_w 1  o_in    3
1388 1 : ;
1390 1 : SOURCE ( OFF_ALU WITH COMMON ( @D@ , 1 ) )
   M 1 : db_ctrl 1    src_frame 2 , r_source 1 , com_ext @D@
1391 1 : TO DESCRIPTOR_BUS ( NAME_CACHE_0 ( NAME_TRAP ) ) ,
   M 1 :  dev_cmd 48 , nb_ctrl 2     ,
1392 1 : OFF_ALU_OUT = ACC MINUS COMMON ( @D@ , 1 ) ,
   M 1 :    alu_in 2  alu_op 2  src_frame 2 , r_source 1 , com_ext @D@ ,
1393 1 : LOAD_OFF ( CURRENT ( 4 ) ) WITH OFFSET ,
   M 1 : dest_frame 0 , r_dest 4 , r_w 1  o_in    3 ,
1394 1 : LOAD ( ACCUMULATOR ) WITH OFFSET ,
   M 1 : a_w 1 , o_in    3 ,
1395 1 : TEST_TO_CC ( OFF_SIGN_EQ_1 ) ,
   M 1 : rand 10 , test 3 , lit8 1   ,
1396 1 : GOTO LOAD_NC_2
   M 1 : nac 4 , lit8  LOAD_NC_2
1396 1 : ;
1399 1 : OFF_ALU_OUT = LIT16 ( @4000@ ) OR CURRENT ( 2 ) ,
   M 1 :    alu_in 3 , 1 0 , lit16 @4000@   alu_op 5   src_frame
   M 1 : 0 , r_source 2 ,
1400 1 : LOAD_OFF ( CURRENT ( 2 ) ) WITH OFFSET
   M 1 : dest_frame 0 , r_dest 2 , r_w 1  o_in    3
1400 1 : ;
1402 1 : SOURCE ( OFF_ALU WITH COMMON ( @D@ , 1 ) )
   M 1 : db_ctrl 1    src_frame 2 , r_source 1 , com_ext @D@
1403 1 : TO DESCRIPTOR_BUS ( NAME_CACHE_0 ( NAME_TRAP ) ) ,
   M 1 :  dev_cmd 48 , nb_ctrl 2     ,
1404 1 : OFF_ALU_OUT = ACC MINUS COMMON ( @D@ , 1 ) ,
   M 1 :    alu_in 2  alu_op 2  src_frame 2 , r_source 1 , com_ext @D@ ,
1405 1 : LOAD_OFF ( CURRENT ( 4 ) ) WITH OFFSET ,
   M 1 : dest_frame 0 , r_dest 4 , r_w 1  o_in    3 ,
1406 1 : LOAD ( ACCUMULATOR ) WITH OFFSET ,
   M 1 : a_w 1 , o_in    3 ,
1407 1 : TEST_TO_CC ( OFF_SIGN_EQ_1 ) ,
   M 1 : rand 10 , test 3 , lit8 1   ,
1408 1 : GOTO LOAD_NC_2
   M 1 : nac 4 , lit8  LOAD_NC_2
1408 1 : ;
1411 1 : SOURCE ( DESCRIPTOR CURRENT ( 4 ) )
   M 1 : db_ctrl 0   src_frame 0 , r_source 4
```

```
1412 1 : TO DESCRIPTOR_BUS ( NAME_CACHE_0 ( NAME_TRAP ) ) ,
   M 1 :   dev_cmd 48 , nb_ctrl 2    ,
1413 1 : OFF_ALU_OUT = ACC OR CURRENT ( 4 ) ,
   M 1 :    alu_in 2  alu_op 5  src_frame 0 , r_source 4  ,
1414 1 : TEST_TO_CC ( OFF_SIGN_EQ_1 ) ,
   M 1 : rand 10 , test 3  , lit8 1    ,
1415 1 : GOTO LOAD_NC_2
   M 1 : nac 4 , lit8  LOAD_NC_2
1415 1 : ;
1417 1 : LOAD_NC_2 :
1418 1 : SOURCE ( DESCRIPTOR CURRENT ( 2 ) )
   M 1 : db_ctrl 0    src_frame 0 , r_source 2
1419 1 : TO DESCRIPTOR_BUS ( NAME_CACHE_2 ( NAME_TRAP ) ) ,
   M 1 :   dev_cmd 50 , nb_ctrl 2    ,
1420 1 : CASE ON ACC_BYTE ( 0 ) MASK @40@ ROTATE ( 3 )
   M 1 : nac 3    srce 4    mask  @40@ sc 4
1420 1 : ;
1422 1 : LOAD_NC_3 :
1423 1 : SOURCE ( DESCRIPTOR PREVIOUS ( 0 ) )
   M 1 : db_ctrl 0    src_frame 3 , r_source 0
1424 1 : TO DESCRIPTOR_BUS ( NAME_CACHE_3 ( NAME_TRAP ) ) ,
   M 1 :   dev_cmd 51 , nb_ctrl 2    ,
1425 1 : LOAD_AON ( CURRENT ( 6 ) ) WITH 0 ,
   M 1 : dest_frame 0 , r_dest 6 , r_w 1   a_in    0 ,
1426 1 : IF CC THEN GOTO L_NAME_ABR
   M 1 : test  13 , polarity 1    nac 4 , lit8  L_NAME_ABR
1426 1 : ;
1428 1 : OFF_ALU_OUT = ACC ZERO_HI OR COMMON ( @B@ , 0 ) ,
   M 1 :    alu_in 2   dev_cmd 3  alu_op 5  src_frame 2 , r_source
   M 1 : 0 , com_ext @B@  ,
1429 1 : LOAD_LEN ( PREVIOUS ( 0 ) ) WITH OFF ,
   M 1 : dest_frame 3 , r_dest 0 , r_w 1   l_in    3 , db_ctrl 1   ,
1430 1 : CASE ON ACC_BYTE ( 0 ) MASK @70@ ROTATE ( 4 )
   M 1 : nac 3    srce 4    mask  @70@ sc 3
1430 1 : ;
1432 1 : SOURCE ( DESCRIPTOR CURRENT ( 1 ) )
   M 1 : db_ctrl 0    src_frame 0 , r_source 1
1433 1 : TO DESCRIPTOR_BUS ( NAME_CACHE_1 ( NAME_TRAP ) ) ,
   M 1 :   dev_cmd 49 , nb_ctrl 2    ,
1434 1 : LONG_GOTO LOAD_NC_3
   M 1 : nac 6 , lit14  LOAD_NC_3
1434 1 : ;
1437 1 : READ TO ACCUMULATOR USING DESCRIPTOR CURRENT ( 2
1437 1 : ) CON_LENGTH ( 32 ) ,
   M 1 : mem 1    md 1    db_ctrl 0    src_frame 0 , r_source 2   len_ctrl 6   ,
1438 1 : LONG_GOTO BASE_ENC_IND
   M 1 : nac 6 , lit14  BASE_ENC_IND
1438 1 : ;
1441 1 : OFF_ALU_OUT = ZERO OR CURRENT ( 2 ) ,
   M 1 :    alu_in 2 , rand 2   alu_op 5  src_frame 0 , r_source 2  ,
1442 1 : LOAD ( ACCUMULATOR ) WITH OFFSET ,
   M 1 : a_w 1 , o_in    3 ,
1443 1 : LONG_GOTO BASE_NAME
   M 1 : nac 6 , lit14  BASE_NAME
1443 1 : ;
1446 1 : OFF_ALU_OUT = ZERO OR CURRENT ( 2 ) ,
   M 1 :    alu_in 2 , rand 2   alu_op 5  src_frame 0 , r_source 2  ,
1447 1 : LOAD ( ACCUMULATOR ) WITH OFFSET ,
   M 1 : a_w 1 , o_in    3 ,
1448 1 : LONG_GOTO BASE_NAME_IND
   M 1 : nac 6 , lit14  BASE_NAME_IND
1448 1 : ;
1451 1 : NOP
   M 1 : timing 0
1451 1 : ;
1454 1 : READ TO ACCUMULATOR USING DESCRIPTOR CURRENT ( 2
1454 1 : ) CON_LENGTH ( 32 ) ,
   M 1 : mem 1    md 1    db_ctrl 0    src_frame 0 , r_source 2   len_ctrl 6   ,
1455 1 : LONG_GOTO L_V_BASE_ENC_IN
   M 1 : nac 6 , lit14  L_V_BASE_ENC_IN
1455 1 : ;
1458 1 : OFF_ALU_OUT = ZERO OR CURRENT ( 2 ) ,
```

```
         M 1 :    alu_in 2 , rand 2  alu_op 5  src_frame 0 , r_source 2 ,
      1459 1 : LOAD ( ACCUMULATOR ) WITH OFFSET ,
         M 1 : a_w 1 , o_in    3 ,
      1460 1 : LONG_GOTO V_BASE_NAME
         M 1 : nac 6 , lit14  V_BASE_NAME
      1460 1 : ;
      1463 1 : OFF_ALU_OUT = ZERO OR CURRENT ( 2 ) ,
         M 1 :    alu_in 2 , rand 2  alu_op 5  src_frame 0 , r_source 2 ,
      1464 1 : LOAD ( ACCUMULATOR ) WITH OFFSET ,
         M 1 : a_w 1 , o_in    3 ,
      1465 1 : LONG_GOTO V_BASE_NAME_IND
         M 1 : nac 6 , lit14  V_BASE_NAME_IND
      1465 1 : ;
      1467 1 : B_VEC_IES_LIT :
      1468 1 : OFF_ALU_OUT = LIT32 ( ⍺40000000⍺ ) OR CURRENT ( 4 ) ,
         M 1 :    alu_in 3 , 1 1 , lit32 ⍺40000000⍺  alu_op 5  src_frame
         M 1 : 0 , r_source 4 ,
      1469 1 : LOAD_OFF ( CURRENT ( 4 ) ) WITH OFFSET
         M 1 : dest_frame 0 , r_dest 4 , r_w 1  o_in    3
      1469 1 : ;
      1471 1 : OFF_ALU_OUT = ACC OR COMMON ( ⍺B⍺ , 0 ) ,
         M 1 :    alu_in 2  alu_op 5  src_frame 2 , r_source 0 , com_ext ⍺B⍺ ,
      1472 1 : LOAD_OFF ( CURRENT ( 1 ) ) WITH OFFSET ,
         M 1 : dest_frame 0 , r_dest 1 , r_w 1  o_in    3 ,
      1473 1 : LOAD_LEN ( CURRENT ( 1 ) ) WITH LITERAL ( CON_LENGTH ( 32 ) ) ,
         M 1 : dest_frame 0 , r_dest 1 , r_w 1  l_in    1 , len_ctrl 6       ,
      1474 1 : CASE ON ACC_BYTE ( 2 ) MASK ⍺80⍺ ROTATE ( 1 )
         M 1 : nac 3   srce 6    mask ⍺80⍺  sc 6
      1474 1 : ;
      1477 1 : OFF_ALU_OUT = ZERO OR CURRENT ( 2 ) ,
         M 1 :    alu_in 2 , rand 2  alu_op 5  src_frame 0 , r_source 2 ,
      1478 1 : LOAD ( ACCUMULATOR ) WITH OFFSET ,
         M 1 : a_w 1 , o_in    3 ,
      1479 1 : LONG_GOTO WEIRD_BASE_000
         M 1 : nac 6 , lit14  WEIRD_BASE_000
      1479 1 : ;
      1482 1 : OFF_ALU_OUT = ACC XOR COMMON ( ⍺C⍺ , 6 ) ,
         M 1 :    alu_in 2  alu_op 4  src_frame 2 , r_source 6 , com_ext ⍺C⍺ ,
      1483 1 : LOAD_OFF ( CURRENT ( 1 ) ) WITH OFFSET ,
         M 1 : dest_frame 0 , r_dest 1 , r_w 1  o_in    3 ,
      1484 1 : LOAD_LEN ( CURRENT ( 1 ) ) WITH LITERAL ( LIT_LENGTH ( 34 ) )
         M 1 : dest_frame 0 , r_dest 1 , r_w 1  l_in    1 , len_ctrl
         M 1 : 15 , lit8 34 , nac 4 , test 15 , polarity 0
      1484 1 : ;
      1486 1 : OFF_ALU_OUT = ONE PLUS CURRENT ( 1 ) ,
         M 1 :    alu_in 2 , rand 3  alu_op 3  src_frame 0 , r_source 1 ,
      1487 1 : LOAD_OFF ( CURRENT ( 1 ) ) WITH OFFSET ,
         M 1 : dest_frame 0 , r_dest 1 , r_w 1  o_in    3 ,
      1488 1 : LONG_GOTO B_VEC_END
         M 1 : nac 6 , lit14  B_VEC_END
      1488 1 : ;
      1490 1 : B_VEC_IES_NAME :
      1491 1 : OFF_ALU_OUT = LIT32 ( ⍺40000000⍺ ) OR CURRENT ( 4 ) ,
         M 1 :    alu_in 3 , 1 1 , lit32 ⍺40000000⍺  alu_op 5  src_frame
         M 1 : 0 , r_source 4 ,
      1492 1 : LOAD_OFF ( CURRENT ( 4 ) ) WITH OFFSET
         M 1 : dest_frame 0 , r_dest 4 , r_w 1  o_in    3
      1492 1 : ;
      1494 1 : OFF_ALU_OUT = ACC OR COMMON ( ⍺B⍺ , 0 ) ,
         M 1 :    alu_in 2  alu_op 5  src_frame 2 , r_source 0 , com_ext ⍺B⍺ ,
      1495 1 : LOAD_OFF ( CURRENT ( 1 ) ) WITH OFFSET ,
         M 1 : dest_frame 0 , r_dest 1 , r_w 1  o_in    3 ,
      1496 1 : LOAD_LEN ( CURRENT ( 1 ) ) WITH LITERAL ( LIT_LENGTH ( 36 ) )
         M 1 : dest_frame 0 , r_dest 1 , r_w 1  l_in    1 , len_ctrl
         M 1 : 15 , lit8 36 , nac 4 , test 15 , polarity 0
      1496 1 : ;
      1498 1 : B_VEC_END :
      1499 1 : OFF_ALU_OUT = ZERO OR CURRENT ( 2 ) ,
         M 1 :    alu_in 2 , rand 2  alu_op 5  src_frame 0 , r_source 2 ,
      1500 1 : LOAD ( ACCUMULATOR ) WITH OFFSET ,
         M 1 : a_w 1 , o_in    3 ,
      1501 1 : LONG_GOTO WEIRD_BASE_000
         M 1 : nac 6 , lit14  WEIRD_BASE_000
```

```
1501 1 : ;
1503 1 : B_VEC_IFS_PWR2 :
1504 1 : OFF_ALU_OUT = LIT32 ( #40000000# ) OR CURRENT ( 4 ) ,
  M 1 :    alu_in 3 , 1 1 , lit32 #40000000# alu_op 5 src_frame
  M 1 : 0 , r_source 0 ,
1505 1 : LOAD_OFF ( CURRENT ( 4 ) ) WITH OFFSET
  M 1 : dest_frame 0 , r_dest 4 , r_w 1  o_in   3
1505 1 : ;
1507 1 : OFF_ALU_OUT = ACC OR COMMON ( #B0 , 0 ) ,
  M 1 :    alu_in 2  alu_op 5  src_frame 2 , r_source 0 , com_ext #B0# ,
1508 1 : LOAD_OFF ( CURRENT ( 1 ) ) WITH OFFSET ,
  M 1 : dest_frame 0 , r_dest 1 , r_w 1  o_in   3  ,
1509 1 : LOAD_LEN ( CURRENT ( 1 ) ) WITH OFF ,
  M 1 : dest_frame 0 , r_dest 1 , r_w 1  l_in   3 , db_ctrl 1   ,
1510 1 : LONG_GOTO B_VEC_END
  M 1 : nac 6 , lit14  B_VEC_END
1510 1 : ;
1511 1 : END
1529 0 : BEGIN
1533 1 : ENTRY COMMON_WEIRD_HI :
1534 1 : LOAD_ADN ( PREVIOUS ( 0 ) ) WITH ADN ( NAME_CACHE_3
 534 1 : ( NAME_TRAP ) ) ,
  M 1 : dest_frame 3 , r_dest 0 , r_w 1  a_in   1 , dev_cmd
  M 1 : 55 , nb_ctrl 2    ,
1535 1 : LOAD_OFF ( PREVIOUS ( 0 ) ) WITH OFF ( NAME_CACHE_3
1535 1 : ( NAME_TRAP ) ) ,
  M 1 : dest_frame 3 , r_dest 0 , r_w 1  o_in   1 , dev_cmd
  M 1 : 55 , nb_ctrl 2    ,
1536 1 : CASE ON ACC_BYTE ( 0 ) MASK #F0# ROTATE ( 4 )
  M 1 : nac 3   srce 4   mask  #F0# sc 3
1536 1 : ;
1539 1 : BASE_DONE :
1540 1 : OFF_ALU_OUT = ZERO OR PREVIOUS ( 0 ) ,
  M 1 :    alu_in 2 , rand 2  alu_op 5  src_frame 3 , r_source 0 ,
1541 1 : LOAD ( ACCUMULATOR ) WITH OFFSET ,
  M 1 : a_w 1 , o_in   3  ,
1542 1 : LOAD_ADN ( CURRENT ( 0 ) ) WITH 0 ,
  M 1 : dest_frame 0 , r_dest 0 , r_w 1  a_in   0 ,
1543 1 : RETURN
  M 1 : nac 2
1543 1 : ;
1546 1 : READ TO ACCUMULATOR
  M 1 : mem 1   md 1
1547 1 : USING DESCRIPTOR NAME_CACHE_2 ( NAME_TRAP ) , CON_LENGTH ( 32 ) ,
  M 1 : db_ctrl 0  dev_cmd 54 , nb_ctrl 2   , len_ctrl 6    ,
1548 1 : LOAD_OFF ( CURRENT ( 2 ) ) WITH OFF ( NAME_CACHE_2
1548 1 : ( NAME_TRAP ) ) ,
  M 1 : dest_frame 0 , r_dest 2 , r_w 1  o_in   1 , dev_cmd
  M 1 : 54 , nb_ctrl 2    ,
1549 1 : LOAD_ADN ( CURRENT ( 2 ) ) WITH ADN ( NAME_CACHE_2
1549 1 : ( NAME_TRAP ) ) ,
  M 1 : dest_frame 0 , r_dest 2 , r_w 1  a_in   1 , dev_cmd
  M 1 : 54 , nb_ctrl 2    ,
1550 1 : LONG_GOTO BASE_END_IND
  M 1 : nac 6 , lit14  BASE_END_IND
1550 1 : ;
1553 1 : LOAD_OFF ( CURRENT ( 2 ) ) WITH OFF ( NAME_CACHE_2
1553 1 : ( NAME_TRAP ) ) ,
  M 1 : dest_frame 0 , r_dest 2 , r_w 1  o_in   1 , dev_cmd
  M 1 : 54 , nb_ctrl 2    ,
1554 1 : LOAD ( ACCUMULATOR ) WITH OFF ( NAME_CACHE_2 ( NAME_TRAP ) ) ,
  M 1 : a_w 1 , o_in   1 , dev_cmd 54 , nb_ctrl 2    ,
1555 1 : LONG_GOTO BASE_NAME
  M 1 : nac 6 , lit14  BASE_NAME
1555 1 : ;
1558 1 : LOAD_OFF ( CURRENT ( 2 ) ) WITH OFF ( NAME_CACHE_2
1558 1 : ( NAME_TRAP ) ) ,
  M 1 : dest_frame 0 , r_dest 2 , r_w 1  o_in   1 , dev_cmd
  M 1 : 54 , nb_ctrl 2    ,
1559 1 : LOAD ( ACCUMULATOR ) WITH OFF ( NAME_CACHE_2 ( NAME_TRAP ) ) ,
  M 1 : a_w 1 , o_in   1 , dev_cmd 54 , nb_ctrl 2    ,
1560 1 : LONG_GOTO BASE_NAME_IND
  M 1 : nac 6 , lit14  BASE_NAME_IND
1560 1 : ;
```

```
1563 1 : LOAD_OFF ( CURRENT ( 1 ) ) WITH OFF ( NAME_CACHE_1
1563 1 : ( NAME_TRAP ) ) ,
   M 1 : dest_frame 0 , r_dest 1 , r_w 1   o_in   1 , dev_cmd
   M 1 : 53 , nb_ctrl 2     ,
1564 1 : LOAD ( ACCUMULATOR ) WITH OFF ( NAME_CACHE_1 ( NAME_TRAP ) ) ,
   M 1 : a_w 1 , o_in    1 , dev_cmd 53 , nb_ctrl 2     ,
1565 1 : LOAD_LEN ( CURRENT ( 1 ) ) WITH LEN ( NAME_CACHE_1
1565 1 : ( NAME_TRAP ) ) ,
   M 1 : dest_frame 0 , r_dest 1 , r_w 1   l_in   1 , dev_cmd
   M 1 : 53 , nb_ctrl 2     ,
1566 1 : LONG_GOTO WEIRD_VECTOR
   M 1 : nac 6 , lit14  WEIRD_VECTOR
1566 1 : ;
1569 1 : LOAD_OFF ( CURRENT ( 1 ) ) WITH OFF ( NAME_CACHE_1
1569 1 : ( NAME_TRAP ) ) ,
   M 1 : dest_frame 0 , r_dest 1 , r_w 1   o_in   1 , dev_cmd
   M 1 : 53 , nb_ctrl 2     ,
1570 1 : LOAD_LEN ( CURRENT ( 1 ) ) WITH LEN ( NAME_CACHE_1
1570 1 : ( NAME_TRAP ) ) ,
   M 1 : dest_frame 0 , r_dest 1 , r_w 1   l_in   1 , dev_cmd
   M 1 : 53 , nb_ctrl 2     ,
1571 1 : LONG_GOTO VEC_BASE_ENC_IN
   M 1 : nac 6 , lit14  VEC_BASE_ENC_IN
1571 1 : ;
1574 1 : LOAD_OFF ( CURRENT ( 1 ) ) WITH OFF ( NAME_CACHE_1
1574 1 : ( NAME_TRAP ) ) ,
   M 1 : dest_frame 0 , r_dest 1 , r_w 1   o_in   1 , dev_cmd
   M 1 : 53 , nb_ctrl 2     ,
1575 1 : LOAD_LEN ( CURRENT ( 1 ) ) WITH LEN ( NAME_CACHE_1
1575 1 : ( NAME_TRAP ) ) ,
   M 1 : dest_frame 0 , r_dest 1 , r_w 1   l_in   1 , dev_cmd
   M 1 : 53 , nb_ctrl 2     ,
1576 1 : LONG_GOTO VEC_BASE_NAME
   M 1 : nac 6 , lit14  VEC_BASE_NAME
1576 1 : ;
1579 1 : LOAD_OFF ( CURRENT ( 1 ) ) WITH OFF ( NAME_CACHE_1
1579 1 : ( NAME_TRAP ) ) ,
   M 1 : dest_frame 0 , r_dest 1 , r_w 1   o_in   1 , dev_cmd
   M 1 : 53 , nb_ctrl 2     ,
1580 1 : LOAD_LEN ( CURRENT ( 1 ) ) WITH LEN ( NAME_CACHE_1
1580 1 : ( NAME_TRAP ) ) ,
   M 1 : dest_frame 0 , r_dest 1 , r_w 1   l_in   1 , dev_cmd
   M 1 : 53 , nb_ctrl 2     ,
1581 1 : LONG_GOTO VEC_BASE_NAME_I
   M 1 : nac 6 , lit14  VEC_BASE_NAME_I
1581 1 : ;
1584 1 : L_NAME_ABR :
1585 1 : OFF_ALU_OUT = ACC OP COMMON ( "B" , 0 ) ,
   M 1 :    alu_in 2  alu_op 5  src_frame 2 , r_source 0 , com_ext 2BA ,
1586 1 : LOAD_OFF ( CURRENT ( 7 ) ) WITH OFFSET ,
   M 1 : dest_frame 0 , r_dest 7 , r_w 1   o_in   3 ,
1587 1 : SOURCE ( OFF_ALU_15_16 ) TO NAME_BUS ( NAME_TRAP ) ,
   M 1 : nb_ctrl 0    dev_cmd 117   ,
1588 1 : LONG_GOTO LEN_IS_A_NAME
   M 1 : nac 6 , lit14  LEN_IS_A_NAME
1588 1 : ;
1591 1 : L_NAME_B_IND :
1592 1 : LOAD_OFF ( CURRENT ( 2 ) ) WITH OFF ( NAME_CACHE_2
1592 1 : ( NAME_TRAP ) ) ,
   M 1 : dest_frame 0 , r_dest 2 , r_w 1   o_in   1 , dev_cmd
   M 1 : 54 , nb_ctrl 2     ,
1593 1 : LOAD_ADN ( CURRENT ( 2 ) ) WITH ADN ( NAME_CACHE_2
1593 1 : ( NAME_TRAP ) ) ,
   M 1 : dest_frame 0 , r_dest 2 , r_w 1   a_in   1 , dev_cmd
   M 1 : 54 , nb_ctrl 2     ,
1594 1 : LONG_GOTO L_NAME_ABR
   M 1 : nac 6 , lit14  L_NAME_ABR
1594 1 : ;
1597 1 : L_NAME_BASE :
1598 1 : LOAD_OFF ( CURRENT ( 2 ) ) WITH OFF ( NAME_CACHE_2
1598 1 : ( NAME_TRAP ) ) ,
   M 1 : dest_frame 0 , r_dest 2 , r_w 1   o_in   1 , dev_cmd
```

```
  M 1 : 54 , nb_ctrl 2    ,
1599 1 : LONG_GOTO L_NAME_ABR
  M 1 : nac 6 , lit14  L_NAME_ABR
1599 1 : ;
1602 1 : LOAD_OFF ( CURRENT ( 2 ) ) WITH OFF ( NAME_CACHE_2
1602 1 : ( NAME_TRAP ) ) ,
  M 1 : dest_frame 0 , r_dest 2 , r_w 1  o_in   1 , dev_cmd
  M 1 : 54 , nb_ctrl 2    ,
1603 1 : LONG_GOTO L_NAME_ABR
  M 1 : nac 6 , lit14  L_NAME_ABR
1603 1 : ;
1606 1 : LOAD_OFF ( CURRENT ( 1 ) ) WITH OFF ( NAME_CACHE_1
1606 1 : ( NAME_TRAP ) ) ,
  M 1 : dest_frame 0 , r_dest 1 , r_w 1  o_in   1 , dev_cmd
  M 1 : 53 , nb_ctrl 2    ,
1607 1 : LOAD_LEN ( CURRENT ( 1 ) ) WITH LEN ( NAME_CACHE_1
1607 1 : ( NAME_TRAP ) ) ,
  M 1 : dest_frame 0 , r_dest 1 , r_w 1  l_in   1 , dev_cmd
  M 1 : 53 , nb_ctrl 2    ,
1608 1 : LONG_GOTO L_NAME_ABR
  M 1 : nac 6 , lit14  L_NAME_ABR
1608 1 : ;
1611 1 : LOAD_OFF ( CURRENT ( 1 ) ) WITH OFF ( NAME_CACHE_1
1611 1 : ( NAME_TRAP ) ) ,
  M 1 : dest_frame 0 , r_dest 1 , r_w 1  o_in   1 , dev_cmd
  M 1 : 53 , nb_ctrl 2    ,
1612 1 : LOAD_LEN ( CURRENT ( 1 ) ) WITH LEN ( NAME_CACHE_1
1612 1 : ( NAME_TRAP ) ) ,
  M 1 : dest_frame 0 , r_dest 1 , r_w 1  l_in   1 , dev_cmd
  M 1 : 53 , nb_ctrl 2    ,
1613 1 : LONG_GOTO L_NAME_B_IND
  M 1 : nac 6 , lit14  L_NAME_B_IND
1613 1 : ;
1616 1 : LOAD_OFF ( CURRENT ( 1 ) ) WITH OFF ( NAME_CACHE_1
1616 1 : ( NAME_TRAP ) ) ,
  M 1 : dest_frame 0 , r_dest 1 , r_w 1  o_in   1 , dev_cmd
  M 1 : 53 , nb_ctrl 2    ,
1617 1 : LOAD_LEN ( CURRENT ( 1 ) ) WITH LEN ( NAME_CACHE_1
1617 1 : ( NAME_TRAP ) ) ,
  M 1 : dest_frame 0 , r_dest 1 , r_w 1  l_in   1 , dev_cmd
  M 1 : 53 , nb_ctrl 2    ,
1618 1 : LONG_GOTO L_NAME_BASE
  M 1 : nac 6 , lit14  L_NAME_BASE
1618 1 : ;
1621 1 : LOAD_OFF ( CURRENT ( 1 ) ) WITH OFF ( NAME_CACHE_1
1621 1 : ( NAME_TRAP ) ) ,
  M 1 : dest_frame 0 , r_dest 1 , r_w 1  o_in   1 , dev_cmd
  M 1 : 53 , nb_ctrl 2    ,
1622 1 : LOAD_LEN ( CURRENT ( 1 ) ) WITH LEN ( NAME_CACHE_1
1622 1 : ( NAME_TRAP ) ) ,
  M 1 : dest_frame 0 , r_dest 1 , r_w 1  l_in   1 , dev_cmd
  M 1 : 53 , nb_ctrl 2    ,
1623 1 : LONG_GOTO L_NAME_BASE
  M 1 : nac 6 , lit14  L_NAME_BASE
1623 1 : ;
1626 1 : LEN_IS_A_NAME :
1627 1 : RESOLVE ( 0 , NAME_TRAP )
  M 1 : mem 0 , nac 0 , snac 4 , dest_frame 0 , r_dest 0
  M 1 : , r_w 1 , nb_ctrl 2 , l_in 1 , o_in 1 , a_in 1 , a_w 1
1627 1 : ;
1629 1 : READ TO ACCUMULATOR USING DESCRIPTOR CURRENT ( 0 ) BIAS_LENGTH
  M 1 : mem 1   md 1   db_ctrl 0   src_frame 0 , r_source 0  len_ctrl 12
1629 1 : ;
1641 1 : DISABLE_ADD_WRT ,
  M 1 : rand 8 ,
1642 1 : OFF_ALU_OUT = ACC OR COMMON ( WRD , 0 ) ,
  M 1 :    alu_in 2  alu_op 5  src_frame 2 , r_source 0 , com_ext 282 ,
1643 1 : LOAD_LEN ( PREVIOUS ( 0 ) ) WITH OFF
  M 1 : dest_frame 3 , r_dest 0 , r_w 1  l_in   3 , db_ctrl 1
1643 1 : ;
1645 1 : OFF_ALU_OUT = ZERO OR CURRENT ( 7 ) ,
  M 1 :    alu_in 2 , rand 2  alu_op 5  src_frame 0 , r_source 7 ,
1646 1 : LOAD ( ACCUMULATOR ) WITH OFFSET ,
```

```
       M 1 : a_w 1 , o_in    3 ,
    1647 1 : LOAD_AUN ( CURRENT ( 0 ) ) WITH 0
       M 1 : dest_frame 0 , r_dest 0 , r_w 1  a_in    0
    1647 1 : ;
    1649 1 : OFF_ALU_OUT = ZERO OR CURRENT ( 2 ) ,
       M 1 :    alu_in 2 , rand 2  alu_op 5  src_frame 0 , r_source 2 ,
    1650 1 : LOAD ( ACCUMULATOR ) WITH OFFSET ,
       M 1 : a_w 1 , o_in    3 ,
    1651 1 : CASE ON ACC_BYTE ( 0 ) MASK a70a ROTATE ( 4 )
       M 1 : nac 3   srce 0   mask  a70a sc 3
    1651 1 : ;
    1654 1 : OFF_ALU_OUT = ZERO OR PREVIOUS ( 0 ) ,
       M 1 :    alu_in 2 , rand 2  alu_op 5  src_frame 3 , r_source 0 ,
    1655 1 : LOAD ( ACCUMULATOR ) WITH OFFSET ,
       M 1 : a_w 1 , o_in    3 ,
    1656 1 : RETURN
       M 1 : nac 2
    1656 1 : ;
    1659 1 : READ TO ACCUMULATOR USING DESCRIPTOR CURRENT ( 2
    1659 1 : ) CON_LENGTH ( 32 ) ,
       M 1 : mem 1   md 1   db_ctrl 0  src_frame 0 , r_source 2  len_ctrl 6     ,
    1660 1 : LONG_GOTO BASE_ENC_IND
       M 1 : nac 6 , lit14  BASE_ENC_IND
    1660 1 : ;
    1663 1 : OFF_ALU_OUT = ACC ZERO_LO OR COMMON ( aBa , 0 ) ,
       M 1 :    alu_in 2  dev_cmd 2  alu_op 5  src_frame 2 , r_source
       M 1 : 0 , com_ext aBa ,
    1664 1 : LOAD_OFF ( CURRENT ( 6 ) ) WITH OFFSET ,
       M 1 : dest_frame 0 , r_dest 0 , r_w 1  o_in   3 ,
    1665 1 : LONG_GOTO L_BASE_NAME
       M 1 : nac 6 , lit14  L_BASE_NAME
    1665 1 : ;
    1668 1 : OFF_ALU_OUT = ACC ZERO_LO OR COMMON ( aBa , 0 ) ,
       M 1 :    alu_in 2  dev_cmd 2  alu_op 5  src_frame 2 , r_source
       M 1 : 0 , com_ext aBa ,
    1669 1 : LOAD_OFF ( CURRENT ( 6 ) ) WITH OFFSET ,
       M 1 : dest_frame 0 , r_dest 0 , r_w 1  o_in   3 ,
    1670 1 : LONG_GOTO L_BASE_NAME_IND
       M 1 : nac 6 , lit14  L_BASE_NAME_IND
    1670 1 : ;
    1673 1 : OFF_ALU_OUT = ZERO OR CURRENT ( 1 ) ,
       M 1 :    alu_in 2 , rand 2  alu_op 5  src_frame 0 , r_source 1 ,
    1674 1 : LOAD ( ACCUMULATOR ) WITH OFFSET ,
       M 1 : a_w 1 , o_in   3 ,
    1675 1 : LONG_GOTO WEIRD_VECTOR
       M 1 : nac 6 , lit14  WEIRD_VECTOR
    1675 1 : ;
    1678 1 : READ TO ACCUMULATOR USING DESCRIPTOR CURRENT ( 2
    1678 1 : ) CON_LENGTH ( 32 ) ,
       M 1 : mem 1   md 1   db_ctrl 0  src_frame 0 , r_source 2  len_ctrl 6
    1679 1 : LONG_GOTO L_V_BASE_ENC_IN
       M 1 : nac 6 , lit14  L_V_BASE_ENC_IN
    1679 1 : ;
    1682 1 : OFF_ALU_OUT = ACC ZERO_LO OR COMMON ( aBa , 0 ) ,
       M 1 :    alu_in 2  dev_cmd 2  alu_op 5  src_frame 2 , r_source
       M 1 : 0 , com_ext aBa ,
    1683 1 : LOAD_OFF ( CURRENT ( 6 ) ) WITH OFFSET ,
       M 1 : dest_frame 0 , r_dest 0 , r_w 1  o_in   3 ,
    1684 1 : LONG_GOTO L_V_BASE_NAME
       M 1 : nac 6 , lit14  L_V_BASE_NAME
    1684 1 : ;
    1687 1 : OFF_ALU_OUT = ACC ZERO_LO OR COMMON ( aBa , 0 ) ,
       M 1 :    alu_in 2  dev_cmd 2  alu_op 5  src_frame 2 , r_source
       M 1 : 0 , com_ext aBa ,
    1688 1 : LOAD_OFF ( CURRENT ( 6 ) ) WITH OFFSET ,
       M 1 : dest_frame 0 , r_dest 0 , r_w 1  o_in   3 ,
    1689 1 : LONG_GOTO L_V_BASE_NAME_I
       M 1 : nac 6 , lit14  L_V_BASE_NAME_I
    1689 1 : ;
    1692 1 : BASE_ENC_IND :
    1693 1 : OFF_ALU_OUT = ACC PLUS PREVIOUS ( 0 ) ,
       M 1 :    alu_in 2  alu_op 3  src_frame 3 , r_source 0 ,
```

```
1694 1 : LOAD_OFF ( PREVIOUS ( 0 ) ) WTIH OFFSET ,
   M 1 : dest_frame 3 , r_dest 0 , r_w 1   o_in    3 ,
1695 1 : LOAD_AON ( PREVIOUS ( 0 ) ) WITH AON ( PREVIOUS ( 0 ) ) ,
   M 1 : dest_frame 3 , r_dest 0 , r_w 1   a_in    2 , src_frame
   M 1 : 3 , r_source 0     ,
1696 1 : CASE ON ACC_BYTE ( 0 ) MASK @80@ RUTATE ( 1 )
   M 1 : nac 3    srce 4    mask  @80@ sc 6
1696 1 : ;
1699 1 : OFF_ALU_OUT = ZERO OR PREVIOUS ( 0 ) ,
   M 1 :   alu_in 2 , rand 2   alu_op 5   src_frame 3 , r_source 0  ,
1700 1 : LOAD ( ACCUMULATOR ) WITH OFFSET ,
   M 1 : a_w 1 , o_in    3 ,
1701 1 : LOAD_AON ( CURRENT ( 2 ) ) WITH 0 ,
   M 1 : dest_frame 0 , r_dest 2 , r_w 1   a_in    0 ,
1702 1 : RETURN
   M 1 : nac 2
1702 1 : ;
1705 1 : OFF_ALU_OUT = ZERO OR CURRENT ( 2 ) , LOAD_OFF (
1705 1 : CURRENT ( 7 ) ) WITH OFFSET , LOAD_LEN ( CURRENT ( 7 ) )
   M 1 :   alu_in 2 , rand 2   alu_op 5   src_frame 0 , r_source
   M 1 : 2 , dest_frame 0 , r_dest 7 , r_w 1   o_in    3 ,
   M 1 : dest_frame 0 , r_dest 7 , r_w 1   l_in
1705 1 : WITH LEN ( CURRENT ( 2 ) ) , LOAD_AON ( CURRENT (
1705 1 : 7 ) ) WITH AON ( CURRENT ( 2 ) )
   M 1 :   2 , src_frame 0 , r_source 2    , dest_frame 0 ,
   M 1 : r_dest 7 , r_w 1   a_in    2 , src_frame 0 , r_source 2
1705 1 : ;
1707 1 : LOAD_OFF ( CURRENT ( 2 ) ) WITH AON ( PREVIOUS ( 0 ) ) ,
   M 1 : dest_frame 0 , r_dest 2 , r_w 1   o_in    2 , src_frame
   M 1 : 3 , r_source 0     ,
1708 1 : LOAD_AON ( CURRENT ( 2 ) ) WITH 0 ,
   M 1 : dest_frame 0 , r_dest 2 , r_w 1   a_in    0 ,
1709 1 : LONG_GOTO B_ENC_IND_END
   M 1 : nac 6 , lit14   B_ENC_IND_END
1709 1 : ;
1711 1 : VFC_BASE_ENC_IN :
1712 1 : READ TO ACCUMULATOR
   M 1 : mem 1    md 1
1713 1 : USING DESCRIPTUR NAME_CACHE_2 ( NAME_TRAP ) , CON_LENGTH ( 32 ) ,
   M 1 :   do_ctrl 0   dev_cmd 54 , no_ctrl 2   , len_ctrl 6   ,
1714 1 : LOAD_OFF ( CURRENT ( 2 ) ) WITH OFF ( NAME_CACHE_2
1714 1 : ( NAME_TRAP ) ) ,
   M 1 : dest_frame 0 , r_dest 2 , r_w 1   o_in    1 , dev_cmd
   M 1 : 54 , no_ctrl 2   ,
1715 1 : LOAD_AON ( CURRENT ( 2 ) ) WITH AON ( NAME_CACHE_2 ( NAME_TRAP ) )
   M 1 : dest_frame 0 , r_dest 2 , r_w 1   a_in    1 , dev_cmd
   M 1 : 54 , no_ctrl 2
1715 1 : ;
 717 1 : L_V_BASE_ENC_IN :
1718 1 : OFF_ALU_OUT = ACC PLUS PREVIOUS ( 0 ) ,
   M 1 :   alu_in 2   alu_op 3   src_frame 3 , r_source 0  ,
1719 1 : LOAD_OFF ( PREVIOUS ( 0 ) ) WITH OFFSET ,
   M 1 : dest_frame 3 , r_dest 0 , r_w 1   o_in    3 ,
1720 1 : LOAD_AON ( PREVIOUS ( 0 ) ) WITH AON ( PREVIOUS ( 0 ) ) ,
   M 1 : dest_frame 3 , r_dest 0 , r_w 1   a_in    2 , src_frame
   M 1 : 3 , r_source 0     ,
1721 1 : CASE ON ACC_BYTE ( 0 ) MASK @80@ RUTATE ( 1 )
   M 1 : nac 3    srce 4    mask  @80@ sc 6
1721 1 : ;
1724 1 : OFF_ALU_OUT = ZERO OR CURRENT ( 1 ) ,
   M 1 :   alu_in 2 , rand 2   alu_op 5   src_frame 0 , r_source 1  ,
1725 1 : LOAD ( ACCUMULATOR ) WITH OFFSET ,
   M 1 : a_w 1 , o_in    3 ,
1726 1 : LOAD_AON ( CURRENT ( 2 ) ) WITH 0 ,
   M 1 : dest_frame 0 , r_dest 2 , r_w 1   a_in    0 ,
1727 1 : LONG_GOTO WEIRD_VECTOR
   M 1 : nac 6 , lit14   WEIRD_VECTOR
1727 1 : ;
1730 1 : OFF_ALU_OUT = ZERO OR CURRENT ( 2 ) , LOAD_OFF (
1730 1 : CURRENT ( 7 ) ) WITH OFFSET , LOAD_LEN ( CURRENT ( 7 ) )
   M 1 :   alu_in 2 , rand 2   alu_op 5   src_frame 0 , r_source
   M 1 : 2 , dest_frame 0 , r_dest 7 , r_w 1   o_in    3 ,
   M 1 : dest_frame 0 , r_dest 7 , r_w 1   l_in
```

```
1730 1 : WITH LEN ( CURRENT ( 2 ) ) , LOAD_AON ( CURRENT (
1730 1 : 7 ) ) WITH AON ( CURRENT ( 2 ) )
   M 1 :  2 , src_frame 0 , r_source 2     , dest_frame 0 ,
   M 1 : r_dest 7 , r_w 1  a_in   2 , src_frame 0 , r_source 2
1730 1 : ;
1732 1 : LOAD_OFF ( CURRENT ( 2 ) ) WITH AON ( PREVIOUS ( 0 ) ) ,
   M 1 : dest_frame 0 , r_dest 2 , r_w 1  o_in   2 , src_frame
   M 1 : 3 , r_source 0      ,
1733 1 : LOAD_AON ( CURRENT ( 2 ) ) WITH 0 ,
   M 1 : dest_frame 0 , r_dest 2 , r_w 1  a_in    0 ,
1734 1 : LONG_GOTO V_B_ENC_IND_END
   M 1 : nac 6 , lit14  V_B_ENC_IND_END
1734 1 : ;
1737 1 : BASE_NAME :
1738 1 : OFF_ALU_OUT = ACC ZERO_LU OR COMMON ( dBd , 0 ) ,
   M 1 :    alu_in 2  dev_cmd 2  alu_op 5  src_frame 2 , r_source
   M 1 : 0 , com_ext dBd ,
1739 1 : LOAD_OFF ( CURRENT ( 6 ) ) WITH OFFSET
   M 1 : dest_frame 0 , r_dest 6 , r_w 1  o_in   3
1739 1 : ;
1741 1 : L_BASE_NAME :
1742 1 : OFF_ALU_OUT = ZERO OR CURRENT ( 2 ) ,
   M 1 :    alu_in 2 , rand 2  alu_op 5  src_frame 0 , r_source 2 ,
1743 1 : RESOLVE ( 0 , OFF_ALU_LS_16 )
   M 1 : mem 0 , nac 0 , snac 4 , dest_frame 0 , r_dest 0
   M 1 : , r_w 1 , nb_ctrl 0 , l_in 1 , o_in 1 , a_in 1 , a_w 1
1743 1 : ;
1745 1 : OFF_ALU_OUT = ACC PLUS PREVIOUS ( 0 ) ,
   M 1 :    alu_in 2  alu_op 3  src_frame 3 , r_source 0 ,
1746 1 : LOAD_OFF ( PREVIOUS ( 0 ) ) WITH OFFSET
   M 1 : dest_frame 3 , r_dest 0 , r_w 1  o_in    3
1746 1 : ;
1748 1 : LOAD ( ACCUMULATOR ) WITH AON ( CURRENT ( 0 ) )
   M 1 : a_w 1 , o_in    2 , src_frame 0 , r_source 0
1748 1 : ;
1750 1 : BASE_END :
1751 1 : INDIVISIBLE ,
   M 1 : rand 15 ,
1752 1 : OFF_ALU_OUT = ACC ZERO_HI OR CURRENT ( 6 ) ,
   M 1 :    alu_in 2  dev_cmd 3  alu_op 5  src_frame 0 , r_source 6 ,
1753 1 : LOAD_AON ( PREVIOUS ( 0 ) ) WITH OFFSET ,
   M 1 : dest_frame 3 , r_dest 0 , r_w 1  a_in   3 ,
1754 1 : LONG_GOTO BASE_DONE
   M 1 : nac 6 , lit14  BASE_DONE
1754 1 : ;
1757 1 : VEC_BASE_NAME :
1758 1 : LOAD_OFF ( CURRENT ( 2 ) ) WITH OFF ( NAME_CACHE_2
1758 1 : ( NAME_TRAP ) ) ,
   M 1 : dest_frame 0 , r_dest 2 , r_w 1  o_in   1 , dev_cmd
   M 1 : 54 , nb_ctrl 2   ,
1759 1 : LOAD ( ACCUMULATOR ) WITH OFF ( NAME_CACHE_2 ( NAME_TRAP ) )
   M 1 : a_w 1 , o_in    1 , dev_cmd 54 , nb_ctrl 2
1759 1 : ;
1761 1 : V_BASE_NAME :
1762 1 : OFF_ALU_OUT = ACC ZERO_LU OR COMMON ( dBd , 0 ) ,
   M 1 :    alu_in 2  dev_cmd 2  alu_op 5  src_frame 2 , r_source
   M 1 : 0 , com_ext dBd ,
1763 1 : LOAD_OFF ( CURRENT ( 6 ) ) WITH OFFSET
   M 1 : dest_frame 0 , r_dest 0 , r_w 1  o_in   3
1763 1 : ;
1765 1 : L_V_BASE_NAME :
1766 1 : OFF_ALU_OUT = ZERO OR CURRENT ( 2 ) ,
   M 1 :    alu_in 2  rand 2  alu_op 5  src_frame 0 , r_source 2 ,
1767 1 : RESOLVE ( 0 , OFF_ALU_LS_16 )
   M 1 : mem 0 , nac 0 , snac 4 , dest_frame 0 , r_dest 0
   M 1 : , r_w 1 , nb_ctrl 0 , l_in 1 , o_in 1 , a_in 1 , a_w 1
1767 1 : ;
1769 1 : OFF_ALU_OUT = ACC PLUS PREVIOUS ( 0 ) ,
   M 1 :    alu_in 2  alu_op 3  src_frame 3 , r_source 0 ,
1770 1 : LOAD_OFF ( PREVIOUS ( 0 ) ) WITH OFFSET
   M 1 : dest_frame 3 , r_dest 0 , r_w 1  o_in   3
1770 1 : ;
```

```
1772 1 : LOAD ( ACCUMULATOR ) WITH AON ( CURRENT ( 0 ) )
   M 1 : a_w 1 , o_in    2 , src_frame 0 , r_source 0
1772 1 : ;
1774 1 : VEC_BASE_END :
1775 1 : INDIVISIBLE ,
   M 1 : rand 15 ,
1776 1 : OFF_ALU_OUT = ACC ZERO_HI OR CURRENT ( 6 ) ,
   M 1 :    alu_in 2  dev_cmd 3  alu_op 5  src_frame 0 , r_source 6 ,
1777 1 : LOAD_AON ( PREVIOUS ( 0 ) ) WITH OFFSET
   M 1 : dest_frame 3 , r_dest 0 , r_w 1  a_in    5
1777 1 : ;
1779 1 : OFF_ALU_OUT = ZERO OR CURRENT ( 1 ) ,
   M 1 :    alu_in 2 , rand 2  alu_op 5  src_frame 0 , r_source 1 ,
1780 1 : LOAD ( ACCUMULATOR ) WITH OFFSET , .
   M 1 : a_w 1 , o_in    3 ,
1781 1 : LONG_GOTO WEIRD_VECTOR
   M 1 : nac 6 , lit14  WEIRD_VECTOR
1781 1 : ;
1784 1 : BASE_NAME_IND :
1785 1 : OFF_ALU_OUT = ACC ZERO_LO OR COMMON ( wBa , 0 ) ,
   M 1 :    alu_in 2  dev_cmd 2  alu_op 5  src_frame 2 , r_source
   M 1 : 0 , com_ext a8a ,
1786 1 : LOAD_OFF ( CURRENT ( 6 ) ) WITH OFFSET
   M 1 : dest_frame 0 , r_dest 6 , r_w 1  o_in    3
1786 1 : ;
1788 1 : L_BASE_NAME_IND :
1789 1 : OFF_ALU_OUT = ZERO OR CURRENT ( 2 ) ,
   M 1 :    alu_in 2 , rand 2  alu_op 5  src_frame 0 , r_source 2 ,
1790 1 : RESOLVE ( 0 , OFF_ALU_LS_16 )
   M 1 : mem 0 , nac 0 , snac 0 , dest_frame 0 , r_dest 0
   M 1 : , r_w 1 , nb_ctrl 0 , l_in 1 , o_in 1 , a_in 1 , a_w 1
1790 1 : ;
1792 1 : READ TO ACCUMULATOR USING DESCRIPTOR CURRENT ( 0
1792 1 : ) CON_LENGTH ( 32 ) ,
   M 1 : mem 1  md 1  db_ctrl 0  src_frame 0 , r_source 0  len_ctrl 4 ,
1793 1 : OFF_ALU_OUT = ZERO OR CURRENT ( 0 ) , LOAD_OFF (
1793 1 : CURRENT ( 7 ) ) WITH OFFSET , LOAD_LEN ( CURRENT ( 7 ) )
   M 1 :    alu_in 2 , rand 2  alu_op 5  src_frame 0 , r_source
   M 1 : 0 , dest_frame 0 , r_dest 7 , r_w 1  o_in    3 ,
   M 1 : dest_frame 0 , r_dest 7 , r_w 1  l_in
1793 1 : WITH LEN ( CURRENT ( 0 ) ) , LOAD_AON ( CURRENT (
1793 1 : 7 ) ) WITH AON ( CURRENT ( 0 ) )
   M 1 :    2 , src_frame 0 , r_source 0    , dest_frame 0 ,
   M 1 : r_dest 7 , r_w 1  a_in    2 , src_frame 0 , r_source 0
1793 1 : ;
1795 1 : OFF_ALU_OUT = ACC PLUS PREVIOUS ( 0 ) ,
   M 1 :    alu_in 2  alu_op 3  src_frame 3 , r_source 0 ,
1796 1 : LOAD_OFF ( PREVIOUS ( 0 ) ) WITH OFFSET ,
   M 1 : dest_frame 3 , r_dest 0 , r_w 1  o_in    3 ,
1797 1 : CASE ON ACC_BYTE ( 0 ) MASK wBaB ROTATE ( 2 )
   M 1 : nac 3  srce 4  mask 2B0a  sc 5
1797 1 : ;
1800 1 : LOAD ( ACCUMULATOR ) WITH AON ( CURRENT ( 0 ) ) ,
   M 1 : a_w 1 , o_in    2 , src_frame 0 , r_source 0    ,
1801 1 : LOAD_AON ( CURRENT ( 7 ) ) WITH 0 ,
   M 1 : dest_frame 0 , r_dest 7 , r_w 1  a_in    0 ,
1802 1 : LONG_GOTO BASE_END
   M 1 : nac 6 , lit14  BASE_END
1802 1 : ;
1804 1 : B_ENC_IND_END :
1805 1 : OFF_ALU_OUT = LIT32 ( aFFFF0000 ) AND CURRENT ( 2 ) ,
   M 1 :    alu_in 3 , 1 1 , lit32 aFFFF0000  alu_op 6  src_frame
   M 1 : 0 , r_source 2 ,
1806 1 : LOAD_OFF ( CURRENT ( 6 ) ) WITH OFFSET
   M 1 : dest_frame 0 , r_dest 6 , r_w 1  o_in    3
1806 1 : ;
1809 1 : OFF_ALU_OUT = ACC REV_MINUS PREVIOUS ( 0 ) ,
   M 1 :    alu_in 2  alu_op 1  src_frame 3 , r_source 0 ,
1810 1 : LOAD_OFF ( PREVIOUS ( 0 ) ) WITH OFFSET ,
   M 1 : dest_frame 3 , r_dest 0 , r_w 1  o_in    3 ,
1811 1 : LONG_CALL PTR_TO_DESC * READ_STARTED
   M 1 : nac 7 , lit14  PTR_TO_DESC * READ_STARTED
1811 1 : ;
```

```
1813 1 : OFF_ALU_OUT = ACC PLUS PREVIOUS ( 0 ) ,
   M 1 :    alu_in 2  alu_op 3  src_frame 3 , r_source 0 ,
1814 1 : LOAD_OFF ( PREVIOUS ( 0 ) ) WITH OFFSET
   M 1 : dest_frame 3 , r_dest 0 , r_w 1  o_in    3
1814 1 : ;
1816 1 : LOAD ( ACCUMULATOR ) WITH AON ( CURRENT ( 7 ) ) ,
   M 1 : a_w 1 , o_in    2 , src_frame 0 , r_source 7   ,
1817 1 : LOAD_AON ( CURRENT ( 7 ) ) WITH 0 ,
   M 1 : dest_frame 0 , r_dest 7 , r_w 1  a_in    0 ,
1818 1 : LONG_GOTO BASE_END
   M 1 : nac 6 , lit14  BASE_END
1818 1 : ;
1821 1 : VEC_BASE_NAME_I :
1822 1 : LOAD_OFF ( CURRENT ( 2 ) ) WITH OFF ( NAME_CACHE_2
1822 1 : ( NAME_TRAP ) ) ,
   M 1 : dest_frame 0 , r_dest 2 , r_w 1  o_in    1 , dev_cmd
   M 1 : 54 , nb_ctrl 2  ,
1823 1 : LOAD ( ACCUMULATOR ) WITH OFF ( NAME_CACHE_2 ( NAME_TRAP ) )
   M 1 : a_w 1 , o_in    1 , dev_cmd 54 , nb_ctrl 2
1823 1 : ;
1825 1 : V_BASE_NAME_IND :
1826 1 : OFF_ALU_OUT = ACC ZERO_LS OR COMMON ( @80 , 0 ) ,
   M 1 :    alu_in 2  dev_cmd 2  alu_op 5  src_frame 2 , r_source
   M 1 : 0 , com_ext @80 ,
1827 1 : LOAD_OFF ( CURRENT ( 6 ) ) WITH OFFSET
   M 1 : dest_frame 0 , r_dest 6 , r_w 1  o_in    3
1827 1 : ;
1829 1 : L_V_BASE_NAME_I :
1830 1 : OFF_ALU_OUT = ZERO OR CURRENT ( 2 ) ,
   M 1 :    alu_in 2 , rand 2  alu_op 5  src_frame 0 , r_source 2 ,
1831 1 : RESOLVE ( 0 , OFF_ALU_LS_16 )
   M 1 : mem 0 , nac 0 , snac 0 , dest_frame 0 , r_dest 0
   M 1 : , r_w 1 ,  nb_ctrl 0 , l_in 1 , o_in 1 , a_in 1 , a_w 1
1831 1 : ;
1833 1 : READ TO ACCUMULATOR USING DESCRIPTOR CURRENT ( 0
1833 1 : ) CON_LENGTH ( 32 ) ,
   M 1 : mem 1  md 1   db_ctrl 0  src_frame 0 , r_source 0  len_ctrl 6 ,
1834 1 : OFF_ALU_OUT = ZERO OR CURRENT ( 0 ) , LOAD_OFF (
1834 1 : CURRENT ( 7 ) ) WITH OFFSET , LOAD_LEN ( CURRENT ( 7 ) )
   M 1 :    alu_in 2 , rand 2  alu_op 5  src_frame 0 , r_source
   M 1 : 0 , dest_frame 0 , r_dest 7 , r_w 1  o_in    3 ,
   M 1 : dest_frame 0 , r_dest 7 , r_w 1  l_in
1834 1 : WITH LEN ( CURRENT ( 0 ) ) , LOAD_AON ( CURRENT (
1834 1 : 7 ) ) WITH AON ( CURRENT ( 0 ) ) .
   M 1 : 2 , src_frame 0 , r_source 0  , dest_frame 0 ,
   M 1 : r_dest 7 , r_w 1  a_in    2 , src_frame 0 , r_source 0
1834 1 : ;
1836 1 : OFF_ALU_OUT = ACC PLUS PREVIOUS ( 0 ) ,
   M 1 :    alu_in 2  alu_op 3  src_frame 3 , r_source 0 ,
1837 1 : LOAD_OFF ( PREVIOUS ( 0 ) ) WITH OFFSET ,
   M 1 : dest_frame 3 , r_dest 0 , r_w 1  o_in    3 ,
1838 1 : CASE ON ACC_BYTE ( 0 ) MASK @80@ ROTATE ( 2 )
   M 1 : nac 3  srce 0  mask @80@ sc 5
1838 1 : ;
1841 1 : LOAD ( ACCUMULATOR ) WITH AON ( CURRENT ( 0 ) ) ,
   M 1 : a_w 1 , o_in    2 , src_frame 0 , r_source 0   ,
1842 1 : LOAD_AON ( CURRENT ( 7 ) ) WITH 0 ,
   M 1 : dest_frame 0 , r_dest 7 , r_w 1  a_in    0 ,
1843 1 : LONG_GOTO VEC_BASE_END
   M 1 : nac 6 , lit14  VEC_BASE_END
1843 1 : ;
1845 1 : V_B_ENC_IND_END :
1846 1 : OFF_ALU_OUT = LIT32 ( @FFFF0000@ ) AND CURRENT ( 2 ) ,
   M 1 :    alu_in 3 , l 1 , lit32 @FFFF0000@  alu_op 6  src_frame
   M 1 : 0 , r_source 2 ,
1847 1 : LOAD_OFF ( CURRENT ( 6 ) ) WITH OFFSET
   M 1 : dest_frame 0 , r_dest 6 , r_w 1  o_in    3
1847 1 : ;
1850 1 : OFF_ALU_OUT = ACC REV_MINUS PREVIOUS ( 0 ) ,
   M 1 :    alu_in 2  alu_op 1  src_frame 3 , r_source 0 ,
1851 1 : LOAD_OFF ( PREVIOUS ( 0 ) ) WITH OFFSET ,
   M 1 : dest_frame 3 , r_dest 0 , r_w 1  o_in    3 ,
1852 1 : LONG_CALL PTR_TO_DESC * READ_STARTED
```

```
     M  1 : nac 7 , lit14  PTR_TO_DESC * READ_STARTED
1852 1 : ;
1854 1 : OFF_ALU_OUT = ACC PLUS PREVIOUS ( 0 ) ,
     M  1 :    alu_in 2   alu_op 3  src_frame 3 , r_source 0 ,
1855 1 : LOAD_OFF ( PREVIOUS ( 0 ) ) WITH OFFSET
     M  1 : dest_frame 3 , r_dest 0 , r_w 1  o_in   3
1855 1 : ;
1857 1 : LOAD ( ACCUMULATOR ) WITH ADN ( CURRENT ( 7 ) ) ,
     M  1 : a_w 1 , o_in   2 , src_frame 0 , r_source 7     ,
1858 1 : LOAD_ADN ( CURRENT ( 7 ) ) WITH 0 ,
     M  1 : dest_frame 0 , r_dest 7 , r_w 1  a_in   0 ,
1859 1 : LONG_GOTO VEC_BASE_END
     M  1 : nac 6 , lit14  VEC_BASE_END
1859 1 : ;
1862 1 : WEIRD_VECTOR :
1863 1 : OFF_ALU_OUT = ZERO OR ACC_HI ,
     M  1 :    alu_in 2 , rand 2  alu_op 5  dev_cmd 1 ,
1864 1 : RESOLVE ( 0 , OFF_ALU_LS_16 )
     M  1 : mem 0 , nac 0 , snac 4 , dest_frame 0 , r_dest 0
     M  1 : , r_w 1 , nb_ctrl 0 , l_in 1 , o_in 1 , a_in 1 , a_w 1
1864 1 : ;
1869 1 : LOAD ( ACCUMULATOR ) WITH JPD ( LEN ( CURRENT ( 1 ) ) )
     M  1 : a_w 1 , o_in   3 , src_frame 0 , r_source 1 , jpd_ctrl 6
1869 1 : ;
1874 1 : WEIRD_VEC_CASE :
1875 1 : READ TO ACCUMULATOR USING DESCRIPTOR CURRENT ( 0 ) BIAS_LENGTH ,
     M  1 : mem 1   md 1   dp_ctrl 0  src_frame 0 , r_source 0  len_ctrl 12  ,
1876 1 : LOAD_ADN ( CURRENT ( 0 ) ) WITH 0 ,
     M  1 : dest_frame 0 , r_dest 0 , r_w 1  a_in   0 ,
1877 1 : CASE ON ACC_BYTE ( 3 ) MASK b3F0 ROTATE ( 0 )
     M  1 : nac 3   srce 7   mask  03F0  sc 7
1877 1 : ;
1880 1 : VEC_SHIFT_0 :
1881 1 : OFF_ALU_OUT = ACC LEFT_SHIFTED ( 0 ) PLUS PREVIOUS ( 0 ) ,
     M  1 :    alu_in 2  sf 0  alu_op 3  src_frame 3 , r_source 0 ,
1882 1 : LOAD_OFF ( PREVIOUS ( 0 ) ) WITH OFFSET ,
     M  1 : dest_frame 3 , r_dest 0 , r_w 1  o_in   3 ,
1883 1 : LOAD ( ACCUMULATOR ) WITH OFFSET ,
     M  1 : a_w 1 , o_in   3 ,
1884 1 : LOAD_ADN ( PREVIOUS ( 0 ) ) WITH ADN ( PREVIOUS ( 0 ) ) ,
     M  1 : dest_frame 3 , r_dest 0 , r_w 1  a_in   2 , src_frame
     M  1 : 3 , r_source 0    ,
1885 1 : RETURN
     M  1 : nac 2
1885 1 : ;
1888 1 : OFF_ALU_OUT = ACC LEFT_SHIFTED ( 1 ) PLUS PREVIOUS ( 0 ) ,
     M  1 :    alu_in 2  sf 1  alu_op 3  src_frame 3 , r_source 0 ,
1889 1 : LOAD_OFF ( PREVIOUS ( 0 ) ) WITH OFFSET ,
     M  1 : dest_frame 3 , r_dest 0 , r_w 1  o_in   3 ,
1890 1 : LOAD ( ACCUMULATOR ) WITH OFFSET ,
     M  1 : a_w 1 , o_in   3 ,
1891 1 : LOAD_ADN ( PREVIOUS ( 0 ) ) WITH ADN ( PREVIOUS ( 0 ) ) ,
     M  1 : dest_frame 3 , r_dest 0 , r_w 1  a_in   2 , src_frame
     M  1 : 3 , r_source 0    ,
1892 1 : RETURN
     M  1 : nac 2
1892 1 : ;
1895 1 : OFF_ALU_OUT = ACC LEFT_SHIFTED ( 2 ) PLUS PREVIOUS ( 0 ) ,
     M  1 :    alu_in 2  sf 2  alu_op 3  src_frame 3 , r_source 0 ,
1896 1 : LOAD_OFF ( PREVIOUS ( 0 ) ) WITH OFFSET ,
     M  1 : dest_frame 3 , r_dest 0 , r_w 1  o_in   3 ,
1897 1 : LOAD ( ACCUMULATOR ) WITH OFFSET ,
     M  1 : a_w 1 , o_in   3 ,
1898 1 : LOAD_ADN ( PREVIOUS ( 0 ) ) WITH ADN ( PREVIOUS ( 0 ) ) ,
     M  1 : dest_frame 3 , r_dest 0 , r_w 1  a_in   2 , src_frame
     M  1 : 3 , r_source 0    ,
1899 1 : RETURN
     M  1 : nac 2
1899 1 : ;
1902 1 : OFF_ALU_OUT = ACC LEFT_SHIFTED ( 3 ) PLUS PREVIOUS ( 0 ) ,
     M  1 :    alu_in 2  sf 3  alu_op 3  src_frame 3 , r_source 0 ,
1903 1 : LOAD_OFF ( PREVIOUS ( 0 ) ) WITH OFFSET ,
     M  1 : dest_frame 3 , r_dest 0 , r_w 1  o_in   3 ,
1904 1 : LOAD ( ACCUMULATOR ) WITH OFFSET ,
     M  1 : a_w 1 , o_in   3 ,
```

```
1905 1 : LOAD_AON ( PREVIOUS ( 0 ) ) WITH AON ( PREVIOUS ( 0 ) ) ,
   M 1 : dest_frame 3 , r_dest 0 , r_w 1    a_in    2 , src_frame
   M 1 : 3 , r_source 0     ,
1906 1 : RETURN
   M 1 : nac 2
1906 1 : ;
1909 1 : OFF_ALU_OUT = ACC LEFT_SHIFTED ( 4 ) PLUS PREVIOUS ( 0 ) ,
   M 1 :    alu_in 2   sf 4    alu_op 3   src_frame 3 , r_source 0 ,
1910 1 : LOAD_OFF ( PREVIOUS ( 0 ) ) WITH OFFSET ,
   M 1 : dest_frame 3 , r_dest 0 , r_w 1    o_in    3 ,
1911 1 : LOAD ( ACCUMULATOR ) WITH OFFSET ,
   M 1 : a_w 1 , o_in    3 ,
1912 1 : LOAD_AON ( PREVIOUS ( 0 ) ) WITH AON ( PREVIOUS ( 0 ) ) ,
   M 1 : dest_frame 3 , r_dest 0 , r_w 1    a_in    2 , src_frame
   M 1 : 3 , r_source 0    ,
1913 1 : RETURN
   M 1 : nac 2
1913 1 : ;
1916 1 : OFF_ALU_OUT = ACC LEFT_SHIFTED ( 5 ) PLUS PREVIOUS ( 0 ) ,
   M 1 :    alu_in 2   sf 5    alu_op 3   src_frame 3 , r_source 0 ,
1917 1 : LOAD_OFF ( PREVIOUS ( 0 ) ) WITH OFFSET ,
   M 1 : dest_frame 3 , r_dest 0 , r_w 1    o_in    3 ,
1918 1 : LOAD ( ACCUMULATOR ) WITH OFFSET ,
   M 1 : a_w 1 , o_in    3 ,
1919 1 : LOAD_AON ( PREVIOUS ( 0 ) ) WITH AON ( PREVIOUS ( 0 ) ) ,
   M 1 : dest_frame 3 , r_dest 0 , r_w 1    a_in    2 , src_frame
   M 1 : 3 , r_source 0    ,
1920 1 : RETURN
   M 1 : nac 2
1920 1 : ;
1923 1 : OFF_ALU_OUT = ACC LEFT_SHIFTED ( 6 ) PLUS PREVIOUS ( 0 ) ,
   M 1 :    alu_in 2   sf 6    alu_op 3   src_frame 3 , r_source 0 ,
1924 1 : LOAD_OFF ( PREVIOUS ( 0 ) ) WITH OFFSET ,
   M 1 : dest_frame 3 , r_dest 0 , r_w 1    o_in    3 ,
1925 1 : LOAD ( ACCUMULATOR ) WITH OFFSET ,
   M 1 : a_w 1 , o_in    3 ,
1926 1 : LOAD_AON ( PREVIOUS ( 0 ) ) WITH AON ( PREVIOUS ( 0 ) ) ,
   M 1 : dest_frame 3 , r_dest 0 , r_w 1    a_in    2 , src_frame
   M 1 : 3 , r_source 0    ,
1927 1 : RETURN
   M 1 : nac 2
1927 1 : ;
1930 1 : VEC_SHIFT_7 :
1931 1 : OFF_ALU_OUT = ACC LEFT_SHIFTED ( 7 ) PLUS PREVIOUS ( 0 ) ,
   M 1 :    alu_in 2   sf 7    alu_op 3   src_frame 3 , r_source 0 ,
1932 1 : LOAD_OFF ( PREVIOUS ( 0 ) ) WITH OFFSET ,
   M 1 : dest_frame 3 , r_dest 0 , r_w 1    o_in    3 ,
1933 1 : LOAD ( ACCUMULATOR ) WITH OFFSET ,
   M 1 : a_w 1 , o_in    3 ,
1934 1 : LOAD_AON ( PREVIOUS ( 0 ) ) WITH AON ( PREVIOUS ( 0 ) ) ,
   M 1 : dest_frame 3 , r_dest 0 , r_w 1    a_in    2 , src_frame
   M 1 : 3 , r_source 0    ,
1935 1 : RETURN
   M 1 : nac 2
1935 1 : ;
1938 1 : OFF_ALU_OUT = ACC LEFT_SHIFTED ( 1 ) OR COMMON ( aBa , 0 ) ,
   M 1 :    alu_in 2   sf 1    alu_op 5   src_frame 2 , r_source
   M 1 : 0 , com_ext aBa ,
1939 1 : LOAD ( ACCUMULATOR ) WITH OFFSET ,
   M 1 : a_w 1 , o_in    3 ,
1940 1 : LONG_GOTO VEC_SHIFT_7
   M 1 : nac 6 , lit14  VEC_SHIFT_7
1940 1 : ;
1943 1 : OFF_ALU_OUT = ACC LEFT_SHIFTED ( 2 ) OR COMMON ( aBa , 0 ) ,
   M 1 :    alu_in 2   sf 2    alu_op 5   src_frame 2 , r_source
   M 1 : 0 , com_ext aBa ,
1944 1 : LOAD ( ACCUMULATOR ) WITH OFFSET ,
   M 1 : a_w 1 , o_in    3 ,
1945 1 : LONG_GOTO VEC_SHIFT_7
   M 1 : nac 6 , lit14  VEC_SHIFT_7
1945 1 : ;
1948 1 : OFF_ALU_OUT = ACC LEFT_SHIFTED ( 3 ) OR COMMON ( aBa , 0 ) ,
```

```
        M 1 :    alu_in 2  sf 3  alu_op 5  src_frame 2 , r_source
        M 1 : 0 , com_ext aBa ,
1949    1 : LOAD ( ACCUMULATOR ) WITH OFFSET ,
        M 1 : a_w 1 , o_in    3 ,
1950    1 : LONG_GOTO VEC_SHIFT_7
        M 1 : nac 6 , lit14  VEC_SHIFT_7
1950    1 : ;
1953    1 : OFF_ALU_OUT = ACC LEFT_SHIFTED ( 4 ) OR COMMON ( aBa , 0 ) ,
        M 1 :    alu_in 2  sf 4  alu_op 5  src_frame 2 , r_source
        M 1 : 0 , com_ext aBa ,
1954    1 : LOAD ( ACCUMULATOR ) WITH OFFSET ,
        M 1 : a_w 1 , o_in    3 ,
1955    1 : LONG_GOTO VEC_SHIFT_7
        M 1 : nac 6 , lit14  VEC_SHIFT_7
1955    1 : ;
1958    1 : OFF_ALU_OUT = ACC LEFT_SHIFTED ( 5 ) OR COMMON ( aBa , 0 ) ,
        M 1 :    alu_in 2  sf 5  alu_op 5  src_frame 2 , r_source
        M 1 : 0 , com_ext aBa ,
1959    1 : LOAD ( ACCUMULATOR ) WITH OFFSET ,
        M 1 : a_w 1 , o_in    3 ,
1960    1 : LONG_GOTO VEC_SHIFT_7
        M 1 : nac 6 , lit14  VEC_SHIFT_7
1960    1 : ;
1963    1 : OFF_ALU_OUT = ACC LEFT_SHIFTED ( 6 ) OR COMMON ( aBa , 0 ) ,
        M 1 :    alu_in 2  sf 6  alu_op 5  src_frame 2 , r_source
        M 1 : 0 , com_ext aBa ,
1964    1 : LOAD ( ACCUMULATOR ) WITH OFFSET ,
        M 1 : a_w 1 , o_in    3 ,
1965    1 : LONG_GOTO VEC_SHIFT_7
        M 1 : nac 6 , lit14  VEC_SHIFT_7
1965    1 : ;
1968    1 : VEC_SHIFT_14 :
1969    1 : OFF_ALU_OUT = ACC LEFT_SHIFTED ( 7 ) OR COMMON ( aBa , 0 ) ,
        M 1 :    alu_in 2  sf 7  alu_op 5  src_frame 2 , r_source
        M 1 : 0 , com_ext aBa ,
1970    1 : LOAD ( ACCUMULATOR ) WITH OFFSET ,
        M 1 : a_w 1 , o_in    3 ,
1971    1 : LONG_GOTO VEC_SHIFT_7
        M 1 : nac 6 , lit14  VEC_SHIFT_7
1971    1 : ;
1974    1 : OFF_ALU_OUT = ACC LEFT_SHIFTED ( 1 ) OR COMMON ( aBa , 0 ) ,
        M 1 :    alu_in 2  sf 1  alu_op 5  src_frame 2 , r_source
        M 1 : 0 , com_ext aBa ,
1975    1 : LOAD ( ACCUMULATOR ) WITH OFFSET ,
        M 1 : a_w 1 , o_in    3 ,
1976    1 : LONG_GOTO VEC_SHIFT_14
        M 1 : nac 6 , lit14  VEC_SHIFT_14
1976    1 : ;
1979    1 : OFF_ALU_OUT = ACC LEFT_SHIFTED ( 2 ) OR COMMON ( aBa , 0 ) ,
        M 1 :    alu_in 2  sf 2  alu_op 5  src_frame 2 , r_source
        M 1 : 0 , com_ext aBa ,
1980    1 : LOAD ( ACCUMULATOR ) WITH OFFSET ,
        M 1 : a_w 1 , o_in    3 ,
1981    1 : LONG_GOTO VEC_SHIFT_14
        M 1 : nac 6 , lit14  VEC_SHIFT_14
1981    1 : ;
1984    1 : OFF_ALU_OUT = ACC LEFT_SHIFTED ( 3 ) OR COMMON ( aBa , 0 ) ,
        M 1 :    alu_in 2  sf 3  alu_op 5  src_frame 2 , r_source
        M 1 : 0 , com_ext aBa ,
1985    1 : LOAD ( ACCUMULATOR ) WITH OFFSET ,
        M 1 : a_w 1 , o_in    3 ,
1986    1 : LONG_GOTO VEC_SHIFT_14
        M 1 : nac 6 , lit14  VEC_SHIFT_14
1986    1 : ;
1989    1 : OFF_ALU_OUT = ACC LEFT_SHIFTED ( 4 ) OR COMMON ( aBa , 0 ) ,
        M 1 :    alu_in 2  sf 4  alu_op 5  src_frame 2 , r_source
        M 1 : 0 , com_ext aBa ,
1990    1 : LOAD ( ACCUMULATOR ) WITH OFFSET ,
        M 1 : a_w 1 , o_in    3 ,
1991    1 : LONG_GOTO VEC_SHIFT_14
        M 1 : nac 6 , lit14  VEC_SHIFT_14
1991    1 : ;
1994    1 : OFF_ALU_OUT = ACC LEFT_SHIFTED ( 5 ) OR COMMON ( aBa , 0 ) ,
```

```
  M 1 :    alu_in 2  sf 5  alu_op 5  src_frame 2 , r_source
  M 1 : 0 , com_ext aBa ,
1995 1 : LOAD ( ACCUMULATOR ) WITH OFFSET ,
  M 1 : a_w 1 , o_in   3 ,
1996 1 : LONG_GOTO VEC_SHIFT_14
  M 1 : nac 6 , lit14  VEC_SHIFT_14
1996 1 : ;
1999 1 : OFF_ALU_OUT = ACC LEFT_SHIFTED ( 6 ) OR COMMON ( aBa , 0 ) ,
  M 1 :    alu_in 2  sf 6  alu_op 5  src_frame 2 , r_source
  M 1 : 0 , com_ext aBa ,
2000 1 : LOAD ( ACCUMULATOR ) WITH OFFSET ,
  M 1 : a_w 1 , o_in   3 ,
2001 1 : LONG_GOTO VEC_SHIFT_14
  M 1 : nac 6 , lit14  VEC_SHIFT_14
2001 1 : ;
2004 1 : VEC_SHIFT_21 :
2005 1 : OFF_ALU_OUT = ACC LEFT_SHIFTED ( 7 ) OR COMMON ( aBa , 0 ) ,
  M 1 :    alu_in 2  sf 7  alu_op 5  src_frame 2 , r_source
  M 1 : 0 , com_ext aBa ,
2006 1 : LOAD ( ACCUMULATOR ) WITH OFFSET ,
  M 1 : a_w 1 , o_in   3 ,
2007 1 : LONG_GOTO VEC_SHIFT_14
  M 1 : nac 6 , lit14  VEC_SHIFT_14
2007 1 : ;
2010 1 : OFF_ALU_OUT = ACC LEFT_SHIFTED ( 1 ) OR COMMON ( aBa , 0 ) ,
  M 1 :    alu_in 2  sf 1  alu_op 5  src_frame 2 , r_source
  M 1 : 0 , com_ext aBa ,
2011 1 : LOAD ( ACCUMULATOR ) WITH OFFSET ,
  M 1 : a_w 1 , o_in   3 ,
2012 1 : LONG_GOTO VEC_SHIFT_21
  M 1 : nac 6 , lit14  VEC_SHIFT_21
2012 1 : ;
2015 1 : OFF_ALU_OUT = ACC LEFT_SHIFTED ( 2 ) OR COMMON ( aBa , 0 ) ,
  M 1 :    alu_in 2  sf 2  alu_op 5  src_frame 2 , r_source
  M 1 : 0 , com_ext aBa ,
2016 1 : LOAD ( ACCUMULATOR ) WITH OFFSET ,
  M 1 : a_w 1 , o_in   3 ,
2017 1 : LONG_GOTO VEC_SHIFT_21
  M 1 : nac 6 , lit14  VEC_SHIFT_21
2017 1 : ;
2020 1 : OFF_ALU_OUT = ACC LEFT_SHIFTED ( 3 ) OR COMMON ( aBa , 0 ) ,
  M 1 :    alu_in 2  sf 3  alu_op 5  src_frame 2 , r_source
  M 1 : 0 , com_ext aBa ,
2021 1 : LOAD ( ACCUMULATOR ) WITH OFFSET ,
  M 1 : a_w 1 , o_in   3 ,
2022 1 : LONG_GOTO VEC_SHIFT_21
  M 1 : nac 6 , lit14  VEC_SHIFT_21
2022 1 : ;
2025 1 : OFF_ALU_OUT = ACC LEFT_SHIFTED ( 4 ) OR COMMON ( aBa , 0 ) ,
  M 1 :    alu_in 2  sf 4  alu_op 5  src_frame 2 , r_source
  M 1 : 0 , com_ext aBa ,
2026 1 : LOAD ( ACCUMULATOR ) WITH OFFSET ,
  M 1 : a_w 1 , o_in   3 ,
2027 1 : LONG_GOTO VEC_SHIFT_21
  M 1 : nac 6 , lit14  VEC_SHIFT_21
2027 1 : ;
2030 1 : OFF_ALU_OUT = ACC LEFT_SHIFTED ( 5 ) OR COMMON ( aBa , 0 ) ,
  M 1 :    alu_in 2  sf 5  alu_op 5  src_frame 2 , r_source
  M 1 : 0 , com_ext aBa ,
2031 1 : LOAD ( ACCUMULATOR ) WITH OFFSET ,
  M 1 : a_w 1 , o_in   3 ,
2032 1 : LONG_GOTO VEC_SHIFT_21
  M 1 : nac 6 , lit14  VEC_SHIFT_21
2032 1 : ;
2035 1 : OFF_ALU_OUT = ACC LEFT_SHIFTED ( 6 ) OR COMMON ( aBa , 0 ) ,
  M 1 :    alu_in 2  sf 6  alu_op 5  src_frame 2 , r_source
  M 1 : 0 , com_ext aBa ,
2036 1 : LOAD ( ACCUMULATOR ) WITH OFFSET ,
  M 1 : a_w 1 , o_in   3 ,
2037 1 : LONG_GOTO VEC_SHIFT_21
  M 1 : nac 6 , lit14  VEC_SHIFT_21
2037 1 : ;
2040 1 : VEC_SHIFT_28 :
```

```
2041 1 : OFF_ALU_OUT = ACC LEFT_SHIFTED ( 7 ) OR COMMON ( aBa , 0 ) ,
   M 1 :    alu_in 2  sf 7  alu_op 5  src_frame 2 , r_source
   M 1 : 0 , com_ext aBa ,
2042 1 : LOAD ( ACCUMULATOR ) WITH OFFSET ,
   M 1 : a_w 1 , o_in    3 ,
2043 1 : LONG_GOTO VEC_SHIFT_21
   M 1 : nac 6 , lit14  VEC_SHIFT_21
2043 1 : ;
2046 1 : OFF_ALU_OUT = ACC LEFT_SHIFTED ( 1 ) OR COMMON ( aBa , 0 ) ,
   M 1 :    alu_in 2  sf 1  alu_op 5  src_frame 2 , r_source
   M 1 : 0 , com_ext aBa ,
2047 1 : LOAD ( ACCUMULATOR ) WITH OFFSET ,
   M 1 : a_w 1 , o_in    3 ,
2048 1 : LONG_GOTO VEC_SHIFT_28
   M 1 : nac 6 , lit14  VEC_SHIFT_28
2048 1 : ;
2051 1 : OFF_ALU_OUT = ACC LEFT_SHIFTED ( 2 ) OR COMMON ( aBa , 0 ) ,
   M 1 :    alu_in 2  sf 2  alu_op 5  src_frame 2 , r_source
   M 1 : 0 , com_ext aBa ,
2052 1 : LOAD ( ACCUMULATOR ) WITH OFFSET ,
   M 1 : a_w 1 , o_in    3 ,
2053 1 : LONG_GOTO VEC_SHIFT_28
   M 1 : nac 6 , lit14  VEC_SHIFT_28
2053 1 : ;
2056 1 : OFF_ALU_OUT = ACC LEFT_SHIFTED ( 3 ) OR COMMON ( aBa , 0 ) ,
   M 1 :    alu_in 2  sf 3  alu_op 5  src_frame 2 , r_source
   M 1 : 0 , com_ext aBa ,
2057 1 : LOAD ( ACCUMULATOR ) WITH OFFSET ,
   M 1 : a_w 1 , o_in    3 ,
2058 1 : LONG_GOTO VEC_SHIFT_28
   M 1 : nac 6 , lit14  VEC_SHIFT_28
2058 1 : ;
2061 1 : LONG_CALL MULTIPLY * MULT_16_32
   M 1 : nac 7 , lit14  MULTIPLY * MULT_16_32
2061 1 : ;
2063 1 : OFF_ALU_OUT = ACC PLUS PREVIOUS ( 0 ) ,
   M 1 :    alu_in 2  alu_op 3  src_frame 3 , r_source 0 ,
2064 1 : LOAD_OFF ( PREVIOUS ( 0 ) ) WITH OFFSET ,
   M 1 : dest_frame 3 , r_dest 0 , r_w 1  o_in    3 ,
2065 1 : LOAD ( ACCUMULATOR ) WITH OFFSET ,
   M 1 : a_w 1 , o_in    3 ,
2066 1 : LOAD_AON ( PREVIOUS ( 0 ) ) WITH AON ( PREVIOUS ( 0 ) ) ,
   M 1 : dest_frame 3 , r_dest 0 , r_w 1  a_in   2 , src_frame
   M 1 : 3 , r_source 0   ,
2067 1 : RETURN
   M 1 : nac 2
2067 1 : ;
2070 1 : LONG_CALL MULTIPLY * MULT_16_32
   M 1 : nac 7 , lit14  MULTIPLY * MULT_16_32
2070 1 : ;
2072 1 : OFF_ALU_OUT = ACC REV_MINUS PREVIOUS ( 0 ) ,
   M 1 :    alu_in 2  alu_op 1  src_frame 3 , r_source 0 ,
2073 1 : LOAD_OFF ( PREVIOUS ( 0 ) ) WITH OFFSET ,
   M 1 : dest_frame 3 , r_dest 0 , r_w 1  o_in    3 ,
2074 1 : LOAD ( ACCUMULATOR ) WITH OFFSET ,
   M 1 : a_w 1 , o_in    3 ,
2075 1 : LOAD_AON ( PREVIOUS ( 0 ) ) WITH AON ( PREVIOUS ( 0 ) ) ,
   M 1 : dest_frame 3 , r_dest 0 , r_w 1  a_in   2 , src_frame
   M 1 : 3 , r_source 0   ,
2076 1 : RETURN
   M 1 : nac 2
2076 1 : ;
2079 1 : OFF_ALU_OUT = ACC OR COMMON ( aBa , 0 ) ,
   M 1 :    alu_in 2  alu_op 5  src_frame 2 , r_source 0 , com_ext aBa ,
2080 1 : LOAD_OFF ( CURRENT ( 7 ) ) WITH OFFSET
   M 1 : dest_frame 0 , r_dest 7 , r_w 1  o_in    3
2080 1 : ;
2082 1 : OFF_ALU_OUT = BIASED_LENGTH CON_LENGTH ( 0 ) OR ACC_HI ,
   M 1 :    alu_in 1  len_ctrl 0   alu_op 5  dev_cmd 1 ,
2083 1 : LOAD_LEN ( CURRENT ( 1 ) ) WITH OFF ,
   M 1 : dest_frame 0 , r_dest 1 , r_w 1  l_in   3 , db_ctrl 1   ,
2084 1 : TEST_TO_CC ( OFF_NE_0 )
   M 1 : rand 10 , test 6  , lit8 1
```

```
2084 1 : ;
2086 1 : OFF_ALU_OUT = ZERO OR CURRENT ( 1 ) ,
   M 1 :    alu_in 2 , rand 2  alu_op 5  src_frame 0 , r_source 1 ,
2087 1 : RESOLVE ( 0 , OFF_ALU_LS_16 )
   M 1 : mem 0 , nac 0 , snac 4 , dest_frame 0 , r_dest 0
   M 1 : , r_w 1 , nb_ctrl 0 , l_in 1 , o_in 1 , a_in 1 , a_w 1
2087 1 : ;
2092 1 : READ TO ACCUMULATOR USING DESCRIPTOR CURRENT ( 0 ) BIAS_LENGTH ,
   M 1 : mem 1   md 1   db_ctrl 0  src_frame 0 , r_source 0 , len_ctrl 12  ,
2093 1 : LOAD_AON ( CURRENT ( 0 ) ) WITH 0
   M 1 : dest_frame 0 , r_dest 0 , r_w 1  a_in    0
2093 1 : ;
2095 1 : OFF_ALU_OUT = ZERO OR CURRENT ( 7 ) ,
   M 1 :    alu_in 2 , rand 2  alu_op 5  src_frame 0 , r_source 7 ,
2096 1 : LOAD_OFF ( CURRENT ( 1 ) ) WITH OFFSET
   M 1 : dest_frame 0 , r_dest 1 , r_w 1  o_in    3
2096 1 : ;
2098 1 : OFF_ALU_OUT = ACC OR COMMON ( aBa , 0 ) ,
   M 1 :    alu_in 2  alu_op 5  src_frame 2 , r_source 0 , com_ext aBa ,
2099 1 : LOAD_OFF ( CURRENT ( 7 ) ) WITH OFFSET ,
   M 1 : dest_frame 0 , r_dest 7 , r_w 1  o_in    3 ,
2100 1 : LONG_CALL MULTIPLY * MULT_16_32
   M 1 : nac 7 , lit14  MULTIPLY * MULT_16_32
2100 1 : ;
2102 1 : LOAD_OFF ( CURRENT ( 1 ) ) WITH JPD ( LEN ( CURRENT ( 1 ) ) ) ,
   M 1 : dest_frame 0 , r_dest 1 , r_w 1  o_in    3 , src_frame
   M 1 : 0 , r_source 1 , jpd_ctrl 6 ,
2103 1 : IF NOT_CC THEN GOTO VEC_SHIFT_0
   M 1 : test  13 , polarity 0   nac 4 , lit8  VEC_SHIFT_0
2103 1 : ;
2105 1 : OFF_ALU_OUT = ACC PLUS PREVIOUS ( 0 ) ,
   M 1 :    alu_in 2  alu_op 3  src_frame 3 , r_source 0 ,
2106 1 : LOAD_OFF ( PREVIOUS ( 0 ) ) WITH OFFSET ,
   M 1 : dest_frame 3 , r_dest 0 , r_w 1  o_in    3 ,
2107 1 : LOAD_AON ( PREVIOUS ( 0 ) ) WITH AON ( PREVIOUS ( 0 ) )
   M 1 : dest_frame 3 , r_dest 0 , r_w 1  a_in    2 , src_frame
   M 1 : 3 , r_source 0
2107 1 : ;
2109 1 : OFF_ALU_OUT = ZERO OR CURRENT ( 7 ) ,
   M 1 :    alu_in 2 , rand 2  alu_op 5  src_frame 0 , r_source 7 ,
2110 1 : LOAD ( ACCUMULATOR ) WITH OFFSET ,
   M 1 : a_w 1 , o_in    3 ,
2111 1 : LONG_CALL MULTIPLY * MULT_16_32
   M 1 : nac 7 , lit14  MULTIPLY * MULT_16_32
2111 1 : ;
2113 1 : OFF_ALU_OUT = ACC LEFT_SHIFTED ( 2 ) OR COMMON ( aBa , 0 ) ,
   M 1 :    alu_in 2  sf 2  alu_op 5  src_frame 2 , r_source
   M 1 : 0 , com_ext aBa ,
2114 1 : LOAD ( ACCUMULATOR ) WITH OFFSET ,
   M 1 : a_w 1 , o_in    3 ,
2115 1 : LONG_GOTO VEC_SHIFT_14
   M 1 : nac 6 , lit14  VEC_SHIFT_14
2115 1 : ;
2116 1 : END
2116 0 :

COMPILATION COMPLETE, 371 STATEMENTS PROCESSED
DATA GENERAL F H P - FETCH MICROCODE GENERATOR, REV. 6.0 (3/16/79)
  6/6/81 AT 1:6:20

INPUT FILE:  EMULATE_2400
OBJECT FILE: EMULATE_2400.OB

LINE MC:SOURCE 1 0 :$NO LIST
  167 0 :
  168 0 :ENTRY PARSE_16_BIT_OPCODE:
  169 0 :        /* First force K to B. */
  170 0 :        OFF_ALU_OUT = ZEROS,
  171 0 :        LOAD_LEN(K_SHADOW) WITH OFF,
  172 0 :        LOAD_OFF(K_SHADOW) WITH AON(K_SHADOW),
```

```
173 0 :            SOURCE(OFF_ALU_DATA) TO JPD_BUS(K_REG);
174 0 :
175 0 :            /* The offset of EXTENDED_OPCODE is always zero. */
176 0 :            PARSE_K_LOAD_EPC,
177 0 :            OFF_ALU_OUT = PARSER(SIGN_EXTEND) OR EXTENDED_OPCODE,
178 0 :            LOAD_LEN(EXTENDED_OPCODE) WITH OFF;
179 0 :
180 0 :            OFF_ALU_OUT = ONES,
181 0 :            LOAD_LEN(K_SHADOW) WITH OFF,
182 0 :            LOAD_OFF(K_SHADOW) WITH AON(K_SHADOW),
183 0 :            SOURCE(OFF_ALU_DATA) TO JPD_BUS(K_REG),
184 0 :            DISPATCH_FETCH;
185 0 :

INPUT FILE:  ?11.1_FILF14
OBJECT FILE: EMULATE_2400.OB

LINE N :SOURCE 168 0 : ENTRY PARSE_16_BIT_OP ;
170 0 : OFF_ALU_OUT = ZEROS ,
  M 0 :    alu_op 0 ,
171 0 : LOAD_LEN ( COMMON ( 4 , 5 ) ) WITH OFF ,
  M 0 : dest_frame 2 , r_dest 5 , com_ext 4 , r_w 1  l_in
  M 0 :    3 , db_ctrl 1   ,
172 0 : LOAD_OFF ( COMMON ( 4 , 5 ) ) WITH AON ( COMMON ( 4 , 5 ) ) ,
  M 0 : dest_frame 2 , r_dest 5 , com_ext 4 , r_w 1  o_in
  M 0 :    2 , src_frame 2 , r_source 5 , com_ext 4    ,
173 0 : SOURCE ( OFF_ALU_DATA ) TO JPD_BUS ( K_REG )
  M 0 : jpd_ctrl 7    dev_cmd 114
173 0 : ;
176 0 : PARSE_K_LOAD_EP ,
  M 0 : dev_cmd 121 , nb_ctrl 1 ,
177 0 : OFF_ALU_OUT = PARSER ( SIGN_EXTEND ) OR COMMON ( 3 , 1 ) ,
  M 0 :    alu_in 2 , nb_ctrl 1 , rand 1    alu_op 5  src_frame
  M 0 : 2 , r_source 1 , com_ext 3 ,
178 0 : LOAD_LEN ( COMMON ( 3 , 1 ) ) WITH OFF
  M 0 : dest_frame 2 , r_dest 1 , com_ext 3 , r_w 1  l_in   3 , db_ctrl 1
178 0 : ;
180 0 : OFF_ALU_OUT = ONES ,
  M 0 :    alu_op 7 ,
181 0 : LOAD_LEN ( COMMON ( 4 , 5 ) ) WITH OFF ,
  M 0 : dest_frame 2 , r_dest 5 , com_ext 4 , r_w 1  l_in
  M 0 :    3 , db_ctrl 1   ,
182 0 : LOAD_OFF ( COMMON ( 4 , 5 ) ) WITH AON ( COMMON ( 4 , 5 ) ) ,
  M 0 : dest_frame 2 , r_dest 5 , com_ext 4 , r_w 1  o_in
  M 0 :    2 , src_frame 2 , r_source 5 , com_ext 4    ,
183 0 : SOURCE ( OFF_ALU_DATA ) TO JPD_BUS ( K_REG ) ,
  M 0 : jpd_ctrl 7    dev_cmd 114    ,
184 0 : DISPATCH_FETCH
  M 0 : nac 0 , snac 2
184 0 : ;
185 0 :
185 0 :

COMPILATION COMPLETE, 3 STATEMENTS PROCESSED

DATA GENERAL F H P - DISPATCH MICROCODE GENERATOR, REV. 6.0 (3/16/79)
 6/9/81 AT 10:35:46

INPUT FILE:  CSL.DISP_2
OBJECT FILE: CSL.DISP_2.OB

LINE NO:SOURCE 1 0 :$TITLE         *** COMMON S-LANGUAGE DISPATCH TABLE ***
  2 0 :
  3 0 :          MACRO   NULL     MEANS    SOP_ENTRIES*ILLEGAL_SOP        ENDMAC
  4 0 :          MACRO   RESERVE           MEANS
  5 0 :                           OP_CODE #1:
  6 0 :                                    FADD = NULL,
  7 0 :                                    FALG = NULL,
  8 0 :                                    FALG = NO_OP*NO_OP
```

```
  9 0 :                          END
 10 0 :         END_AAC;
 11 0 :
 12 0 :/* FABS */     OP_CODE a50w:
 13 1 :                         FADR = ACCUMULATION_ENTRIES*F32_A_B,
 14 1 :                         FALG = NULL,
 15 1 :                         FALG = FLOAT*FABS
 16 1 :               END;
 17 0 :
 18 0 :/* FABS.A */   OP_CODE a51w:
 19 1 :                         FADR = ACCUMULATION_ENTRIES*F32_A_ACC,
 20 1 :                         FALG = NULL,
 21 1 :                         FALG = FLOAT*FABS
 22 1 :               END;
 23 0 :
 24 0 :/* FABS.M */   OP_CODE a52w:
 25 1 :                         FADR = ACCUMULATION_ENTRIES*F32_ACC_B,
 26 1 :                         FALG = NULL,
 27 1 :                         FALG = FLOAT*FABS
 28 1 :               END;
 29 0 :
 30 0 :/* FABS1 */    OP_CODE a53w:
 31 1 :                         FADR = ACCUMULATION_ENTRIES*F32_A_A,
 32 1 :                         FALG = NULL,
 33 1 :                         FALG = FLOAT*FABS
 34 1 :               END;
 35 0 :
 36 0 :/* FABS1.A */  OP_CODE a54w:
 37 1 :                         FADR = ACCUMULATION_ENTRIES*F32_ACC_ACC,
 38 1 :                         FALG = NULL,
 39 1 :                         FALG = FLOAT*FABS
 40 1 :               END;
 41 0 :
 42 0 :/* FADD */     OP_CODE a55w:
 43 1 :                         FADR = ACCUMULATION_ENTRIES*F32_A_B_C,
 44 1 :
 45 1 :                         FALG = NULL,
 46 1 :                         FALG = FLOAT*FADD
 47 1 :               END;
 48 0 :
 49 0 :/* FADD.1 */   OP_CODE a56w:

***** COMMON S-LANGUAGE DISPATCH TABLE *****

50 1 :                         FADR = ACCUMULATION_ENTRIES*F32_A_B_ACC,
 51 1 :                         FALG = NULL,
 52 1 :                         FALG = FLOAT*FADD
 53 1 :               END;
 54 0 :
 55 0 :/* FADD.M */   OP_CODE a57w:
 56 1 :                         FADR = ACCUMULATION_ENTRIES*F32_ACC_B_C,
 57 1 :                         FALG = NULL,
 58 1 :                         FALG = FLOAT*FADD
 59 1 :               END;
 60 0 :
 61 0 :/* FADD2 */    OP_CODE a58w:
 62 1 :                         FADR = ACCUMULATION_ENTRIES*F32_A_B_B,
 63 1 :                         FALG = NULL,
 64 1 :                         FALG = FLOAT*FADD
 65 1 :               END;
 66 0 :
 67 0 :/* FADD2.A */  OP_CODE a59w:
 68 1 :                         FADR = ACCUMULATION_ENTRIES*F32_ACC_B_ACC,
 69 1 :                         FALG = NULL,
 70 1 :                         FALG = FLOAT*FADD
 71 1 :               END;
 72 0 :
 73 0 :/* FADD2.M */  OP_CODE a5Aw:
 74 1 :                         FADR = ACCUMULATION_ENTRIES*F32_ACC_B_B,
 75 1 :                         FALG = NULL,
 76 1 :                         FALG = FLOAT*FADD
 77 1 :               END;
```

```
 78  0 :
 79  0 :/* FDIV */       OP_CODE 98B0:
 80  1 :                    FADR = ACCUMULATION_ENTRIES*F32_A_B_C,
 81  1 :                    FALG = NULL,
 82  1 :                    FALG = FLOAT*FDIV
 83  1 :                 END;
 84  0 :
 85  0 :/* FDIV.A */     OP_CODE 98C0:
 86  1 :                    FADR = ACCUMULATION_ENTRIES*F32_A_B_ACC,
 87  1 :                    FALG = NULL,
 88  1 :                    FALG = FLOAT*FDIV
 89  1 :                 END;
 90  0 :
 91  0 :/* FDIV.M */     OP_CODE 98D0:
 92  1 :                    FADR = ACCUMULATION_ENTRIES*F32_ACC_B_C,
 93  1 :                    FALG = NULL,
 94  1 :                    FALG = FLOAT*FDIV
 95  1 :                 END;
 96  0 :
 97  0 :/* FDIV2 */      OP_CODE 98E0:
 98  1 :                    FADR = ACCUMULATION_ENTRIES*F32_A_B_B,
 99  1 :                    FALG = NULL,
100  1 :                    FALG = FLOAT*FDIV
101  1 :                 END;
102  0 :
103  0 :/* FDIV2.A */    OP_CODE 98F0:
104  1 :                    FADR = ACCUMULATION_ENTRIES*F32_ACC_B_ACC,
105  1 :                    FALG = NULL,
106  1 :                    FALG = FLOAT*FDIV
107  1 :                 END;
108  0 :
109  0 :/* FDIV2.M */    OP_CODE 9900:
110  1 :                    FADR = ACCUMULATION_ENTRIES*F32_ACC_B_B,
111  1 :                    FALG = NULL,
112  1 :                    FALG = FLOAT*FDIV
113  1 :                 END;
114  0 :
115  0 :/* FMOV */       OP_CODE 9910:
116  1 :                    FADR = ACCUMULATION_ENTRIES*F32_A_B,
117  1 :                    FALG = NULL,
118  1 :                    FALG = INT_32*MOV_32
119  1 :                 END;
120  0 :
121  0 :/* FMUL */       OP_CODE 9920:
122  1 :                    FADR = ACCUMULATION_ENTRIES*F32_A_B_C,
123  1 :                    FALG = NULL,
124  1 :                    FALG = FLOAT*FMUL
125  1 :                 END;
126  0 :
127  0 :/* FMUL.A */     OP_CODE 9930:
128  1 :                    FADR = ACCUMULATION_ENTRIES*F32_A_B_ACC,
129  1 :                    FALG = NULL,
130  1 :                    FALG = FLOAT*FMUL
131  1 :                 END;
132  0 :
133  0 :/* FMUL.M */     OP_CODE 9940:
134  1 :                    FADR = ACCUMULATION_ENTRIES*F32_ACC_B_C,
135  1 :                    FALG = NULL,
136  1 :                    FALG = FLOAT*FMUL
137  1 :                 END;
138  0 :
139  0 :/* FMUL2 */      OP_CODE 9950:
140  1 :                    FADR = ACCUMULATION_ENTRIES*F32_A_B_B,
141  1 :                    FALG = NULL,
142  1 :                    FALG = FLOAT*FMUL
143  1 :                 END;
144  0 :
145  0 :/* FMUL2.A */    OP_CODE 9960:
146  1 :                    FADR = ACCUMULATION_ENTRIES*F32_ACC_B_ACC,
147  1 :                    FALG = NULL,
148  1 :                    FALG = FLOAT*FMUL
149  1 :                 END;
150  0 :
```

```
151 0 :/* FMUL2.M */    OP_CODE 997⍵:
152 1 :                     FADR = ACCUMULATION_ENTRIES*F32_ACC_B_B,
153 1 :                     FALG = NULL,
154 1 :                     EALG = FLOAT*FMUL
155 1 :                 END;
156 0 :
157 0 :/* FNEG */       OP_CODE 998⍵:
158 1 :                     FADR = ACCUMULATION_ENTRIES*F32_A_B,
159 1 :                     FALG = NULL,
160 1 :                     EALG = FLOAT*FNEG
161 1 :                 END;
162 0 :
163 0 :/* FNEG.A */     OP_CODE 999⍵:
164 1 :                     FADR = ACCUMULATION_ENTRIES*F32_A_ACC,
165 1 :                     FALG = NULL,
166 1 :                     EALG = FLOAT*FNEG
167 1 :                 END;
168 0 :
169 0 :/* FNEG.M */     OP_CODE 99A⍵:
170 1 :                     FADR = ACCUMULATION_ENTRIES*F32_ACC_B,
171 1 :                     FALG = NULL,
172 1 :                     EALG = FLOAT*FNEG
173 1 :                 END;
174 0 :
175 0 :/* FNEG1 */      OP_CODE 99B⍵:
176 1 :                     FADR = ACCUMULATION_ENTRIES*F32_A_A,
177 1 :                     FALG = NULL,
178 1 :                     FALG = FLOAT*FNEG
179 1 :                 END;
180 0 :
181 0 :/* FNEG1.A */    OP_CODE 99C⍵:
182 1 :                     FADR = ACCUMULATION_ENTRIES*F32_ACC_ACC,
183 1 :                     FALG = NULL,
184 1 :                     FALG = FLOAT*FNEG
185 1 :                 END;
186 0 :
187 0 :/* FSUB */       OP_CODE 99D⍵:
188 1 :                     FADR = ACCUMULATION_ENTRIES*F32_A_B_C,
189 1 :                     FALG = NULL,
190 1 :                     FALG = FLOAT*FSUB
191 1 :                 END;
192 0 :
193 0 :/* FSUB.A */     OP_CODE 99E⍵:
194 1 :                     FADR = ACCUMULATION_ENTRIES*F32_A_B_ACC,
195 1 :                     FALG = NULL,
196 1 :                     FALG = FLOAT*FSUB
197 1 :                 END;
198 0 :
199 0 :/* FSUB.M */     OP_CODE 99F⍵:
200 1 :                     FADR = ACCUMULATION_ENTRIES*F32_ACC_B_C,
201 1 :                     FALG = NULL,
202 1 :                     FALG = FLOAT*FSUB
203 1 :                 END;
204 0 :
205 0 :/* FSUB2 */      OP_CODE 9A0⍵:
206 1 :                     FADR = ACCUMULATION_ENTRIES*F32_A_B_B,
207 1 :                     FALG = NULL,
208 1 :                     FALG = FLOAT*FSUB
209 1 :                 END;
210 0 :
211 0 :/* FSUB2.A */    OP_CODE 9A1⍵:
212 1 :                     FADR = ACCUMULATION_ENTRIES*F32_ACC_B_ACC,
213 1 :                     FALG = NULL,
214 1 :                     FALG = FLOAT*FSUB
215 1 :                 END;
216 0 :
217 0 :/* FSUB2.M */    OP_CODE 9A2⍵:
218 1 :                     FADR = ACCUMULATION_ENTRIES*F32_ACC_B_B,
219 1 :                     FALG = NULL,
220 1 :                     FALG = FLOAT*FSUB
221 1 :                 END;
222 0 :
```

```
223  0 :                    RESERVE(@A3@);
224  0 :                    RESERVE(@A4@);
225  0 :                    RESERVE(@A5@);
226  0 :                    RESERVE(@A6@);
227  0 :                    RESERVE(@A7@);
228  0 :                    RESERVE(@A8@);
229  0 :                    RESERVE(@A9@);
230  0 :                    RESERVE(@AA@);
231  0 :                    RESERVE(@AB@);
232  0 :                    RESERVE(@AC@);
233  0 :                    RESERVE(@AD@);
234  0 :                    RESERVE(@AE@);
235  0 :                    RESERVE(@AF@);
236  0 :
237  0 :/* GABS */          OP_CODE @B0@:
238  1 :                         FADR = SOP_ENTRIES*FLT_A_B,
239  1 :                         FALG = NULL,
240  1 :                         FALG = FLOAT*FABS
241  1 :                    END;
242  0 :
243  0 :/* GADD */          OP_CODE @B1@:
244  1 :                         FADR = SOP_ENTRIES*FLT_A_B_C,
245  1 :                         FALG = NULL,
246  1 :                         FALG = FLOAT*FADD
247  1 :                    END;
248  0 :
249  0 :/* GADD2 */         OP_CODE @B2@:
250  1 :                         FADR = SOP_ENTRIES*FLT_A_B_B,
251  1 :                         FALG = NULL,
252  1 :                         FALG = FLOAT*FADD
253  1 :                    END;
254  0 :
255  0 :/* GDIV */          OP_CODE @B3@:
256  1 :                         FADR = SOP_ENTRIES*FLT_A_B_C,
257  1 :                         FALG = NULL,
258  1 :                         FALG = FLOAT*FDIV
259  1 :                    END;
260  0 :
261  0 :/* GFLVI */         OP_CODE @B4@:
262  1 :                         FADR = SOP_ENTRIES*FLOAT_READ_A_DOUBLE,
263  1 :                         FALG = SOP_ENTRIES*D_INT32,
264  1 :                         FALG = FLOAT*FLT_TO_INT32
265  1 :                    END;
266  0 :
267  0 :/* GINT */          OP_CODE @B5@:
268  1 :                         FADR = SOP_ENTRIES*FLT_A_B,
269  1 :                         FALG = NULL,
270  1 :                         FALG = FLOAT*FINT
271  1 :                    END;
272  0 :
273  0 :/* GMOV */          OP_CODE @B6@:
274  1 :                         FADR = SOP_ENTRIES*FMOV,
275  1 :                         FALG = NULL,
276  1 :                         FALG = INT_32*MOV_32
277  1 :                    END;
278  0 :
279  0 :/* GMUL */          OP_CODE @B7@:
280  1 :                         FADR = SOP_ENTRIES*FLT_A_B_C,
281  1 :                         FALG = NULL,
282  1 :                         FALG = FLOAT*FMUL
283  1 :                    END;
284  0 :
285  0 :/* GMUL2 */         OP_CODE @B8@:
286  1 :                         FADR = SOP_ENTRIES*FLT_A_B_B,
287  1 :                         FALG = NULL,
288  1 :                         FALG = FLOAT*FMUL
289  1 :                    END;
290  0 :
291  0 :/* GNEG */          OP_CODE @B9@:
292  1 :                         FADR = SOP_ENTRIES*FLT_A_B,
293  1 :                         FALG = NULL,
294  1 :                         FALG = FLOAT*FNEG
295  1 :                    END;
```

```
296 0 :
297 0 :/* GSUB */        OP_CODE  FSAW:
298 1 :                          FADR = SOP_ENTRIES*FLT_A_B_C,
299 1 :                          FALG = NULL,
300 1 :                          FALG = FLOAT*FSUB
301 1 :                  END;
302 0 :
303 0 :/* GSUB2 */       OP_CODE  FSBW:
304 1 :                          FADR = SOP_ENTRIES*FLT_A_B_B,
305 1 :                          FALG = NULL,
306 1 :                          FALG = FLOAT*FSUB
307 1 :                  END;
308 0 :
309 0 :/* GRL */         OP_CODE  FSCW:
310 1 :                          FADR = SOP_ENTRIES*FLT_CMP_A_B,
311 1 :                          FALG = CSL_BRANCH*BR_LT,
312 1 :                          FALG = FLOAT*FCMP
313 1 :                  END;
314 0 :
315 0 :/* GBLE */        OP_CODE  FSDW:
316 1 :                          FADR = SOP_ENTRIES*FLT_CMP_A_B,
317 1 :                          FALG = CSL_BRANCH*BR_LE,
318 1 :                          FALG = FLOAT*FCMP
319 1 :                  END;
320 0 :
321 0 :                  RESERVE(R6EW);
322 0 :                  RESERVE(R6FW);
323 0 :
324 0 :/* IABS */        OP_CODE  AC0W:
325 1 :                          FADR = SOP_ENTRIES*I32_A_B,
326 1 :                          FALG = NULL,
327 1 :                          FALG = INT_32*ABS_INT32
328 1 :                  END;
329 0 :
330 0 :/* IABS1 */       OP_CODE  AC1W:
331 1 :                          FADR = SOP_ENTRIES*I32_A_A,
332 1 :                          FALG = NULL,
333 1 :                          FALG = INT_32*ABS_INT32
334 1 :                  END;
335 0 :
336 0 :/* IADD */        OP_CODE  AC2W:
337 1 :                          FADR = SOP_ENTRIES*I32_A_B_C,
338 1 :                          FALG = NULL,
339 1 :                          FALG = INT_32*ADD_INT32
340 1 :                  END;
341 0 :
342 0 :/* IADD2 */       OP_CODE  AC3W:
343 1 :                          FADR = SOP_ENTRIES*I32_A_B_B,
344 1 :                          FALG = NULL,
345 1 :                          FALG = INT_32*ADD_INT32
346 1 :                  END;
347 0 :
348 0 :/* ICLR */        OP_CODE  AC4W:
349 1 :                          FADR = SOP_ENTRIES*ICLR,
350 1 :                          FALG = NULL,
351 1 :                          FALG = NO_OP*NO_OP
352 1 :                  END;
353 0 :
354 0 :/* IDEC */        OP_CODE  AC5W:
355 1 :                          FADR = SOP_ENTRIES*I32_A_B,
356 1 :                          FALG = NULL,
357 1 :                          FALG = INT_32*DEC_INT32
358 1 :                  END;
359 0 :
360 0 :/* IDEC1 */       OP_CODE  AC6W:
361 1 :                          FADR = SOP_ENTRIES*I32_A_A,
362 1 :                          FALG = NULL,
363 1 :                          FALG = INT_32*DEC_INT32
364 1 :                  END;
365 0 :
366 0 :/* IDIV */        OP_CODE  AC7W:
367 1 :                          FADR = SOP_ENTRIES*I32_A_B_C,
```

```
368 1 :                              FALG = NULL,
369 1 :                              FALG = INT_32*DIV_INT32
370 1 :                    END;
371 0 :
372 0 :/* IDIV2 */    OP_CODE aLBw:
373 1 :                              FADR = SOP_ENTRIES*I32_A_B_B,
374 1 :                              FALG = NULL,
375 1 :                              FALG = INT_32*DIV_INT32
376 1 :                    END;
377 0 :
378 0 :/* IINC */     OP_CODE aC9w:
379 1 :                              FADR = SOP_ENTRIES*I32_A_B,
380 1 :                              FALG = NULL,
381 1 :                              FALG = INT_32*INC_INT32
382 1 :                    END;
383 0 :
384 0 :/* IINC1 */    OP_CODE aCAw:
385 1 :                              FADR = SOP_ENTRIES*I32_A_A,
386 1 :                              FALG = NULL,
387 1 :                              FALG = INT_32*INC_INT32
388 1 :                    END;
389 0 :
390 0 :/* IGCVT */    OP_CODE aCBw:
391 1 :                              FADR = SOP_ENTRIES*EVAL_A,
392 1 :                              FALG = SOP_ENTRIES*FLOAT_STORE_B_DOUBLE,
393 1 :                              FALG = FLOAT*INT32_TO_FLT64
394 1 :                    END;
395 0 :
396 0 :/* IMOD */     RESERVE(ACCU);
397 0 :
398 0 :/* IMOV */     OP_CODE aCDw:
399 1 :                              FADR = SOP_ENTRIES*I32_A_B,
400 1 :                              FALG = NULL,
401 1 :                              FALG = INT_32*MOV_INT32
402 1 :                    END;
403 0 :
404 0 :/* IMUL */     OP_CODE aLEw:
405 1 :                              FADR = SOP_ENTRIES*I32_A_B_C,
406 1 :                              FALG = NULL,
407 1 :                              FALG = INT_32*MUL_INT32
408 1 :                    END;
409 0 :
410 0 :/* IMUL2 */    OP_CODE aLFw:
411 1 :                              FADR = SOP_ENTRIES*I32_A_B_B,
412 1 :                              FALG = NULL,
413 1 :                              FALG = INT_32*MUL_INT32
414 1 :                    END;
415 0 :
416 0 :/* INEG */     OP_CODE aD0w:
417 1 :                              FADR = SOP_ENTRIES*I32_A_B,
418 1 :                              FALG = NULL,
419 1 :                              FALG = INT_32*NEG_INT32
420 1 :                    END;
421 0 :
422 0 :/* INEG1 */    OP_CODE aD1w:
423 1 :                              FADR = SOP_ENTRIES*I32_A_A,
424 1 :                              FALG = NULL,
425 1 :                              FALG = INT_32*NEG_INT32
426 1 :                    END;
427 0 :
428 0 :/* IREM */     OP_CODE aD2w:
429 1 :                              FADR = SOP_ENTRIES*I32_A_B_C,
430 1 :                              FALG = NULL,
431 1 :                              FALG = INT_32*REM_INT32
432 1 :                    END;
433 0 :
434 0 :/* ISET */     OP_CODE aD3w:
435 1 :                              FADR = SOP_ENTRIES*ISET,
436 1 :                              FALG = NULL,
437 1 :                              FALG = NO_OPAND_OP
438 1 :                    END;
439 0 :
440 0 :/* ISETUNE */  OP_CODE aD4w:
```

```
441  1 :                          FADR = SOP_ENTRIES*ISETONE,
442  1 :                          FALG = NULL,
443  1 :                          FALG = INT_32*ONE_INT32
444  1 :                   END;
445  0 :
446  0 :/* ISUB */      OP_CODE  3D5#:
447  1 :                          FADR = SOP_ENTRIES*I32_A_B_C,
448  1 :                          FALG = NULL,
449  1 :                          FALG = INT_32*SUB_INT32
450  1 :                   END;
451  0 :
452  0 :/* ISUB2 */     OP_CODE  3D6#:
453  1 :                          FADR = SOP_ENTRIES*I32_A_B_B,
454  1 :                          FALG = NULL,
455  1 :                          FALG = INT_32*SUB_INT32
456  1 :                   END;
457  0 :
458  0 :/* IAUDBGE */   OP_CODE  3D7#:
459  1 :                          FADR = SOP_ENTRIES*RESOLVE_ZERO,
460  1 :                          FALG = CSL_BRANCH*AUDBGE,
461  1 :                          FALG = INT_32*ADD_INT32
462  1 :                   END;
463  0 :
464  0 :/* IAUDBLE */   OP_CODE  3D8#:
465  1 :                          FADR = SOP_ENTRIES*RESOLVE_ZERO,
466  1 :                          FALG = CSL_BRANCH*AUDBLE,
467  1 :                          FALG = INT_32*ADD_INT32
468  1 :                   END;
469  0 :
470  0 :/* ILPD  */     OP_CODE  3D9#:
471  1 :                          FADR = SOP_ENTRIES*I32_CMP_A_B,
472  1 :                          FALG = CSL_BRANCH*LPDN,
473  1 :                          FALG = INT_32*COMPARE_N_DEC
474  1 :                   END;
475  0 :
476  0 :/* ILPDNZ */    OP_CODE  3DA#:
477  1 :                          FADR = SOP_ENTRIES*I32_CMP_0,
478  1 :                          FALG = CSL_BRANCH*LPDNZ,
479  1 :                          FALG = INT_32*DEC_INT32
480  1 :                   END;
481  0 :
482  0 :/* ILPUP */     OP_CODE  3DB#:
483  1 :                          FADR = SOP_ENTRIES*I32_CMP_A_B,
484  1 :                          FALG = CSL_BRANCH*LPUP,
485  1 :                          FALG = INT_32*COMPARE_N_INC
486  1 :                   END;
487  0 :
488  0 :/* IINCBLE */   OP_CODE  3DC#:
489  1 :                          FADR = SOP_ENTRIES*I32_CMP_A_B,
490  1 :                          FALG = CSL_BRANCH*INCBLE,
491  1 :                          FALG = INT_32*COMPARE_N_INC
492  1 :                   END;
493  0 :
494  0 :/* IBE  */      OP_CODE  3DD#:
495  1 :                          FADR = SOP_ENTRIES*I32_CMP_A_B,
496  1 :                          FALG = CSL_BRANCH*BR_EQ,
497  1 :                          FALG = INT_32*COMPARE_32
498  1 :                   END;
499  0 :
500  0 :/* IBGEZ */     OP_CODE  3DE#:
501  1 :                          FADR = SOP_ENTRIES*I32_CMP_0,
502  1 :                          FALG = CSL_BRANCH*BR_GE,
503  1 :                          FALG = INT_32*MOV_32
504  1 :                   END;
505  0 :
506  0 :/* IBGZ */      OP_CODE  3DF#:
507  1 :                          FADR = SOP_ENTRIES*I32_CMP_0,
508  1 :                          FALG = CSL_BRANCH*BR_GT,
509  1 :                          FALG = INT_32*TESTZ_32
510  1 :                   END;
511  0 :
512  0 :/* IBINBND */   OP_CODE  3E0#:
```

```
513  1 :                              FADR = SOP_ENTRIES*I32_CMP_A_B_C,
514  1 :                              FALG = CSL_BRANCH*BR_GE,
515  1 :                              FALG = INT_32*INBOUNDS_INT32
516  1 :                   END;
517  0 :
518  0 :/* INSTGRID */ OP_CODE  #E1#:
519  1 :                              FADR = SOP_ENTRIES*I32_CMP_A_B_C,
520  1 :                              FALG = CSL_BRANCH*BR_LT,
521  1 :                              FALG = INT_32*INBOUNDS_INT32
522  1 :                   END;
523  0 :
524  0 :/* IRL     */ OP_CODE  #E2#:
525  1 :                              FADR = SOP_ENTRIES*I32_CMP_A_B,
526  1 :                              FALG = CSL_BRANCH*BR_LT,
527  1 :                              FALG = INT_32*REV_SUB_INT32
528  1 :                   END;
529  0 :
530  0 :/* IRLF    */ OP_CODE  #E3#:
531  1 :                              FADR = SOP_ENTRIES*I32_CMP_A_B,
532  1 :                              FALG = CSL_BRANCH*BR_GE,
533  1 :                              FALG = INT_32*SUB_INT32
534  1 :                   END;
535  0 :
536  0 :/* IRLFZ   */ OP_CODE  #E4#:
537  1 :                              FADR = SOP_ENTRIES*I32_CMP_0,
538  1 :                              FALG = CSL_BRANCH*BR_LE,
539  1 :                              FALG = INT_32*TESTZ_32
540  1 :                   END;
541  0 :
542  0 :/* IRLZ    */ OP_CODE  #E5#:
543  1 :                              FADR = SOP_ENTRIES*I32_CMP_0,
544  1 :                              FALG = CSL_BRANCH*BR_LT,
545  1 :                              FALG = INT_32*MOV_32
546  1 :                   END;
547  0 :
548  0 :/* IRNE    */ OP_CODE  #E6#:
549  1 :                              FADR = SOP_ENTRIES*I32_CMP_A_B,
550  1 :                              FALG = CSL_BRANCH*BR_NE,
551  1 :                              FALG = INT_32*COMPARE_32
552  1 :                   END;
553  0 :
554  0 :/* IRNZ    */ OP_CODE  #E7#:
555  1 :                              FADR = SOP_ENTRIES*I32_CMP_0,
556  1 :                              FALG = CSL_BRANCH*BR_NE,
557  1 :                              FALG = INT_32*TESTZ_32
558  1 :                   END;
559  0 :
560  0 :/* IRZ     */ OP_CODE  #E8#:
561  1 :                              FADR = SOP_ENTRIES*I32_CMP_0,
562  1 :                              FALG = CSL_BRANCH*BR_EQ,
563  1 :                              FALG = INT_32*TESTZ_32
564  1 :                   END;
565  0 :
566  0 :                   RESERVE(#E9#);
567  0 :                   RESERVE(#EA#);
568  0 :                   RESERVE(#EB#);
569  0 :                   RESERVE(#EC#);
570  0 :                   RESERVE(#ED#);
571  0 :                   RESERVE(#EE#);
572  0 :                   RESERVE(#EF#);
573  0 :
574  0 :/* JABS    */ OP_CODE  #F0#:
575  1 :                              FADR = SOP_ENTRIES*RESOLVE_ZERO,
576  1 :                              FALG = CSL_INT64*I64_A_B,
577  1 :                              FALG = INT_64*ABS_INT64
578  1 :                   END;
579  0 :
580  0 :/* JADD    */ OP_CODE  #F1#:
581  1 :                              FADR = SOP_ENTRIES*RESOLVE_ZERO,
582  1 :                              FALG = CSL_INT64*FBOX_I64_A_B_C,
583  1 :                              FALG = NO_OP*NO_OP
584  1 :                   END;
```

```
585 0 :
586 0 :/* JDIV */         OP_CODE OF2:
587 1 :                       FADR = SOP_ENTRIES*RESOLVE_ZERO,
588 1 :                       FALG = CSL_INT64*I64_A_B_C,
589 1 :                       FALG = INT_64*DIV_INT64
590 1 :                   END;
591 0 :
592 0 :/* JMOV */         OP_CODE OF3:
593 1 :                       FADR = SOP_ENTRIES*RESOLVE_ZERO,
594 1 :                       FALG = CSL_INT64*I64_A_B,
595 1 :                       FALG = INT_64*MOV_INT64
596 1 :                   END;
597 0 :
598 0 :/* JMUL */         OP_CODE OF4:
599 1 :                       FADR = SOP_ENTRIES*RESOLVE_ZERO,
600 1 :                       FALG = CSL_INT64*I64_A_B_C,
601 1 :                       FALG = INT_64*MUL_INT64
602 1 :                   END;
603 0 :
604 0 :/* JNEG */         OP_CODE OF5:
605 1 :                       FADR = SOP_ENTRIES*RESOLVE_ZERO,
606 1 :                       FALG = CSL_INT64*I64_A_B,
607 1 :                       FALG = INT_64*NEG_INT64
608 1 :                   END;
609 0 :
610 0 :/* JNOP */         RESERVE(OF6);
611 0 :
612 0 :/* JSCALE */       RESERVE(OF7);
613 0 :
614 0 :/* JSUB */         OP_CODE OF8:
615 1 :                       FADR = SOP_ENTRIES*RESOLVE_ZERO,
616 1 :                       FALG = CSL_INT64*F4UX_I64_A_B_C,
617 1 :                       FALG = NO_OP*NO_OP
618 1 :                   END;
619 0 :
620 0 :/* JBE */          OP_CODE OF9:
621 1 :                       FADR = SOP_ENTRIES*I64_CMP_A_B,
622 1 :                       FALG = CSL_BRANCH*BR_EQ,
623 1 :                       FALG = INT_64*COMPARE_64
624 1 :                   END;
625 0 :
626 0 :/* JBGT */         OP_CODE OFA:
627 1 :                       FADR = SOP_ENTRIES*I64_CMP_0,
628 1 :                       FALG = CSL_BRANCH*BR_GT,
629 1 :                       FALG = INT_64*TEST_64
630 1 :                   END;
631 0 :
632 0 :/* JBL */          OP_CODE OFB:
633 1 :                       FADR = SOP_ENTRIES*I64_CMP_A_B,
634 1 :                       FALG = CSL_BRANCH*BR_LT,
635 1 :                       FALG = INT_64*COMPARE_64
636 1 :                   END;
637 0 :
638 0 :/* JBLE */         OP_CODE OFC:
639 1 :                       FADR = SOP_ENTRIES*I64_CMP_A_B,
640 1 :                       FALG = CSL_BRANCH*BR_LE,
641 1 :                       FALG = INT_64*COMPARE_64
642 1 :                   END;
643 0 :
644 0 :/* JBLEZ */        OP_CODE OFD:
645 1 :                       FADR = SOP_ENTRIES*I64_CMP_0,
646 1 :                       FALG = CSL_BRANCH*BR_LE,
647 1 :                       FALG = INT_64*TEST_64
648 1 :                   END;
649 0 :
650 0 :/* JBNE */         OP_CODE OFE:
651 1 :                       FADR = SOP_ENTRIES*I64_CMP_A_B,
652 1 :                       FALG = CSL_BRANCH*BR_NE,
653 1 :                       FALG = INT_64*COMPARE_64
654 1 :                   END;
655 0 :
```

```
656 0 :             RESERVE(OFF0);
657 0 :
658 0 :/* COMMON S-LANGUAGE DISPATCH TABLE */
659 0 :

DATA GENERAL F H P - FETCH MICROCODE GENERATOR, REV. 6.0 (3/16/79)
   6/23/81 AT 16:54:13

INPUT FILE: ACCUMULATION_ENTRIES
OBJECT FILE: ACCUMULATION_ENTRIES.OB

LINE NC:SOURCE 1 0 :$INCLUDE FBUX_INCLUDES:COMMON_REGISTERS
   2 0 :$NO LIST
 166 0 :$INCLUDE FBUX_INCLUDES:F.MAC
 167 0 :$NO LIST
 235 0 :$TITLE S-op Entries for Emulated Accumulation S-ops
 236 0 :
 237 0 :        MACRO   FBOX_ACCUM      MEANS   CURRENT(3)      ENDMAC;
 238 0 :
 239 0 :ENTRY F32_A_B_C:
 240 0 :        PARSE_K_DISPATCH_EBOX,
 241 0 :        EVAL(A);
 242 0 :
 243 0 :        PARSE_K_LOAD_EPC,
 244 0 :        EVAL(A);
 245 0 :
 246 0 :        PARSE_K_LOAD_EPC,
 247 0 :        RESOLVE(A);
 248 0 :
 249 0 :        OFF_ALU_OUT = EBOX_DATA OR CON_0,
 250 0 :        LOAD_OFF(EBOX_ACCUM) WITH OFFSET,
 251 0 :        LONG_GOTO F32_STORE;
 252 0 :
 253 0 :ENTRY F32_A_B_B:
 254 0 :        PARSE_K_DISPATCH_EBOX,
 255 0 :        EVAL(A);
 256 0 :
 257 0 :        PARSE_K_LOAD_EPC,
 258 0 :        EVAL(A);
 259 0 :
 260 0 :        OFF_ALU_OUT = EBOX_DATA OR CON_0,
 261 0 :        LOAD_OFF(EBOX_ACCUM) WITH OFFSET;
 262 0 :
 263 0 :F32_STORE:
 264 0 :        WRITE FROM STOREBACK_DATA USING DESCRIPTOR REG_A BIAS_LENGTH,
 265 0 :        LOAD_AON(REG_A) WITH 0,
 266 0 :        NEXT_S_OP;
 267 0 :
 268 0 :ENTRY F32_A_B_ACC:
 269 0 :        PARSE_K_DISPATCH_EBOX,
 270 0 :        EVAL(A);
 271 0 :
 272 0 :        PARSE_K_LOAD_EPC,
 273 0 :        EVAL(A);
 274 0 :
 275 0 :        ACK_EBOX_DATA,
 276 0 :        OFF_ALU_OUT = EBOX_DATA OR CON_0,
 277 0 :        LOAD_OFF(EBOX_ACCUM) WITH OFFSET,
 278 0 :        IF EBOX_EXCEPTION THEN GOTO SIGNAL_EXCEPT;
 279 0 :
```

S-op Entries for Emulated Accumulation S-ops

```
 280 0 :        NEXT_S_OP;
 281 0 :
 282 0 :ENTRY F32_ACC_B_C:
 283 0 :        PARSE_K_DISPATCH_EBOX,
 284 0 :        EVAL(A);
 285 0 :
 286 0 :        OFF_ALU_OUT = BIASED_LENGTH CON_LENGTH(0) OR EBOX_ACCUM,
 287 0 :        SOURCE(OFF_ALU_DATA) TO IPO_BUS(EBOX_DATA_0);
```

```
288 0 :
289 0 :           PARSE_K_LOAD_EPC,
290 0 :           RESOLVE(A);
291 0 :
292 0 :           OFF_ALU_OUT = EBOX_DATA OR CON_0,
293 0 :           LOAD_OFF(EBOX_ACCUM) WITH OFFSET,
294 0 :           LONG_GOTO F32_STORE;
295 0 :
296 0 :ENTRY F32_ACC_B_ACC:
297 0 :           PARSE_K_DISPATCH_EBOX,
298 0 :           EVAL(A);
299 0 :
300 0 :           OFF_ALU_OUT = BIASED_LENGTH CON_LENGTH(0) OR EBOX_ACCUM,
301 0 :           SOURCE(OFF_ALU_DATA) TO JPD_BUS(EBOX_DATA_0);
302 0 :
303 0 :           ACK_EBOX_DATA,
304 0 :           OFF_ALU_OUT = EBOX_DATA OR CON_0,
305 0 :           LOAD_OFF(EBOX_ACCUM) WITH OFFSET,
306 0 :           IF EBOX_EXCEPTION THEN GOTO SIGNAL_EXCEPT;
307 0 :
308 0 :           NEXT_S_OP;
309 0 :
310 0 :ENTRY F32_ACC_B_B:
311 0 :           PARSE_K_DISPATCH_EBOX,
312 0 :           EVAL(A);
313 0 :
314 0 :           OFF_ALU_OUT = BIASED_LENGTH CON_LENGTH(0) OR EBOX_ACCUM,
315 0 :           SOURCE(OFF_ALU_DATA) TO JPD_BUS(EBOX_DATA_0);
316 0 :
317 0 :           OFF_ALU_OUT = EBOX_DATA OR CON_0,
318 0 :           LOAD_OFF(EBOX_ACCUM) WITH OFFSET;
319 0 :
320 0 :           WRITE FROM STOREBACK_DATA USING DESCRIPTOR REG_A BIAS_LENGTH,
321 0 :           LOAD_AON(REG_A) WITH 0,
322 0 :           NEXT_S_OP;
323 0 :
324 0 :ENTRY F32_A_B:
325 0 :           PARSE_K_DISPATCH_EBOX,
326 0 :           EVAL(A);
327 0 :
328 0 :           PARSE_K_LOAD_EPC,
329 0 :           RESOLVE(A);
330 0 :
331 0 :           OFF_ALU_OUT = EBOX_DATA OR CON_0,
332 0 :           LOAD_OFF(EBOX_ACCUM) WITH OFFSET;
333 0 :
334 0 :           WRITE FROM STOREBACK_DATA USING DESCRIPTOR REG_A BIAS_LENGTH.
335 0 :           LOAD_AON(REG_A) WITH 0,
336 0 :           NEXT_S_OP;
337 0 :
338 0 :ENTRY F32_A_ACC:
339 0 :           PARSE_K_DISPATCH_EBOX,
340 0 :           EVAL(A);
341 0 :
342 0 :           ACK_EBOX_DATA,
343 0 :           OFF_ALU_OUT = EBOX_DATA OR CON_0,
344 0 :           LOAD_OFF(EBOX_ACCUM) WITH OFFSET,
345 0 :           IF EBOX_EXCEPTION THEN GOTO SIGNAL_EXCEPT;
346 0 :
347 0 :           NEXT_S_OP;
348 0 :
349 0 :           NOP;
350 0 :
351 0 :ENTRY F32_ACC_B:
352 0 :           DISPATCH EBOX,
353 0 :           OFF_ALU_OUT = BIASED_LENGTH CON_LENGTH(0) OR EBOX_ACCUM,
354 0 :           SOURCE(OFF_ALU_DATA) TO JPD_BUS(EBOX_DATA_0);
355 0 :
356 0 :           PARSE_K_LOAD_EPC,
357 0 :           RESOLVE(A);
358 0 :
359 0 :           OFF_ALU_OUT = EBOX_DATA OR CON_0,
360 0 :           LOAD_OFF(EBOX_ACCUM) WITH OFFSET;
```

```
361 0 :
362 0 :           WRITE FROM STOREBACK_DATA USING DESCRIPTOR REG_A BIAS_LENGTH,
363 0 :           LOAD_AON(REG_A) WITH 0,
364 0 :           NEXT_S_OP;
365 0 :
366 0 :ENTRY F32_ACC_ACC:
367 0 :           DISPATCH EBOX,
368 0 :           OFF_ALU_OUT = BIASED_LENGTH CON_LENGTH(0) OR EBOX_ACCUM,
369 0 :           SOURCE(OFF_ALU_DATA) TO JPD_BUS(EBOX_DATA_0);
370 0 :
371 0 :           ACK_EBOX_DATA,
372 0 :           OFF_ALU_OUT = EBOX_DATA OR CON_0,
373 0 :           LOAD_OFF(EBOX_ACCUM) WITH OFFSET,
374 0 :           IF EBOX_EXCEPTION THEN GOTO SIGNAL_EXCEPT;
375 0 :
376 0 :           NEXT_S_OP;
377 0 :
378 0 :           NOP;
379 0 :
380 0 :ENTRY F32_A_A:
381 0 :           PARSE_K_DISPATCH_EBOX,
382 0 :           EVAL(A);
383 0 :
384 0 :           OFF_ALU_OUT = EBOX_DATA OR CON_0,
385 0 :           LOAD_OFF(EBOX_ACCUM) WITH OFFSET;
386 0 :
387 0 :           WRITE FROM STOREBACK_DATA USING DESCRIPTOR REG_A BIAS_LENGTH
388 0 :           LOAD_AON(REG_A) WITH 0,
389 0 :           NEXT_S_OP;
390 0 :
391 0 :SIGNAL_EXCEPT:
392 0 :           LONG_CALL EXCEPTION_HANDLER+GENERAL_ENTRY;
393 0 :
IPUT FILE:    218.1_FILE13
JJECT FILE:   ACCUMULATION_ENTRIES.OB

LINE N :SOURCE 239 0 : ENTRY F32_A_B_C :
240 0 : PARSE_K_DISPATC ,
  M 0 : dev_cmd 125 ,
241 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
241 0 : ;
243 0 : PARSE_K_LOAD_FP ,
  M 0 : dev_cmd 121 , nb_ctrl 1 ,
244 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
244 0 : ;
246 0 : PARSE_K_LOAD_EP ,
  M 0 : dev_cmd 121 , nb_ctrl 1 ,
247 0 : RESOLVE ( 0 )
  M 0 : mem 0 , nac 0 , snac 0 , dest_frame 0 , r_dest 0
  M 0 : , r_w 1 , nb_ctrl 1 , l_in 1 , o_in 1 , a_in 1 , a_w 1
247 0 : ;
249 0 : OFF_ALU_OUT = EBOX_DATA OR COMMON ( mRW , 0 ) ,
  M 0 :   alu_in 0 , jpd_ctrl 15 alu_op 5 src_frame 2 ,
  M 0 : r_source 0 , com_ext 858 ,
250 0 : LOAD_OFF ( CURRENT ( 3 ) ) WITH OFFSET ,
  M 0 : dest_frame 0 , r_dest 3 , r_w 1 o_in 3 ,
251 0 : LONG_GOTO F32_STORE
  M 0 : nac 0 , lit14 F32_STORE
251 0 : ;
253 0 : ENTRY F32_A_B_B :
254 0 : PARSE_K_DISPATC ,
  M 0 : dev_cmd 125 ,
255 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
255 0 : ;
```

```
257 0 : PARSE_K_LOAD_EP ,
  M 0 : dev_cmd 121 , nb_ctrl 1 ,
258 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
258 0 : ;
260 0 : OFF_ALU_OUT = EBOX_DATA OP COMMON ( OR@ , 0 ) ,
  M 0 :    alu_in 0 , ipd_ctrl 15  alu_op 5  src_frame 2 ,
  M 0 : r_source 0 , com_ext OR@ ,
261 0 : LOAD_OFF ( CURRENT ( 3 ) ) WITH OFFSET
  M 0 : dest_frame 0 , r_dest 3 , r_w 1  o_in   3
261 0 : ;
263 0 : F32_STORE :
264 0 : WRITE FROM STOREBACK_DATA USING DESCRIPTOR CURRENT
264 0 : ( 0 ) BIAS_LENGTH ,
  M 0 : mem 4 , ipd_ctrl 1    nb_ctrl 0  src_frame 0 , r_source
  M 0 : 0  len_ctrl 12 ,
265 0 : LOAD_ADR ( CURRENT ( 0 ) ) WITH 0 ,
  M 0 : dest_frame 0 , r_dest 0 , r_w 1  a_in   0 ,
266 0 : NEXT_S_OP
  M 0 : dev_cmd 120 , nb_ctrl 1 , nb_ctrl 1 , nac 6 , lit14
  M 0 :  EMULATE_2400 * PARSE_16_BIT_OP
266 0 : ;
268 0 : ENTRY F32_A_B_ACC :
269 0 : PARSE_K_DISPATC ,
  M 0 : dev_cmd 125 ,
270 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
270 0 : ;
272 0 : PARSE_K_LOAD_EP ,
  M 0 : dev_cmd 121 , nb_ctrl 1 ,
273 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
273 0 : ;
275 0 : ACK_EBOX_DATA ,
  M 0 : dev_cmd 111 ,
276 0 : OFF_ALU_OUT = EBOX_DATA OR COMMON ( OR@ , 0 ) ,
  M 0 :   alu_in 0 , ipd_ctrl 15  alu_op 5  src_frame 2 ,
  M 0 : r_source 0 , com_ext OR@ ,
277 0 : LOAD_OFF ( CURRENT ( 3 ) ) WITH OFFSET ,
  M 0 : dest_frame 0 , r_dest 3 , r_w 1  o_in   3 ,
278 0 : IF EBOX_EXCEPTION THEN GOTO SIGNAL_EXCEPT
  M 0 : test 19 , polarity 1   nac 4 , lit9 SIGNAL_EXCEPT
278 0 : ;
280 0 : NEXT_S_OP
  M 0 : dev_cmd 120 , nb_ctrl 1 , nb_ctrl 1 , nac 6 , lit14
  M 0 :  EMULATE_2400 * PARSE_16_BIT_OP
280 0 : ;
282 0 : ENTRY F32_ACC_B_C :
283 0 : PARSE_K_DISPATC ,
  M 0 : dev_cmd 125 ,
284 0 : EVAL ( 0 )
  M 0 : mem 1 , md 0 , nac 0 , snac 5 , dest_frame 0 , r_dest
  M 0 : 0 , r_w 1 , nb_ctrl 1 , l_in 1 , o_in 1 , a_in 1 , a_w 1
284 0 : ;
286 0 : OFF_ALU_OUT = BIASED_LENGTH CON_LENGTH ( 0 ) OR CURRENT ( 3 ) ,
  M 0 :   alu_in 1  len_ctrl 0    alu_op 5  src_frame 0 , r_source 3 ,
287 0 : SOURCE ( OFF_ALU_DATA ) TO IPD_BUS ( EBOX_DATA_0 )
  M 0 : ipd_ctrl 7    rand 12
287 0 : ;
289 0 : PARSE_K_LOAD_EP ,
  M 0 : dev_cmd 121 , nb_ctrl 1 ,
290 0 : RESOLVE ( 0 )
  M 0 : mem 0 , nac 0 , snac 0 , dest_frame 0 , r_dest 0
  M 0 : , r_w 1 , nb_ctrl 1 , l_in 1 , o_in 1 , a_in 1 , a_w 1
290 0 : ;
292 0 : OFF_ALU_OUT = EBOX_DATA OP COMMON ( OR@ , 0 ) ,
```

```
   M 0 :     alu_in 0 , ipd_ctrl 15   alu_op 5   src_frame 2 ,
   M 0 :   r_source 0 , com_ext 8b8   ,
 293 0 : LOAD_OFF ( CURRENT ( 3 ) ) WITH OFFSET ,
   M 0 :   dest_frame 0 , r_dest 3 , r_w 1  o_in   3  ,
 294 0 : LONG_GOTO F32_STORE
   M 0 :   nac 6 , lit14  F32_STORE
 294 0 : ;
 296 0 : ENTRY F32_ACC_B_ACC :
 297 0 : PARSE_K_DISPATC ,
   M 0 :   dev_cmd 125  ,
 298 0 : EVAL ( 0 )
   M 0 :   mem 1 , md 0 , nac 0 , snac 5 , dest_frame 0 , r_dest
   M 0 :   0 , r_w 1  ,  nb_ctrl 1  , l_in 1 , o_in 1 , a_in 1 , a_w 1
 298 0 : ;
 300 0 : OFF_ALU_OUT = BIASED_LENGTH CON_LENGTH ( 0 ) OR CURRENT ( 3 ) ,
   M 0 :     alu_in 1   len_ctrl 0    alu_op 5  src_frame 0 , r_source 3  ,
 301 0 : SOURCE ( OFF_ALU_DATA ) TO IPD_BUS ( EBOX_DATA_Q )
   M 0 :   ipd_ctrl 7     rand 12
 301 0 : ;
 303 0 : ACK_EBOX_DATA ,
   M 0 :   dev_cmd 111  ,
 304 0 : OFF_ALU_OUT = EBOX_DATA OR COMMON ( 8b8 , 0 ) ,
   M 0 :     alu_in 0 , ipd_ctrl 15   alu_op 5  src_frame 2 ,
   M 0 :   r_source 0 , com_ext 8b8  ,
 305 0 : LOAD_OFF ( CURRENT ( 3 ) ) WITH OFFSET ,
   M 0 :   dest_frame 0 , r_dest 3 , r_w 1  o_in   3  ,
 306 0 : IF EBOX_EXCEPTION THEN GOTO SIGNAL_EXCEPT
   M 0 :   test 19 , polarity 1   nac 4 , lit8  SIGNAL_EXCEPT
 306 0 : ;
 308 0 : NEXT_S_OP
   M 0 :   dev_cmd 120 , nb_ctrl 1  , nb_ctrl 1 , nac 6 , lit14
   M 0 :   EMULATE_2400 * PARSE_16_BIT_OP
 308 0 : ;
 310 0 : ENTRY F32_ACC_B_0 :
 311 0 : PARSE_K_DISPATC ,
   M 0 :   dev_cmd 125  ,
 312 0 : EVAL ( 0 )
   M 0 :   mem 1 , md 0 , nac 0 , snac 5 , dest_frame 0 , r_dest
   M 0 :   0 , r_w 1  ,  nb_ctrl 1  , l_in 1 , o_in 1 , a_in 1 , a_w 1
 312 0 : ;
 314 0 : OFF_ALU_OUT = BIASED_LENGTH CON_LENGTH ( 0 ) OR CURRENT ( 3 ) ,
   M 0 :     alu_in 1   len_ctrl 0    alu_op 5  src_frame 0 , r_source 3  ,
 315 0 : SOURCE ( OFF_ALU_DATA ) TO IPD_BUS ( EBOX_DATA_Q )
   M 0 :   ipd_ctrl 7     rand 12
 315 0 : ;
 317 0 : OFF_ALU_OUT = EBOX_DATA OR COMMON ( 8b8 , 0 ) ,
   M 0 :     alu_in 0 , ipd_ctrl 15   alu_op 5  src_frame 2 ,
   M 0 :   r_source 0 , com_ext 8b8  ,
 318 0 : LOAD_OFF ( CURRENT ( 3 ) ) WITH OFFSET
   M 0 :   dest_frame 0 , r_dest 3 , r_w 1  o_in   3
 318 0 : ;
 320 0 : WRITE FROM STOREBACK_DATA USING DESCRIPTOR CURRENT
 320 0 : ( 0 ) BIAS_LENGTH ,
   M 0 :   mem 4   ipd_ctrl 1   db_ctrl 0   src_frame 0 , r_source
   M 0 :   0  len_ctrl 12  ,
 321 0 : LOAD_ADM ( CURRENT ( 0 ) ) WITH 0 ,
   M 0 :   dest_frame 0 , r_dest 0 , r_w 1   a_in  0 ,
 322 0 : NEXT_S_OP
   M 0 :   dev_cmd 120 , nb_ctrl 1  , nb_ctrl 1 , nac 6 , lit14
   M 0 :   EMULATE_2400 * PARSE_16_BIT_OP
 322 0 : ;
 324 0 : ENTRY F32_A_B :
 325 0 : PARSE_K_DISPATC ,
   M 0 :   dev_cmd 125  ,
 326 0 : EVAL ( 0 )
   M 0 :   mem 1 , md 0 , nac 0 , snac 5 , dest_frame 0 , r_dest
   M 0 :   0 , r_w 1  ,  nb_ctrl 1  , l_in 1 , o_in 1 , a_in 1 , a_w 1
 326 0 : ;
 328 0 : PARSE_K_LOAD_EP ,
   M 0 :   dev_cmd 121 , nb_ctrl 1  ,
 329 0 : RESOLVE ( 0 )
   M 0 :   mem 0 , nac 0 , snac 4 , dest_frame 0 , r_dest 0
   M 0 :   , r_w 1  ,  nb_ctrl 1  , l_in 1 , o_in 1 , a_in 1 , a_w 1
```

```
329 0 : ;
331 0 : OFF_ALU_OUT = EBOX_DATA OR COMMON ( aBa , 0 ) ,
  M 0 :    alu_in 0 , jpd_ctrl 15  alu_op 5   src_frame 2 ,
  M 0 : r_source 0 , com_ext aaa  ,
332 0 : LOAD_OFF ( CURRENT ( 3 ) ) WITH OFFSET
  M 0 : dest_frame 0 , r_dest 3 , r_w 1   o_in    3
332 0 : ;
334 0 : WRITE FROM STOREBACK_DATA USING DESCRIPTOR CURRENT
334 0 : ( 0 ) BIAS_LENGTH ,
  M 0 : mem 4    jpd_ctrl 1    nb_ctrl 0   src_frame 0 , r_source
  M 0 : 0  len_ctrl 12    ,
335 0 : LOAD_NUM ( CURRENT ( 0 ) ) WITH 0 ,
  M 0 : dest_frame 0 , r_dest 0 , r_w 1   a_in    0 ,
335 0 : NEXT_S_OP
  M 0 : dev_cmd 120 , nb_ctrl 1  , nb_ctrl 1 , nac 6 , lit14
  M 0 :  EMULATE_2400 & PARSE_16_BIT_OP
336 0 : ;
338 0 : ENTRY F32_A_ACC :
339 0 : PARSE_K_DISPATC ,
  M 0 : dev_cmd 125   ,
340 0 : EVAL ( 0 )
  M 0 : mem 1 , ad 0 , nac 0 , snac 5 , dest_frame 0 , r_dest
  M 0 : 0 , r_w 1  , nb_ctrl 1  , l_in 1 , o_in 1 , a_in 1 , a_w 1
340 0 : ;
342 0 : ACK_EBOX_DATA ,
  M 0 : dev_cmd 111  ,
343 0 : OFF_ALU_OUT = EBOX_DATA OR COMMON ( aBa , 0 ) ,
  M 0 :    alu_in 0 , jpd_ctrl 15  alu_op 5   src_frame 2 ,
  M 0 : r_source 0 , com_ext aaa  ,
344 0 : LOAD_OFF ( CURRENT ( 3 ) ) WITH OFFSET ,
  M 0 : dest_frame 0 , r_dest 3 , r_w 1   o_in    3  ,
345 0 : IF EBOX_EXCEPTION THEN GOTO SIGNAL_EXCEPT
  M 0 : test 15 , polarity 1   nac 4 , lit8  SIGNAL_EXCEPT
345 0 : ;
347 0 : NEXT_S_OP
  M 0 : dev_cmd 120 , nb_ctrl 1  , nb_ctrl 1 , nac 6 , lit14
  M 0 :  EMULATE_2400 & PARSE_16_BIT_OP
347 0 : ;
349 0 : NOP
  M 0 : timing 0
349 0 : ;
351 0 : ENTRY F32_ACC_B :
352 0 : DISPATCH FBOX ,
  M 0 : cmd_sp 8   dev_sp 6  ,
353 0 : OFF_ALU_OUT = BIASED_LENGTH CON_LENGTH ( 0 ) OR CURRENT ( 3 ) ,
  M 0 :    alu_in 1  len_ctrl 0    alu_op 5  src_frame 0 , r_source 3  ,
354 0 : SOURCE ( OFF_ALU_DATA ) TO JPD_BUS ( EBOX_DATA_0 )
  M 0 : jpd_ctrl 7    rand 12
354 0 : ;
356 0 : PARSE_K_LOAD_FP ,
  M 0 : dev_cmd 121 , nb_ctrl 1  ,
357 0 : RESOLVE ( 0 )
  M 0 : mem 0 , nac 0 , snac 4 , dest_frame 0 , r_dest 0
  M 0 : , r_w 1  , nb_ctrl 1  , l_in 1 , o_in 1 , a_in 1 , a_w 1
357 0 : ;
359 0 : OFF_ALU_OUT = EBOX_DATA OR COMMON ( aBa , 0 ) ,
  M 0 :    alu_in 0 , jpd_ctrl 15  alu_op 5   src_frame 2 ,
  M 0 : r_source 0 , com_ext aaa  ,
360 0 : LOAD_OFF ( CURRENT ( 3 ) ) WITH OFFSET
  M 0 : dest_frame 0 , r_dest 3 , r_w 1   o_in    3
360 0 : ;
362 0 : WRITE FROM STOREBACK_DATA USING DESCRIPTOR CURRENT
362 0 : ( 0 ) BIAS_LENGTH ,
  M 0 : mem 4    jpd_ctrl 1    do_ctrl 0   src_frame 0 , r_source
  M 0 : 0  len_ctrl 12    ,
363 0 : LOAD_NUM ( CURRENT ( 0 ) ) WITH 0 ,
  M 0 : dest_frame 0 , r_dest 0 , r_w 1   a_in    0 ,
364 0 : NEXT_S_OP
  M 0 : dev_cmd 120 , nb_ctrl 1  , nb_ctrl 1 , nac 6 , lit14
  M 0 :  EMULATE_2400 & PARSE_16_BIT_OP
364 0 : ;
366 0 : ENTRY F32_ACC_ACC :
367 0 : DISPATCH FBOX ,
```

```
    M 0 : cmd_sr 8   dev_sp 6 ,
366 0 : OFF_ALU_OUT = BIASED_LENGTH COM_LENGTH ( 0 ) OR CURRENT ( 3 ) ,
    M 0 :    alu_in 1   len_ctrl 0    alu_op 5   src_frame 0 , r_source 3 ,
369 0 : SOURCE ( OFF_ALU_DATA ) IN JPD_BUS ( FBOX_DATA_0 )
    M 0 : jpd_ctrl 7    rand 12
369 0 : ;
371 0 : ACK_EBOX_DATA ,
    M 0 : dev_cmd 111 ,
372 0 : OFF_ALU_OUT = EBOX_DATA OR COMMON ( aBa , 0 ) ,
    M 0 :    alu_in 0 , jpd_ctrl 15   alu_op 5   src_frame 2 ,
    M 0 : r_source 0 , com_ext aBa ,
373 0 : LOAD_OFF ( CURRENT ( 3 ) ) WITH OFFSET ,
    M 0 : dest_frame 0 , r_dest 3 , r_w 1   o_in   3 ,
374 0 : IF FBOX_EXCEPTION THEN GOTO SIGNAL_EXCEPT
    M 0 : test  19 , polarity 1   nac 4 , lit8 SIGNAL_EXCEPT
374 0 : ;
376 0 : NEXT_S_OP
    M 0 : dev_cmd 120 , nb_ctrl 1 , nb_ctrl 1 , nac 6 , lit14
    M 0 :   EMULATE_2400 * PARSE_16_BIT_OP
376 0 : ;
378 0 : NOP
    M 0 : timing 0
378 0 : ;
380 0 : ENTRY F32_A_A :
381 0 : PARSE_K_DISPATC ,
    M 0 : dev_cmd 125 ,
382 0 : EVAL ( 0 )
    M 0 : mem 1 , md 0 , nac 0 , snac 5 , dest_frame 0 , r_dest
    M 0 : 0 , r_w 1 , nb_ctrl 1 , l_in 1 , o_in 1 , a_in 1 , a_w 1
382 0 : ;
384 0 : OFF_ALU_OUT = EBOX_DATA OR COMMON ( aBa , 0 ) ,
    M 0 :    alu_in 0 , jpd_ctrl 15   alu_op 5   src_frame 2 ,
    M 0 : r_source 0 , com_ext aBa ,
385 0 : LOAD_OFF ( CURRENT ( 3 ) ) WITH OFFSET
    M 0 : dest_frame 0 , r_dest 3 , r_w 1   o_in   3
385 0 : ;
387 0 : WRITE FROM STOREBACK_DATA USING DESCRIPTOR CURRENT
387 0 : ( 0 ) BIAS_LENGTH
    M 0 : mem 4   jpd_ctrl 1   db_ctrl 0   src_frame 0 , r_source
    M 0 : 0   len_ctrl 12
388 0 : LOAD_AON ( CURRENT ( 0 ) ) WITH 0 ,
    M 0 : dest_frame 0 , r_dest 0 , r_w 1   a_in   0 ,
389 0 : NEXT_S_OP
    M 0 : dev_cmd 120 , nb_ctrl 1 , nb_ctrl 1 , nac 6 , lit14
    M 0 :   EMULATE_2400 * PARSE_16_BIT_OP
389 0 : ;
391 0 : SIGNAL_EXCEPT :
392 0 : LONG_CALL EXCEPTION_HANDL * GENERAL_ENTRY
    M 0 : nac 7 , lit14 EXCEPTION_HANDL * GENERAL_ENTRY
392 0 : ;
393 0 :
393 0 :

COMPILATION COMPLETE, 44 STATEMENTS PROCESSED

DATA GENERAL F M P - FETCH MICROCODE GENERATOR, REV. 6.0 (3/16/79)
   6/5/81 AT 23:9:41

INPUT FILE: CALL_ENTRIES
OBJECT FILE: CALL_ENTRIES.OB

LINE NO:SOURCE 1 0 :$NO LIST
  167 0 :$INCLUDE FBOX_INCLUDES:F.MAC
  168 0 :$NO LIST
  236 0 :$LIST
  237 0 :
  238 0 :@00@:
  239 0 :ENTRY RTN:
  240 0 :
  241 0 :    /*Recover the return info from the save area*/
```

```
242 0 :
243 0 :           /*get SAVED_PC*/
244 0 :
245 0 :           READ TO ACCUMULATOR USING OFF_ALU WITH FP
246 0 :               CON_LENGTH(32),
247 0 :           OFF_ALU_OUT = LIT16(64) REV_MINUS FP,
248 0 :           LOAD_OFF (CURRENT(7)) WITH OFFSET,
249 0 :           LOAD_AON (CURRENT(7)) WITH AON(FP),
250 0 :           FLUSH_NAME_CACHE;
251 0 :
252 0 :           /*get SP into EBOX*/
253 0 :
254 0 :           DISPATCH EBOX,
255 0 :           OFF_ALU_OUT = ONE LEFT_SHIFTED(5) REV_MINUS CURRENT(7),
256 0 :           READ TO EBOX_DATA_O USING OFF_ALU WITH CURRENT(7),
257 0 :               CON_LENGTH(32),
258 0 :           LOAD_AON (CURRENT(7)) WITH 0,
259 0 :           LONG_GOTO LEVEL_S_RETURN*LEVEL_S_RETURN;
260 0 :
261 0 :           NOP;
262 0 :
263 0 :           NOP;
264 0 :
265 0 :304w:
266 0 :ENTRY NCALL:
267 0 :
268 0 :           /*Get the IPC relative offset from the instruction stream*/
269 0 :
270 0 :           PARSE_K_LOAD_EPC,
271 0 :           OFF_ALU_OUT = PARSE(SIGN_EXTEND) LEFT_SHIFTED(4) OR PC.AON,
272 0 :           LOAD_OFF (CURRENT(1)) WITH OFFSET,
273 0 :           LOAD_AON (CURRENT(1)) WITH AON (PC.AON),
274 0 :           DISPATCH_ALGORITHM; /*NEIGHBORHOOD_CALL */
275 0 :
276 0 :ENTRY SET_UP_NCALL:
277 0 :
278 0 :           /*Subtract IPC so we can use same path as NCALL.*/
279 0 :           /*Both NCall and a converted Gcall come through here.*/
280 0 :
281 0 :           OFF_ALU_OUT = IPC REV_MINUS CURRENT(0),
282 0 :           LOAD_OFF (CURRENT(1)) WITH OFFSET,
283 0 :           LOAD_AON (CURRENT(1)) WITH AON (CURRENT(0)),
284 0 :           LONG_GOTO NEIGHBORHOOD_CALL*NEIGHBORHOOD_CALL;
285 0 :
286 0 :           NOP;
287 0 :
288 0 :           NOP;
289 0 :
290 0 :308w:
291 0 :ENTRY GCALL:
292 0 :
293 0 :           /*Resolve the TARGET NAME from the instruction stream*/
294 0 :
295 0 :           PARSE_K_LOAD_EPC,
296 0 :           RESOLVE(1);
297 0 :
298 0 :           /*Check for hidden NCALL (i.e. intra-ped through pointer.*/
299 0 :
300 0 :           LOAD (ACCUMULATOR) WITH AON (CURRENT(1));
301 0 :
302 0 :           INDIVISIBLE,
303 0 :           LOAD_OFF (CURRENT(0)) WITH AON (PBP);
304 0 :
305 0 :           INDIVISIBLE,
306 0 :           OFF_ALU_OUT = ACC XOR CURRENT(0),
307 0 :           LOAD( ACCUMULATOR ) WITH OFFSET,
308 0 :           DISPATCH_ALGORITHM; /*to level_s_call*/
309 0 :
310 0 :
```

```
INPUT FILE: ?11.I_FILE1A
OBJECT FILE: CALL_ENTRIES.OB

LINE N :SOURCE 238 0 : w00R :
 239 0 : ENTRY RTN :
 245 0 : READ TO ACCUMULATOR USING OFF_ALU WITH COMMON ( 2 , 1 )
   M 0 : mem 1    md 1    db_ctrl 1    src_frame 2 , r_source 1 , com_ext 2
 246 0 : CON_LENGTH ( 32 ) ,
   M 0 : len_ctrl 6    ,
 247 0 : OFF_ALU_OUT = LIT16 ( 64 ) REV_MINUS COMMON ( 2 , 1 ) ,
   M 0 :    alu_in 3 , 1 0 , lit16 64    alu_op 1    src_frame
   M 0 : 2 , r_source 1 , com_ext 2 ,
 248 0 : LOAD_OFF ( CURRENT ( 7 ) ) WITH OFFSET ,
   M 0 : dest_frame 0 , r_dest 7 , r_w 1    o_in    3 ,
 249 0 : LOAD_ADR ( CURRENT ( 7 ) ) WITH ADR ( COMMON ( 2 , 1 ) ) ,
   M 0 : dest_frame 0 , r_dest 7 , r_w 1    a_in    2 , src_frame
   M 0 : 2 , r_source 1 , com_ext 2    ,
 250 0 : FLUSH_NAME_CACH
   M 0 : dev_cmd 60
 250 0 : ;
 254 0 : DISPATCH FBOX ,
   M 0 : cmd_sp 8    dev_sp 6 ,
 255 0 : OFF_ALU_OUT = ONE LEFT_SHIFTED ( 5 ) REV_MINUS CURRENT ( 7 ) ,
   M 0 :    alu_in 2 , rand 3 sf 5    alu_op 1    src_frame 0 , r_source 7 ,
 256 0 : READ TO FBOX_DATA_0 USING OFF_ALU WITH CURRENT ( 7 ) ,
   M 0 : mem 1    md 0    db_ctrl 1    src_frame 0 , r_source 7 ,
 257 0 : CON_LENGTH ( 32 ) ,
   M 0 : len_ctrl 6    ,
 258 0 : LOAD_ADR ( CURRENT ( 7 ) ) WITH 0 ,
   M 0 : dest_frame 0 , r_dest 7 , r_w 1    a_in    0 ,
 259 0 : LONG_GOTO LEVEL_S_RETURN * LEVEL_S_RETURN
   M 0 : nac 6 , lit14    LEVEL_S_RETURN * LEVEL_S_RETURN
 259 0 : ;
 261 0 : NOP
   M 0 : timing 0
 261 0 : ;
 263 0 : NOP
   M 0 : timing 0
 263 0 : ;
 265 0 : w04A :
 266 0 : ENTRY NCALL :
 270 0 : PARSE_R_LOAD_EP ,
   M 0 : dev_cmd 121 , nb_ctrl 1 ,
 271 0 : OFF_ALU_OUT = PARSER ( SIGN_EXTEND ) LEFT_SHIFTED
 271 0 : ( 4 ) OR COMMON ( 2 , 6 ) ,
   M 0 :    alu_in 2 , nb_ctrl 1 , rand 1    sf 4    alu_op 5
   M 0 :    src_frame 2 , r_source 6 , com_ext 2 ,
 272 0 : LOAD_OFF ( CURRENT ( 1 ) ) WITH OFFSET ,
   M 0 : dest_frame 0 , r_dest 1 , r_w 1    o_in    3 ,
 273 0 : LOAD_ADR ( CURRENT ( 1 ) ) WITH ADR ( COMMON ( 2 , 6 ) ) ,
   M 0 : dest_frame 0 , r_dest 1 , r_w 1    a_in    2 , src_frame
   M 0 : 2 , r_source 6 , com_ext 2    ,
 274 0 : DISPATCH_ALGOR ,
   M 0 : nac 0 , snac 1
 274 0 : ;
 276 0 : ENTRY SET_UP_NCALL :
 281 0 : OFF_ALU_OUT = IPC REV_MINUS CURRENT ( 0 ) ,
   M 0 :    jod_ctrl 10    alu_op 1    src_frame 0 , r_source 0 ,
 282 0 : LOAD_OFF ( CURRENT ( 1 ) ) WITH OFFSET ,
   M 0 : dest_frame 0 , r_dest 1 , r_w 1    o_in    3 ,
 283 0 : LOAD_ADR ( CURRENT ( 1 ) ) WITH ADR ( CURRENT ( 0 ) ) ,
   M 0 : dest_frame 0 , r_dest 1 , r_w 1    a_in    2 , src_frame
   M 0 : 0 , r_source 0    ,
 284 0 : LONG_GOTO NEIGHBORHOOD_CA * NEIGHBORHOOD_CA
   M 0 : nac 6 , lit14    NEIGHBORHOOD_CA * NEIGHBORHOOD_CA
 284 0 : ;
 286 0 : NOP
   M 0 : timing 0
 286 0 : ;
 288 0 : NOP
   M 0 : timing 0
```

```
288 0 :  ;
289 0 :  NOOP ;
291 0 :  EMPTY_UCALL ;
295 0 :  PARSE_K_LOAD_FP ,
  M 0 :  dev_cmd 121 , nh_ctrl 1 ,
296 0 :  RESOLVE ( 1 )
  M 0 :  mem 0 , nac 0 , snac 6 , dest_frame 0 , r_dest 1
  M 0 :  , r_w 1 , nh_ctrl 1 , l_in 1 , o_in 1 , a_in 1 , a_w 1
299 0 :  ;
300 0 :  LOAD ( ACCUMULATOR ) WITH ADR ( CURRENT ( 1 ) )
  M 0 :  a_w 1 , o_in    2 , src_frame 0 , r_source 1
300 0 :  ;
302 0 :  INDIVISIBLE ,
  M 0 :  rand 15 ,
303 0 :  LOAD_OFF ( CURRENT ( 0 ) ) WITH ADR ( COMMON ( 2 , 0 ) )
  M 0 :  dest_frame 0 , r_dest 0 , r_w 1 , o_in    2 , src_frame
  M 0 :  2 , r_source 0 , com_ext 2
303 0 :  ;
305 0 :  INDIVISIBLE ,
  M 0 :  rand 15 ,
306 0 :  OFF_ALU_UNIT = ACC XOR CURRENT ( 0 ) ,
  M 0 :    alu_in 2  alu_op 4  src_frame 0 , r_source 0 ,
307 0 :  LOAD ( ACCUMULATOR ) WITH OFFSET ,
  M 0 :  a_w 1 , o_in    5 ,
308 0 :  DISPATCH_SLOCAL
  M 0 :  nac 0 , snac 1
308 0 :  ;
310 0 :
310 0 :

COMPILATION COMPLETE, 12 STATEMENTS PROCESSED
DATA GENERAL F M P - FETCH MICROCODE GENERATOR, REV. 6.0 (3/16/79)
   6/11/81 AT 10:45:1

INPUT FILE:  NEIGHBORHOOD_CALL
OBJECT FILE: NEIGHBORHOOD_CALL.OB

LINE NC:SOURCE 1 0 :
   2 0 :/*********************************************************/
   3 0 :/*                                                       */
   4 0 :/*     NEIGHBORHOOD CALL                                 */
   5 0 :/*                                                       */
   6 0 :/*     FUNCTION: Dispatched to by the neighborhood call S-op */
   7 0 :/*              Pushes SP, FP, PC, and flags into the 128 bits */
   8 0 :/*              beginning at FP-128. Arguments are pushed onto */
   9 0 :/*              the user's stack. The code assumes that the   */
  10 0 :/*              call is well formed and that the PED for the  */
  11 0 :/*              call is the same as the caller's PED. PC      */
  12 0 :/*              is updated to point into the called procedure. */
  13 0 :/*              Assumes that the first 32 bits in the called  */
  14 0 :/*              procedure are the initial stack top offset.   */
  15 0 :/*                                                       */
  16 0 :/*     CALLS: none                                       */
  17 0 :/*                                                       */
  18 0 :/*     CALLED BY: Dispatched to by the neighborhood call S-op. */
  19 0 :/*                                                       */
  20 0 :/*     INPUTS:  The instruction stream:                  */
  21 0 :/*              bCALL num_args  pc_offset <arg_names>    */
  22 0 :/*              op    ext_op        lit      names      */
  23 0 :/*                                                       */
  24 0 :/*     OUTPUTS: New procedure begins executing.          */
  25 0 :/*                                                       */
  26 0 :/*     AUTHOR:  TC                                       */
  27 0 :/*                                                       */
  28 0 :/*     DATE:    15/Feb/80                                */
  29 0 :/*              mod GU                                   */
  30 0 :/*                                                       */
  31 0 :/*********************************************************/
  32 0 :$NO DOLLAR
  33 0 :      MACRO   SP_SAVE     MEANS   CURRENT(3)    ENDMAC;
```

```
314 0 :         MACRO   SP_TMP          MEANS   CURRENT(6)      ENDMAC;
315 0 :         MACRO   LOAD_DATA_TRAP  MEANS
316 0 :                 WRITE_PHY FROM OFF_ALU_DATA CON_LENGTH (0)
317 0 :                                                         ENDMAC;
318 0 :         MACRO   OFFSET_DATA     MEANS                   ENDMAC;
319 0 :
320 0 :/* NCALL does this. NCALL resolves target and subtracts inc
321 0C:*
322 0C:*        PARSE_K_LOAD_EPC,
323 0C:*        OFF_ALU_OUT = PARSER(SIGN_EXTEND) LEFT_SHIFTED(5) OR PC_AON,
324 0C:*        LOAD_OFF (TARGET) WITH OFFSET,
325 0C:*        LOAD_AON (TARGET) WITH AON (PC_AON),
326 0C:*        LONG_GOTO NEIGHBORHOOD_CALL+NEIGHBORHOOD_CALL;
327 0C:*/
328 0 :
329 0 :
330 0 :ENTRY NEIGHBORHOOD_CALL:
331 0 :
332 0 :         LOAD(ACCUMULATOR) WITH JPD(LEN(EXTENDED_OPCODE));
333 0 :
334 0 :         /* Mask out sign extension. */
335 0 :         OFF_ALU_OUT = ACC AND CON_FF,
336 0 :         LOAD(ACCUMULATOR) WITH OFFSET;
337 0 :
338 0 :         OFF_ALU_OUT = ACC LEFT_SHIFTED(5) OR CON_0,
339 0 :         LOAD_AON (CON_FFFFFF80) WITH OFFSET,
340 0 :         LOAD_LEN (CON_FFFFFF80) WITH OFF,
341 0 :         SOURCE(OFF_ALU_DATA) TO JPD_BUS(DATA_TRAP);
342 0 :
343 0 :         INDIVISIBLE,
344 0 :         DISPATCH EBUX,
345 0 :         OFF_ALU_OUT = LIT16(255) PLUS SP,
346 0 :         LOAD (ACCUMULATOR) WITH OFFSET,
347 0 :         LOAD_LEN (SP_SAVE) WITH OFF(SP),
348 0 :         LOAD_AON (SP_SAVE) WITH AON(SP);
349 0 :
350 0 :         INDIVISIBLE,
351 0 :         OFF_ALU_OUT = ACC AND CON_FFFFFF80,
352 0 :         LOAD_OFF (SP_TMP) WITH OFFSET,
353 0 :         LOAD_AON (SP_TMP) WITH 0,
354 0 :         LOAD_LEN (SP_TMP) WITH LEN (CON_FFFFFF80) CON_LENGTH (8).
355 0 :         IF AON_EQ_0 THEN GOTO NO_ARGS;
356 0 :
357 0 :         OFF_ALU_OUT = DATA_TRAP LEFT_SHIFTED(2) PLUS SP_TMP,
358 0 :         LOAD_OFF (SP) WITH OFFSET,
359 0 :         DISABLE_AON_WRITE,
360 0 :         LONG_GOTO ARG_LOOP;
361 0 :
362 0 :NOT_INTRA:
363 0 :         COPY (CURRENT(7), CURRENT(0)),
364 0 :         LONG_CALL DESC_TO_PTR*DESC_TO_UID_PTR;
365 0 :
366 0 :         OFF_ALU_OUT = ONE LEFT_SHIFTED(7) PLUS SP_TMP,
367 0 :         LOAD_OFF (SP_TMP) WITH OFFSET,
368 0 :         LOAD_AON (SP_TMP) WITH AON(SP_TMP),
369 0 :         LOAD_LEN (SP_TMP) WITH LEN(SP_TMP), CON_LENGTH(32,DEC).
370 0 :         IF LEN_LE_32 THEN GOTO ARGS_PUSHED;
371 0 :
372 0 :ARG_LOOP:
373 0 :         PARSE_K_LOAD_EPC,
374 0 :         RESOLVE (0);
375 0 :
376 0 :ARG_LOOP_1:
377 0 :         OFF_ALU_OUT = ZERO OR CURRENT(0),
378 0 :         SOURCE (OFF_ALU_DATA) TO JPD_BUS(DATA_TRAP),
379 0 :         LOAD (ACCUMULATOR) WITH AON(CURRENT(0)),
380 0 :         CASE ON ALC_BYTE(0) MASK J909 ROTATE(3);
381 0 :
382 0 :/* 0 */ INDIVISIBLE,
383 0 :         OFF_ALU_OUT = ACC ZERO_HI XOR SP_AON,
384 0 :         LOAD_AON (SP_TMP) WITH AON (SP_AON),
385 0 :         IF OFF_NE_0 THEN GOTO NOT_INTRA;
386 0 :
387 0 :         WRITE FROM DATA_TRAP USING DESCRIPTOR SP_TMP CON_LENGTH(32),
```

```
388 0 :          OFF_ALU_OUT = ONE LEFT_SHIFTED(7) PLUS SP_TMP,
389 0 :          LOAD_OFF (SP_TMP) WITH OFFSET,
390 0 :          LOAD_AON (SP_TMP) WITH AON(SP_TMP),
391 0 :          LOAD_LEN (SP_TMP) WITH LEN(SP_TMP), CON_LENGTH(32,DEC),
392 0 :          IF LEN_GT_32 THEN GOTO ARG_LOOP;
393 0 :
394 0 :ARGS_PUSHED:
395 0 :          FLUSH_NAME_CACHE,
396 0 :          OFF_ALU_OUT = LIT16(0) OR FP,
397 0 :          LOAD_AON(CURRENT(7)) WITH 0,
398 0 :          SOURCE (OFF_ALU_DATA) TO JPD_BUS(EBOX_DATA_0);
399 0 :
400 0 :          OFF_ALU_OUT = IPC PLUS TARGET,
401 0 :          LOAD_OFF (TARGET) WITH OFFSET,
402 0 :          LOAD_AON (TARGET) WITH AON (TARGET),
403 0 :          STAGE_PC,
404 0 :          LONG_GOTO NCALL_END;
405 0 :
406 0 :/* 1 */ OFF_ALU_OUT = DATA_TRAP XOR CON_80000000,
407 0 :          LOAD_OFF (CURRENT(0)) WITH OFFSET,
408 0 :          LOAD (ACCUMULATOR) WITH OFFSET,
409 0 :          DISABLE_AON_WRITE,
410 0 :          LONG_GOTO ARG_LOOP_1;
411 0 :
412 0 :NCALL_END:
413 0 :          READ_PREFETCH USING DESCRIPTOR TARGET,
414 0 :                CON_LENGTH(32),
415 0 :          OFF_ALU_OUT = ZERO OR TARGET,
416 0 :          LOAD_AON(TARGET) WITH 0,
417 0 :          SOURCE (OFF_ALU_DATA) TO JPD_BUS(CURR_PC);
418 0 :
419 0 :          WRITE FROM IPC USING OFF_ALU WITH SP CON_LENGTH(32),
420 0 :          OFF_ALU_OUT = LIT16(64) PLUS SP,
421 0 :          LOAD_OFF (SP_SAVE) WITH OFFSET,
422 0 :          LOAD_AON (SP_SAVE) WITH AON(SP);
423 0 :
424 0 :          WRITE FROM STOREBACK_DATA USING DESCRIPTOR SP CON_LENGTH(32),
425 0 :          OFF_ALU_OUT = LIT16(128) PLUS SP,
426 0 :          LOAD_OFF (FP) WITH OFFSET,
427 0 :          DISABLE_AON_WRITE;
428 0 :
429 0 :          PARSE_K_LOAD_EPC,
430 0 :          OFF_ALU_OUT = PARSER(SIGN_EXTEND) LEFT_SHIFTED(7) PLUS FP,
431 0 :          LOAD_OFF (SP) WITH OFFSET,
432 0 :          LOAD_AON (SP) WITH AON(FP);
433 0 :
434 0 :          DISABLE_AON_WRITE,
435 0 :          OFF_ALU_OUT = LIT16(82FF8) OR ZERO_VAL,
436 0 :          SOURCE (OFF_ALU_LS_16) TO NAME_BUS(NAME_TRAP),
437 0 :          LOAD_LEN (CURRENT(0)) WITH LEN(READ_TRACING);
438 0 :
439 0 :          LOAD (CURRENT(0)) WITH DESCRIPTOR CURRENT(0),
440 0 :          FIL(RIGHT,SIGN), CON_LENGTH(32),
441 0 :          IF LEN_GT_32 THEN GOTO DONT_ENCACHE;
442 0 :
443 0 :          WRITE FROM LENGTH(SP_SAVE) USING OFF_ALU WITH SP_SAVE,
444 0 :                CON_LENGTH(32),
445 0 :          OFF_ALU_OUT = ONE LEFT_SHIFTED(5) REV_MINUS SP_SAVE,
446 0 :          LOAD_AON(SP_SAVE) WITH 0;
447 0 :
448 0 :          SOURCE (DESCRIPTOR CURRENT(0))
449 0 :               TO DESCRIPTOR_BUS(NAME_CACHE_0(NAME_TRAP)),
450 0 :          LOAD_AON(SP_TMP) WITH 0;
451 0 :
452 0 :          NEXT_S_OP;
453 0 :
454 0 :NO_ARGS:
455 0 :
456 0 :          FLUSH_NAME_CACHE,
457 0 :          DISABLE_AON_WRITE,
458 0 :          OFF_ALU_OUT = LIT16(0) OR SP_TMP,
459 0 :          LOAD_OFF (SP) WITH OFFSET;
460 0 :
461 0 :          OFF_ALU_OUT = LIT16(0) OR FP,
462 0 :          SOURCE (OFF_ALU_DATA) TO JPD_BUS(EBOX_DATA_0);
```

```
463 0 :
464 0 :              OFF_ALU_OUT = IPC PLUS TARGET,
465 0 :              LOAD_OFF (TARGET) WITH OFFSET,
466 0 :              LOAD_AON (TARGET) WITH AON (TARGET),
467 0 :              STAGE_PC;
468 0 :
469 0 :              READ_PREFETCH USING DESCRIPTOR TARGET,
470 0 :                 CON_LENGTH(32),
471 0 :              OFF_ALU_OUT = ZERO OR TARGET,
472 0 :              LOAD_AON(TARGET) WITH 0,
473 0 :              SOURCE (OFF_ALU_DATA) TO JPD_BUS (CURR_PC);
474 0 :
475 0 :              WRITE FROM IPC USING OFF_ALU WITH SP CON_LENGTH(32),
476 0 :              OFF_ALU_OUT = LIT16(64) PLUS SP,
477 0 :              LOAD_OFF (SP_SAVE) WITH OFFSET,
478 0 :              LOAD_AON (SP_SAVE) WITH AON(SP);
479 0 :
480 0 :              WRITE FROM STOREPACK_DATA USING DESCRIPTOR SP CON_LENGTH(32),
481 0 :              OFF_ALU_OUT = LIT16(128) PLUS SP,
482 0 :              LOAD_OFF (FP) WITH OFFSET,
483 0 :              DISABLE_AON_WRITE;
484 0 :
485 0 :           .  PARSE_K_LOAD_EPC,
486 0 :              OFF_ALU_OUT = PARSER(SIGN_EXTEND) LEFT_SHIFTED(7) PLUS FP,
487 0 :              LOAD_OFF (SP) WITH OFFSET,
488 0 :              LOAD_AON (SP) WITH AON(FP);
489 0 :
490 0 :DONT_ENCACHE:
491 0 :              WRITE FROM LENGTH(SP_SAVE) USING OFF_ALU WITH SP_SAVE,
492 0 :              OFF_ALU_OUT = ONE LEFT_SHIFTED(5) REV_MINUS SP_SAVE,
493 0 :              LOAD_AON(SP_SAVE) WITH 0,
494 0 :              NEXT_S_OP,                                    CON_LENGTH(32);

NPUT FILE: ?18.1_FILE14
BJECT FILE: NEIGHBORHOOD_CALL.OB

INE N :SOURCE 330 0 : ENTRY NEIGHBORHOOD_CA :
332 0 : LOAD ( ACCUMULATOR ) WITH JPD ( LEN ( COMMON ( 3 , 1 ) ) )
  M 0 : a_w 1 , o_in    3 , src_frame 2 , r_source 1 , com_ext
  M 0 : 3 , jpd_ctrl 6
332 0 : ;
335 0 : OFF_ALU_OUT = ACC AND COMMON ( @B@ , 3 ) ,
  M 0 :    alu_in 2   alu_op 6   src_frame 2 , r_source 3 , com_ext @B@ ,
336 0 : LOAD ( ACCUMULATOR ) WITH OFFSET
  M 0 : a_w 1 , o_in   3
336 0 : ;
338 0 : OFF_ALU_OUT = ACC LEFT_SHIFTED ( 5 ) OR COMMON ( @B@ , 0 ) ,
  M 0 :    alu_in 2  sf 5  alu_op 5  src_frame 2 , r_source
  M 0 : 0 , com_ext @B@ ,
339 0 : LOAD_AON ( COMMON ( @B@ , 6 ) ) WITH OFFSET ,
  M 0 : dest_frame 2 , r_dest 6 , com_ext @B@ , r_w 1  a_in   3 ,
340 0 : LOAD_LEN ( COMMON ( @B@ , 6 ) ) WITH OFF ,
  M 0 : dest_frame 2 , r_dest 6 , com_ext @B@ , r_w 1  l_in
  M 0 :    3 , dh_ctrl 1 ,
341 0 : SOURCE ( OFF_ALU_DATA ) TO JPD_BUS ( DATA_TRAP )
  M 0 : jpd_ctrl 7   dev_cmd 28
341 0 : ;
343 0 : INDIVISIBLE ,
  M 0 : rand 15 ,
344 0 : DISPATCH EBOX ,
  M 0 : cmd_sp 8  dev_sp 6 ,
345 0 : OFF_ALU_OUT = LIT16 ( 255 ) PLUS COMMON ( 2 , 5 ) ,
  M 0 :    alu_in 3 , 1 0 , lit16 255   alu_op 3   src_frame
  M 0 : 2 , r_source 5 , com_ext 2 ,
346 0 : LOAD ( ACCUMULATOR ) WITH OFFSET ,
  M 0 : a_w 1 , o_in    3 ,
347 0 : LOAD_LEN ( CURRENT ( 3 ) ) WITH OFF ( COMMON ( 2 , 5 ) )
  M 0 : dest_frame 0 , r_dest 3 , r_w 1  l_in   3 , src_frame
  M 0 : 2 , r_source 5 , com_ext 2 , dh_ctrl 0 ,
348 0 : LOAD_AON ( CURRENT ( 3 ) ) WITH AON ( COMMON ( 2 , 5 ) )
  M 0 : dest_frame 0 , r_dest 3 , r_w 1  a_in   2 , src_frame
  M 0 : 2 , r_source 5 , com_ext 2
348 0 : ;
```

```
350 0 : INDIVISIBLE ,
  M 0 :  rand 15 ,
351 0 : OFF_ALU_OUT = ACC AND COMMON ( 268 , 6 ) ,
  M 0 :   alu_in 2  alu_op 6  src_frame 2 , r_source 6 , com_ext 268 ,
352 0 : LOAD_OFF ( CURRENT ( 6 ) ) WITH OFFSET ,
  M 0 :  dest_frame 0 , r_dest 6 , r_w 1  o_in   3 ,
353 0 : LOAD_AON ( CURRENT ( 6 ) ) WITH 0 ,
  M 0 :  dest_frame 0 , r_dest 6 , r_w 1  a_in   0 ,
354 0 : LOAD_LEN ( CURRENT ( 6 ) ) WITH LEN ( COMMON ( 268
354 0 : , 6 ) ) CON_LENGTH ( 0 ) ,
  M 0 :  dest_frame 0 , r_dest 6 , r_w 1  l_in   2 , src_frame
  M 0 :  2 , r_source 6 , com_ext 268    len_ctrl 0   ,
355 0 : IF AON_EN_0 THEN GOTO NO_ARGS
  M 0 :  test  4 , polarity 0   nac 4 , lit8  NO_ARGS
355 0 : ;
357 0 : OFF_ALU_OUT = DATA_TRAP LEFT_SHIFTED ( 2 ) PLUS CURRENT ( 6 ) ,
  M 0 :   jpd_ctrl 4  sf 2  alu_op 3  src_frame 0 , r_source 6 ,
358 0 : LOAD_OFF ( COMMON ( 2 , 5 ) ) WITH OFFSET ,
  M 0 : dest_frame 2 , r_dest 5 , com_ext 2 , r_w 1  o_in   3 ,
359 0 : DISABLE_AON_API ,
  M 0 :  rand 8 ,
360 0 : LONG_GOTO ARG_LOOP
  M 0 :  nac 6 , lit14  ARG_LOOP
360 0 : ;
362 0 : NOT_INTRA :
363 0 : OFF_ALU_OUT = ZERO OR CURRENT ( 0 ) , LOAD_OFF (
363 0 : CURRENT ( 7 ) ) WITH OFFSET , LOAD_LEN ( CURRENT ( 7 ) )
  M 0 :   alu_in 2 , rand 2  alu_op 5  src_frame 0 , r_source
  M 0 :  0 , dest_frame 0 , r_dest 7 , r_w 1  o_in  3 ,
  M 0 : dest_frame 0 , r_dest 7 , r_w 1  l_in
363 0 : WITH LEN ( CURRENT ( 0 ) ) , LOAD_AON ( CURRENT (
363 0 : 7 ) ) WITH AON ( CURRENT ( 0 ) ) ,
  M 0 :  2 , src_frame 0 , r_source 0   , dest_frame 0 ,
  M 0 :  r_dest 7 , r_w 1  a_in   2 , src_frame 0 , r_source 0   ,
364 0 : LONG_CALL DESC_TO_PTR * DESC_TO_UID_PTR
  M 0 :  nac 7 , lit14  DESC_TO_PTR * DESC_TO_UID_PTR
364 0 : ;
366 0 : OFF_ALU_OUT = ONE LEFT_SHIFTED ( 7 ) PLUS CURRENT ( 6 ) ,
  M 0 :   alu_in 2 , rand 3  sf 7  alu_op 3  src_frame 0 , r_source 6 ,
367 0 : LOAD_OFF ( CURRENT ( 6 ) ) WITH OFFSET ,
  M 0 : dest_frame 0 , r_dest 6 , r_w 1  o_in   3 ,
368 0 : LOAD_AON ( CURRENT ( 6 ) ) WITH AON ( CURRENT ( 0 ) ) ,
  M 0 : dest_frame 0 , r_dest 6 , r_w 1  a_in   2 , src_frame
  M 0 :  0 , r_source 6 ,
369 0 : LOAD_LEN ( CURRENT ( 6 ) ) WITH LEN ( CURRENT ( 6
369 0 : ) ) , CON_LENGTH ( 32 , DEC ) ,
  M 0 : dest_frame 0 , r_dest 6 , r_w 1  l_in   2 , src_frame
  M 0 :  0 , r_source 6 , len_ctrl 6 ,
370 0 : IF LEN_LE_32 THEN GOTO ARGS_PUSHED
  M 0 :  test  9 , polarity 1   nac 4 , lit8  ARGS_PUSHED
370 0 : ;
372 0 : ARG_LOOP :
373 0 : PARSE_K_LOAD_FP ,
  M 0 : dev_cmd 121 , nb_ctrl 1 ,
374 0 : RESOLVE ( 0 )
  M 0 : mem 0 , nac 0 , snac 4 , dest_frame 0 , r_dest 0
  M 0 : , r_w 1 , nb_ctrl 1 , l_in 1 , o_in 1 , a_in 1 , a_w 1
374 0 : ;
376 0 : ARG_LOOP_1 :
377 0 : OFF_ALU_OUT = ZERO OR CURRENT ( 0 ) ,
  M 0 :   alu_in 2 , rand 2  alu_op 5  src_frame 0 , r_source 0 ,
378 0 : SOURCE ( OFF_ALU_DATA ) TO JPD_BUS ( DATA_TRAP ) ,
  M 0 : jpd_ctrl 7   dev_cmd 28 ,
379 0 : LOAD ( ACCUMULATOR ) WITH AON ( CURRENT ( 0 ) ) ,
  M 0 : a_w 1 , o_in  2 , src_frame 0 , r_source 0 ,
380 0 : CASE ON ACC_BYTE ( 0 ) MASK 2808 ROTATE ( 3 )
  M 0 : nac 3  src 4  mask 2808 sc 4
380 0 : ;
382 0 : INDIVISIBLE ,
  M 0 : rand 15 ,
383 0 : OFF_ALU_OUT = ACC ZERO_HI XOR COMMON ( 2 , 7 ) ,
  M 0 :   alu_in 2  dev_cmd 3  alu_op 4  src_frame 2 , r_source
  M 0 :  7 , com_ext 2 ,
384 0 : LOAD_AON ( CURRENT ( 6 ) ) WITH AON ( COMMON ( 2 , 7 ) ) ,
```

```
       M 0 : dest_frame 0 , r_dest 6 , r_w 1   a_in   2 , src_frame
       M 0 : 2 , r_source 7 , com_ext 2    ,
     385 0 : IF OFF_NE_0 THEN GOTO NOT_INTRA
       M 0 : test  6 , polarity 1   nac 4 , lit8  NOT_INTRA
     385 0 : ;
     387 0 : WRITE FROM DATA_TRAP USING DESCRIPTOR CURRENT ( 6
     387 0 : ) CON_LENGTH ( 32 ) ,
       M 0 : mem 4   jpd_ctrl 4   db_ctrl 0  src_frame 0 , r_source
       M 0 : 0  len_ctrl 6   ,
     388 0 : OFF_ALU_OUT = ONE LEFT_SHIFTED ( 7 ) PLUS CURRENT ( 6 ) ,
       M 0 :   alu_in 2 , rand 3  sf 7  alu_op 3  src_frame 0 , r_source 6 ,
     389 0 : LOAD_OFF ( CURRENT ( 6 ) ) WITH OFFSET ,
       M 0 : dest_frame 0 , r_dest 6 , r_w 1   o_in   3 ,
     390 0 : LOAD_AON ( CURRENT ( 6 ) ) WITH AON ( CURRENT ( 6 ) ) ,
       M 0 : dest_frame 0 , r_dest 6 , r_w 1   a_in   2 , src_frame
       M 0 : 0 , r_source 6   ,
     391 0 : LOAD_LEN ( CURRENT ( 6 ) ) WITH LEN ( CURRENT ( 6
     391 0 : ) ) , CON_LENGTH ( 32 , DEC ) ,
       M 0 : dest_frame 0 , r_dest 6 , r_w 1   l_in   2 , src_frame
       M 0 : 0 , r_source 6   , len_ctrl 6    ,
     392 0 : IF LEN_GT_32 THEN GOTO ARG_LOOP
       M 0 : test  9 , polarity 0   nac 4 , lit8  ARG_LOOP
     392 0 : ;
     394 0 : ARGS_PUSHED :
     395 0 : FLUSH_NAME_CACH ,
       M 0 : dev_cmd 60 ,
     396 0 : OFF_ALU_OUT = LIT16 ( 0 ) OR COMMON ( 2 , 1 ) ,
       M 0 :   alu_in 3 , 1 0 , lit16 0   alu_op 5  src_frame
       M 0 : 2 , r_source 1 , com_ext 2  ,
     397 0 : LOAD_AON ( CURRENT ( 7 ) ) WITH 0 ,
       M 0 : dest_frame 0 , r_dest 7 , r_w 1   a_in   0 ,
     398 0 : SOURCE ( OFF_ALU_DATA ) TO IPD_BUS ( FBOX_DATA_0 )
       M 0 : jpd_ctrl 7    rand 12
     398 0 : ;
     400 0 : OFF_ALU_OUT = IPC PLUS CURRENT ( 1 ) ,
       M 0 :   jpd_ctrl 10  alu_op 3  src_frame 0 , r_source 1 ,
     401 0 : LOAD_OFF ( CURRENT ( 1 ) ) WITH OFFSET ,
       M 0 : dest_frame 0 , r_dest 1 , r_w 1   o_in   3 ,
     402 0 : LOAD_AON ( CURRENT ( 1 ) ) WITH AON ( CURRENT ( 1 ) ) ,
       M 0 : dest_frame 0 , r_dest 1 , r_w 1   a_in   2 , src_frame
       M 0 : 0 , r_source 1   ,
     403 0 : STAGE_PC ,
       M 0 : dev_cmd 122 ,
     404 0 : LONG_GOTO NCALL_END
       M 0 : nac 6 , lit14  NCALL_END
     404 0 : ;
     406 0 : OFF_ALU_OUT = DATA_TRAP XOR COMMON ( aca , 3 ) ,
       M 0 :   jpd_ctrl 4   alu_op 4  src_frame 2 , r_source 3 , com_ext aca ,
     407 0 : LOAD_OFF ( CURRENT ( 0 ) ) WITH OFFSET ,
       M 0 : dest_frame 0 , r_dest 0 , r_w 1   o_in   3 ,
     408 0 : LOAD ( ACCUMULATOR ) WITH OFFSET ,
       M 0 : a_w 1 , o_in   3 ,
     409 0 : DISABLE_AON_WP1 ,
       M 0 : rand 8 ,
     410 0 : LONG_GOTO ARG_LOOP_1
       M 0 : nac 6 , lit14  ARG_LOOP_1
     410 0 : ;
     412 0 : NCALL_END :
     413 0 : READ_PREFETCH USING DESCRIPTOR CURRENT ( 1 ) ,
       M 0 : mem 7   db_ctrl 0  src_frame 0 , r_source 1 ,
     414 0 : CON_LENGTH ( 32 ) ,
       M 0 : len_ctrl 6   ,
     415 0 : OFF_ALU_OUT = ZERO OR CURRENT ( 1 ) ,
       M 0 :   alu_in 2 , rand 2  alu_op 5  src_frame 0 , r_source 1 ,
     416 0 : LOAD_AON ( CURRENT ( 1 ) ) WITH 0 ,
       M 0 : dest_frame 0 , r_dest 1 , r_w 1   a_in   0 ,
     417 0 : SOURCE ( OFF_ALU_DATA ) TO JPD_BUS ( CURR_PC )
       M 0 : jpd_ctrl 7    dev_cmd 124
     417 0 : ;
     419 0 : WRITE FROM IPC USING OFF_ALU WITH COMMON ( 2 , 5
     419 0 : ) CON_LENGTH ( 32 ) ,
       M 0 : mem 4   jpd_ctrl 10  db_ctrl 1   src_frame 2 , r_source
       M 0 : 5 , com_ext 2  len_ctrl 6   ,
     420 0 : OFF_ALU_OUT = LIT16 ( 64 ) PLUS COMMON ( 2 , 5 ) ,
       M 0 :   alu_in 3 , 1 0 , lit16 64   alu_op 3  src_frame
```

```
  M U :   2 , r_source 5 , com_ext 2 ,
421 U : LOAD_OFF ( CURRENT ( 3 ) ) WITH OFFSET ,
  M U : dest_frame 0 , r_dest 3 , r_w 1   o_in   3 ,
422 U : LOAD_AON ( CURRENT ( 3 ) ) WITH AON ( COMMON ( 2 , 5 ) )
  M U : dest_frame 0 , r_dest 3 , r_w 1   a_in   2 , src_frame
  M U :   2 , r_source 5 , com_ext 2 ,
422 U : ;
424 U : WRITE FROM STOREBACK_DATA USING DESCRIPTOR COMMON
424 U : ( 2 , 5 ) COM_LENGTH ( 32 ) ,
  M U : mem 4   jnd_ctrl 1   db_ctrl 0  src_frame 2 , r_source
  M U : 5 , com_ext 2   len_ctrl 0    ,
425 U : OFF_ALU_OUT = LIT16 ( 128 ) PLUS COMMON ( 2 , 5 ) ,
  M U :   alu_in 3 , 1 0 , lit16 128    alu_op 3  src_frame
  M U : 2 , r_source 5 , com_ext 2 ,
426 U : LOAD_OFF ( COMMON ( 2 , 1 ) ) WITH OFFSET ,
  M U : dest_frame 2 , r_dest 1 , com_ext 2 , r_w 1   o_in   3 .
427 U : DISABLE_AON_WRT
  M U : rand 8
427 U : ;
429 U : PARSE_N_LOAD_FF ,
  M U : dev_cmd 121 , nb_ctrl 1 ,
430 U : OFF_ALU_OUT = PARSER ( SIGN_EXTEND ) LEFT_SHIFTED
430 U : ( 7 ) PLUS COMMON ( 2 , 1 ) ,
  M U :   alu_in 2 , nb_ctrl 1 , rand 1   sf 7   alu_op 3
  M U :   src_frame 2 , r_source 1 , com_ext 2 ,
431 U : LOAD_OFF ( COMMON ( 2 , 5 ) ) WITH OFFSET ,
  M U : dest_frame 2 , r_dest 5 , com_ext 2 , r_w 1   o_in   3 ,
432 U : LOAD_AON ( COMMON ( 2 , 5 ) ) WITH AON ( COMMON ( 2 , 1 ) )
  M U : dest_frame 2 , r_dest 5 , com_ext 2 , r_w 1   a_in
  M U :   2 , src_frame 2 , r_source 1 , com_ext 2
432 U : ;
434 U : DISABLE_AON_WRT ,
  M U : rand 8 ,
435 U : OFF_ALU_OUT = LIT16 ( #FF80 ) OR COMMON ( 2 , 6 ) ,
  M U :   alu_in 3 , 1 0 , lit16 #FF80    alu_op 5  src_frame
  M U : 2 , r_source 6 , com_ext 2 ,
436 U : SOURCE ( OFF_ALU_LS_16 ) TO NAME_BUS ( NAME_TRAP ) ,
  M U : nb_ctrl 0    dev_cmd 117 ,
437 U : LOAD_LEN ( CURRENT ( 0 ) ) WITH LEN ( COMMON ( 2 , 6 ) )
  M U : dest_frame 0 , r_dest 0 , r_w 1   l_in   2 , src_frame
  M U : 2 , r_source 6 , com_ext 2
437 U : ;
439 U : LOAD ( CURRENT ( 0 ) ) WITH DESCRIPTOR CURRENT ( 0 ) ,
  M U : dest_frame 0 , r_dest 0 , r_w 1 , a_in 1 , o_in 1
  M U : , l_in 1    db_ctrl 0  src_frame 0 , r_source 0 ,
440 U : FTO ( RIGHT , SIGN 1 , COM_LENGTH ( 32 ) ,
  M U : rand 5   , len_ctrl 6   ,
441 U : IF LEN_GT_32 THEN GOTO DUMP_ENCACHE
  M U : test 4 , polarity 0   nac 4 , lit8   DUMP_ENCACHE
441 U : ;
443 U : WRITE FROM LENGTH ( CURRENT ( 3 ) ) USING OFF_ALU
443 U : WITH CURRENT ( 3 ) ,
  M U : mem 4   jnd_ctrl 6 , src_frame 0 , r_source 3
  M U : db_ctrl 1   src_frame 0 , r_source 3 ,
444 U : COM_LENGTH ( 32 ) ,
  M U : len_ctrl 6
445 U : OFF_ALU_OUT = ONE LEFT_SHIFTED ( 5 ) REV_MINUS CURRENT ( 3 ) ,
  M U :   alu_in 2 , rand 3  sf 5  alu_op 1   src_frame 0 , r_source 3 ,
446 U : LOAD_AON ( CURRENT ( 3 ) ) WITH 0
  M U : dest_frame 0 , r_dest 3 , r_w 1   a_in   0
446 U : ;
448 U : SOURCE ( DESCRIPTOR CURRENT ( 0 ) )
  M U : db_ctrl 0   src_frame 0 , r_source 0
449 U : TO DESCRIPTOR_BUS ( NAME_CACHE_0 ( NAME_TRAP ) ) ,
  M U :   dev_cmd 48 , nb_ctrl 2 ,
450 U : LOAD_AON ( CURRENT ( 6 ) ) WITH 0
  M U : dest_frame 0 , r_dest 6 , r_w 1   a_in   0
450 U : ;
452 U : NEXT_S_OP
  M U : dev_cmd 120 , nb_ctrl 1 , np_ctrl 1 , nac 6 , lit14
  M U :   EMULATE_2400 * PARSE_16_BIT_OP
452 U : ;
454 U : NO_ARGS :
456 U : FLUSH_NAME_CACHE ,
```

```
M 0 : dev_cmd 60 ,
457 0 : DISABLE_ADH_WRI ,
 M 0 :   rand 8 ,
458 0 : OFF_ALU_OUT = LIT16 ( 0 ) OR CURRENT ( 6 ) ,
 M 0 :    alu_in 3 , 1 0 , lit16 0   alu_op 5   src_frame 0 , r_source 6 ,
459 0 : LOAD_OFF ( COMMON ( 2 , 5 ) ) WITH OFFSET
 M 0 : dest_frame 2 , r_dest 5 , com_ext 2 , r_w 1   o_in   3
459 0 : ;
461 0 : OFF_ALU_OUT = LIT16 ( 0 ) OR COMMON ( 2 , 1 ) ,
 M 0 :    alu_in 3 , 1 0 , lit16 0   alu_op 5   src_frame
 M 0 : 2 , r_source 1 , com_ext 2 ,
462 0 : SOURCE ( OFF_ALU_DATA ) TO IPD_BUS ( EBOX_DATA_0 )
 M 0 : ipd_ctrl 7    rand 12
462 0 : ;
464 0 : OFF_ALU_OUT = IPC PLUS CURRENT ( 1 ) ,
 M 0 :    ipd_ctrl 10   alu_op 3   src_frame 0 , r_source 1 ,
465 0 : LOAD_OFF ( CURRENT ( 1 ) ) WITH OFFSET ,
 M 0 : dest_frame 0 , r_dest 1 , r_w 1   o_in   3 ,
466 0 : LOAD_AON ( CURRENT ( 1 ) ) WITH AON ( CURRENT ( 1 ) ) ,
 M 0 : dest_frame 0 , r_dest 1 , r_w 1   a_in   2 , src_frame
 M 0 : 0 , r_source 1    ,
467 0 : STAGE_PC
 M 0 : dev_cmd 122
467 0 : ;
469 0 : READ_PREFETCH USING DESCRIPTOR CURRENT ( 1 ) ,
 M 0 : mem 7    ob_ctrl 0   src_frame 0 , r_source 1 ,
470 0 : CON_LENGTH ( 32 ) ,
 M 0 : len_ctrl 6    ,
471 0 : OFF_ALU_OUT = ZERO OR CURRENT ( 1 ) ,
 M 0 :    alu_in 2 , rand 2   alu_op 5   src_frame 0 , r_source 1 ,
472 0 : LOAD_AON ( CURRENT ( 1 ) ) WITH 0 ,
 M 0 : dest_frame 0 , r_dest 1 , r_w 1   a_in   0 ,
473 0 : SOURCE ( OFF_ALU_DATA ) TO IPD_BUS ( CURR_PC )
 M 0 : ipd_ctrl 7    dev_cmd 124
473 0 : ;
475 0 : WRITE FROM IPC USING OFF_ALU WITH COMMON ( 2 , 5
475 0 : ) CON_LENGTH ( 32 ) ,
 M 0 : mem 4    ipd_ctrl 10   ob_ctrl 1   src_frame 2 , r_source
 M 0 : 5 , com_ext 2   len_ctrl 6    ,
476 0 : OFF_ALU_OUT = LIT16 ( 64 ) PLUS COMMON ( 2 , 5 ) ,
 M 0 :    alu_in 3 , 1 0 , lit16 64   alu_op 3   src_frame
 M 0 : 2 , r_source 5 , com_ext 2 ,
477 0 : LOAD_OFF ( CURRENT ( 3 ) ) WITH OFFSET ,
 M 0 : dest_frame 0 , r_dest 3 , r_w 1   o_in   3 ,
478 0 : LOAD_AON ( CURRENT ( 3 ) ) WITH AON ( COMMON ( 2 , 5 ) )
 M 0 : dest_frame 0 , r_dest 3 , r_w 1   a_in   2 , src_frame
 M 0 : 2 , r_source 5 , com_ext 2
478 0 : ;
480 0 : WRITE FROM STOREBACK_DATA USING DESCRIPTOR COMMON
480 0 : ( 2 , 5 ) CON_LENGTH ( 32 ) ,
 M 0 : mem 4    ipd_ctrl 1   ob_ctrl 0   src_frame 2 , r_source
 M 0 : 5 , com_ext 2   len_ctrl 6    ,
481 0 : OFF_ALU_OUT = LIT16 ( 128 ) PLUS COMMON ( 2 , 5 ) ,
 M 0 :    alu_in 3 , 1 0 , lit16 128   alu_op 3   src_frame
 M 0 : 2 , r_source 5 , com_ext 2 ,
482 0 : LOAD_OFF ( COMMON ( 2 , 1 ) ) WITH OFFSET ,
 M 0 : dest_frame 2 , r_dest 1 , com_ext 2 , r_w 1   o_in   3 ,
483 0 : DISABLE_AON_WRI
 M 0 : rand 8
483 0 : ;
485 0 : PARSE_A_LOAD_EP ,
 M 0 : dev_cmd 121 , nb_ctrl 1 ,
486 0 : OFF_ALU_OUT = PARSER ( SIGN_EXTEND ) LEFT_SHIFTED
486 0 : ( 7 ) PLUS COMMON ( 2 , 1 ) ,
 M 0 :    alu_in 2 , nb_ctrl 1 , rand 1   sf 7   alu_op 3
 M 0 :   src_frame 2 , r_source 1 , com_ext 2 ,
487 0 : LOAD_OFF ( COMMON ( 2 , 5 ) ) WITH OFFSET ,
 M 0 : dest_frame 2 , r_dest 5 , com_ext 2 , r_w 1   o_in   3 ,
488 0 : LOAD_AON ( COMMON ( 2 , 5 ) ) WITH AON ( COMMON ( 2 , 1 ) )
 M 0 : dest_frame 2 , r_dest 5 , com_ext 2 , r_w 1   a_in
 M 0 : 2 , src_frame 2 , r_source 1 , com_ext 2
488 0 : ;
490 0 : DONT_ENCACHE ;
491 0 : WRITE FROM LENGTH ( CURRENT ( 3 ) ) USING OFF_ALU
491 0 : WITH CURRENT ( 3 ) ,
```

```
  0 : mem 4    jod_ctrl 6 , src_frame 0 , r_source 3
  0 : nh_ctrl 1    src_frame 0 , r_source 3 ,
492 0 : OFF_ALU_OUT = ONE LEFT_SHIFTED ( 5 ) REV_MINUS CURRENT ( 3 ) ,
  0 :    alu_in 2 , rand 3   sf 5   alu_op 1   src_frame 0 , r_source 3 ,
493 0 : LOAD_AUN ( CURRENT ( 3 ) ) WITH 0 ,
  0 : dest_frame 0 , r_dest 3 , r_w 1   a_in    0 ,
494 0 : NEXT_S_OP , CON_LENGTH ( 3c )
  0 : dev_cmd 120 , nh_ctrl 1 , nb_ctrl 1 , nac 6 , lit14
  0 : EMULATE_2400 * PARSE_16_BIT_OP , len_ctrl o
494 0 : ;
494 0 :
```

COMPILATION COMPLETE, 32 STATEMENTS PROCESSED

DATA GENERAL F m P - FETCH MICROCODE GENERATOR, REV. 6.0 (3/16/79)
    6/6/81 AT 2:38:19

INPUT FILE: LEVEL_S_RETURN
OBJECT FILE: LEVEL_S_RETURN.OB

LINE NO:SOURCE

```
  1 0 :$NO LIST
 40 0 :$INCLUDE FROX_INCLUDES:FRAME.DEF
 41 0 :$NO LIST
144 0 :$INCLUDE FROX_INCLUDES:COMMON_REGISTERS
145 0 :$NO LIST
309 0 :$INCLUDE FROX_INCLUDES:MACROS
310 0 :$NO LIST
336 0 :$LIST
337 0 :/************************************************************/
338 0 :/*                                                          */
339 0 :/*      LEVEL S RETURN                                      */
340 0 :/*                                                          */
341 0 :/*      FUNCTION:     LEVEL S RETURN implements the RETURN  */
342 0 :/*                    S-Op. The current stack frame is popped */
343 0 :/*                    from the domain stack. If the call crossed */
344 0 :/*                    domains, all domain crossings are reversed. */
345 0 :/*                    If the call was software to software, when */
346 0 :/*                    the old state is restored, S-op execution */
347 0 :/*                    continues, via NEXT_S_OP. If the call was */
348 0 :/*                    microcode to software, when the old state */
349 0 :/*                    is restored microexecution continues, via a */
350 0 :/*                    microreturn in Invoke_signaller and   */
351 0 :/*                    saved microstate is restored from the secure */
352 0 :/*                    stack, and a secure stack frame is popped. */
353 0 :/*                                                          */
354 0 :/*      NOTE:          This is the intermediate form.       */
355 0 :/*                                                          */
356 0 :/*      INPUTS:        RETURN S op                          */
357 0 :/*                                                          */
358 0 :/*      OUTPUTS:       State before call is restored        */
359 0 :/*                                                          */
360 0 :/************************************************************/
361 0 :
362 0 :
363 0 :BEGIN
364 1 :     MACRO TEMP1        MEANS   CURRENT(1)      ENDMAC;
365 1 :     MACRO SAVED_SP_    MEANS   CURRENT_3       ENDMAC;
366 1 :     MACRO SAVED_FP_    MEANS   CURRENT_4       ENDMAC;
367 1 :     MACRO SAVED_PC_    MEANS   CURRENT_5       ENDMAC;
368 1 :     MACRO CALL_TYPE_   MEANS   CURRENT_7       ENDMAC;
369 1 :     MACRO CALL_TYPE    MEANS   CURRENT(7)      ENDMAC;
370 1 :
371 1 :
372 1 :
373 1 :$PAGE
374 1 :
375 1 :         /*
376 1C:          * recover_return_info();
377 1C:          * IF .call_type.neighborhood_Call = Yes THEN
378 1C:          *     FP.offset := .saved_FP.;
379 1C:          *     SP.offset := .saved_SP.;
380 1C:          *     start_prefetch?     %% Using .saved_PC., of course.
381 1C:          *     NEXT_S_OP;
```

```
382 1C:          *       ELSE
383 1C:          *          IF .call_type.nlg_pending = Yes  THEN
384 1C:          *              GOTO NLG*REENTER;
385 1C:          *          ELSE
386 1C:          *              REPEAT
387 1C:          *                  .abandoned_FP. := FP;
388 1C:          *                  FP.offset := .saved_FP.;
389 1C:          *                  SP.offset := .saved_SP.;
390 1C:          *                  WHEN .call_type.XDC_Incoming = No LEAVE;
391 1C:          *                  leave_domain( .abandoned_FP. );
392 1C:          *                  recover_return_info();
393 1C:          *              END REPEAT;
394 1C:          *          END IF;
395 1C:          *       END IF;
396 1C:          *  restore_macro_state();
397 1C:          *  WHEN .call_type.signal = Yes GOTO signal_return_path;
398 1C:          *  start_prefetch;      %% Using .saved_PC., of course.
399 1C:          *  NEXT_S_OP;
400 1C:          *
401 1C:          */
402 1 :
403 1 :        /*
404 1C:          * It should be noted that .saved_PC., .saved_SP., .saved_FP.,
405 1C:          * and .call_type. are all set up by the initial call to
406 1C:          * write_return_info.
407 1C:          */
408 1 :
409 1 :$PAGE
410 1 :
411 1 :ENTRY LEVEL_S_RETURN:   /*begins in _COMMON*/
412 1 :               /*enters here with saved_SP in Ebox,
413 1C:                 CPC and control flags in ACC*/
414 1 :
415 1 :               /*Check for Neighborhood return*/
416 1 :               /*i.e., full call bit not set */
417 1 :               /*Recover saved_FP.*/
418 1 :
419 1 :         OFF_ALU_OUT = ONE LEFT_SHIFTED(7) REV_MINUS FP,
420 1 :         READ TO SAVED_FP_ USING OFF_ALU WITH FP,
421 1 :         CUR_LENGTH (32),
422 1 :         CASE ON ACC_BYTE(3) MASK #01B ROTATE(0);
423 1 :
424 1 :/*0*/    /*Read for Prefetch and load CPC*/
425 1 :
426 1 :         OFF_ALU_OUT = ACC PLUS PC.AON,
427 1 :         READ_PREFETCH USING OFF_ALU WITH PC.AON,
428 1 :         SOURCE (OFF_ALU_DATA) TO JPU_BUS (CURR_PC),
429 1 :         GOTO NHOOD_RTN;
430 1 :
431 1 :/*1*/    /*Not Ncall return so go to full call case*/
432 1 :         /* and get call flags into CALL_TYPE.*/
433 1 :         /*Get CPC (accumulator) into SAVED_PC*/
434 1 :         /*
435 1C:          * FULL_RETURN is an entry point for invoke_callers_signaller.
436 1C:          */
437 1 :ENTRY FULL_RETURN:
438 1 :
439 1 :         /*Get call flags.*/
440 1 :         OFF_ALU_OUT = LIT1A (BACK_FLAGS) REV_MINUS FP,
441 1 :         READ TO CURRENT_7 USING OFF_ALU WITH FP,
442 1 :         CUR_LENGTH(32);
443 1 :
444 1 :         /*See if the frame has a NLG pending, if it does let NLG code
445 1C:           handle things.*/
446 1 :
447 1 :         OFF_ALU_OUT = ONE LEFT_SHIFTED(1) AND CALL_TYPE,
448 1 :         IF OFF_EQ_0 THEN GOTO CONTINUE_RETURN;
449 1 :
450 1 :         LONG_GOTO NLG*REENTER;
451 1 :
452 1 :CONTINUE_RETURN:
453 1 :
454 1 :         OFF_ALU_OUT = ACC OR CPC_0,
455 1 :         LOAD_OFF (SAVED_PC) WITH OFFSET,
456 1 :         LOAD_AON (SAVED_PC) WITH 0;
```

```
457 1 :
458 1 :            ALU_FUNC=DATA,
459 1 :            OFF_ALU_OUT = FUNC_DATA OR CON_0,
460 1 :            LOAD_OFF (SAVED_SP) WITH OFFSET;
461 1 :
462 1 :            /*Stash the current FP away*/
463 1 :            OFF_ALU_OUT = LIT16( 0 ) OR FP,
464 1 :            LOAD_OFF ( ABANDONED_FP ) WITH OFFSET,
465 1 :            LOAD_AON( ABANDONED_FP ) WITH 0;
466 1 :
467 1 :            OFF_ALU_OUT = LIT16(0) OR SAVED_FP,
468 1 :            LOAD_OFF( FP ) WITH OFFSET,
469 1 :            LOAD_LEN (FP) WITH LITERAL (CON_LENGTH(32)),
470 1 :            DISABLE_AON_WRITE;
471 1 :
472 1 :            OFF_ALU_OUT = LIT16(0) OR SAVED_SP,
473 1 :            LOAD_OFF( SP ) WITH OFFSET,
474 1 :            DISABLE_AON_WRITE;
475 1 :
476 1 :            /*CALL_TYPE is current?*/
477 1 :
478 1 :            OFF_ALU_OUT = LIT16( XDMN_INCOMING ) AND CALL_TYPE,
479 1 :            LOAD( ACCUMULATOR ) WITH OFFSET;
480 1 :
481 1 :            OFF_ALU_OUT = ACC OR CON_0,
482 1 :            IF OFF_EQ_0 THEN GOTO XDC_DONE;
483 1 :
484 1 :XDC_BID:
485 1 :            LONG_CALL XDOMAIN_SUPPORT*LEAVE_DOMAIN;
486 1 :
487 1 :/* RECOVER RETURN INFORMATION                                        */
488 1 :/*          Save area format is:                                     */
489 1 :/*          FP-32  FP-64  FP-64  FP-96  FP-128                       */
490 1 :/*          Flags  Flags  PC     SP     FP                           */
491 1 :
492 1 :            DISPATCH EBOX,
493 1 :            OFF_ALU_OUT = LIT16(BACK_OLD_SP) REV_MINUS FP,
494 1 :            READ TO EBOX_DATA_0 USING OFF_ALU WITH FP CON_LENGTH( 32 );
495 1 :
496 1 :            OFF_ALU_OUT = LIT16(BACK_OLD_FP) REV_MINUS FP,
497 1 :            READ TO SAVED_FP_ USING OFF_ALU WITH FP CON_LENGTH( 32 );
498 1 :
499 1 :            OFF_ALU_OUT = LIT16( BACK_OLD_PC ) REV_MINUS FP,
500 1 :            READ TO ACCUMULATOR USING OFF_ALU WITH FP CON_LENGTH( 32 );
501 1 :
502 1 :            OFF_ALU_OUT = ONE LEFT_SHIFTED(5) REV_MINUS FP,
503 1 :            READ TO CALL_TYPE_ USING OFF_ALU WITH FP CON_LENGTH( 32 ),
504 1 :            GOTO FULL_RETURN;
505 1 :
506 1 :XDC_DONE:
507 1 :
508 1 :            LONG_CALL CALL_STATE*RESTORE_MACPU_STATE;
509 1 :
510 1 :            OFF_ALU_OUT = LIT32( SIGNAL_BIT ) OR CON_0,
511 1 :            LOAD( ACCUMULATOR ) WITH OFFSET;
512 1 :
513 1 :            TURN_OFF_PREFETCH,
514 1 :            OFF_ALU_OUT = ACC AND CALL_TYPE,
515 1 :            IF OFF_EQ_0 THEN GOTO SOFTWARE_RETURN;
516 1 :
517 1 :            /*Prepare prefetcher*/
518 1 :
519 1 :            OFF_ALU_OUT = ZERO OR SAVED_PC,
520 1 :            SOURCE (OFF_ALU_DATA) TO JPD_BUS (CURR_PC),
521 1 :            LONG_GOTO INVOKE_SIGNALLER*SIGNAL_RETURN_PATH;
522 1 :
523 1 :SOFTWARE_RETURN:
524 1 :
525 1 :            LOAD_AON (SAVED_PC) WITH AON (PBP);
526 1 :
527 1 :            OFF_ALU_OUT = ZERO OR SAVED_PC,
528 1 :            SOURCE( OFF_ALU_DATA ) TO JPD_BUS( CURR_PC ),
529 1 :            READ_PREFETCH USING DESCRIPTOR SAVED_PC,
530 1 :            LOAD_AON(SAVED_PC) WITH 0,
531 1 :            LONG_GOTO SOP_ENTRIES*NXT_S_OP;
```

```
532 1 :
533 1 :NHOOD_RTN:
534 1 :
535 1 :        DISABLE_AON_WRITE,
536 1 :        ACK_FBOX_DATA,
537 1 :        OFF_ALU_OUT = FBOX_DATA OR ZERO_VAL,
538 1 :        LOAD_OFF (SP) WITH OFFSET;
539 1 :
540 1 :        DISABLE_AON_WRITE,
541 1 :        OFF_ALU_OUT = BIASED_LENGTH CON_LENGTH(0) OR SAVED_FP,
542 1 :        LOAD_OFF( FP ) WITH OFFSET,
543 1 :        NEXT_S_UP;
544 1 :END

INPUT FILE:  211.1_FILE1A
OBJECT FILE: LEVEL_S_RETURN.OB

LINE N :SOURCE 363 0 : BEGIN
411 1 : ENTRY LEVEL_S_RETURN :
419 1 : OFF_ALU_OUT = ONE LEFT_SHIFTED ( 7 ) REV_MINUS COMMON ( 2 , 1 ) ,
  M 1 :    alu_in 2 , rand 3 sf 7   alu_op 1  src_frame 2
  M 1 : , r_source 1 , com_ext 2 ,
420 1 : READ TO CURRENT_4 USING OFF_ALU WITH COMMON ( 2 , 1 ) ,
  M 1 : mem 1   md 12   db_ctrl 1   src_frame 2 , r_source 1 , com_ext 2 ,
421 1 : CON_LENGTH ( 32 ) ,
  M 1 : len_ctrl 6 ,
422 1 : CASE ON ACC_BYTE ( 3 ) MASK %010 ROTATE ( 0 )
  M 1 : nac 5   srce 7   mask %010 sc 7
422 1 : ;
426 1 : OFF_ALU_OUT = ACC PLUS COMMON ( 2 , 6 ) ,
  M 1 :    alu_in 2  alu_op 3  src_frame 2 , r_source 6 , com_ext 2 ,
427 1 : READ_PREFETCH USING OFF_ALU WITH COMMON ( 2 , 6 ) ,
  M 1 : mem 7   db_ctrl 1   src_frame 2 , r_source 6 , com_ext 2 ,
428 1 : SOURCE ( OFF_ALU_DATA ) TO JPD_BUS ( CURR_PC ) ,
  M 1 : jpd_ctrl 7   dev_cmd 124 ,
429 1 : GOTO NHOOD_RTN
  M 1 : nac 4 , lit8  NHOOD_RTN
429 1 : ;
437 1 : ENTRY FULL_RETURN :
440 1 : OFF_ALU_OUT = LIT16 ( 32 ) REV_MINUS COMMON ( 2 , 1 ) ,
  M 1 :    alu_in 3 , 1 0 , lit16 32   alu_op 1  src_frame
  M 1 : 2 , r_source 1 , com_ext 2 ,
441 1 : READ TO CURRENT_7 USING OFF_ALU WITH COMMON ( 2 , 1 ) ,
  M 1 : mem 1   md 15   db_ctrl 1   src_frame 2 , r_source 1 , com_ext 2 ,
442 1 : CON_LENGTH ( 32 )
  M 1 : len_ctrl 6
442 1 : ;
447 1 : OFF_ALU_OUT = ONE LEFT_SHIFTED ( 1 ) AND CURRENT ( 7 ) ,
  M 1 :    alu_in 2 , rand 3 sf 1  alu_op 0  src_frame 0 , r_source 7 ,
448 1 : IF OFF_EQ_0 THEN GOTO CONTINUE_RETURN
  M 1 : test 6 , polarity 0   nac 4 , lit8 CONTINUE_RETURN
448 1 : ;
450 1 : LONG_GOTO MLG + REENTER
  M 1 : nac 6 , lit14  MLG + REENTER
450 1 : ;
452 1 : CONTINUE_RETURN :
454 1 : OFF_ALU_OUT = ACC OR COMMON ( %80 , 0 ) ,
  M 1 :    alu_in 2  alu_op 5  src_frame 2 , r_source 0 , com_ext %80 ,
455 1 : LOAD_OFF ( CURRENT ( 5 ) ) WITH OFFSET ,
  M 1 : dest_frame 0 , r_dest 5 , r_w 1   o_in 3 ,
456 1 : LOAD_AOP ( CURRENT ( 5 ) ) WITH 0
  M 1 : dest_frame 0 , r_dest 5 , r_w 1   a_in 0
456 1 : ;
458 1 : ACK_EBOX_DATA ,
  M 1 : dev_cmd 111 ,
459 1 : OFF_ALU_OUT = EBOX_DATA OR COMMON ( %80 , 0 ) ,
  M 1 :    alu_in 0 , jpd_ctrl 15  alu_op 5  src_frame 2 ,
  M 1 : r_source 0 , com_ext %80 ,
460 1 : LOAD_OFF ( CURRENT ( 3 ) ) WITH OFFSET
  M 1 : dest_frame 0 , r_dest 3 , r_w 1   o_in 3
460 1 : ;
463 1 : OFF_ALU_OUT = LIT16 ( 0 ) OR COMMON ( 2 , 1 ) ,
  M 1 :    alu_in 3 , 1 0 , lit16 0   alu_op 5  src_frame
```

```
   M 1 :   2 , r_source 1 , com_ext 2 ,
 464 1 : LOAD_OFF ( CURRENT ( 0 ) ) WITH OFFSET ,
   M 1 : dest_frame 0 , r_dest 0 , r_w 1   o_in    3 ,
 465 1 : LOAD_AUM ( CURRENT ( 0 ) ) WITH 0
   M 1 : dest_frame 0 , r_dest 0 , r_w 1   a_in    0
 465 1 : ;
 467 1 : OFF_ALU_OUT = LIT16 ( 0 ) OR CURRENT ( 4 ) ,
   M 1 :    alu_in 3 , 1 0 , lit16 0   alu_op 5  src_frame 0 , r_source 4 ,
 468 1 : LOAD_OFF ( COMMON ( 2 , 1 ) ) WITH OFFSET ,
   M 1 : dest_frame 2 , r_dest 1 , com_ext 2 , r_w 1   o_in    3 ,
 469 1 : LOAD_LEN ( COMMON ( 2 , 1 ) ) WITH LITERAL ( CON_LENGTH ( 32 ) ) ,
   M 1 : dest_frame 2 , r_dest 1 , com_ext 2 , r_w 1   l_in
   M 1 :    1 , len_ctrl 6   ,
 470 1 : DISABLE_ADD_WRI
   M 1 : rand 8
 470 1 : ;
 472 1 : OFF_ALU_OUT = LIT16 ( 0 ) OR CURRENT ( 3 ) ,
   M 1 :    alu_in 3 , 1 0 , lit16 0   alu_op 5  src_frame 0 , r_source 3 ,
 473 1 : LOAD_OFF ( COMMON ( 2 , 5 ) ) WITH OFFSET ,
   M 1 : dest_frame 2 , r_dest 5 , com_ext 2 , r_w 1   o_in    3 ,
 474 1 : DISABLE_ADD_WRI
   M 1 : rand 8
 474 1 : ;
 476 1 : OFF_ALU_OUT = LIT16 ( 806a ) AND CURRENT ( 7 ) ,
   M 1 :    alu_in 3 , 1 0 , lit16 808w   alu_op 6   src_frame
   M 1 : 0 , r_source 7 ,
 479 1 : LOAD ( ACCUMULATOR ) WITH OFFSET
   M 1 : a_w 1 , o_in    3
 479 1 : ;
 481 1 : OFF_ALU_OUT = ACC OR COMMON ( 8a , 0 ) ,
   M 1 :    alu_in 2   alu_op 5  src_frame 2 , r_source 0 , com_ext aba ,
 482 1 : IF OFF_EQ_0 THEN GOTO XDC_DONE
   M 1 : test  0 , polarity 0   nac 4 , lit8 XDC_DONE
 482 1 : ;
 484 1 : XDC_RTN :
 485 1 : LONG_CALL XDOMAIN_SUPPORT * LEAVE_DOMAIN
   M 1 : nac 7 , lit16 XDOMAIN_SUPPORT * LEAVE_DOMAIN
 485 1 : ;
 492 1 : DISPATCH FMOX ,
   M 1 : cmd_so 8   dev_so 6 ,
 493 1 : OFF_ALU_OUT = LIT16 ( 96 ) REV_MINUS COMMON ( 2 , 1 ) ,
   M 1 :    alu_in 3 , 1 0 , lit16 96   alu_op 1  src_frame
   M 1 : 2 , r_source 1 , com_ext 2 ,
 494 1 : READ TO ERDY_DATA_W USING OFF_ALU WITH COMMON ( 2
 494 1 : , 1 ) CON_LENGTH ( 32 )
   M 1 : mem 1   md 0   db_ctrl 1   src_frame 2 , r_source
   M 1 : 1 , com_ext 2  len_ctrl 6
 494 1 : ;
 496 1 : OFF_ALU_OUT = LIT16 ( 128 ) REV_MINUS COMMON ( 2 , 1 ) ,
   M 1 :    alu_in 3 , 1 0 , lit16 128   alu_op 1  src_frame
   M 1 : 2 , r_source 1 , com_ext 2 ,
 497 1 : READ TO CURRENT_4 USING OFF_ALU WITH COMMON ( 2 ,
 497 1 : 1 ) CON_LENGTH ( 32 )
   M 1 : mem 1   md 12   db_ctrl 1   src_frame 2 , r_source
   M 1 : 1 , com_ext 2  len_ctrl 6
 497 1 : ;
 499 1 : OFF_ALU_OUT = LIT16 ( 64 ) REV_MINUS COMMON ( 2 , 1 ) ,
   M 1 :    alu_in 3 , 1 0 , lit16 64   alu_op 1  src_frame
   M 1 : 2 , r_source 1 , com_ext 2 ,
 500 1 : READ TO ACCUMULATOR USING OFF_ALU WITH COMMON ( 2
 500 1 : , 1 ) CON_LENGTH ( 32 )
   M 1 : mem 1   md 1   db_ctrl 1   src_frame 2 , r_source
   M 1 : 1 , com_ext 2  len_ctrl 6
 500 1 : ;
 502 1 : OFF_ALU_OUT = ONE LEFT_SHIFTED ( 5 ) REV_MINUS COMMON ( 2 , 1 ) ,
   M 1 :    alu_in 2 , rand 3  sf 5  alu_op 1  src_frame 2
   M 1 : , r_source 1 , com_ext 2 ,
 503 1 : READ TO CURRENT_7 USING OFF_ALU WITH COMMON ( 2 ,
 503 1 : 1 ) CON_LENGTH ( 32 ) ,
   M 1 : mem 1   md 15   db_ctrl 1   src_frame 2 , r_source
   M 1 : 1 , com_ext 2  len_ctrl 6   ,
 504 1 : GOTO FULL_RETURN
   M 1 : nac 4 , lit8 FULL_RETURN
 504 1 : ;
```

```
506  1 : XPC_DONE :
508  1 : LONG_CALL CALL_STATE * RESTORE_MACRO_S
  M  1 : nac 7 , lit14 CALL_STATE * RESTORE_MACRO_S
508  1 : ;
510  1 : OFF_ALU_OUT = LIT32 ( A10A ) OR COMMON ( ABA , 0 ) ,
  M  1 :    alu_in 3 , 1 1 , lit32 A10A  alu_op 5  src_frame
  M  1 : 2 , r_source 0 , com_ext ABA ,
511  1 : LOAD ( ACCUMULATOR ) WITH OFFSET
  M  1 : a_w 1 , o_in    3
511  1 : ;
513  1 : TURN_OFF_PREFET ,
  M  1 : dev_cmd 57 ,
514  1 : OFF_ALU_OUT = ACC AND CURRENT ( 7 ) ,
  M  1 :    alu_in 2  alu_op 6  src_frame 0 , r_source 7 ,
515  1 : IF OFF_EQ_0 THEN GOTO SOFTWARE_RETURN
  M  1 : test  0 , polarity 0   nac 4 , lit8  SOFTWARE_RETURN
515  1 : ;
519  1 : OFF_ALU_OUT = ZERO OR CURRENT ( 5 ) ,
  M  1 :    alu_in 2 , rand 2  alu_op 5  src_frame 0 , r_source 5 ,
520  1 : SOURCE ( OFF_ALU_DATA ) TO JPD_BUS ( CURR_PC ) ,
  M  1 : jpd_ctrl 7     dev_cmd 124 ,
521  1 : LONG_GOTO INVOKE_SIGNALLE * SIGNAL_RETURN_P
  M  1 : nac 6 , lit14 INVOKE_SIGNALLE * SIGNAL_RETURN_P
521  1 : ;
523  1 : SOFTWARE_RETURN :
525  1 : LOAD_AON ( CURRENT ( 5 ) ) WITH AON ( COMMON ( 2 , 0 ) )
  M  1 : dest_frame 0 , r_dest 5 , r_w 1  a_in    2 , src_frame
  M  1 : 2 , r_source 0 , com_ext 2
525  1 : ;
527  1 : OFF_ALU_OUT = ZERO OR CURRENT ( 5 ) ,
  M  1 :    alu_in 2 , rand 2  alu_op 5  src_frame 0 , r_source 5 ,
528  1 : SOURCE ( OFF_ALU_DATA ) TO JPD_BUS ( CURR_PC ) ,
  M  1 : jpd_ctrl 7     dev_cmd 124 ,
529  1 : READ_PREFETCH USING DESCRIPTOR CURRENT ( 5 ) ,
  M  1 : mem 7   dh_ctrl 0  src_frame 0 , r_source 5 ,
530  1 : LOAD_AON ( CURRENT ( 5 ) ) WITH 0 ,
  M  1 : dest_frame 0 , r_dest 5 , r_w 1  a_in    0 ,
531  1 : LONG_GOTO SOP_ENTRIES * NXT_S_OP
  M  1 : nac 6 , lit14 SOP_ENTRIES * NXT_S_OP
531  1 : ;
533  1 : NHOOD_RTN :
535  1 : DISABLE_AON_WRT ,
  M  1 : rand 8 ,
536  1 : ACK_EBOX_DATA ,
  M  1 : dev_cmd 111 ,
537  1 : OFF_ALU_OUT = EBOX_DATA OR COMMON ( 2 , 6 ) ,
  M  1 :    alu_in 0 , icd_ctrl 15  alu_op 5  src_frame 2 ,
  M  1 : r_source 6 , com_ext 2 ,
538  1 : LOAD_OFF ( COMMON ( 2 , 5 ) ) WITH OFFSET
  M  1 : dest_frame 2 , r_dest 5 , com_ext 2 , r_w 1  o_in    3
538  1 : ;
540  1 : DISABLE_AON_WRT ,
  M  1 : rand 8 ,
541  1 : OFF_ALU_OUT = BIASED_LENGTH COM_LENGTH ( 0 ) OR CURRENT ( 4 ) ,
  M  1 :    alu_in 1  len_ctrl 0    alu_op 5  src_frame 0 , r_source 4 ,
542  1 : LOAD_OFF ( COMMON ( 2 , 1 ) ) WITH OFFSET ,
  M  1 : dest_frame 2 , r_dest 1 , com_ext 2 , r_w 1  o_in    3 ,
543  1 : NEXT_S_OP
  M  1 : dev_cmd 120 , dh_ctrl 1 , np_ctrl 1 , nac 6 , lit14
  M  1 :   EMULATE_2400 * PARSE_16_BIT_OP
543  1 : ;
544  1 : END
544  0 :

COMPILATION COMPLETE, 25 STATEMENTS PROCESSED
DATA GENERAL F H P - FETCH MICROCODE GENERATOR, REV. 6.0 (3/16/79)
6/6/81 AT 2:32:46

INPUT FILE: LEVEL_S_CALL
OBJECT FILE: LEVEL_S_CALL.OB

LINE NC:SOURCE 1 0 :$NO LIST
 29 0 :$INCLUDE FBOX_INCLUDES:ENTRY_DESC.DEF
```

```
 30 0 :$NO LIST
 61 0 :$INCLUDE FRUX_INCLUDES:CALL.DEF
 62 0 :$NO LIST
105 0 :$INCLUDE FRUX_INCLUDES:FRAME.DEF
106 0 :$NO LIST
209 0 :$INCLUDE FRUX_INCLUDES:COMMON_REGISTERS
210 0 :$NO LIST
374 0 :$INCLUDE FRUX_INCLUDES:ESSA.DEF
375 0 :$NO LIST
413 0 :$LIST
414 0 :/****************************************************************/
415 0 :/*                                                              */
416 0 :/*        LEVEL S CALL                                          */
417 0 :/*                                                              */
418 0 :/*        FUNCTION:     LEVEL S CALL implements the call S Op.  */
419 0 :/*                     The call target, number of arguments, and*/
420 0 :/*                     arguments themselves are fetched from the*/
421 0 :/*                     I stream. The arguments are pushed. We   */
422 0 :/*                     then GOTO the COMMON CALL CODE, which    */
423 0 :/*                     actually performs the call.              */
424 0 :/*                                                              */
425 0 :/*                     RESTRICTION: Not more than 32K arguments.*/
426 0 :/*                                                              */
427 0 :/*        INPUTS:       I stream contains:                      */
428 0 :/*                       CALL <nargs> <target> <arg1> ... <argn>*/
429 0 :/*                       op    ext_op   name    name      name */
430 0 :/*                                                              */
431 0 :/*        OUTPUTS:      None.                                   */
432 0 :/*                                                              */
433 0 :/*        DATE:         JAN 23 1981.                            */
434 0 :/*                                                              */
435 0 :/****************************************************************/
436 0 :
437 0 :    BEGIN
438 1 :
439 1 :        MACRO SF_TMP    MEANS CURRENT(6) ENDMAC;
440 1 :
441 1 :ENTRY LEVEL_S_CALL:
442 1 :
443 1 :    /************************************************************
444 1C:     /* From disp algorithm through PARSE_TARGET*/
445 1C:
446 1C:     /* Call target into CURRENT(1), .target. */
447 1C:     PARSE_K_LOAD_EPL,
448 1C:     RESOLVE(1);
449 1C:
450 1C:     /*Check for hidden NCALL (i.e. intra-ped through pointer.*/
451 1C:
452 1C:     LOAD (ACCUMULATOR) WITH ADM (TARGET);
453 1C:
454 1C:     INDIVISIBLE,
455 1C:     LOAD_OFF (TEMP0) WITH ADM (PBP);
456 1C:
457 1C:     INDIVISIBLE,
458 1C:     OFF_ALU_OUT = ACC XOR TEMP0,
459 1C:     LOAD( ACCUMULATOR ) WITH OFFSET;
460 1C:
461 1C:     ************************************************************/
462 1 :
463 1 :        OFF_ALU_OUT = ACC AND CON_3FFF,
464 1 :        IF OFF_NE_0 THEN GOTO NOT_INTRA_PED;
465 1 :
466 1 :CHECK_FOR_FD:
467 1 :
468 1 :        OFF_ALU_OUT = LIT16( ENTRY_DESC.NR ) PLUS TARGET,
469 1 :        READ TO ACCUMULATOR USING OFF_ALU WITH TARGET
470 1 :            CON_LENGTH( 8 ), FIU( RIGHT, ZERO ));
471 1 :
472 1 :        OFF_ALU_OUT = ACC XOR CON_FD,
473 1 :        IF OFF_NE_0 THEN GOTO NOT_INTRA_PED;
474 1 :
475 1 :        /*Check PED ptr against target PFD.*/
476 1 :
477 1 :        OFF_ALU_OUT = LIT16(ENTRY_DESC.ENV_OFF) PLUS TARGET,
478 1 :        READ TO ACCUMULATOR USING OFF_ALU WITH TARGET
```

```
479  1 :              CON_LENGTH(32);
480  1 :
481  1 :      OFF_ALU_OUT = ACC XOR PED_PTR,
482  1 :      IF OFF_NE_0 THEN GOTO NOT_INTRA_PED;
483  1 :
484  1 :      /*Fix up target to beginning of code.*/
485  1 :      /*The path we're taking here expects target to
486  1C:        be in current(0).*/
487  1 :
488  1 :      READ TO ACCUMULATOR USING TARGET CON_LENGTH(32);
489  1 :
490  1 :      OFF_ALU_OUT = ACC PLUS PRP,
491  1 :      LOAD_OFF(CURRENT(0)) WITH OFFSET,
492  1 :      LOAD_AON (CURRENT(0)) WITH AON (PRP),
493  1 :      LONG_GOTO CALL_ENTRIES*SET_UP_MCALL;
494  1 :
495  1 :NOT_INTRA_PED:
496  1 :
497  1 :      /*Get arg count.*/
498  1 :
499  1 :      LOAD(ACCUMULATOR) WITH OPU(LEN(EXTENDED_OPCODE));
500  1 :
501  1 :      /* Mask out sign extension. */
502  1 :      OFF_ALU_OUT = ACC AND CON_FF,
503  1 :      LOAD(ACCUMULATOR) WITH OFFSET;
504  1 :
505  1 :      OFF_ALU_OUT = ACC LEFT_SHIFTED (5) OR CON_0,
506  1 :      LOAD_LEN( TEMP7 ) WITH OFF;
507  1 :
508  1 :      /* Prepare to round SP up to 128 bit boundary. */
509  1 :      OFF_ALU_OUT = LIT16( 127 ) PLUS SP,
510  1 :      LOAD_OFF( TEMP7 ) WITH OFFSET,
511  1 :      LOAD_AON( TEMP7 ) WITH AON( SP );
512  1 :
513  1 :      OFF_ALU_OUT = LIT16( 0FF80, SIGN_EXTEND_LO_HALF ) AND TEMP7,
514  1 :      LOAD_OFF( TEMP7 ) WITH OFFSET,
515  1 :      LOAD_AON( TEMP7 ) WITH AON( TEMP7 );
516  1 :
517  1 :      COPY( TEMP6, SP );
518  1 :
519  1 :      /*Temp7 now points to the bottom of the ESSA. */
520  1 :      /*Remember the top of the ESSA*/
521  1 :      /*and also get arg count into N_args (saved_sp.len).*/
522  1 :
523  1 :      OFF_ALU_OUT = LIT16(ESSA.SIZE) PLUS TEMP7,
524  1 :      LOAD_AON(SAVED_SP) WITH AON(TEMP7),
525  1 :      LOAD_OFF(SAVED_SP) WITH OFFSET,
526  1 :      LOAD_LEN(N_ARGS) WITH LEN(TEMP7);
527  1 :
528  1 :      /*Reserve space for OS area by setting ARGVECTOR_BASE */
529  1 :      /*Also pass along the arg count in ARGVECTOR_BASE.len */
530  1 :
531  1 :      OFF_ALU_OUT = LIT16( 128 ) PLUS SAVED_SP,
532  1 :      LOAD_OFF(ARGVECTOR_BASE) WITH OFFSET,
533  1 :      LOAD_AON(ARGVECTOR_BASE) WITH AON(SAVED_SP),
534  1 :      LOAD_LEN(ARGVECTOR_BASE) WITH LEN(N_ARGS)
535  1 :              CON_LENGTH (32,INC);
536  1 :
537  1 :      /* SP := .argvector_base. */
538  1 :      /*temp6 is saved as caller's SP, temp7 points to ESSA area*/
539  1 :      /*save_macro_state( .temp7., .temp6. );*/
540  1 :
541  1 :      OFF_ALU_OUT = BIASED_LENGTH CON_LENGTH(0) OR ARGVECTOR_BASE,
542  1 :      LOAD_OFF(SP) WITH OFFSET,
543  1 :      DISABLE_AON_WRITE,
544  1 :      LONG_CALL CALL_STATE*SAVE_MACRO_STATE;
545  1 :
546  1 :      COPY(SP_TMP,ARGVECTOR_BASE)
547  1 :              CON_LENGTH (32,DEC),
548  1 :      IF LEN_LE_32 THEN GOTO ARGS_PUSHED;
549  1 :
550  1 :      /*Reserve space for args*/
551  1 :      /*Save macro state puts cur7.len in the data_trap.*/
552  1 :
```

```
553 1 :          OFF_ALU_OUT = DATA_TRAP LEFT_SHIFTED(2) PLUS SP,
554 1 :          LOAD_OFF (SP) WITH OFFSET,
555 1 :          LOAD_AON (SP) WITH AON (SP),
556 1 :          LONG_GOTO ARG_LOOP;
557 1 :
558 1 :NOT_INTRA:
559 1 :
560 1 :          COPY (CURRENT(7), CURRENT(0)),
561 1 :          LONG_CALL DESC_TO_PTR*DESC_TO_UID_PTR;
562 1 :
563 1 :          OFF_ALU_OUT = ONE LEFT_SHIFTED(7) PLUS SP_TMP,
564 1 :          LOAD_OFF (SP_TMP) WITH OFFSET,
565 1 :          LOAD_AON (SP_TMP) WITH AON(SP_TMP),
566 1 :          LOAD_LEN (SP_TMP) WITH LEN(SP_TMP), CON_LENGTH(32,DEC),
567 1 :          IF LEN_LE_32 THEN GOTO ARGS_PUSHED;
568 1 :
569 1 :ARG_LOOP:
570 1 :          PARSE_K_LOAD_EPC,
571 1 :          RESOLVE (0);
572 1 :
573 1 :ARG_LOOP_1:
574 1 :          OFF_ALU_OUT = ZERO OR CURRENT(0),
575 1 :          SOURCE (OFF_ALU_DATA) TO JPD_BUS(DATA_TRAP),
576 1 :          LOAD (ACCUMULATOR) WITH AON(CURRENT(0)),
577 1 :          CASE ON ACC_BYTE(0) MASK 0R0R ROTATE(2);
578 1 :
579 1 :/* 0 */ INDIVISIBLE,
580 1 :          OFF_ALU_OUT = ACC ZERO_HI XOR SP_AON,
581 1 :          LOAD_AON (SP_TMP) WITH AON (SP_AON),
582 1 :          IF OFF_NE_0 THEN GOTO NOT_INTRA;
583 1 :
584 1 :INTRA:
585 1 :          WRITE FROM DATA_TRAP USING DESCRIPTOR SP_TMP CON_LENGTH(32),
586 1 :          OFF_ALU_OUT = ONE LEFT_SHIFTED(7) PLUS SP_TMP,
587 1 :          LOAD_OFF (SP_TMP) WITH OFFSET,
588 1 :          LOAD_AON (SP_TMP) WITH AON(SP_TMP),
589 1 :          LOAD_LEN (SP_TMP) WITH LEN(SP_TMP), CON_LENGTH(32,DEC),
590 1 :          IF LEN_GT_32 THEN GOTO ARG_LOOP;
591 1 :
592 1 :ARGS_PUSHED:
593 1 :
594 1 :          /*Reserve space for save area */
595 1 :          OFF_ALU_OUT = ONE LEFT_SHIFTED(7) PLUS SP,
596 1 :          LOAD_OFF (SP) WITH OFFSET,
597 1 :          LOAD_AON (SP) WITH AON (SP),
598 1 :          GOTO FINISH_UP;
599 1 :
600 1 :/* 1 */ OFF_ALU_OUT = DATA_TRAP XOR CON_80000000,
601 1 :          LOAD_OFF (CURRENT(0)) WITH OFFSET,
602 1 :          LOAD (ACCUMULATOR) WITH OFFSET,
603 1 :          DISABLE_AON_WRITE,
604 1 :          LONG_GOTO ARG_LOOP_1;
605 1 :
606 1 :FINISH_UP:
607 1 :          /* .current_PO := PRP_AON */
608 1 :          /* set call type to full call */
609 1 :          /* join common_call_code:*/
610 1 :
611 1 :          OFF_ALU_OUT = LIT16(FULL_CALL_FLAGS) OR CON_0,
612 1 :          LOAD_OFF (CALL_TYPE) WITH OFFSET;
613 1 :
614 1 :          LOAD_AON (CURRENT_PO ) WITH AON( PRP ),
615 1 :          LONG_GOTO COMMON_CALL.*COMMON_CALL;
616 1 :
617 1 :END
618 0 :
INPUT FILE:  211.I_FILE14
OBJECT FILE: LEVEL_S_CALL.OB

LINE N :SOURCE 437 0 : BEGIN
441 1 : ENTRY LEVEL_S_CALL :
463 1 : OFF_ALU_OUT = ACC AND COMMON ( 0R0 , 4 ) ,
```

```
M 1 :    alu_in 2  alu_op 6  src_frame 2 , r_source 4 , com_ext aaa  ,
464 1 : IF OFF_NE_0 THEN GOTO NOT_INTRA_PED
 M 1 : test  6 , polarity 1   nac 4 , lit8  NOT_INTRA_PED
464 1 : ;
466 1 : CHECK_FOR_ED :
468 1 : OFF_ALU_OUT = LIT16 ( 40 ) PLUS CURRENT ( 1 ) ,
 M 1 :    alu_in 3 , 1 0 , lit16 40   alu_op 3  src_frame 0 , r_source 1  ,
469 1 : READ TO ACCUMULATOR USING OFF_ALU WITH CURRENT ( 1 )
 M 1 : mem 1   md 1   do_ctrl 1   src_frame 0 , r_source 1
470 1 : CON_LENGTH ( 8 ) , FIL ( RIGHT , ZERO )
 M 1 : len_ctrl 4    , rand 0
470 1 : ;
472 1 : OFF_ALU_OUT = ACC XOR COMMON ( aaa , 7 ) ,
 M 1 :    alu_in 2  alu_op 4  src_frame 2 , r_source 7 , com_ext aaa  ,
473 1 : IF OFF_NE_0 THEN GOTO NOT_INTRA_PED
 M 1 : test  6 , polarity 1   nac 4 , lit8  NOT_INTRA_PED
473 1 : ;
477 1 : OFF_ALU_OUT = LIT16 ( 64 ) PLUS CURRENT ( 1 ) ,
 M 1 :    alu_in 3 , 1 0 , lit16 64   alu_op 3  src_frame 0 , r_source 1  ,
478 1 : READ TO ACCUMULATOR USING OFF_ALU WITH CURRENT ( 1 )
 M 1 : mem 1   md 1   do_ctrl 1   src_frame 0 , r_source 1
479 1 : CON_LENGTH ( 32 )
 M 1 : len_ctrl 6
479 1 : ;
481 1 : OFF_ALU_OUT = ACC XOR COMMON ( 2 , 3 ) ,
 M 1 :    alu_in 2  alu_op 4  src_frame 2 , r_source 3 , com_ext 2  ,
482 1 : IF OFF_NE_0 THEN GOTO NOT_INTRA_PED
 M 1 : test  6 , polarity 1   nac 4 , lit8  NOT_INTRA_PED
482 1 : ;
486 1 : READ TO ACCUMULATOR USING CURRENT ( 1 ) CON_LENGTH ( 32 )
 M 1 : mem 1   md 1   src_frame 0 , r_source 1  len_ctrl 6
488 1 : ;
490 1 : OFF_ALU_OUT = ACC PLUS COMMON ( 2 , 0 ) ,
 M 1 :    alu_in 2  alu_op 3  src_frame 2 , r_source 0 , com_ext 2  ,
491 1 : LOAD_OFF ( CURRENT ( 0 ) ) WITH OFFSET ,
 M 1 : dest_frame 0 , r_dest 0 , r_w 1  o_in   3  ,
492 1 : LOAD_AON ( CURRENT ( 0 ) ) WITH AON ( COMMON ( 2 , 0 ) ) ,
 M 1 : dest_frame 0 , r_dest 0 , r_w 1  a_in   2 , src_frame
 M 1 : 2 , r_source 0 , com_ext 2  ,
493 1 : LONG_GOTO CALL_ENTRIES + SET_UP_NCALL
 M 1 : nac 6 , lit16  CALL_ENTRIES + SET_UP_NCALL
493 1 : ;
495 1 : NOT_INTRA_PED :
499 1 : LOAD ( ACCUMULATOR ) WITH AON ( LPL ( COMMON ( 3 , 1 ) ) )
 M 1 : a_w 1 , o_in   3 , src_frame 2 , r_source 1 , com_ext
 M 1 : 3 , ipd_ctrl 6
499 1 : ;
502 1 : OFF_ALU_OUT = ACC AND COMMON ( aaa , 3 ) ,
 M 1 :    alu_in 2  alu_op 6  src_frame 2 , r_source 3 , com_ext aaa  ,
503 1 : LOAD ( ACCUMULATOR ) WITH OFFSET
 M 1 : a_w 1 , o_in   3
503 1 : ;
505 1 : OFF_ALU_OUT = ACC LEFT_SHIFTED ( 5 ) OR COMMON ( aaa , 0 ) ,
 M 1 :    alu_in 2  sf 5  alu_op 5  src_frame 2 , r_source
 M 1 : 0 , com_ext aaa  ,
506 1 : LOAD_LEN ( CURRENT ( 7 ) ) WITH OFF
 M 1 : dest_frame 0 , r_dest 7 , r_w 1  l_in  3 , dh_ctrl 1
506 1 : ;
509 1 : OFF_ALU_OUT = LIT16 ( 127 ) PLUS COMMON ( 2 , 5 ) ,
 M 1 :    alu_in 3 , 1 0 , lit16 127   alu_op 3  src_frame
 M 1 : 2 , r_source 5 , com_ext 2  ,
510 1 : LOAD_OFF ( CURRENT ( 7 ) ) WITH OFFSET ,
 M 1 : dest_frame 0 , r_dest 7 , r_w 1  o_in   3  ,
511 1 : LOAD_AON ( CURRENT ( 7 ) ) WITH AON ( COMMON ( 2 , 5 ) )
 M 1 : dest_frame 0 , r_dest 7 , r_w 1  a_in   2 , src_frame
 M 1 : 2 , r_source 5 , com_ext 2
511 1 : ;
513 1 : OFF_ALU_OUT = LIT16 ( wFF80 , SIGN_EXTEND_LO_ )
513 1 : AND CURRENT ( 7 ) ,
 M 1 :    alu_in 3 , 1 0 , lit16 0FF80 dev_cmd 5   alu_op
 M 1 : 6  src_frame 0 , r_source 7  ,
514 1 : LOAD_OFF ( CURRENT ( 7 ) ) WITH OFFSET ,
 M 1 : dest_frame 0 , r_dest 7 , r_w 1  o_in   3  ,
515 1 : LOAD_AON ( CURRENT ( 7 ) ) WITH AON ( CURRENT ( 7 ) )
```

```
 1 : dest_frame 0 , r_dest 7 , r_w 1   a_in    2 , src_frame
 1 : 0 , r_source 7
515  1 : ;
517  1 : OFF_ALU_OUT = ZERO OR COMMON ( 2 , 5 ) , LOAD_AON
517  1 : ( CURRENT ( 6 ) ) WITH AON ( COMMON ( 2 , 5 ) )
 1 :   alu_in 2 , rand 2  alu_op 5  src_frame 2 , r_source
 1 : 5 , com_ext 2  , dest_frame 0 , r_dest 6 , r_w 1
 1 : a_in   2 , src_frame 2 , r_source 5 , com_ext 2
517  1 : , LOAD_LEN ( CURRENT ( 6 ) ) WITH LEN ( COMMON (
517  1 : 2 , 5 ) ) , LOAD_OFF ( CURRENT ( 6 ) )
 1 : , dest_frame 0 , r_dest 6 , r_w 1  l_in   2 , src_frame
 1 : 2 , r_source 5 , com_ext 2   , dest_frame 0 , r_dest
 1 : 6 , r_w 1  o_in
517  1 : WITH OFFSET
 1 :  3
517  1 : ;
523  1 : OFF_ALU_OUT = LIT16 ( 512 ) PLUS CURRENT ( 7 ) ,
 1 :    alu_in 3 , 1 0 , lit16 512   alu_op 3  src_frame
 1 : 0 , r_source 7 ,
524  1 : LOAD_AON ( CURRENT ( 2 ) ) WITH AON ( CURRENT ( 7 ) ) ,
 1 : dest_frame 0 , r_dest 2 , r_w 1   a_in    2 , src_frame
 1 : 0 , r_source 7 ,
525  1 : LOAD_OFF ( CURRENT ( 2 ) ) WITH OFFSET ,
 1 : dest_frame 0 , r_dest 2 , r_w 1  o_in   3 ,
526  1 : LOAD_LEN ( CURRENT ( 2 ) ) WITH LEN ( CURRENT ( 7 ) )
 1 : dest_frame 0 , r_dest 2 , r_w 1  l_in   2 , src_frame
 1 : 0 , r_source 7
526  1 : ;
531  1 : OFF_ALU_OUT = LIT16 ( 128 ) PLUS CURRENT ( 2 ) ,
 1 :    alu_in 3 , 1 0 , lit16 128   alu_op 3  src_frame
 1 : 0 , r_source 2 ,
532  1 : LOAD_OFF ( CURRENT ( 3 ) ) WITH OFFSET ,
 1 : dest_frame 0 , r_dest 3 , r_w 1  o_in   3 ,
533  1 : LOAD_AON ( CURRENT ( 3 ) ) WITH AON ( CURRENT ( 2 ) ) ,
 1 : dest_frame 0 , r_dest 3 , r_w 1   a_in   2 , src_frame
 1 : 0 , r_source 2   ,
534  1 : LOAD_LEN ( CURRENT ( 3 ) ) WITH LEN ( CURRENT ( 2 ) )
 1 : dest_frame 0 , r_dest 3 , r_w 1  l_in   2 , src_frame
 1 : 0 , r_source 2
535  1 : CON_LENGTH ( 32 , INC )
 1 : len_ctrl 11
535  1 : ;
541  1 : OFF_ALU_OUT = BIASED_LENGTH CON_LENGTH ( 0 ) OR CURRENT ( 3 ) ,
 1 :    alu_in 1  len_ctrl 0   alu_op 5  src_frame 0 , r_source 3 ,
542  1 : LOAD_OFF ( COMMON ( 2 , 5 ) ) WITH OFFSET ,
 1 : dest_frame 2 , r_dest 5 , com_ext 2 , r_w 1  o_in   3 ,
543  1 : DISABLE_AON_WRI ,
 1 : rand 8 ,
544  1 : LONG_CALL CALL_STATE + SAVE_MACRO_STAT
 1 : nac 7 , lit14  CALL_STATE + SAVE_MACRO_STAT
544  1 : ;
546  1 : OFF_ALU_OUT = ZERO OR CURRENT ( 3 ) , LOAD_AON (
546  1 : CURRENT ( 6 ) ) WITH AON ( CURRENT ( 3 ) )
 1 :    alu_in 2 , rand 2  alu_op 5  src_frame 0 , r_source
 1 : 3 , dest_frame 0 , r_dest 6 , r_w 1   a_in   2 ,
 1 : src_frame 0 , r_source 3
546  1 : , LOAD_LEN ( CURRENT ( 6 ) ) WITH LEN ( CURRENT (
546  1 : 3 ) ) , LOAD_OFF ( CURRENT ( 6 ) )
 1 : , dest_frame 0 , r_dest 6 , r_w 1  l_in   2 , src_frame
 1 : 0 , r_source 3   , dest_frame 0 , r_dest 6 , r_w 1  o_in
546  1 : WITH OFFSET
 1 :  3
547  1 : CON_LENGTH ( 32 , DEC ) ,
 1 : len_ctrl 6
548  1 : IF LEN_LE_32 THEN GOTO ARGS_PUSHED
 1 : test 9 , polarity 1   nac 4 , lit8  ARGS_PUSHED
548  1 : ;
553  1 : OFF_ALU_OUT = DATA_TRAP LEFT_SHIFTED ( 2 ) PLUS COMMON ( 2 , 5 ) ,
 1 :    jpd_ctrl 4  sf 2  alu_op 3  src_frame 2 , r_source
 1 : 5 , com_ext 2 ,
554  1 : LOAD_OFF ( COMMON ( 2 , 5 ) ) WITH OFFSET ,
 1 : dest_frame 2 , r_dest 5 , com_ext 2 , r_w 1  o_in   3 ,
555  1 : LOAD_AON ( COMMON ( 2 , 5 ) ) WITH AON ( COMMON ( 2 , 5 ) ) ,
 1 : dest_frame 2 , r_dest 5 , com_ext 2 , r_w 1   a_in
 1 :   2 , src_frame 2 , r_source 5 , com_ext 2
```

```
556 1 : LONG_GOTO ARG_LOOP
  M 1 : nac 6 , lit14  ARG_LOOP
556 1 : ;
558 1 : NOT_INTRA :
560 1 : OFF_ALU_OUT = ZERO OR CURRENT ( 0 ) , LOAD_AON (
560 1 : CURRENT ( 7 ) ) WITH AON ( CURRENT ( 0 ) )
  M 1 :    alu_in 2 , rand 2  alu_op 5  src_frame 0 , r_source
  M 1 : 0 , dest_frame 0 , r_dest 7 , r_w 1  a_in   2 ,
  M 1 : src_frame 0 , r_source 0
560 1 : , LOAD_LEN ( CURRENT ( 7 ) ) WITH LEN ( CURRENT (
560 1 : 0 ) ) , LOAD_OFF ( CURRENT ( 7 ) )
  M 1 : , dest_frame 0 , r_dest 7 , r_w 1  l_in   2 , src_frame
  M 1 : 0 , r_source 0    , dest_frame 0 , r_dest 7 , r_w 1  o_in
560 1 : WITH OFFSET ,
  M 1 :   3 ,
561 1 : LONG_CALL DESC_TO_PTR * DESC_TO_UID_PTR
  M 1 : nac 7 , lit14  DESC_TO_PTR * DESC_TO_UID_PTR
561 1 : ;
563 1 : OFF_ALU_OUT = ONE LEFT_SHIFTED ( 7 ) PLUS CURRENT ( 6 ) ,
  M 1 :    alu_in 2 , rand 3  sf 7  alu_op 3  src_frame 0 , r_source 6 ,
564 1 : LOAD_OFF ( CURRENT ( 6 ) ) WITH OFFSET ,
  M 1 : dest_frame 0 , r_dest 6 , r_w 1  o_in   3 ,
565 1 : LOAD_AON ( CURRENT ( 6 ) ) WITH AON ( CURRENT ( 6 ) ) ,
  M 1 : dest_frame 0 , r_dest 6 , r_w 1  a_in   2 , src_frame
  M 1 : 0 , r_source 6   ,
566 1 : LOAD_LEN ( CURRENT ( 6 ) ) WITH LEN ( CURRENT ( 6
566 1 : ) ) , CON_LENGTH ( 32 , DEC )
  M 1 : dest_frame 0 , r_dest 6 , r_w 1  l_in   2 , src_frame
  M 1 : 0 , r_source 6   , len_ctrl 6
566 1 : ;
567 1 : IF LEN_LE_32 THEN GOTO ARGS_PUSHED
  M 1 : test 9 , polarity 1   nac 4 , lit8  ARGS_PUSHED
567 1 : ;
569 1 : ARG_LOOP :
570 1 : PARSE_K_LOAD_EP ,
  M 1 : dev_cmd 121 , nb_ctrl 1 ,
571 1 : RESOLVE ( 0 )
  M 1 : mem 0 , nac 0 , snap 4 , dest_frame 0 , r_dest 0
  M 1 : , r_w 1  , nb_ctrl 1 , l_in 1 , o_in 1 , a_in 1 , a_w 1
571 1 : ;
573 1 : ARG_LOOP_1 :
574 1 : OFF_ALU_OUT = ZERO OR CURRENT ( 0 ) ,
  M 1 :    alu_in 2 , rand 2  alu_op 5  src_frame 0 , r_source 0 ,
575 1 : SOURCE ( OFF_ALU_DATA ) TO IPD_BUS ( DATA_TRAP ) ,
  M 1 : jpd_ctrl 7    dev_cmd 28 ,
576 1 : LOAD ( ACCUMULATOR ) WITH AON ( CURRENT ( 0 ) ) ,
  M 1 : a_w 1 , o_in   2 , src_frame 0 , r_source 0 ,
577 1 : CASE ON ACC_BYTE ( 0 ) MASK GROUP ROTATE ( 2 )
  M 1 : nac 3   src 0    mask  group sc 5
577 1 : ;
579 1 : INDIVISIBLE ,
  M 1 : rand 15 ,
580 1 : OFF_ALU_OUT = ACC_ZERO_HI AND COMMON ( 2 , 7 ) ,
  M 1 :    alu_in 2  dev_cmd 3  alu_op 4  src_frame 2 , r_source
  M 1 : 7 , com_ext 2 ,
581 1 : LOAD_AON ( CURRENT ( 6 ) ) WITH AON ( COMMON ( 2 , 7 ) ) ,
  M 1 : dest_frame 0 , r_dest 6 , r_w 1  a_in   2 , src_frame
  M 1 : 2 , r_source 7 , com_ext 2 ,
582 1 : IF OFF_NE_0 THEN GOTO NOT_INTRA
  M 1 : test 0 , polarity 1   nac 4 , lit8  NOT_INTRA
582 1 : ;
584 1 : INTRA :
585 1 : WRITE FROM DATA_TRAP USING DESCRIPTOR CURRENT ( 6
585 1 : ) CON_LENGTH ( 32 ) ,
  M 1 : mem 4   jpd_ctrl 4   db_ctrl 0  src_frame 0 , r_source
  M 1 : 6  len_ctrl 6 ,
586 1 : OFF_ALU_OUT = ONE LEFT_SHIFTED ( 7 ) PLUS CURRENT ( 6 ) ,
  M 1 :    alu_in 2 , rand 3  sf 7  alu_op 3  src_frame 0 , r_source 6 ,
587 1 : LOAD_OFF ( CURRENT ( 6 ) ) WITH OFFSET ,
  M 1 : dest_frame 0 , r_dest 6 , r_w 1  o_in   3 ,
588 1 : LOAD_AON ( CURRENT ( 6 ) ) WITH AON ( CURRENT ( 6 ) ) ,
  M 1 : dest_frame 0 , r_dest 6 , r_w 1  a_in   2 , src_frame
  M 1 : 0 , r_source 6   ,
589 1 : LOAD_LEN ( CURRENT ( 6 ) ) WITH LEN ( CURRENT ( 6
589 1 : ) ) , CON_LENGTH ( 32 , DEC )
```

```
M 1 : dest_frame 0 , r_dest 6 , r_w 1   l_in   2 , src_frame
M 1 : 0 , r_source 6       , len_ctrl 6
589 1 : ,
590 1 : IF LEN_GT_32 THEN GOTO ARG_LOOP
  1 : test  9 , polarity 0   nac 4 , lit8  ARG_LOOP
590 1 : ;
592 1 : ARGS_PUSHED :
595 1 : OFF_ALU_OUT = ONE LEFT_SHIFTED ( 7 ) PLUS COMMON ( 2 , 5 ) ,
  1 :    alu_in 2 , rand 3  sf 7  alu_op 3  src_frame 2
  1 :  r_source 5 , com_ext 2         ,
596 1 : LOAD_OFF ( COMMON ( 2 , 5 ) ) WITH OFFSET ,
  1 : dest_frame 2 , r_dest 5 , com_ext 2 , r_w 1  o_in   3 ,
597 1 : LOAD_AOM ( COMMON ( 2 , 5 ) ) WITH AOM ( COMMON ( 2 , 5 ) ) ,
  1 : dest_frame 2 , r_dest 5 , com_ext 2 , r_w 1   a_in
  1 :   2 , src_frame 2 , r_source 5 , com_ext 2       ,
598 1 : GOTO FINISH_UP
  1 : nac 4 , lit8  FINISH_UP
599 1 : ;
600 1 : OFF_ALU_OUT = DATA_TRAP AND COMMON ( 2C2 , 3 ) ,
  1 :    jnd_ctrl 2  alu_op 4  src_frame 2 , r_source 3 , com_ext 2C2 ,
601 1 : LOAD_OFF ( CURRENT ( 0 ) ) WITH OFFSET ,
  1 : dest_frame 0 , r_dest 0 , r_w 1   o_in   3 ,
602 1 : LOAD ( ACCUMULATOR ) WITH OFFSET ,
  1 : a_w 1 , o_in    3 ,
603 1 : DISABLE_AOM_SEL ,
  1 : rand 8 ,
604 1 : LONG_GOTO ARG_LOOP_1
  1 : nac 6 , lit14 ARG_LOOP_1
604 1 : ;
606 1 : FINISH_UP :
611 1 : OFF_ALU_OUT = LIT16 ( m1 ) OR COMMON ( ARW , 0 ) ,
  1 :    alu_in 3 , 1 9 , lit16 m19  alu_op 5  src_frame
  1 :  2 , r_source 0 , com_ext 2C0 ,
612 1 : LOAD_OFF ( CURRENT ( 0 ) ) WITH OFFSET
  1 : dest_frame 0 , r_dest 4 , r_w 1   o_in   3
612 1 : ;
614 1 : LOAD_AOM ( CURRENT ( 0 ) ) WITH AOM ( COMMON ( 2 , 0 ) ) ,
  1 : dest_frame 0 , r_dest 4 , r_w 1   a_in   2 , src_frame
  1 : 2 , r_source 0 , com_ext 2    ,
615 1 : LONG_GOTO COMMON_CALL * COMMON_CALL
  1 : nac 6 , lit14 COMMON_CALL * COMMON_CALL
615 1 : ;
617 1 : END
618 0 :
618 0 :

COMPILATION COMPLETE, 28 STATEMENTS PROCESSED
DATA GENERAL F H P - FETCH MICROCODE GENERATOR, REV. 6.0 (3/16/79)
   6/5/81 AT 23:19:49

INPUT FILE:  COMMON_CALL
OBJECT FILE: COMMON_CALL.OP

LINE NC:SOURCE 1 0 :$TITLE COMMON CALL
   2 0 :$DOLLAR
   3 0 :$NO LIST
  32 1 :$INCLUDE FBOX_INCLUDES:SIGNAL
  33 1 :$NO LIST
 159 1 :$INCLUDE FBOX_INCLUDES:FRAME.DEF
 160 1 :$NO LIST
 263 1 :$INCLUDE FBOX_INCLUDES:CALL.DEF
 264 1 :$NO LIST
 307 1 :$INCLUDE FBOX_INCLUDES:COMMON_REGISTERS
 308 1 :$NO LIST
 472 1 :$INCLUDE FBOX_INCLUDES:EMPTY_DESC.DEF
 473 1 :$NO LIST
 504 1 :$LIST
 505 1 :/*************************************************/
 506 1 :/*                                               */
 507 1 :/*      COMMON_CALL                              */
 508 1 :/*                                               */
```

```
509  1 :/*       FUNCTION:  This is the common code for signals and full    */
510  1 :/*                  calls. The call target pointer is followed       */
511  1 :/*                  to the final target of the call. In doing so,    */
512  1 :/*                  all domain crossings are performed.              */
513  1 :/*                                                                   */
514  1 :/*       CALLED BY: Gone-to from LEVEL_S_CALL and INVOKE_SIGNALLER   */
515  1 :/*                                                                   */
516  1 :/*       INPUTS:    See CALL.DEF for register assignments. On        */
517  1 :/*                  entry, the arguments are already pushed onto     */
518  1 :/*                  the stack, and the ESSA is already set up.       */
519  1 :/*                                                                   */
520  1 :/*       OUTPUTS:   Exits to the called procedure. At this           */
521  1 :/*                  point, we are running in the appropriate         */
522  1 :/*                  domain, with new macrostate completely set       */
523  1 :/*                  up.                                               */
524  1 :/*                                                                   */
525  1 :/*       AUTHOR:    ECH                                               */
526  1 :/*       DATE:      10 Oct 80   (mod apre' Jan 81 TC)                 */
527  1 :/*                                                                   */
528  1 :/*****************************************************************/
529  1 :
530  1 :ENTRY COMMON_CALL:
531  1 :
532  1 :           /*
533  1C:          *     REPEAT
534  1C:          *        IF .target.ADW <> .current_PD. THEN
535  1C:          *           .current_PD. := .target.ADN;
536  1C:          *           IF .current_PD.DOE <> domain_index AND
537  1C:          *              .current_PD.DOE <> Null_Domain THEN
538  1C:          *              .call_type. := .call_type OR XDC_Out;
539  1C:          *              write_return_info();
JMMON CALL 540  1C:          *              FP := SP;
541  1C:          *              .call_type. :=
542  1C:          *                ( .call_type. OR XDC_In ) ANDNOT XDC_Out;
543  1C:          *              enter_domain();
544  1C:          *           END IF;
545  1C:          *        END IF;
546  1C:          *     WHEN .target.@ is an ED LEAVE;
547  1C:          *        .target. := .target.@;
548  1C:          *     END REPEAT;
549  1C:          *     write_return_info();
550  1C:          *     FP := SP;
551  1C:          *     PED_PTR := target.@.ped_offset;
552  1C:          *     generate_macro_state(PED_PIP);
553  1C:          *     PC := PRP + target.@.target_pc;
554  1C:          *     read_prefetch (PC);
555  1C:          *     SP := SP + initial_offset (parsed from I-stream);
556  1C:          *     next_s_op;
557  1C:          */
558  1 :
559  1 :REPEAT: LOAD( ACCUMULATOR ) WITH ADN( TARGET );
560  1 :
561  1 :         INDIVISIBLE,
562  1 :         LOAD_OFF (TEMPO) WITH ADN (CURRENT_PD);
563  1 :
564  1 :         OFF_ALU_OUT = ACC XOR TEMPO,
565  1 :         LOAD( ACCUMULATOR ) WITH OFFSET;
566  1 :
567  1 :         OFF_ALU_OUT = ACC AND CON_3FFF,
568  1 :         IF OFF_EQ_0 THEN GOTO CHECK_FOR_ED;
569  1 :
570  1 :         LONG_CALL XDOMAIN_SUPPORTARGET_DOE;
571  1 :
572  1 :         /*Note this micro CANNOT be combined with the preceding ones*/
573  1 :         LOAD_ADN (CURRENT_PD) WITH ADN( TARGET );
574  1 :
575  1 :         /* DOE of .target. PD is now in ACCUMULATOR.    */
576  1 :         OFF_ALU_OUT = ACC OR CON_0,
577  1 :         IF OFF_EQ_0 THEN GOTO CHECK_FOR_ED;
578  1 :
579  1 :         OFF_ALU_OUT = ACC XOR DOMAIN_INDEX,
580  1 :         IF OFF_EQ_0 THEN GOTO CHECK_FOR_ED;
581  1 :
```

```
582  1 :          OFF_ALU_OUT = LIT16( XDMN_OUTGOING ) OR CALL_TYPE,
583  1 :          LOAD_AON( CALL_TYPE ) WITH AON( CALL_TYPE ),
584  1 :          LOAD_OFF( CALL_TYPE ) WITH OFFSET;
585  1 :
586  1 :          /*Stage PC for stashing away, get temp7 to saved SP*/
587  1 :
588  1 :          STAGE_PC,
589  1 :          OFF_ALU_OUT = ONE LEFT_SHIFTED (7) REV_MINUS SP,
590  1 :          LOAD_OFF( TEMP7 ) WITH OFFSET,
591  1 :          LOAD_AON( TEMP7 ) WITH AON( SP ),
592  1 :          LONG_CALL CALL_STATE*WRITE_RETURN_INFO;
COMMON CALL 593  1 :
594  1 :          LOAD(FP) WITH DESCRIPTOR SP,
595  1 :          CON_LENGTH (32) FIU (RIGHT,SIGN);
596  1 :
597  1 :ENTRY CROSSOUT_RETRY:
598  1 :
599  1 :          OFF_ALU_OUT = LIT16( XDMN_INCOMING ) OR CALL_TYPE,
600  1 :          LOAD_AON( CALL_TYPE ) WITH AON( CALL_TYPE ),
601  1 :          LOAD_OFF( CALL_TYPE ) WITH OFFSET;
602  1 :
603  1 :          OFF_ALU_OUT = LIT16( GET_XDMN_OUT ) AND CALL_TYPE,
604  1 :          LOAD_AON( CALL_TYPE ) WITH AON( CALL_TYPE ),
605  1 :          LOAD_OFF( CALL_TYPE ) WITH OFFSET;
606  1 :
607  1 :          LONG_CALL XDOMAIN_SUPPORT*ENTER_DOMAIN;
608  1 :
609  1 :          /*Check for gate offset = 0. */
610  1 :
611  1 :          OFF_ALU_OUT = ZERO OR TARGET,
612  1 :          LOAD (ACCUMULATOR) WITH OFFSET,
613  1 :          LOAD_AON (TEMP7) WITH AON (TARGET),
614  1 :          IF OFF_EQ_0 THEN GOTO SIG_INV_GATE;
615  1 :
616  1 :          /*Check for gate offset = 0 mod 128. */
617  1 :
618  1 :          DISABLE_AON_WRITE,
619  1 :          OFF_ALU_OUT = ACC LEFT_SHIFTED(1) AND CON_FF,
620  1 :          LOAD_OFF (TEMP7) WITH OFFSET,
621  1 :          IF OFF_NE_0 THEN GOTO SIG_INV_GATE;
622  1 :
623  1 :          /*Check for gate limit exceeded.*/
624  1 :          /*The read is ignore protection, since there are better
625  1C:             places to flunk access checking.*/
626  1 :
627  1 :          OFF_ALU_OUT = LIT16(48) PLUS TEMP7,
628  1 :          IGNORE_PROT,
629  1 :          READ TO ACCUMULATOR USING OFF_ALU WITH TEMP7,
630  1 :             CON_LENGTH (16) FIU (RIGHT,ZERO),
631  1 :          LOAD_AON(TEMP7) WITH 0;
632  1 :
633  1 :          OFF_ALU_OUT = ACC LEFT_SHIFTED(7) MINUS TARGET,
634  1 :          IF OFF_CARRY THEN GOTO GATE_OK;
635  1 :
636  1 :SIG_INV_GATE:
637  1 :
638  1 :          SIGNAL (INVALID_GATE, TARGET, NON_RETURNABLE);
639  1 :
640  1 :GATE_OK:
641  1 :CHECK_FOR_ED:
642  1 :          OFF_ALU_OUT = LIT16( ENTRY_DESC.NR ) PLUS TARGET,
643  1 :          READ TO ACCUMULATOR USING OFF_ALU WITH TARGET
644  1 :             CON_LENGTH( 8 ), FIU( RIGHT, ZERO );
645  1 :
COMMON CALL 646  1 :          OFF_ALU_OUT = ACC XOR CON_C0,
647  1 :          LOAD (ACCUMULATOR) WITH OFFSET,
648  1 :          IF OFF_EQ_0 THEN GOTO END_REPEAT;
649  1 :
650  1 :          OFF_ALU_OUT = ACC LEFT_SHIFTED (1) XOR CON_80,
651  1 :          IF OFF_NE_0 THEN GOTO USE_TARGET;
652  1 :
```

```
553 1 :              /*Get offset to link pointer*/
554 1 :
555 1 :              OFF_ALU_OUT = ZEROS,
556 1 :              READ TO ACCUMULATOR USING DESCRIPTOR TARGET,
557 1 :              LOAD_AON (TARGET) WITH AON (TARGET),
558 1 :              LOAD_OFF (TARGET) WITH OFFSET,
559 1 :              CON_LENGTH (32);
560 1 :
561 1 :              OFF_ALU_OUT = ACC OR TARGET,
562 1 :              LOAD_OFF (TARGET) WITH OFFSET,
563 1 :              LOAD_AON (TARGET) WITH AON (TARGET);
564 1 :
565 1 :USE_TARGET:
566 1 :              COPY( TEMP7, TARGET ),
567 1 :              READ TO ACCUMULATOR USING DESCRIPTOR TARGET
568 1 :                     CON_LENGTH(32),
569 1 :              LONG_CALL PTR_TO_DESC*READ_STARTED;
570 1 :
571 1 :              COPY( TARGET, TEMP7 ),
572 1 :              GOTO REPEAT;
573 1 :
574 1 :END_REPEAT:
575 1 :
576 1 :              /*Staging PC for write return info*/
577 1 :              /*Get Temp7 pointing to the save_area */
578 1 :
579 1 :              STAGE_PC,
580 1 :              OFF_ALU_OUT = ONE LEFT_SHIFTED(7) REV_MINUS SP,
581 1 :              LOAD_OFF( TEMP7 ) WITH OFFSET,
582 1 :              LOAD_AON( TEMP7 ) WITH AON( SP ),
583 1 :              LONG_CALL CALL_STATE*WRITE_RETURN_INFO;
584 1 :
585 1 :              FLUSH_NAME_CACHE,
586 1 :              LOAD(FP) WITH DESCRIPTOR SP,
587 1 :              CON_LENGTH (32) FIU (RIGHT, SIGN);
588 1 :
589 1 :              OFF_ALU_OUT = LITIA( ENTRY_DESC.ENV_OFF ) PLUS TARGET,
590 1 :              READ TO CURRENT_7 USING OFF_ALU WITH TARGET
591 1 :                     CON_LENGTH( 32 ) FIU( LEFT, ZERO ),
592 1 :              LOAD_AON (TEMP6) WITH 0;
593 1 :
594 1 :              LOAD_AON( TEMP7 ) WITH AON( TARGET ),
595 1 :              LONG_CALL GENERATE_MACRO_STATE*GENERATE_MACRO_STATE;
596 1 :
597 1 :
598 1 :              OFF_ALU_OUT = LITIA( ENTRY_DESC.TARGET_PC ) PLUS TARGET,
599 1 :              READ TO ACCUMULATOR USING OFF_ALU WITH TARGET
700 1 :                     CON_LENGTH( 32 ) FIU( LEFT, ZERO ),
701 1 :              LOAD_AON (TEMP7) WITH 0;
702 1 :
703 1 :              OFF_ALU_OUT = ACC PLUS PRP,
704 1 :              READ_PREFETCH USING OFF_ALU WITH PRP,
705 1 :              SOURCE( OFF_ALU_DATA ) TO JPD_BUS( CURR_PC ),
706 1 :              LOAD_AON (TARGET) WITH 0;
707 1 :
708 1 :              PARSE_K_LOAD_EPC,
709 1 :              OFF_ALU_OUT = PARSER(SIGN_EXTEND) LEFT_SHIFTED(7) PLUS SP,
710 1 :              LOAD_OFF( SP ) WITH OFFSET,
711 1 :              LOAD_AON (SP) WITH AON (SP),
712 1 :              LONG_GOTO SUP_ENTRIES*NXT_S_OP;
713 1 :
714 1 :END

INPUT FILE:   211.I_FILE1A
OBJECT FILE:  COMMON_CALL.OB

LINE N :SOURCE 4 0 : BEGIN
  330 1 : ENTRY COMMON_CALL :
  359 1 : REPEAT : LOAD ( ACCUMULATOR ) WITH AON ( CURRENT ( 1 ) )
    M 1 : REPEAT : a_w 1 , n_in    2 , src_frame 0 , r_source 1
  359 1 : ;
  361 1 : INDIVISIBLE ,
    M 1 : rand 15 ,
```

```
562 1 : LOAD_OFF ( CURRENT ( 0 ) ) WITH AON ( CURRENT ( 4 ) )
  M 1 : dest_frame 0 , r_dest 0 , r_w 1   o_in   2 , src_frame
  M 1 : 0 , r_source 4
562 1 : ;
564 1 : OFF_ALU_OUT = ACC XOR CURRENT ( 0 ) ,
  M 1 :    alu_in 2   alu_op 4   src_frame 0 , r_source 0 ,
565 1 : LOAD ( ACCUMULATOR ) WITH OFFSET
  M 1 : a_w 1 , o_in    3
565 1 : ;
567 1 : OFF_ALU_OUT = ACC AND COMMON ( aBa , 4 ) ,
  M 1 :    alu_in 2   alu_op 6   src_frame 2 , r_source 4 , com_ext aBa ,
568 1 : IF OFF_EQ_0 THEN GOTO CHECK_FOR_EO
  M 1 : test  6 , polarity 0   nac 4 , lit8  CHECK_FOR_EO
568 1 : ;
570 1 : LONG_CALL XDOMAIN_SUPPORT * GET_ODE
  M 1 : nac 7 , lit14   XDOMAIN_SUPPORT * GET_ODE
570 1 : ;
573 1 : LOAD_AON ( CURRENT ( 4 ) ) WITH AON ( CURRENT ( 1 ) )
  M 1 : dest_frame 0 , r_dest 4 , r_w 1   a_in   2 , src_frame
  M 1 : 0 , r_source 1
573 1 : ;
576 1 : OFF_ALU_OUT = ACC OR COMMON ( wBa , 0 ) ,
  M 1 :    alu_in 2   alu_op 5   src_frame 2 , r_source 0 , com_ext aBa ,
577 1 : IF OFF_EQ_0 THEN GOTO CHECK_FOR_EO
  M 1 : test  6 , polarity 0   nac 4 , lit8  CHECK_FOR_ED
577 1 : ;
579 1 : OFF_ALU_OUT = ACC XOR COMMON ( 3 , 4 ) ,
  M 1 :    alu_in 2   alu_op 4   src_frame 2 , r_source 4 , com_ext 3 ,
580 1 : IF OFF_EQ_0 THEN GOTO CHECK_FOR_EO
  M 1 : test  6 , polarity 0   nac 4 , lit8  CHECK_FOR_ED
580 1 : ;
582 1 : OFF_ALU_OUT = LIT16 ( w04a ) OR CURRENT ( 4 ) ,
  M 1 :    alu_in 3 , l 0 , lit16 a04a   alu_op 5   src_frame
  M 1 : 0 , r_source 4 ,
583 1 : LOAD_AON ( CURRENT ( 4 ) ) WITH AON ( CURRENT ( 4 ) ) ,
  M 1 : dest_frame 0 , r_dest 4 , r_w 1   a_in   2 , src_frame
  M 1 : 0 , r_source 1 ,
584 1 : LOAD_OFF ( CURRENT ( 4 ) ) WITH OFFSET
  M 1 : dest_frame 0 , r_dest 4 , r_w 1   o_in   3
584 1 : ;
585 1 : STAGE_PC ,
  M 1 : nev_cmd 122 ,
586 1 : OFF_ALU_OUT = ONE_LEFT_SHIFTED ( 7 ) REV_MINUS COMMON ( 2 , 5 ) ,
  M 1 :    alu_in 2 , rand 5   st 7   alu_op 1   src_frame 2
  M 1 : , r_source 5 , com_ext 2 ,
590 1 : LOAD_OFF ( CURRENT ( 7 ) ) WITH OFFSET ,
  M 1 : dest_frame 0 , r_dest 7 , r_w 1   o_in   3 ,
591 1 : LOAD_AON ( CURRENT ( 7 ) ) WITH AON ( COMMON ( 2 , 5 ) ) ,
  M 1 : dest_frame 0 , r_dest 7 , r_w 1   a_in   2 , src_frame
  M 1 : 2 , r_source 5 , com_ext 2 ,
592 1 : LONG_CALL CALL_STATE * WRITE_RETURN_IN
  M 1 : nac 7 , lit14 CALL_STATE * WRITE_RETURN_IN
592 1 : ;
594 1 : LOAD ( COMMON ( 2 , 1 ) ) WITH DESCRIPTOR COMMON ( 2 , 5 ) ,
  M 1 : dest_frame 2 , r_dest 1 , com_ext 2 , r_w 1 , a_in
  M 1 : 1 , o_in 1 , l_in 1    db_ctrl 0   src_frame 2 ,
  M 1 : r_source 5 , com_ext 2 ,
595 1 : CON_LENGTH ( 32 ) FTO ( RIGHT , SIGN )
  M 1 : len_ctrl 6    rand 5
595 1 : ;
597 1 : ENTRY CRAWLOUT_RETRY :
599 1 : OFF_ALU_OUT = LIT16 ( a06a ) OR CURRENT ( 4 ) ,
  M 1 :    alu_in 3 , l 0 , lit16 a08a   alu_op 5   src_frame
  M 1 : 0 , r_source 4 ,
600 1 : LOAD_AON ( CURRENT ( 4 ) ) WITH AON ( CURRENT ( 4 ) ) ,
  M 1 : dest_frame 0 , r_dest 4 , r_w 1   a_in   2 , src_frame
  M 1 : 0 , r_source 4 ,
601 1 : LOAD_OFF ( CURRENT ( 4 ) ) WITH OFFSET
  M 1 : dest_frame 0 , r_dest 4 , r_w 1   o_in   3
601 1 : ;
603 1 : OFF_ALU_OUT = LIT16 ( aFBa ) AND CURRENT ( 4 ) ,
  M 1 :    alu_in 3 , l 0 , lit16 aFBa   alu_op 6   src_frame
  M 1 : 0 , r_source 4 ,
604 1 : LOAD_AON ( CURRENT ( 4 ) ) WITH AON ( CURRENT ( 4 ) ) ,
  M 1 : dest_frame 0 , r_dest 4 , r_w 1   a_in   2 , src_frame
```

```
   M 1 : 0 , r_source 4          ,
 605 1 : LOAD_OFF ( CURRENT ( 4 ) ) WITH OFFSET
   M 1 : dest_frame 0 , r_dest 4 , r_w 1  o_in    3
 605 1 : ;
 607 1 : LONG_CALL XDOMAIN_SUPPORT * ENTER_DOMAIN
   M 1 : nac 7 , lit14  XDOMAIN_SUPPORT * ENTER_DOMAIN
 607 1 : ;
 611 1 : OFF_ALU_OUT = ZERO OR CURRENT ( 1 ) ,
   M 1 :   alu_in 2 , rand 2  alu_op 5   src_frame 0 , r_source 1 ,
 612 1 : LOAD ( ACCUMULATOR ) WITH OFFSET ,
   M 1 : a_w 1 , o_in    3 ,
 613 1 : LOAD_AON ( CURRENT ( 7 ) ) WITH AON ( CURRENT ( 1 ) ) ,
   M 1 : dest_frame 0 , r_dest 7 , r_w 1  a_in   2 , src_frame
   M 1 : 0 , r_source 1      ,
 614 1 : IF OFF_EQ_0 THEN GOTO SIG_INV_GATE
   M 1 : test  6 , polarity 0   nac 4 , lit8  SIG_INV_GATE
 614 1 : ;
 618 1 : DISABLE_AON_WRI ,
   M 1 : rand 8 ,
 619 1 : OFF_ALU_OUT = ACC LEFT_SHIFTED ( 1 ) AND COMMON ( 0B0 , 3 ) ,
   M 1 :   alu_in 2  sf 1   alu_op 6  src_frame 2 , r_source
   M 1 : 3 , com_ext 0B0 ,
 620 1 : LOAD_OFF ( CURRENT ( 7 ) ) WITH OFFSET ,
   M 1 : dest_frame 0 , r_dest 7 , r_w 1  o_in    3 ,
 621 1 : IF OFF_NE_0 THEN GOTO SIG_INV_GATE
   M 1 : test  6 , polarity 1   nac 4 , lit8  SIG_INV_GATE
 621 1 : ;
 627 1 : OFF_ALU_OUT = LIT16 ( 48 ) PLUS CURRENT ( 7 ) ,
   M 1 :   alu_in 3 , 1 0 , lit16 48   alu_op 3  src_frame 0 , r_source 7 ,
 628 1 : IGNORE_PROT ,
   M 1 : dev_cmd 40 ,
 629 1 : READ TO ACCUMULATOR USING OFF_ALU WITH CURRENT ( 7 ) ,
   M 1 : mem 1   md 1   db_ctrl 1   src_frame 0 , r_source 7 ,
 630 1 : CON_LENGTH ( 16 ) FIU ( RIGHT , ZERO ) ,
   M 1 : len_ctrl 5    rand 4  ,
 631 1 : LOAD_AON ( CURRENT ( 7 ) ) WITH 0
   M 1 : dest_frame 0 , r_dest 7 , r_w 1   a_in    0
 631 1 : ;
 633 1 : OFF_ALU_OUT = ACC LEFT_SHIFTED ( 7 ) MINUS CURRENT ( 1 ) ,
   M 1 :   alu_in 2  sf 7  alu_op 2  src_frame 0 , r_source 1 ,
 634 1 : IF OFF_CARRY THEN GOTO GATE_OK
   M 1 : test  2 , polarity 1   nac 4 , lit8  GATE_OK
 634 1 : ;
 636 1 : SIG_INV_GATE :
 638 1 : INDIVISIBLE , OFF_ALU_OUT = LIT16 ( 011F0 ) OR COMMON
 638 1 : ( 0 , 2 ) , LOAD_OFF ( COMMON ( 0 , 3 ) )
   M 1 : rand 15 ,   alu_in 3 , 1 0 , lit16 011F0    alu_op
   M 1 : 5  src_frame 2 , r_source 2 , com_ext 0 , dest_frame
   M 1 : 2 , r_dest 3 , com_ext 0 , r_w 1  o_in
 638 1 : WITH OFFSET , LOAD_LEN ( COMMON ( 0 , 3 ) ) WITH
 638 1 : LITERAL ( CON_LENGTH ( 1 ) ) , LOAD_AON ( COMMON ( 0 , 3 ) )
   M 1 : 3 , dest_frame 2 , r_dest 3 , com_ext 0 , r_w 1
   M 1 : l_in  1 , len_ctrl 1    , dest_frame 2 , r_dest
   M 1 : 3 , com_ext 0 , r_w 1  a_in
 638 1 : WITH 0
   M 1 : 0
 638 1 : ; INDIVISIBLE , OFF_ALU_OUT = BIASED_LENGTH CON_LENGTH
 638 1 : ( 0 ) OR CURRENT ( 1 ) LOAD_OFF ( COMMON ( 0 , 4 ) )
   M 1 : ; rand 15 ,  alu_in 1  len_ctrl 0   alu_op 5
   M 1 : src_frame 0 , r_source 1  dest_frame 2 , r_dest 4
   M 1 : , com_ext 0 , r_w 1  o_in
 638 1 : WITH OFFSET , LOAD_AON ( COMMON ( 0 , 4 ) ) WITH
 638 1 : AON ( CURRENT ( 1 ) ) LONG_CALL INVOKE_SIGNALLE * INVOKE_SIGNALLE
   M 1 : 3 , dest_frame 2 , r_dest 4 , com_ext 0 , r_w 1
   M 1 : a_in   2 , src_frame 0 , r_source 1   nac 7 , lit14
   M 1 : INVOKE_SIGNALLE * INVOKE_SIGNALLE
 638 1 : ;
 640 1 : GATE_OK :
 641 1 : CHECK_FOR_ED :
 642 1 : OFF_ALU_OUT = LIT16 ( 40 ) PLUS CURRENT ( 1 ) ,
   M 1 :   alu_in 3 , 1 0 , lit16 40   alu_op 3  src_frame 0 , r_source 1 ,
 643 1 : READ TO ACCUMULATOR USING OFF_ALU WITH CURRENT ( 1 )
   M 1 : mem 1   md 1   db_ctrl 1   src_frame 0 , r_source 1
 644 1 : CON_LENGTH ( 8 ) , FIU ( RIGHT , ZERO )
   M 1 : len_ctrl 4    , rand 4
```

```
644 1 : ;
646 1 : OFF_ALU_OUT = ACC XOR COMMON ( aaa , 7 ) ,
  M 1 :    alu_in 2  alu_op 4  src_frame 2 , r_source 7 , com_ext aaa ,
647 1 : LOAD ( ACCUMULATOR ) WITH OFFSET ,
  M 1 : a_w 1 , o_in   3 ,
648 1 : IF OFF_EQ_0 THEN GOTO END_REPEAT
  M 1 : test  0 , polarity 0   nac 4 , lito  END_REPEAT
649 1 : ;
650 1 : OFF_ALU_OUT = ACC LEFT_SHIFTED ( 1 ) XOR COMMON ( aCa , 0 ) ,
  M 1 :    alu_in 2  sf 1  alu_op 4  src_frame 2 , r_source
  M 1 : 0 , com_ext aCa ,
651 1 : IF OFF_NE_0 THEN GOTO USE_TARGET
  M 1 : test  0 , polarity 1   nac 4 , lito  USE_TARGET
651 1 : ;
655 1 : OFF_ALU_OUT = ZEROS ,
  M 1 :    alu_op 0 ,
656 1 : READ TO ACCUMULATOR USING DESCRIPTOR CURRENT ( 1 ) ,
  M 1 : mem 1   md 1   db_ctrl 0  src_frame 0 , r_source 1 ,
657 1 : LOAD_ADN ( CURRENT ( 1 ) ) WITH ADN ( CURRENT ( 1 ) ) ,
  M 1 : dest_frame 0 , r_dest 1 , r_w 1  a_in   2 , src_frame
  M 1 : 0 , r_source 1 ,
658 1 : LOAD_OFF ( CURRENT ( 1 ) ) WITH OFFSET ,
  M 1 : dest_frame 0 , r_dest 1 , r_w 1  o_in   3 ,
658 1 : CON_LENGTH ( 32 )
  M 1 : len_ctrl 6
659 1 : ;
661 1 : OFF_ALU_OUT = ACC OR CURRENT ( 1 ) ,
  M 1 :    alu_in 2  alu_op 5  src_frame 0 , r_source 1 ,
662 1 : LOAD_OFF ( CURRENT ( 1 ) ) WITH OFFSET ,
  M 1 : dest_frame 0 , r_dest 1 , r_w 1  o_in   3 ,
663 1 : LOAD_ADN ( CURRENT ( 1 ) ) WITH ADN ( CURRENT ( 1 ) )
  M 1 : dest_frame 0 , r_dest 1 , r_w 1  a_in   2 , src_frame
  M 1 : 0 , r_source 1
663 1 : ;
665 1 : USE_TARGET :
666 1 : OFF_ALU_OUT = ZERO OR CURRENT ( 1 ) , LOAD_ADN (
666 1 : CURRENT ( 7 ) ) WITH ADN ( CURRENT ( 1 ) )
  M 1 :    alu_in 2 , rand 2  alu_op 5  src_frame 0 , r_source
  M 1 : 1 , dest_frame 0 , r_dest 7 , r_w 1  a_in   2 ,
  M 1 : src_frame 0 , r_source 1
666 1 : , LOAD_LEN ( CURRENT ( 7 ) ) WITH LEN ( CURRENT (
666 1 : 1 ) ) , LOAD_OFF ( CURRENT ( 7 ) ) WITH OFFSET
  M 1 : , dest_frame 0 , r_dest 7 , r_w 1  l_in   2 , src_frame
  M 1 : 0 , r_source 1 , dest_frame 0 , r_dest 7 , r_w 1  o_in   3
666 1 : ,
667 1 : READ TO ACCUMULATOR USING DESCRIPTOR CURRENT ( 1 )
  M 1 : mem 1   md 1   db_ctrl 0  src_frame 0 , r_source 1
668 1 : CON_LENGTH ( 32 ) ,
  M 1 : len_ctrl 6 ,
669 1 : LONG_CALL PIP_TO_DESC * READ_STARTED
  M 1 : nac 7 , lito  PIP_TO_DESC * READ_STARTED
669 1 : ;
671 1 : OFF_ALU_OUT = ZERO OR CURRENT ( 7 ) , LOAD_ADN (
671 1 : CURRENT ( 1 ) ) WITH ADN ( CURRENT ( 7 ) )
  M 1 :    alu_in 2 , rand 2  alu_op 5  src_frame 0 , r_source
  M 1 : 7 , dest_frame 0 , r_dest 1 , r_w 1  a_in   2 ,
  M 1 : src_frame 0 , r_source 7
671 1 : , LOAD_LEN ( CURRENT ( 1 ) ) WITH LEN ( CURRENT (
671 1 : 7 ) ) , LOAD_OFF ( CURRENT ( 1 ) ) WITH OFFSET
  M 1 : , dest_frame 0 , r_dest 1 , r_w 1  l_in   2 , src_frame
  M 1 : 0 , r_source 7 , dest_frame 0 , r_dest 1 , r_w 1  o_in   3
671 1 : ,
672 1 : GOTO REPEAT
  M 1 : nac 4 , lito  REPEAT
672 1 : ;
674 1 : END_REPEAT :
679 1 : STAGE_PC ,
  M 1 : dev_cmd 132 ,
680 1 : OFF_ALU_OUT = ONE LEFT_SHIFTED ( 7 ) REV_MINUS COMMON ( 2 , 5 ) ,
  M 1 :    alu_in 2 , rand 3  sf 7  alu_op 1  src_frame 2
  M 1 : , r_source 5 , com_ext 2 ,
681 1 : LOAD_OFF ( CURRENT ( 7 ) ) WITH OFFSET ,
  M 1 : dest_frame 0 , r_dest 7 , r_w 1  o_in   3 ,
682 1 : LOAD_ADN ( CURRENT ( 7 ) ) WITH ADN ( COMMON ( 2 , 5 ) ) ,
```

```
  M 1 : dest_frame 0 , r_dest 7 , r_w 1  a_in   2 , src_frame
    1 : 2 , r_source 5 , com_ext 2    ,
685 1 : LONG_CALL CALL_STATE * WRITE_RETURN_IN
  M 1 : nac 7 , lit14  CALL_STATE * WRITE_RETURN_IN
685 1 : ;
685 1 : FLUSH_NAME_CACH ,
  M 1 : dev_cmd 60 ,
686 1 : LOAD ( COMMON ( 2 , 1 ) ) WITH DESCRIPTOR COMMON ( 2 , 5 ) ,
  M 1 : dest_frame 2 , r_dest 1 , com_ext 2 , r_w 1 , a_in
  M 1 : 1 , o_in 1 , l_in 1    db_ctrl 0  src_frame 2 ,
  M 1 : r_source 5 , com_ext 2  ,
687 1 : CON_LENGTH ( 32 ) FIU ( RIGHT , SIGN )
  M 1 : len_ctrl 6    rand 5
687 1 : ;
689 1 : OFF_ALU_OUT = LIT16 ( 64 ) PLUS CURRENT ( 1 ) ,
  M 1 :    alu_in 3 , 1 0 , lit16 64   alu_op 3  src_frame 0 , r_source 1 ,
690 1 : READ TO CURRENT_7 USING OFF_ALU WITH CURRENT ( 1 )
  M 1 : mem 1   md 15   db_ctrl 1   src_frame 0 , r_source 1
691 1 : CON_LENGTH ( 32 ) FIU ( LEFT , ZERO ) ,
  M 1 : len_ctrl 6    rand 6
692 1 : LOAD_AON ( CURRENT ( 6 ) ) WITH 0
  M 1 : dest_frame 0 , r_dest 6 , r_w 1  a_in   0
692 1 : ;
694 1 : LOAD_AON ( CURRENT ( 7 ) ) WITH AON ( CURRENT ( 1 ) ) ,
  M 1 : dest_frame 0 , r_dest 7 , r_w 1  a_in   2 , src_frame
  M 1 : 0 , r_source 1   ,
695 1 : LONG_CALL GENERATE_MACRO_ * GENERATE_MACRO_
  M 1 : nac 7 , lit14  GENERATE_MACRO_ * GENERATE_MACRO_
695 1 : ;
698 1 : OFF_ALU_OUT = LIT16 ( 0 ) PLUS CURRENT ( 1 ) ,
    1 :    alu_in 3 , 1 0 , lit16 0   alu_op 3  src_frame 0 , r_source 1 ,
699 1 : READ TO ACCUMULATOR USING OFF_ALU WITH CURRENT ( 1 )
  M 1 : mem 1   md 1   db_ctrl 1   src_frame 0 , r_source 1
700 1 : CON_LENGTH ( 32 ) FIU ( LEFT , ZERO ) ,
  M 1 : len_ctrl 6    rand 6
701 1 : LOAD_AON ( CURRENT ( 7 ) ) WITH 0
  M 1 : dest_frame 0 , r_dest 7 , r_w 1  a_in   0
701 1 : ;
703 1 : OFF_ALU_OUT = ACC PLUS COMMON ( 2 , 0 ) ,
  M 1 :    alu_in 2   alu_op 3  src_frame 2 , r_source 0 , com_ext 2 ,
704 1 : READ_PREFETCH USING OFF_ALU WITH COMMON ( 2 , 0 ) ,
  M 1 : mem 7   db_ctrl 1   src_frame 2 , r_source 0 , com_ext 2 ,
705 1 : SOURCE ( OFF_ALU_DATA ) TO JPD_BUS ( CURR_PC ) ,
  M 1 : jpd_ctrl 7    dev_cmd 124   ,
706 1 : LOAD_AON ( CURRENT ( 1 ) ) WITH 0
  M 1 : dest_frame 0 , r_dest 1 , r_w 1  a_in   0
706 1 : ;
708 1 : PARSE_K_LOAD_EP ,
  M 1 : dev_cmd 121 , nb_ctrl 1 ,
709 1 : OFF_ALU_OUT = PARSER ( SIGN_EXTEND ) LEFT_SHIFTED
709 1 : ( 7 ) PLUS COMMON ( 2 , 5 ) ,
  M 1 :    alu_in 2 , nb_ctrl 1 , rand 1   sf 7  alu_op 3
  M 1 : src_frame 2 , r_source 5 , com_ext 2 ,
710 1 : LOAD_OFF ( COMMON ( 2 , 5 ) ) WITH OFFSET ,
  M 1 : dest_frame 2 , r_dest 5 , com_ext 2 , r_w 1  o_in  3 ,
711 1 : LOAD_AON ( COMMON ( 2 , 5 ) ) WITH AON ( COMMON ( 2 , 5 ) ) ,
  M 1 : dest_frame 2 , r_dest 5 , com_ext 2 , r_w 1  a_in
  M 1 : 2 , src_frame 2 , r_source 5 , com_ext 2   ,
712 1 : LONG_GOTO SOP_ENTRIES * NXT_S_OP
  M 1 : nac 6 , lit14  SOP_ENTRIES * NXT_S_OP
712 1 : ;
714 1 : END
714 0 :

COMPILATION COMPLETE, 34 STATEMENTS PROCESSED
DATA GENERAL F H P - FETCH MICROCODE GENERATOR, REV. 6.0 (3/16/79)
  6/15/81 AT 11:16:45

INPUT FILE: CALL_STATE
OBJECT FILE: CALL_STATE.OB

LINE NC:SOURCE 1 0 :$DOLLAR
    2 0 :STITLE WRITE RETURN INFO
```

```
WRITE RETURN INFO
  3 0 :$PAGE
  4 0 :$NO LIST
 49 0 :$INCLUDE FROX_INCLUDES:FRAME.DEF
 50 0 :$NO LIST
153 0 :$INCLUDE FROX_INCLUDES:COMMON_REGISTERS
154 0 :$NO LIST
318 0 :$LIST
319 0 :
320 0 :/*****************************************************************/
321 0 :/*                                                               */
322 0 :/*      WRITE RETURN INFO                                        */
323 0 :/*                                                               */
324 0 :/*      Write return info is called write return information     */
325 0 :/*      into the save area of a domain frame. The optimized      */
326 0 :/*      form of NCALL does this inline.                          */
327 0 :/*                                                               */
328 0 :/*      INPUTS: OLD_SP, FP of caller in FP reg, CPC in IPC        */
329 0 :/*              after pushing args, flags in CALL_TYPE.           */
330 0 :/*              PREV(7) points to the area where the return       */
331 0 :/*              info should be stored; it is the caller's         */
332 0 :/*              responsibility to allocate space here.            */
333 0 :/*                                                               */
334 0 :/*                                                               */
335 0 :/*      OUTPUT: Writes FP to PREV7+0,                             */
336 0 :/*              writes old_sp to PREV7+32,                        */
337 0 :/*              writes CPC to PREV7+64,                           */
338 0 :/*              writes flags to PREV7+96,                         */
339 0 :/*                                                               */
340 0 :/*      CALLS: none                                              */
341 0 :/*                                                               */
342 0 :/*      CALLED BY: COMMON_CALL code                              */
343 0 :/*                                                               */
344 0 :/*      AUTHOR: TC                                               */
345 0 :/*      DATE: 10/8/80                                            */
346 0 :/*                                                               */
347 0 :/*****************************************************************/
348 0 :BEGIN
349 1 :        MACRO CALL_TYPE        MEANS    PREVIOUS(4)    ENDMAC;
350 1 :        MACRO OLD_SP           MEANS    PREVIOUS(2)    ENDMAC;
351 1 :        MACRO CALLERS_PC       MEANS    PREVIOUS(5)    ENDMAC;
352 1 :        MACRO WHERE            MEANS    PREVIOUS(7)    ENDMAC;
353 1 :
354 1 :ENTRY WRITE_RETURN_INFO:
355 1 :
356 1 :        /*General Flags are expected in CALL_TYPE*/
357 1 :        /*Set up len WHERE with 11 for control flags.*/
358 1 :
359 1 :        OFF_ALU_OUT = ZERO OR CALL_TYPE,
360 1 :        SOURCE (OFF_ALU_DATA)) TO JPD_BUS (DATA_TRAP);
361 1 :
362 1 :        DISABLE_ALU_WRITE,
363 1 :        LOAD_LEN (WHERE) WITH LITERAL (LIT_LENGTH(3));
364 1 :
365 1 :        OFF_ALU_OUT = LIT16( FRAME.FLAGS) PLUS WHERE,
366 1 :        WRITE FROM DATA_TRAP USING OFF_ALU WITH WHERE,
367 1 :            CON_LENGTH (32);
368 1 :
369 1 :        /*Write old SP*/
370 1 :
371 1 :        OFF_ALU_OUT = ZERO OR OLD_SP,
372 1 :        SOURCE (OFF_ALU_DATA) TO JPD_BUS (DATA_TRAP);
373 1 :
374 1 :        OFF_ALU_OUT = LIT16( FRAME.OLD_SP ) PLUS WHERE,
375 1 :        WRITE FROM DATA_TRAP USING OFF_ALU WITH WHERE,
376 1 :            CON_LENGTH (32);
377 1 :
378 1 :        /*Write current CPC, the CPC value is in IPC*/
379 1 :
380 1 :        OFF_ALU_OUT = LIT16( FRAME.OLD_PC ) PLUS WHERE,
381 1 :        WRITE FROM IPC USING OFF_ALU WITH WHERE,
382 1 :            CON_LENGTH (32);
383 1 :
384 1 :        /*Set control flags up with 11 binary.*/
```

WRITE RETURN INFO

```
385 1 :
386 1 :          OFF_ALU_OUT = LIT16(FRAME.CTRL_FLAGS) PLUS WHERE,
387 1 :          WRITE FROM LENGTH (WHERE) USING OFF_ALU WITH WHERE,
388 1 :          CON_LENGTH(2) EIU (RIGHT);
389 1 :
390 1 :          /*Write old FP */
391 1 :          OFF_ALU_OUT = ZERO OR FP,
392 1 :          SOURCE (OFF_ALU_DATA) TO JPU_BUS (DATA_TRAP);
393 1 :
394 1 :          OFF_ALU_OUT = ZERO PLUS WHERE,
395 1 :          WRITE FROM DATA_TRAP USING OFF_ALU WITH WHERE,
396 1 :              CON_LENGTH (32),
397 1 :          RETURN;
398 1 :
399 1 :END   /*WRITE_RETURN_INFO*/
400 0 :
401 0 :$TITLE SAVE MACRO STATE
402 0 :$PAGE
```

SAVE MACRO STATE

```
403 0 :
404 0 :$NO LIST
444 0 :$INCLUDE FROX_INCLUDES:MACROS
445 0 :$NO LIST
471 0 :$LIST
472 0 :/*******************************************************/
473 0 :/*                                                     */
474 0 :/*       SAVE_MACRO_STATE                              */
475 0 :/*                                                     */
476 0 :/*       FUNCTION:       Saves current macrostate on the domain */
477 0 :/*                       stack during a full (non-neighborhood) */
478 0 :/*                       call.  The saved state forms a new    */
479 0 :/*                       Extended State Save Area (ESSA).  In  */
480 0 :/*                       addition, if the call is a signal, the */
481 0 :/*                       signal-dependent state is written to  */
482 0 :/*                       the secure stack marker generated by  */
483 0 :/*                       the signal.                           */
484 0 :/*                                                     */
485 0 :/*                       Macro state is: NI_PTR         */
486 0 :/*                                      Callers_SP      */
487 0 :/*                                      DIALECT         */
488 0 :/*                                      PED_PTR         */
489 0 :/*                                      SUP             */
490 0 :/*                                      PBP             */
491 0 :/*                                      Callers_Target  */
492 0 :/*                                      (saved for debugger) */
493 0 :/*                                                     */
494 0 :/*       INPUTS:         PREVIOUS(7) points to the area where */
495 0 :/*                       state should be saved. PREVIOUS(6) */
496 0 :/*                       contains the value which should be */
497 0 :/*                       written as CALLERS_SP. PREV(1) has */
498 0 :/*                       the caller's target.    All other */
499 0 :/*                       saved state is available in common */
500 0 :/*                       registers.                          */
501 0 :/*                                                     */
502 0 :/*       OUTPUTS:        None.  A new ESSA is written.        */
503 0 :/*                                                     */
504 0 :/*       AUTHOR:         ECH                                  */
505 0 :/*                                                     */
506 0 :/*       DATE:           21 Oct 80                            */
507 0 :/*                       mod: 2 Dec mod: 14 Jan 81 (TC)       */
508 0 :/*******************************************************/
509 0 :
510 0 :BEGIN
511 1 :          MACRO CALLERS_TARGET    MEANS   PREVIOUS(1)     ENDMAC;
512 1 :          MACRO CALLERS_SP        MEANS   PREVIOUS(6)     ENDMAC;
513 1 :          MACRO WHERE             MEANS   PREVIOUS(7)     ENDMAC;
514 1 :
515 1 :          MACRO TEMP6             MEANS   CURRENT(6)      ENDMAC;
516 1 :          MACRO TEMP7             MEANS   CURRENT(7)      ENDMAC;
517 1 :          MACRO TEMP7_            MEANS   CURRENT_7       ENDMAC;
518 1 :
519 1 :ENTRY SAVE_MACRO_STATE:
```

SAVE MACRO STATE

```
520 1 :
521 1 :            /*
522 1C:             * ^where^ points to the ESSA.  Start writing to it.
523 1C:             * First will be structure and version id.
524 1C:             */
525 1 :
526 1 :            OFF_ALU_OUT = LIT16( ESSA.STRUCT_VERSION ) OR CON_0,
527 1 :            SOURCE( OFF_ALU_DATA ) TO JPD_BUS( DATA_TRAP );
528 1 :
529 1 :            OFF_ALU_OUT = LIT16( ESSA.STRUCTURE ) PLUS WHERE,
530 1 :            WRITE FROM DATA_TRAP USING OFF_ALU WITH WHERE
531 1 :                CON_LENGTH( 16 );
532 1 :
533 1 :            /*
534 1C:             * And then SIP, saved as dialect value only.
535 1C:             */
536 1 :
537 1 :            OFF_ALU_OUT = ZERO OR DIALECT_COPY,
538 1 :            SOURCE (OFF_ALU_DATA) TO JPD_BUS (DATA_TRAP);
539 1 :
540 1 :            OFF_ALU_OUT = LIT16( ESSA.DIALECT) PLUS WHERE,
541 1 :            WRITE FROM DATA_TRAP USING OFF_ALU WITH WHERE,
542 1 :            CON_LENGTH (8);
543 1 :
544 1 :            /*
545 1C:             * And the callers SP.
546 1C:             */
547 1 :
548 1 :            OFF_ALU_OUT = ZERO OR CALLERS_SP,
549 1 :            SOURCE( OFF_ALU_DATA ) TO JPD_BUS( DATA_TRAP );
550 1 :
551 1 :            OFF_ALU_OUT = LIT16( ESSA.CALLERS_SP ) PLUS WHERE,
552 1 :            WRITE FROM DATA_TRAP USING OFF_ALU WITH WHERE
553 1 :                CON_LENGTH( 32 ) FIU( LEFT, ZERO );
554 1 :
555 1 :            /*
556 1C:             * And the NT_PTR, offset only, UID is assumed that of PBP.
557 1C:             */
558 1 :
559 1 :            LOAD_AON (TEMP7) WITH 0,
560 1 :            OFF_ALU_OUT = ZERO OR NT_PTR,
561 1 :            SOURCE (OFF_ALU_DATA) TO JPD_BUS (DATA_TRAP);
562 1 :
563 1 :            OFF_ALU_OUT = LIT16( ESSA.NT_PTR ) PLUS WHERE,
564 1 :            WRITE FROM DATA_TRAP USING OFF_ALU WITH WHERE,
565 1 :            CON_LENGTH (32);
566 1 :
567 1 :            /*
568 1C:             * And the PFD_PTR, offset only, UID is assumed that of PBP.
569 1C:             */
570 1 :
571 1 :            LOAD_AON (TEMP7) WITH 0,
572 1 :            OFF_ALU_OUT = ZERO OR PFD_PTR,
573 1 :            SOURCE (OFF_ALU_DATA) TO JPD_BUS (DATA_TRAP);
574 1 :
575 1 :            OFF_ALU_OUT = LIT16( ESSA.PFD_PTR ) PLUS WHERE,
576 1 :            WRITE FROM DATA_TRAP USING OFF_ALU WITH WHERE,
577 1 :            CON_LENGTH (32);
578 1 :
579 1 :            /*
580 1C:             * And then SDP.
581 1C:             */
582 1 :
583 1 :            OFF_ALU_OUT = LIT16( ESSA.SDP ) PLUS WHERE,
584 1 :            LOAD_OFF( TEMP6 ) WITH OFFSET,
585 1 :            LOAD_AON( TEMP6 ) WITH AON( WHERE );
586 1 :
587 1 :            COPY( TEMP7, SDP ),
588 1 :            LONG_CALL DESC_IO_PTR*DESC_IO_UID_PTR;
589 1 :
590 1 :            /*
591 1C:             * And then PBP.
592 1C:             */
```

SAVE MACRO STATE

```
593  1 :
594  1 :          OFF_ALU_OUT = LIT16( ESSA.PBP ) PLUS WHERE,
595  1 :          LOAD_OFF (TEMP6) WITH OFFSET,
596  1 :          LOAD_AON( TEMP6 ) WITH AON( WHERE );
597  1 :
598  1 :          COPY( TEMP7, PBP ),
599  1 :          LONG_CALL DESC_TO_PTR*DESC_TO_UID_PTR;
600  1 :
601  1 :          /*
602  1C:           * write out the caller's target to make the debugger
603  1C:           * happy.
604  1C:           */
605  1 :
606  1 :          OFF_ALU_OUT = LIT16(ESSA.CALLERS_TARGET) PLUS WHERE,
607  1 :          LOAD_OFF (TEMP6) WITH OFFSET,
608  1 :          LOAD_AON (TEMP6) WITH AON (WHERE);
609  1 :
610  1 :          LOAD (TEMP7) WITH CALLERS_TARGET,
611  1 :          LONG_CALL DESC_TO_PTR*DESC_TO_UID_PTR;
612  1 :
613  1 :          LOAD_AON (TEMP6) WITH 0,
614  1 :          SOURCE (LEN (WHERE)) TO JPD_BUS (DATA_TRAP),
615  1 :          RETURN;
616  1 :
617  1 :$TITLE RESTORE MACRO STATE
618  1 :$PAGE
```

RESTORE MACRO STATE

```
619  1 :
620  1 :/****************************************************************/
621  1 :/*                                                              */
622  1 :/*      RESTORE_MACRO_STATE                                     */
623  1 :/*                                                              */
624  1 :/*      FUNCTION:       Restores current macrostate from the    */
625  1 :/*                      domain stack during non-neighborhood    */
626  1 :/*                      call. The saved state forms a new       */
627  1 :/*                      Extended State Save Area (ESSA). In     */
628  1 :/*                      addition, if the call is a signal, the  */
629  1 :/*                      signal-dependent state is read from     */
630  1 :/*                      the secure stack marker generated by    */
631  1 :/*                      the signal.                             */
632  1 :/*                                                              */
633  1 :/*                      Macro state is: NT_PTR                  */
634  1 :/*                                      PED_PTR                 */
635  1 :/*                                      SIP                    */
636  1 :/*                                      SDP                    */
637  1 :/*                                      PBP                    */
638  1 :/*                                      callers_SP              */
639  1 :/*                                                              */
640  1 :/*      INPUTS:         SP points to the top of the ESSA.       */
641  1 :/*                                                              */
642  1 :/*      OUTPUTS:        SIP, PBP, etc. get their "pre call"     */
643  1 :/*                      values.  SP gets the saved value.       */
644  1 :/*                                                              */
645  1 :/*      AUTHOR:         TC                                      */
646  1 :/*                                                              */
647  1 :/*      DATE:           27 Oct 80  mod: 14 Jan 81 (TC)          */
648  1 :/****************************************************************/
649  1 :
650  1 :          MACRO LOCAL_0           MEANS   CURRENT(0)      ENDMAC;
651  1 :          MACRO TEMP1             MEANS   CURRENT(1)      ENDMAC;
652  1 :          MACRO TEMP7_            MEANS   CURRENT_7       ENDMAC;
653  1 :
654  1 : ENTRY RESTORE_MACRO_STATE:
655  1 :
656  1 :          /*
657  1C:           * SP points to top of ESSA.
658  1C:           */
659  1 :
660  1 :          OFF_ALU_OUT = LIT16(ESSA.SIZE) REV_MINUS SP,
661  1 :          LOAD_OFF (TEMP1) WITH OFFSET,
662  1 :          LOAD_AON (TEMP1) WITH AON (SP);
663  1 :
```

RESTORE MACRO STATE

```
664 1 :          /* Use Temp as addressing base during the state restore*/
665 1 :
666 1 :          /*Restore PBP and PC.AON*/
667 1 :
668 1 :          OFF_ALU_OUT = LIT16 (ESSA.PBP) PLUS TEMP1,
669 1 :          LOAD_OFF (TEMP7) WITH OFFSET,
670 1 :          LOAD_AON (TEMP7) WITH AON (TEMP1),
671 1 :          READ TO ACCUMULATOR USING OFF_ALU WITH TEMP1,
672 1 :          CON_LENGTH (32);
673 1 :
674 1 :          LONG_CALL PTR_TO_DESC*READ_STARTED;
675 1 :
676 1 :          LOAD (PBP) WITH DESCRIPTOR TEMP7,
677 1 :          CON_LENGTH (32) FIU (RIGHT, SIGN);
678 1 :
679 1 :          OFF_ALU_OUT = ZEROS,
680 1 :          LOAD_OFF (PC.AON) WITH OFFSET,
681 1 :          LOAD_AON (PC.AON) WITH AON (PBP);
682 1 :
683 1 :          /*Restore SDP*/
684 1 :
685 1 :          OFF_ALU_OUT = LIT16 (ESSA.SDP) PLUS TEMP1,
686 1 :          LOAD_OFF (TEMP7) WITH OFFSET,
687 1 :          LOAD_AON (TEMP7) WITH AON (TEMP1),
688 1 :          READ TO ACCUMULATOR USING OFF_ALU WITH TEMP1,
689 1 :          CON_LENGTH (32);
690 1 :
691 1 :          LONG_CALL PTR_TO_DESC*READ_STARTED;
692 1 :
693 1 :          LOAD(SDP) WITH DESCRIPTOR TEMP7,
694 1 :          CON_LENGTH (32) FIU (RIGHT, SIGN);
695 1 :
696 1 :          /*Restore Dialect*/
697 1 :
698 1 :          OFF_ALU_OUT = LIT16 (ESSA.DIALECT) PLUS TEMP1,
699 1 :          READ TO TEMP7_ USING OFF_ALU WITH TEMP1,
700 1 :          CON_LENGTH (8) FIU (RIGHT, ZERO);
701 1 :
702 1 :          OFF_ALU_OUT = ZERO OR TEMP7,
703 1 :          LOAD_OFF (DIALECT_COPY) WITH OFFSET,
704 1 :          SOURCE (OFF_ALU_DATA) TO JPU_BUS (DIALECT);
705 1 :
706 1 :          /*Restore Name Table Pointer*/
707 1 :
708 1 :          OFF_ALU_OUT = LIT16 (ESSA.NT_PTR) PLUS TEMP1,
709 1 :          READ TO ACCUMULATOR USING OFF_ALU WITH TEMP1,
710 1 :          CON_LENGTH (32);
711 1 :
712 1 :          OFF_ALU_OUT = ACC OR PC.AON,
713 1 :          LOAD_OFF (NT_PTR) WITH OFFSET,
714 1 :          LOAD_AON (NT_PTR) WITH AON (PC.AON);
715 1 :
716 1 :          /*Restore PED Pointer offset, AON = 0.*/
717 1 :
718 1 :          OFF_ALU_OUT = LIT16 (ESSA.PED_PTR) PLUS TEMP1,
719 1 :          READ TO ACCUMULATOR USING OFF_ALU WITH TEMP1,
720 1 :          CON_LENGTH (32);
721 1 :
722 1 :          OFF_ALU_OUT = ACC OR ZERO_VAL,
723 1 :          LOAD_OFF (PED_PTR) WITH OFFSET;
724 1 :
725 1 :          /*
726 1C:          * Recover the caller's SP.
727 1C:          */
728 1 :          OFF_ALU_OUT = LIT16( ESSA.CALLERS_SP ) PLUS TEMP1,
729 1 :          READ TO TEMP7_ USING OFF_ALU WITH TEMP1,
730 1 :          CON_LENGTH (32),
731 1 :          LOAD_AON (TEMP1) WITH 0;
732 1 :
733 1 :          CON_LENGTH(0),
734 1 :          OFF_ALU_OUT = BIASED_LENGTH OR TEMP7,
735 1 :          LOAD_OFF( SP ) WITH OFFSET,
```

RESTORE MACRO STATE

```
736 1 :          DISABLE_AON_WRITE,
737 1 :          RETURN;
738 1 :
739 1 :END       /*MACRO_STATE*/
740 0 :
741 0 :$TITLE SAVE SIGNAL STATE
742 0 :$PAGE
```
SAVE SIGNAL STATE

```
743 0 :
744 0 :$NO LIST
818 0 :$LIST
819 0 :/****************************************************************/
820 0 :/*                                                              */
821 0 :/*       SAVE_SIGNAL_STATE                                      */
822 0 :/*                                                              */
823 0 :/*       FUNCTION:     Saves "Machine Dependent" state, which is,*/
824 0 :/*                    (by definition!) that state which must be  */
825 0 :/*                    saved by signals but not by architectural  */
826 0 :/*                    calls. It is all state which is expected   */
827 0 :/*                    to persist within, but not across, s_op    */
828 0 :/*                    boundaries.                                */
829 0 :/*                    The state is saved in the newest secure    */
830 0 :/*                    stack marker frame.                        */
831 0 :/*                                                              */
832 0 :/*                    Machine dependent state is:                */
833 0 :/*                         Opcode latch                          */
834 0 :/*                         IPC                                   */
835 0 :/*                         FPC                                   */
836 0 :/*                         MCW0                                  */
837 0 :/*                         MCW1 (but not trace enables)          */
838 0 :/*                         Fpox                                  */
839 0 :/*                    Flags are for signal microcode's use.      */
840 0 :/*                                                              */
841 0 :/*       DATE:         22 Oct 80.                               */
842 0 :/*                    mod: 28 OCT TC                            */
843 0 :/*                    mod: 2 DEC TC                             */
844 0 :/*                                                              */
845 0 :/*       AUTHOR:       FLH                                      */
846 0 :/*                                                              */
847 0 :/****************************************************************/
848 0 :
849 0 :BEGIN
850 1 :
851 1 :          MACRO   STATE_BASE    MEANS   CURRENT(0)    ENDMAC;
852 1 :          MACRO   TEMP3         MEANS   CURRENT(3)    ENDMAC;
853 1 :          MACRO   WHERE         MEANS   CURRENT(3)    ENDMAC;
854 1 :          MACRO   TEMP6         MEANS   CURRENT(6)    ENDMAC;
855 1 :          MACRO   SAVING        MEANS   CURRENT(7)    ENDMAC;
856 1 :          MACRO   TEMP7         MEANS   CURRENT(7)    ENDMAC;
857 1 :          MACRO   READ_PRIV     MEANS   IGNORE_PROT,
858 1 :                                        READ          ENDMAC;
859 1 :
860 1 :          MACRO   WRITE_PRIV    MEANS   IGNORE_PROT,
861 1 :                                        WRITE         ENDMAC;
862 1 :          MACRO   SAVED_ACC     MEANS   PREVIOUS(4)   ENDMAC;
863 1 :
864 1 :
865 1 :
866 1 :ENTRY SAVE_SIGNAL_STATE:
867 1 :
868 1 :          /*
869 1C:          * STATE_BASE := SSMP + 160, thus
870 1C:          * STATE_BASE points to bottom of the state save area.
871 1C:          * in a secure stack marker frame.
872 1C:          */
873 1 :          OFF_ALU_OUT = LIT16( STATE_SAVE_AREA ) PLUS SSMP,
874 1 :          LOAD_OFF( STATE_BASE ) WITH OFFSET,
875 1 :          LOAD_AON( STATE_BASE ) WITH AON( SSMP );
876 1 :
877 1 :          /*Save SIGNAL_FLAGS*/
878 1 :          /*Get flags into data trap*/
879 1 :          /*PUP_PACKET flag*/
```

SAVE SIGNAL STATE

```
880  1 :        LOAD_OFF(TEMP3) WITH JPD (LEN (PREVIOUS(0)));
881  1 :
882  1 :        /*NO_RETURN flag*/
883  1 :        LOAD (ACCUMULATOR) WITH JPD (LEN (PREVIOUS(4)));
884  1 :
885  1 :        OFF_ALU_OUT = ACC LEFT_SHIFTED(1) OR TEMP3,
886  1 :        SOURCE (OFF_ALU_DATA) TO JPD_BUS (DATA_TRAP);
887  1 :
888  1 :        OFF_ALU_OUT = LIT16(SS_FRAME.FLAGS) PLUS STATE_BASE,
889  1 :        WRITE_PRIV FROM DATA_TRAP USING OFF_ALU WITH STATE_BASE,
890  1 :            CON_LENGTH(32);
891  1 :
892  1 :        /*
893  1C:         * TPC
894  1C:         */
895  1 :        OFF_ALU_OUT = LIT16( SS_FRAME.TPC ) PLUS STATE_BASE,
896  1 :        WRITE_PRIV FROM TPC USING OFF_ALU WITH STATE_BASE
897  1 :            CON_LENGTH( 32 ) ;
898  1 :
899  1 :        /*
900  1C:         * EPC
901  1C:         */
902  1 :        OFF_ALU_OUT = LIT16( SS_FRAME.EPC ) PLUS STATE_BASE,
903  1 :        WRITE_PRIV FROM EPC USING OFF_ALU WITH STATE_BASE,
904  1 :            CON_LENGTH( 32 ) ;
905  1 :
906  1 :        /*
907  1C:         * MCW0
908  1C:         */
909  1 :        OFF_ALU_OUT = LIT16( SS_FRAME.MCW0 ) PLUS STATE_BASE,
910  1 :        WRITE_PRIV FROM MCW_0 USING OFF_ALU WITH STATE_BASE
911  1 :            CON_LENGTH( 32 ) ;
912  1 :
913  1 :        /*
914  1C:         * MCW1.
915  1C:         */
916  1 :        SOURCE( LEN (PREVIOUS( 1 ))) TO JPD_BUS( DATA_TRAP );
917  1 :
918  1 :        OFF_ALU_OUT = LIT16( SS_FRAME.MCW1) PLUS STATE_BASE,
919  1 :        WRITE_PRIV FROM DATA_TRAP USING OFF_ALU WITH STATE_BASE
920  1 :            CON_LENGTH( 32 ) ;
921  1 :
922  1 :        /*
923  1C:         *OPCODE LATCH
924  1C:         */
925  1 :        OFF_ALU_OUT = OPCODE OR CON_0,
926  1 :        LOAD(ACCUMULATOR) WITH OFFSET;
927  1 :
928  1 :        /*This can be combined with above micro if OPCODE macro doesn't
929  1C:          zero extend. */
930  1 :
931  1 :        OFF_ALU_OUT = ACC OR CON_0,
932  1 :        SOURCE (OFF_ALU_DATA) TO JPD_BUS (DATA_TRAP);
933  1 :
934  1 :        OFF_ALU_OUT = LIT16 (SS_FRAME.OPCODE) PLUS STATE_BASE,
935  1 :        WRITE_PRIV FROM DATA_TRAP USING OFF_ALU WITH STATE_BASE
936  1 :            CON_LENGTH (8) FIU (RIGHT);
937  1 :
938  1 :        SOURCE(LEN(EXTENDED_OPCODE)) TO JPD_BUS(DATA_TRAP);
939  1 :
940  1 :        OFF_ALU_OUT = LIT16( SS_FRAME.EXT_OPCODE) PLUS STATE_BASE,
941  1 :        WRITE_PRIV FROM DATA_TRAP USING OFF_ALU WITH STATE_BASE
942  1 :            CON_LENGTH(8) FIU(RIGHT);
943  1 :
944  1 :        SOURCE(LEN(K_SHADOW)) TO JPD_BUS(DATA_TRAP);
945  1 :
946  1 :        OFF_ALU_OUT = LIT16(SS_FRAME.K_SHADOW) PLUS STATE_BASE,
947  1 :        WRITE_PRIV FROM DATA_TRAP USING OFF_ALU WITH STATE_BASE
948  1 :            CON_LENGTH(16) FIU(RIGHT);
949  1 :
950  1 :        /*
951  1C:         * And then the FBOX.
952  1C:         */
```

SAVE SIGNAL STATE

```
953 1 :          OFF_ALU_OUT = LIT16( SS_FRAME.FBOX ) PLUS STATE_BASE,
954 1 :          LOAD_OFF( TEMP7 ) WITH OFFSET,
955 1 :          LOAD_AON( TEMP7 ) WITH AON( STATE_BASE );
956 1 :
957 1 :          /*SAVE_EBOX expects monitor mask to be set*/
958 1 :
959 1 :          SET_MON_MASK,
960 1 :          LONG_CALL FBOX_STATE*SAVE_FBOX_ARCH;
961 1 :
962 1 :          /*We must clear the mask, SAVE_EBOX doesn't*/
963 1 :          CLR_MON_MASK,
964 1 :          RETURN;
965 1 :
966 1 :SPACE
967 1 :$TITLE RESTORE SIGNAL STATE
968 1 :/*******************************************************/
969 1 :/*                                                     */
970 1 :/*       RESTORE_SIGNAL_STATE                          */
971 1 :/*                                                     */
972 1 :/*       FUNCTION:        Restores "Machine Dependent" state, which is*/
973 1 :/*                       that state which must be       */
974 1 :/*                       saved by signals but not by architectural */
975 1 :/*                       calls.  It is all state which is expected */
976 1 :/*                       to persist within, but not across, s_op */
977 1 :/*                       boundaries.                   */
978 1 :/*                       The state is saved in the newest secure */
979 1 :/*                       stack marker frame.           */
980 1 :/*                                                     */
981 1 :/*                       Machine dependent state is:   */
982 1 :/*                               IPC                   */
983 1 :/*                               EPC                   */
984 1 :/*                               MCW0                  */
985 1 :/*                               MCW1                  */
986 1 :/*                               Opcode latch          */
987 1 :/*                               Fbox                  */
988 1 :/*                                                     */
989 1 :/*                                                     */
990 1 :/*       DATE:           27 Oct 80.                    */
991 1 :/*                       1  Dec                        */
992 1 :/*                                                     */
993 1 :/*       AUTHOR:         TC                            */
994 1 :/*                                                     */
995 1 :/*******************************************************/
996 1 :
997 1 :ENTRY RESTORE_SIGNAL_STATE:
998 1 :
999 1 :/*Set up state_base to point to state save area of the marker frame*/
1000 1 :
1001 1 :          OFF_ALU_OUT = LIT16(STATE_SAVE_AREA) PLUS SSMP,
1002 1 :          LOAD_OFF (STATE_BASE) WITH OFFSET,
1003 1 :          LOAD_AON (STATE_BASE) WITH AON (SSMP);
1004 1 :
1005 1 :          /*Restore E-box state*/
1006 1 :
1007 1 :          OFF_ALU_OUT = LIT16 (SS_FRAME.EBOX) PLUS STATE_BASE,
1008 1 :          LOAD_OFF (TEMP7) WITH OFFSET,
1009 1 :          LOAD_AON (TEMP7) WITH AON (STATE_BASE);
1010 1 :
1011 1 :          /*NOTE: This must be done before restoring mask state
1012 1C:             since we set and clear a mask */
1013 1 :
1014 1 :          SET_MON_MASK,
1015 1 :          LONG_CALL EBOX_STATE*REST_FBOX_ARCH;
1016 1 :
1017 1 :          CLR_MON_MASK;
1018 1 :
1019 1 :          /*Restore IPC*/
1020 1 :          /*Restore EPC*/
1021 1 :
1022 1 :          OFF_ALU_OUT = LIT16 (SS_FRAME.EPC) PLUS STATE_BASE,
1023 1 :          READ_PRIV TO ACCUMULATOR USING OFF_ALU WITH STATE_BASE,
1024 1 :          CON_LENGTH (32);
1025 1 :
```

RESTORE SIGNAL STATE

```
1026 1 :         OFF_ALU_OUT = ACC OR CON_0,
1027 1 :         SOURCE (OFF_ALU_DATA) TO JPD_BUS (CURR_PC_STAGE);
1028 1 :
1029 1 :         /*Stash CPC away since it's good*/
1030 1 :
1031 1 :         SOURCE (IPC) TO JPD_BUS (DATA_TRAP);
1032 1 :
1033 1 :         OFF_ALU_OUT = LIT16 (SS_FRAME.IPC) PLUS STATE_BASE,
1034 1 :         READ_PRIV TO ACCUMULATOR USING OFF_ALU WITH STATE_BASE,
1035 1 :         CON_LENGTH (32);
1036 1 :
1037 1 :         OFF_ALU_OUT = ACC OR CON_0,
1038 1 :         SOURCE (OFF_ALU_DATA) TO JPD_BUS (CURR_PC_STAGE);
1039 1 :
1040 1 :         /*Put CPC back and stage everything into place*/
1041 1 :
1042 1 :         SOURCE (DATA_TRAP) TO JPD_BUS (CURR_PC_STAGE);
1043 1 :
1044 1 :         /*Restore Opcode latch*/
1045 1 :
1046 1 :         OFF_ALU_OUT = LIT16 (SS_FRAME.OPCODE) PLUS STATE_BASE,
1047 1 :         READ_PRIV TO ACCUMULATOR USING OFF_ALU WITH STATE_BASE,
1048 1 :         CON_LENGTH (8) FIU (RIGHT, ZERO);
1049 1 :
1050 1 :         OFF_ALU_OUT = ACC OR CON_0,
1051 1 :         SOURCE (OFF_ALU_LS_16) TO NAME_BUS (OPCODE);
1052 1 :
1053 1 :         OFF_ALU_OUT = LIT16(SS_FRAME.EXT_OPCODE) PLUS STATE_BASE,
1054 1 :         READ_PRIV TO ACCUMULATOR USING OFF_ALU WITH STATE_BASE,
1055 1 :                 CON_LENGTH(8) FIU(RIGHT,SIGN);
1056 1 :
1057 1 :         OFF_ALU_OUT = ACC OR EXTENDED_OPCODE,
1058 1 :         LOAD_LEN(EXTENDED_OPCODE) WITH OFF;
1059 1 :
1060 1 :         OFF_ALU_OUT = LIT16(SS_FRAME.K_SHADOW) PLUS STATE_BASE,
1061 1 :         READ_PRIV TO ACCUMULATOR USING OFF_ALU WITH STATE_BASE,
1062 1 :                 CON_LENGTH(16) FIU(RIGHT,ZERO);
1063 1 :
1064 1 :         OFF_ALU_OUT = ACC OR K_SHADOW,
1065 1 :         LOAD_LEN(K_SHADOW) WITH OFF,
1066 1 :         LOAD_OFF(K_SHADOW) WITH AON(K_SHADOW),
1067 1 :         SOURCE(OFF_ALU_DATA) TO JPD_BUS(K_REG);
1068 1 :
1069 1 :         /*Restore MCW0 repeat counter*/
1070 1 :
1071 1 :         OFF_ALU_OUT = LIT16 (SS_FRAME.MCW0) PLUS STATE_BASE,
1072 1 :         READ_PRIV TO ACCUMULATOR USING OFF_ALU WITH STATE_BASE,
1073 1 :         CON_LENGTH (32);
1074 1 :
1075 1 :         OFF_ALU_OUT = ACC OR CON_0,
1076 1 :         SOURCE (OFF_ALU_DATA) TO JPD_BUS (REPEAT_CTR);
1077 1 :
1078 1 :         /*Restore signal microcode flags*/
1079 1 :
1080 1 :         OFF_ALU_OUT = LIT16(SS_FRAME.FLAGS) PLUS STATE_BASE,
1081 1 :         READ_PRIV TO ACCUMULATOR USING OFF_ALU WITH STATE_BASE,
1082 1 :         CON_LENGTH (32);
1083 1 :
1084 1 :         OFF_ALU_OUT = ACC OR CON_0,
1085 1 :         LOAD_OFF (PREVIOUS(0)) WITH OFFSET;
1086 1 :
1087 1 :         OFF_ALU_OUT = LIT16 (SS_FRAME.MCW1) PLUS STATE_BASE,
1088 1 :         READ_PRIV TO ACCUMULATOR USING OFF_ALU WITH STATE_BASE,
1089 1 :         CON_LENGTH (32),
1090 1 :         LOAD_AON (STATE_BASE) WITH 0;
1091 1 :
1092 1 :         /*Trace traps (tracing state) are not restored after signals*/
1093 1 :
1094 1 :ENTRY RESTORE_MASKS:
1095 1 :
1096 1 :         /*Restore MCW1 mask status but not trace enables.
1097 1C:         Masks are in ACC byte 2, format xAMTxxxx. Don't bother
1098 1C:         the monitor mask since it is already set correctly
1099 1C:         whenever this routine is invoked. */
```

RESTORE SIGNAL STATE

```
1100 1 :           INDIVISIBLE,
1101 1 :           CASE ON ACC_BYTE(2) MASK @10@ ROTATE (4),
1102 1 :           SET_TRACE_MASK;
1103 1 :
1104 1 :           INDIVISIBLE,
1105 1 :/*0*/      CLR_TRACE_MASK;
1106 1 :
1107 1 :/*1*/      INDIVISIBLE,
1108 1 :           CASE ON ACC_BYTE(2) MASK @40@ ROTATE (2),
1109 1 :           SET_ASYNC_MASK;
1110 1 :
1111 1 :/*0*/      INDIVISIBLE,
1112 1 :           CLR_ASYNC_MASK,
1113 1 :           RETURN;
1114 1 :
1115 1 :/*1*/      INDIVISIBLE,
1116 1 :           RETURN;
1117 1 :
1118 1 :END   /*SIGNAL STATE*/
1119 0 :
1120 0 :$TITLE PUSH SS MARKER
1121 0 :$PAGE
```
PUSH SS MARKER

```
1122 0 :
1123 0 :
1124 0 :$NO LIST
1126 0 :/*****************************************************************/
1127 0 :/*                                                               */
1128 0 :/*       SS_PUSH_MARKER                                          */
1129 0 :/*                                                               */
1130 0 :/*       FUNCTION:       SS_PUSH_MARKER pushes a marker frame onto */
1131 0 :/*                       the secure stack. This marker frame will */
1132 0 :/*                       be used to mark the secure stack for cutback */
1133 0 :/*                       during crawlout and nonlocal goto. In    */
1134 0 :/*                       addition, machine dependent state is saved */
1135 0 :/*                       in the marker frame by save_macrostate out */
1136 0 :/*                       of invoke_signaller.                     */
1137 0 :/*                                                               */
1138 0 :/*       INPUTS:         Saved FP is taken from FP.              */
1139 0 :/*                       The caller is responsible for saving the */
1140 0 :/*                       Fbox stack appropriately.                */
1141 0 :/*                                                               */
1142 0 :/*       OUTPUTS:        None.                                   */
1143 0 :/*                                                               */
1144 0 :/*       AUTHOR:         FCH                                     */
1145 0 :/*                                                               */
1146 0 :/*       DATE:           14 Oct 1980.                            */
1147 0 :/*                                                               */
1148 0 :/*****************************************************************/
1149 0 :
1150 0 :BEGIN
1151 1 :           MACRO   MARKER_BASE    MEANS  CURRENT(0)    ENDMAC;
1152 1 :
1153 1 :ENTRY SS_PUSH_MARKER:
1154 1 :           /*
1155 1C:           * .marker_base. := SSTP;
1156 1C:           */
1157 1 :           OFF_ALU_OUT = ZEPO OR SSTP,
1158 1 :           LOAD_OFF( MARKER_BASE ) WITH OFFSET,
1159 1 :           SOURCE( OFF_ALU_DATA ) TO JPD_BUS( DATA_TRAP ),
1160 1 :           LOAD_AON( MARKER_BASE ) WITH AON( SSTP );
1161 1 :
1162 1 :           /*
1163 1C:           * SSTP := SSTP + Marker_size;
1164 1C:           */
1165 1 :           INDIVISIBLE,
1166 1 :           SET_MON_MASK,
1167 1 :           OFF_ALU_OUT = LIT16( MARKER_SIZE ) PLUS SSTP,
1168 1 :           LOAD_OFF( SSTP ) WITH OFFSET,
1169 1 :           LOAD_AON (SSTP) WITH AON (SSTP);
1170 1 :
1171 1 :           /*
```

PUSH SS MARKER

```
1172 1C:        * SSMP@.next_frame_offset := .marker_base.;
1173 1C:        */
1174 1 :        OFF_ALU_OUT = LIT16( NEXT_FRAME_OFFSET ) PLUS SSMP,
1175 1 :        IGNORE_PROT,
1176 1 :        WRITE FROM DATA_TRAP USING OFF_ALU WITH SSMP
1177 1 :            CON_LENGTH( 32 );
1178 1 :
1179 1 :        /*
1180 1C:        * .marker_base.@.last_frame_offset := SSMP;
1181 1C:        */
1182 1 :        OFF_ALU_OUT = ZERO OR SSMP,
1183 1 :        SOURCE( OFF_ALU_DATA ) TO JPD_BUS( DATA_TRAP );
1184 1 :
1185 1 :        OFF_ALU_OUT = LIT16( PREVIOUS_FRAME_OFFSET ) PLUS MARKER_BASE,
1186 1 :        IGNORE_PROT,
1187 1 :        WRITE FROM DATA_TRAP USING OFF_ALU WITH MARKER_BASE
1188 1 :            CON_LENGTH( 32 ) FIU( LEFT, ZERO );
1189 1 :
1190 1 :        /*
1191 1C:        * .marker_base.@.FP_offset := FP.offset;
1192 1C:        */
1193 1 :        OFF_ALU_OUT = ZERO OR FP,
1194 1 :        SOURCE( OFF_ALU_DATA ) TO JPD_BUS( DATA_TRAP );
1195 1 :
1196 1 :        OFF_ALU_OUT = LIT16( FP_OFFSET ) PLUS MARKER_BASE,
1197 1 :        IGNORE_PROT,
1198 1 :        WRITE FROM DATA_TRAP USING OFF_ALU WITH MARKER_BASE
1199 1 :            CON_LENGTH( 32 ) FIU( LEFT, ZERO );
1200 1 :
1201 1 :        /*
1202 1C:        * .marker_base.@.num_fbox_frames := 0;
1203 1C:        */
1204 1 :        OFF_ALU_OUT = ZERO OR CON_0,
1205 1 :        SOURCE( OFF_ALU_DATA ) TO JPD_BUS( DATA_TRAP );
1206 1 :
1207 1 :        OFF_ALU_OUT = LIT16( NUM_FBOX_FRAMES ) PLUS MARKER_BASE,
1208 1 :        IGNORE_PROT,
1209 1 :        WRITE FROM DATA_TRAP USING OFF_ALU WITH MARKER_BASE
1210 1 :            CON_LENGTH( 16 ) FIU( LEFT, ZERO );
1211 1 :
1212 1 :        /*
1213 1C:        * .marker_base.@.next_frame_offset := -1;
1214 1C:        */
1215 1 :        OFF_ALU_OUT = ZERO OR CON_ALL_ONES,
1216 1 :        SOURCE( OFF_ALU_DATA ) TO JPD_BUS( DATA_TRAP );
1217 1 :
1218 1 :        OFF_ALU_OUT = LIT16( NEXT_FRAME_OFFSET ) PLUS MARKER_BASE,
1219 1 :        IGNORE_PROT,
1220 1 :        WRITE FROM DATA_TRAP USING OFF_ALU WITH MARKER_BASE
1221 1 :            CON_LENGTH( 32 ) FIU( LEFT, ZERO );
1222 1 :
1223 1 :        /*
1224 1C:        * .marker_base.@.SS_frame_type := Mark_Type;
1225 1C:        */
1226 1 :        OFF_ALU_OUT = LIT16( MARK_TYPE ) OR CON_0,
1227 1 :        SOURCE( OFF_ALU_DATA ) TO JPD_BUS( DATA_TRAP );
1228 1 :
1229 1 :        OFF_ALU_OUT = LIT16( SS_FRAME_TYPE ) PLUS MARKER_BASE,
1230 1 :        IGNORE_PROT,
1231 1 :        WRITE FROM DATA_TRAP USING OFF_ALU WITH MARKER_BASE
1232 1 :            CON_LENGTH( 8 ) FIU( RIGHT, ZERO );
1233 1 :
1234 1 :        OFF_ALU_OUT = LIT16( SS_FRAME_CURRENT_VERSION ) OR CON_0,
1235 1 :        SOURCE( OFF_ALU_DATA ) TO JPD_BUS( DATA_TRAP );
1236 1 :
1237 1 :        OFF_ALU_OUT = LIT16( SS_FRAME_VERSION ) PLUS MARKER_BASE,
1238 1 :        IGNORE_PROT,
1239 1 :        WRITE FROM DATA_TRAP USING OFF_ALU WITH MARKER_BASE
1240 1 :            CON_LENGTH( 8 ) FIU( RIGHT, ZERO );
1241 1 :
1242 1 :        /*
1243 1C:        * SSMP := .marker_base.;
1244 1C:        * RETURN;
```

```
PUSH SS MARKER
 1245 1C:            */
 1246 1 :            CLR_MON_MASK,
 1247 1 :            COPY( SSMP, MARKER_BASE ),
 1248 1 :            RETURN;
 1249 1 :
 1250 1 :END   /*PUSH MARKER FRAME*/
 1251 0 :
 1252 0 :
 1253 0 :$TITLE POP SS MARKER
 1254 0 :$PAGE
POP SS MARKER
 1255 0 :
 1256 0 :/*****************************************************************/
 1257 0 :/*                                                                */
 1258 0 :/*       SS_POP_MARKER                                            */
 1259 0 :/*                                                                */
 1260 0 :/*       FUNCTION:       Pops the most recent marker frame off    */
 1261 0 :/*                       the secure stack. The marker frame       */
 1262 0 :/*                       must be the last thing on the stack:     */
 1263 0 :/*                               SSMP + Marker_Size = SSTP        */
 1264 0 :/*                                                                */
 1265 0 :/*       INPUTS:         SSMP points to the marker frame.         */
 1266 0 :/*                                                                */
 1267 0 :/*       OUTPUTS:        None.  The frame just disappears.        */
 1268 0 :/*                                                                */
 1269 0 :/*       AUTHOR:         FCH                                      */
 1270 0 :/*                                                                */
 1271 0 :/*       DATE:           17 Oct 80                                */
 1272 0 :/*                                                                */
 1273 0 :/*****************************************************************/
 1274 0 :
 1275 0 :BEGIN
 1276 1 :
 1277 1 :        MACRO   TEMP    MEANS   CURRENT(0)      ENDMAC;
 1278 1 :
 1279 1 :ENTRY SS_POP_MARKER:
 1280 1 :
 1281 1 :        /*
 1282 1C:        * .temp. := SSMP;
 1283 1C:        * .temp.offset := SSMP@.previous_frame_offset;
 1284 1C:        * .temp.w.next_frame_offset := -1;
 1285 1C:        * SSTP := SSMP;
 1286 1C:        * SSMP := .temp.;
 1287 1C:        * RETURN;
 1288 1C:        */
 1289 1 :        SET_MON_MASK;
 1290 1 :
 1291 1 :        OFF_ALU_OUT = LIT16( PREVIOUS_FRAME_OFFSET ) PLUS SSMP,
 1292 1 :        LOAD_AON( TEMP ) WITH AON( SSMP ),
 1293 1 :        IGNORE_PROT,
 1294 1 :        READ TO ACCUMULATOR USING OFF_ALU WITH SSMP
 1295 1 :            CON_LENGTH( 32 );
 1296 1 :
 1297 1 :        DISABLE_AON_WRITE,
 1298 1 :        OFF_ALU_OUT = ACC OR CON_0,
 1299 1 :        LOAD_OFF( TEMP ) WITH OFF_SET;
 1300 1 :
 1301 1 :        OFF_ALU_OUT = ONES,
 1302 1 :        SOURCE( OFF_ALU_DATA ) TO IPD_BUS( DATA_TRAP );
 1303 1 :
 1304 1 :        OFF_ALU_OUT = LIT16( NEXT_FRAME_OFFSET ) PLUS TEMP,
 1305 1 :        IGNORE_PROT,
 1306 1 :        WRITE FROM DATA_TRAP USING OFF_ALU WITH TEMP
 1307 1 :            CON_LENGTH( 32 );
 1308 1 :
 1309 1 :        COPY( SSTP, SSMP );
 1310 1 :
 1311 1 :        CLR_MON_MASK,
 1312 1 :        COPY( SSMP, TEMP ),
 1313 1 :        RETURN;
 1314 1 :
 1315 1 :END   /*POP MARKER FRAME*/
 1316 0 :
```

```
INPUT FILE: 221.1_FILE1A
OBJECT FILE: CALL_STATE.OB

LINE N :SOURCE 348 0 : BEGIN
 354 1 : ENTRY WRITE_RETURN_IN :
 359 1 : OFF_ALU_OUT = ZERO OR PREVIOUS ( 4 ) ,
   M 1 :    alu_in 2 , rand 2  alu_op 5  src_frame 3 , r_source 4  ,
 360 1 : SOURCE ( OFF_ALU_DATA ) ) TO JPD_BUS ( DATA_TRAP )
   M 1 : jpd_ctrl 7   )  dev_cmd 28
 360 1 : ;
 362 1 : DISABLE_ADN_WR1 ,
   M 1 : rand 8 ,
 363 1 : LOAD_LEN ( PREVIOUS ( 7 ) ) WITH LITERAL ( LIT_LENGTH ( 3 ) )
   M 1 : dest_frame 3 , r_dest 7 , r_w 1  l_in  1 , len_ctrl
   M 1 : 15 , lit8 3 , nac 4 , test 15 , polarity 0
 363 1 : ;
 365 1 : OFF_ALU_OUT = LIT16 ( 96 ) PLUS PREVIOUS ( 7 ) ,
   M 1 :    alu_in 3 , 1 0 , lit16 96   alu_op 3  src_frame 3 , r_source 7 ,
 366 1 : WRITE FROM DATA_TRAP USING OFF_ALU WITH PREVIOUS ( 7 ) ,
   M 1 : mem 4   jpd_ctrl 4   db_ctrl 1   src_frame 3 , r_source 7 ,
 367 1 : CON_LENGTH ( 32 )
   M 1 : len_ctrl 6
 367 1 : ;
 371 1 : OFF_ALU_OUT = ZERO OR PREVIOUS ( 2 ) ,
   M 1 :    alu_in 2 , rand 2  alu_op 5  src_frame 3 , r_source 2 ,
 372 1 : SOURCE ( OFF_ALU_DATA ) TO JPD_BUS ( DATA_TRAP )
   M 1 : jpd_ctrl 7    dev_cmd 28
 372 1 : ;
 374 1 : OFF_ALU_OUT = LIT16 ( 32 ) PLUS PREVIOUS ( 7 ) ,
   M 1 :    alu_in 3 , 1 0 , lit16 32   alu_op 3  src_frame 3 , r_source 7 ,
 375 1 : WRITE FROM DATA_TRAP USING OFF_ALU WITH PREVIOUS ( 7 ) ,
   M 1 : mem 4   jpd_ctrl 4   db_ctrl 1   src_frame 3 , r_source 7 ,
 376 1 : CON_LENGTH ( 32 )
   M 1 : len_ctrl 6
 376 1 : ;
 380 1 : OFF_ALU_OUT = LIT16 ( 64 ) PLUS PREVIOUS ( 7 ) ,
   M 1 :    alu_in 3 , 1 0 , lit16 64   alu_op 3  src_frame 3 , r_source 7 ,
 381 1 : WRITE FROM TPC USING OFF_ALU WITH PREVIOUS ( 7 ) ,
   M 1 : mem 4   jpd_ctrl 10  db_ctrl 1   src_frame 3 , r_source 7 ,
 382 1 : CON_LENGTH ( 32 )
   M 1 : len_ctrl 6
 382 1 : ;
 386 1 : OFF_ALU_OUT = LIT16 ( 94 ) PLUS PREVIOUS ( 7 ) ,
   M 1 :    alu_in 3 , 1 0 , lit16 94   alu_op 3  src_frame 3 , r_source 7 ,
 387 1 : WRITE FROM LENGTH ( PREVIOUS ( 7 ) ) USING OFF_ALU
 387 1 : WITH PREVIOUS ( 7 ) ,
   M 1 : mem 4   jpd_ctrl 6 , src_frame 3 , r_source 7
   M 1 : db_ctrl 1   src_frame 3 , r_source 7 ,
 388 1 : CON_LENGTH ( 2 ) FIU ( RIGHT )
   M 1 : len_ctrl 2    rand 4
 388 1 : ;
 391 1 : OFF_ALU_OUT = ZERO OR COMMON ( 2 , 1 ) ,
   M 1 :    alu_in 2 , rand 2  alu_op 5  src_frame 2 , r_source
   M 1 : 1 , com_ext 2 ,
 392 1 : SOURCE ( OFF_ALU_DATA ) TO JPD_BUS ( DATA_TRAP )
   M 1 : jpd_ctrl 7    dev_cmd 28
 392 1 : ;
 394 1 : OFF_ALU_OUT = ZERO PLUS PREVIOUS ( 7 ) ,
   M 1 :    alu_in 2 , rand 2  alu_op 3  src_frame 3 , r_source 7 ,
 395 1 : WRITE FROM DATA_TRAP USING OFF_ALU WITH PREVIOUS ( 7 ) ,
   M 1 : mem 4   jpd_ctrl 4   db_ctrl 1   src_frame 3 , r_source 7 ,
 396 1 : CON_LENGTH ( 32 ) ,
   M 1 : len_ctrl 6  ,
 397 1 : RETURN
   M 1 : nac 2
 397 1 : ;
 399 1 : END
 510 0 : BEGIN
 519 1 : ENTRY SAVE_MACRO_STAT :
 526 1 : OFF_ALU_OUT = LIT16 ( #00020 ) OR COMMON ( #B@ , 0 ) ,
```

```
 M 1 :    alu_in 3 , 1 0 , lit16 a0002w   alu_op 5  src_frame
 M 1 :  2 , r_source 0 , com_ext 28a ,
527 1 : SOURCE ( OFF_ALU_DATA ) TO JPD_BUS ( DATA_TRAP )
 M 1 : jpd_ctrl 7    dev_cmd 28
527 1 : ;
529 1 : OFF_ALU_OUT = LIT16 ( 0 ) PLUS PREVIOUS ( 7 ) ,
 M 1 :    alu_in 3 , 1 0 , lit16 0   alu_op 3  src_frame 3 , r_source 7 ,
530 1 : WRITE FROM DATA_TRAP USING OFF_ALU WITH PREVIOUS ( 7 )
 M 1 : mem 4    jpd_ctrl 0   db_ctrl 1   src_frame 3 , r_source 7
531 1 : CON_LENGTH ( 16 )
 M 1 : len_ctrl 5
531 1 : ;
537 1 : OFF_ALU_OUT = ZERO OR COMMON ( 0 , 6 ) ,
 M 1 :   alu_in 2 , rand 2  alu_op 5  src_frame 2 , r_source
 M 1 : 6 , com_ext 0 ,
538 1 : SOURCE ( OFF_ALU_DATA ) TO JPD_BUS ( DATA_TRAP )
 M 1 : jpd_ctrl 7    dev_cmd 28
538 1 : ;
540 1 : OFF_ALU_OUT = LIT16 ( 16 ) PLUS PREVIOUS ( 7 ) ,
 M 1 :    alu_in 3 , 1 0 , lit16 16   alu_op 3  src_frame 3 , r_source 7 ,
541 1 : WRITE FROM DATA_TRAP USING OFF_ALU WITH PREVIOUS ( 7 ) ,
 M 1 : mem 4    jpd_ctrl 0   db_ctrl 1   src_frame 3 , r_source 7 ,
542 1 : CON_LENGTH ( 8 )
 M 1 : len_ctrl 4
542 1 : ;
548 1 : OFF_ALU_OUT = ZERO OR PREVIOUS ( 6 ) ,
 M 1 :    alu_in 2 , rand 2  alu_op 5  src_frame 3 , r_source 6 ,
549 1 : SOURCE ( OFF_ALU_DATA ) TO JPD_BUS ( DATA_TRAP )
 M 1 : jpd_ctrl 7    dev_cmd 28
549 1 : ;
551 1 : OFF_ALU_OUT = LIT16 ( 32 ) PLUS PREVIOUS ( 7 ) ,
 M 1 :    alu_in 3 , 1 0 , lit16 32   alu_op 3  src_frame 3 , r_source 7 ,
552 1 : WRITE FROM DATA_TRAP USING OFF_ALU WITH PREVIOUS ( 7 )
 M 1 : mem 4    jpd_ctrl 0   db_ctrl 1   src_frame 3 , r_source 7
553 1 : CON_LENGTH ( 32 ) FIU ( LEFT , ZERO )
 M 1 : len_ctrl 6    rand 6
553 1 : ;
559 1 : LOAD_AON ( CURRENT ( 7 ) ) WITH 0 ,
 M 1 : dest_frame 0 , r_dest 7 , r_w 1  a_in  0 ,
560 1 : OFF_ALU_OUT = ZERO OR COMMON ( 2 , 4 ) ,
 M 1 :   alu_in 2 , rand 2  alu_op 5  src_frame 2 , r_source
 M 1 : 4 , com_ext 2 ,
561 1 : SOURCE ( OFF_ALU_DATA ) TO JPD_BUS ( DATA_TRAP )
 M 1 : jpd_ctrl 7    dev_cmd 28
561 1 : ;
563 1 : OFF_ALU_OUT = LIT16 ( 64 ) PLUS PREVIOUS ( 7 ) ,
 M 1 :    alu_in 3 , 1 0 , lit16 64   alu_op 3  src_frame 3 , r_source 7 ,
564 1 : WRITE FROM DATA_TRAP USING OFF_ALU WITH PREVIOUS ( 7 ) ,
 M 1 : mem 4    jpd_ctrl 0   db_ctrl 1   src_frame 3 , r_source 7 ,
565 1 : CON_LENGTH ( 32 )
 M 1 : len_ctrl 6
565 1 : ;
571 1 : LOAD_AON ( CURRENT ( 7 ) ) WITH 0 ,
 M 1 : dest_frame 0 , r_dest 7 , r_w 1  a_in  0 ,
572 1 : OFF_ALU_OUT = ZERO OR COMMON ( 2 , 3 ) ,
 M 1 :   alu_in 2 , rand 2  alu_op 5  src_frame 2 , r_source
 M 1 : 3 , com_ext 2 ,
573 1 : SOURCE ( OFF_ALU_DATA ) TO JPD_BUS ( DATA_TRAP )
 M 1 : jpd_ctrl 7    dev_cmd 28
573 1 : ;
575 1 : OFF_ALU_OUT = LIT16 ( 96 ) PLUS PREVIOUS ( 7 ) ,
 M 1 :    alu_in 3 , 1 0 , lit16 96   alu_op 3  src_frame 3 , r_source 7 ,
576 1 : WRITE FROM DATA_TRAP USING OFF_ALU WITH PREVIOUS ( 7 ) ,
 M 1 : mem 4    jpd_ctrl 0   db_ctrl 1   src_frame 3 , r_source 7 ,
577 1 : CON_LENGTH ( 32 )
 M 1 : len_ctrl 6
577 1 : ;
583 1 : OFF_ALU_OUT = LIT16 ( 128 ) PLUS PREVIOUS ( 7 ) ,
 M 1 :    alu_in 3 , 1 0 , lit16 128   alu_op 3  src_frame
 M 1 : 3 , r_source 7 ,
584 1 : LOAD_OFF ( CURRENT ( 6 ) ) WITH OFFSET ,
 M 1 : dest_frame 0 , r_dest 6 , r_w 1  o_in  3 ,
585 1 : LOAD_AON ( CURRENT ( 6 ) ) WITH AON ( PREVIOUS ( 7 ) )
```

```
 M 1 : dest_frame 0 , r_dest 6 , r_w 1  a_in   2 , src_frame
 M 1 : 3 , r_source 7
585 1 : ;
587 1 : OFF_ALU_OUT = ZERO OR COMMON ( 2 , 2 ) , LOAD_AON
587 1 : ( CURRENT ( 7 ) ) WITH AON ( COMMON ( 2 , 2 ) )
 M 1 :    alu_in 2 , rand 2  alu_op 5  src_frame 2 , r_source
 M 1 : 2 , com_ext 2  , dest_frame 0 , r_dest 7 , r_w 1
 M 1 :  a_in   2 , src_frame 2 , r_source 2 , com_ext 2
587 1 : , LOAD_LEN ( CURRENT ( 7 ) ) WITH LEN ( COMMON (
587 1 : 2 , 2 ) ) , LOAD_OFF ( CURRENT ( 7 ) )
 M 1 : , dest_frame 0 , r_dest 7 , r_w 1  l_in   2 , src_frame
 M 1 : 2 , r_source 2 , com_ext 2   , dest_frame 0 , r_dest
 M 1 : 7 , r_w 1  o_in
587 1 : WITH OFFSET ,
 M 1 : 3 ,
588 1 : LONG_CALL DFSC_TO_PTR * DESC_TO_UID_PTR
 M 1 : nac 7 , lit14 DESC_TO_PTR * DESC_TO_UID_PTR
588 1 : ;
594 1 : OFF_ALU_OUT = LIT16 ( 256 ) PLUS PREVIOUS ( 7 ) ,
 M 1 :    alu_in 3 , 1 0 , lit16 256  alu_op 3  src_frame
 M 1 : 3 , r_source 7 ,
595 1 : LOAD_OFF ( CURRENT ( 6 ) ) WITH OFFSET ,
 M 1 : dest_frame 0 , r_dest 6 , r_w 1  o_in   3 ,
596 1 : LOAD_AON ( CURRENT ( 6 ) ) WITH AON ( PREVIOUS ( 7 ) )
 M 1 : dest_frame 0 , r_dest 6 , r_w 1  a_in   2 , src_frame
 M 1 : 3 , r_source 7
596 1 : ;
598 1 : OFF_ALU_OUT = ZERO OR COMMON ( 2 , 0 ) , LOAD_AON
598 1 : ( CURRENT ( 7 ) ) WITH AON ( COMMON ( 2 , 0 ) )
 M 1 :    alu_in 2 , rand 2  alu_op 5  src_frame 2 , r_source
 M 1 : 0 , com_ext 2  , dest_frame 0 , r_dest 7 , r_w 1
 M 1 :  a_in   2 , src_frame 2 , r_source 0 , com_ext 2
598 1 : , LOAD_LEN ( CURRENT ( 7 ) ) WITH LEN ( COMMON (
598 1 : 2 , 0 ) ) , LOAD_OFF ( CURRENT ( 7 ) )
 M 1 : , dest_frame 0 , r_dest 7 , r_w 1  l_in   2 , src_frame
 M 1 : 2 , r_source 0 , com_ext 2   , dest_frame 0 , r_dest
 M 1 : 7 , r_w 1  o_in
598 1 : WITH OFFSET ,
 M 1 : 3 ,
599 1 : LONG_CALL DFSC_TO_PTR * DESC_TO_UID_PTR
 M 1 : nac 7 , lit14 DESC_TO_PTR * DESC_TO_UID_PTR
599 1 : ;
606 1 : OFF_ALU_OUT = LIT16 ( 384 ) PLUS PREVIOUS ( 7 ) ,
 M 1 :    alu_in 3 , 1 0 , lit16 384  alu_op 3  src_frame
 M 1 : 3 , r_source 7 ,
607 1 : LOAD_OFF ( CURRENT ( 6 ) ) WITH OFFSET ,
 M 1 : dest_frame 0 , r_dest 6 , r_w 1  o_in   3 ,
608 1 : LOAD_AON ( CURRENT ( 6 ) ) WITH AON ( PREVIOUS ( 7 ) )
 M 1 : dest_frame 0 , r_dest 6 , r_w 1  a_in   2 , src_frame
 M 1 : 3 , r_source 7
608 1 : ;
610 1 : LOAD ( CURRENT ( 7 ) ) WITH PREVIOUS ( 1 ) ,
 M 1 : dest_frame 0 , r_dest 7 , r_w 1 , a_in 1 , o_in 1
 M 1 : , l_in 1    src_frame 3 , r_source 1 ,
611 1 : LONG_CALL DFSC_TO_PTR * DESC_TO_UID_PTR
 M 1 : nac 7 , lit14 DESC_TO_PTR * DESC_TO_UID_PTR
611 1 : ;
613 1 : LOAD_AON ( CURRENT ( 6 ) ) WITH 0 ,
 M 1 : dest_frame 0 , r_dest 6 , r_w 1  a_in   0 ,
614 1 : SOURCE ( LEN ( PREVIOUS ( 7 ) ) ) TO JPD_BUS ( DATA_TRAP ) ,
 M 1 : jpd_ctrl 6 , src_frame 3 , r_source 7     dev_cmd 28 ,
615 1 : RETURN
 M 1 : nac 2
615 1 : ;
654 1 : ENTRY RESTORE_MACRO_S :
660 1 : OFF_ALU_OUT = LIT16 ( 512 ) REV_MINUS COMMON ( 2 , 5 ) ,
 M 1 :    alu_in 3 , 1 0 , lit16 512  alu_op 1  src_frame
 M 1 : 2 , r_source 5 , com_ext 2 ,
661 1 : LOAD_OFF ( CURRENT ( 1 ) ) WITH OFFSET ,
 M 1 : dest_frame 0 , r_dest 1 , r_w 1  o_in   3 ,
662 1 : LOAD_AON ( CURRENT ( 1 ) ) WITH AON ( COMMON ( 2 , 5 ) )
 M 1 : dest_frame 0 , r_dest 1 , r_w 1  a_in   2 , src_frame
```

```
  M 1 :   2 , r_source 5 , com_ext 2
662 1 : ;
668 1 : UFF_ALU_OUT = LIT16 ( 256 ) PLUS CURRENT ( 1 ) ,
  M 1 :    alu_in 3 , 1 0 , lit16 256   alu_op 3  src_frame
  M 1 :  0 , r_source 1 ,
669 1 : LOAD_OFF ( CURRENT ( 7 ) ) WITH OFFSET ,
  M 1 : dest_frame 0 , r_dest 7 , r_w 1  o_in   3 ,
670 1 : LOAD_AON ( CURRENT ( 7 ) ) WITH AON ( CURRENT ( 1 ) ) ,
  M 1 : dest_frame 0 , r_dest 7 , r_w 1  a_in   2 , src_frame
  M 1 : 0 , r_source 1 ,
671 1 : READ TO ACCUMULATOR USING UFF_ALU WITH CURRENT ( 1 ) ,
  M 1 : mem 1   md 1   db_ctrl 1   src_frame 0 , r_source 1 ,
672 1 : CON_LENGTH ( 32 )
  M 1 : len_ctrl 6
672 1 : ;
674 1 : LONG_CALL PTR_TO_DESC * READ_STARTED
  M 1 : nac 7 , lit14  PTR_TO_DESC * READ_STARTED
674 1 : ;
676 1 : LOAD ( COMMON ( 2 , 0 ) ) WITH DESCRIPTOR CURRENT ( 7 ) ,
  M 1 : dest_frame 2 , r_dest 0 , com_ext 2 , r_w 1 , a_in
  M 1 : 1 , o_in 1 , l_in 1    db_ctrl 0  src_frame 0 , r_source 7 ,
677 1 : CON_LENGTH ( 32 ) FIU ( RIGHT , SIGN )
  M 1 : len_ctrl 6    rand 5
677 1 : ;
679 1 : UFF_ALU_OUT = ZEROS ,
  M 1 :    alu_op 0 ,
680 1 : LOAD_OFF ( COMMON ( 2 , 6 ) ) WITH OFFSET ,
  M 1 : dest_frame 2 , r_dest 6 , com_ext 2 , r_w 1  o_in   3 ,
681 1 : LOAD_AON ( COMMON ( 2 , 6 ) ) WITH AON ( COMMON ( 2 , 0 ) )
  M 1 : dest_frame 2 , r_dest 6 , com_ext 2 , r_w 1  a_in
  M 1 :    2 , src_frame 2 , r_source 0 , com_ext 2
681 1 : ;
685 1 : UFF_ALU_OUT = LIT16 ( 128 ) PLUS CURRENT ( 1 ) ,
  M 1 :    alu_in 3 , 1 0 , lit16 128   alu_op 3  src_frame
  M 1 : 0 , r_source 1 ,
686 1 : LOAD_OFF ( CURRENT ( 7 ) ) WITH OFFSET ,
  M 1 : dest_frame 0 , r_dest 7 , r_w 1  o_in   3 ,
687 1 : LOAD_AON ( CURRENT ( 7 ) ) WITH AON ( CURRENT ( 1 ) ) ,
  M 1 : dest_frame 0 , r_dest 7 , r_w 1  a_in   2 , src_frame
  M 1 : 0 , r_source 1 ,
688 1 : READ TO ACCUMULATOR USING UFF_ALU WITH CURRENT ( 1 ) ,
  M 1 : mem 1   md 1   db_ctrl 1   src_frame 0 , r_source 1 ,
689 1 : CON_LENGTH ( 32 )
  M 1 : len_ctrl 6
689 1 : ;
691 1 : LONG_CALL PTR_TO_DESC * READ_STARTED
  M 1 : nac 7 , lit14  PTR_TO_DESC * READ_STARTED
691 1 : ;
693 1 : LOAD ( COMMON ( 2 , 2 ) ) WITH DESCRIPTOR CURRENT ( 7 ) ,
  M 1 : dest_frame 2 , r_dest 2 , com_ext 2 , r_w 1 , a_in
  M 1 : 1 , o_in 1 , l_in 1    db_ctrl 0  src_frame 0 , r_source 7 ,
694 1 : CON_LENGTH ( 32 ) FIU ( RIGHT , SIGN )
  M 1 : len_ctrl 6    rand 5
694 1 : ;
698 1 : UFF_ALU_OUT = LIT16 ( 16 ) PLUS CURRENT ( 1 ) ,
  M 1 :    alu_in 3 , 1 0 , lit16 16   alu_op 3  src_frame 0 , r_source 1 ,
699 1 : READ TO CURRENT_7 USING UFF_ALU WITH CURRENT ( 1 ) ,
  M 1 : mem 1   md 15   db_ctrl 1   src_frame 0 , r_source 1 ,
700 1 : CON_LENGTH ( 8 ) FIU ( RIGHT , ZERO )
  M 1 : len_ctrl 4    rand 4
700 1 : ;
702 1 : UFF_ALU_OUT = ZERO OR CURRENT ( 7 ) ,
  M 1 :    alu_in 2 , rand 2  alu_op 5  src_frame 0 , r_source 7 ,
703 1 : LOAD_OFF ( COMMON ( 0 , 6 ) ) WITH OFFSET ,
  M 1 : dest_frame 2 , r_dest 6 , com_ext 0 , r_w 1  o_in   3 ,
704 1 : SOURCE ( OFF_ALU_DATA ) TO JPD_BUS ( DIALECT )
  M 1 : jpd_ctrl 7    dev_cmd 113
704 1 : ;
708 1 : UFF_ALU_OUT = LIT16 ( 64 ) PLUS CURRENT ( 1 ) ,
  M 1 :    alu_in 3 , 1 0 , lit16 64   alu_op 3  src_frame 0 , r_source 1 ,
709 1 : READ TO ACCUMULATOR USING UFF_ALU WITH CURRENT ( 1 ) ,
  M 1 : mem 1   md 1   db_ctrl 1   src_frame 0 , r_source 1 ,
```

```
710 1 : CON_LENGTH ( 32 )
  M 1 : len_ctrl 6
710 1 : ;
712 1 : OFF_ALU_OUT = ACC OR COMMON ( 2 , 6 ) ,
  M 1 :    alu_in 2  alu_op 5  src_frame 2 , r_source 6 , com_ext 2 ,
713 1 : LOAD_OFF ( COMMON ( 2 , 4 ) ) WITH OFFSET ,
  M 1 : dest_frame 2 , r_dest 4 , com_ext 2 , r_w 1  o_in  3 ,
714 1 : LOAD_AON ( COMMON ( 2 , 4 ) ) WITH AON ( COMMON ( 2 , 6 ) )
  M 1 : dest_frame 2 , r_dest 4 , com_ext 2 , r_w 1  a_in
  M 1 :    2 , src_frame 2 , r_source 6 , com_ext 2
714 1 : ;
718 1 : OFF_ALU_OUT = LIT16 ( 96 ) PLUS CURRENT ( 1 ) ,
  M 1 :    alu_in 3 , 1 0 , lit16 96  alu_op 3  src_frame 0 , r_source 1 ,
719 1 : READ TO ACCUMULATOR USING OFF_ALU WITH CURRENT ( 1 ) ,
  M 1 : mem 1   md 1   db_ctrl 1   src_frame 0 , r_source 1 ,
720 1 : CON_LENGTH ( 32 )
  M 1 : len_ctrl 6
720 1 : ;
722 1 : OFF_ALU_OUT = ACC OR COMMON ( 2 , 6 ) ,
  M 1 :    alu_in 2  alu_op 5  src_frame 2 , r_source 6 , com_ext 2 ,
723 1 : LOAD_OFF ( COMMON ( 2 , 3 ) ) WITH OFFSET
  M 1 : dest_frame 2 , r_dest 3 , com_ext 2 , r_w 1  o_in  3
723 1 : ;
726 1 : OFF_ALU_OUT = LIT16 ( 32 ) PLUS CURRENT ( 1 ) ,
  M 1 :    alu_in 3 , 1 0 , lit16 32  alu_op 3  src_frame 0 , r_source 1 ,
729 1 : READ TO CURRENT_7 USING OFF_ALU WITH CURRENT ( 1 ) ,
  M 1 : mem 1   md 15  db_ctrl 1   src_frame 0 , r_source 1 ,
730 1 : CON_LENGTH ( 32 ) ,
  M 1 : len_ctrl 6
731 1 : LOAD_AON ( CURRENT ( 1 ) ) WITH 0
  M 1 : dest_frame 0 , r_dest 1 , r_w 1  a_in  0
731 1 : ;
733 1 : CON_LENGTH ( 0 ) ,
  M 1 : len_ctrl 0
734 1 : OFF_ALU_OUT = BIASED_LENGTH OR CURRENT ( 7 ) ,
  M 1 :    alu_in 1  alu_op 5  src_frame 0 , r_source 7 ,
735 1 : LOAD_OFF ( COMMON ( 2 , 5 ) ) WITH OFFSET ,
  M 1 : dest_frame 2 , r_dest 5 , com_ext 2 , r_w 1  o_in  3 ,
736 1 : DISABLE_AON_WRI ,
  M 1 : rand 8 ,
737 1 : RETURN
  M 1 : nac 2
737 1 : ;
739 1 : END
849 0 : BEGIN
866 1 : ENTRY SAVE_SIGNAL_STA :
873 1 : OFF_ALU_OUT = LIT16 ( 160 ) PLUS COMMON ( 0 , 0 ) ,
  M 1 :    alu_in 3 , 1 0 , lit16 160  alu_op 3  src_frame
  M 1 : 2 , r_source 0 , com_ext 0 ,
874 1 : LOAD_OFF ( CURRENT ( 0 ) ) WITH OFFSET ,
  M 1 : dest_frame 0 , r_dest 0 , r_w 1  o_in  3 ,
875 1 : LOAD_AON ( CURRENT ( 0 ) ) WITH AON ( COMMON ( 0 , 0 ) )
  M 1 : dest_frame 0 , r_dest 0 , r_w 1  a_in  2 , src_frame
  M 1 : 2 , r_source 0 , com_ext 0
875 1 : ;
880 1 : LOAD_OFF ( CURRENT ( 3 ) ) WITH JPD ( LEN ( PREVIOUS ( 0 ) ) )
  M 1 : dest_frame 0 , r_dest 3 , r_w 1  o_in  3 , src_frame
  M 1 : 3 , r_source 0 , jpd_ctrl 6
880 1 : ;
883 1 : LOAD ( ACCUMULATOR ) WITH JPD ( LEN ( PREVIOUS ( 4 ) ) )
  M 1 : a_w 1 , o_in  3 , src_frame 3 , r_source 4 , jpd_ctrl 6
883 1 : ;
885 1 : OFF_ALU_OUT = ACC LEFT_SHIFTED ( 1 ) OR CURRENT ( 3 ) ,
  M 1 :    alu_in 2  sf 1  alu_op 5  src_frame 0 , r_source 3 ,
886 1 : SOURCE ( OFF_ALU_DATA ) TO JPD_BUS ( DATA_TRAP )
  M 1 : jpd_ctrl 7   dev_cmd 28
886 1 : ;
886 1 : OFF_ALU_OUT = LIT16 ( 0 ) PLUS CURRENT ( 0 ) ,
  M 1 :    alu_in 3 , 1 0 , lit16 0  alu_op 3  src_frame 0 , r_source 0 ,
889 1 : IGNORE_PROT , WRITE FROM DATA_TRAP USING OFF_ALU
889 1 : WITH CURRENT ( 0 ) ,
  M 1 : dev_cmd 40 , mem 4  jpd_ctrl 9  db_ctrl 1   src_frame
```

```
 M 1 :  0 , r_source 0 ,
890 1 : CON_LENGTH ( 32 )
 M 1 : len_ctrl 6
890 1 : ;
895 1 : OFF_ALU_OUT = LIT16 ( 32 ) PLUS CURRENT ( 0 ) ,
 M 1 :    alu_in 3 , 1 0 , lit16 32   alu_op 3  src_frame 0 , r_source 0 ,
896 1 : IGNORE_PROT , WRITE FROM TPC USING OFF_ALU WITH CURRENT ( 0 )
 M 1 : dev_cmd 40 , mem 4   jpd_ctrl 10   db_ctrl 1   src_frame
 M 1 :  0 , r_source 0
897 1 : CON_LENGTH ( 32 )
 M 1 : len_ctrl 6
897 1 : ;
902 1 : OFF_ALU_OUT = LIT16 ( 64 ) PLUS CURRENT ( 0 ) ,
 M 1 :    alu_in 3 , 1 0 , lit16 64   alu_op 3  src_frame 0 , r_source 0 ,
903 1 : IGNORE_PROT , WRITE FROM FPC USING OFF_ALU WITH CURRENT ( 0 )
 M 1 : dev_cmd 40 , mem 4   jpd_ctrl 9   db_ctrl 1   src_frame
 M 1 :  0 , r_source 0
904 1 : CON_LENGTH ( 32 )
 M 1 : len_ctrl 6
904 1 : ;
909 1 : OFF_ALU_OUT = LIT16 ( 96 ) PLUS CURRENT ( 0 ) ,
 M 1 :    alu_in 3 , 1 0 , lit16 96   alu_op 3  src_frame 0 , r_source 0 ,
910 1 : IGNORE_PROT , WRITE FROM MCW_0 USING OFF_ALU WITH CURRENT ( 0 )
 M 1 : dev_cmd 40 , mem 4   jpd_ctrl 11   db_ctrl 1   src_frame
 M 1 :  0 , r_source 0
911 1 : CON_LENGTH ( 32 )
 M 1 : len_ctrl 6
911 1 : ;
916 1 : SOURCE ( LEN ( PREVIOUS ( 1 ) ) ) TO JPD_BUS ( DATA_TRAP )
 M 1 : jpd_ctrl 6 , src_frame 3 , r_source 1   dev_cmd 28
916 1 : ;
918 1 : OFF_ALU_OUT = LIT16 ( 128 ) PLUS CURRENT ( 0 ) ,
 M 1 :    alu_in 3 , 1 0 , lit16 128   alu_op 3  src_frame
 M 1 :  0 , r_source 0 ,
919 1 : IGNORE_PROT , WRITE FROM DATA_TRAP USING OFF_ALU WITH CURRENT ( 0 )
 M 1 : dev_cmd 40 , mem 4   jpd_ctrl 4   db_ctrl 1   src_frame
 M 1 :  0 , r_source 0
920 1 : CON_LENGTH ( 32 )
 M 1 : len_ctrl 6
920 1 : ;
925 1 : OFF_ALU_OUT = OPCODE OR COMMON ( 888 , 0 ) ,
 M 1 :    alu_in 2 , nb_ctrl 3 , dev_cmd 4  alu_op 5  src_frame
 M 1 :  2 , r_source 0 , com_ext 888 ,
926 1 : LOAD ( ACCUMULATOR ) WITH OFFSET
 M 1 : a_w 1 , o_in   3
926 1 : ;
931 1 : OFF_ALU_OUT = ACC OR COMMON ( 888 , 0 ) ,
 M 1 :    alu_in 2  alu_op 5  src_frame 2 , r_source 0 , com_ext 888 ,
932 1 : SOURCE ( OFF_ALU_DATA ) TO JPD_BUS ( DATA_TRAP )
 M 1 : jpd_ctrl 7   dev_cmd 28
932 1 : ;
934 1 : OFF_ALU_OUT = LIT16 ( 160 ) PLUS CURRENT ( 0 ) ,
 M 1 :    alu_in 3 , 1 0 , lit16 160   alu_op 3  src_frame
 M 1 :  0 , r_source 0 ,
935 1 : IGNORE_PROT , WRITE FROM DATA_TRAP USING OFF_ALU WITH CURRENT ( 0 )
 M 1 : dev_cmd 40 , mem 4   jpd_ctrl 4   db_ctrl 1   src_frame
 M 1 :  0 , r_source 0
936 1 : CON_LENGTH ( 8 ) FIU ( RIGHT )
 M 1 : len_ctrl 4   rand 4
936 1 : ;
938 1 : SOURCE ( LEN ( COMMON ( 3 , 1 ) ) ) TO JPD_BUS ( DATA_TRAP )
 M 1 : jpd_ctrl 6 , src_frame 2 , r_source 1 , com_ext 3   dev_cmd 28
938 1 : ;
940 1 : OFF_ALU_OUT = LIT16 ( 168 ) PLUS CURRENT ( 0 ) ,
 M 1 :    alu_in 3 , 1 0 , lit16 168   alu_op 3  src_frame
 M 1 :  0 , r_source 0 ,
941 1 : IGNORE_PROT , WRITE FROM DATA_TRAP USING OFF_ALU WITH CURRENT ( 0 )
 M 1 : dev_cmd 40 , mem 4   jpd_ctrl 4   db_ctrl 1   src_frame
 M 1 :  0 , r_source 0
942 1 : CON_LENGTH ( 8 ) FIU ( RIGHT )
 M 1 : len_ctrl 4   rand 4
942 1 : ;
944 1 : SOURCE ( LEN ( COMMON ( 4 , 5 ) ) ) TO JPD_BUS ( DATA_TRAP )
 M 1 : jpd_ctrl 6 , src_frame 2 , r_source 5 , com_ext 4   dev_cmd 28
```

```
944  1 : ;
946  1 : OFF_ALU_OUT = LIT16 ( 176 ) PLUS CURRENT ( 0 ) ,
  M  1 :    alu_in 3 ,  1 0 , lit16 176   alu_op 3  src_frame
  M  1 : 0 , r_source 0 ,
947  1 : IGNORE_PROT , WRITE FROM DATA_TRAP USING OFF_ALU WITH CURRENT ( 0 )
  M  1 : dev_cmd 40 , mem 4   jpd_ctrl 4   db_ctrl 1   src_frame
  M  1 : 0 , r_source 0
948  1 : CON_LENGTH ( 16 ) FTU ( RIGHT )
  M  1 : len_ctrl 5    rand 4
948  1 : ;
953  1 : OFF_ALU_OUT = LIT16 ( 192 ) PLUS CURRENT ( 0 ) ,
  M  1 :    alu_in 3 , 1 0 , lit16 192   alu_op 3  src_frame
  M  1 : 0 , r_source 0 ,
954  1 : LOAD_OFF ( CURRENT ( 7 ) ) WITH OFFSET ,
  M  1 : dest_frame 0 , r_dest 7 , r_w 1   o_in   3 ,
955  1 : LOAD_AON ( CURRENT ( 7 ) ) WITH AON ( CURRENT ( 0 ) )
  M  1 : dest_frame 0 , r_dest 7 , r_w 1   a_in   2 , src_frame
  M  1 : 0 , r_source 0
955  1 : ;
959  1 : SET_MON_MASK ,
  M  1 : dev_cmd 72 ,
960  1 : LONG_CALL EBOX_STATE * SAVE_EBOX_ARCH
  M  1 : nac 7 , lit14  EBOX_STATE * SAVE_EBOX_ARCH
960  1 : ;
963  1 : CLR_MON_MASK ,
  M  1 : dev_cmd 73 ,
964  1 : RETURN
  M  1 : nac 2
964  1 : ;
997  1 : ENTRY RESTORE_SIGNAL_ :
1001 1 : OFF_ALU_OUT = LIT16 ( 160 ) PLUS COMMON ( 0 , 0 ) ,
  M  1 :    alu_in 3 , 1 0 , lit16 160   alu_op 3  src_frame
  M  1 : 2 , r_source 0 , com_ext 0 ,
1002 1 : LOAD_OFF ( CURRENT ( 0 ) ) WITH OFFSET ,
  M  1 : dest_frame 0 , r_dest 0 , r_w 1   o_in   3 ,
1003 1 : LOAD_AON ( CURRENT ( 0 ) ) WITH AON ( COMMON ( 0 , 0 ) )
  M  1 : dest_frame 0 , r_dest 0 , r_w 1   a_in   2 , src_frame
  M  1 : 2 , r_source 0 , com_ext 0
1003 1 : ;
1007 1 : OFF_ALU_OUT = LIT16 ( 192 ) PLUS CURRENT ( 0 ) ,
  M  1 :    alu_in 3 , 1 0 , lit16 192   alu_op 3  src_frame
  M  1 : 0 , r_source 0 ,
1008 1 : LOAD_OFF ( CURRENT ( 7 ) ) WITH OFFSET ,
  M  1 : dest_frame 0 , r_dest 7 , r_w 1   o_in   3 ,
1009 1 : LOAD_AON ( CURRENT ( 7 ) ) WITH AON ( CURRENT ( 0 ) )
  M  1 : dest_frame 0 , r_dest 7 , r_w 1   a_in   2 , src_frame
  M  1 : 0 , r_source 0
1009 1 : ;
1014 1 : SET_MON_MASK ,
  M  1 : dev_cmd 72 ,
1015 1 : LONG_CALL EBOX_STATE * REST_EBOX_ARCH
  M  1 : nac 7 , lit14  EBOX_STATE * REST_EBOX_ARCH
1015 1 : ;
1017 1 : CLR_MON_MASK
  M  1 : dev_cmd 73
1017 1 : ;
1022 1 : OFF_ALU_OUT = LIT16 ( 64 ) PLUS CURRENT ( 0 ) ,
  M  1 :    alu_in 3 , 1 0 , lit16 64   alu_op 3  src_frame 0 , r_source 0 ,
1023 1 : IGNORE_PROT , READ TO ACCUMULATOR USING OFF_ALU WITH
1023 1 : CURRENT ( 0 ) ,
  M  1 : dev_cmd 40 , mem 1   md 1   db_ctrl 1   src_frame
  M  1 : 0 , r_source 0 ,
1024 1 : CON_LENGTH ( 32 )
  M  1 : len_ctrl 6
1024 1 : ;
1026 1 : OFF_ALU_OUT = ACC OR COMMON ( @B@ , 0 ) ,
  M  1 :    alu_in 2  alu_op 5  src_frame 2 , r_source 0 , com_ext @B@ ,
1027 1 : SOURCE ( OFF_ALU_DATA ) TO JPD_BUS ( CURR_PC_STAGE )
  M  1 : jpd_ctrl 7    dev_cmd 123
1027 1 : ;
1031 1 : SOURCE ( TPC ) TO JPD_BUS ( DATA_TRAP )
  M  1 : jpd_ctrl 10    dev_cmd 28
1031 1 : ;
```

```
1033 1 : OFF_ALU_OUT = LIT16 ( 32 ) PLUS CURRENT ( 0 ) ,
   M 1 :   alu_in 3 , 1 0 , lit16 32    alu_op 3  src_frame 0 , r_source 0 ,
1034 1 : IGNORE_PROT , READ TO ACCUMULATOR USING OFF_ALU WITH
1034 1 : CURRENT ( 0 ) ,
   M 1 : dev_cmd 40 , mem 1    md 1    db_ctrl 1    src_frame
   M 1 :   0 , r_source 0 ,
1035 1 : CON_LENGTH ( 32 )
   M 1 : len_ctrl 6
1035 1 : ;
1037 1 : OFF_ALU_OUT = ACC OR COMMON ( aBa , 0 ) ,
   M 1 :   alu_in 2  alu_op 5  src_frame 2 , r_source 0 , com_ext aBa ,
1038 1 : SOURCE ( OFF_ALU_DATA ) TO JPD_BUS ( CURR_PC_STAGE )
   M 1 : jpd_ctrl 7    dev_cmd 123
1038 1 : ;
1042 1 : SOURCE ( DATA_TRAP ) TO JPD_BUS ( CURR_PC_STAGE )
   M 1 : jpd_ctrl 4    dev_cmd 123
1042 1 : ;
1046 1 : OFF_ALU_OUT = LIT16 ( 160 ) PLUS CURRENT ( 0 ) ,
   M 1 :   alu_in 3 , 1 0 , lit16 160   alu_op 3  src_frame
   M 1 :   0 , r_source 0 ,
1047 1 : IGNORE_PROT , READ TO ACCUMULATOR USING OFF_ALU WITH
1047 1 : CURRENT ( 0 ) ,
   M 1 : dev_cmd 40 , mem 1    md 1    db_ctrl 1    src_frame
   M 1 :   0 , r_source 0 ,
1048 1 : CON_LENGTH ( 8 ) FIU ( RIGHT , ZERO )
   M 1 : len_ctrl 4    rand 4
1048 1 : ;
1050 1 : OFF_ALU_OUT = ACC OR COMMON ( aBa , 0 ) ,
   M 1 :   alu_in 2  alu_op 5  src_frame 2 , r_source 0 , com_ext aBa ,
1051 1 : SOURCE ( OFF_ALU_LS_16 ) TO NAME_BUS ( OPCODE )
   M 1 : nb_ctrl 0    dev_cmd 115
1051 1 : ;
1053 1 : OFF_ALU_OUT = LIT16 ( 168 ) PLUS CURRENT ( 0 ) ,
   M 1 :   alu_in 3 , 1 0 , lit16 168   alu_op 3  src_frame
   M 1 :   0 , r_source 0 ,
1054 1 : IGNORE_PROT , READ TO ACCUMULATOR USING OFF_ALU WITH
1054 1 : CURRENT ( 0 ) ,
   M 1 : dev_cmd 40 , mem 1    md 1    db_ctrl 1    src_frame
   M 1 :   0 , r_source 0 ,
1055 1 : CON_LENGTH ( 8 ) FIU ( RIGHT , SIGN )
   M 1 : len_ctrl 4    rand 5
1055 1 : ;
1057 1 : OFF_ALU_OUT = ACC OR COMMON ( 3 , 1 ) ,
   M 1 :   alu_in 2  alu_op 5  src_frame 2 , r_source 1 , com_ext 3 ,
1058 1 : LOAD_LEN ( COMMON ( 3 , 1 ) ) WITH OFF
   M 1 : dest_frame 2 , r_dest 1 , com_ext 3 , r_w 1  l_in  3 , db_ctrl 1
1058 1 : ;
1060 1 : OFF_ALU_OUT = LIT16 ( 176 ) PLUS CURRENT ( 0 ) ,
   M 1 :   alu_in 3 , 1 0 , lit16 176   alu_op 3  src_frame
   M 1 :   0 , r_source 0 ,
1061 1 : IGNORE_PROT , READ TO ACCUMULATOR USING OFF_ALU WITH
1061 1 : CURRENT ( 0 ) ,
   M 1 : dev_cmd 40 , mem 1    md 1    db_ctrl 1    src_frame
   M 1 :   0 , r_source 0 ,
1062 1 : CON_LENGTH ( 16 ) FIU ( RIGHT , ZERO )
   M 1 : len_ctrl 5    rand 4
1062 1 : ;
1064 1 : OFF_ALU_OUT = ACC OR COMMON ( 4 , 5 ) ,
   M 1 :   alu_in 2  alu_op 5  src_frame 2 , r_source 5 , com_ext 4 ,
1065 1 : LOAD_LEN ( COMMON ( 4 , 5 ) ) WITH OFF ,
   M 1 : dest_frame 2 , r_dest 5 , com_ext 4 , r_w 1  l_in
   M 1 :   3 , db_ctrl 1 ,
1066 1 : LOAD_OFF ( COMMON ( 4 , 5 ) ) WITH AUN ( COMMON ( 4 , 5 ) ) ,
   M 1 : dest_frame 2 , r_dest 5 , com_ext 4 , r_w 1  o_in
   M 1 :   2 , src_frame 2 , r_source 5 , com_ext 4 ,
1067 1 : SOURCE ( OFF_ALU_DATA ) TO JPD_BUS ( K_REG )
   M 1 : jpd_ctrl 7    dev_cmd 114
1067 1 : ;
1071 1 : OFF_ALU_OUT = LIT16 ( 96 ) PLUS CURRENT ( 0 ) ,
   M 1 :   alu_in 3 , 1 0 , lit16 96    alu_op 3  src_frame 0 , r_source 0 ,
1072 1 : IGNORE_PROT , READ TO ACCUMULATOR USING OFF_ALU WITH
1072 1 : CURRENT ( 0 ) ,
```

```
    M 1 : dev_cmd 40 , mem 1   md 1   db_ctrl 1   src_frame
    M 1 : 0 , r_source 0 ,
 1073 1 : CON_LENGTH ( 32 )
    M 1 : len_ctrl 6
 1075 1 : ;
 1075 1 : OFF_ALU_OUT = ACC OR COMMON ( @R@ , 0 ) ,
    M 1 :    alu_in 2  alu_op 5  src_frame 2 , r_source 0 , com_ext @B@ ,
 1076 1 : SOURCE ( OFF_ALU_DATA ) TO JPD_BUS ( REPEAT_CTR )
    M 1 : jpd_ctrl 7   dev_cmd 101
 1076 1 : ;
 1080 1 : OFF_ALU_OUT = LIT16 ( 0 ) PLUS CURRENT ( 0 ) ,
    M 1 :    alu_in 3 , 1 0 , lit16 0   alu_op 3  src_frame 0 , r_source 0 ,
 1081 1 : IGNORE_PROT , READ TO ACCUMULATOR USING OFF_ALU WITH
 1081 1 : CURRENT ( 0 ) ,
    M 1 : dev_cmd 40 , mem 1   md 1   db_ctrl 1   src_frame
    M 1 : 0 , r_source 0 ,
 1082 1 : CON_LENGTH ( 32 )
    M 1 : len_ctrl 6
 1082 1 : ;
 1084 1 : OFF_ALU_OUT = ACC OR COMMON ( @R@ , 0 ) ,
    M 1 :    alu_in 2  alu_op 5  src_frame 2 , r_source 0 , com_ext @B@ ,
 1085 1 : LOAD_OFF ( PREVIOUS ( 0 ) ) WITH OFFSET
    M 1 : dest_frame 3 , r_dest 0 , r_w 1  o_in   3
 1085 1 : ;
 1087 1 : OFF_ALU_OUT = LIT16 ( 128 ) PLUS CURRENT ( 0 ) ,
    M 1 :    alu_in 3 , 1 0 , lit16 128  alu_op 3  src_frame
    M 1 : 0 , r_source 0 ,
 1088 1 : IGNORE_PROT , READ TO ACCUMULATOR USING OFF_ALU WITH
 1088 1 : CURRENT ( 0 ) ,
    M 1 : dev_cmd 40 , mem 1   md 1   db_ctrl 1   src_frame
    M 1 : 0 , r_source 0 ,
 1089 1 : CON_LENGTH ( 32 ) ,
    M 1 : len_ctrl 6 ,
 1090 1 : LOAD_AUN ( CURRENT ( 0 ) ) WITH 0
    M 1 : dest_frame 0 , r_dest 0 , r_w 1  a_in   0
 1090 1 : ;
 1094 1 : ENTRY RESTORE_MASKS :
 1100 1 : INDIVISIBLE ,
    M 1 : rand 15 ,
 1101 1 : CASE ON ACC_BYTE ( 2 ) MASK @10@ ROTATE ( 4 ) ,
    M 1 : nac 3   srce 6   mask @10@ sc 3 ,
 1102 1 : SET_TRACE_MASK
    M 1 : dev_cmd 76
 1102 1 : ;
 1104 1 : INDIVISIBLE ,
    M 1 : rand 15 ,
 1105 1 : CLR_TRACE_MASK
    M 1 : dev_cmd 77
 1105 1 : ;
 1107 1 : INDIVISIBLE ,
    M 1 : rand 15 ,
 1108 1 : CASE ON ACC_BYTE ( 2 ) MASK @04@ ROTATE ( 2 ) ,
    M 1 : nac 3   srce 6   mask @04@ sc 5 ,
 1109 1 : SET_ASYNC_MASK
    M 1 : dev_cmd 74
 1109 1 : ;
 1111 1 : INDIVISIBLE ,
    M 1 : rand 15 ,
 1112 1 : CLR_ASYNC_MASK ,
    M 1 : dev_cmd 75 ,
 1113 1 : RETURN
    M 1 : nac 2
 1113 1 : ;
 1115 1 : INDIVISIBLE ,
    M 1 : rand 15 ,
 1116 1 : RETURN
    M 1 : nac 2
 1116 1 : ;
 1118 1 : END
 1150 0 : BEGIN
 1153 1 : ENTRY SS_PUSH_MARKER :
 1157 1 : OFF_ALU_OUT = ZERO OR COMMON ( 0 , 5 ) ,
```

```
   M 1 :    alu_in 2 , rand 2   alu_op 5   src_frame 2 , r_source
   M 1 : 5 , com_ext 0 ,
1158 1 : LOAD_OFF ( CURRENT ( 0 ) ) WITH OFFSET ,
   M 1 : dest_frame 0 , r_dest 0 , r_w 1   o_in   3 ,
1159 1 : SOURCE ( OFF_ALU_DATA ) TO JPD_BUS ( DATA_TRAP ) ,
   M 1 : jpd_ctrl 7    dev_cmd 28    ,
1160 1 : LOAD_AON ( CURRENT ( 0 ) ) WITH AON ( COMMON ( 0 , 5 ) )
   M 1 : dest_frame 0 , r_dest 0 , r_w 1   a_in   2 , src_frame
   M 1 : 2 , r_source 5 , com_ext 0
1160 1 : ;
1165 1 : INDIVISIBLE ,
   M 1 : rand 15 ,
1166 1 : SET_MON_MASK ,
   M 1 : dev_cmd 72 ,
1167 1 : OFF_ALU_OUT = LIT16 ( 1216 ) PLUS COMMON ( 0 , 5 ) ,
   M 1 :    alu_in 3 , 1 0 , lit16 1216   alu_op 3   src_frame
   M 1 : 2 , r_source 5 , com_ext 0 ,
1168 1 : LOAD_OFF ( COMMON ( 0 , 5 ) ) WITH OFFSET ,
   M 1 : dest_frame 2 , r_dest 5 , com_ext 0 , r_w 1   o_in   3 ,
1169 1 : LOAD_AON ( COMMON ( 0 , 5 ) ) WITH AON ( COMMON ( 0 , 5 ) )
   M 1 : dest_frame 2 , r_dest 5 , com_ext 0 , r_w 1   a_in
   M 1 :    2 , src_frame 2 , r_source 5 , com_ext 0
1169 1 : ;
1174 1 : OFF_ALU_OUT = LIT16 ( 64 ) PLUS COMMON ( 0 , 0 ) ,
   M 1 :    alu_in 3 , 1 0 , lit16 64   alu_op 3   src_frame
   M 1 : 2 , r_source 0 , com_ext 0 ,
1175 1 : IGNORE_PROT ,
   M 1 : dev_cmd 40 ,
1176 1 : WRITE FROM DATA_TRAP USING OFF_ALU WITH COMMON ( 0 , 0 )
   M 1 : mem 4    jpd_ctrl 4    db_ctrl 1    src_frame 2 , r_source
   M 1 : 0 , com_ext 0
1177 1 : CON_LENGTH ( 32 )
   M 1 : len_ctrl 6
1177 1 : ;
1182 1 : OFF_ALU_OUT = ZERO OR COMMON ( 0 , 0 ) ,
   M 1 :    alu_in 2 , rand 2   alu_op 5   src_frame 2 , r_source
   M 1 : 0 , com_ext 0 ,
1183 1 : SOURCE ( OFF_ALU_DATA ) TO JPD_BUS ( DATA_TRAP )
   M 1 : jpd_ctrl 7    dev_cmd 28
1183 1 : ;
1185 1 : OFF_ALU_OUT = LIT16 ( 32 ) PLUS CURRENT ( 0 ) ,
   M 1 :    alu_in 3 , 1 0 , lit16 32   alu_op 3   src_frame 0 , r_source 0 ,
1186 1 : IGNORE_PROT ,
   M 1 : dev_cmd 40
1187 1 : WRITE FROM DATA_TRAP USING OFF_ALU WITH CURRENT ( 0 )
   M 1 : mem 4    jpd_ctrl 4    db_ctrl 1    src_frame 0 , r_source 0
1188 1 : CON_LENGTH ( 32 ) FIU ( LEFT , ZERO )
   M 1 : len_ctrl 6    rand 6
1188 1 : ;
1193 1 : OFF_ALU_OUT = ZERO OR COMMON ( 2 , 1 ) ,
   M 1 :    alu_in 2 , rand 2   alu_op 5   src_frame 2 , r_source
   M 1 : 1 , com_ext 2 ,
1194 1 : SOURCE ( OFF_ALU_DATA ) TO JPD_BUS ( DATA_TRAP )
   M 1 : jpd_ctrl 7    dev_cmd 28
1194 1 : ;
1196 1 : OFF_ALU_OUT = LIT16 ( 96 ) PLUS CURRENT ( 0 ) ,
   M 1 :    alu_in 3 , 1 0 , lit16 96   alu_op 3   src_frame 0 , r_source 0 ,
1197 1 : IGNORE_PROT ,
   M 1 : dev_cmd 40 ,
1198 1 : WRITE FROM DATA_TRAP USING OFF_ALU WITH CURRENT ( 0 )
   M 1 : mem 4    jpd_ctrl 4    db_ctrl 1    src_frame 0 , r_source 0
1199 1 : CON_LENGTH ( 32 ) FIU ( LEFT , ZERO )
   M 1 : len_ctrl 6    rand 6
1199 1 : ;
1204 1 : OFF_ALU_OUT = ZERO OR COMMON ( @@@ , 0 ) ,
   M 1 :    alu_in 2 , rand 2   alu_op 5   src_frame 2 , r_source
   M 1 : 0 , com_ext @@@ ,
1205 1 : SOURCE ( OFF_ALU_DATA ) TO JPD_BUS ( DATA_TRAP )
   M 1 : jpd_ctrl 7    dev_cmd 28
1205 1 : ;
1207 1 : OFF_ALU_OUT = LIT16 ( 16 ) PLUS CURRENT ( 0 ) ,
   M 1 :    alu_in 3 , 1 0 , lit16 16   alu_op 3   src_frame 0 , r_source 0 ,
1208 1 : IGNORE_PROT ,
```

```
   M  1 : dev_cmd 40 ,
1209  1 : WRITE FROM DATA_TRAP USING OFF_ALU WITH CURRENT ( 0 )
   M  1 : mem 4    jpd_ctrl 4    db_ctrl 1    src_frame 0 , r_source 0
1210  1 : CON_LENGTH ( 16 ) FIU ( LEFT , ZERO )
   M  1 : len_ctrl 5    rand 6
1210  1 : ;
1215  1 : OFF_ALU_OUT = ZERO OR COMMON ( aBa , 5 ) ,
   M  1 :    alu_in 2 , rand 2   alu_op 5   src_frame 2 , r_source
   M  1 : 5 , com_ext aBa ,
1216  1 : SOURCE ( OFF_ALU_DATA ) TO JPD_BUS ( DATA_TRAP )
   M  1 : jpd_ctrl 7    dev_cmd 28
1216  1 : ;
1218  1 : OFF_ALU_OUT = LIT16 ( 64 ) PLUS CURRENT ( 0 ) ,
   M  1 :    alu_in 3 , 1 0 , lit16 64   alu_op 3   src_frame 0 , r_source 0 ,
1219  1 : IGNORE_PROT ,
   M  1 : dev_cmd 40 ,
1220  1 : WRITE FROM DATA_TRAP USING OFF_ALU WITH CURRENT ( 0 )
   M  1 : mem 4    jpd_ctrl 4    db_ctrl 1    src_frame 0 , r_source 0
1221  1 : CON_LENGTH ( 32 ) FIU ( LEFT , ZERO )
   M  1 : len_ctrl 6    rand 6
1221  1 : ;
1226  1 : OFF_ALU_OUT = LIT16 ( w01a ) OR COMMON ( aBa , 0 ) ,
   M  1 :    alu_in 3 , 1 0 , lit16 a01w   alu_op 5   src_frame
   M  1 : 2 , r_source 0 , com_ext aBa
1227  1 : SOURCE ( OFF_ALU_DATA ) TO JPD_BUS ( DATA_TRAP )
   M  1 : jpd_ctrl 7    dev_cmd 28
1227  1 : ;
1229  1 : OFF_ALU_OUT = LIT16 ( 0 ) PLUS CURRENT ( 0 ) ,
   M  1 :    alu_in 3 , 1 0 , lit16 0    alu_op 3   src_frame 0 , r_source 0 ,
1230  1 : IGNORE_PROT ,
   M  1 : dev_cmd 40 ,
1231  1 : WRITE FROM DATA_TRAP USING OFF_ALU WITH CURRENT ( 0 )
   M  1 : mem 4    jpd_ctrl 4    db_ctrl 1    src_frame 0 , r_source 0
1232  1 : CON_LENGTH ( 8 ) FIU ( RIGHT , ZERO )
   M  1 : len_ctrl 4    rand 4
1232  1 : ;
1234  1 : OFF_ALU_OUT = LIT16 ( w01a ) OR COMMON ( aBa , 0 ) ,
   M  1 :    alu_in 3 , 1 0 , lit16 001w   alu_op 5   src_frame
   M  1 : 2 , r_source 0 , com_ext aBa
1235  1 : SOURCE ( OFF_ALU_DATA ) TO JPD_BUS ( DATA_TRAP )
   M  1 : jpd_ctrl 7    dev_cmd 28
1235  1 : ;
1237  1 : OFF_ALU_OUT = LIT16 ( 8 ) PLUS CURRENT ( 0 ) ,
   M  1 :    alu_in 3 , 1 0 , lit16 8    alu_op 3   src_frame 0 , r_source 0 ,
1238  1 : IGNORE_PROT ,
   M  1 : dev_cmd 40 ,
1239  1 : WRITE FROM DATA_TRAP USING OFF_ALU WITH CURRENT ( 0 )
   M  1 : mem 4    jpd_ctrl 4    db_ctrl 1    src_frame 0 , r_source 0
1240  1 : CON_LENGTH ( 8 ) FIU ( RIGHT , ZERO )
   M  1 : len_ctrl 4    rand 4
1240  1 : ;
1246  1 : CLR_MON_MASK ,
   M  1 : dev_cmd 73 ,
1247  1 : OFF_ALU_OUT = ZERO OR CURRENT ( 0 ) , LOAD_AON (
1247  1 : COMMON ( 0 , 0 ) ) WITH AON ( CURRENT ( 0 ) )
   M  1 :    alu_in 2 , rand 2   alu_op 5   src_frame 0 , r_source
   M  1 : 0 , dest_frame 2 , r_dest 0 , com_ext 0 , r_w 1
   M  1 : a_in 2 , src_frame 0 , r_source 0
1247  1 : , LOAD_LEN ( COMMON ( 0 , 0 ) ) WITH LEN ( CURRENT
1247  1 : ( 0 ) ) , LOAD_OFF ( COMMON ( 0 , 0 ) )
   M  1 : , dest_frame 2 , r_dest 0 , com_ext 0 , r_w 1   l_in
   M  1 : 2 , src_frame 0 , r_source 0   , dest_frame 2
   M  1 : , r_dest 0 , com_ext 0 , r_w 1   o_in
1247  1 : WITH OFFSET ,
   M  1 : 3 ,
1248  1 : RETURN
   M  1 : nac 2
1248  1 : ;
1250  1 : END
1275  0 : BEGIN
1279  1 : ENTRY SS_POP_MARKER :
1299  1 : SET_MON_MASK
```

```
   M 1 : dev_cmd 72
1289 1 : ;
1291 1 : OFF_ALU_OUT = LIT16 ( 32 ) PLUS COMMON ( 0 , 0 ) ,
   M 1 :    alu_in 3 , 1 0 , lit16 32   alu_op 3  src_frame
   M 1 : 2 , r_source 0 , com_ext 0  ,
1292 1 : LOAD_AON ( CURRENT ( 0 ) ) WITH AON ( COMMON ( 0 , 0 ) ) ,
   M 1 : dest_frame 0 , r_dest 0 , r_w 1  a_in   2 , src_frame
   M 1 : 2 , r_source 0 , com_ext 0   ,
1293 1 : IGNORE_PROT ,
   M 1 : dev_cmd 40
1294 1 : READ TO ACCUMULATOR USING OFF_ALU WITH COMMON ( 0 , 0 )
   M 1 : mem 1   md 1   db_ctrl 1   src_frame 2 , r_source 0 , com_ext 0
1295 1 : CON_LENGTH ( 32 )
   M 1 : len_ctrl 6
1295 1 : ;
1297 1 : DISABLE_AON_WRI ,
   M 1 : rand 8  ,
1298 1 : OFF_ALU_OUT = ACC OR COMMON ( 0R0 , 0 ) ,
   M 1 :    alu_in 2  alu_op 5  src_frame 2 , r_source 0 , com_ext 0R0  ,
1299 1 : LOAD_OFF ( CURRENT ( 0 ) ) WITH OFFSET
   M 1 : dest_frame 0 , r_dest 0 , r_w 1  o_in   3
1299 1 : ;
1301 1 : OFF_ALU_OUT = ONES ,
   M 1 :   alu_op 7  ,
1302 1 : SOURCE ( OFF_ALU_DATA ) TO JPD_BUS ( DATA_TRAP )
   M 1 : jpd_ctrl 7    dev_cmd 28
1302 1 : ;
1304 1 : OFF_ALU_OUT = LIT16 ( 64 ) PLUS CURRENT ( 0 ) ,
   M 1 :    alu_in 3 , 1 0 , lit16 64   alu_op 3  src_frame 0 , r_source 0 ,
1305 1 : IGNORE_PROT ,
   M 1 : dev_cmd 40  ,
1306 1 : WRITE FROM DATA_TRAP USING OFF_ALU WITH CURRENT ( 0 )
   M 1 : mem 4   jpd_ctrl 4   db_ctrl 1   src_frame 0 , r_source 0
1307 1 : CON_LENGTH ( 32 )
   M 1 : len_ctrl 6
1307 1 : ;
1309 1 : OFF_ALU_OUT = ZERO OR COMMON ( 0 , 0 ) , LOAD_AON
1309 1 : ( COMMON ( 0 , 5 ) ) WITH
   M 1 :    alu_in 2 , rand 2  alu_op 5  src_frame 2 , r_source
   M 1 : 0 , com_ext 0  , dest_frame 2 , r_dest 5 , com_ext
   M 1 : 0 , r_w 1  a_in
1309 1 : AON ( COMMON ( 0 , 0 ) ) , LOAD_LEN ( COMMON ( 0
1309 1 : , 5 ) ) WITH LEN ( COMMON ( 0 , 0 ) )
   M 1 : 2 , src_frame 2 , r_source 0 , com_ext 0    , dest_frame
   M 1 : 2 , r_dest 5 , com_ext 0 , r_w 1  l_in   2 , src_frame
   M 1 : 2 , r_source 0 , com_ext 0
1309 1 : , LOAD_OFF ( COMMON ( 0 , 5 ) ) WITH OFFSET
   M 1 : , dest_frame 2 , r_dest 5 , com_ext 0 , r_w 1  o_in   3
1309 1 : ;
1311 1 : CLR_MON_MASK ,
   M 1 : dev_cmd 73 ,
1312 1 : OFF_ALU_OUT = ZERO OR CURRENT ( 0 ) , LOAD_AON (
1312 1 : COMMON ( 0 , 0 ) ) WITH AON ( CURRENT ( 0 ) )
   M 1 :    alu_in 2 , rand 2  alu_op 5  src_frame 0 , r_source
   M 1 : 0 , dest_frame 2 , r_dest 0 , com_ext 0 , r_w 1
   M 1 : a_in   2 , src_frame 0 , r_source 0
1312 1 : , LOAD_LEN ( COMMON ( 0 , 0 ) ) WITH LEN ( CURRENT
1312 1 : ( 0 ) ) , LOAD_OFF ( COMMON ( 0 , 0 ) )
   M 1 : , dest_frame 2 , r_dest 0 , com_ext 0 , r_w 1  l_in
   M 1 : 2 , src_frame 0 , r_source 0    , dest_frame 2
   M 1 : , r_dest 0 , com_ext 0 , r_w 1  o_in
1312 1 : WITH OFFSET ,
   M 1 : 3 ,
1313 1 : RETURN
   M 1 : nac 2
1313 1 : ;
1315 1 : END
1316 0 :
1316 0 :

COMPILATION COMPLETE, 111 STATEMENTS PROCESSED
```

DATA GENERAL F H P - FETCH MICROCODE GENERATOR, REV. 6.0 (3/16/79)
6/15/81 AT 11:40:38

INPUT FILE: GENERATE_MACRO_STATE
OBJECT FILE: GENERATE_MACRO_STATE.OB

LINE NC:SOURCE

```
  1  0 :$NO LIST
 29  0 :$INCLUDE FBOX_INCLUDES:F.MAC
 30  0 :$NO LIST
 98  0 :$INCLUDE FBOX_INCLUDES:SIGNAL
 99  0 :$NO LIST
225  0 :$INCLUDE FBOX_INCLUDES:COMMON_REGISTERS
226  0 :$NO LIST
390  0 :$LIST
391  0 :/*******************************************************************/
392  0 :/*                                                                 */
393  0 :/*     FUNCTION:     Generates new macrostate for a process.       */
394  0 :/*                                                                 */
395  0 :/*     INPUTS:       PREVIOUS( 7 ) points to the PED from which    */
396  0 :/*                   state is generated.                           */
397  0 :/*                                                                 */
398  0 :/*     OUTPUTS:      Macrostate is changed. That is, there will    */
399  0 :/*                   be new:                                       */
400  0 :/*                            UT_PTR                               */
401  0 :/*                            PED_PTR                              */
402  0 :/*                            SIP                                  */
403  0 :/*                            PGP                                  */
404  0 :/*                            SJP                                  */
405  0 :/*                                                                 */
406  0 :/*     DATE:         14/JAN/81 new PED format (TC)                 */
407  0 :/*                                                                 */
408  0 :/*******************************************************************/
409  0 :
410  0 :BEGIN
411  1 :MACRO    PED_ADR   MEANS    PREVIOUS( 7 )              ENDMAC;
412  1 :MACRO    TARGET    MEANS    PREVIOUS( 1 )              ENDMAC;
413  1 :
414  1 :MACRO    TEMP6     MEANS    CURRENT(6)                 ENDMAC;
415  1 :MACRO    TEMP_6    MEANS    CURRENT_6                  ENDMAC;
416  1 :MACRO    TEMP7     MEANS    CURRENT(7)                 ENDMAC;
417  1 :MACRO    TEMP_7    MEANS    CURRENT_7                  ENDMAC;
418  1 :
419  1 :MACRO    CSL_UID_0..15   MEANS    @00000450@           ENDMAC;
420  1 :MACRO    CSL_UID_16..47  MEANS    @1592E785@           ENDMAC;
421  1 :MACRO    CSL_UID_48..79  MEANS    @00000000@           ENDMAC;
422  1 :MACRO    CSL_DIALECT     MEANS    1                    ENDMAC;
423  1 :
424  1 :MACRO    KUS_UID_0..15   MEANS    @00000457@           ENDMAC;
425  1 :MACRO    KUS_UID_16..47  MEANS    @1592E785@           ENDMAC;
426  1 :MACRO    KUS_UID_48..79  MEANS    @00000000@           ENDMAC;
427  1 :MACRO    KUS_DIALECT     MEANS    0                    ENDMAC;
428  1 :
429  1 :ENTRY GENERATE_MACRO_STATE:
430  1 :
431  1 :         /*    PED_PTR, AON=0, OFFSET = PED_ADR.OFF    */
432  1 :
433  1 :         OFF_ALU_OUT = ZERO OR PED_ADR,
434  1 :         LOAD_OFF (PED_PTR) WITH OFFSET;
435  1 :
436  1 :         /*
437 1C:          *     PBP.
438 1C:          */
439  1 :         OFF_ALU_OUT = LIT16( ENV_DFSC.PBP ) PLUS PED_ADR,
440  1 :         READ TO ACCUMULATOR USING OFF_ALU WITH PED_ADR,
441  1 :             COM_LENGTH (32);
442  1 :
443  1 :         /*Can't combine these two micros. PC and PBP must be
444 1C:           updated indivisibly.*/
445  1 :
446  1 :         LOAD_AON (PC.AON) WITH AON(PED_ADR);
```

```
447 1 :
448 1 :              INDIVISIBLE,
449 1 :              OFF_ALU_OUT = ACC OR ZERO_VAL,
450 1 :              LOAD_OFF (PBP) WITH OFFSET,
451 1 :              LOAD_LEN (PBP) WITH LITERAL(CON_LENGTH(32)),
452 1 :              LOAD_AON (PBP) WITH AON (PC.AON);
453 1 :
454 1 :              /*
455 1C:              *      Get SIP.
456 1C:              */
457 1 :TRY_SIP_AGAIN:
458 1 :              OFF_ALU_OUT = LIT16( ENV_DESC.SIP_0..15 ) PLUS PED_ADR,
459 1 :              READ TO ACCUMULATOR USING OFF_ALU WITH PED_ADR CON_LENGTH(16);
460 1 :
461 1 :              OFF_ALU_OUT = LIT32(CSL_UID_0..15) OR CON_0,
462 1 :              LOAD_OFF (TEMP7) WITH OFFSET;
463 1 :
464 1 :              OFF_ALU_OUT = ACC XOR TEMP7,
465 1 :              IF OFF_NE_0 THEN GOTO NOT_CSL;
466 1 :
467 1 :              OFF_ALU_OUT = LIT16( ENV_DESC.SIP_16..47 ) PLUS PED_ADR,
468 1 :              READ TO ACCUMULATOR USING OFF_ALU WITH PED_ADR CON_LENGTH(32);
469 1 :
470 1 :              OFF_ALU_OUT = LIT32(CSL_UID_16..47) OR CON_0,
471 1 :              LOAD_OFF (TEMP7) WITH OFFSET;
472 1 :
473 1 :              OFF_ALU_OUT = ACC XOR TEMP7,
474 1 :              IF OFF_NE_0 THEN GOTO NOT_CSL;
475 1 :
476 1 :              OFF_ALU_OUT = LIT16( ENV_DESC.SIP_48..79 ) PLUS PED_ADR,
477 1 :              READ TO ACCUMULATOR USING OFF_ALU WITH PED_ADR CON_LENGTH(32);
478 1 :
479 1 :              OFF_ALU_OUT = LIT32(CSL_UID_48..79) OR CON_0,
480 1 :              LOAD_OFF (TEMP7) WITH OFFSET;
481 1 :
482 1 :              OFF_ALU_OUT = ACC XOR TEMP7,
483 1 :              LOAD_OFF (TEMP7) WITH OFFSET,
484 1 :              IF OFF_NE_0 THEN GOTO NOT_CSL;
485 1 :
486 1 :              OFF_ALU_OUT = BIASED_LENGTH CON_LENGTH(CSL_DIALECT) OR TEMP7,
487 1 :              SOURCE (OFF_ALU_DATA) TO JPD_BUS(DIALECT),
488 1 :              LOAD_OFF (DIALECT_COPY) WITH OFFSET,
489 1 :              LONG_GOTO FOUND;
490 1 :
491 1 :NOT_CSL:
492 1 :              OFF_ALU_OUT = LIT16( ENV_DESC.SIP_0..15 ) PLUS PED_ADR,
493 1 :              READ TO ACCUMULATOR USING OFF_ALU WITH PED_ADR CON_LENGTH(16);
494 1 :
495 1 :              OFF_ALU_OUT = LIT32(KOS_UID_0..15) OR CON_0,
496 1 :              LOAD_OFF (TEMP7) WITH OFFSET;
497 1 :
498 1 :              OFF_ALU_OUT = ACC XOR TEMP7,
499 1 :              IF OFF_NE_0 THEN GOTO NOT_KUS;
500 1 :
501 1 :              OFF_ALU_OUT = LIT16( ENV_DESC.SIP_16..47 ) PLUS PED_ADR,
502 1 :              READ TO ACCUMULATOR USING OFF_ALU WITH PED_ADR CON_LENGTH(32);
503 1 :
504 1 :              OFF_ALU_OUT = LIT32(KOS_UID_16..47) OR CON_0,
505 1 :              LOAD_OFF (TEMP7) WITH OFFSET;
506 1 :
507 1 :              OFF_ALU_OUT = ACC XOR TEMP7,
508 1 :              IF OFF_NE_0 THEN GOTO NOT_KUS;
509 1 :
510 1 :              OFF_ALU_OUT = LIT16( ENV_DESC.SIP_48..79 ) PLUS PED_ADR,
511 1 :              READ TO ACCUMULATOR USING OFF_ALU WITH PED_ADR CON_LENGTH(32);
512 1 :
513 1 :              OFF_ALU_OUT = LIT32(KOS_UID_48..79) OR CON_0,
514 1 :              LOAD_OFF (TEMP7) WITH OFFSET;
515 1 :
516 1 :              OFF_ALU_OUT = ACC XOR TEMP7,
517 1 :              LOAD_OFF (TEMP7) WITH OFFSET,
518 1 :              IF OFF_NE_0 THEN GOTO NOT_KUS;
```

```
519 1 :
520 1 :           OFF_ALU_OUT = BIASED_LENGTH CON_LENGTH(KOS_DIALECT) OR TEMP7,
521 1 :           SOURCE (OFF_ALU_DATA) TO JPO_BUS(DIALECT),
522 1 :           LOAD_OFF (DIALECT_COPY) WITH OFFSET,
523 1 :           LONG_GOTO FOUND;
524 1 :
525 1 :NOT_KOS:
526 1 :
527 1 :NOT_FOUND:
528 1 :           OFF_ALU_OUT = LIT16 (ENV_DESC.SIP) PLUS PED_ADR,
529 1 :           LOAD_OFF (TEMP7) WITH OFFSET,
530 1 :           LOAD_AON (TEMP7) WITH AON(PED_ADR);
531 1 :
532 1 :           SIGNAL(INVALID_S_INTERPRETER,TEMP7,RETURNABLE);
533 1 :
534 1 :           LOAD_AON(TEMP7) WITH 0,
535 1 :           LONG_GOTO TRY_SIP_AGAIN;
536 1 :
537 1 :FOUND:
538 1 :           /*
539 1C:          *        And NIP.
540 1C:          */
541 1 :           OFF_ALU_OUT = LIT16( ENV_DESC.NTP ) PLUS PED_ADR,
542 1 :           READ TO TEMP_7 USING OFF_ALU WITH PED_ADR,
543 1 :           CON_LENGTH (32),
544 1 :           LOAD_AON (NT_PTR) WITH AON (PED_ADR);
545 1 :
546 1 :           OFF_ALU_OUT = LIT32(@00180000@) REV_MINUS TEMP7,
547 1 :           LOAD_OFF (NT_PTR) WITH OFFSET,
548 1 :           DISABLE_AON_WRITE;
549 1 :
550 1 :           /*
551 1C:          *        And SDPP.
552 1C:          */
553 1 :           OFF_ALU_OUT = LIT16( ENV_DESC.SDPP ) PLUS PED_ADR,
554 1 :           READ TO ACCUMULATOR USING OFF_ALU WITH PED_ADR CON_LENGTH(32),
555 1 :           LOAD_OFF (TEMP7) WITH OFFSET,
556 1 :           LOAD_AON (TEMP7) WITH AON (PED_ADR);
557 1 :
558 1 :           LOAD_AON(TEMP6) WITH 0,
559 1 :           LONG_CALL PTR_TO_DESC*READ_STARTED;
560 1 :
561 1 :           /*SDP returned in temp7*/
562 1 :
563 1 :           LOAD (SDP) WITH DESCRIPTOR TEMP7,
564 1 :           CON_LENGTH (32) FILL (RIGHT, ZERO);
565 1 :
566 1 :           LOAD_AON (TEMP7) WITH 0,
567 1 :           RETURN;
568 1 :
569 1 :END
NPUT FILE: ?27.1_FILE14
BJECT FILE: GENERATE_MACRO_STATE.OB

INE N :SOURCE 410 0 : BEGIN
429 1 : ENTRY GENERATE_MACRO_ :
433 1 : OFF_ALU_OUT = ZERO OR PREVIOUS ( 7 ) ,
  M 1 :    alu_in 2 , rand 2  alu_op 5  src_frame 3 , r_source 7 ,
434 1 : LOAD_OFF ( COMMON ( 2 , 3 ) ) WITH OFFSET
  M 1 : dest_frame 2 , r_dest 3 , com_ext 2 , r_w 1  o_in   3
434 1 : ;
439 1 : OFF_ALU_OUT = LIT16 ( 64 ) PLUS PREVIOUS ( 7 ) ,
  M 1 :    alu_in 3 , 1 0 , lit16 64    alu_op 3  src_frame 3 , r_source 7 ,
440 1 : READ TO ACCUMULATOR USING OFF_ALU WITH PREVIOUS ( 7 ) ,
  M 1 : mem 1   md 1   db_ctrl 1   src_frame 3 , r_source 7 ,
441 1 : CON_LENGTH ( 32 )
  M 1 : len_ctrl 6
441 1 : ;
446 1 : LOAD_AON ( COMMON ( 2 , 6 ) ) WITH AON ( PREVIOUS ( 7 ) )
  M 1 : dest_frame 2 , r_dest 6 , com_ext 2 , r_w 1  a_in
  M 1 :   2 , src_frame 3 , r_source 7
```

```
446 1 : ;
448 1 : INDIVISIBLE ,
  M 1 : rand 15 ,
449 1 : OFF_ALU_OUT = ACC OR COMMON ( 2 , 6 ) ,
  M 1 :    alu_in 2   alu_op 5   src_frame 2 , r_source 6 , com_ext 2 ,
450 1 : LOAD_OFF ( COMMON ( 2 , 0 ) ) WITH OFFSET ,
  M 1 : dest_frame 2 , r_dest 0 , com_ext 2 , r_w 1   o_in   3 ,
451 1 : LOAD_LEN ( COMMON ( 2 , 0 ) ) WITH LITERAL ( CON_LENGTH ( 32 ) ) ,
  M 1 : dest_frame 2 , r_dest 0 , com_ext 2 , r_w 1   l_in
  M 1 :    1 , len_ctrl 6      ,
452 1 : LOAD_ADN ( COMMON ( 2 , 0 ) ) WITH ADN ( COMMON ( 2 , 6 ) )
  M 1 : dest_frame 2 , r_dest 0 , com_ext 2 , r_w 1   a_in
  M 1 :    2 , src_frame 2 , r_source 6 , com_ext 2
452 1 : ;
457 1 : TRY_SIP_AGAIN :
458 1 : OFF_ALU_OUT = LIT16 ( 176 ) PLUS PREVIOUS ( 7 ) ,
  M 1 :    alu_in 3 , 1 0 , lit16 176   alu_op 3   src_frame
  M 1 : 3 , r_source 7 ,
459 1 : READ TO ACCUMULATOR USING OFF_ALU WITH PREVIOUS (
459 1 : 7 ) CON_LENGTH ( 16 )
  M 1 : mem 1   md 1   db_ctrl 1   src_frame 3 , r_source 7   len_ctrl 5
459 1 : ;
461 1 : OFF_ALU_OUT = LIT32 ( @000045D@ ) OR COMMON ( @B@ , 0 ) ,
  M 1 :    alu_in 3 , 1 1 , lit32 @000045D@   alu_op 5   src_frame
  M 1 : 2 , r_source 0 , com_ext @B@ ,
462 1 : LOAD_OFF ( CURRENT ( 7 ) ) WITH OFFSET
  M 1 : dest_frame 0 , r_dest 7 , r_w 1   o_in   3
462 1 : ;
464 1 : OFF_ALU_OUT = ACC XOR CURRENT ( 7 ) ,
  M 1 :    alu_in 2   alu_op 4   src_frame 0 , r_source 7 ,
465 1 : IF OFF_NE_0 THEN GOTO NOT_CSL
  M 1 : test  6 , polarity 1   nac 4 , lit8 NOT_CSL
465 1 : ;
467 1 : OFF_ALU_OUT = LIT16 ( 192 ) PLUS PREVIOUS ( 7 ) ,
  M 1 :    alu_in 3 , 1 0 , lit16 192   alu_op 3   src_frame
  M 1 : 3 , r_source 7 ,
468 1 : READ TO ACCUMULATOR USING OFF_ALU WITH PREVIOUS (
468 1 : 7 ) CON_LENGTH ( 32 )
  M 1 : mem 1   md 1   db_ctrl 1   src_frame 3 , r_source 7   len_ctrl 6
468 1 : ;
470 1 : OFF_ALU_OUT = LIT32 ( @1592E785@ ) OR COMMON ( @B@ , 0 ) ,
  M 1 :    alu_in 3 , 1 1 , lit32 @1592E785@   alu_op 5   src_frame
  M 1 : 2 , r_source 0 , com_ext @B@ ,
471 1 : LOAD_OFF ( CURRENT ( 7 ) ) WITH OFFSET
  M 1 : dest_frame 0 , r_dest 7 , r_w 1   o_in   3
471 1 : ;
473 1 : OFF_ALU_OUT = ACC XOR CURRENT ( 7 ) ,
  M 1 :    alu_in 2   alu_op 4   src_frame 0 , r_source 7 ,
474 1 : IF OFF_NE_0 THEN GOTO NOT_CSL
  M 1 : test  6 , polarity 1   nac 4 , lit8 NOT_CSL
474 1 : ;
476 1 : OFF_ALU_OUT = LIT16 ( 224 ) PLUS PREVIOUS ( 7 ) ,
  M 1 :    alu_in 3 , 1 0 , lit16 224   alu_op 3   src_frame
  M 1 : 3 , r_source 7 ,
477 1 : READ TO ACCUMULATOR USING OFF_ALU WITH PREVIOUS (
477 1 : 7 ) CON_LENGTH ( 32 )
  M 1 : mem 1   md 1   db_ctrl 1   src_frame 3 , r_source 7   len_ctrl 6
477 1 : ;
479 1 : OFF_ALU_OUT = LIT32 ( @00000000@ ) OR COMMON ( @B@ , 0 ) ,
  M 1 :    alu_in 3 , 1 1 , lit32 @00000000@   alu_op 5   src_frame
  M 1 : 2 , r_source 0 , com_ext @B@ ,
480 1 : LOAD_OFF ( CURRENT ( 7 ) ) WITH OFFSET
  M 1 : dest_frame 0 , r_dest 7 , r_w 1   o_in   3
480 1 : ;
482 1 : OFF_ALU_OUT = ACC XOR CURRENT ( 7 ) ,
  M 1 :    alu_in 2   alu_op 4   src_frame 0 , r_source 7 ,
483 1 : LOAD_OFF ( CURRENT ( 7 ) ) WITH OFFSET ,
  M 1 : dest_frame 0 , r_dest 7 , r_w 1   o_in   3 ,
484 1 : IF OFF_NE_0 THEN GOTO NOT_CSL
  M 1 : test  6 , polarity 1   nac 4 , lit8 NOT_CSL
484 1 : ;
486 1 : OFF_ALU_OUT = BIASED_LENGTH CON_LENGTH ( 1 ) OR CURRENT ( 7 ) ,
```

```
 M 1 :    alu_in 1  len_ctrl 1    alu_op 5  src_frame 0 , r_source 7 ,
487 1 : SOURCE ( OFF_ALU_DATA ) TO JPD_BUS ( DIALECT ) ,
 M 1 : jpd_ctrl 7     dev_cmd 113    ,
488 1 : LOAD_OFF ( COMMON ( 0 , 6 ) ) WITH OFFSET ,
 M 1 : dest_frame 2 , r_dest 6 , com_ext 0 , r_w 1  o_in    3  ,
489 1 : LONG_GOTO FOUND
 M 1 : nac 6 , lit14  FOUND
489 1 : ;
491 1 : NOT_CSL :
492 1 : OFF_ALU_OUT = LIT16 ( 176 ) PLUS PREVIOUS ( 7 ) ,
 M 1 :    alu_in 3 , 1 0 , lit16 176   alu_op 3  src_frame
 M 1 : 3 , r_source 7 ,
493 1 : READ TO ACCUMULATOR USING OFF_ALU WITH PREVIOUS (
493 1 : 7 ) CON_LENGTH ( 16 )
 M 1 : mem 1   md 1   db_ctrl 1   src_frame 3 , r_source 7  len_ctrl 5
493 1 : ;
495 1 : OFF_ALU_OUT = LIT32 ( @00000457@ ) OR COMMON ( @8@ , 0 ) ,
 M 1 :    alu_in 3 , 1 1 , lit32 @00000457@  alu_op 5  src_frame
 M 1 : 2 , r_source 0 , com_ext @8@ ,
496 1 : LOAD_OFF ( CURRENT ( 7 ) ) WITH OFFSET
 M 1 : dest_frame 0 , r_dest 7 , r_w 1   o_in   3
496 1 : ;
498 1 : OFF_ALU_OUT = ACC XOR CURRENT ( 7 ) ,
 M 1 :    alu_in 2  alu_op 4  src_frame 0 , r_source 7 ,
499 1 : IF OFF_NE_0 THEN GOTO NOT_KOS
 M 1 : test 6 , polarity 1   nac 4 , lit8  NOT_KOS
499 1 : ;
501 1 : OFF_ALU_OUT = LIT16 ( 192 ) PLUS PREVIOUS ( 7 ) ,
 M 1 :    alu_in 3 , 1 0 , lit16 192   alu_op 3  src_frame
 M 1 : 3 , r_source 7 ,
502 1 : READ TO ACCUMULATOR USING OFF_ALU WITH PREVIOUS (
502 1 : 7 ) CON_LENGTH ( 32 )
 M 1 : mem 1   md 1   db_ctrl 1   src_frame 3 , r_source 7  len_ctrl 6
502 1 : ;
504 1 : OFF_ALU_OUT = LIT32 ( @1592E785@ ) OR COMMON ( @8@ , 0 ) ,
 M 1 :    alu_in 3 , 1 1 , lit32 @1592E785@  alu_op 5  src_frame
 M 1 : 2 , r_source 0 , com_ext @8@ ,
505 1 : LOAD_OFF ( CURRENT ( 7 ) ) WITH OFFSET
 M 1 : dest_frame 0 , r_dest 7 , r_w 1   o_in   3
505 1 : ;
507 1 : OFF_ALU_OUT = ACC XOR CURRENT ( 7 ) ,
 M 1 :    alu_in 2  alu_op 4  src_frame 0 , r_source 7 ,
508 1 : IF OFF_NE_0 THEN GOTO NOT_KOS
 M 1 : test 6 , polarity 1   nac 4 , lit8  NOT_KOS
508 1 : ;
510 1 : OFF_ALU_OUT = LIT16 ( 224 ) PLUS PREVIOUS ( 7 ) ,
 M 1 :    alu_in 3 , 1 0 , lit16 224   alu_op 3  src_frame
 M 1 : 3 , r_source 7 ,
511 1 : READ TO ACCUMULATOR USING OFF_ALU WITH PREVIOUS (
511 1 : 7 ) CON_LENGTH ( 32 )
 M 1 : mem 1   md 1   db_ctrl 1   src_frame 3 , r_source 7  len_ctrl 6
511 1 : ;
513 1 : OFF_ALU_OUT = LIT32 ( @00000000@ ) OR COMMON ( @8@ , 0 ) ,
 M 1 :    alu_in 3 , 1 1 , lit32 @00000000@  alu_op 5  src_frame
 M 1 : 2 , r_source 0 , com_ext @8@ ,
514 1 : LOAD_OFF ( CURRENT ( 7 ) ) WITH OFFSET
 M 1 : dest_frame 0 , r_dest 7 , r_w 1   o_in   3
514 1 : ;
516 1 : OFF_ALU_OUT = ACC XOR CURRENT ( 7 ) ,
 M 1 :    alu_in 2  alu_op 4  src_frame 0 , r_source 7 ,
517 1 : LOAD_OFF ( CURRENT ( 7 ) ) WITH OFFSET ,
 M 1 : dest_frame 0 , r_dest 7 , r_w 1   o_in   3  ,
518 1 : IF OFF_NE_0 THEN GOTO NOT_KOS
 M 1 : test 6 , polarity 1   nac 4 , lit8  NOT_KOS
518 1 : ;
520 1 : OFF_ALU_OUT = BIASED_LENGTH CON_LENGTH ( 0 ) OR CURRENT ( 7 ) ,
 M 1 :    alu_in 1  len_ctrl 0    alu_op 5  src_frame 0 , r_source 7 ,
521 1 : SOURCE ( OFF_ALU_DATA ) TO JPD_BUS ( DIALECT ) ,
 M 1 : jpd_ctrl 7     dev_cmd 113    ,
522 1 : LOAD_OFF ( COMMON ( 0 , 6 ) ) WITH OFFSET ,
 M 1 : dest_frame 2 , r_dest 6 , com_ext 0 , r_w 1  o_in    3  ,
523 1 : LONG_GOTO FOUND
```

```
  M 1 : nac 6 , lit14  FOUND
523 1 : ;
525 1 : NOT_KOS :
527 1 : NOT_FOUND :
528 1 : OFF_ALU_OUT = LIT16 ( 128 ) PLUS PREVIOUS ( 7 ) ,
  M 1 :    alu_in 3 , 1 0 , lit16 128    alu_op 3  src_frame
  M 1 : 3 , r_source 7 ,
529 1 : LOAD_OFF ( CURRENT ( 7 ) ) WITH OFFSET ,
  M 1 : dest_frame 0 , r_dest 7 , r_w 1  o_in   3 ,
530 1 : LOAD_AON ( CURRENT ( 7 ) ) WITH AON ( PREVIOUS ( 7 ) )
  M 1 : dest_frame 0 , r_dest 7 , r_w 1  a_in   2 , src_frame
  M 1 : 3 , r_source 7
530 1 : ;
532 1 : INDIVISIBLE , OFF_ALU_OUT = LIT16 ( @11A@ ) OR COMMON
532 1 : ( 0 , 2 ) , LOAD_OFF ( COMMON ( 0 , 3 ) )
  M 1 : rand 15 ,    alu_in 3 , 1 0 , lit16 @11A@   alu_op
  M 1 : 5  src_frame 2 , r_source 2 , com_ext 0 , dest_frame
  M 1 : 2 , r_dest 3 , com_ext 0 , r_w 1  o_in
532 1 : WITH OFFSET , LOAD_LEN ( COMMON ( 0 , 3 ) ) WITH
532 1 : LITERAL ( CON_LENGTH ( 0 ) ) , LOAD_AON ( COMMON ( 0 , 3 ) )
  M 1 : 3 , dest_frame 2 , r_dest 3 , com_ext 0 , r_w 1
  M 1 : l_in   1 , len_ctrl 0    , dest_frame 2 , r_dest
  M 1 : 3 , com_ext 0 , r_w 1  a_in
532 1 : WITH 0
  M 1 : 0
532 1 : ; INDIVISIBLE , OFF_ALU_OUT = BIASED_LENGTH CON_LENGTH
532 1 : ( 0 ) OR CURRENT ( 7 ) LOAD_OFF ( COMMON ( 0 , 4 ) ) WITH
  M 1 : ; rand 15 ,    alu_in 1  len_ctrl 0    alu_op 5
  M 1 : src_frame 0 , r_source 7  dest_frame 2 , r_dest 4
  M 1 : , com_ext 0 , r_w 1  o_in
532 1 : OFFSET , LOAD_AON ( COMMON ( 0 , 4 ) ) WITH AON (
532 1 : CURRENT ( 7 ) ) LONG_CALL INVOKE_SIGNALLE * INVOKE_SIGNALLE
  M 1 : 3 , dest_frame 2 , r_dest 4 , com_ext 0 , r_w 1
  M 1 : a_in   2 , src_frame 0 , r_source 7   nac 7 , lit14
  M 1 :   INVOKE_SIGNALLE * INVOKE_SIGNALLE
532 1 : ;
534 1 : LOAD_AON ( CURRENT ( 7 ) ) WITH 0 ,
  M 1 : dest_frame 0 , r_dest 7 , r_w 1  a_in   0 ,
535 1 : LONG_GOTO TRY_SIP_AGAIN
  M 1 : nac 6 , lit14  TRY_SIP_AGAIN
535 1 : ;
537 1 : FOUND :
541 1 : OFF_ALU_OUT = LIT16 ( 96 ) PLUS PREVIOUS ( 7 ) ,
  M 1 :    alu_in 3 , 1 0 , lit16 96    alu_op 3  src_frame 3 , r_source 7 ,
542 1 : READ TO CURRENT_7 USING OFF_ALU WITH PREVIOUS ( 7 ) ,
  M 1 : mem 1   md 15   db_ctrl 1   src_frame 3 , r_source 7 ,
543 1 : CON_LENGTH ( 32 ) ,
  M 1 : len_ctrl 6 ,
544 1 : LOAD_AON ( COMMON ( 2 , 4 ) ) WITH AON ( PREVIOUS ( 7 ) )
  M 1 : dest_frame 2 , r_dest 4 , com_ext 2 , r_w 1  a_in
  M 1 :  2 , src_frame 3 , r_source 7
544 1 : ;
546 1 : OFF_ALU_OUT = LIT32 ( @00180000@ ) REV_MINUS CURRENT ( 7 ) ,
  M 1 :    alu_in 3 , 1 1 , lit32 @00180000@  alu_op 1  src_frame
  M 1 : 0 , r_source 7 ,
547 1 : LOAD_OFF ( COMMON ( 2 , 4 ) ) WITH OFFSET ,
  M 1 : dest_frame 2 , r_dest 4 , com_ext 2 , r_w 1  o_in   3 ,
548 1 : DISABLE_AON_WRI
  M 1 : rand 8
548 1 : ;
553 1 : OFF_ALU_OUT = LIT16 ( 256 ) PLUS PREVIOUS ( 7 ) ,
  M 1 :    alu_in 3 , 1 0 , lit16 256   alu_op 3  src_frame
  M 1 : 3 , r_source 7 ,
554 1 : READ TO ACCUMULATOR USING OFF_ALU WITH PREVIOUS (
554 1 : 7 ) CON_LENGTH ( 32 ) ,
  M 1 : mem 1   md 1   db_ctrl 1   src_frame 3 , r_source
  M 1 : 7  len_ctrl 6 ,
555 1 : LOAD_OFF ( CURRENT ( 7 ) ) WITH OFFSET ,
  M 1 : dest_frame 0 , r_dest 7 , r_w 1  o_in   3 ,
556 1 : LOAD_AON ( CURRENT ( 7 ) ) WITH AON ( PREVIOUS ( 7 ) )
  M 1 : dest_frame 0 , r_dest 7 , r_w 1  a_in   2 , src_frame
  M 1 : 3 , r_source 7
```

```
556  1  :  ;
558  1  :  LOAD_AON ( CURRENT ( 6 ) ) WITH 0 ,
  M  1  :  dest_frame 0 , r_dest 6 , r_w 1  a_in   0 ,
559  1  :  LONG_CALL PTR_TO_DESC * READ_STARTED
  M  1  :  nac 7 , lit14 PTR_TO_DESC * READ_STARTED
559  1  :  ;
563  1  :  LOAD ( COMMON ( 2 , 2 ) ) WITH DESCRIPTOR CURRENT ( 7 ) ,
  M  1  :  dest_frame 2 , r_dest 2 , com_ext 2 , r_w 1 , a_in
  M  1  :  1 , o_in 1 , l_in 1    ob_ctrl 0  src_frame 0 , r_source 7 ,
564  1  :  CON_LENGTH ( 32 ) FIU ( RIGHT , ZERO )
  M  1  :  len_ctrl 6    rand 4
564  1  :  ;
566  1  :  LOAD_AUN ( CURRENT ( 7 ) ) WITH 0 ,
  M  1  :  dest_frame 0 , r_dest 7 , r_w 1  a_in   0 ,
567  1  :  RETURN
  M  1  :  nac 2
567  1  :  ;
569  1  :  END
569  0  :

COMPILATION COMPLETE, 34 STATEMENTS PROCESSED
```

What is claimed is:

1. In an improved digital data processing system including (1) memory means for storing items of data including
(a) procedures containing instructions and
(b) pointers representing addresses in said memory means and providing said items in response to memory signals specifying addresses of said items in said memory means, (2) processor means for providing said memory signals to said memory means, receiving said data and said instructions from said memory means, and processing said data in response to said instructions, and (3) communications means for transferring said items and said memory signals between said processor means and said memory means, and wherein said processor means performs a procedure execution for a process by executing said instructions in said procedure using a plurality of process items of said items specified for said process, said process items include a set of architectural base pointers of said pointers associated with each said procedure execution performed by said process, said instructions contain table names representing said items, each said table name specifying one name table entry of said items in a name table of said items associated with said procedure containing said instructions, each said name table entry includes at least a basic name table entry and said name table entry including said basic name table entry specifies said address of said item represented by said table name specifying said name table entry by specifying a base address of said addresses and a displacement, and wherein further said processor means includes name processing means responsive to said table names and said name table entries for producing said address of said represented item from said name table entry associated with said table name representing said represented item by processing said associated name table entry, the improvements comprising:

(1) an improved said basic name table entry including
(a) a base source specifier alternatively specifying
(i) one of said architectural base pointers or
(ii) that said base address is not said address represented by one of said architectural base pointers, and
(b) a base-or-displacement specifier alternatively specifying
(i) said displacement when said base source specifier specifies one of said architectural base pointers and
(ii) otherwise said base address; and (2) an improved said name processing means including
(a) first means responsive to said base source specifier and to said base-or-displacement specifier for adding said displacement specified by said base-or-displacement specifier to said address represented by said architectural base pointer specified by said base source specifier when said base source specifies one of said architectural base pointers and
(b) second means responsive to said base source specifer and to said base-or-displacement specifier for producing said base address specified by said base-or-displacement specifier when said base source specifier does not specify one of said architectural base pointers by using said name table and said architectural base pointers as specified in said base-or-displacement specifier.

2. In the improved digital data processing system of claim 1, and wherein:

said instructions further contain indirect immediate names including
(a) an architectural base pointer code specifying one of said architectural base pointers,
(b) a displacement code specifying one said displacement, and
(c) an indirection code specifying that said architectural base pointer code and said displacement code specify said address of one said pointer;

said table names further include a table name code specifying that said table name is not one of said indirect immediate names;

certain ones of said table names are associated with said name table entries whose said base specifier and said displacement specifier specify said address of one said pointer;

said name processing means produces said address for said item represented by said table name by means of operations including (a) a first name resolve operation for resolving each one of said table names other than said certain ones by obtaining said base address and said displacement specified in said name table entry and adding said displacement to said base address, (b) a second name resolve operation for resolving each one of said certain ones by performing said first name resolve operation to obtain said address of said pointer specified in said associated name table entry and obtaining said specified pointer from said memory means, and (c) a third name resolve operation for resolving each one of said indirect immediate names by adding said displacement specified by said displacement code to said address represented by said architectural base pointer specified by said architectural base pointer code to obtain said address of said pointer specified by said indirect immediate name and obtaining said specified pointer from said memory means;

said base-or-displacement specifier specifying said base address alternatively contains (a) one of said indirect immediate names, (b) one of said table names, or (c) an indirect table name whose said table name code specifies that said table name is one of said certain ones of said table names; and said means responsive to said base-or-displacement specifier responds to said base-or-displacement specifier specifying said base address to obtain said base address by (a) performing said third resolve operation when said base-or-displacement specifier contains said indirect immediate name, (b) performing said first resolve operation when said base-or-displacement specifier contains said table name, and (c) performing said second resolve operation when said base-or-displacement specifier contains said indirect table name.

3. In the improved digital data processing system of claim 2, and wherein:

each said name table has a set of said procedures associated therewith;

said process items further include (a) a frame item associated with each said procedure execution and (b) a static data area item associated with at least one of said procedure executions;

said set of architectural base pointers includes (a) a frame pointer representing one said address in said frame item associated with said procedure execution associated with said set of architectural base pointers, (b) a static data area pointer representing one said address in said static data area item associated with said procedure execution associated with said set of architectural base pointers, and (c) a procedure base pointer representing one said address in said set of procedures associated with said name table;

said architectural base pointer codes include (a) a frame pointer code specifying said frame pointer, (b) a static data area pointer code specifying said static data area pointer, and (c) a procedure base pointer code specifying said procedure base pointer;

said indirect immediate name in said base-or-displacement specifier specifying said base address contains either said frame pointer code or said static data area pointer code, but not said procedure base pointer code;

said table name code in said indirect table name is said procedure base pointer code; and said means responsive to said base-or-displacement specifier performs said second resolve operation on said indirect table name in response to said procedure base pointer code.

* * * * *